US007051922B2

(12) United States Patent
Check et al.

(10) Patent No.: US 7,051,922 B2
(45) Date of Patent: *May 30, 2006

(54) COMPACT BIOPTICAL LASER SCANNING SYSTEM

(75) Inventors: Frank Check, San Jose, CA (US); LeRoy Dickson, Leeds, UT (US); John Groot, Felton, CA (US); Timothy Good, Clementon, NJ (US)

(73) Assignee: Metrologic Instruments, Inc., Blackwood, NJ (US)

(*) Notice: Subject to any disclaimer, the term of this patent is extended or adjusted under 35 U.S.C. 154(b) by 498 days.

This patent is subject to a terminal disclaimer.

(21) Appl. No.: 09/837,535

(22) Filed: Apr. 18, 2001

(65) Prior Publication Data

US 2002/0038820 A1 Apr. 4, 2002

Related U.S. Application Data

(63) Continuation-in-part of application No. 09/551,887, filed on Apr. 18, 2000, and a continuation-in-part of application No. 08/949,915, filed on Oct. 14, 1997, now Pat. No. 6,158,659, and a continuation-in-part of application No. 08/726,522, filed on Oct. 7, 1996, now Pat. No. 6,073,846, which is a continuation-in-part of application No. 08/615,054, filed on Mar. 12, 1996, now Pat. No. 6,286,760, which is a continuation of application No. 08/573,949, filed on Dec. 18, 1995, now abandoned, and a continuation-in-part of application No. 08/561,479, filed on Nov. 20, 1995, now Pat. No. 5,661,292, and a continuation-in-part of application No. 08/476,069, filed on Jun. 7, 1995, now Pat. No. 5,591,953, and a continuation of application No. 08/475,376, filed on Jun. 7, 1995, now Pat. No. 5,637,852, which is a continuation of application No. 08/293,695, filed on Aug. 19, 1994, now Pat. No. 5,468,951, and a continuation of application No. 08/293,493, filed on Aug. 19, 1994, now Pat. No. 5,525,789, and a continuation of application No. 08/292,237, filed on Aug. 17, 1994, now Pat. No. 5,808,285, and a continuation of application No. 08/439,224, filed on May 11, 1995, now Pat. No. 5,627,359.

(51) Int. Cl.
*G06K 7/10* (2006.01)

(52) U.S. Cl. ............................ 234/462.32; 235/462.4; 235/462.22; 235/462.43; 235/462.47; 235/462.25

(58) Field of Classification Search ............ 235/462.4, 235/472, 462.1, 462.32, 462.34, 462.22, 235/462.36, 472.01, 462.45, 462.39, 462.28, 235/462.43, 462.47, 462.25
See application file for complete search history.

(56) References Cited

U.S. PATENT DOCUMENTS

| | | | | | |
|---|---|---|---|---|---|
| 3,728,677 | A | * | 4/1973 | Munson | 235/437 |
| 3,902,048 | A | | 8/1975 | Fleischer et al. | 235/462.3 |
| 3,919,527 | A | | 11/1975 | Bowen et al. | 235/462.3 |
| 3,947,816 | A | | 3/1976 | Rabedeau | 235/462.4 |
| 3,978,317 | A | | 8/1976 | Yamaguchib et al. | 235/462.3 |
| 4,006,343 | A | | 2/1977 | Izura et al. | 235/470 |
| 4,026,630 | A | | 5/1977 | Wollenmann | 359/17 |
| 4,093,865 | A | | 6/1978 | Nickl | 250/566 |
| 4,097,729 | A | | 6/1978 | Seligman et al. | 235/462.4 |
| 4,113,343 | A | | 9/1978 | Pole et al. | 359/17 |
| 4,224,509 | A | * | 9/1980 | Cheng | 235/462.34 |
| 4,333,006 | A | | 6/1982 | Gorin et al. | 235/462.3 |
| 4,364,627 | A | | 12/1982 | Haines | 359/23 |
| 4,378,142 | A | | 3/1983 | Ono | 359/18 |
| 4,415,224 | A | | 11/1983 | Dickson | 359/18 |
| 4,416,505 | A | | 11/1983 | Dickson | 359/12 |
| 4,428,643 | A | | 1/1984 | Kay | 359/18 |
| 4,429,946 | A | | 2/1984 | Haines | 359/22 |
| 4,591,242 | A | | 5/1986 | Broockman et al. | 359/17 |
| 4,593,186 | A | * | 6/1986 | Swartz et al. | 235/462.36 |
| 4,610,500 | A | | 9/1986 | Kramer | 359/18 |
| 4,639,070 | A | | 1/1987 | Ikeda et al. | 235/462.3 |
| 4,647,143 | A | | 3/1987 | Yamazaki et al. | 359/18 |
| 4,652,732 | A | * | 3/1987 | Nickl | 235/462.4 |
| 4,713,532 | A | | 12/1987 | Knowles | 235/462.4 |
| 4,748,316 | A | | 5/1988 | Dickson | 235/454 |

| | | | | |
|---|---|---|---|---|
| 4,753,502 | A | 6/1988 | Ono | 359/18 |
| 4,758,058 | A | 7/1988 | Cato et al. | 359/18 |
| 4,766,298 | A | 8/1988 | Meyers | 235/462.4 |
| 4,790,612 | A | 12/1988 | Dickson | 359/12 |
| 4,794,237 | A | 12/1988 | Ferrante | 235/962.3 |
| 4,795,224 | A | 1/1989 | Goto | 359/211 |
| 4,800,256 | A * | 1/1989 | Broockman et al. | 235/462.28 |
| 4,861,973 | A | 8/1989 | Hellekson et al. | 235/462.4 |
| 4,904,034 | A | 2/1990 | Narayan et al. | 359/17 |
| 4,957,336 | A | 9/1990 | Hasegawa et al. | 359/17 |
| 4,960,985 | A | 10/1990 | Knowles | 235/462.4 |
| 4,973,112 | A | 11/1990 | Kramer | 359/17 |
| 5,000,529 | A | 3/1991 | Katoh et al. | 359/216 |
| 5,026,975 | A | 6/1991 | Guber et al. | 235/462.1 |
| 5,039,184 | A | 8/1991 | Murakawa et al. | 359/216 |
| 5,043,563 | A * | 8/1991 | Chi et al. | 235/462.4 |
| 5,073,702 | A | 12/1991 | Schuhmacher | 235/462.2 |
| 5,124,537 | A | 6/1992 | Chandler et al. | 235/462.1 |
| 5,132,524 | A | 7/1992 | Singh et al. | 235/462.3 |
| 5,144,118 | A | 9/1992 | Actis et al. | 235/462.1 |
| 5,153,417 | A | 10/1992 | Sakai et al. | 235/462.3 |
| 5,162,929 | A | 11/1992 | Roddy et al. | 359/17 |
| 5,206,491 | A | 4/1993 | Katoh et al. | 235/462.4 |
| 5,212,370 | A | 5/1993 | Wittensoldner et al. | 235/472 |
| 5,216,230 | A | 6/1993 | Nakazawa | 235/454 |
| 5,229,588 | A | 7/1993 | Detwiler et al. | 235/462.3 |
| 5,286,961 | A | 2/1994 | Saegusa | 235/462.4 |
| 5,296,689 | A | 3/1994 | Reddersen et al. | 235/462.2 |
| 5,361,158 | A | 11/1994 | Tang | 235/462.4 |
| 5,452,379 | A * | 9/1995 | Poor | 382/317 |
| 5,459,308 | A | 10/1995 | Detwiler et al. | 235/462.3 |
| 5,475,207 | A | 12/1995 | Bobba et al. | 235/462.4 |
| 5,484,990 | A | 1/1996 | Lindacher et al. | 235/462.2 |
| 5,491,328 | A | 2/1996 | Rando | 235/462.1 |
| 5,495,097 | A | 2/1996 | Katz et al. | 235/462.1 |
| 5,504,595 | A | 4/1996 | Moron et al. | 359/16 |
| 5,510,605 | A | 4/1996 | Miyazaki | 235/462.4 |
| 5,550,655 | A | 8/1996 | Kayashima et al. | 359/17 |
| 5,555,130 | A | 9/1996 | Marom et al. | 359/574 |
| 5,557,093 | A | 9/1996 | Knowles et al. | 235/462.3 |
| 5,684,289 | A | 11/1997 | Detwiler et al. | 235/462.3 |
| 5,689,102 | A | 11/1997 | Schonenberg et al. | 235/462.3 |
| 5,693,930 | A | 12/1997 | Katoh et al. | 235/462.3 |
| 5,705,802 | A | 1/1998 | Bobba et al. | 235/462.3 |
| 5,723,852 | A | 3/1998 | Rando et al. | 235/462.4 |
| 5,801,370 | A | 9/1998 | Katoh et al. | 235/462 |
| 5,814,803 | A | 9/1998 | Olmstead et al. | 235/462 |
| 5,837,988 | A | 11/1998 | Bobba et al. | 235/472 |
| 5,869,827 | A | 2/1999 | Rando | 235/462.4 |
| 5,886,336 | A | 3/1999 | Tang et al. | 303/37 |
| 5,945,658 | A * | 8/1999 | Salatto et al. | 235/462.22 |
| 6,098,885 | A * | 8/2000 | Knowles et al. | 235/462.4 |
| 6,216,951 | B1 * | 4/2001 | Swift et al. | 235/462.45 |
| 6,330,975 | B1 * | 12/2001 | Bunte et al. | 235/472.01 |
| 6,568,598 | B1 * | 5/2003 | Bobba et al. | 235/462.39 |
| 6,631,844 | B1 * | 10/2003 | Ohkawa et al. | 235/462.38 |
| 6,681,994 | B1 * | 1/2004 | Koenck | 235/472.01 |
| 6,758,402 | B1 * | 7/2004 | Check et al. | 235/462.34 |
| 2001/0000615 | A1 * | 5/2001 | Amundsen et al. | 235/472.01 |

FOREIGN PATENT DOCUMENTS

| | | |
|---|---|---|
| JP | 54-819 | 1/1979 |
| JP | 51-33710 | 3/1979 |
| JP | 56-47019 A | 4/1981 |
| JP | 64-48017 | 2/1989 |

OTHER PUBLICATIONS

PSC Magellan SL 360-Degree Scanner/Scale by PSC Inc., www.pscnet.com/magslspe.html#spec5, 2000.

Fujitsu Slimscan by Fujitsu Systems of America, Fujitsu Systems of America, vol. 0, No. 0, 1991.

Low-Profile Holog Raphic Bar Code Scanner by LeRoy Dickson and Robert Cato, IBM Technical Disclosure Bulletin., vol. 31, No. 12, 1989, p. 205-206.

Dual-Purpose Holographic Optical Element for a Scanner by IBM Corp., IBM Technical Disclosure Bulletin, vol. 29, No. 7, 1986, p. 2892-2893.

Chromatic Correction for a Laser Diode/Holographic Deflector by G.T. Sincerbox, IBM Technical Disclosure Bulletin, vol. 27, No. 5, 1984, p. 2892-2893.

Aberrant Holographic Focusing Element for Post-Objective Holographic Deflector by L. D. Dickson, IBM Technical Disclosure Bulletin, vol. 26, No. 12, 1984, p. 6687-6688.

Holography in the IBM 3687 Supermarket Scanner by LeRoy D. Dickson, et. al., IBM Journal of Research and Development, vol. 26, No. 2, 1982, p. 228-234.

Correction of Astigmatism for Off-Axis Reconstruction Beam Holographic Deflector by L.D. Dickson, IBM Technical Disclosure Bulletin, vol. 23, No. 9, 1981, p. 4255-4256.

Hologram Scanner for Pos Bar Code Symbol Reader by Hiroyuki Ikeda, et. al., Fujitsu Scientific & Technical Journal, vol. 15, No. 1, 1979, p. 59-77.

* cited by examiner

*Primary Examiner*—Jared J. Fureman
*Assistant Examiner*—Allyson N Trail
(74) *Attorney, Agent, or Firm*—Thomas J. Perkowski, Esq., P.C.

(57) ABSTRACT

A bioptical holographic laser scanning system employing a plurality of laser scanning stations about a holographic scanning disc having scanning facets with high and low elevation angle characteristics, as well as positive, negative and zero skew angle characteristics which strategically cooperate with groups of beam folding mirrors having optimized surface geometry characteristics. The system has an ultra-compact construction, ideally suited for space-constrained retail scanning environments, and generate a 3-D omnidirectional laser scanning pattern between the bottom and side scanning windows during system operation. The laser scanning pattern of the present invention comprises a complex of pairs of quasi-orthogonal laser scanning planes, which include a plurality of substantially-vertical laser scanning planes for reading bar code symbols having bar code elements (i.e. ladder-type bar code symbols) that are oriented substantially horizontal with respect to the bottom scanning window, and a plurality of substantially-horizontal laser scanning planes for reading bar code symbols having bar code elements (i.e. picket-fence type bar code symbols) that are oriented substantially vertical with respect to the bottom scanning window.

31 Claims, 365 Drawing Sheets

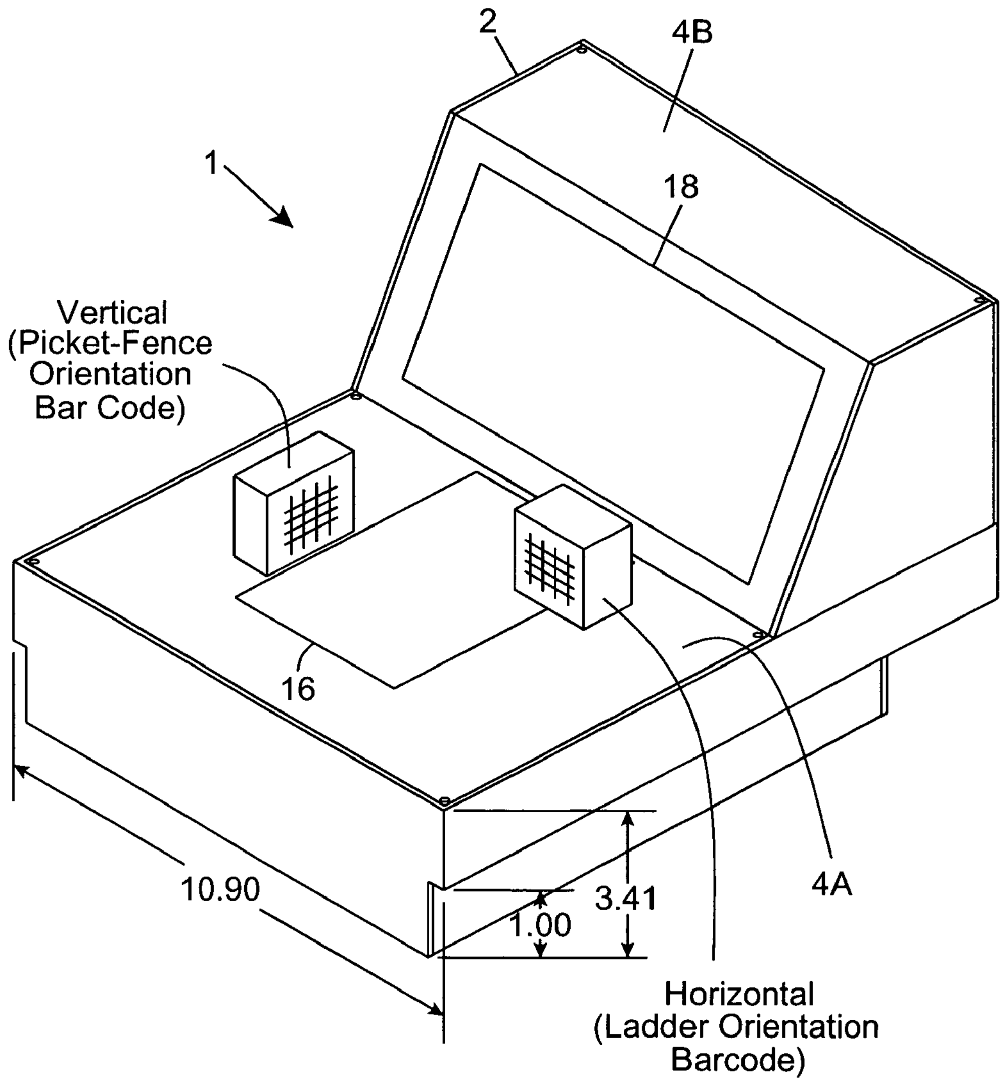
FIG. 1A1

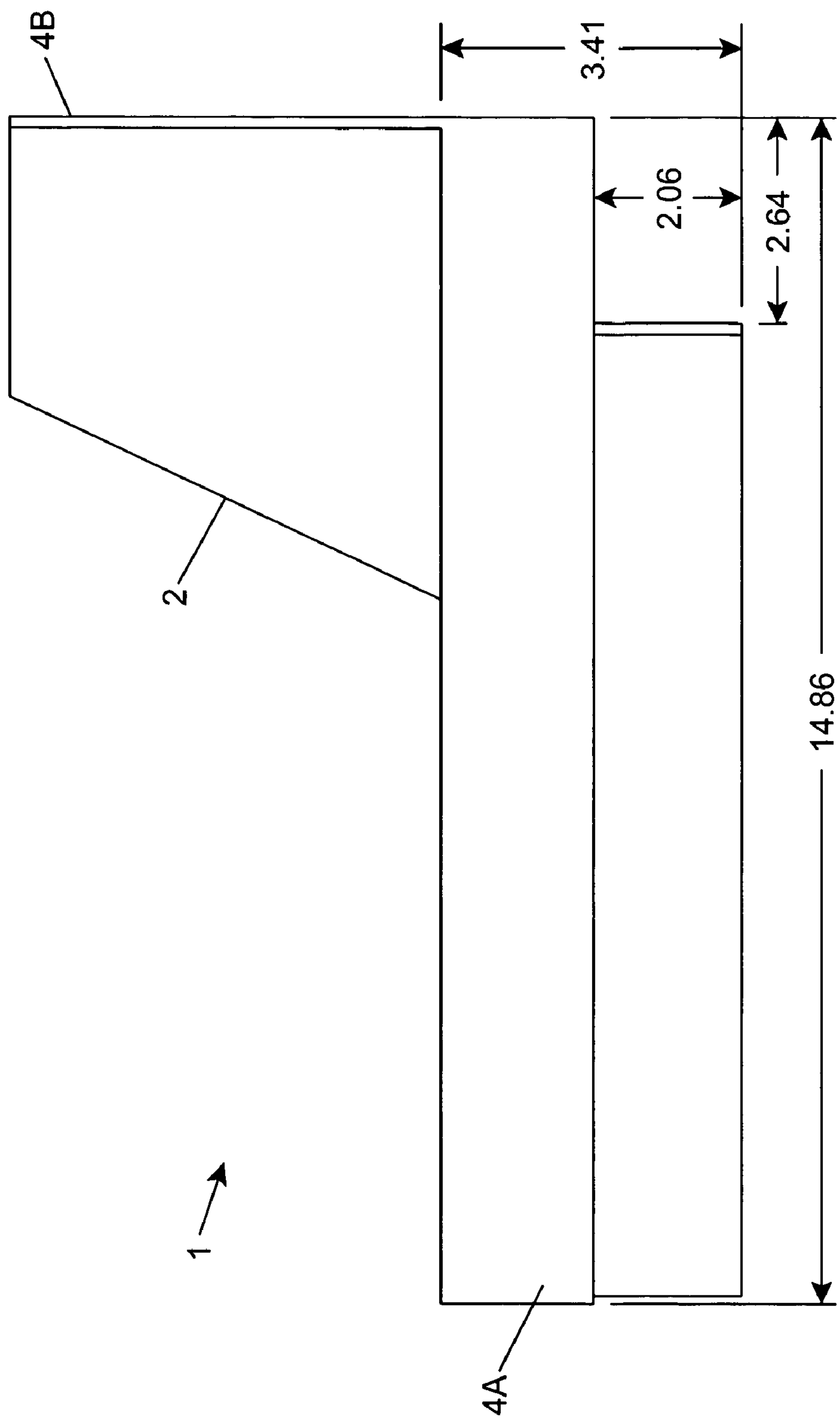
FIG. 1A2

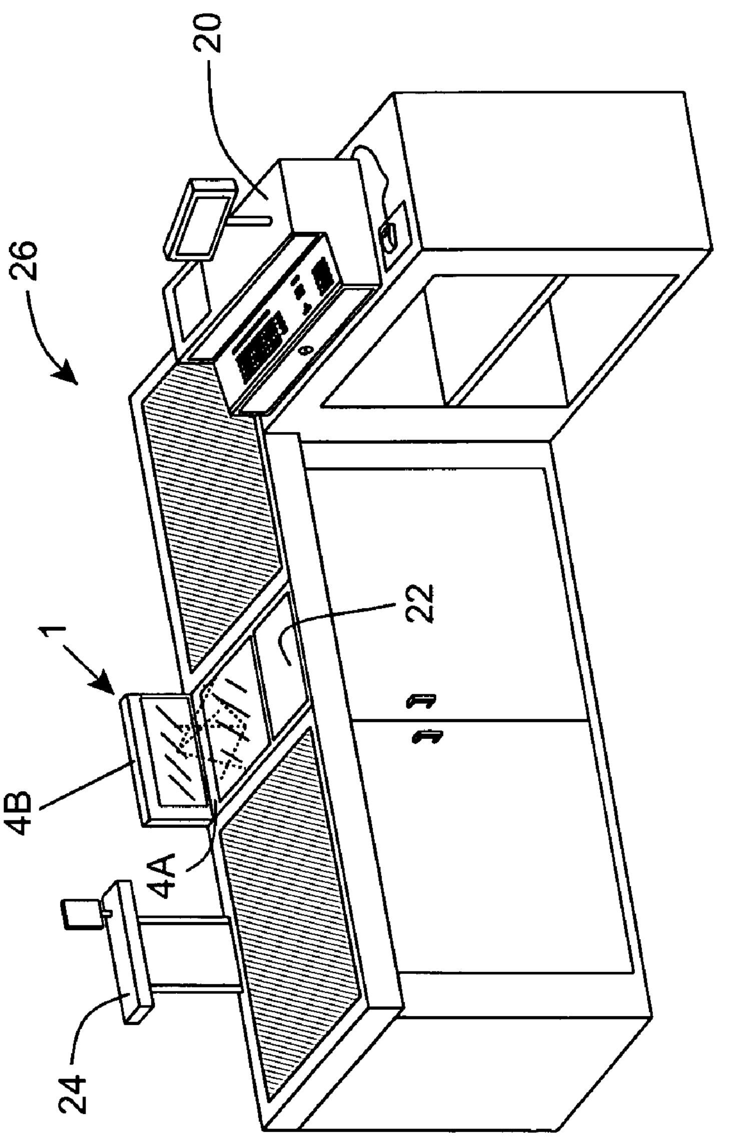
FIG. 1B1

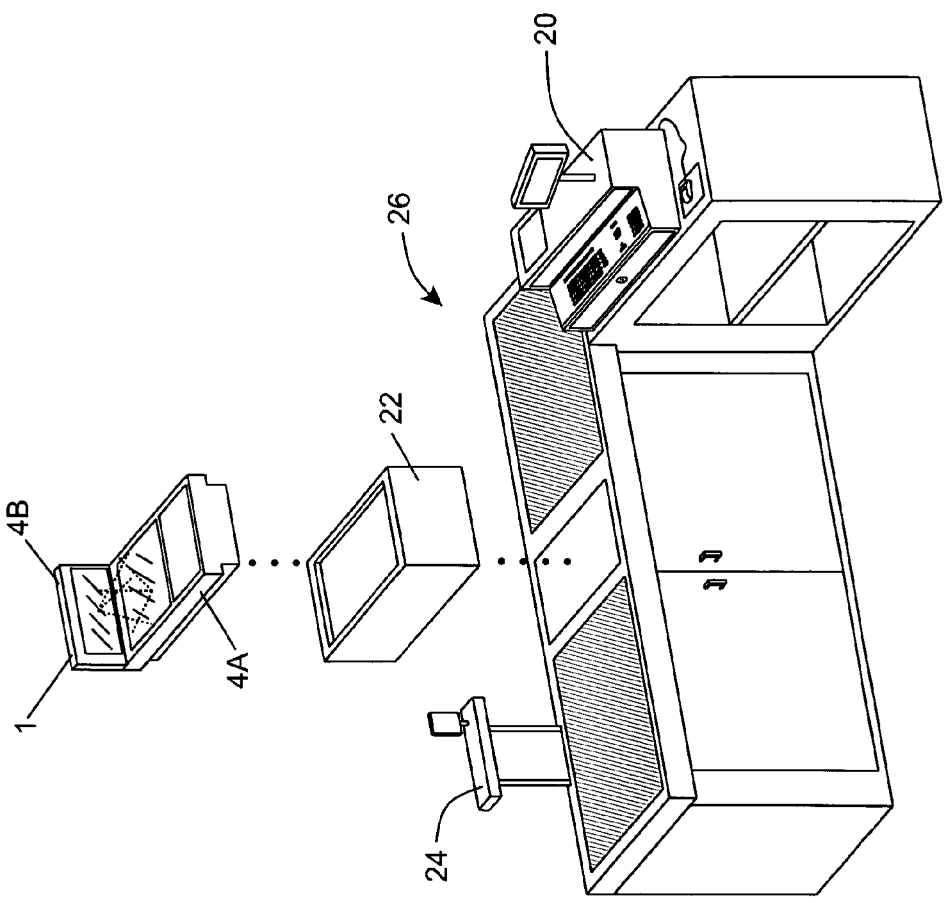
FIG. 1B2

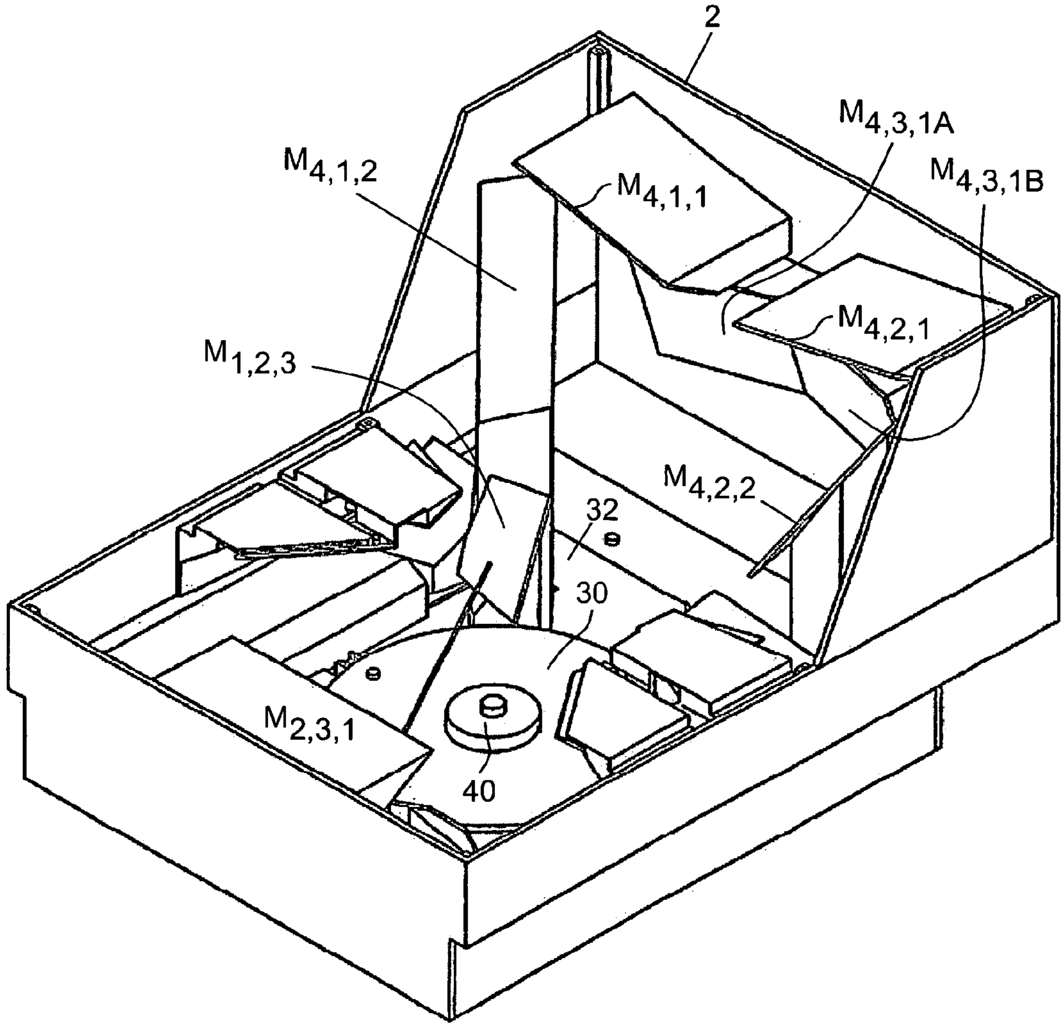
FIG. 1D1

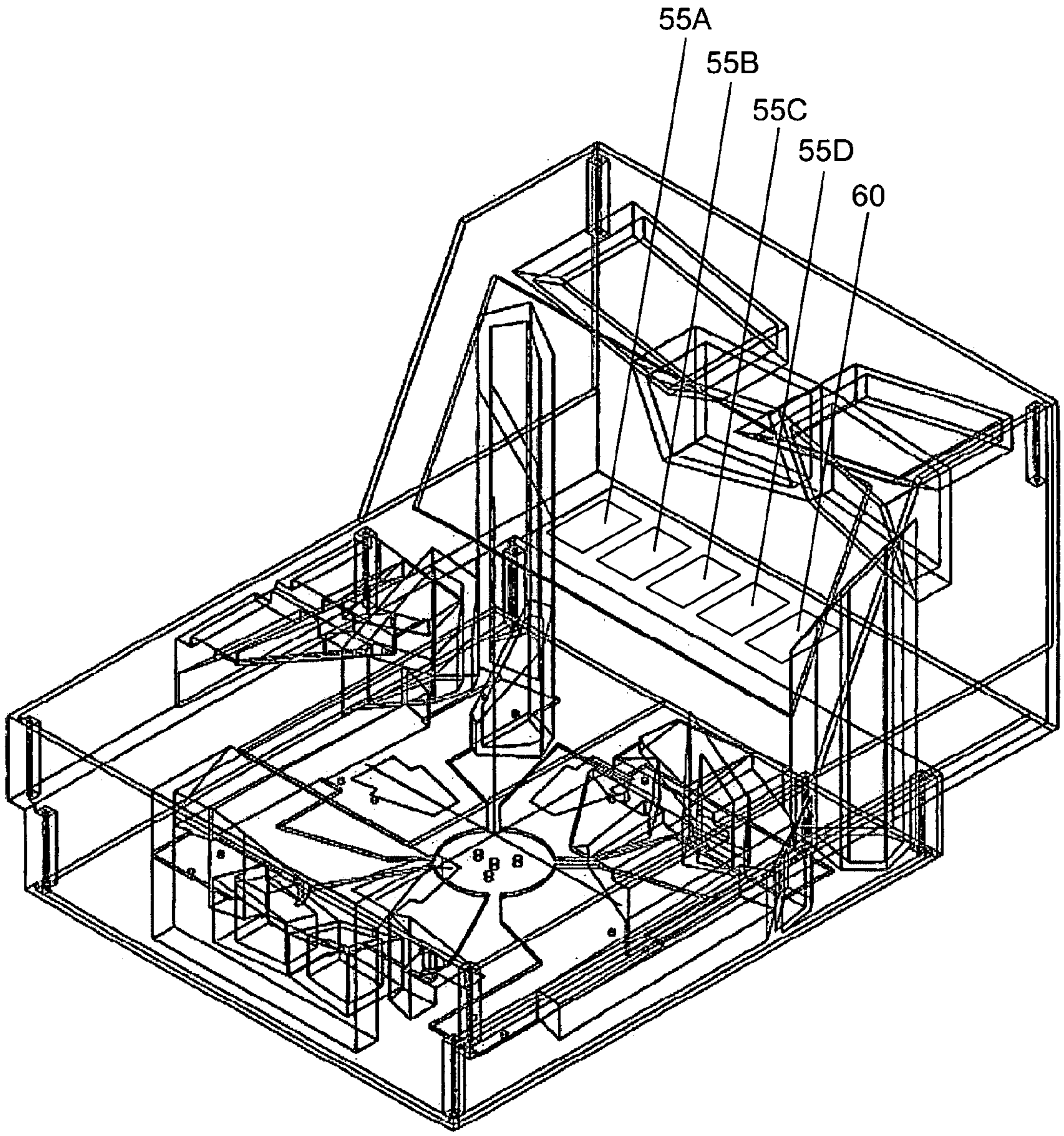
FIG. 1D2

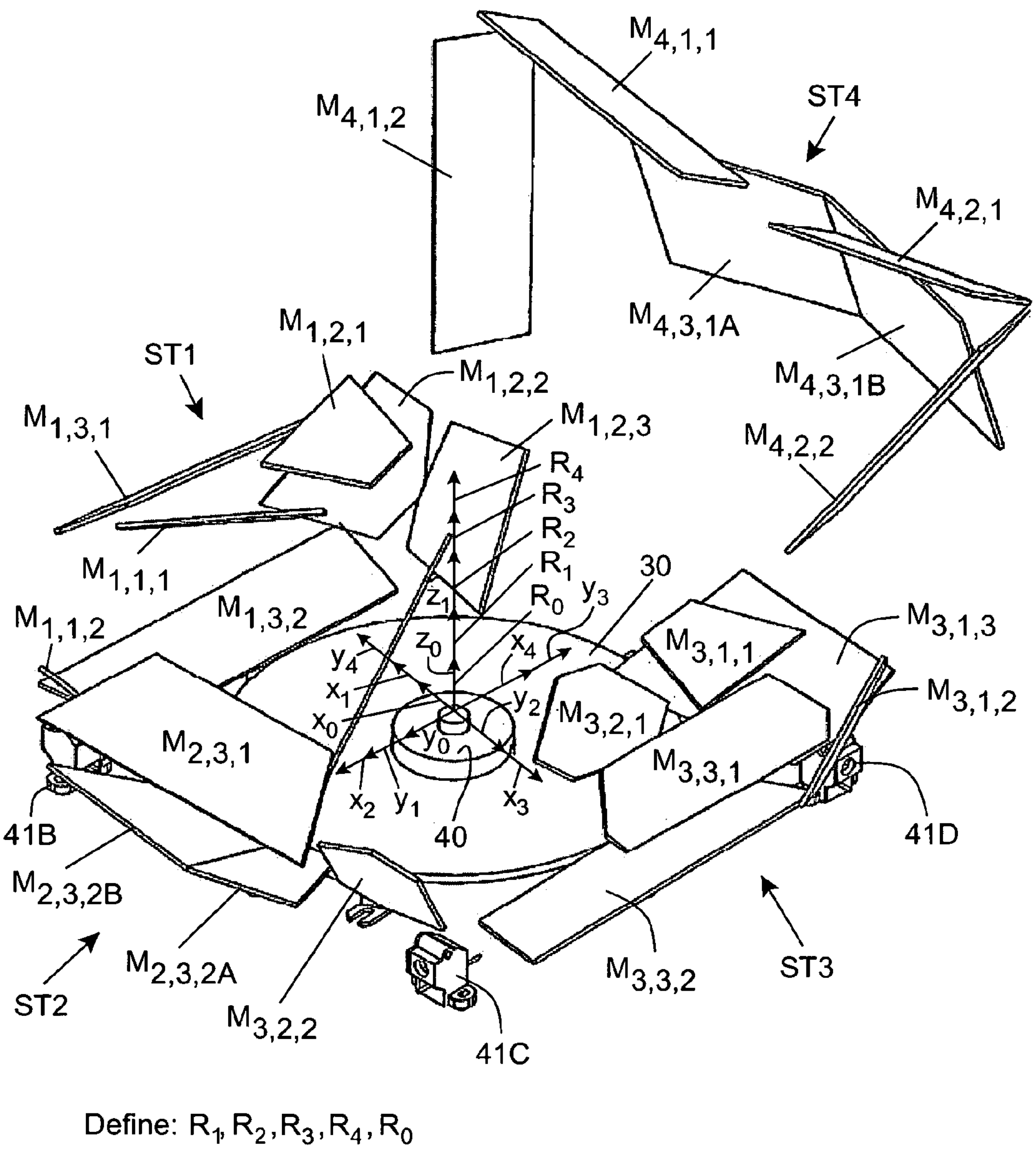
FIG. 2A1

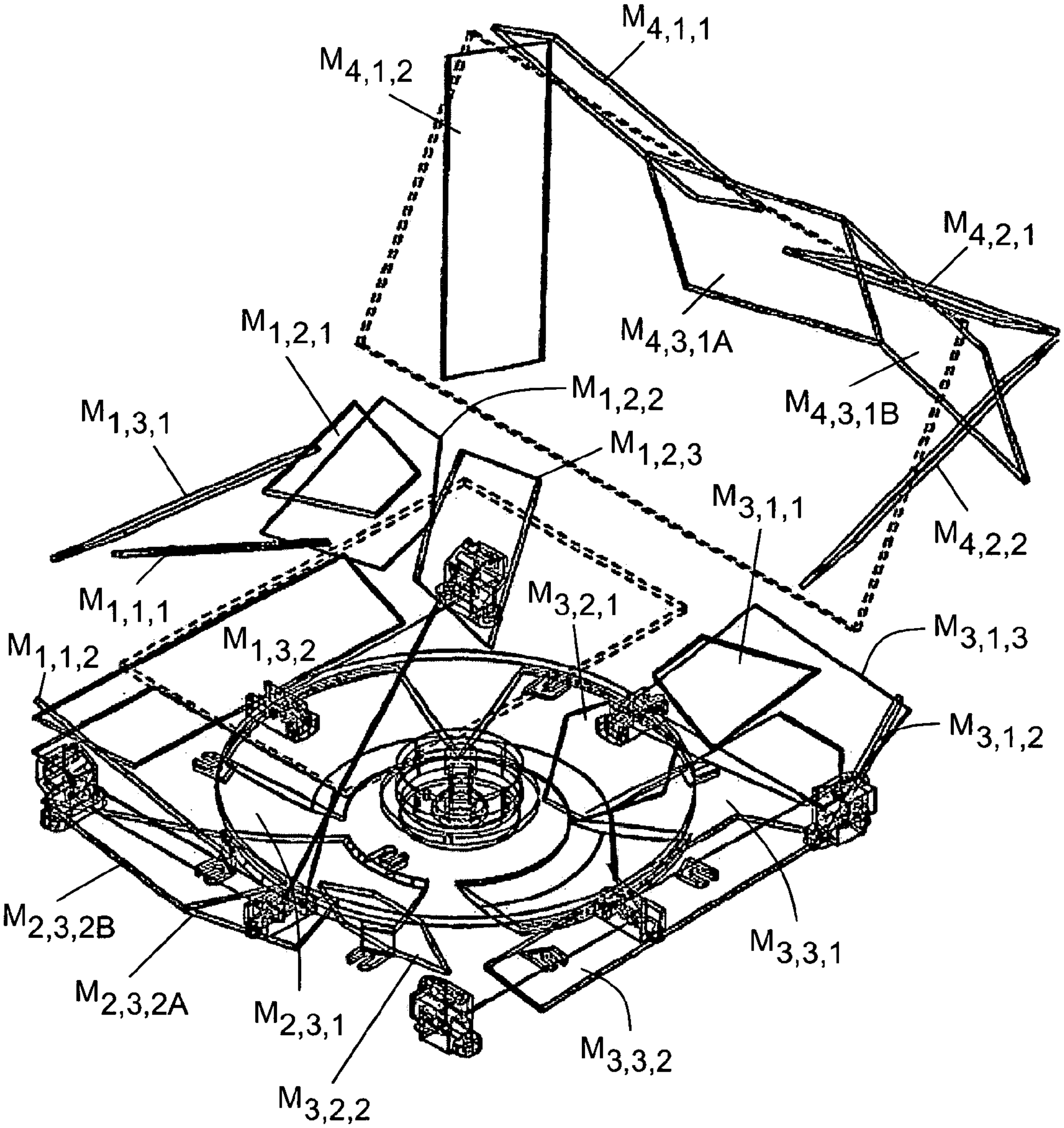
FIG. 2A2

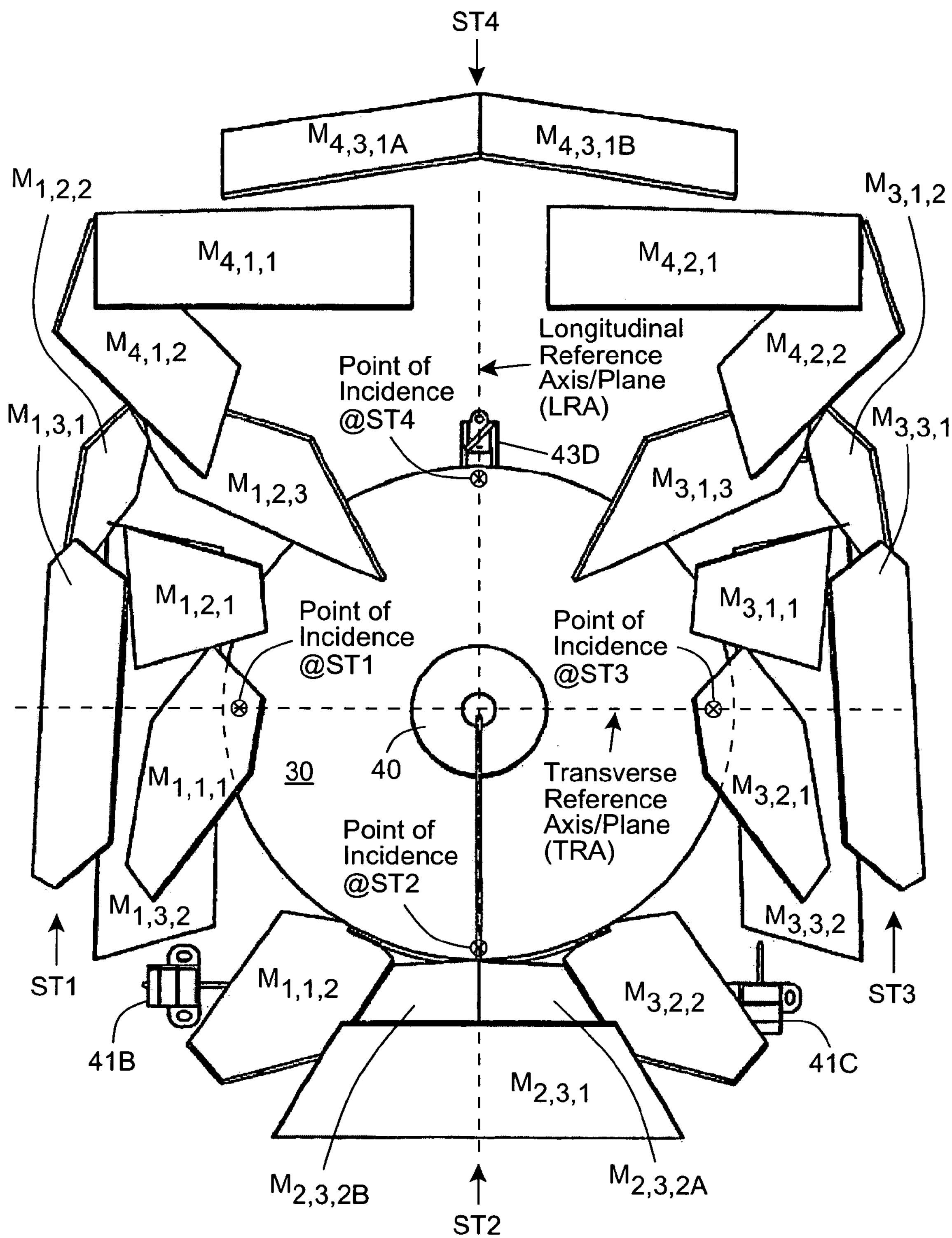
FIG. 2B1

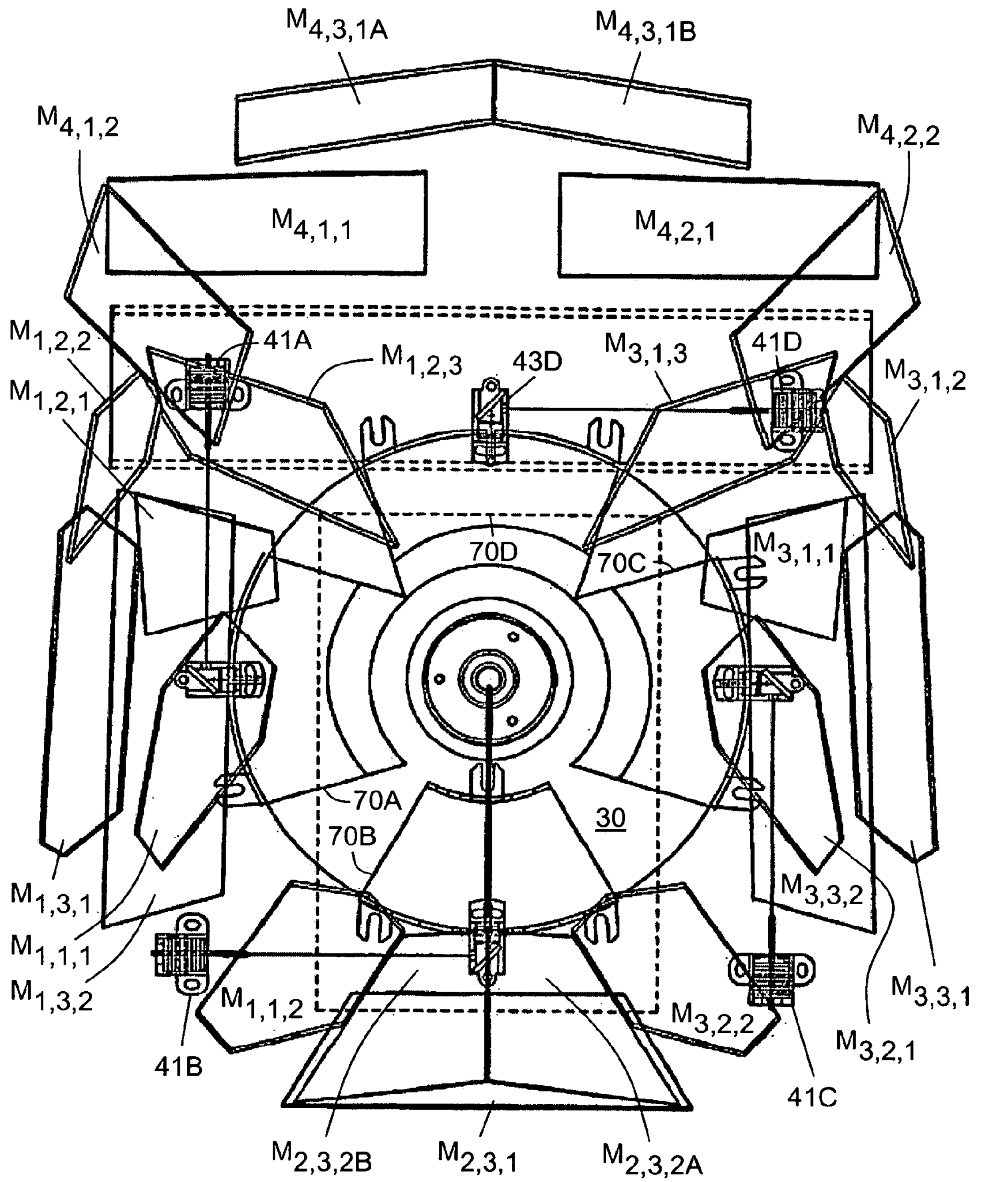
FIG. 2B2

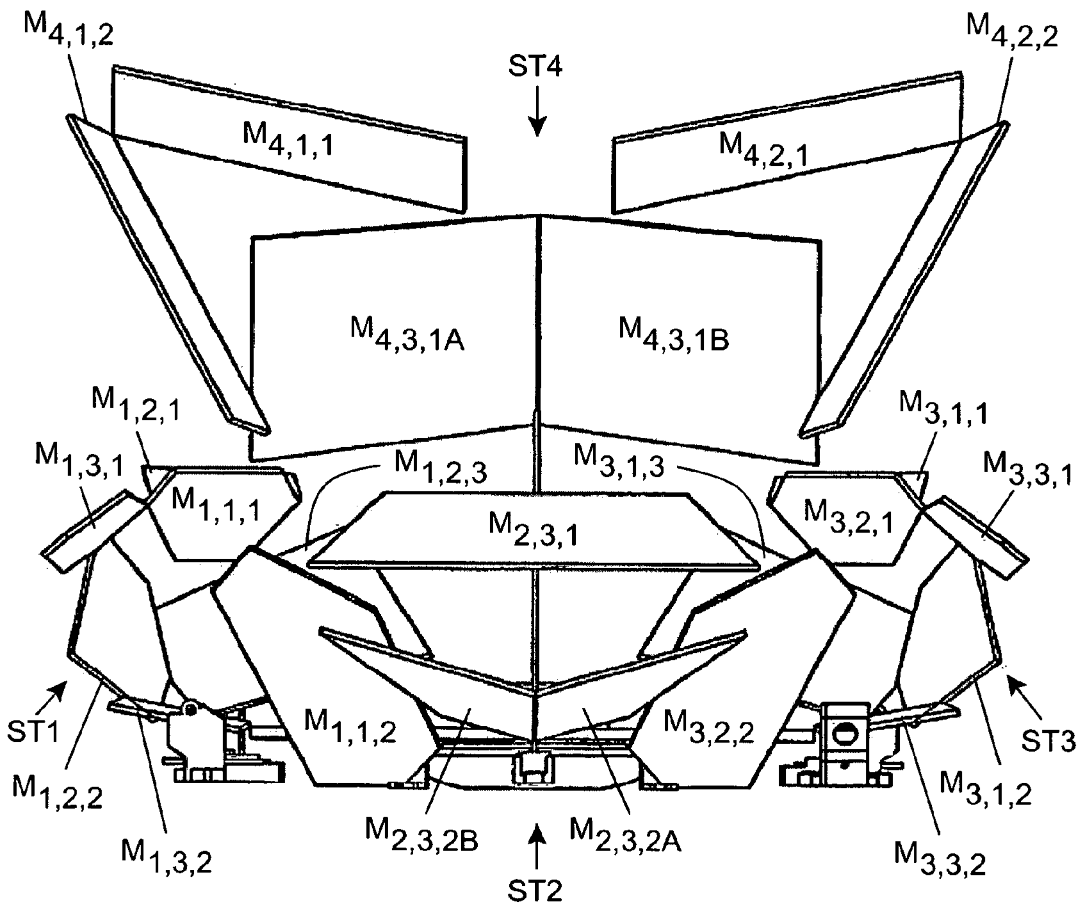
FIG. 2C1

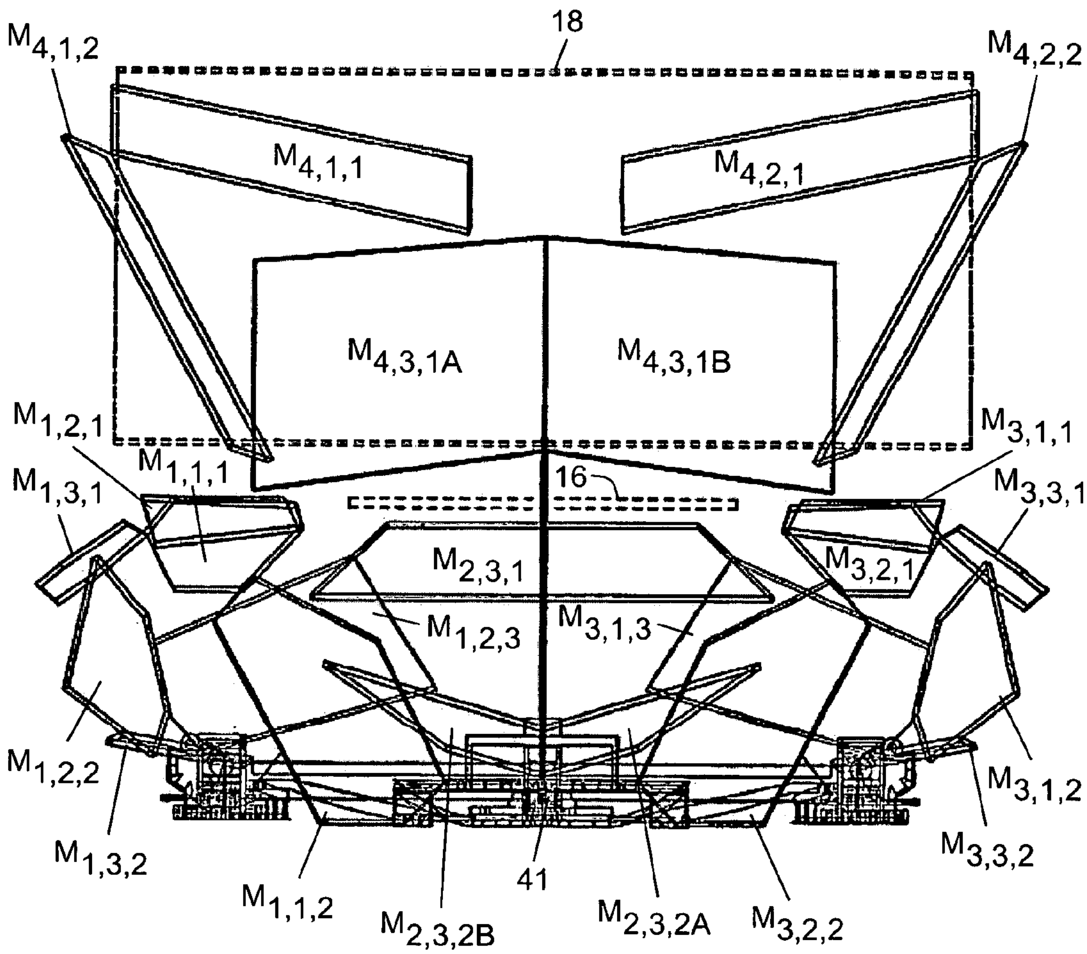
FIG. 2C2

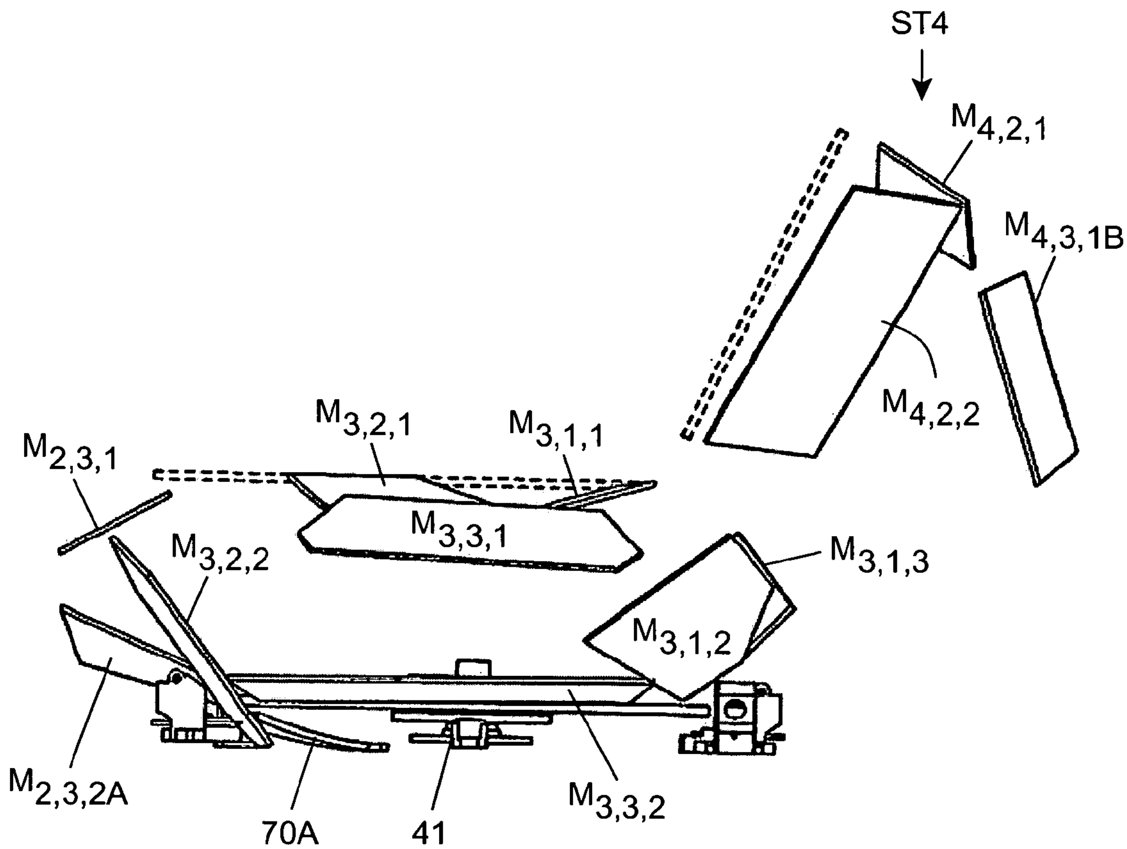
FIG. 2D1

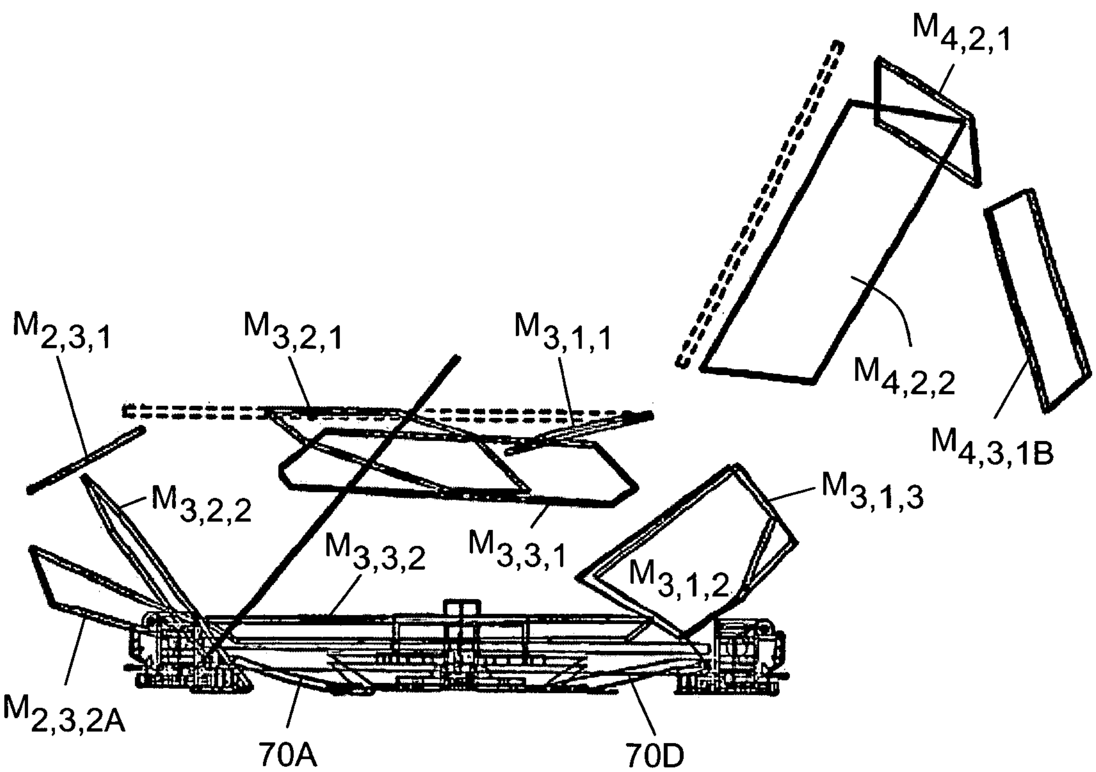
FIG. 2D2

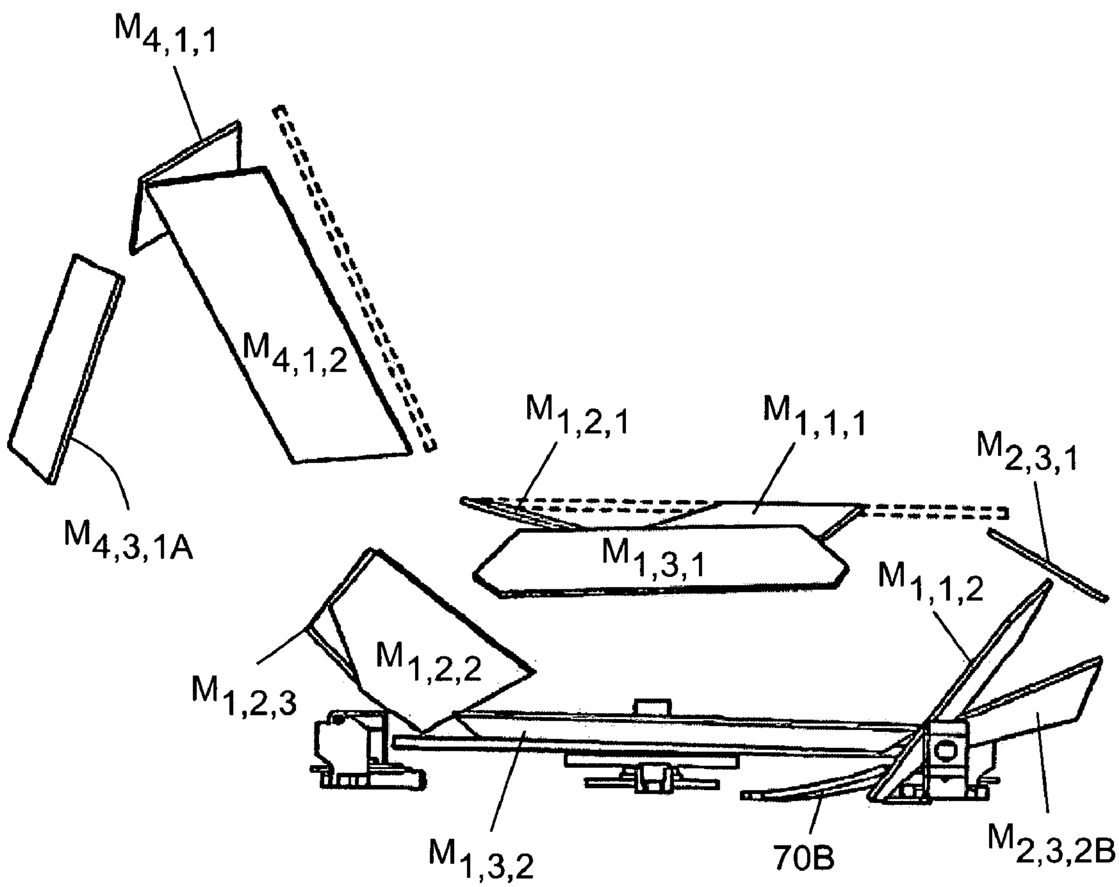
FIG. 2E1

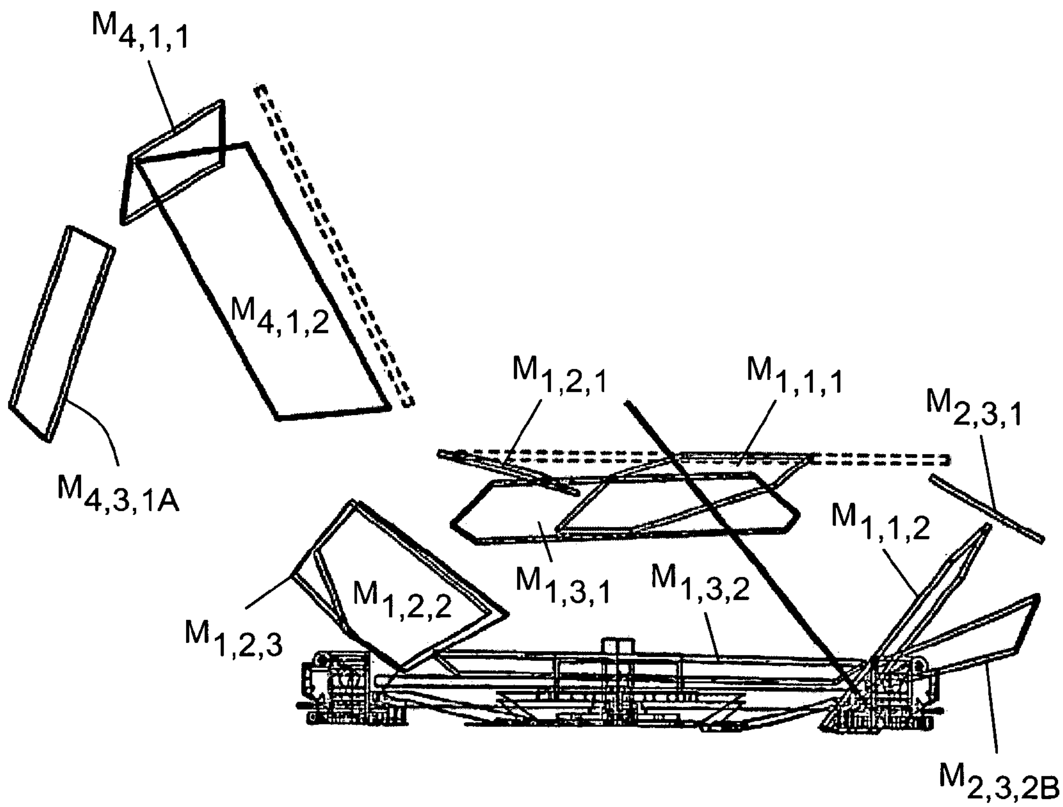
FIG. 2E2

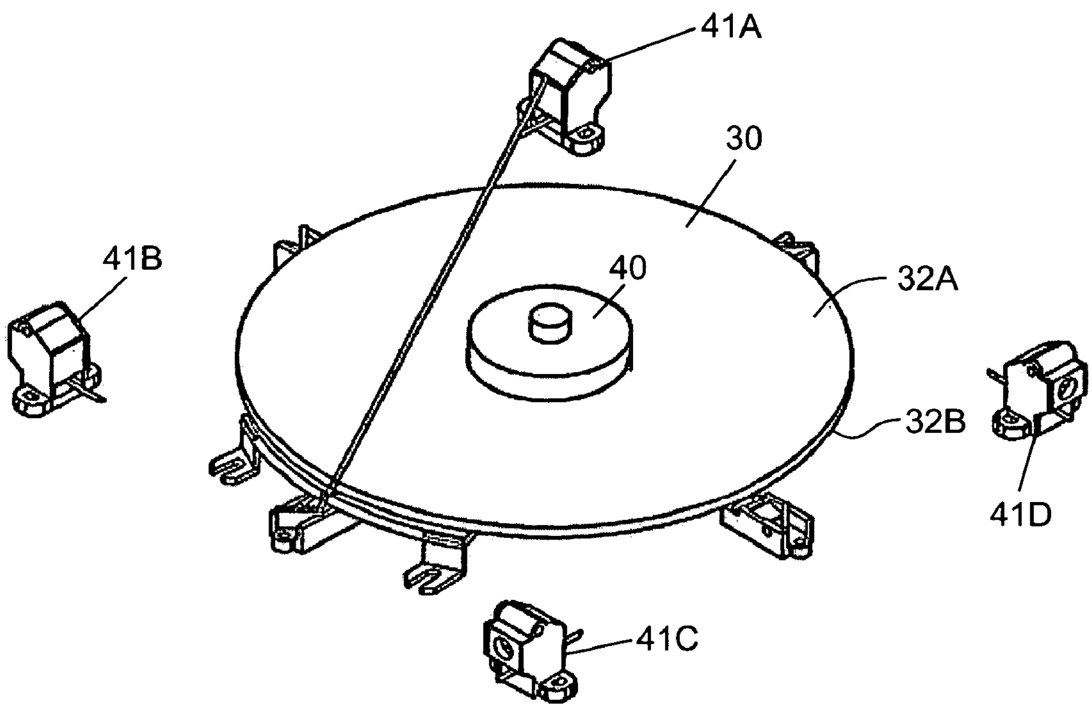
FIG. 2F1

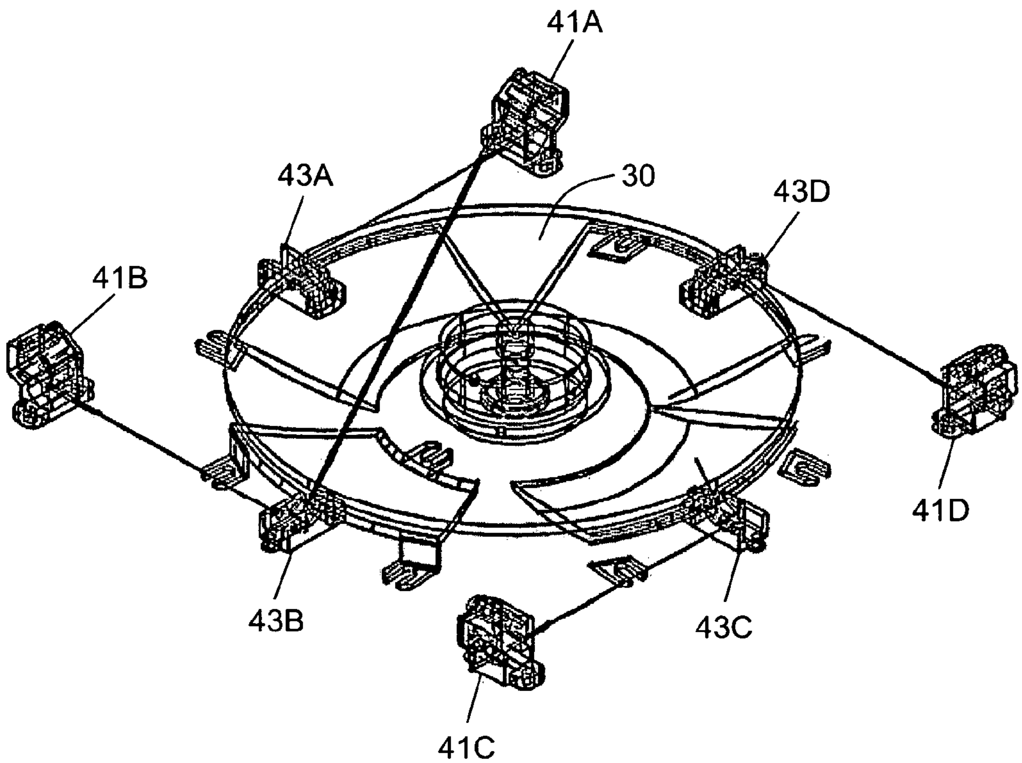
FIG. 2F2

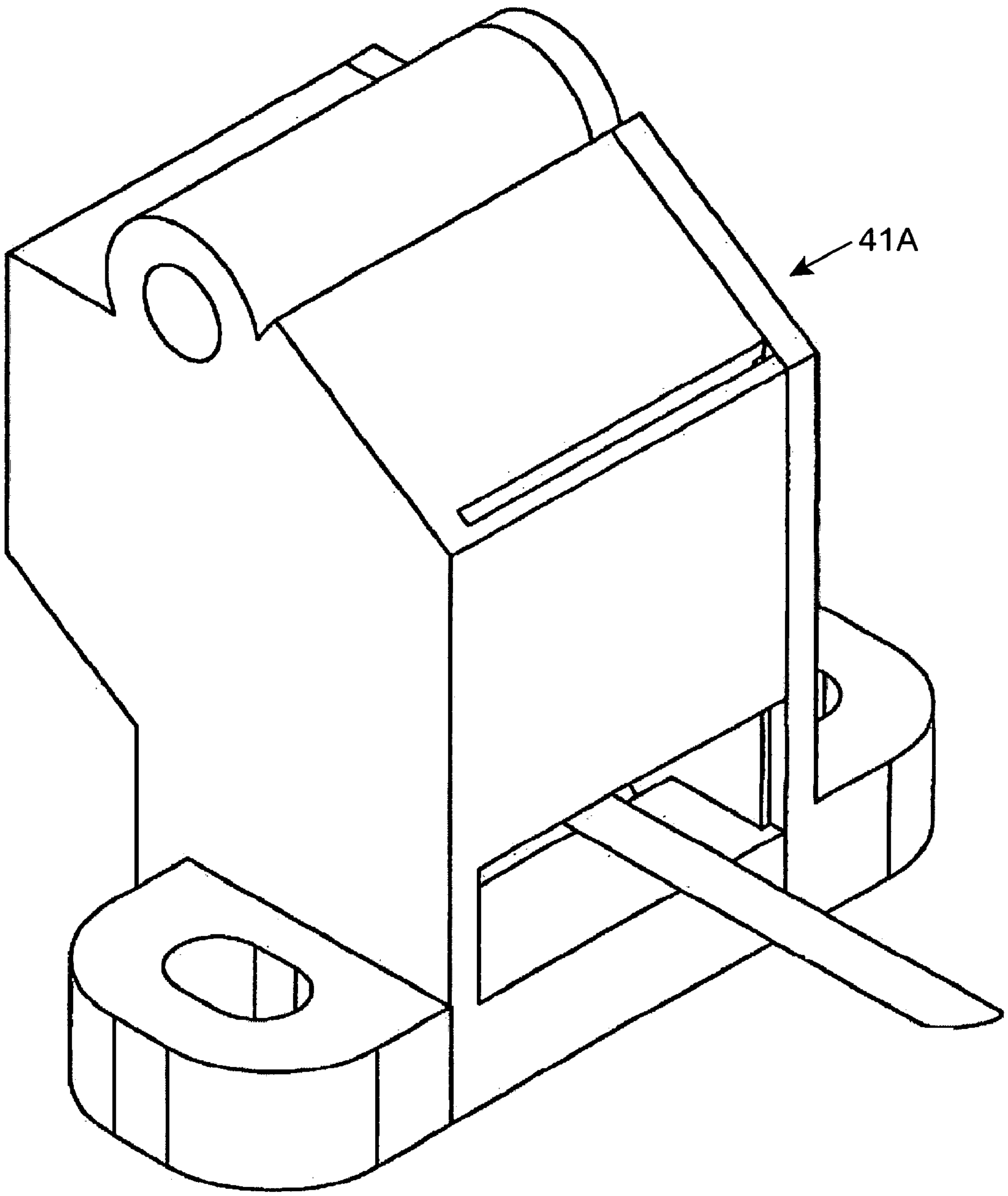
FIG. 2G1

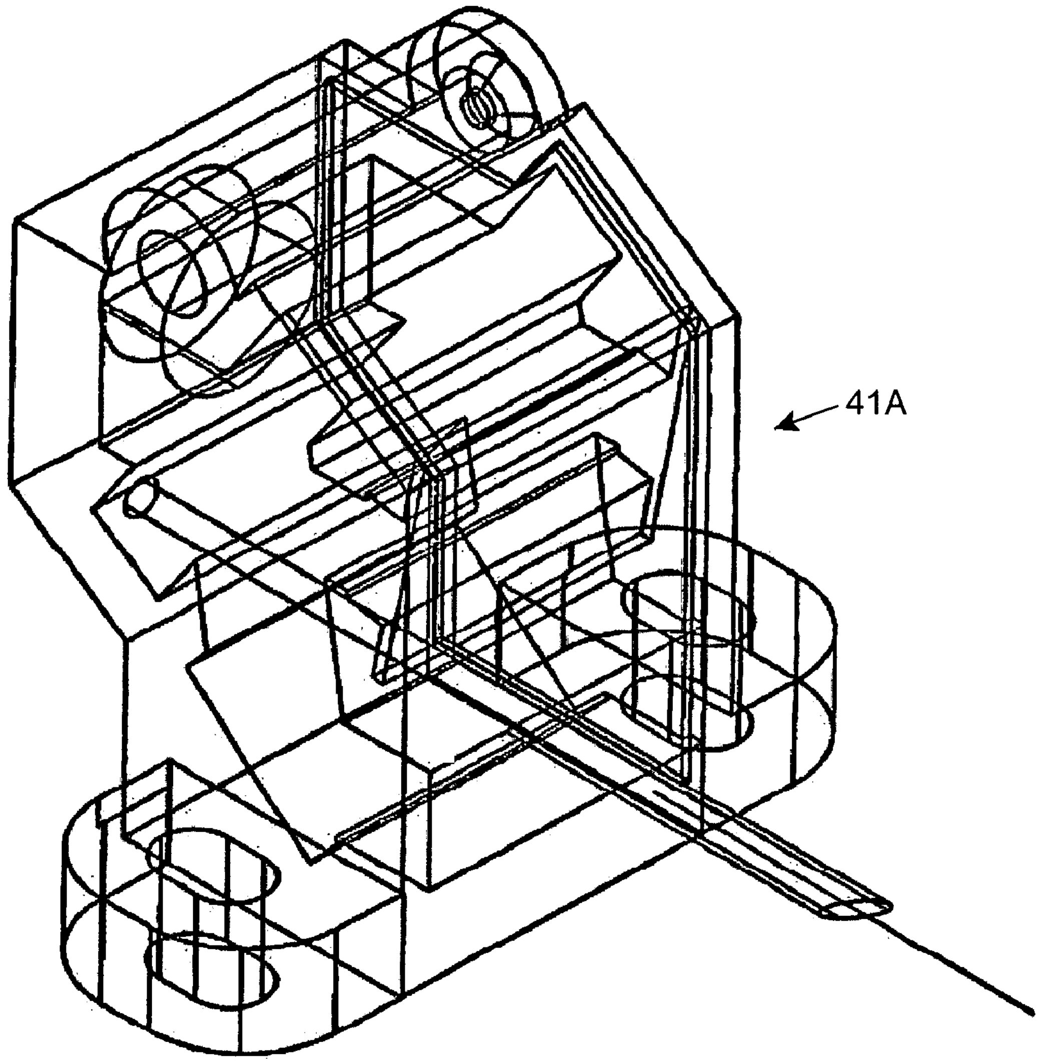
FIG. 2G2

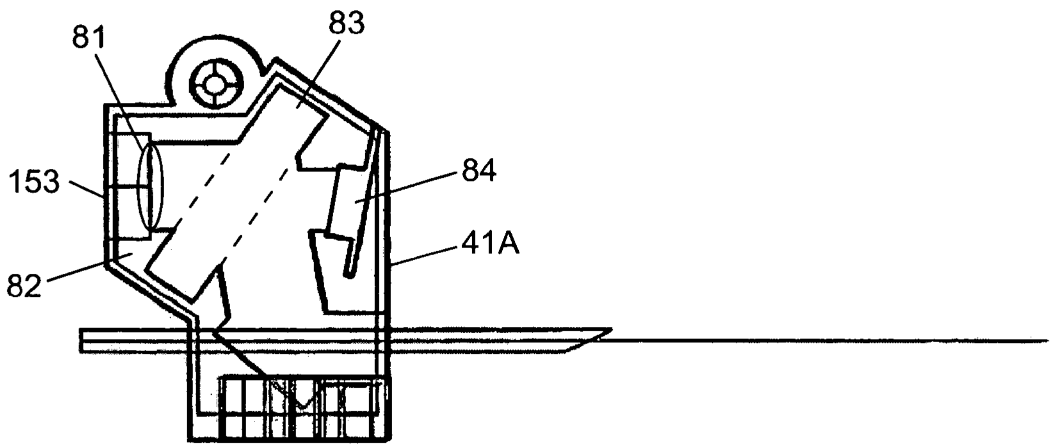
FIG. 2G3

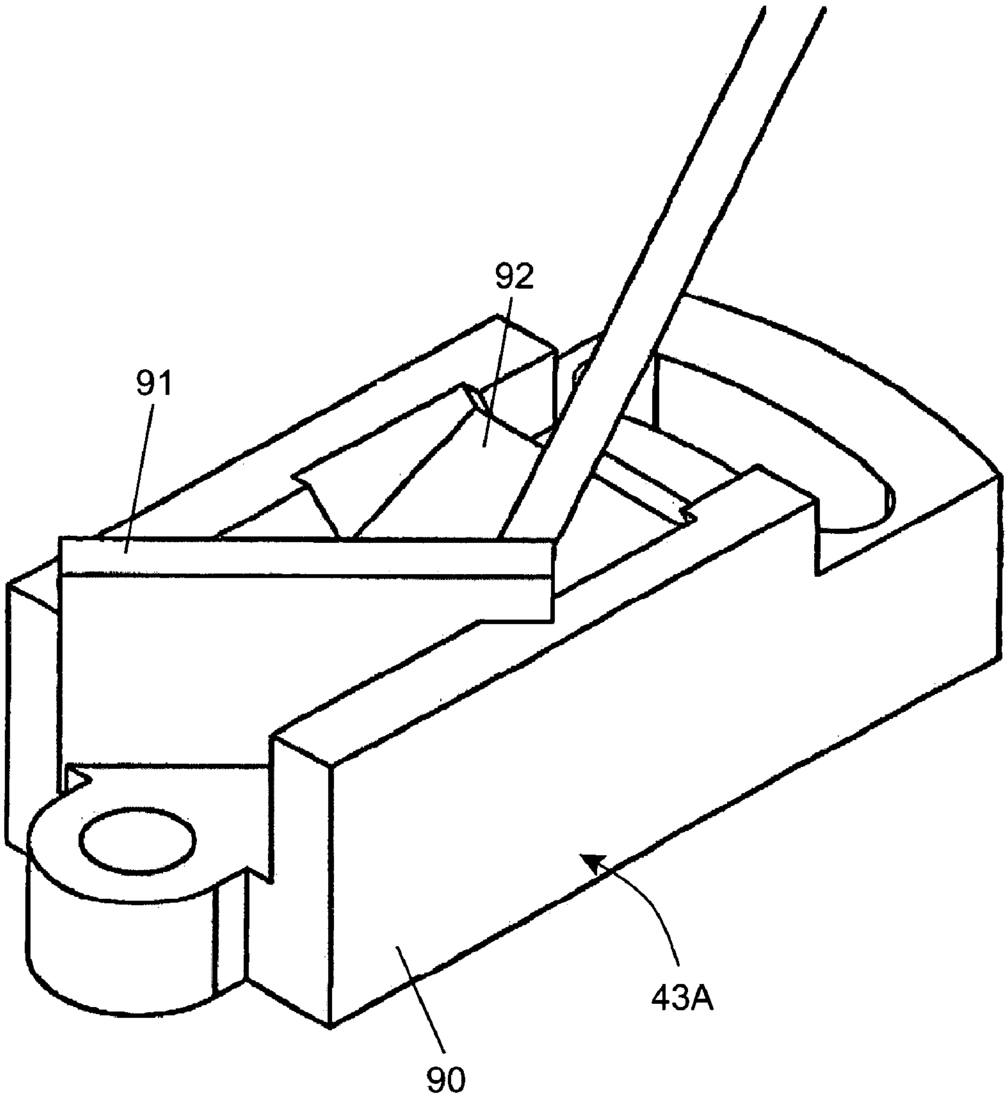
FIG. 2H1

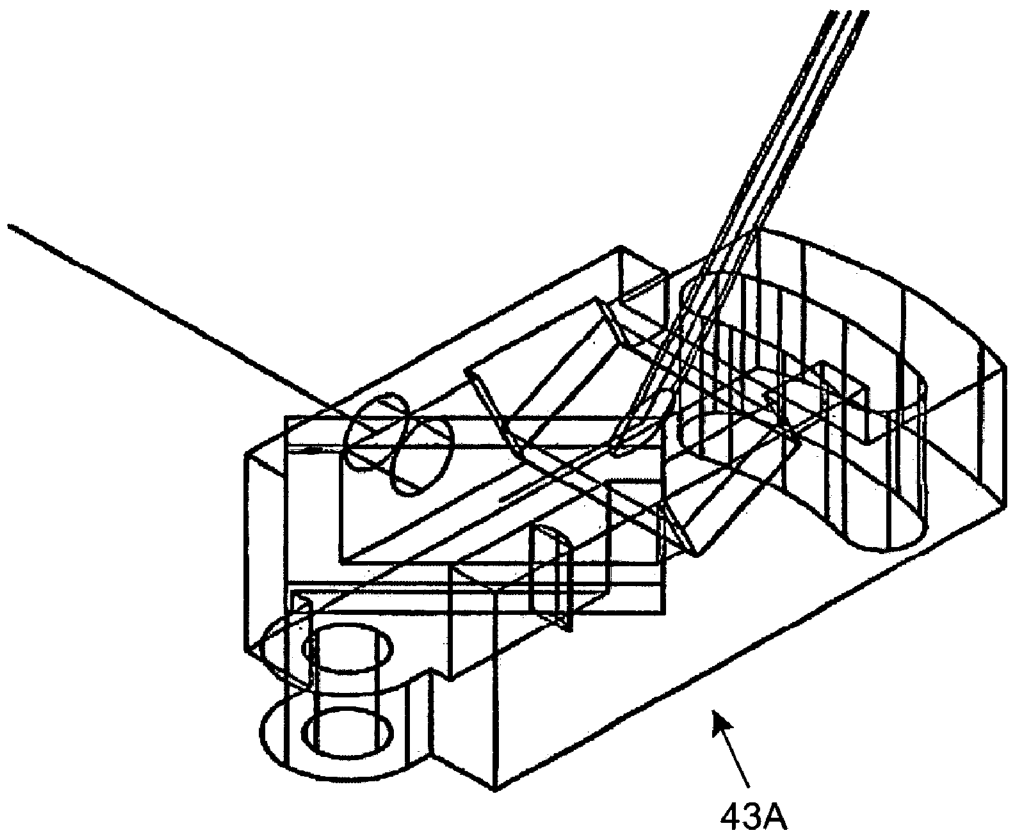
FIG. 2H2

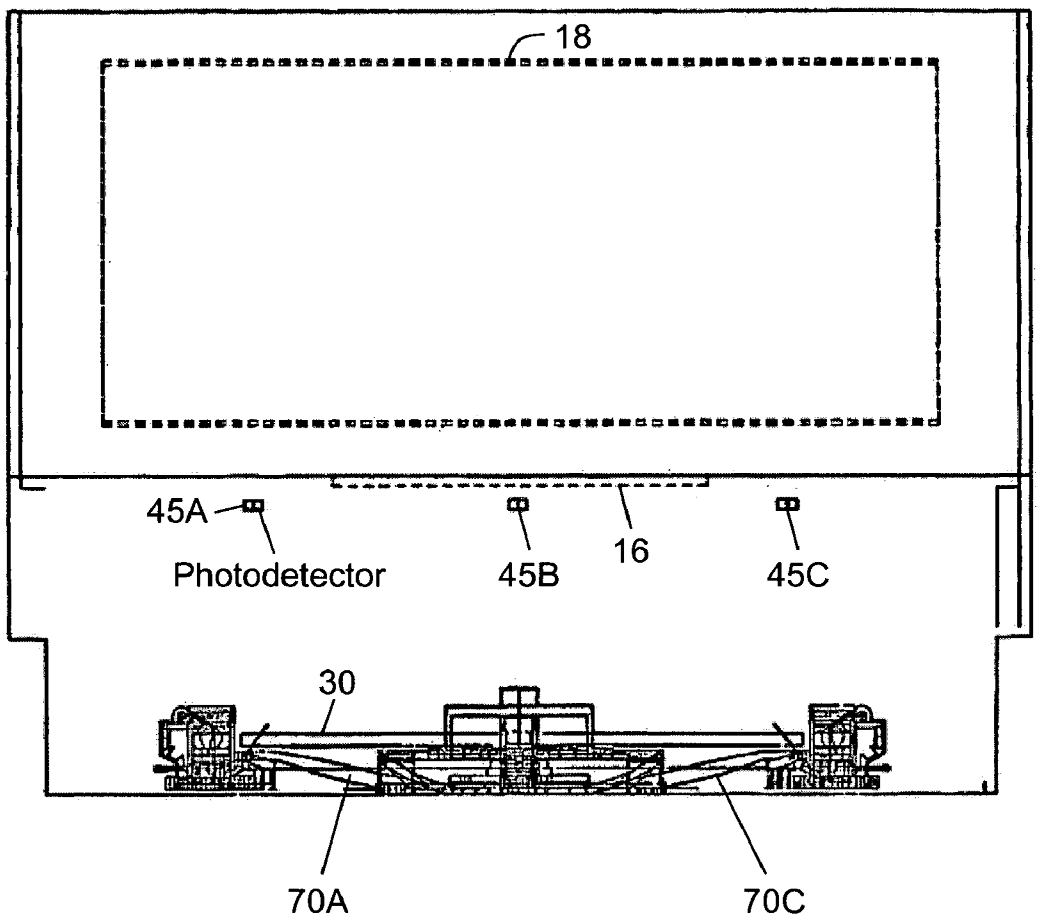
FIG. 2I1

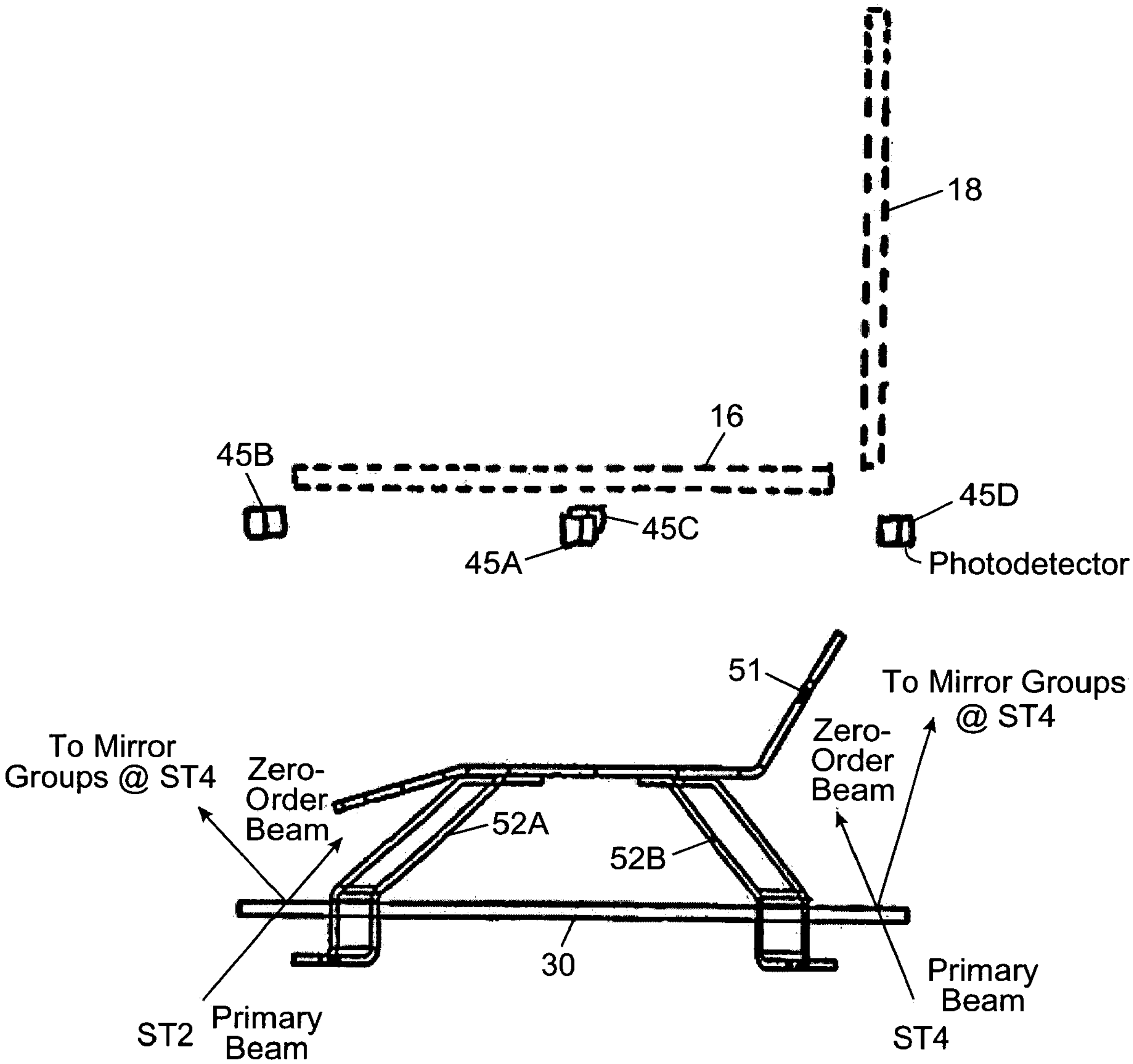
FIG. 2I2

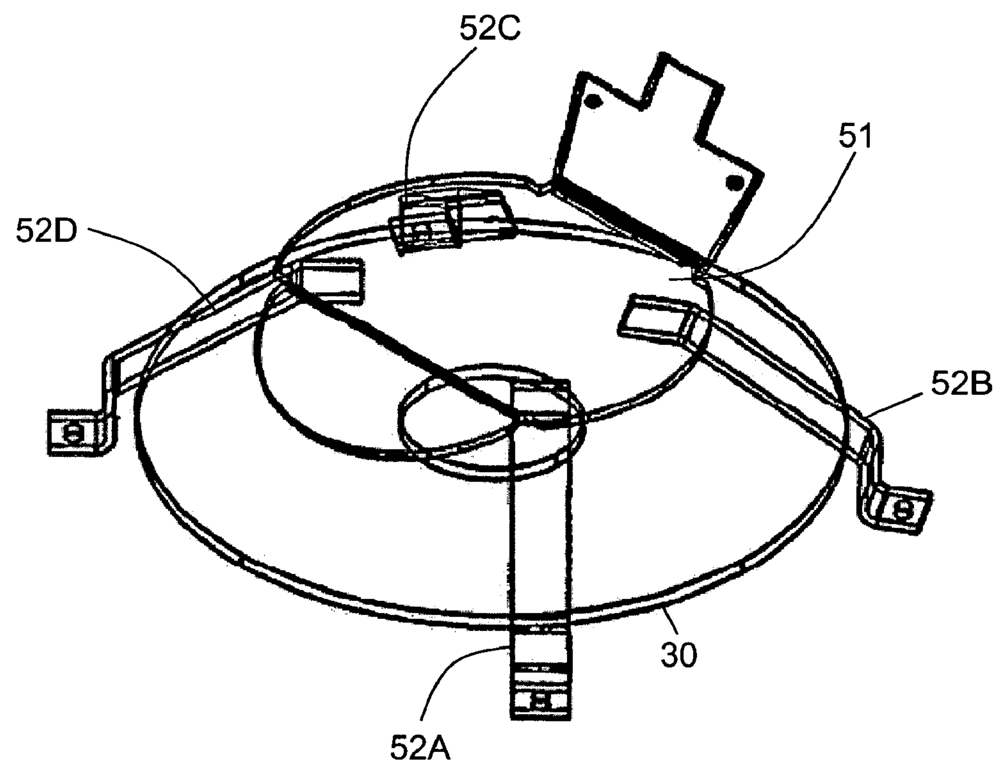
FIG. 2I3

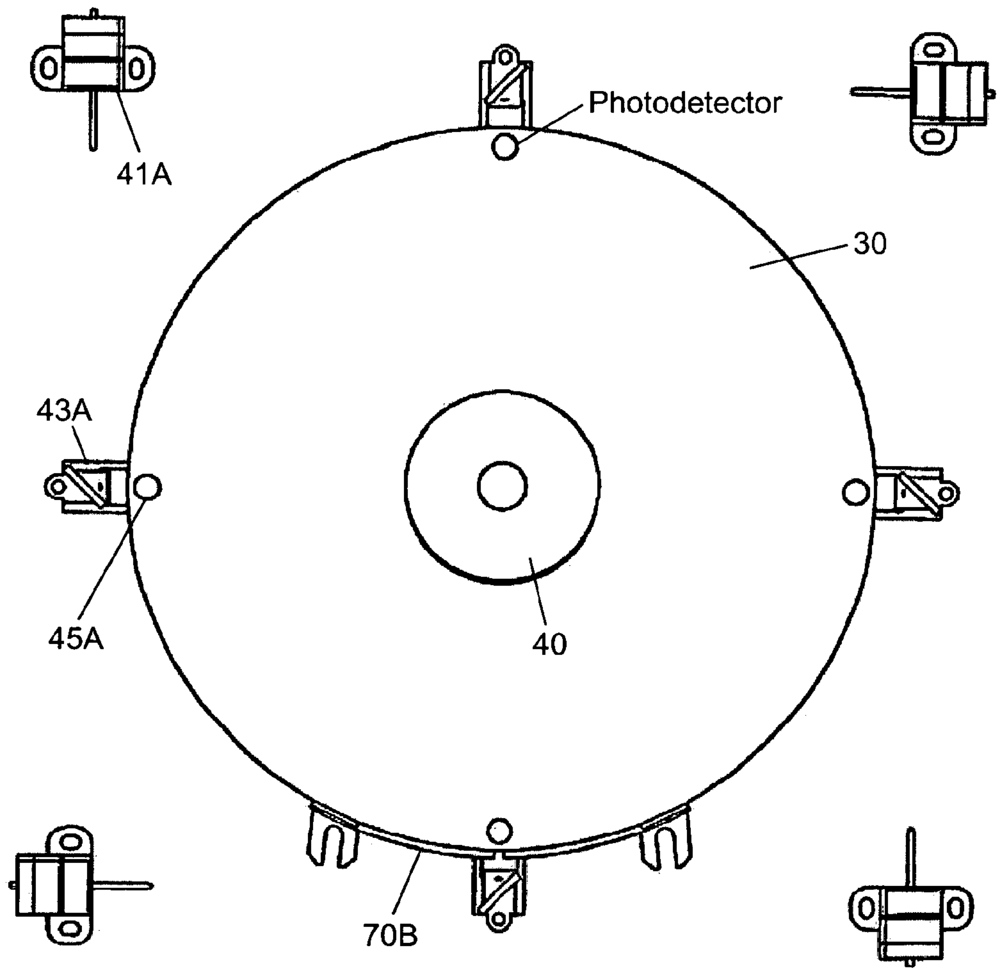
FIG. 2J1

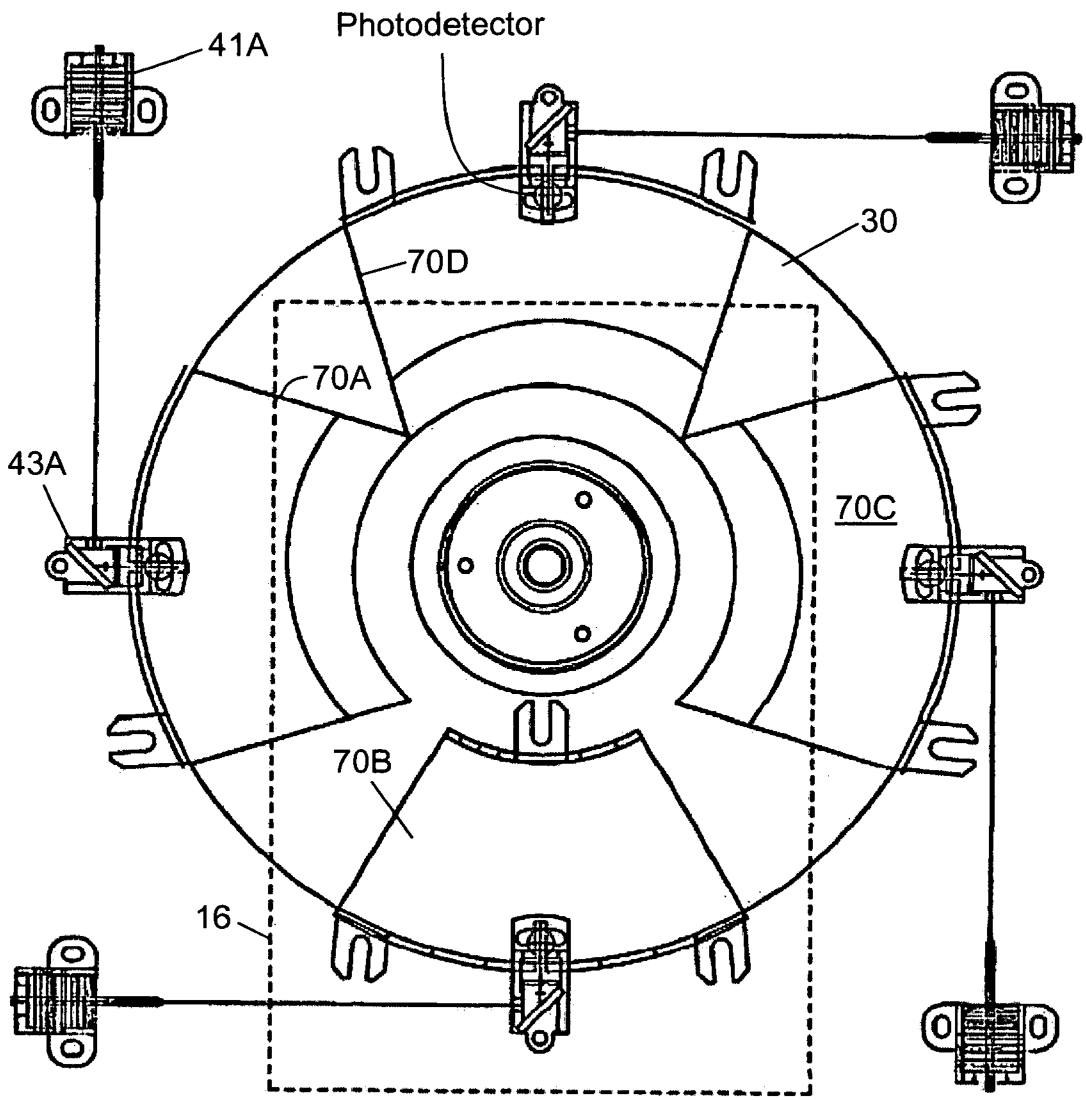
FIG. 2J2

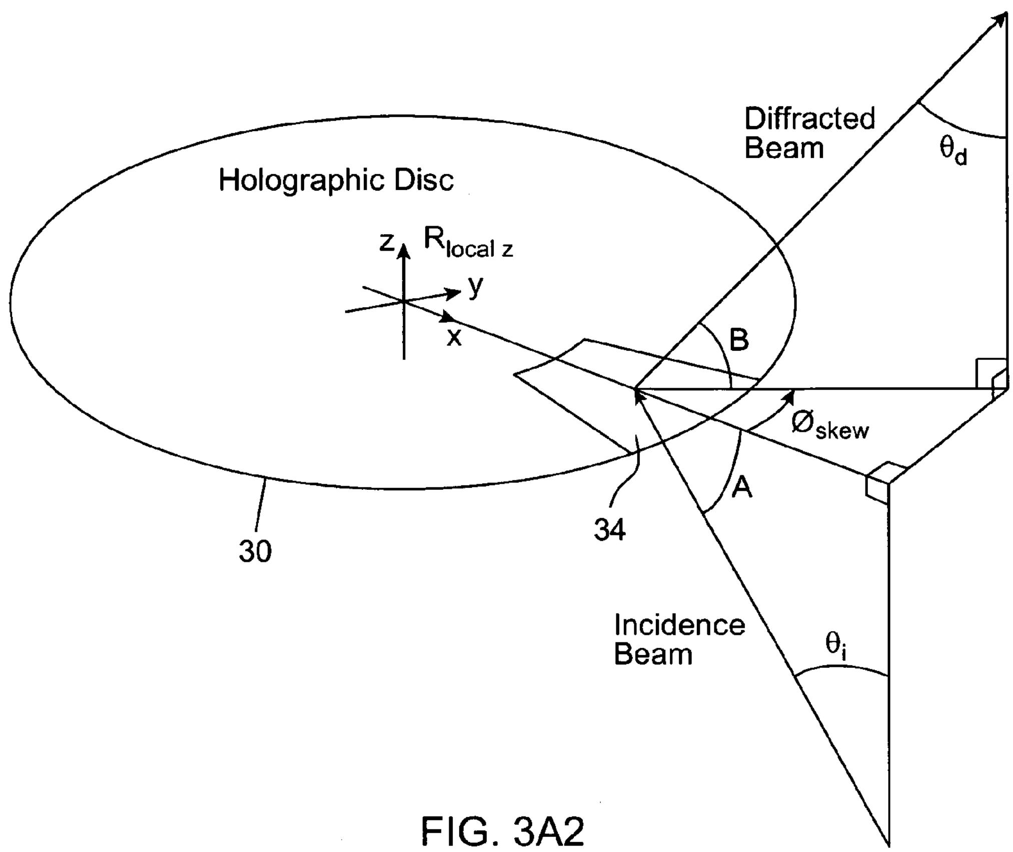
FIG. 3A2
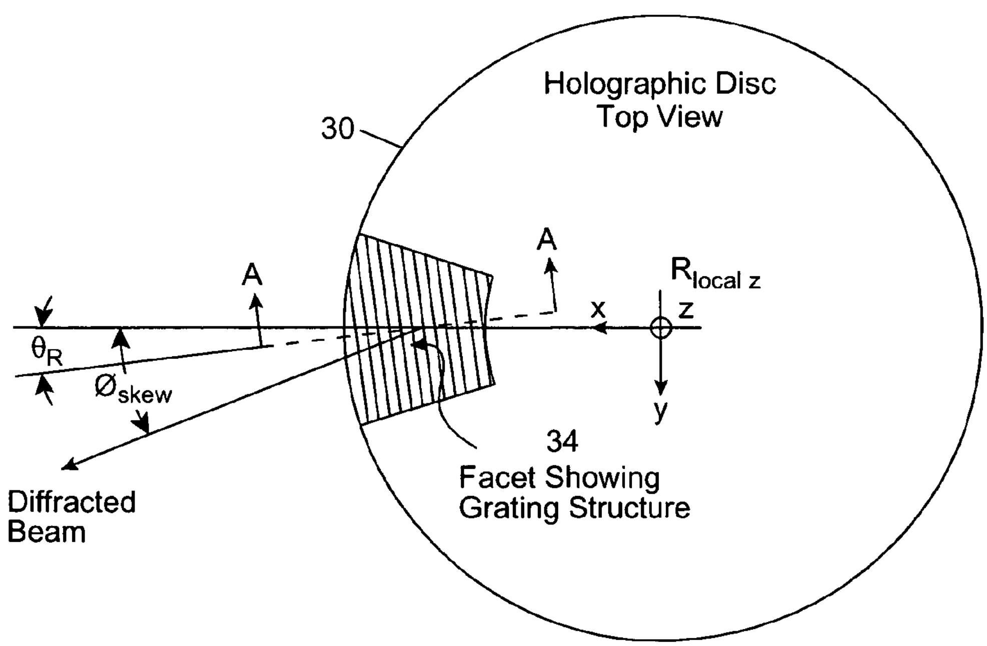
FIG. 3A3

ELEVATION AND SKEW ANGLE CHARACTERISTICS OF FACETS ON HOLOGRAPHIC SCANNING DISK OF THE PRESENT INVENTION

| FACET GROUP NO. | | | FACET NO. |
|---|---|---|---|
| | G1 | HIGH ELEVATION ANGLE LEFT SKEW ANGLE | 7, 9, 11 |
| | G2 | HIGH ELEVATION ANGLE RIGHT SKEW ANGLE | 8, 10, 12 |
| | G3 | LOW ELEVATION ANGLE NO/ZERO SKEW ANGLE | 1, 2, 3, 4, 5, 6 |

FIG. 3A4

| | A | B | C | D | E | F | G | H | I | J | K | L | M | N | O | P |
|---|---|---|---|---|---|---|---|---|---|---|---|---|---|---|---|---|
| | | MG2@ST1 | | | | MG1@ST1 | | | | MG3@ST1 | | | | | | |
| 1 | **Station 1** | (Local Co-ordinates) | | | | | | | | | | | | | | |
| 2 | | Negative skew (Right) | | | | Positive Skew (Left) | | | | No Skew (Zero) | | | | | | |
| 3 | First Mirror | **x** | **y** | **z** | | **x** | **y** | **z** | | **x** | **y** | **z** | | | | |
| 4 | | 2.55 | -1.80 | 2.70 | | 3.80 | 2.30 | 2.77 | | 4.30 | 1.60 | 2.52 | | | | |
| 5 | | 4.15 | -2.27 | 2.77 | | 4.10 | 1.88 | 2.40 | | 4.95 | 2.15 | 2.04 | | | | |
| 6 | $M_{1,2,1}$ | 3.95 | 0.23 | 2.05 | $M_{1,1,1}$ | 3.80 | 0.14 | 1.80 | $M_{1,3,1}$ | 5.20 | 2.00 | 1.83 | | | | |
| 7 | | 2.42 | -0.24 | 2.25 | | 3.10 | -0.80 | 1.80 | | 5.00 | -1.80 | 1.66 | | | | |
| 8 | | 2.55 | -1.80 | 2.70 | | 2.50 | -0.16 | 2.45 | | 4.70 | -2.10 | 1.87 | | | | |
| 9 | | | | | | 2.65 | 0.76 | 2.77 | | 4.10 | -1.60 | 2.40 | | | | |
| 10 | | | | | | 3.80 | 2.30 | 2.77 | | 4.30 | 1.60 | 2.52 | | | | |
| 11 | | | | | | | | | | | | | | | | |
| 12 | Second Mirror | **x** | **y** | **z** | | **x** | **y** | **z** | | **x** | **y** | **z** | | | | |
| 13 | | 4.00 | -2.63 | 0.05 | | 1.70 | 4.10 | 1.30 | | 3.10 | 2.60 | -0.03 | | | | |
| 14 | | 4.90 | -1.40 | 0.77 | | 3.00 | 4.45 | 1.98 | | 4.50 | 3.00 | 0.22 | | | | |
| 15 | $M_{1,2,2}$ | 4.60 | -3.20 | 2.18 | $M_{1,1,2}$ | 3.40 | 3.99 | 1.50 | $M_{1,3,2}$ | 4.35 | -2.30 | 0.30 | | | | |
| 16 | | 3.70 | -4.10 | 1.06 | | 2.30 | 2.43 | -0.63 | | 3.00 | -2.00 | 0.04 | | | | |
| 17 | | 4.00 | -2.63 | 0.05 | | 1.40 | 2.57 | -0.63 | | 3.10 | 2.60 | -0.03 | | | | |
| 18 | | | | | | 1.00 | 2.99 | -0.20 | | | | | | | | |
| 19 | | | | | | 1.70 | 4.10 | 1.30 | | | | | | | | |
| 20 | | | | | | | | | | | | | | | | |
| 21 | Third Mirror | **x** | **y** | **z** | | | | | | | | | | | | |
| 22 | | 4.41 | -4.10 | 1.10 | | | | | | | | | | | | |
| 23 | | 1.97 | -3.30 | 2.20 | | | | | | | | | | | | |
| 24 | $M_{1,2,3}$ | 1.12 | -1.60 | 0.80 | | | | | | | | | | | | |
| 25 | | 2.51 | -2.00 | 0.10 | | | | | | | | | | | | |
| 26 | | 3.53 | -2.70 | 0.10 | | | | | | | | | | | | |
| 27 | | 4.41 | -4.10 | 1.10 | | | | | | | | | | | | |
| 28 | | | | | | | | | | | | | | | | |

| | A | B | C | D | E | F | G | H | I | J | K | L | M | N | O | P |
|---|---|---|---|---|---|---|---|---|---|---|---|---|---|---|---|---|
| 30 | | | | | | | | | | | | | | | | |
| 31 | **Station 2** | (Local Co-ordinates) | | | | | | | | | | | | | | |
| 32 | | Negative skew | | | | Positive Skew | | | | No Skew | | | | No Skew | | |
| 33 | First Mirror | **x** | **y** | **z** | | **x** | **y** | **z** | | **x** | **y** | **z** | | | | |
| 34 | | | | | | | | | | 3.75 | -1.60 | 2.51 | | | | |
| 35 | | | | | | | | | | 5.10 | -2.40 | 1.73 | | | | |
| 36 | | | | | | | | | $M_{2,3,}$ | 5.10 | 2.40 | 1.73 | | | | |
| 37 | | | | | | | | | | 3.75 | 1.60 | 2.51 | | | | |
| 38 | | | | | | | | | | 3.75 | -1.60 | 2.51 | | | | |
| 39 | | | | | | | | | | | | | | | | |
| 40 | | | | | | | | | | | | | | | | |
| 41 | | | | | | | | | | | | | | | | |
| 42 | Second Mirror | **x** | **y** | **z** | | **x** | **y** | **z** | | **x** | **y** | **z** | | **x** | **y** | **z** |
| 43 | | | | | | | | | | 3.00 | 0.00 | -0.11 | | 3.00 | 0.00 | -0.11 |
| 44 | | | | | | | | | | 4.80 | 0.00 | 0.38 | | 4.80 | 0.00 | 0.38 |
| 45 | | | | | | | | | | 5.07 | -2.26 | 1.07 | | 5.07 | 2.26 | 1.07 |
| 46 | | | | | | | | | $M_{3,3,2A}$ | 5.07 | -2.26 | 1.07 | | 5.07 | 2.26 | 1.07 |
| 47 | | | | | | | | | | 3.06 | -1.00 | 0.17 | | 3.06 | 1.00 | 0.17 |
| 48 | | | | | | | | | | 3.00 | 0.00 | -0.11 | | 3.00 | 0.00 | -0.11 |
| 49 | | | | | | | | | | | | | | | | |
| 50 | | | | | | | | | | (Split mirror for generating two sets of horizontal lines) | | | | | | |
| 51 | | | | | | | | | | | | | | | | |
| 52 | | | | | | | | | | | | | | | | |

| | | MG2@ST3 | | | | MG1@ST3 | | | | | MG3@ST3 | | |
|---|---|---|---|---|---|---|---|---|---|---|---|---|---|
| | A | B | C | D | E | F | G | H | I | J | K | L | |
| 54 | **Station 3** | (Local Co-ordinates) | | | | | | | | | | | |
| 55 | | (R)Negative skew | | | | (L)Positive Skew | | | | No Skew | | | |
| 56 | First Mirror | **x** | **y** | **z** | | **x** | **y** | **z** | | **x** | **y** | **z** | |
| 57 | | 3.80 | -2.30 | 2.77 | | 2.55 | 1.80 | 2.70 | | 4.30 | -1.60 | 2.52 | |
| 58 | | 4.10 | -1.88 | 2.40 | | 4.15 | 2.27 | 2.77 | | 4.95 | -2.15 | 2.04 | |
| 59 | $M_{3,2,1}$ | 3.80 | -0.14 | 1.80 | $M_{3,1,1}$ | 3.95 | -0.23 | 2.05 | | 5.20 | -2.00 | 1.83 | $M_{3,3,1}$ |
| 60 | | 3.10 | 0.80 | 1.80 | | 2.42 | 0.24 | 2.25 | | 5.00 | 1.80 | 1.66 | |
| 61 | | 2.50 | 0.16 | 2.45 | | 2.55 | 1.80 | 2.70 | | 4.70 | 2.10 | 1.87 | |
| 62 | | 2.65 | -0.76 | 2.77 | | | | | | 4.10 | 1.60 | 2.40 | |
| 63 | | 3.80 | -2.30 | 2.77 | | | | | | 4.30 | -1.60 | 2.52 | |
| 64 | | | | | | | | | | | | | |
| 65 | Second Mirror | **x** | **y** | **z** | | **x** | **y** | **z** | | **x** | **y** | **z** | |
| 66 | | 1.70 | -4.10 | 1.30 | | 4.00 | 2.63 | 0.05 | | 3.10 | -2.60 | -0.03 | |
| 67 | | 3.00 | -4.45 | 1.98 | | 4.90 | 1.40 | 0.77 | | 4.50 | -3.00 | 0.22 | |
| 68 | | 3.40 | -3.99 | 1.50 | | 4.60 | 3.20 | 2.18 | | 4.35 | 2.30 | 0.30 | |
| 69 | $M_{3,2,2}$ | 2.30 | -2.43 | -0.63 | $M_{3,1,2}$ | 3.70 | 4.10 | 1.06 | | 3.00 | 2.00 | 0.04 | $M_{3,3,2}$ |
| 70 | | 1.40 | -2.57 | -0.63 | | 4.00 | 2.63 | 0.05 | | 3.10 | -2.60 | -0.03 | |
| 71 | | 1.00 | -2.99 | -0.20 | | | | | | | | | |
| 72 | | 1.70 | -4.10 | 1.30 | | | | | | | | | |
| 73 | | | | | | | | | | | | | |
| 74 | Third Mirror | **x** | **y** | **z** | | **x** | **y** | **z** | | | | | |
| 75 | | | | | | 4.41 | 4.10 | 1.10 | | | | | |
| 76 | | | | | | 1.97 | 3.30 | 2.20 | | | | | |
| 77 | | | | | $M_{3,1,3}$ | 1.12 | 1.60 | 0.80 | | | | | |
| 78 | | | | | | 2.51 | 2.00 | 0.10 | | | | | |
| 79 | | | | | | 3.53 | 2.70 | 0.10 | | | | | |
| 80 | | | | | | 4.41 | 4.10 | 1.10 | | | | | |
| 81 | | | | | | | | | | | | | |

FIG. 3D

| | MG2@ST4 | | | | | MG1@ST4 | | | | MG3@ST4 | | | | | | | |
|---|---|---|---|---|---|---|---|---|---|---|---|---|---|---|---|---|---|
| | A | B | C | D | E | F | G | H | I | J | K | L | M | N | O | P | |
| 83 | **Station 4** | (Local Co-ordinates) | | | | | | | | | | | | | | | |
| 84 | | | Negative skew | | | | Positive Skew | | | | No Skew | | | | No Skew | | |
| 85 | First Mirror | **x** | **y** | **z** | | **x** | **y** | **z** | | **x** | **y** | **z** | | **x** | **y** | **z** | |
| 86 | | 4.90 | -0.80 | 6.41 | | 4.90 | 0.80 | 6.41 | | 6.70 | 0.00 | 5.61 | | 6.70 | 0.00 | 5.61 | |
| 87 | | 6.10 | -0.80 | 5.65 | | 6.10 | 0.80 | 5.65 | | 7.40 | 0.00 | 3.32 | | 7.40 | 0.00 | 3.32 | |
| 88 | $M_{4,2,1}$ | 6.00 | -4.50 | 6.47 | $M_{4,1,1}$ | 6.00 | 4.50 | 6.47 | $M_{4,3,1A}$ | 6.95 | -3.00 | 2.90 | | 6.95 | 3.00 | 2.90 | $M_{4,3,1B}$ |
| 89 | | 4.90 | -4.50 | 7.17 | | 4.90 | 4.50 | 7.17 | | 6.20 | -3.00 | 5.34 | | 6.20 | 3.00 | 5.34 | |
| 90 | | 4.90 | -0.80 | 6.41 | | 4.90 | 0.80 | 6.41 | | 6.70 | 0.00 | 5.61 | | 6.70 | 0.00 | 5.61 | |
| 91 | | | | | | | | | | | | | | | | | |
| 92 | | | | | | | | | | (Split mirror for generating two sets of horizontal lines) | | | | | | | |
| 93 | | | | | | | | | | | | | | | | | |
| 94 | Second Mirror | **x** | **y** | **z** | | **x** | **y** | **z** | | **x** | **y** | **z** | | | | | |
| 95 | | 2.85 | -3.20 | 3.37 | | 2.85 | 3.20 | 3.37 | | | | | | | | | |
| 96 | | 4.20 | -2.80 | 3.23 | | 4.20 | 2.80 | 3.23 | | | | | | | | | |
| 97 | $M_{4,2,2}$ | 5.95 | -4.50 | 6.46 | $M_{4,1,2}$ | 5.95 | 4.50 | 6.46 | | | | | | | | | |
| 98 | | 4.60 | -4.95 | 6.68 | | 4.60 | 4.95 | 6.68 | | | | | | | | | |
| 99 | | 2.85 | -3.20 | 3.37 | | 2.85 | 3.20 | 3.37 | | | | | | | | | |
| 100 | | | | | | | | | | | | | | | | | |

FIG. 3E

| | A | B | C | D | E | F | G | H | I | J | K |
|---|---|---|---|---|---|---|---|---|---|---|---|
| 967 | *** Table of Major Dependent Parameters for both the Scanner and the Disk *** | | | | | | | | | | |
| 968 | | | | | | | | | | | |
| 969 | Box height (inches): | | | | N/A | (See Note 1) | | | | | |
| 970 | Box width (inches): | | | | N/A | (See Note 2) | | | | | |
| 971 | Max angle B (degrees): | | | | 62.00 | (See Note 3) | | | | | |
| 972 | Min angle B (degrees): | | | | 38.00 | (See Note 3) | | | | | |
| 973 | Total facet angular sweep (degrees): | | | | 358.14 | (See Note 4) | | | | | |
| 974 | | | | | | | | | | | |
| 975 | Min (angle A - angle B) (degrees): | | | | 0.00 | (See Note 6) | | | | | |
| 976 | Max beam speed (inches per second): | | | | 13704 | | | | | | |
| 977 | Min beam speed (inches per second): | | | | 7158 | | | | | | |
| 978 | Power at data detector (nW): | | | | 872 | | | | | | |
| 979 | Signal voltage (volts): | | | | 5.47 | (See Note 7) | | | | | |
| 980 | Signal voltage at max DOF limits (volts): | | | | 3.45 | (See Note 7) | 0.91 | Max bandwidth (MHz) for | | 7.5 | mil bars |
| 981 | CDRH: | P-avg. Class 2? | Class 2A? | P-pulse Class 1? | | | | | | | |
| 982 | | YES | YES | YES | | (See Note 8) | | | | | |
| 983 | | | | | | | | | | | |
| 984 | IEC: | Single pulse | P-avg. 0.25s | Pulse train correction | | | | | | | |
| 985 | | PASS | PASS | PASS | | (See Note 8) | | | | | |
| 986 | | | | | | | | | | | |
| 987 | | | | | | | | | | | |

FIG. 3F1

| | A | B | C | D | E | F | G | H | I | J | K |
|---|---|---|---|---|---|---|---|---|---|---|---|
| 988 | Note 1: If this entry is highlighted (red) then the value exceeds the specified value for | | | | | | | | | | |
| 989 | the box height (Cell G21). Go to cells G417 to G456 to identify the problem entries | | | | | | | | | | |
| 990 | and make the necessary inner radius adjustments in Cells G215 to G254. | | | | | | | | | | |
| 991 | | | | | | | | | | | |
| 992 | Note 2: This entry is not used in the box design, but it gives an indication of the box | | | | | | | | | | |
| 993 | dimensions that would be established by the width of the tops of the mirrors. | | | | | | | | | | |
| 994 | | | | | | | | | | | |
| 995 | Note 3: Generally, the B angles should range between 40 degrees and 70 degrees. | | | | | | | | | | |
| 996 | Holograms with smaller or larger angles may be difficult to construct. | | | | | | | | | | |
| 997 | | | | | | | | | | | |
| 998 | Note 4: This entry must be less than, but within a few degrees of, 360 degrees. | | | | | | | | | | |
| 999 | To satisfy this requirement, it may be necessary to make adjustments | | | | | | | | | | |
| 1000 | to the focal distances and/or the length of the scan lines. | | | | | | | | | | |
| 1001 | | | | | | | | | | | |
| 1002 | | | | | | | | | | | |
| 1003 | | | | | | | | | | | |
| 1004 | | | | | | | | | | | |
| 1005 | | | | | | | | | | | |
| 1006 | Note 6: This value must be greater than 0.5 degrees to avoid feedback into the | | | | | | | | | | |
| 1007 | laser from disk surface reflections. If it is too small, adjustments must be | | | | | | | | | | |
| 1008 | made to the B angles of the problem facets (See Cells X468 to X507). | | | | | | | | | | |
| 1009 | | | | | | | | | | | |
| 1010 | Note 7: The signal voltage must be greater than some value established by the signal | | | | | | | | | | |
| 1011 | processor requirements. Typically, this value should be greater than 2 volts. | | | | | | | | | | |
| 1012 | If this value is less than 2 volts, either the laser power must be increased or | | | | | | | | | | |
| 1013 | the focal distances must be decreased. | | | | | | | | | | |
| 1014 | | | | | | | | | | | |
| 1015 | Note 8: All CDRH/IEC entries must be YES or PASS. If not, laser power must be reduced. | | | | | | | | | | |
| 1016 | (Modify laser power in Cell B799.) | | | | | | | | | | |

FIG. 3F2

| | A | B | C | D | E | F |
|---|---|---|---|---|---|---|
| 457 | | | | | | |
| 458 | d = distance from disk to base of scanner (inches): | | | | | |
| 459 | | | | | | |
| 460 | Rotational speed of disk (rpm) | | | | | |
| 461 | | | | | | |
| 462 | DiskStratos_4.xls | | | | | |
| 463 | | | | | | |
| 464 | | Diffraction | Geometrical | | | Angle of |
| 465 | Facet | Focal length | Focal length | Angle A | Angle B | Diffraction |
| 466 | | (inches) | (inches) | (degrees) | (degrees) | (degrees) |
| 467 | | Given | | Given | Given | |
| 468 | 1 | 12.5 | 12.68 | 52 | 38.00 | 52.00 |
| 469 | 2 | 11.5 | 11.64 | 52 | 40.00 | 50.00 |
| 470 | 3 | 12.7 | 12.88 | 52 | 42.00 | 48.00 |
| 471 | 4 | 11.5 | 11.64 | 52 | 44.00 | 46.00 |
| 472 | 5 | 12.7 | 12.88 | 52 | 48.00 | 42.00 |
| 473 | 6 | 12.0 | 12.15 | 52 | 52.00 | 38.00 |
| 474 | 7 | 14.7 | 14.99 | 52 | 58.00 | 32.00 |
| 475 | 8 | 14.7 | 14.99 | 52 | 58.00 | 32.00 |
| 476 | 9 | 13.5 | 13.72 | 52 | 60.00 | 30.00 |
| 477 | 10 | 13.5 | 13.72 | 52 | 60.00 | 30.00 |
| 478 | 11 | 14.8 | 15.09 | 52 | 62.00 | 28.00 |
| 479 | 12 | 14.8 | 15.09 | 52 | 62.00 | 28.00 |

FIG. 3G1A

| | G | H | I | J | K | L | M |
|---|---|---|---|---|---|---|---|
| 457 | | | | | | | |
| 458 | 0 | | | | | | |
| 459 | | | | | | | |
| 460 | 5200 | | | | | | Maximum |
| 461 | | | | | | | Collection |
| 462 | 650 | nm | | | Accounting for | Light | Area |
| 463 | Focal plane | 359.13 | | | dead time for | Collection | (ignoring |
| 464 | scan line | | Scan mult. | Rotation | laser beam | Factor | notch) |
| 465 | length | Scan Angle | Factor (m) | Angle | 1.23 | | |
| 466 | (inches) | (degrees) | | (degrees) | (degrees) | | (sq. in.) |
| 467 | | | | | | | |
| 468 | 9.750 | 42.61 | 1.62 | 26.24 | 27.47 | 1.00 | 2.28 |
| 469 | 9.750 | 45.95 | 1.62 | 28.35 | 29.58 | 0.80 | 1.81 |
| 470 | 9.750 | 42.00 | 1.58 | 26.66 | 27.89 | 0.92 | 2.09 |
| 471 | 9.750 | 45.95 | 1.57 | 29.19 | 30.42 | 0.71 | 1.62 |
| 472 | 9.750 | 42.00 | 1.50 | 27.97 | 29.21 | 0.79 | 1.79 |
| 473 | 9.750 | 44.22 | 1.46 | 30.28 | 31.51 | 0.64 | 1.47 |
| 474 | 9.750 | 36.69 | 1.31 | 27.99 | 29.23 | 0.87 | 1.97 |
| 475 | 9.750 | 36.69 | 1.31 | 27.99 | 29.23 | 0.87 | 1.97 |
| 476 | 9.750 | 39.71 | 1.30 | 30.65 | 31.88 | 0.71 | 1.61 |
| 477 | 9.750 | 39.71 | 1.30 | 30.65 | 31.88 | 0.71 | 1.61 |
| 478 | 9.750 | 36.46 | 1.25 | 29.19 | 30.42 | 0.83 | 1.88 |
| 479 | 9.750 | 36.46 | 1.25 | 29.19 | 30.42 | 0.83 | 1.88 |

FIG. 3G1B

| | N | O | P | Q | R | S | T | U |
|---|---|---|---|---|---|---|---|---|
| 457 | Notch size in mirror | | | | | | | |
| 458 | TG (12/21/99) | | | | | | | |
| 459 | 3.5 mm x 5.1 m | (3.5 mm x 6.5 mm at disk) | | | | | | |
| 460 | **Design** | | | | | | | |
| 461 | **Collection** | | | | | | | |
| 462 | **Area** | **Beam speed** | **Beam speed** | **Beam speed** | **Beam** | | | |
| 463 | **(Includes** | **at center of** | **at max depth** | **at min depth** | **skew** | **Facet count** | | |
| 464 | **notch loss of** | **scan line** | **of field** | **of field** | **angle** | **function** | **Number of** | |
| 465 | **0.035** | | | | | **1 = facet** | **facets** | |
| 466 | **sq. inches)** | **(inches/sec)** | **(inches/sec)** | **(inches/sec)** | **(degrees)** | **0 =no facet** | **12** | |
| 467 | | | | | | | Max freq. | Min Freq. |
| 468 | **2.27** | **11052** | **13704** | **8400** | **0** | **1** | **0.914** | **0.560** |
| 469 | **1.81** | **10150** | **12798** | **7502** | **0** | **1** | **0.853** | **0.500** |
| 470 | **2.08** | **10895** | **13468** | **8321** | **0** | **1** | **0.898** | **0.555** |
| 471 | **1.63** | **9858** | **12429** | **7286** | **0** | **1** | **0.829** | **0.486** |
| 472 | **1.79** | **10383** | **12835** | **7930** | **0** | **1** | **0.856** | **0.529** |
| 473 | **1.47** | **9544** | **11929** | **7158** | **0** | **1** | **0.795** | **0.477** |
| 474 | **1.97** | **10492** | **12634** | **8351** | **28** | **1** | **0.842** | **0.557** |
| 475 | **1.97** | **10492** | **12634** | **8351** | **-28** | **1** | **0.842** | **0.557** |
| 476 | **1.62** | **9524** | **11640** | **7407** | **28** | **1** | **0.776** | **0.494** |
| 477 | **1.62** | **9524** | **11640** | **7407** | **-28** | **1** | **0.776** | **0.494** |
| 478 | **1.88** | **10068** | **12108** | **8027** | **28** | **1** | **0.807** | **0.535** |
| 479 | **1.88** | **10068** | **12108** | **8027** | **-28** | **1** | **0.807** | **0.535** |

FIG. 3G2A

| | V | W | X | Y | Z | AA | AB |
|---|---|---|---|---|---|---|---|
| 457 | | | | | | | |
| 458 | | | | | | | |
| 459 | **<u>NOTE</u>: if any entry in these two columns is less than 0.5 degrees** | | | | | | |
| 460 | **(highlighted in red), the corresponding B angle should be changed.** | | | | | | |
| 461 | **This is accomplished by modifying the "Distance from rotational axis"** | | | | | | |
| 462 | **entry for that line (cells G46 to G85).** | | | | | | |
| 463 | | | | | | | |
| 464 | | | **Angle A - Angle B** | | | | |
| 465 | | | **(Absolute value)** | | | | |
| 466 | | | **(degrees)** | | | | |
| 467 | Bandwidth | | | | | | |
| 468 | **0.354** | | **14.00** | | | | |
| 469 | **0.353** | | **12.00** | | | | |
| 470 | **0.343** | | **10.00** | | | | |
| 471 | **0.343** | | **8.00** | | | | |
| 472 | **0.327** | | **4.00** | | | | |
| 473 | **0.318** | | **0.00** | | | | |
| 474 | **0.286** | | **6.00** | | | | |
| 475 | **0.286** | | **6.00** | | | | |
| 476 | **0.282** | | **8.00** | | | | |
| 477 | **0.282** | | **8.00** | | | | |
| 478 | **0.272** | | **10.00** | | | | |
| 479 | **0.272** | | **10.00** | | | | |

FIG. 3G2B

| | A | B | C | D | E |
|---|---|---|---|---|---|
| 508 | Avg. f.l. (in.) | 13.46 | Average angle B (degrees): | | 52.00 |
| 509 | Avg waist loc | 13.24 | Maximum angle B (degrees): | | 62.00 |
| 510 | Approximate minimum box width: | | | N/A | inches |
| 511 | (Based on large mirror as limitation) | | | | |
| 512 | | | | | |
| 513 | | | | | |
| 514 | | | | | |
| 515 | *** Master Hologram Exposure Information *** | | | | |
| 516 | DiskStratos_4.xls | | | | |
| 517 | Gelatin Refractive Indexes | | | Wavelengths (microns) | |
| 518 | Before processing: | | 1.53 | Scanner: | 0.65 |
| 519 | After processing: | | 1.4 | Exposure: | 0.488 |
| 520 | | | | | |
| 521 | Facet | | | | |
| 522 | | Grating spacing at scan region (microns) | | | |
| 523 | | Design wavelength = | | 0.65 | microns |
| 524 | 1 | | 0.4631 | | |
| 525 | 2 | | 0.4704 | | |
| 526 | 3 | | 0.4784 | | |
| 527 | 4 | | 0.4869 | | |
| 528 | 5 | | 0.5059 | | |
| 529 | 6 | | 0.5279 | | |
| 530 | 7 | | 0.5674 | | |
| 531 | 8 | | 0.5674 | | |
| 532 | 9 | | 0.5826 | | |
| 533 | 10 | | 0.5826 | | |
| 534 | 11 | | 0.5990 | | |
| 535 | 12 | | 0.5990 | | |

FIG. 3H1

| | F | G | H | I | J | K | L |
|---|---|---|---|---|---|---|---|
| 508 | | | Average: | 1.42 | | | |
| 509 | | SUMS ----> | 488.46 | | 344.36 | 359.13 | 9.65 |
| 510 | | | | | | | |
| 511 | | Total facet angular sweep (degrees): | | | | 359.13 | |
| 512 | | | | | | | |
| 513 | | | | | | | |
| 514 | | | | | | | |
| 515 | | | | | | | |
| 516 | | 650 | nm | | | | |
| 517 | | | | | | | |
| 518 | | Distance from beam incidence point on disk to 488 nm reference point: | | | | | |
| 519 | | Diffraction | Diffraction | | Exposure angles at reference point at 488 nm | | |
| 520 | | angle from | angle from | | Reference | Object | |
| 521 | Facet | annulus | reference point | | Beam | Beam | |
| 522 | | (degrees) | (degrees) | | (degrees) | (degrees) | |
| 523 | | | | | | | |
| 524 | 1 | 52.00 | 52.00 | | 25.13 | 38.99 | |
| 525 | 2 | 50.00 | 50.00 | | 25.45 | 37.42 | |
| 526 | 3 | 48.00 | 48.00 | | 25.78 | 35.82 | |
| 527 | 4 | 46.00 | 46.00 | | 26.12 | 34.20 | |
| 528 | 5 | 42.00 | 42.00 | | 26.81 | 30.90 | |
| 529 | 6 | 38.00 | 38.00 | | 27.53 | 27.53 | |
| 530 | 7 | 32.00 | 32.00 | | 28.64 | 22.38 | |
| 531 | 8 | 32.00 | 32.00 | | 28.64 | 22.38 | |
| 532 | 9 | 30.00 | 30.00 | | 29.02 | 20.64 | |
| 533 | 10 | 30.00 | 30.00 | | 29.02 | 20.64 | |
| 534 | 11 | 28.00 | 28.00 | | 29.40 | 18.89 | |
| 535 | 12 | 28.00 | 28.00 | | 29.40 | 18.89 | |

FIG. 3H2

| | M | N | O | P | Q | R | S | T | U | V |
|---|---|---|---|---|---|---|---|---|---|---|
| 508 | | | | | | | | | | |
| 509 | 21.99 | 21.99 | | <------SUMS | | | | | | |
| 510 | | Vmax (in/s): | 13704 | | | | | | | |
| 511 | | Vmin (in/s): | 7158 | | | | | | | |
| 512 | | Ratio | 1.91 | | | | | | | |
| 513 | | | | | | | | | | |
| 514 | | | | | | | | | | |
| 515 | | | | | | | | | | |
| 516 | | | | | | | | | | |
| 517 | | | | | | | | | | |
| 518 | 0 | inch | | | | | | | | |
| 519 | | | | | | | | | | |
| 520 | | | | | | | | | | |
| 521 | | | alpha-1 | beta-1 | phi | theta-1 | L | theta-2 | alpha-2 | beta-2 |
| 522 | | | (degrees) | (degrees) | (degrees) | (degrees) | (microns) | (degrees) | (degrees) | (degrees) |
| 523 | | | | | | | | | | |
| 524 | | | 26.09 | 34.25 | 85.92 | 30.17 | 0.46 | 20.20 | 16.12 | 24.28 |
| 525 | | | 26.09 | 33.17 | 86.46 | 29.63 | 0.47 | 19.86 | 16.31 | 23.40 |
| 526 | | | 26.09 | 32.06 | 87.01 | 29.07 | 0.48 | 19.50 | 16.52 | 22.49 |
| 527 | | | 26.09 | 30.92 | 87.59 | 28.50 | 0.49 | 19.14 | 16.72 | 21.55 |
| 528 | | | 26.09 | 28.55 | 88.77 | 27.32 | 0.51 | 18.38 | 17.15 | 19.61 |
| 529 | | | 26.09 | 26.09 | 90.00 | 26.09 | 0.53 | 17.58 | 17.58 | 17.58 |
| 530 | | | 26.09 | 22.24 | 91.92 | 24.17 | 0.57 | 16.33 | 18.26 | 14.41 |
| 531 | | | 26.09 | 22.24 | 91.92 | 24.17 | 0.57 | 16.33 | 18.26 | 14.41 |
| 532 | | | 26.09 | 20.92 | 92.58 | 23.51 | 0.58 | 15.90 | 18.48 | 13.32 |
| 533 | | | 26.09 | 20.92 | 92.58 | 23.51 | 0.58 | 15.90 | 18.48 | 13.32 |
| 534 | | | 26.09 | 19.59 | 93.25 | 22.84 | 0.60 | 15.47 | 18.71 | 12.22 |
| 535 | | | 26.09 | 19.59 | 93.25 | 22.84 | 0.60 | 15.47 | 18.71 | 12.22 |

FIG. 3H3

| | A | B | C | D | E | F | G | H |
|---|---|---|---|---|---|---|---|---|
| 566 | *** Modified Exposure Angles to Correct for Post-processing Residual Gelatin Swell *** | | | | | | | |
| 567 | DiskStratos_4.xls | | | | | | 650 | nm |
| 568 | Percent gelatin swell (from measurements) delta-t/t: | | | | 20% | | | |
| 569 | | | | | | | | |
| 570 | | Exposure angles at 488 nm | | | Exposure angles to compensate for swell | | | |
| 571 | | Reference | Object | | Reference | Object | | gamma(sw) |
| 572 | Facet | Beam | Beam | | Beam | Beam | | |
| 573 | | (degrees) | (degrees) | | (degrees) | (degrees) | | |
| 574 | | | | | | | | |
| 575 | 1 | 25.13 | 38.99 | | 23.85 | 40.50 | | -4.08 |
| 576 | 2 | 25.45 | 37.42 | | 24.34 | 38.70 | | -3.54 |
| 577 | 3 | 25.78 | 35.82 | | 24.83 | 36.88 | | -2.99 |
| 578 | 4 | 26.12 | 34.20 | | 25.35 | 35.04 | | -2.41 |
| 579 | 5 | 26.81 | 30.90 | | 26.41 | 31.31 | | -1.23 |
| 580 | 6 | 27.53 | 27.53 | | 27.53 | 27.53 | | 0.00 |
| 581 | 7 | 28.64 | 22.38 | | 29.28 | 21.77 | | 1.92 |
| 582 | 8 | 28.64 | 22.38 | | 29.28 | 21.77 | | 1.92 |
| 583 | 9 | 29.02 | 20.64 | | 29.89 | 19.83 | | 2.58 |
| 584 | 10 | 29.02 | 20.64 | | 29.89 | 19.83 | | 2.58 |
| 585 | 11 | 29.40 | 18.89 | | 30.50 | 17.89 | | 3.25 |
| 586 | 12 | 29.40 | 18.89 | | 30.50 | 17.89 | | 3.25 |

FIG. 3I1

| | I | J | K | L | M | N | O |
|---|---|---|---|---|---|---|---|
| 566 | | | | | | | |
| 567 | | | | | | | |
| 568 | | | | | | | |
| 569 | | | | | | | |
| 570 | | | | | | | |
| 571 | gamma(0) | A | B | C | Z | alpha-0 | beta-0 |
| 572 | | | | | | | |
| 573 | | | | | | | |
| 574 | | | | | | | |
| 575 | -4.90 | 1.99 | 0.17 | 0.69 | 0.26 | 15.33 | 25.12 |
| 576 | -4.25 | 1.99 | 0.15 | 0.68 | 0.27 | 15.62 | 24.12 |
| 577 | -3.58 | 1.99 | 0.12 | 0.67 | 0.27 | 15.93 | 23.10 |
| 578 | -2.90 | 1.99 | 0.10 | 0.66 | 0.28 | 16.25 | 22.04 |
| 579 | -1.48 | 2.00 | 0.05 | 0.63 | 0.29 | 16.90 | 19.86 |
| 580 | 0.00 | 2.00 | 0.00 | 0.60 | 0.30 | 17.58 | 17.58 |
| 581 | 2.31 | 2.00 | -0.08 | 0.56 | 0.32 | 18.65 | 14.03 |
| 582 | 2.31 | 2.00 | -0.08 | 0.56 | 0.32 | 18.65 | 14.03 |
| 583 | 3.10 | 1.99 | -0.11 | 0.55 | 0.33 | 19.01 | 12.81 |
| 584 | 3.10 | 1.99 | -0.11 | 0.55 | 0.33 | 19.01 | 12.81 |
| 585 | 3.90 | 1.99 | -0.14 | 0.53 | 0.33 | 19.37 | 11.58 |
| 586 | 3.90 | 1.99 | -0.14 | 0.53 | 0.33 | 19.37 | 11.58 |

FIG. 3I2

| | A | B | C | D | E | F | G | H |
|---|---|---|---|---|---|---|---|---|
| 617 | *** Analysis of the Focus Shift and Out-of-focus Spot Size for Converging Reference Beam *** | | | | | | | |
| 618 | (Not applicable for Stratos) | | | | | | | |
| 619 | Convergence of the reference beam: | | | | -1477 | mm | | |
| 620 | Focal length of parabolic mirror: | | | | 58.82 | mm | | |
| 621 | Distance from parabolic mirror to detector: | | | | 60 | mm | | |
| 622 | | Design | Par. Mirror | Required | Object | Image | Image | Spot size |
| 623 | Facet | Focal length | Eff. width | foc. length | distance | distance | shift | at detector |
| 624 | | (mm) | (mm) | (mm) | (mm) | (mm) | (mm) | (mm) |
| 625 | | | | | | | | |
| 626 | | | | | | | | |
| 627 | 1 | 317.50 | 40 | 404.42 | -14858.75 | 59.05 | -0.95 | 0.64 |
| 628 | 2 | 292.10 | 40 | 364.09 | 31841.43 | 58.71 | -1.29 | 0.88 |
| 629 | 3 | 322.58 | 40 | 412.69 | -11828.19 | 59.11 | -0.89 | 0.60 |
| 630 | 4 | 292.10 | 40 | 364.09 | 31841.43 | 58.71 | -1.29 | 0.88 |
| 631 | 5 | 322.58 | 40 | 412.69 | -11828.19 | 59.11 | -0.89 | 0.60 |
| 632 | 6 | 304.80 | 40 | 384.03 | -48230.76 | 58.89 | -1.11 | 0.75 |
| 633 | 7 | 373.38 | 40 | 499.67 | -4485.04 | 59.60 | -0.40 | 0.27 |
| 634 | 8 | 373.38 | 40 | 499.67 | -4485.04 | 59.60 | -0.40 | 0.27 |
| 635 | 9 | 342.90 | 40 | 446.55 | -6818.26 | 59.33 | -0.67 | 0.45 |
| 636 | 10 | 342.90 | 40 | 446.55 | -6818.26 | 59.33 | -0.67 | 0.45 |
| 637 | 11 | 375.92 | 40 | 504.23 | -4375.15 | 59.62 | -0.38 | 0.25 |
| 638 | 12 | 375.92 | 40 | 504.23 | -4375.15 | 59.62 | -0.38 | 0.25 |

FIG. 3J1

| | I | J | K | L | M |
|---|---|---|---|---|---|
| 617 | | | | | |
| 618 | | | | | |
| 619 | | | | | |
| 620 | | | | | |
| 621 | | | | | |
| 622 | | | | | |
| 623 | | | | | |
| 624 | | | | | |
| 625 | **0.88** | | | | |
| 626 | | | | | |
| 627 | **Distance (Cell E621) may have to be adjusted** | | | | |
| 628 | **so that the maximum spot size at the detector is** | | | | |
| 629 | **approximately the same when the 1/2 depth of field value** | | | | |
| 630 | **is negative as it is when the 1/2 depth of field value is positive.** | | | | |
| 631 | **(The 1/2 depth of field value is located at Cell G19)** | | | | |
| 632 | | | | | |
| 633 | | | | | |
| 634 | | | | | |
| 635 | | | | | |
| 636 | | | | | |
| 637 | | | | | |
| 638 | | | | | |

FIG. 3J2

Focal distances and distances to the window for the Stratos scanner
LDD 12/7/99 RPH

| Facet | Diffraction Focal length (inches) Given | Distance to horizontal window (inches) | Difference (inches) | Distance to vertical window (inches) | Difference (inches) | Operator side Distance to horizontal window (inches) | Difference (inches) |
|---|---|---|---|---|---|---|---|
| 1 | 12.5 | 8.5 | 4 | 10.2 | 2.3 | 8 | 4.5 |
| 2 | 11.5 | 8.8 | 2.7 | 10.2 | 1.3 | 8.42 | 3.08 |
| 3 | 12.7 | 9.2 | 3.5 | 10.2 | 2.5 | 8.85 | 3.85 |
| 4 | 11.5 | 9.5 | 2 | 10.2 | 1.3 | 9.25 | 2.25 |
| 5 | 12.7 | 9.8 | 2.9 | 10.2 | 2.5 | 9.7 | 3 |
| 6 | 12 | 10.2 | 1.8 | 10.2 | 1.8 | 10.1 | 1.9 |
| 7 | 14.7 | 10.6 | 4.1 | 14.1 | 0.6 | | |
| 8 | 14.7 | 9.7 | 5 | 14.1 | 0.6 | | |
| 9 | 13.5 | 11.2 | 2.3 | 13.8 | -0.3 | | |
| 10 | 13.5 | 9.8 | 3.7 | 13.8 | -0.3 | | |
| 11 | 14.8 | 11.1 | 3.7 | 13.6 | 1.2 | | |
| 12 | 14.8 | 9.6 | 5.2 | 13.6 | 1.2 | | |

The horizontal window lines from the even numbered vertical facets 8, 10, 12 are near the vertical window.

FIG. 3K

| | A | B | C | D | E | F | G | H | I |
|---|---|---|---|---|---|---|---|---|---|
| 1 | *** CDRH/IEC Calculations to Verify that the Scanner Meets the Laser Class Requirements *** | | | | | | | | |
| 2 | | | | | | | | | |
| 3 | The number of overlapping lines (N-overlap) must be determined from the scanner data. | | | | | | | | |
| 4 | A safe assumption for our scanners is to consider that two scan lines are overlapped | | | | | | | | |
| 5 | ONLY when the difference between their diffraction angles (B) is less than 2 degrees. | | | | | | | | |
| 6 | All else being equal, the slowest scan lines (largest angle B) will be the worst case scan lines. | | | | | | | | |
| 7 | | | | | | | | | |
| 8 | N-overlap: | 1 | | | | | | | |
| 9 | Motor speed (rpm): | | | 5200 | | | | | |
| 10 | Alpha-min (radians): | | | 0.0015 | (from standard) | | | | |
| 11 | FWHM P-divergence of laser (deg.): | | | 8 | (Linked from Trnc spreadsheet) | | | | |
| 12 | FWHM S-divergence of laser (deg.): | | | 30 | (Linked from Trnc spreadsheet) | | | | |
| 13 | Focal length of collimating lens (mm): | | | 6.1 | (Linked from Trnc spreadsheet) | | | | |
| 14 | Angle of incidence at MF plate (deg.): | | | 29.23 | | | | | |
| 15 | Angle of diffraction at MF plate (deg.): | | | 42.12 | | | | | |
| 16 | X-p (mm): | | | 0.87 | | | | | |
| 17 | X-s (mm): | | | 3.93 | | | | | |
| 18 | Average source dimension (mm): | | | 2.40 | | | | | |
| 19 | Distance to aperture (mm): | | | 200 | (actual distance or 200 mm, whichever is greater) | | | | |
| 20 | Alpha (radians): | | | 0.012 | | | | | |
| 21 | C6: | | | 7.996 | | | | | |
| 22 | | | | | | | | | |

FIG. 3L1A

| | A | B | C | D | E | F | G | H | I |
|---|---|---|---|---|---|---|---|---|---|
| 23 | | | | | | | | | |
| 24 | | Laser power | tc (200) | ti (actual) | | | | | |
| 25 | | at window | 7 mm transit | 7 mm transit | P x ti | | | | |
| 26 | Facet | (mW) | time at | time at | (Joules) | | | | |
| 27 | | | d = 200 mm | actual d | | | | | |
| 28 | | | (seconds) | (seconds) | | | Facet count | | |
| 29 | | | | | | | | | |
| 30 | 1 | 0.86 | 3.95856E-05 | 3.95856E-05 | 0.0000339 | | 1 | | |
| 31 | 2 | 0.86 | 3.96549E-05 | 3.96549E-05 | 0.0000341 | | 1 | | |
| 32 | 3 | 0.86 | 4.08001E-05 | 4.08001E-05 | 0.0000351 | | 1 | | |
| 33 | 4 | 0.86 | 4.08315E-05 | 4.08315E-05 | 0.0000352 | | 1 | | |
| 34 | 5 | 0.86 | 4.28115E-05 | 4.28115E-05 | 0.0000370 | | 1 | | |
| 35 | 6 | 0.87 | 4.40086E-05 | 4.40086E-05 | 0.0000381 | | 1 | | |
| 36 | 7 | 0.87 | 4.90358E-05 | 4.90358E-05 | 0.0000425 | | 1 | | |
| 37 | 8 | 0.87 | 4.90358E-05 | 4.90358E-05 | 0.0000425 | | 1 | | |
| 38 | 9 | 0.87 | 4.96126E-05 | 4.96126E-05 | 0.0000430 | | 1 | | |
| 39 | 10 | 0.87 | 4.96126E-05 | 4.96126E-05 | 0.0000430 | | 1 | | |
| 40 | 11 | 0.87 | 5.14525E-05 | 5.14525E-05 | 0.0000446 | | 1 | | |
| 41 | 12 | 0.87 | 5.14525E-05 | 5.14525E-05 | 0.0000446 | | 1 | | |

FIG. 3L1B

| | A | B | C | D | E | F | G | H |
|---|---|---|---|---|---|---|---|---|
| 912 | Sums: | | | 0.0000515 | 0.0000446 | These values are the sums of the | | |
| 913 | | | | | | worst case (largest) overlap values | | |
| 914 | Duty Cycle: | 0.004459213 | | | | | | |
| 915 | | | | | | | | |
| 916 | Paverage is the sum of the overlap Pi x ti products divided by the sum of the ti times times the duty cycle | | | | | | | |
| 917 | Paverage is, therefore, the sum of the overlap Pi x ti products times the rps of the motor. | | | | | | | |
| 918 | | | | | | | | |
| 919 | CDRH calculations and results | | | | | | | |
| 920 | | | | Class 1 | Class 2? | Class 2A? | | |
| 921 | | | | | | | | |
| 922 | Pavg. (mW): | | 0.003869 | | YES | YES | | |
| 923 | | | | | | | | |
| 924 | P (single pulse) (mW): | | 8.27 | | | | | |
| 925 | (Maximum allowed) | | | | | | | |
| 926 | | | | | | | | |
| 927 | P (single pulse) | | 0.87 | YES | | | | |
| 928 | (Actual) | | | | | | | |
| 929 | | | | | | | | |
| 930 | IEC calculations and results | | | | | | | |
| 931 | | | | | | | | |
| 932 | IEC condition A (Single pulse) | | | | | PASS/FAIL | | |
| 933 | | | | | | | | |
| 934 | P (single pulse) (mW): | | 70.6 | | | PASS | | |
| 935 | (Maximum allowed) | | | | | | | |
| 936 | | | | | | | | |

FIG. 3L2A

| | A | B | C | D | E | F | G | H |
|---|---|---|---|---|---|---|---|---|
| 937 | | | | | | | | |
| 938 | IEC condition B (average power in a 0.25 second pulse train) | | | | | | | |
| 939 | | | | | | | | |
| 940 | Pavg. allowed (mW): | | 7.92 | | | PASS/FAIL | | |
| 941 | | | | | | | | |
| 942 | Pavg. scanner (mW): | | 0.0039 | | | PASS | | |
| 943 | | | | | | | | |
| 944 | | | | | | | | |
| 945 | IEC condition C (pulse train correction factor) | | | | | | | |
| 946 | (For this calculation, you need to insert the sum of the pulse times in the overlapping scan lines) | | | | | | | |
| 947 | | | | | | | | |
| 948 | | | | | | | | |
| 949 | T-total (seconds): | | 0.000051 | | | | | |
| 950 | (sum of pulse times | | | | | | | |
| 951 | in overlap scan lines) | | | | | | | |
| 952 | | | | | | | | |
| 953 | Pmax (mW): | | 66.1 | | | | | |
| 954 | | | | | | | | |
| 955 | Number of pulses in train: | | 21.67 | | | | | |
| 956 | | | | | | | | |
| 957 | Correction factor: | | 0.4635 | | | | | |
| 958 | | | | | | | | |
| 959 | Pmax (PT corrected)(mW): | | 30.63 | | | PASS/FAIL | | |
| 960 | | | | | | | | |
| 961 | Pw (including overlap) | | 0.87 | | | PASS | | |
| 962 | | | | | | | | |

FIG. 3L2B

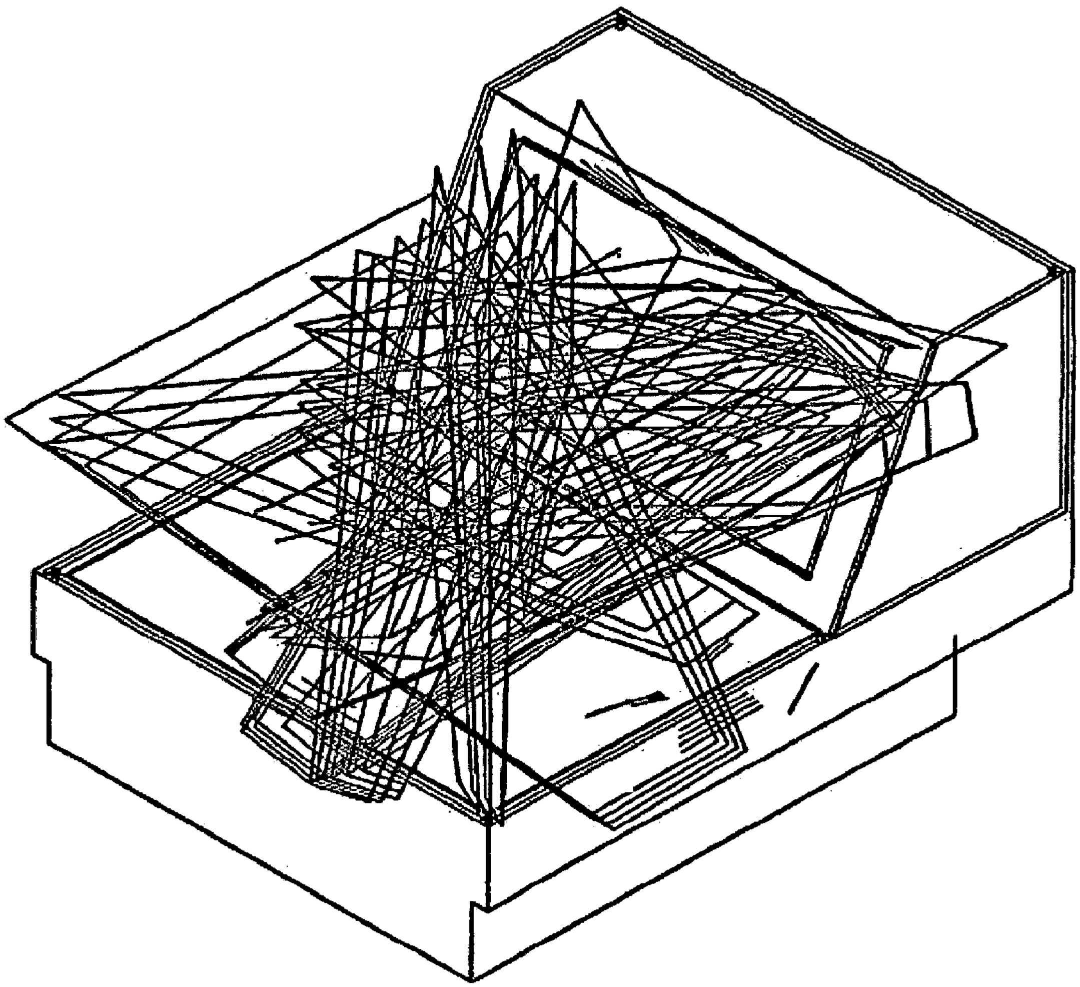
FIG. 5A1

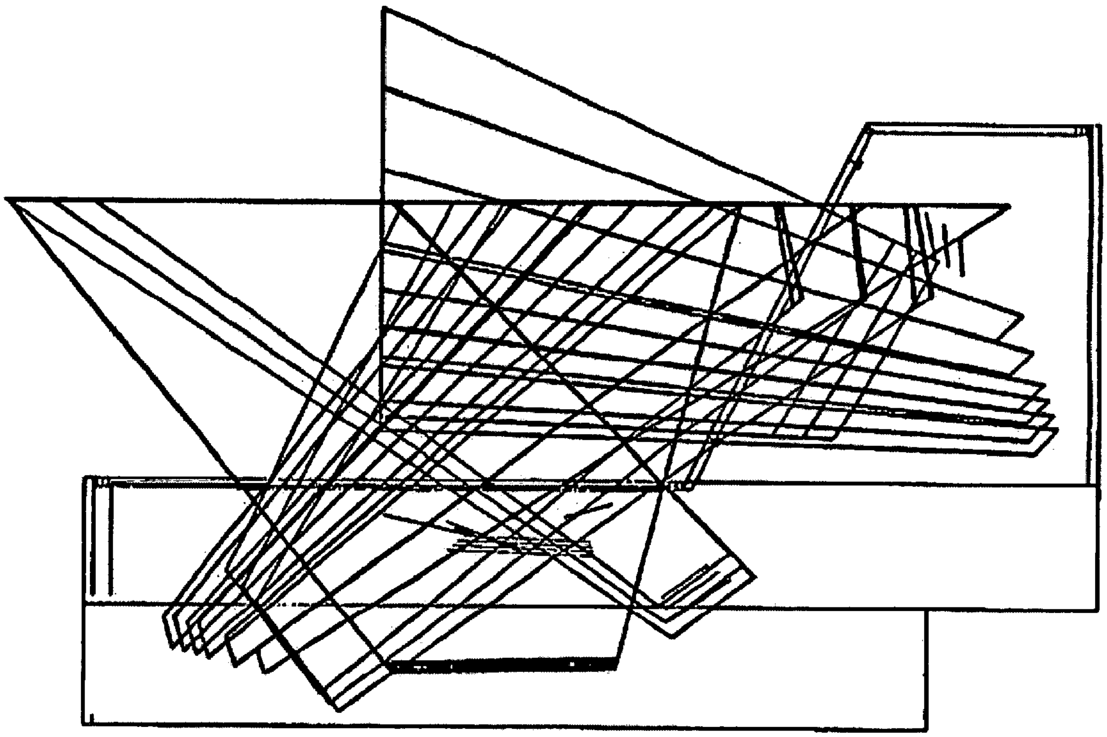
FIG. 5A2

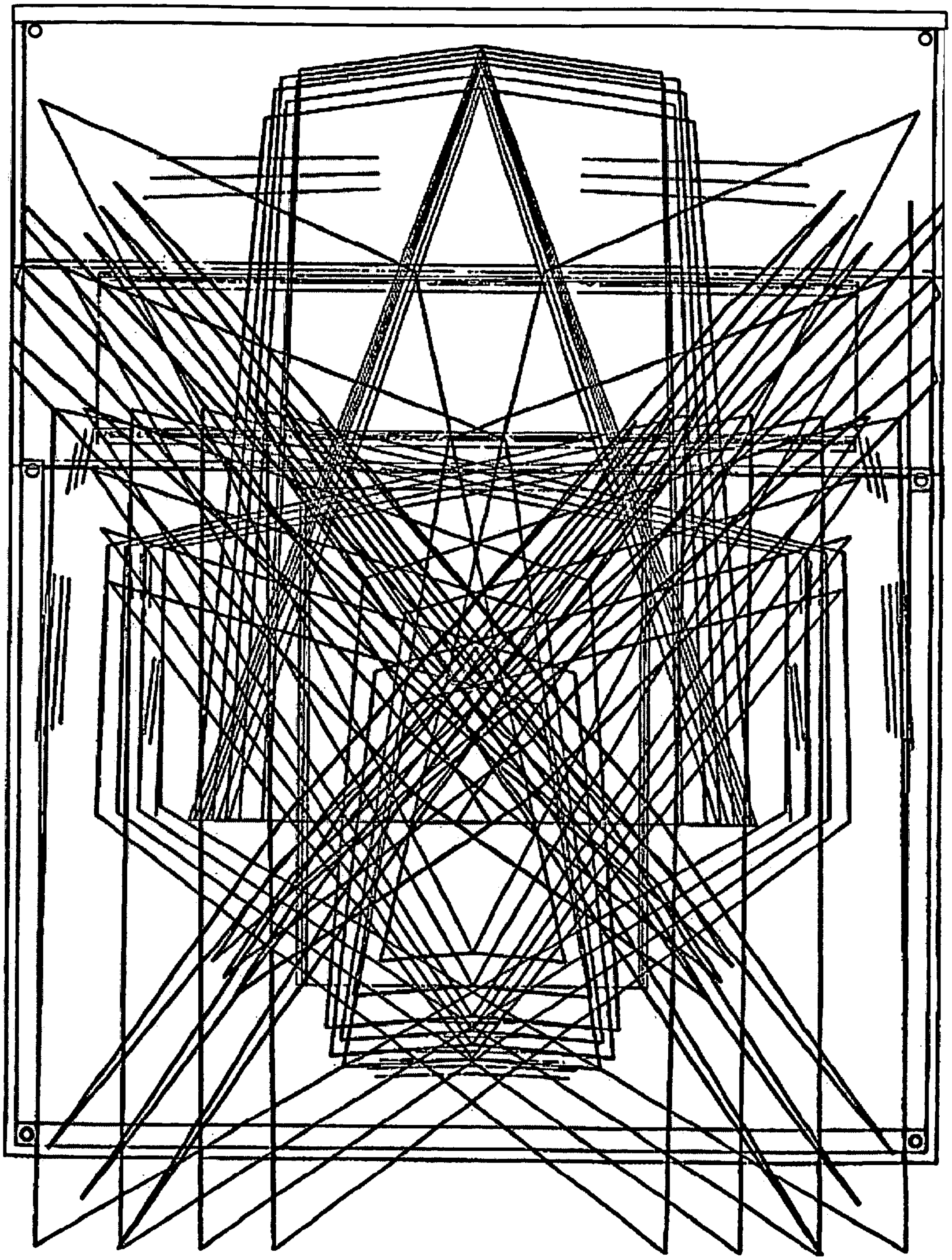
FIG. 5A3

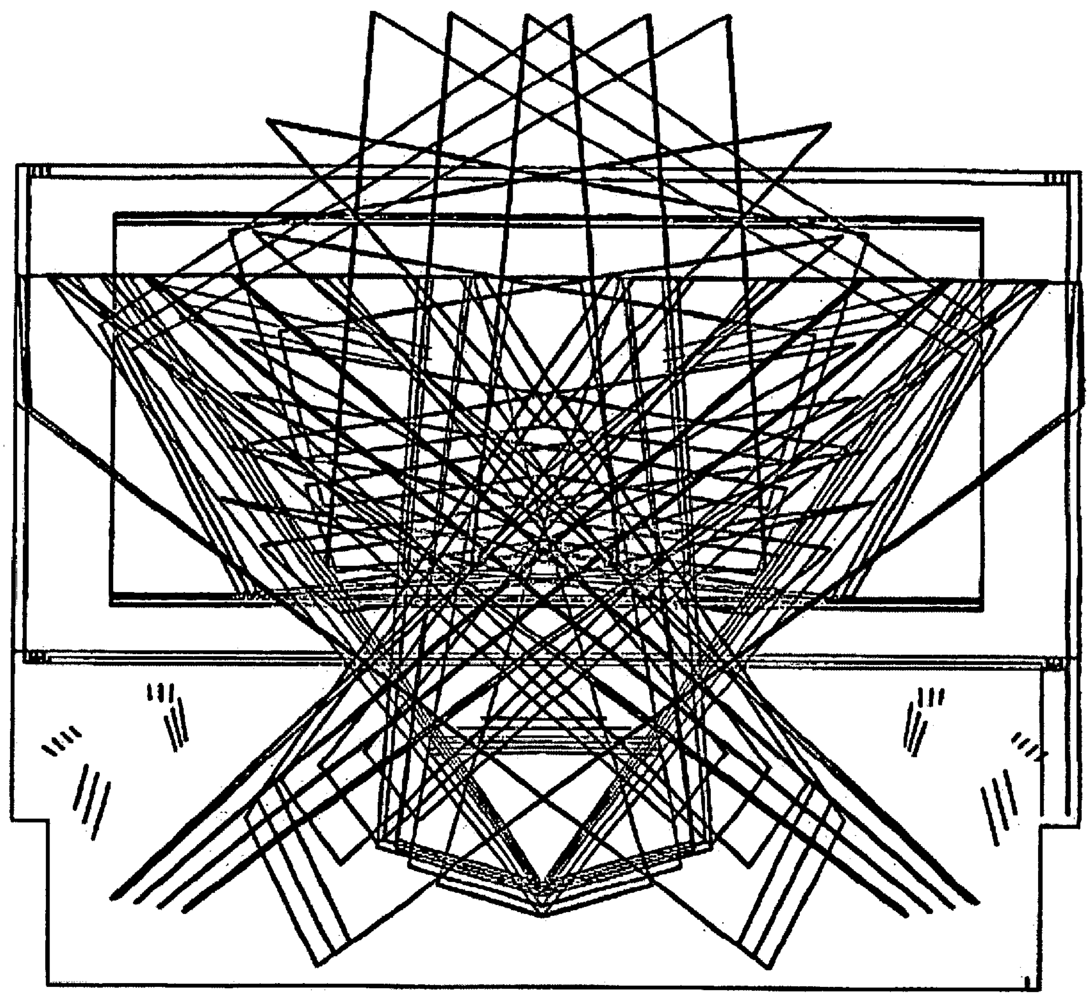
FIG. 5A4

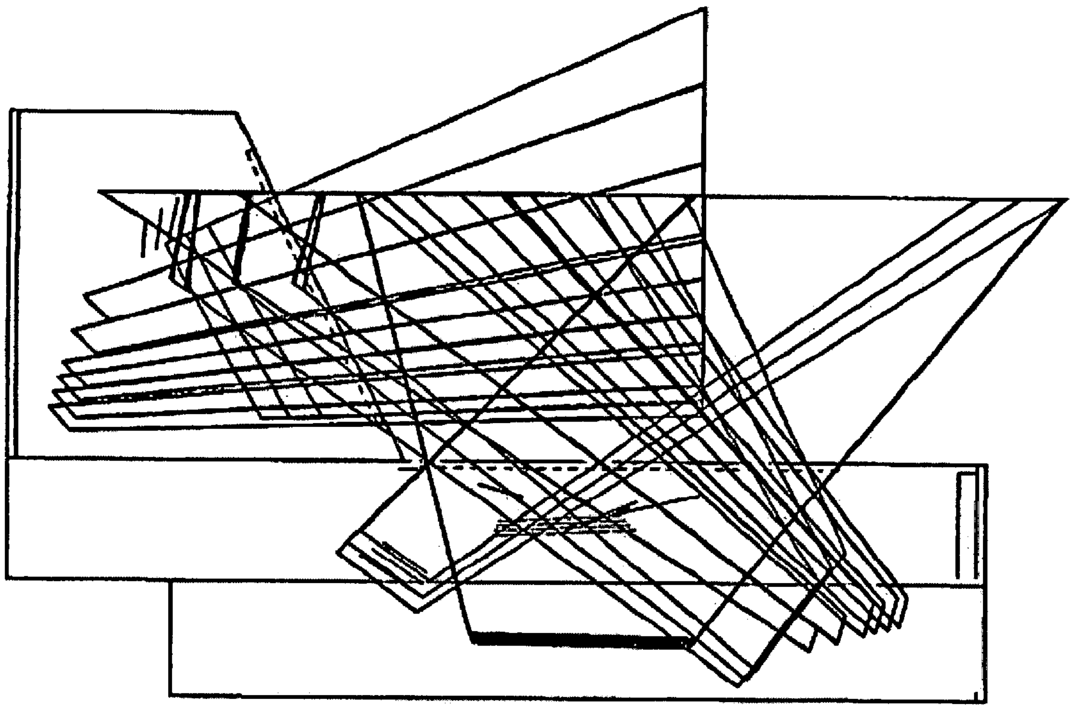
FIG. 5A5

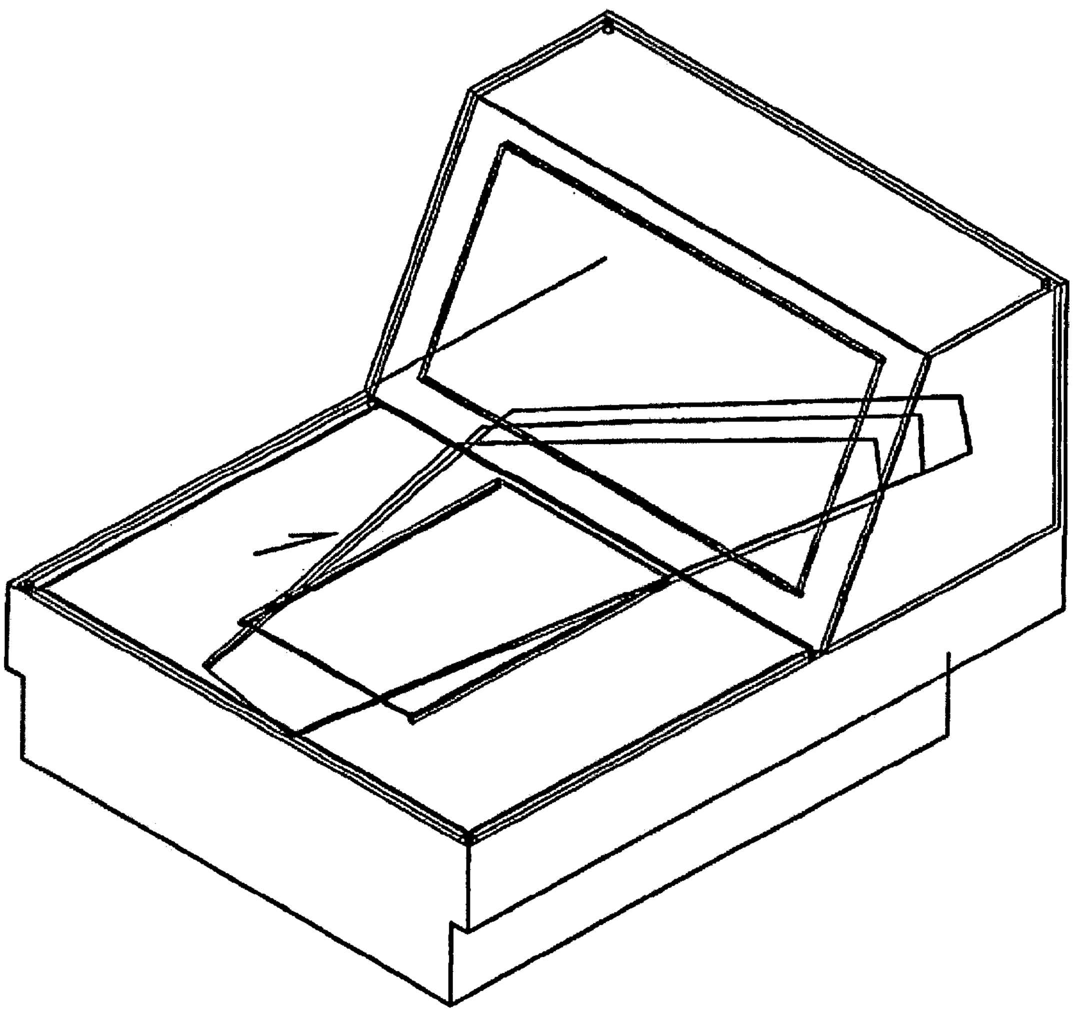
FIG. 5B1

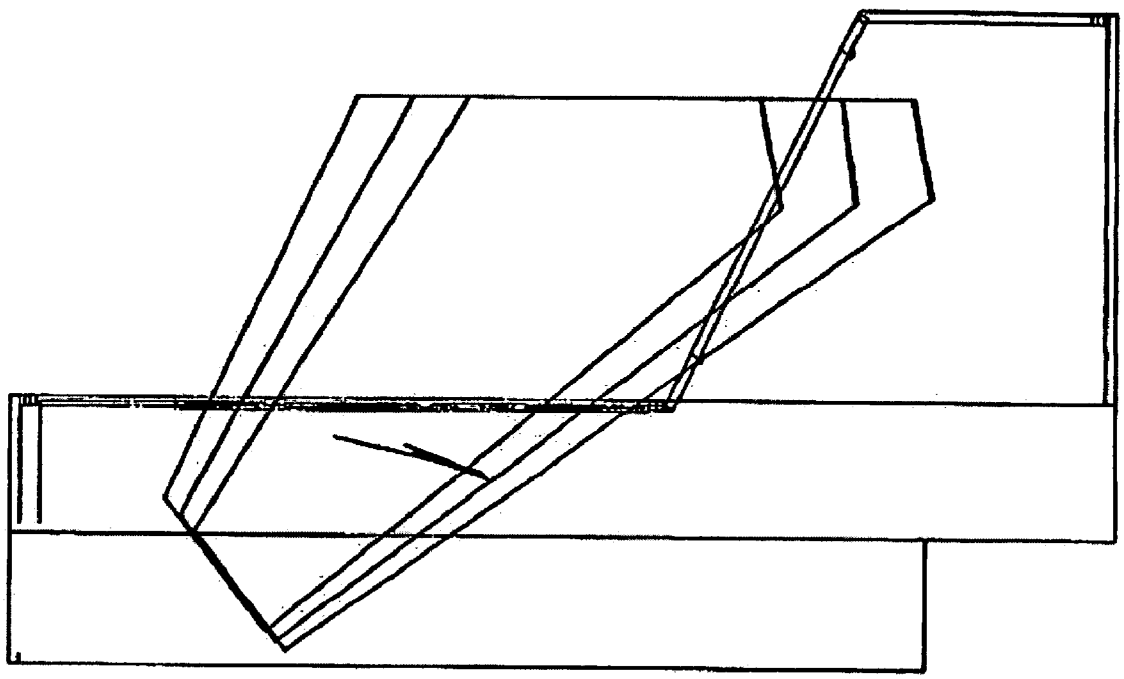
FIG. 5B2

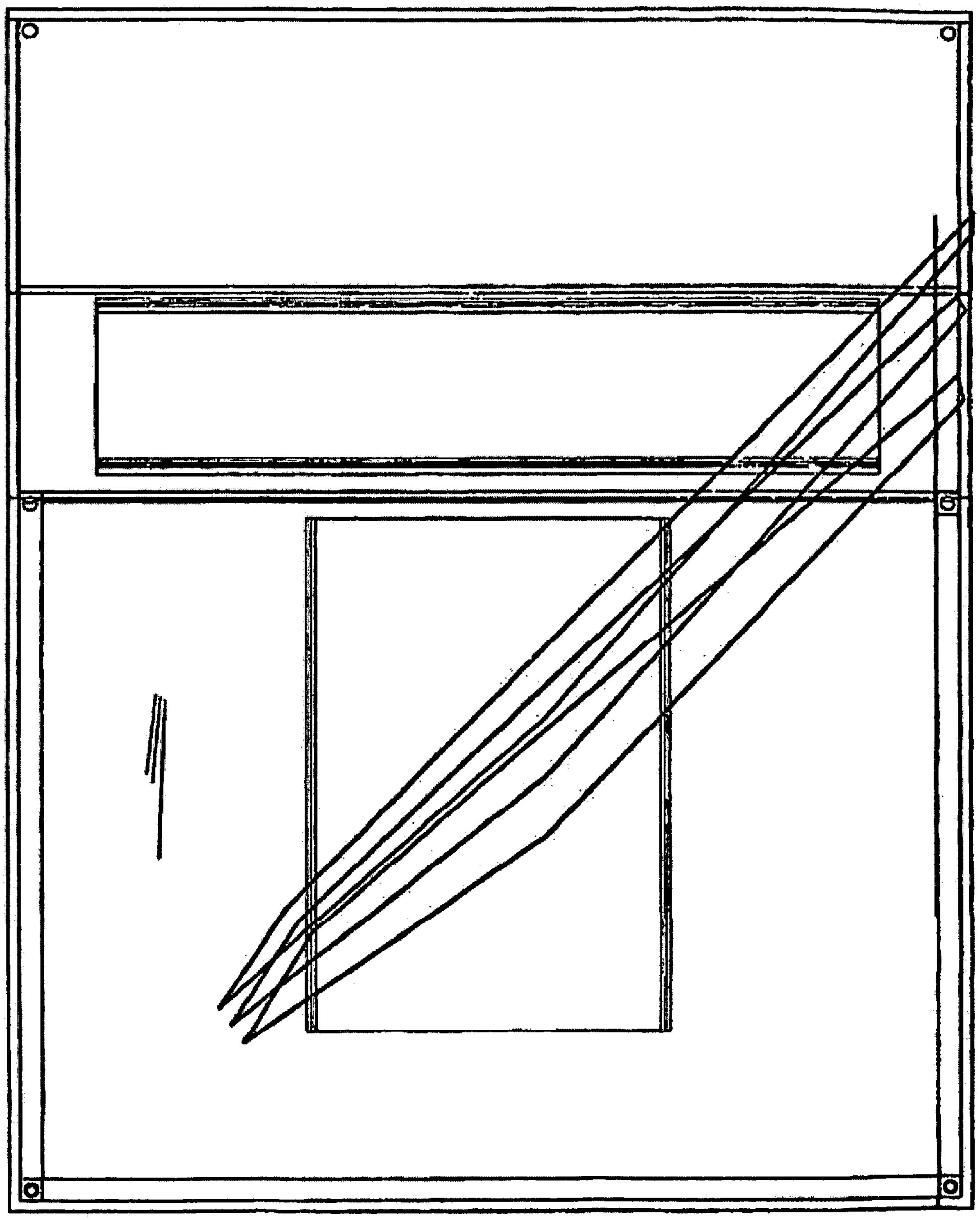
FIG. 5B3

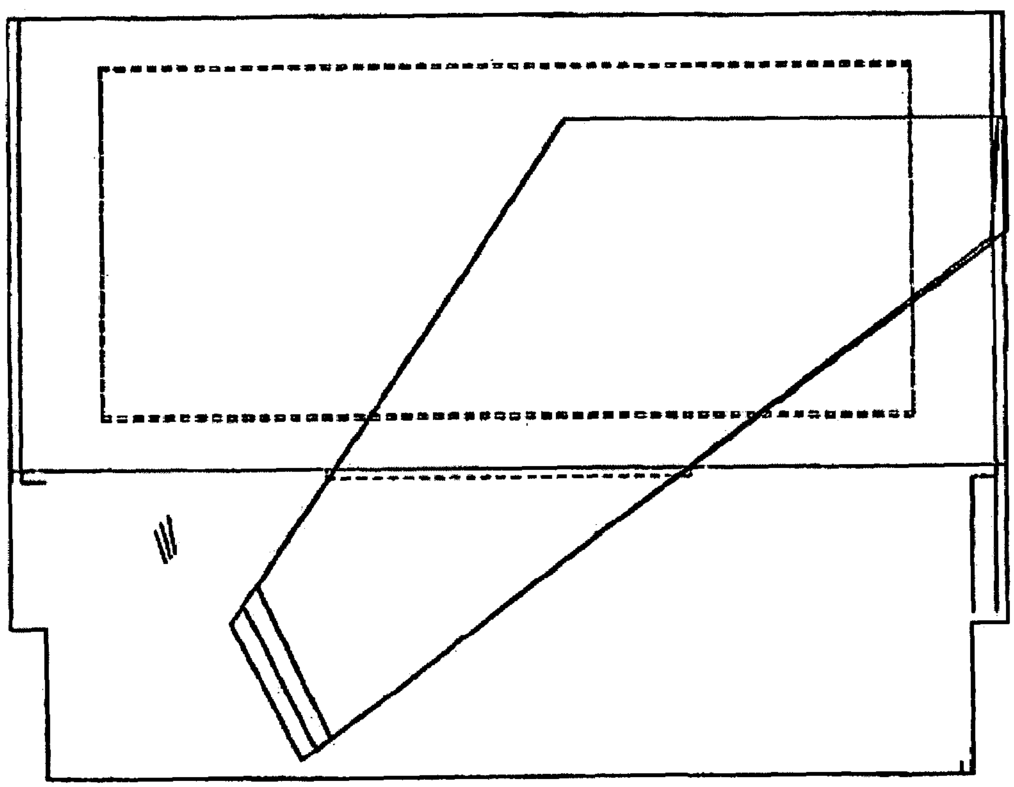
FIG. 5B4

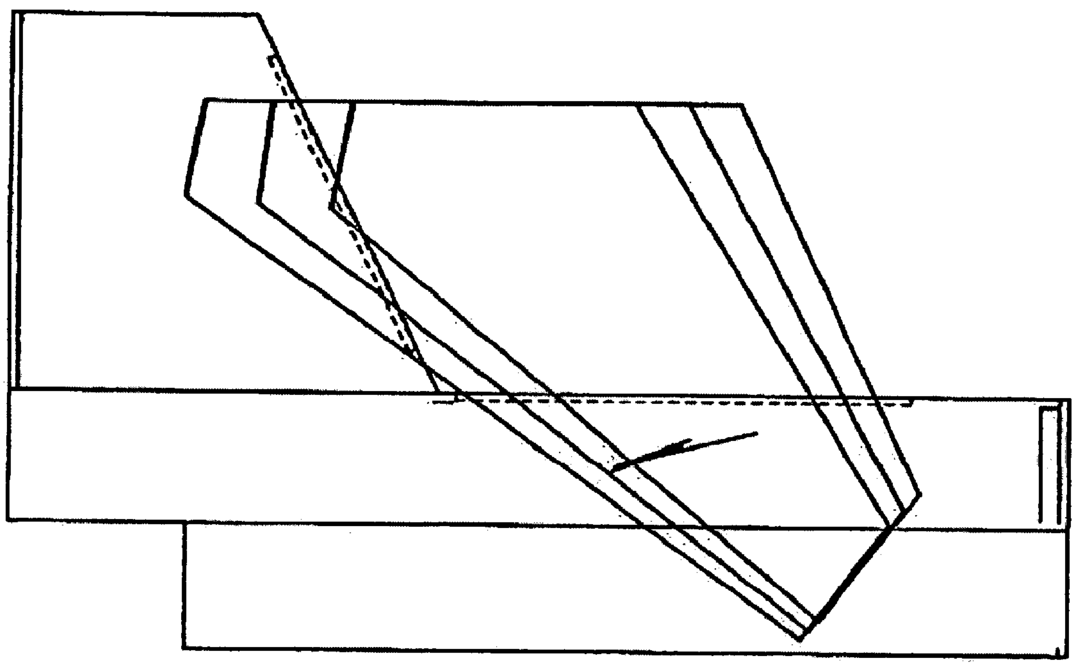
FIG. 5B5

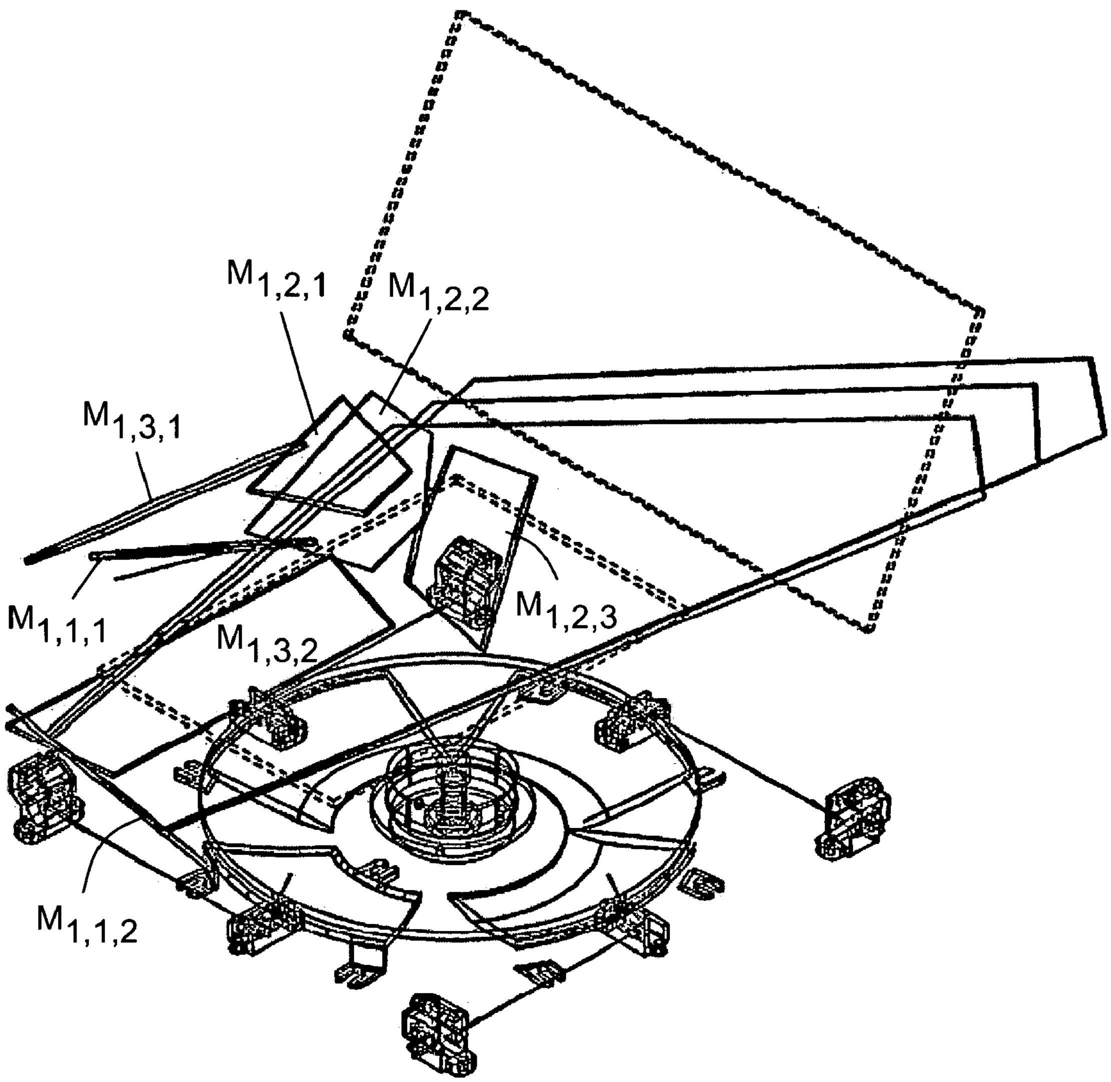
FIG. 5C1

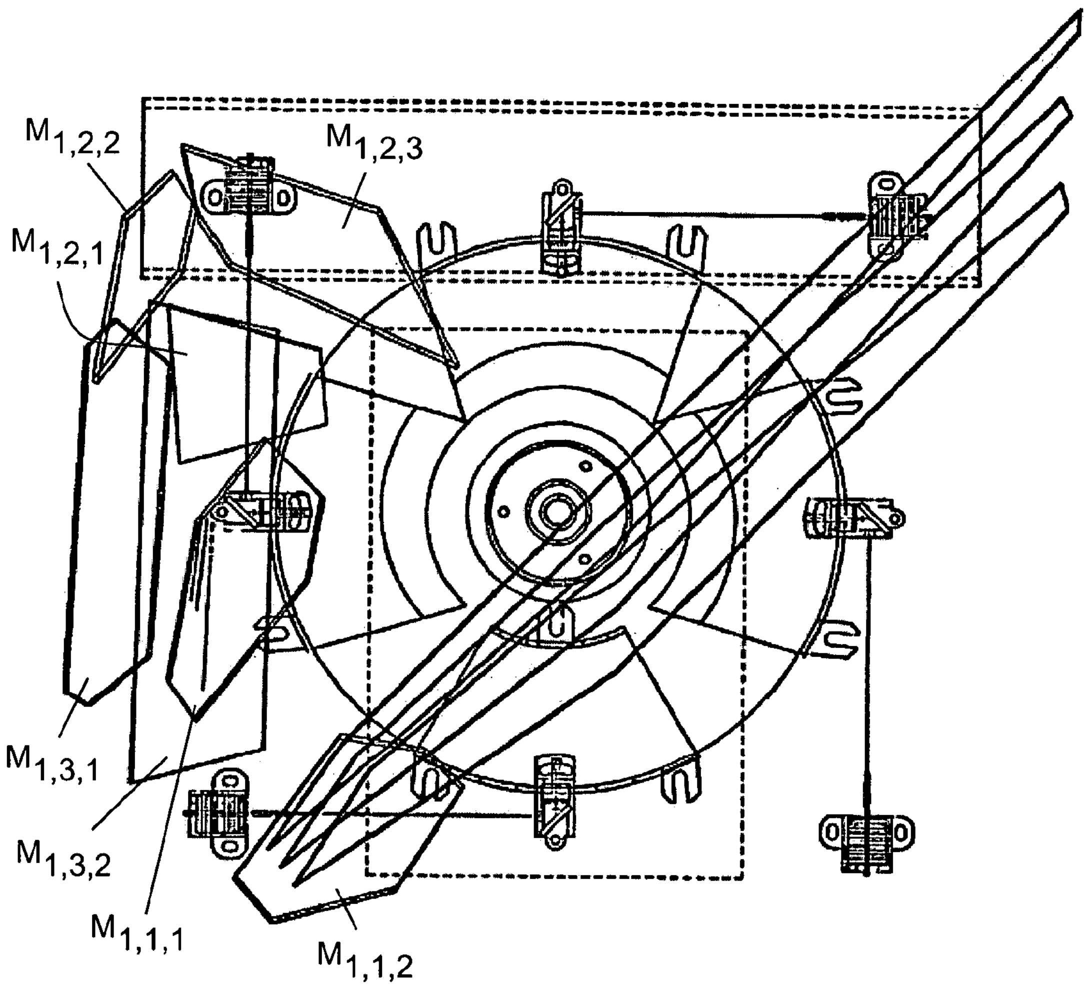
FIG. 5C2

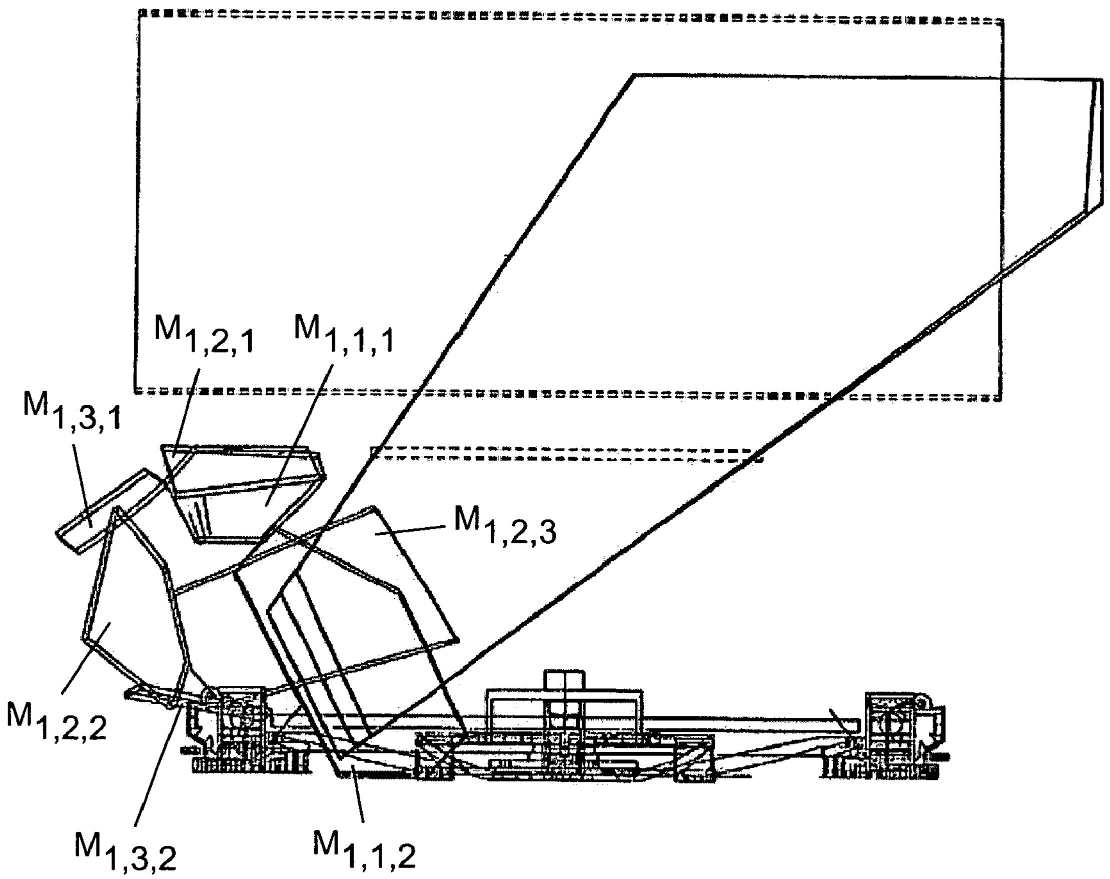
FIG. 5C3

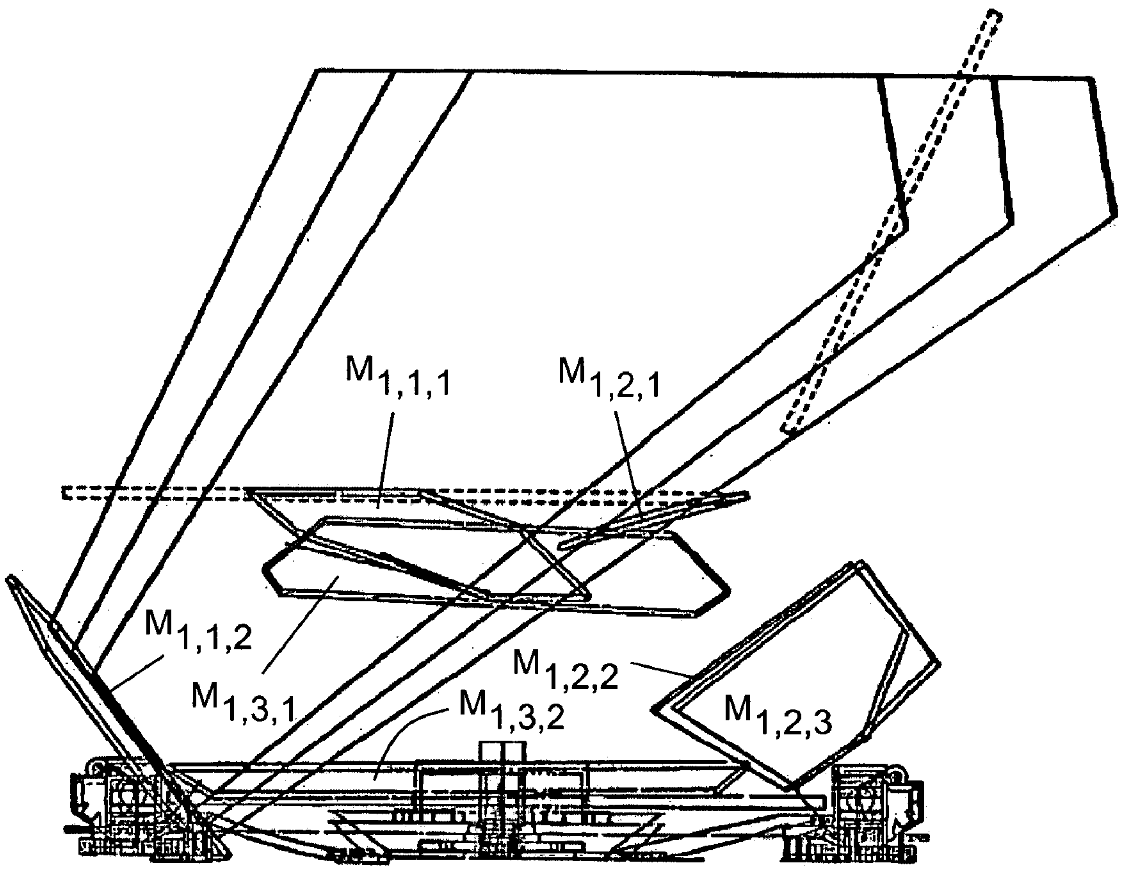
FIG. 5C4

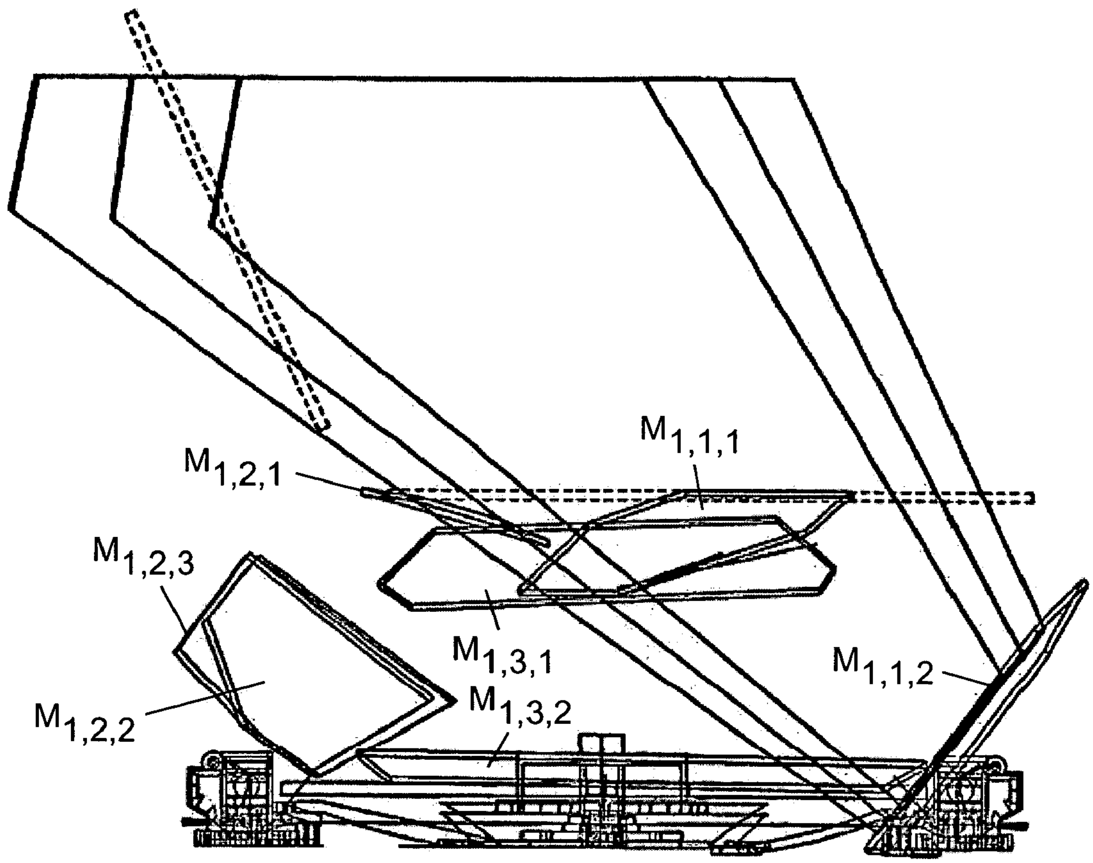
FIG. 5C5

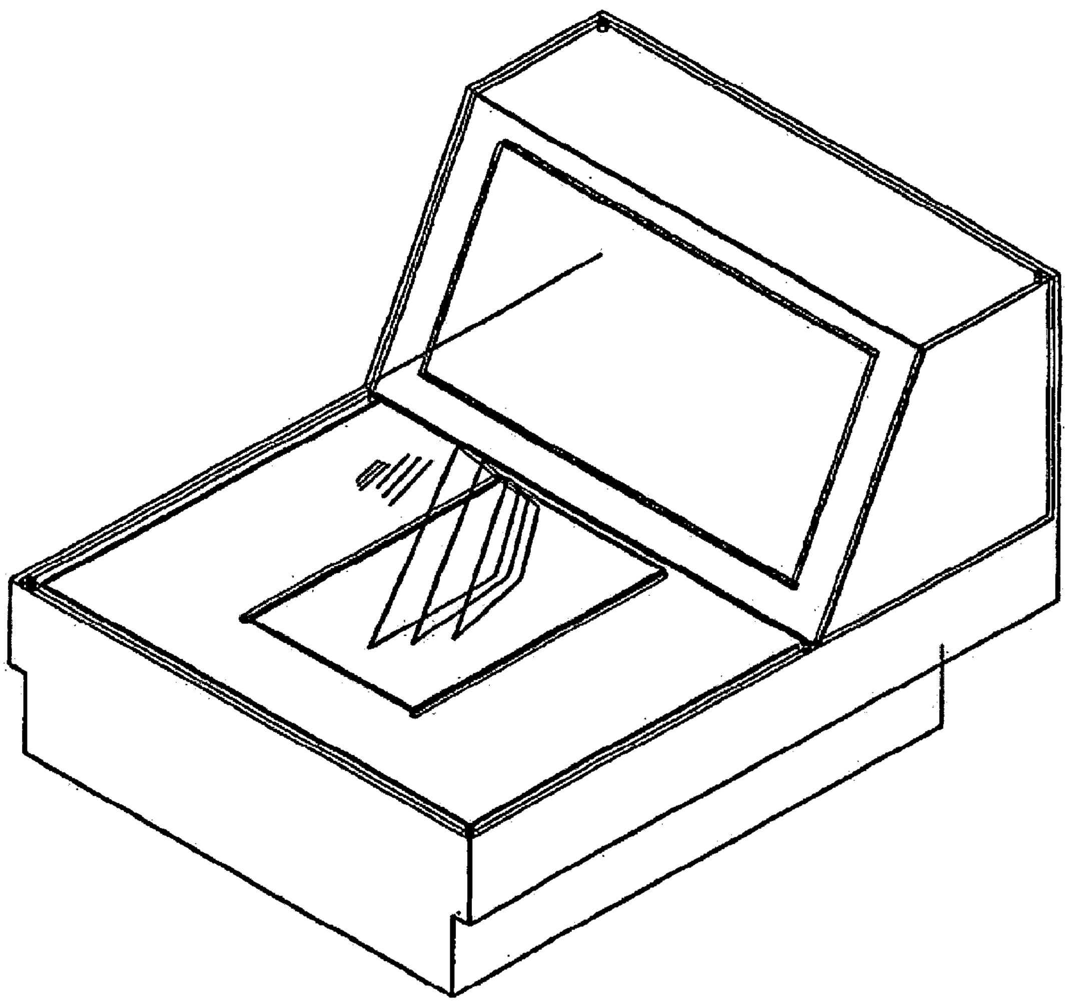
FIG. 5D1

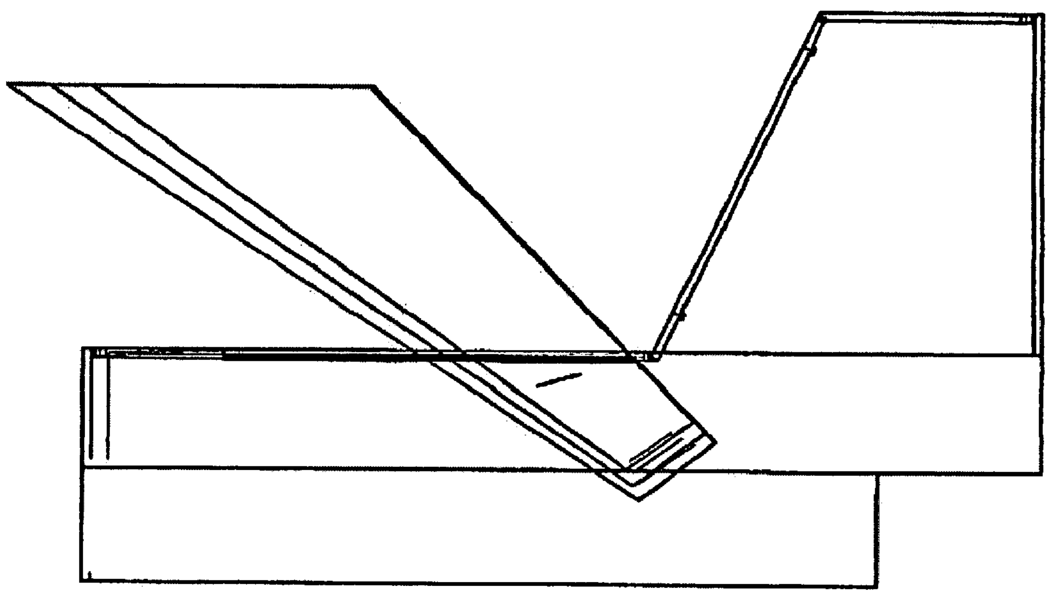
FIG. 5D2

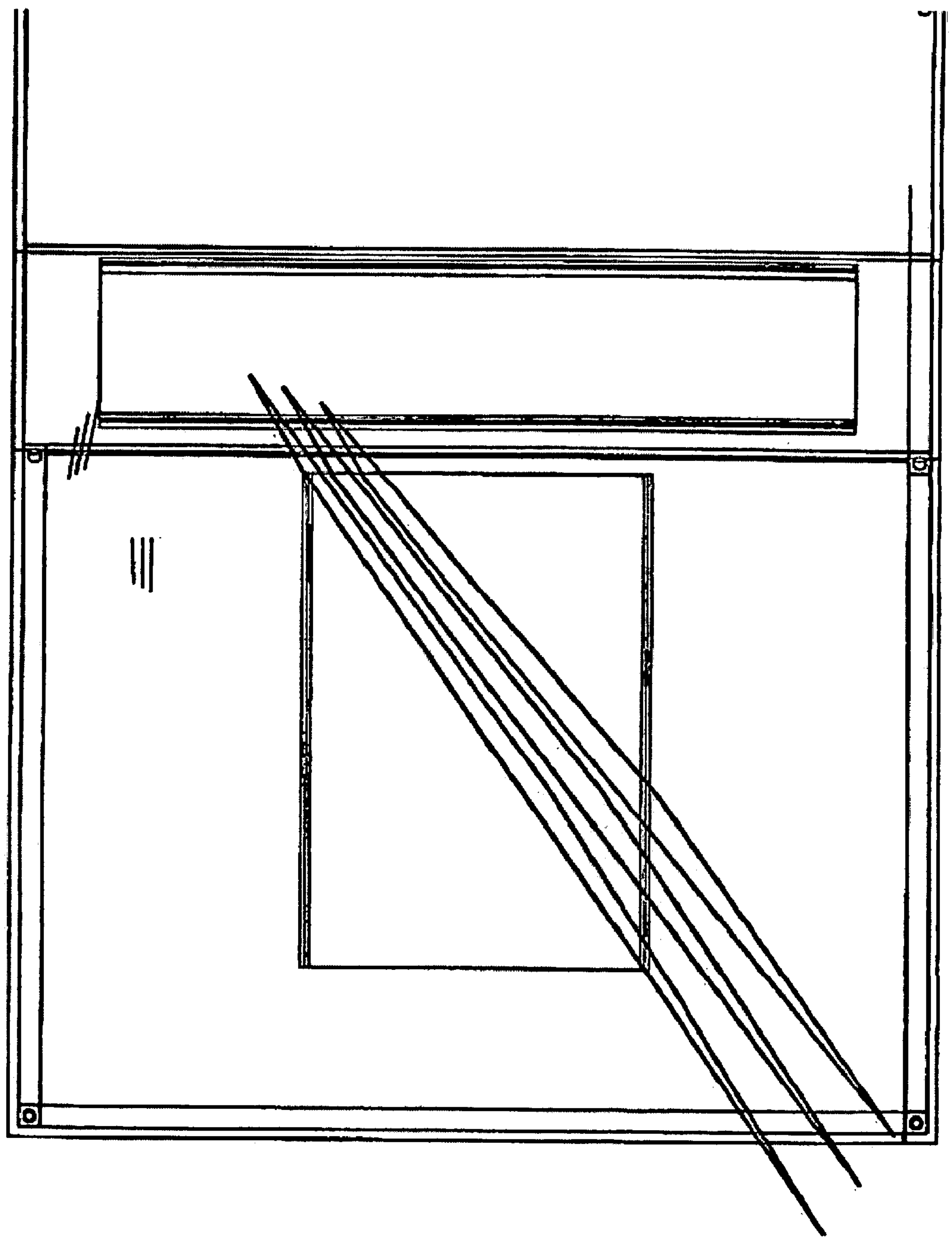
FIG. 5D3

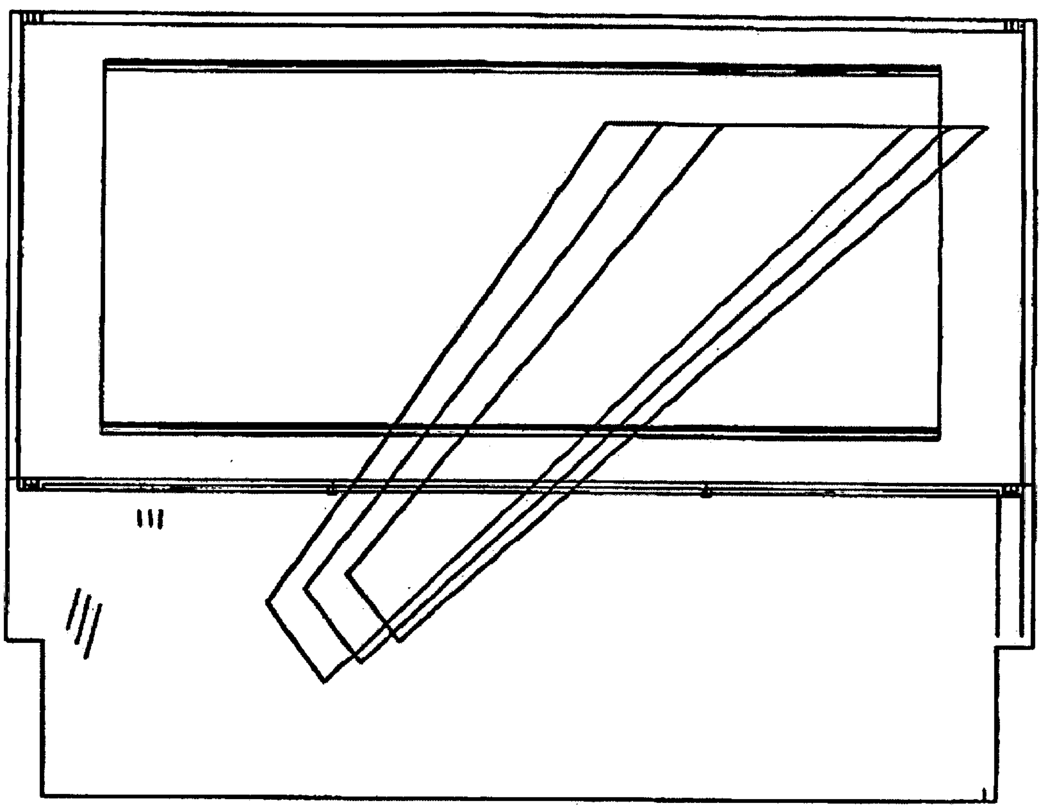
FIG. 5D4

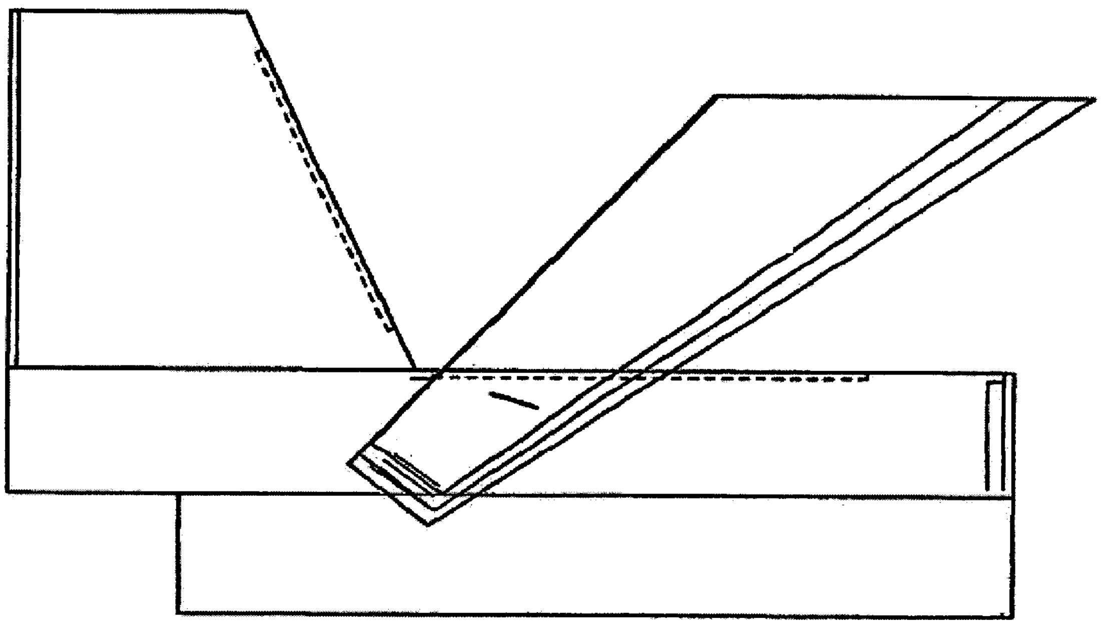
FIG. 5D5

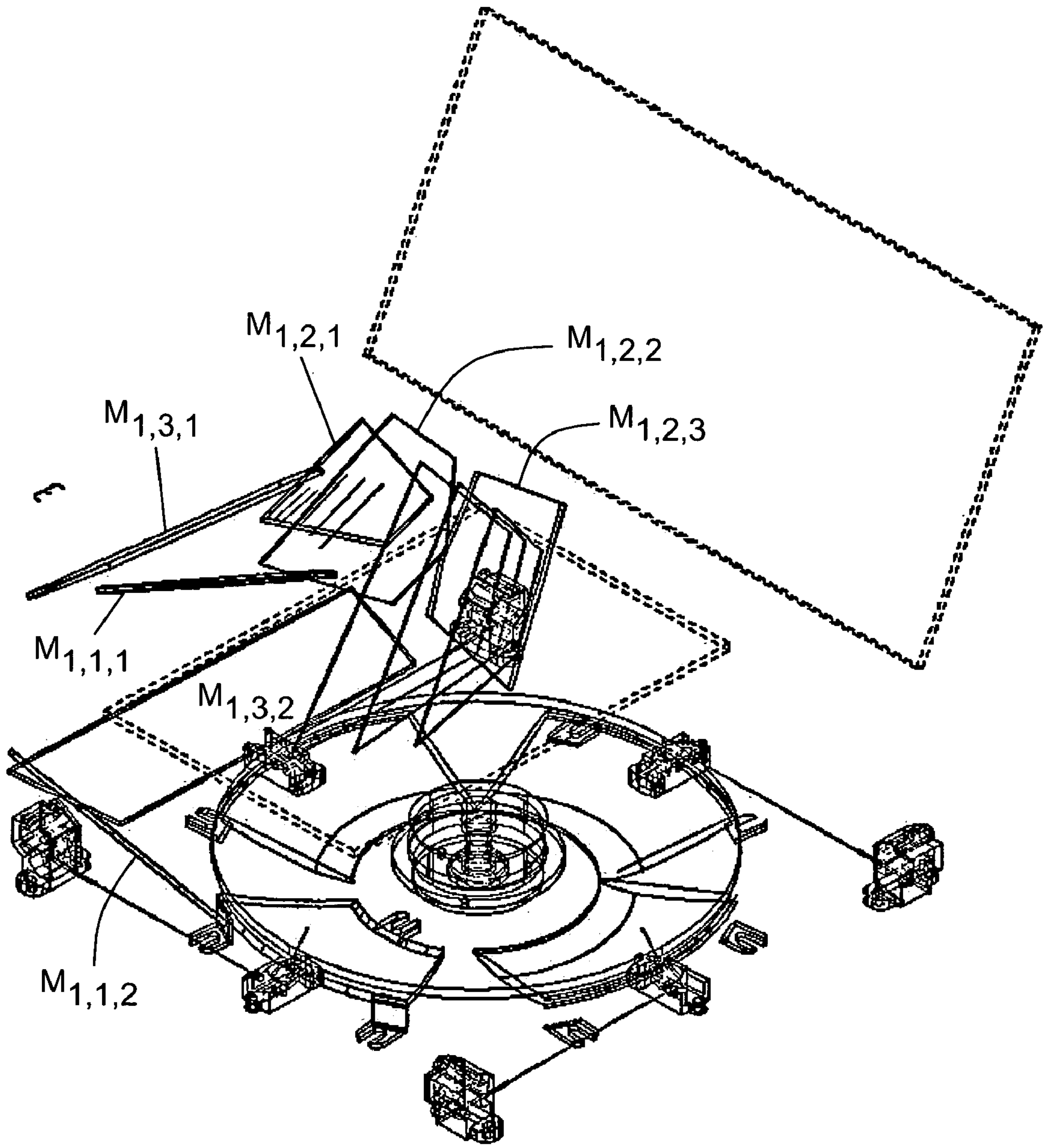
FIG. 5E1

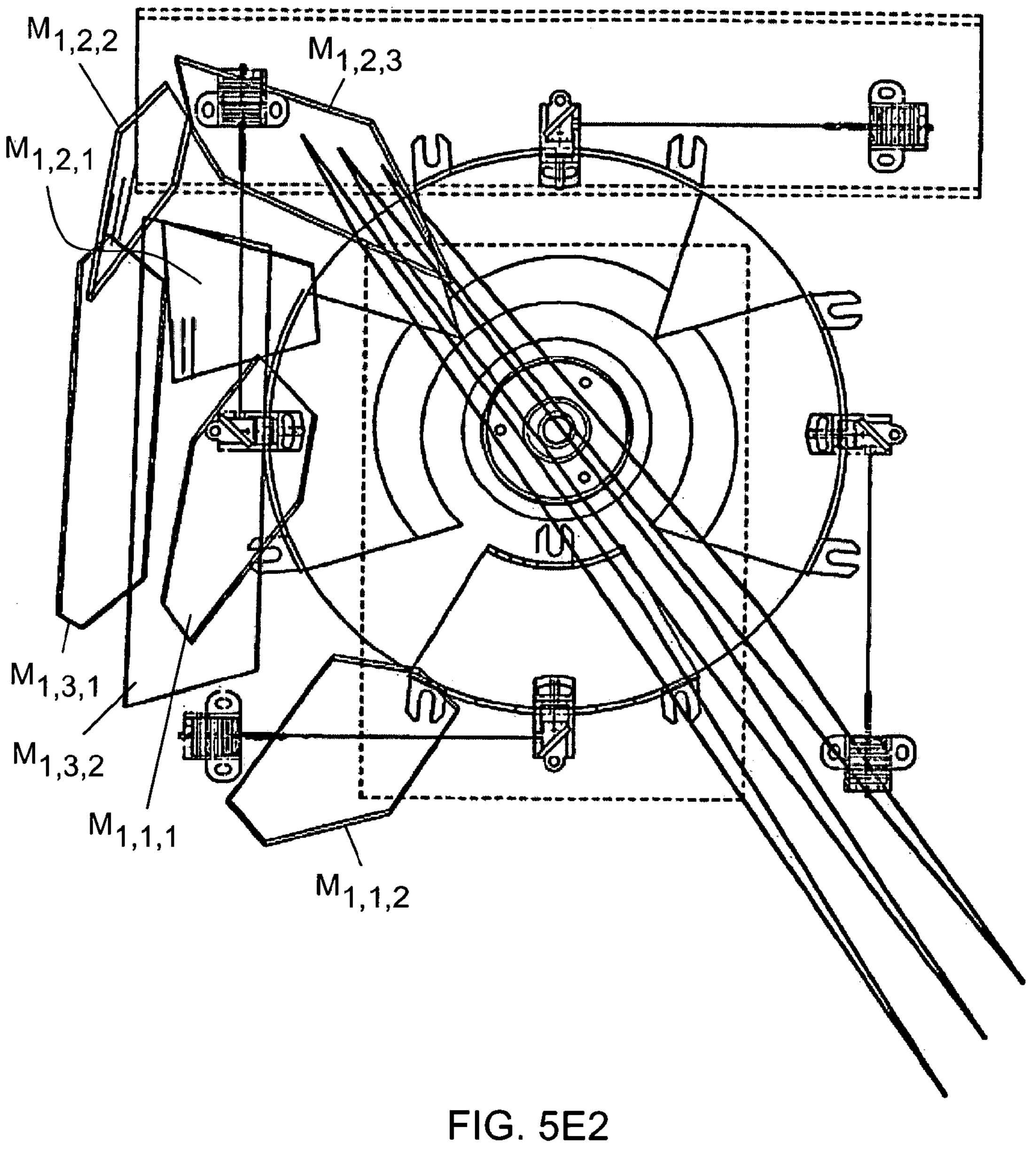
FIG. 5E2

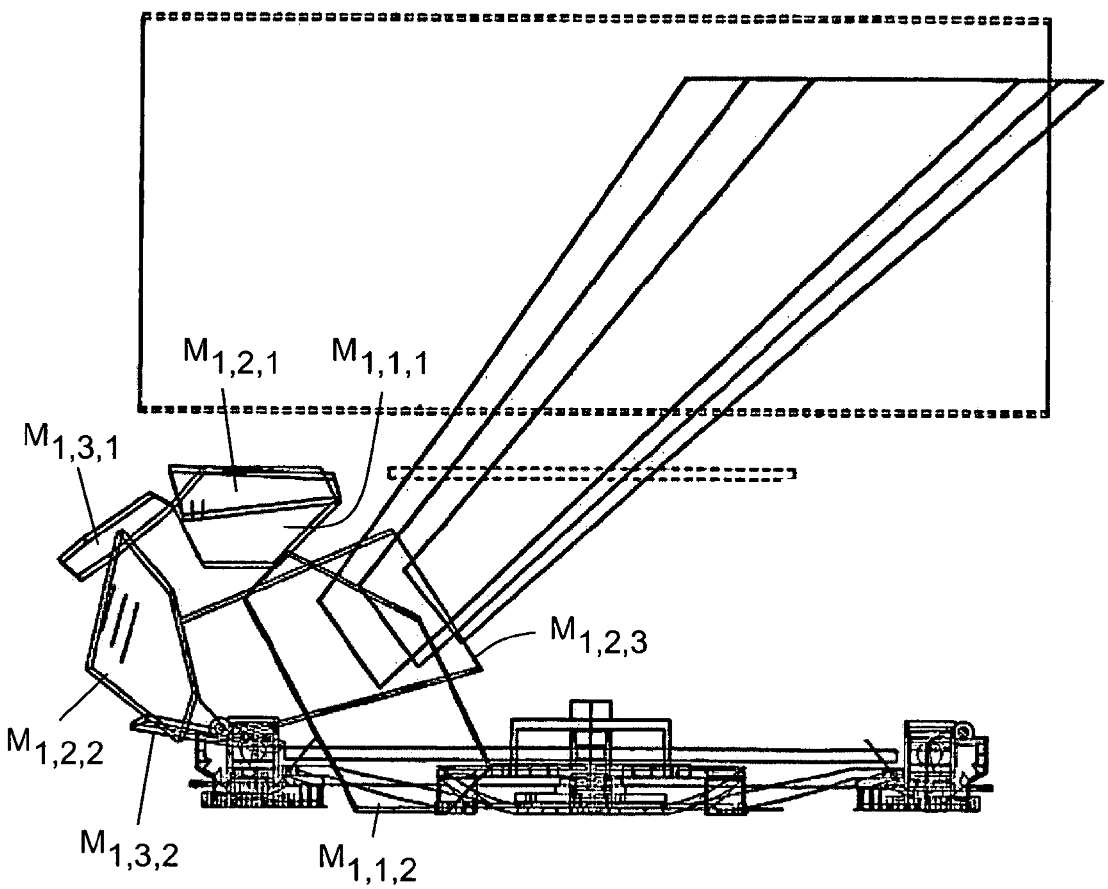
FIG. 5E3

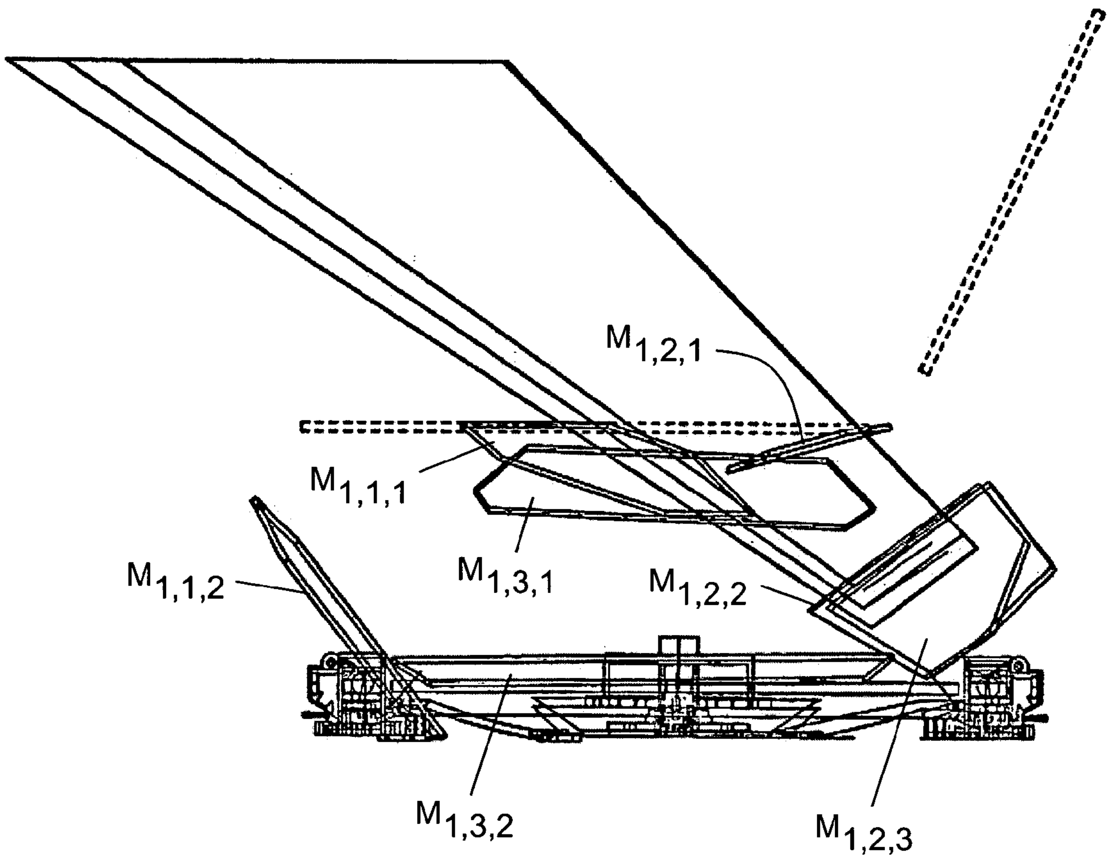
FIG. 5E4

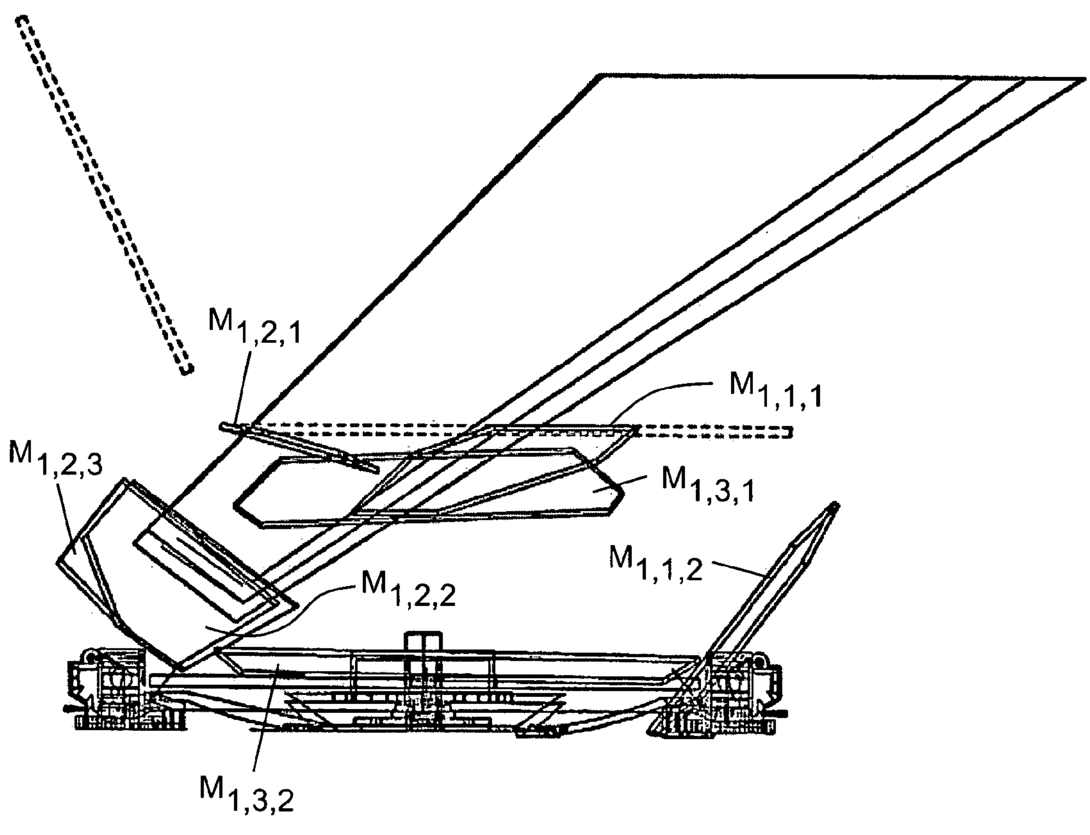
FIG. 5E5

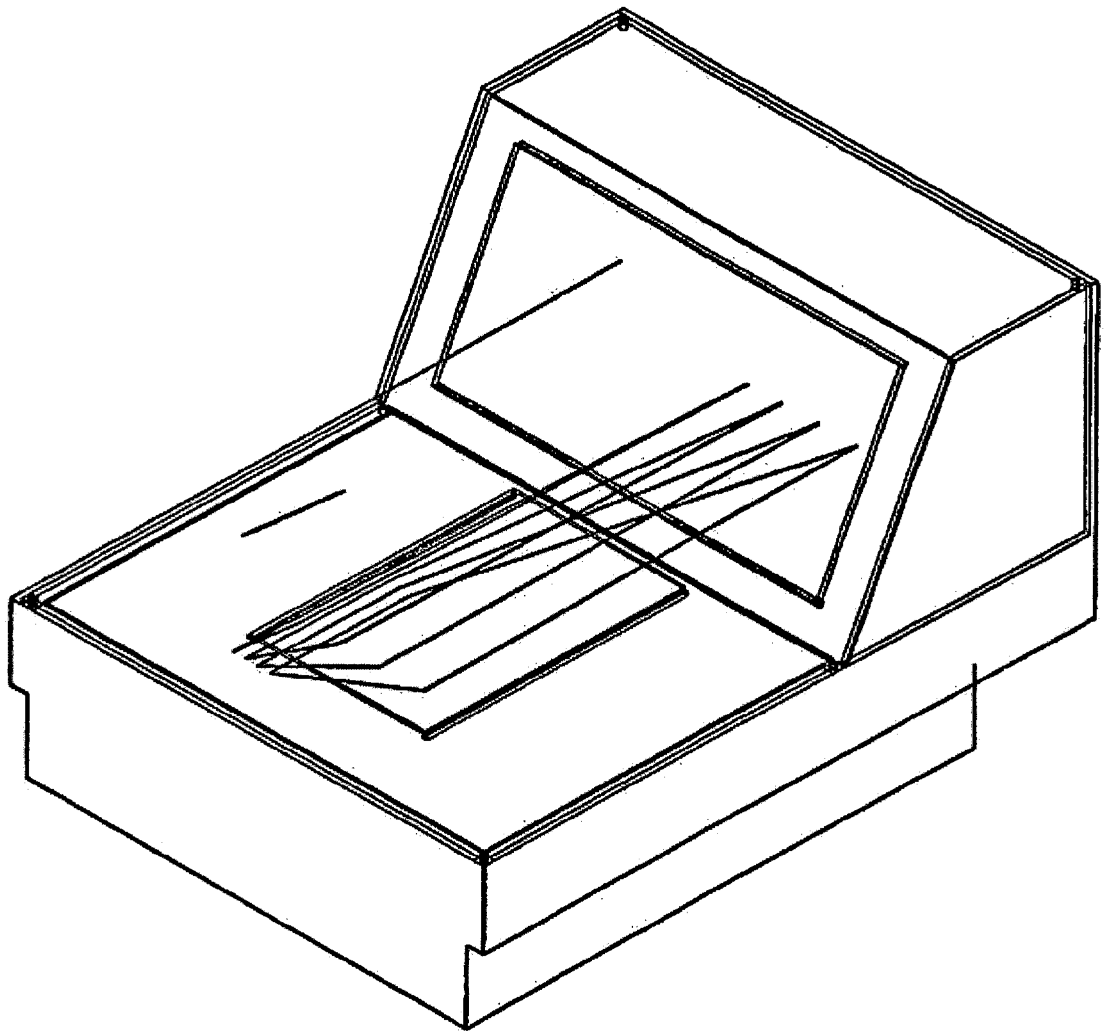
FIG. 5F1

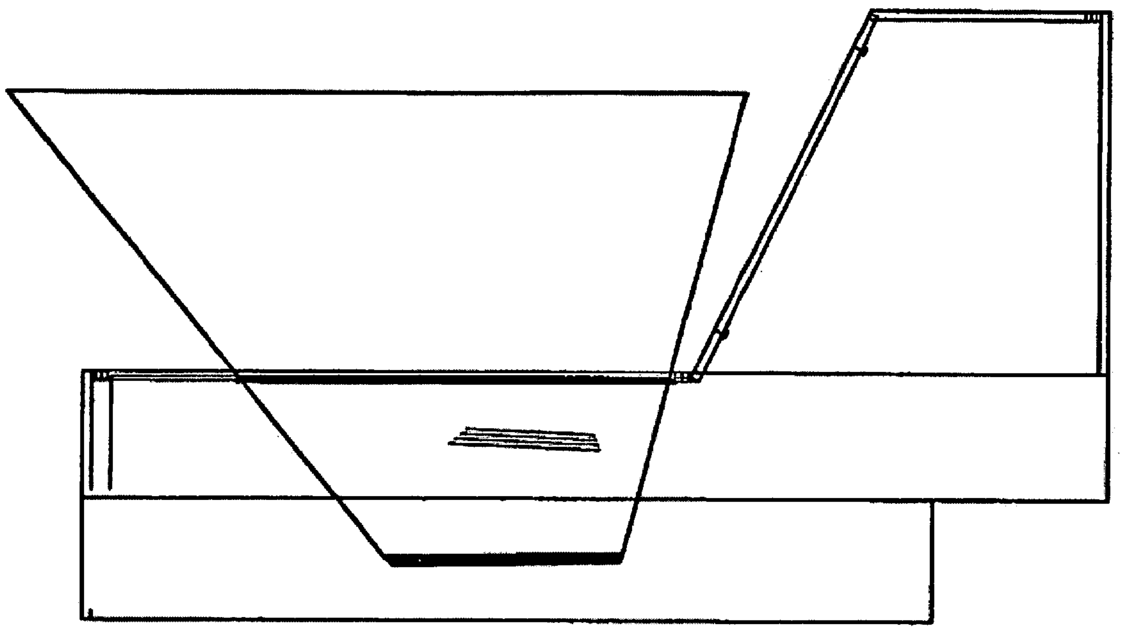
FIG. 5F2

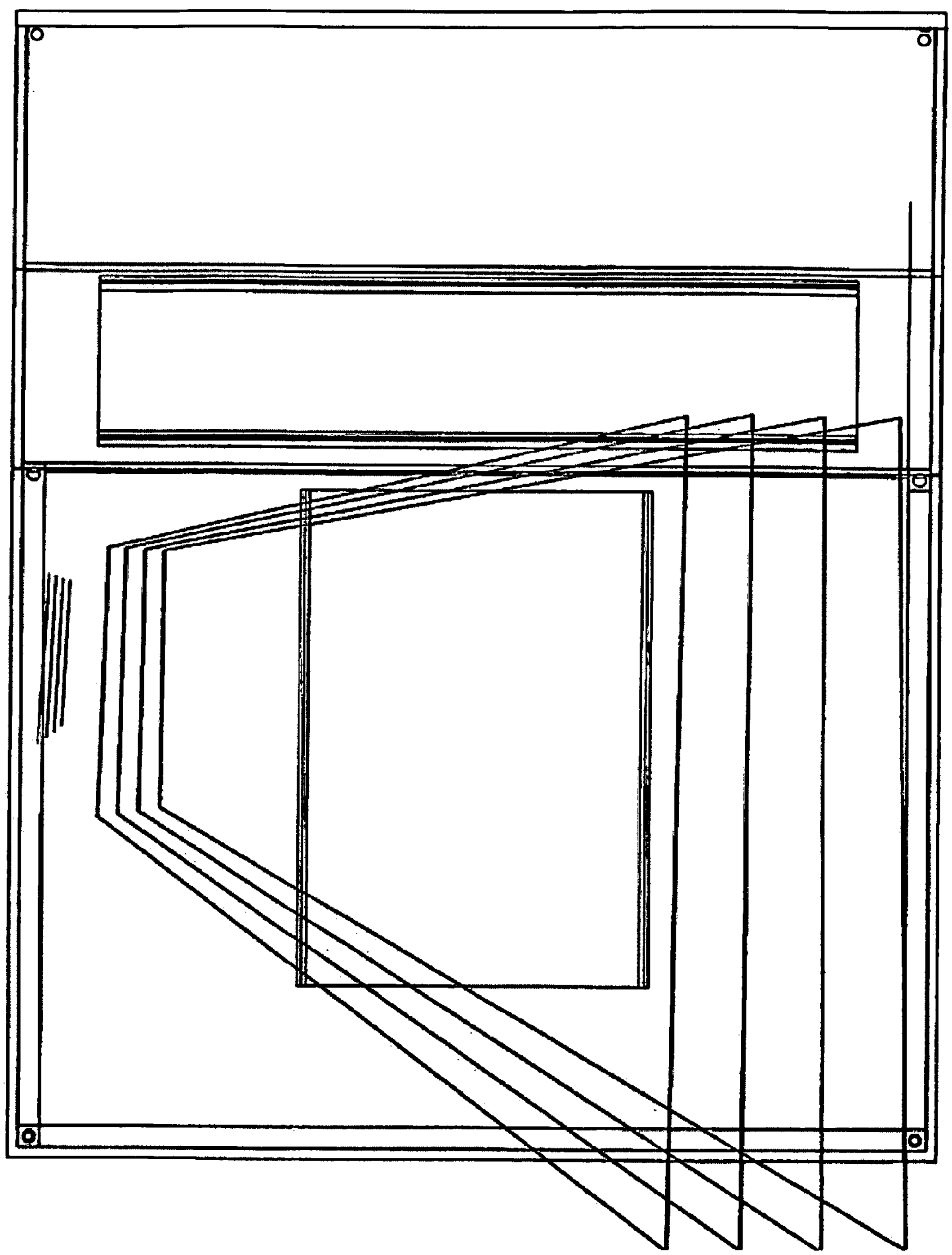
FIG. 5F3

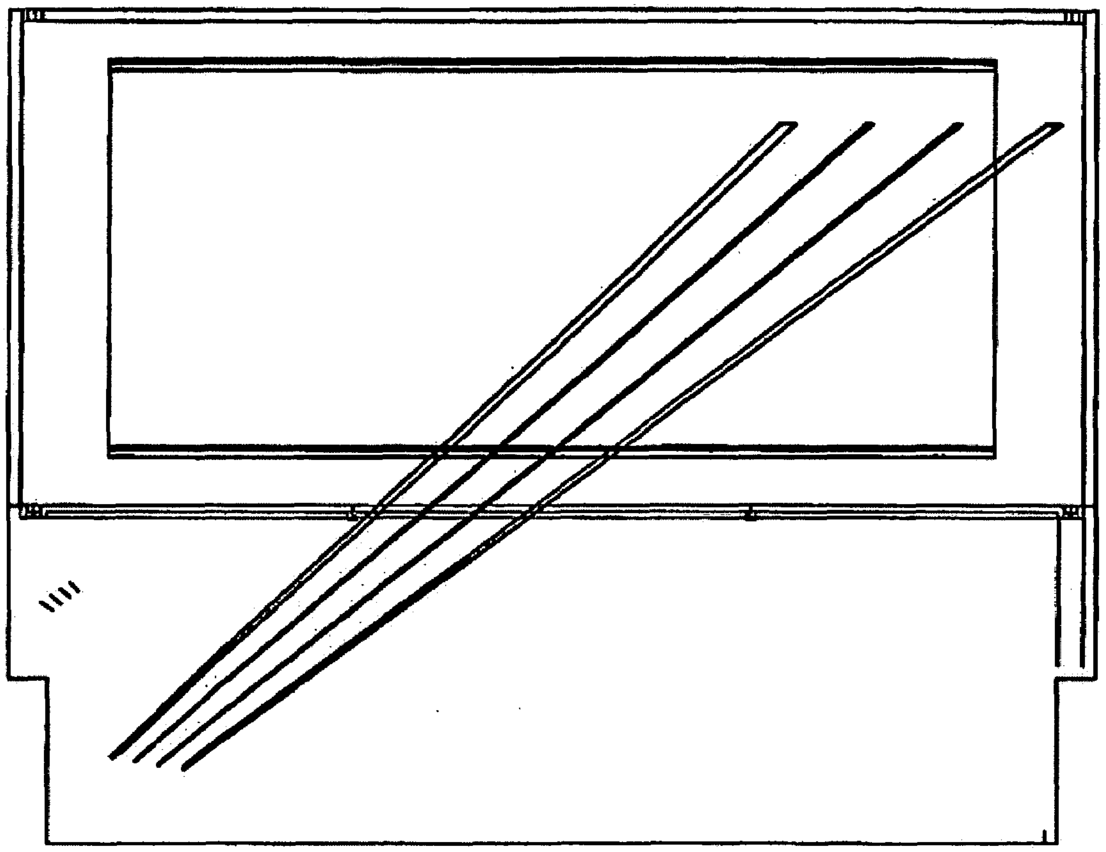
FIG. 5F4

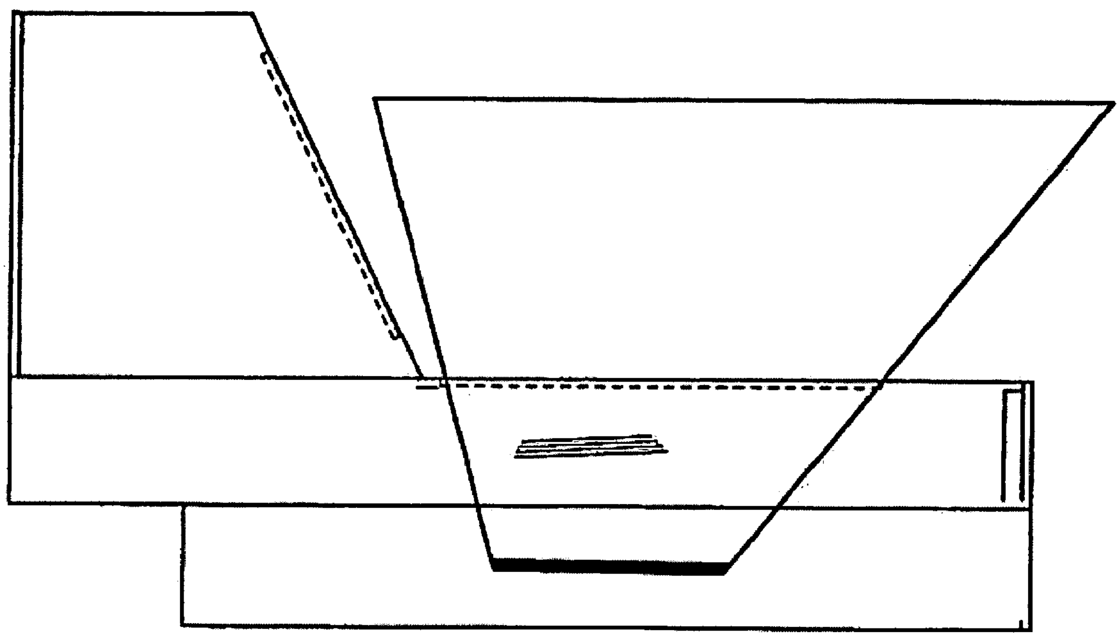
FIG. 5F5

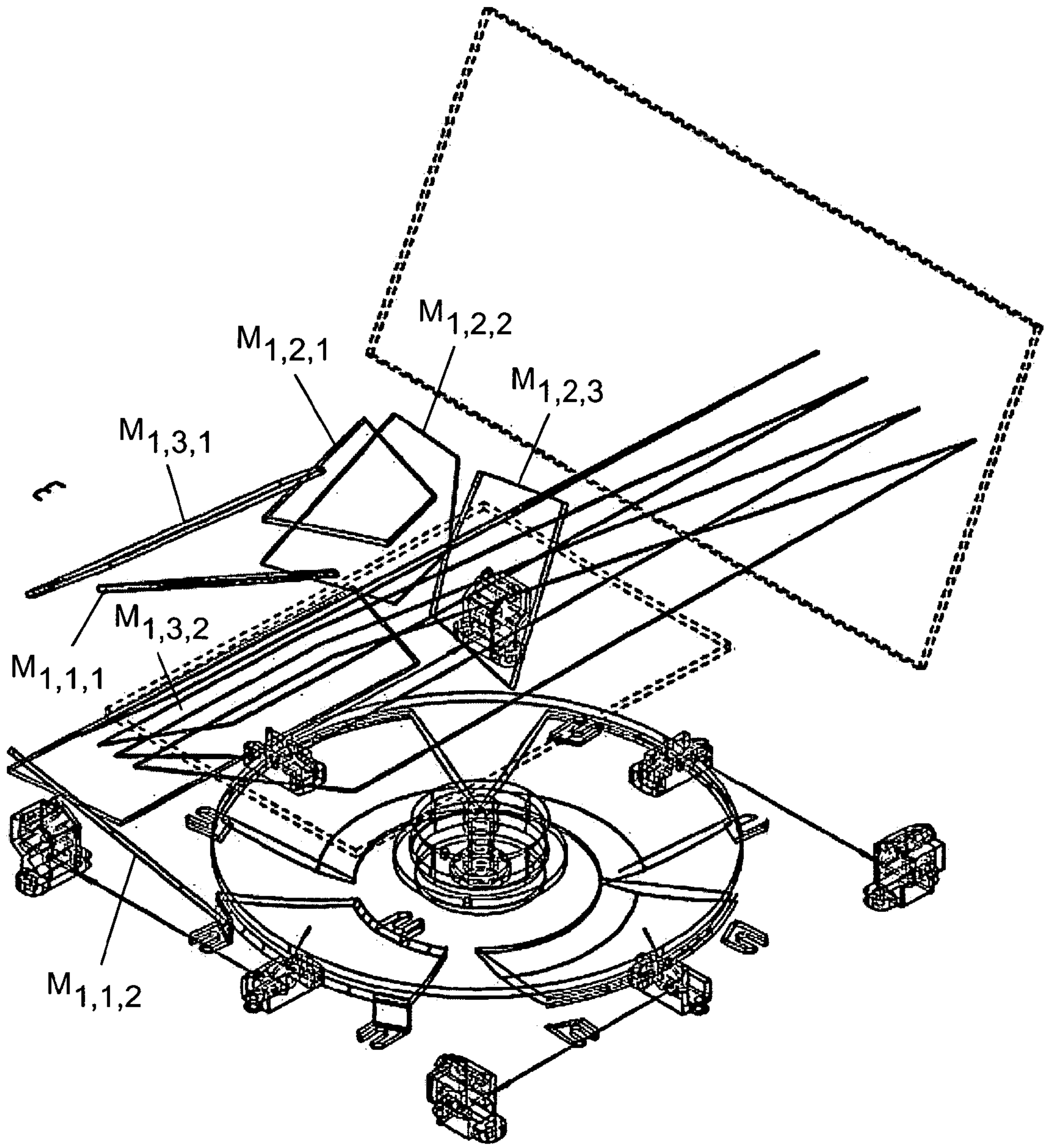
FIG. 5G1

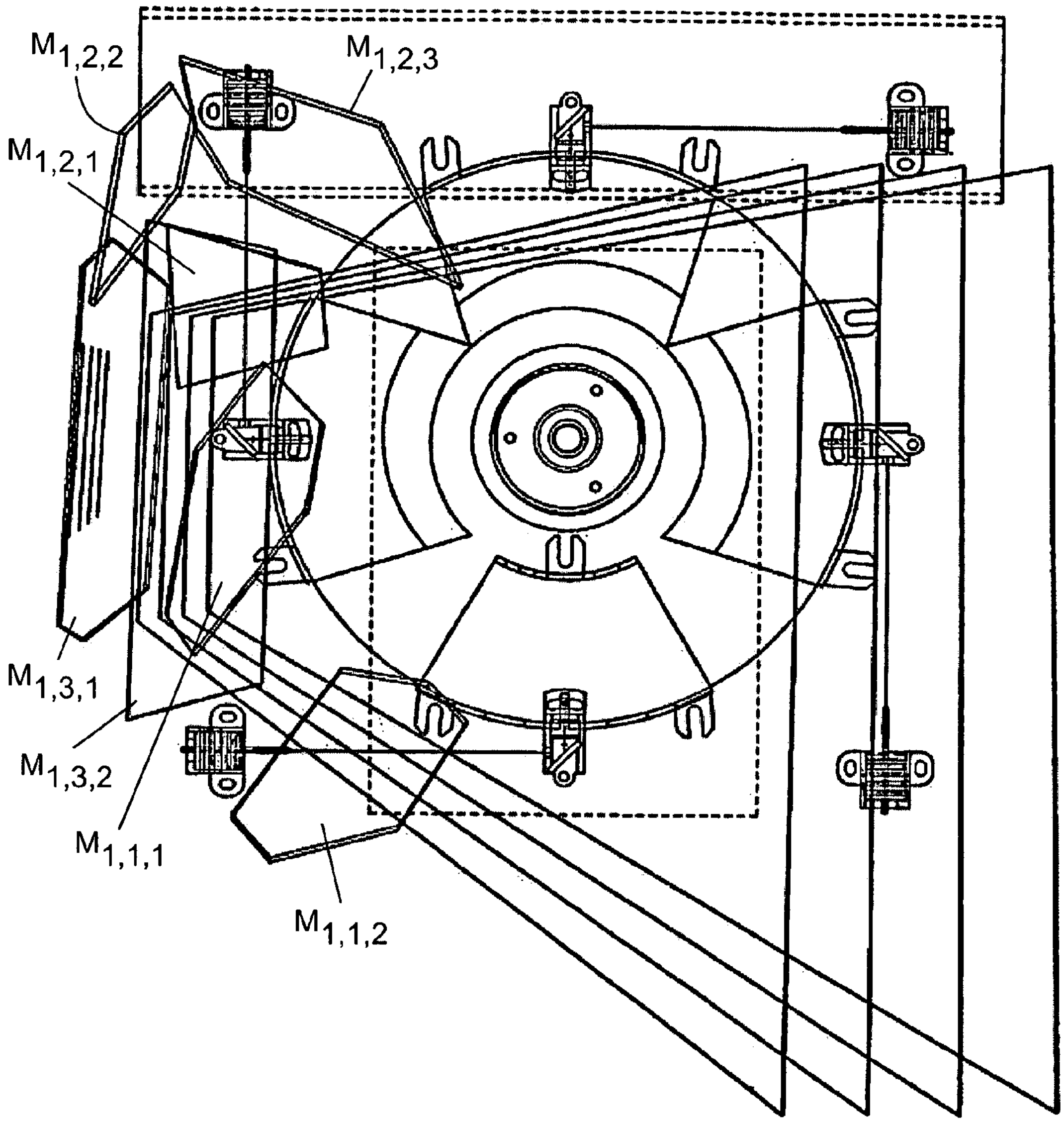
FIG. 5G2

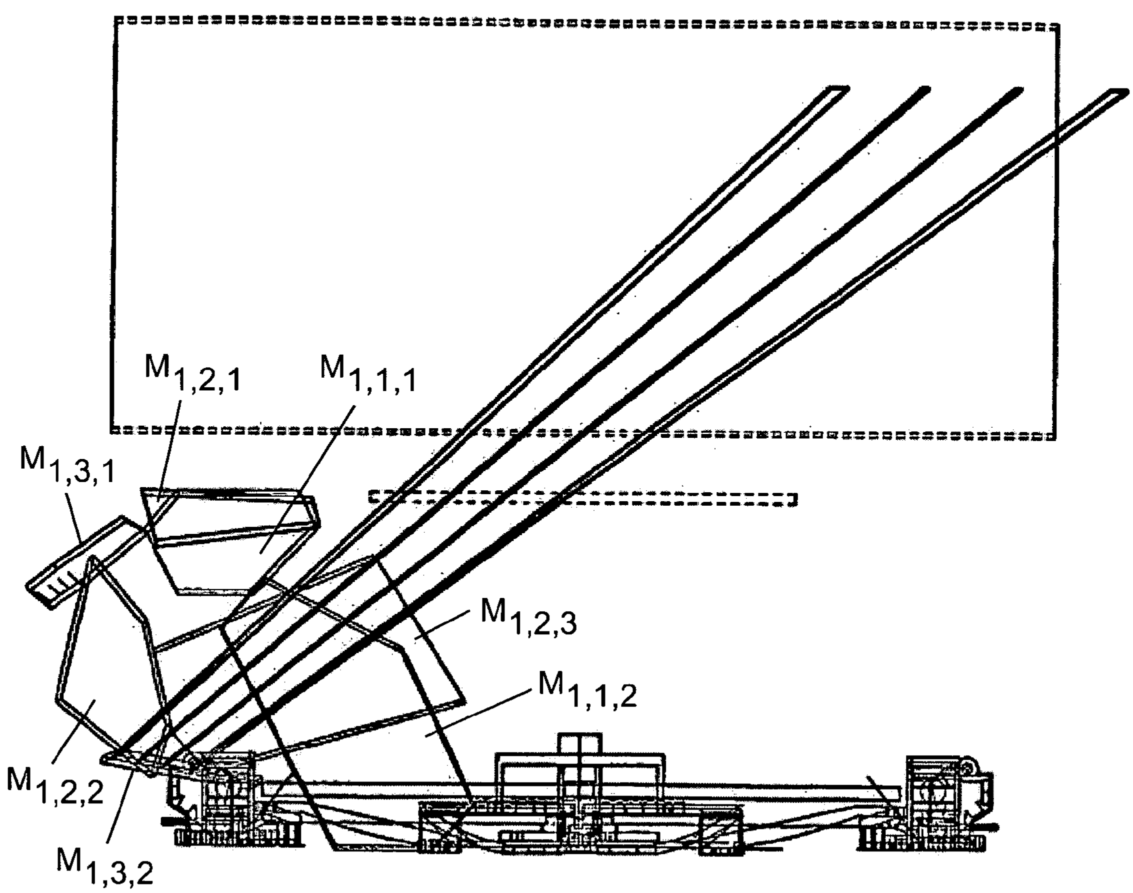
FIG. 5G3

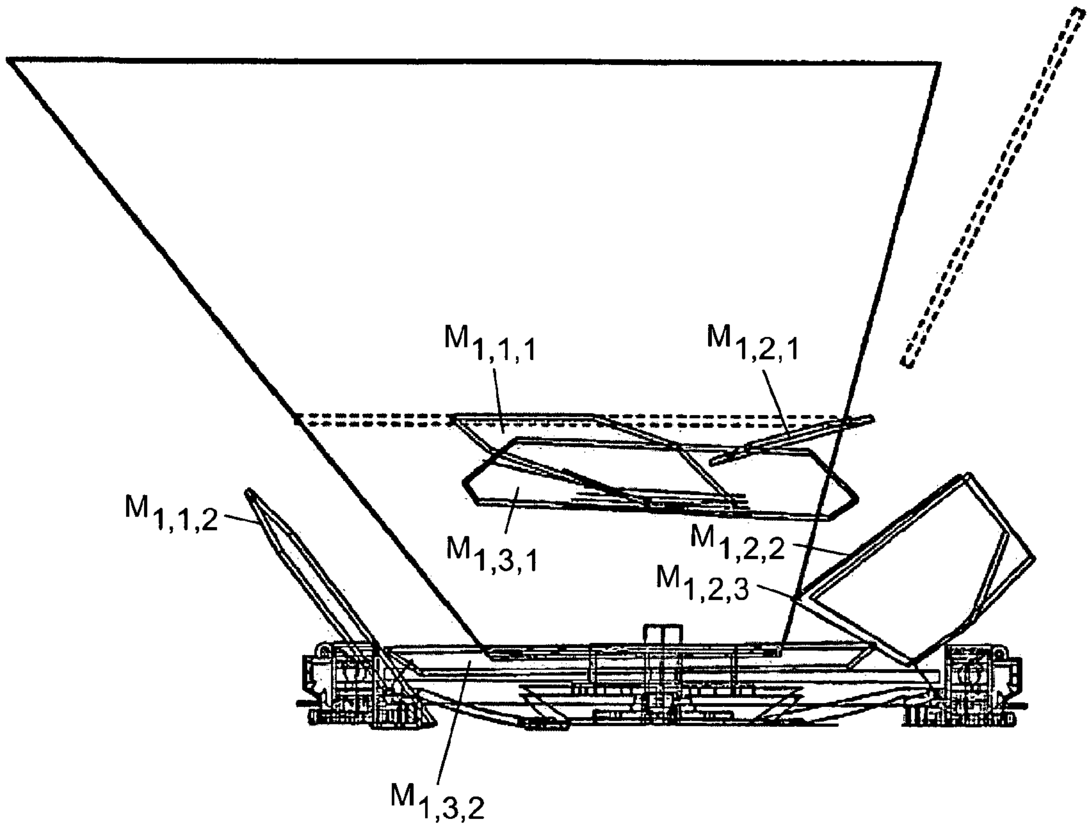
FIG. 5G4

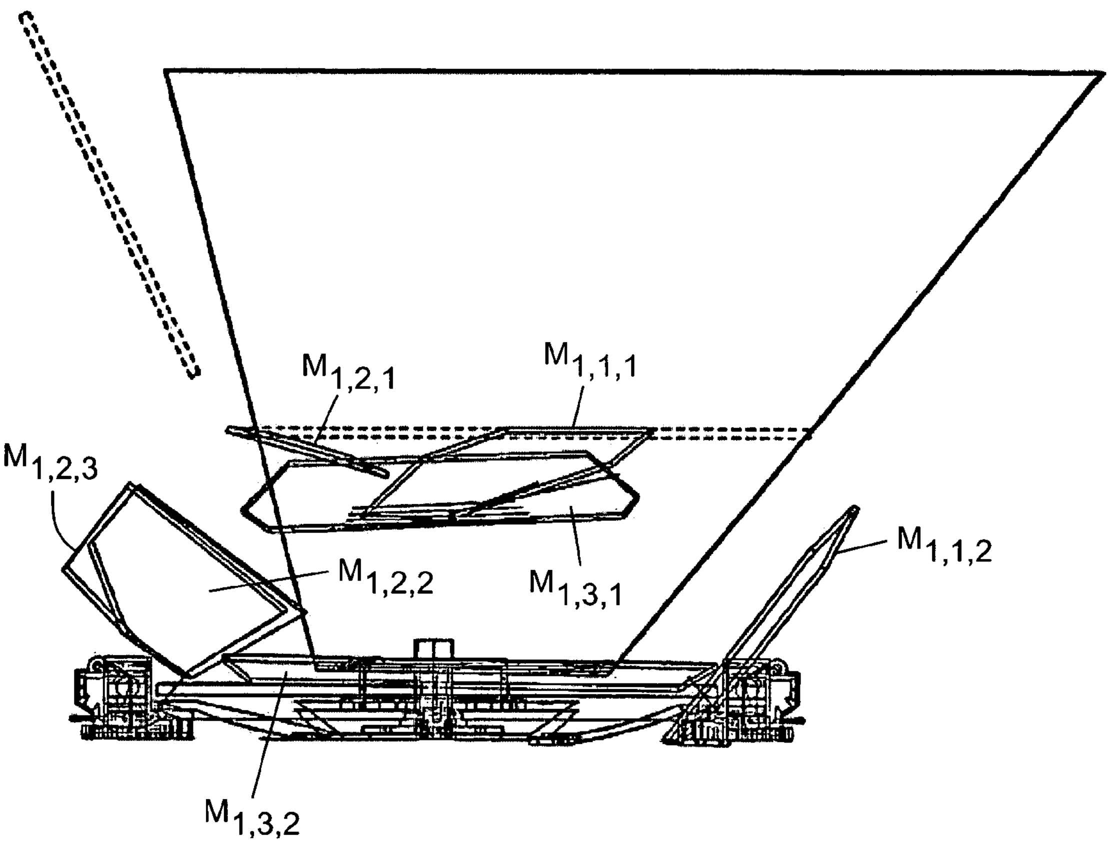
FIG. 5G5

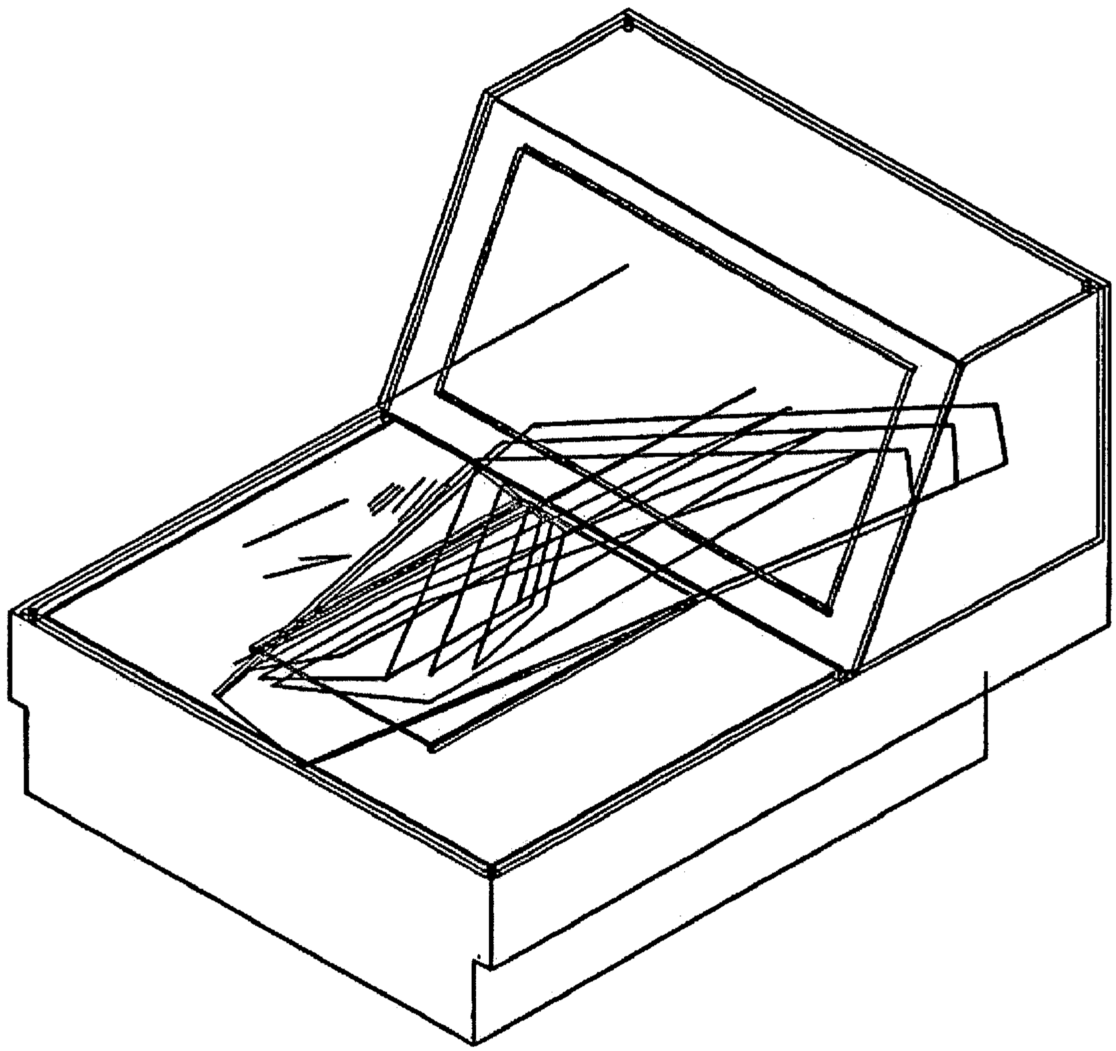
FIG. 5H1

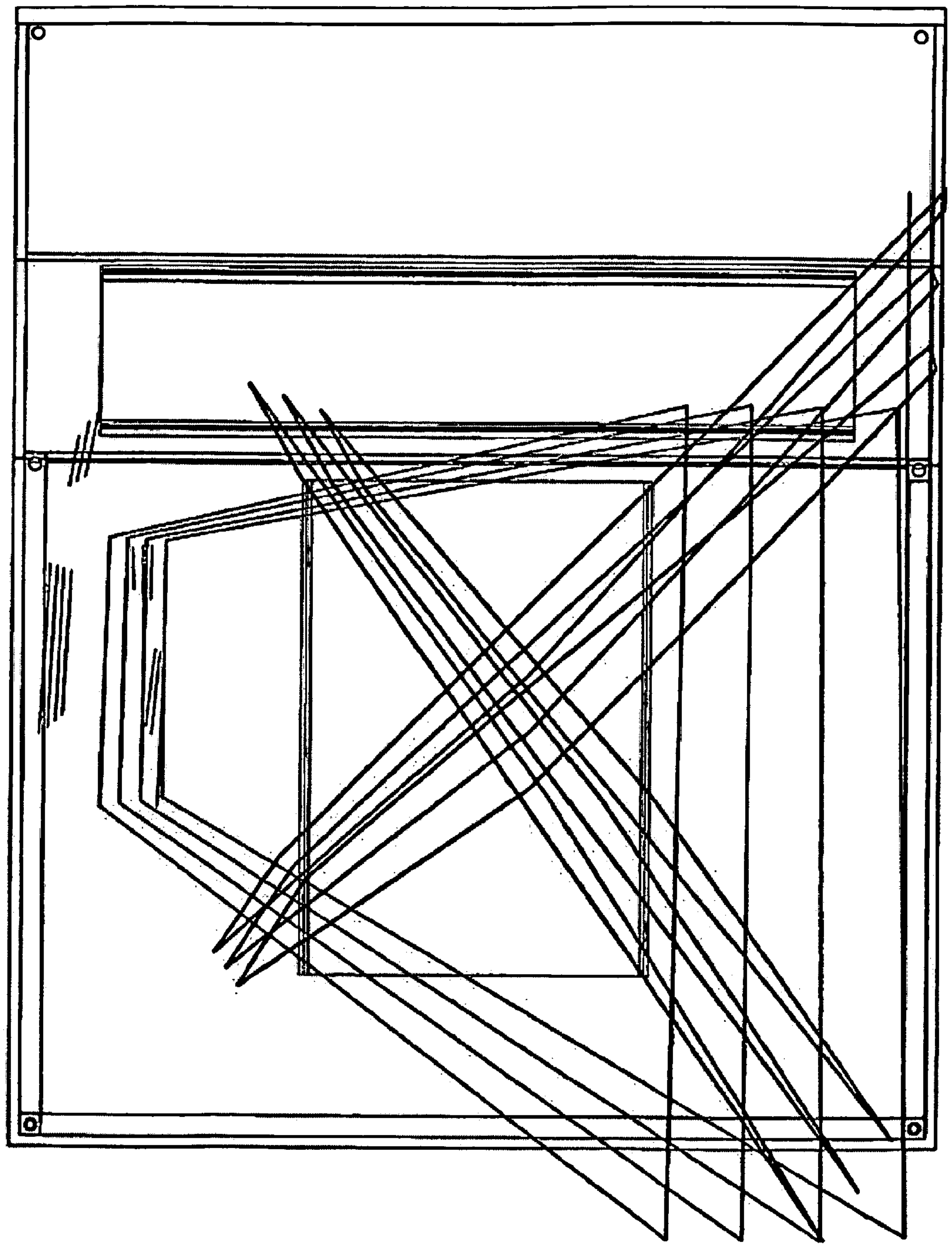
FIG. 5H2

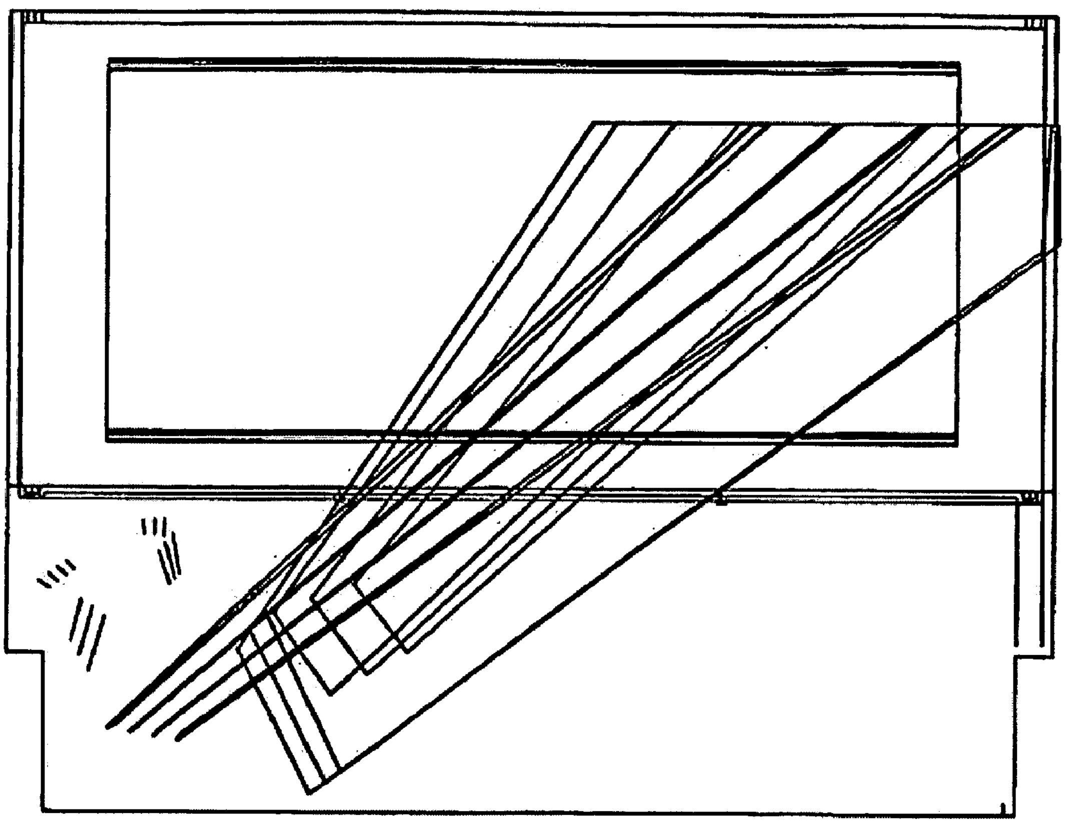
FIG. 5H3

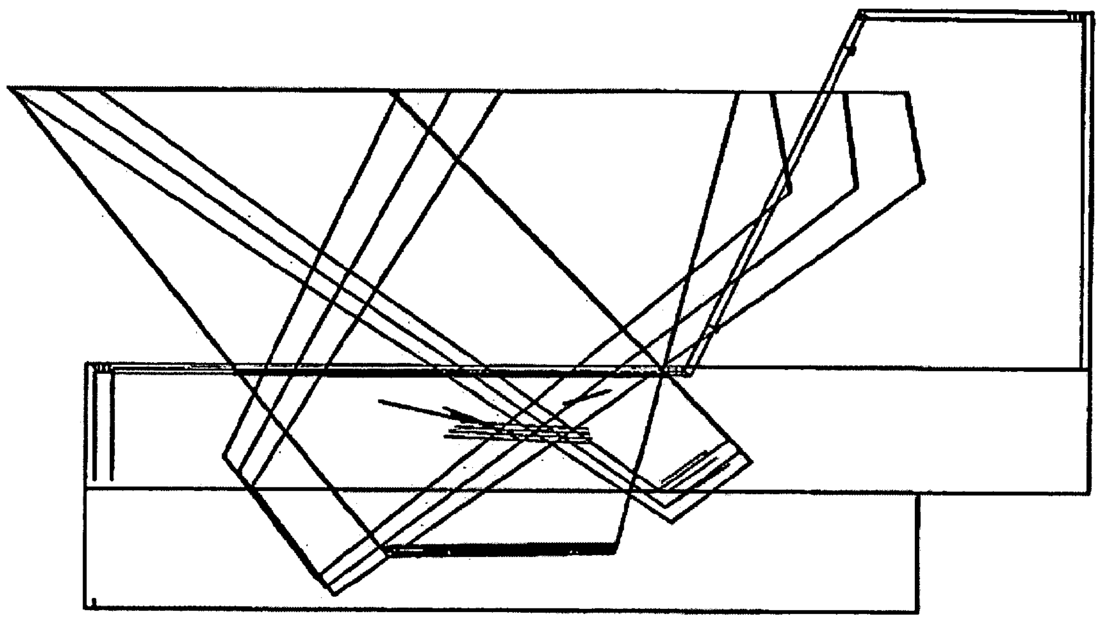
FIG. 5H4

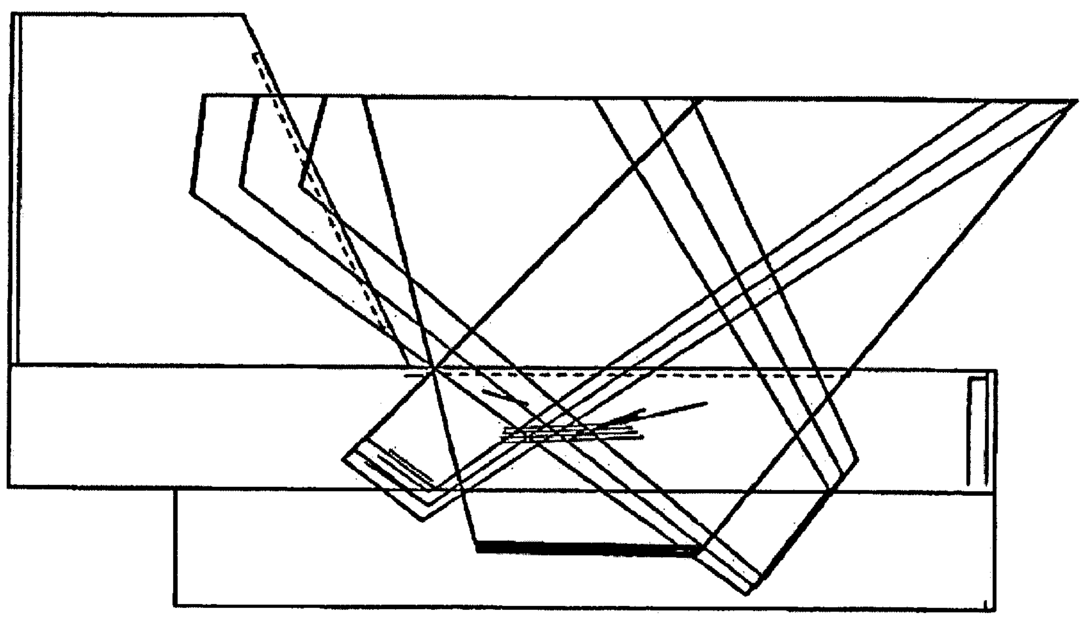
FIG. 5H5

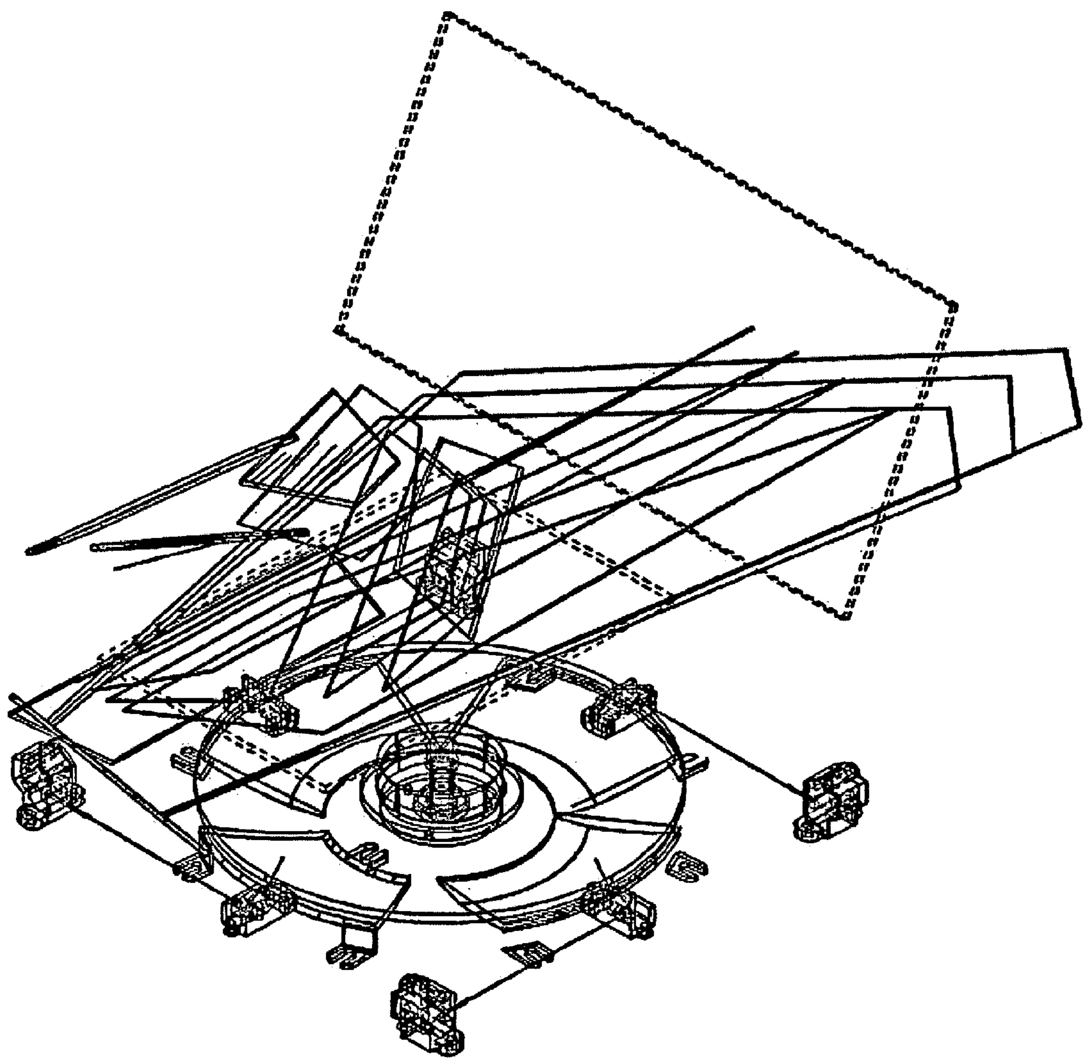
FIG. 5H6

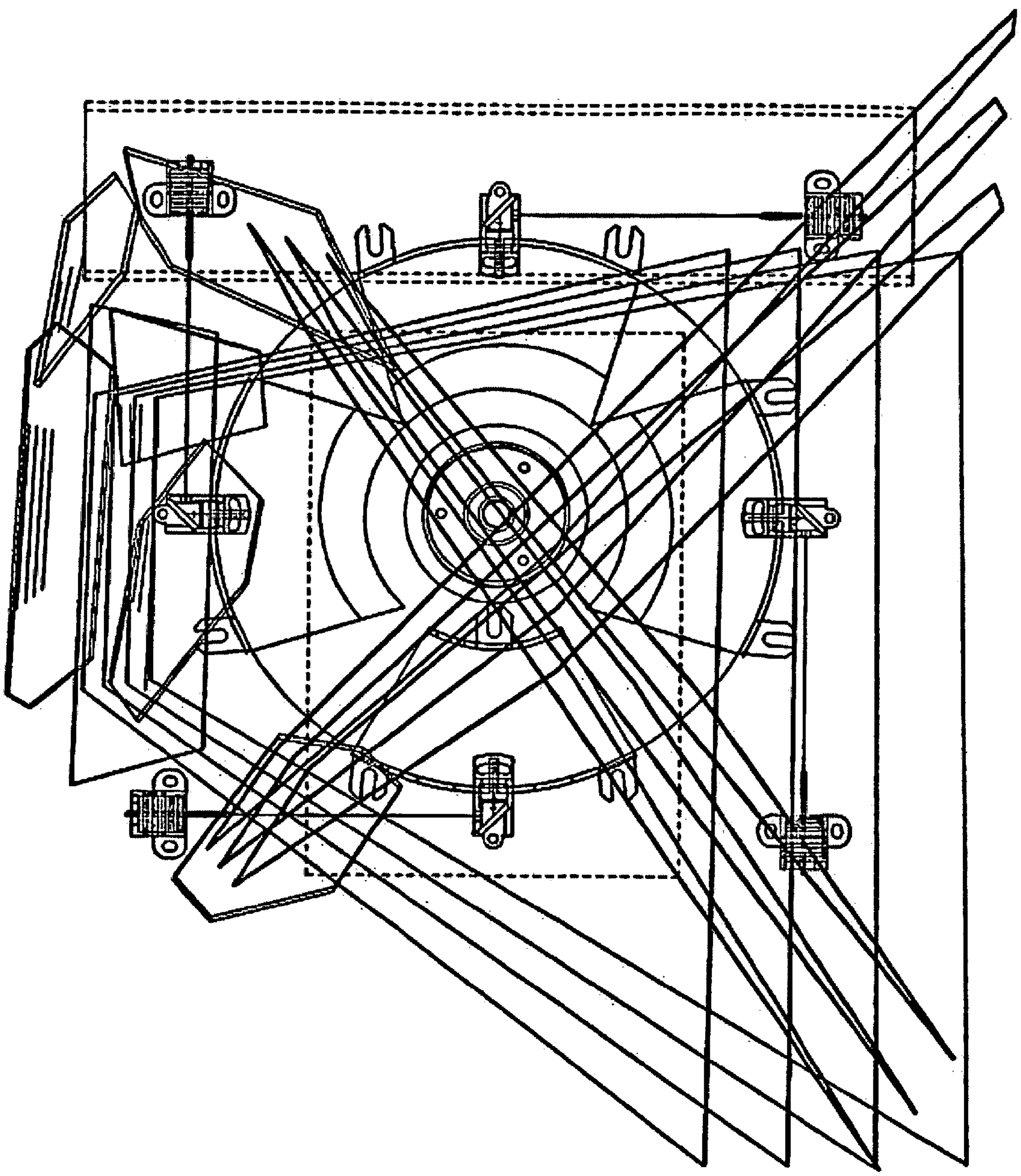
FIG. 5H7

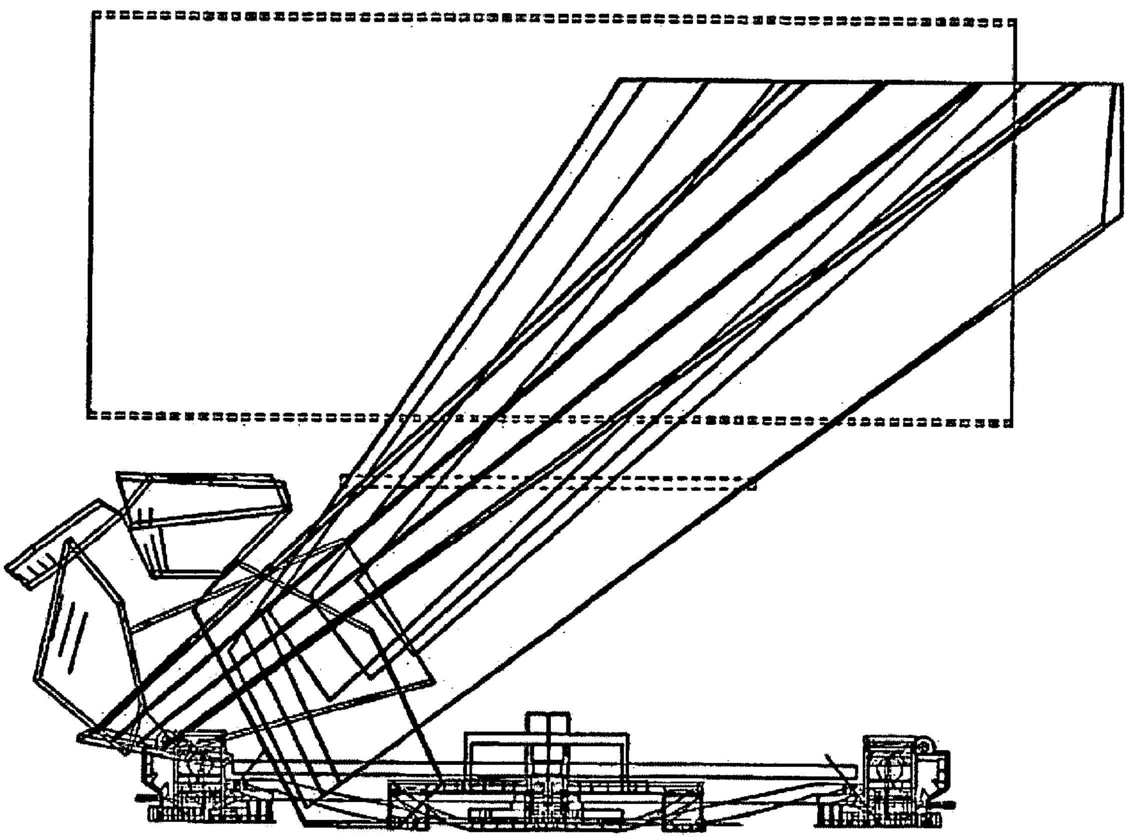
FIG. 5H8

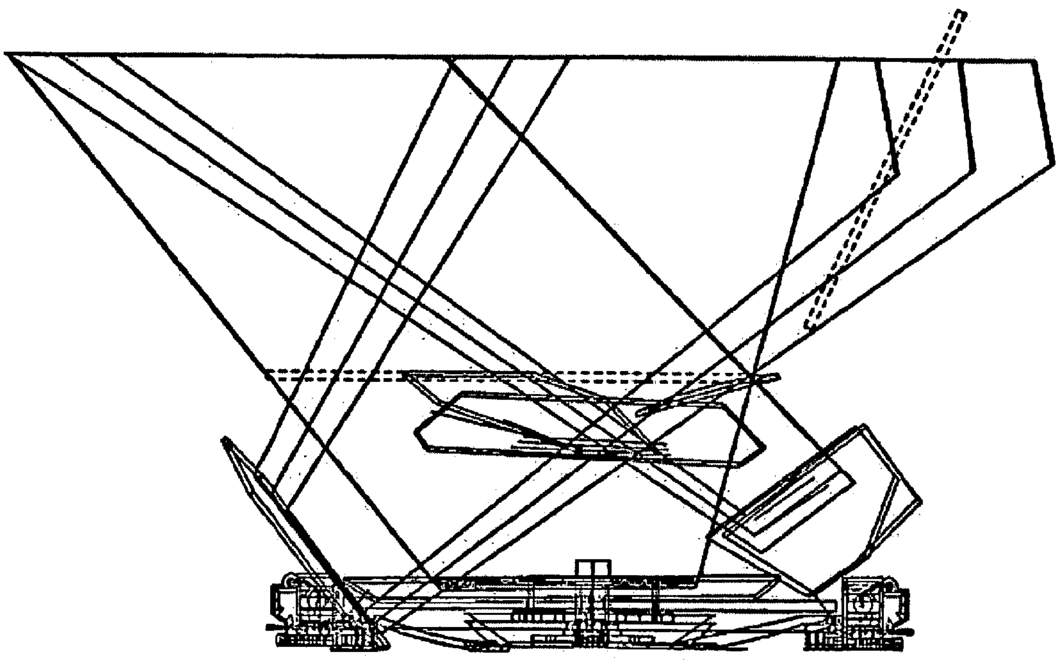
FIG. 5H9

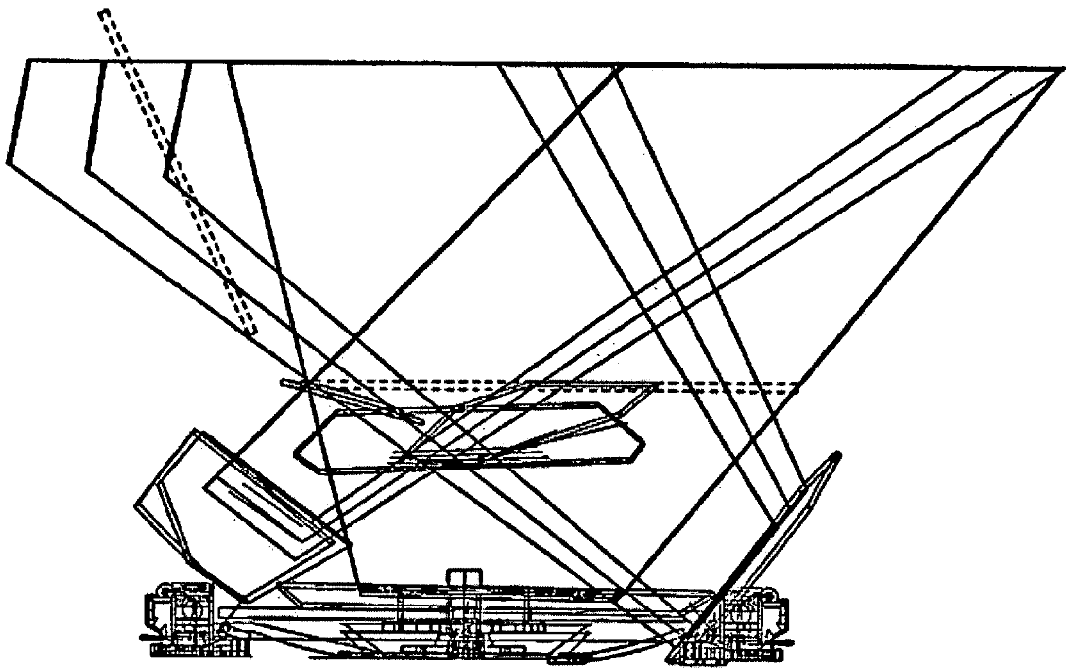
FIG. 5H10

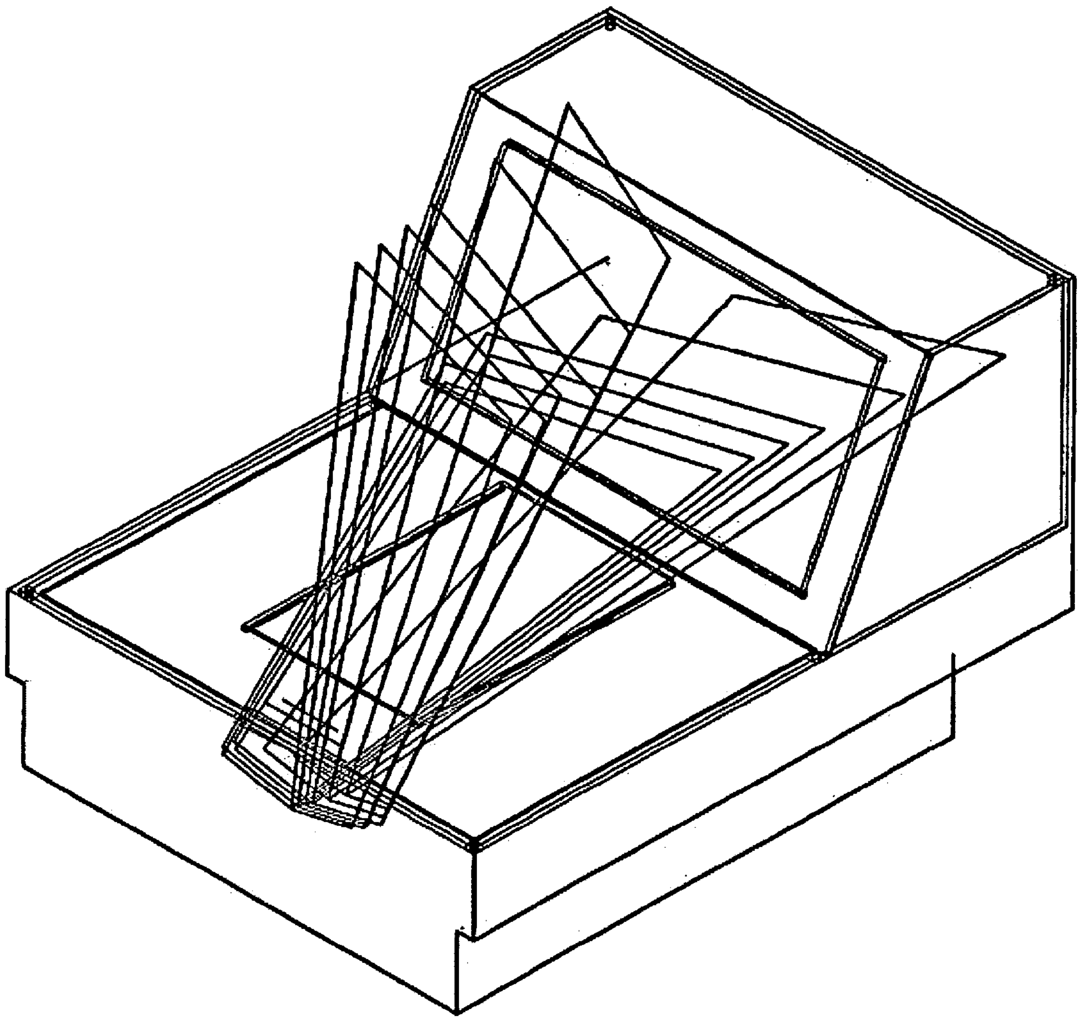
FIG. 5I1

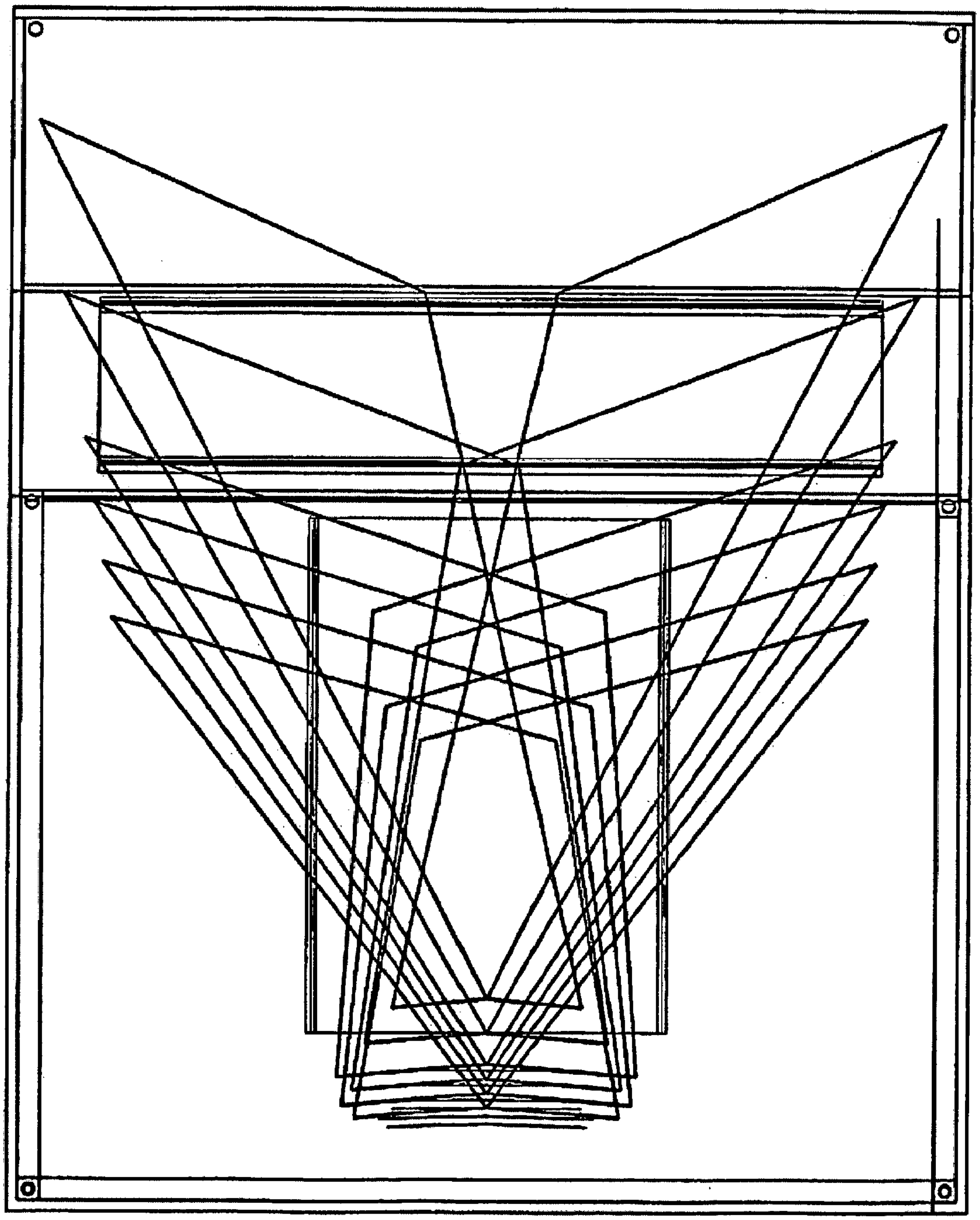
FIG. 5I2

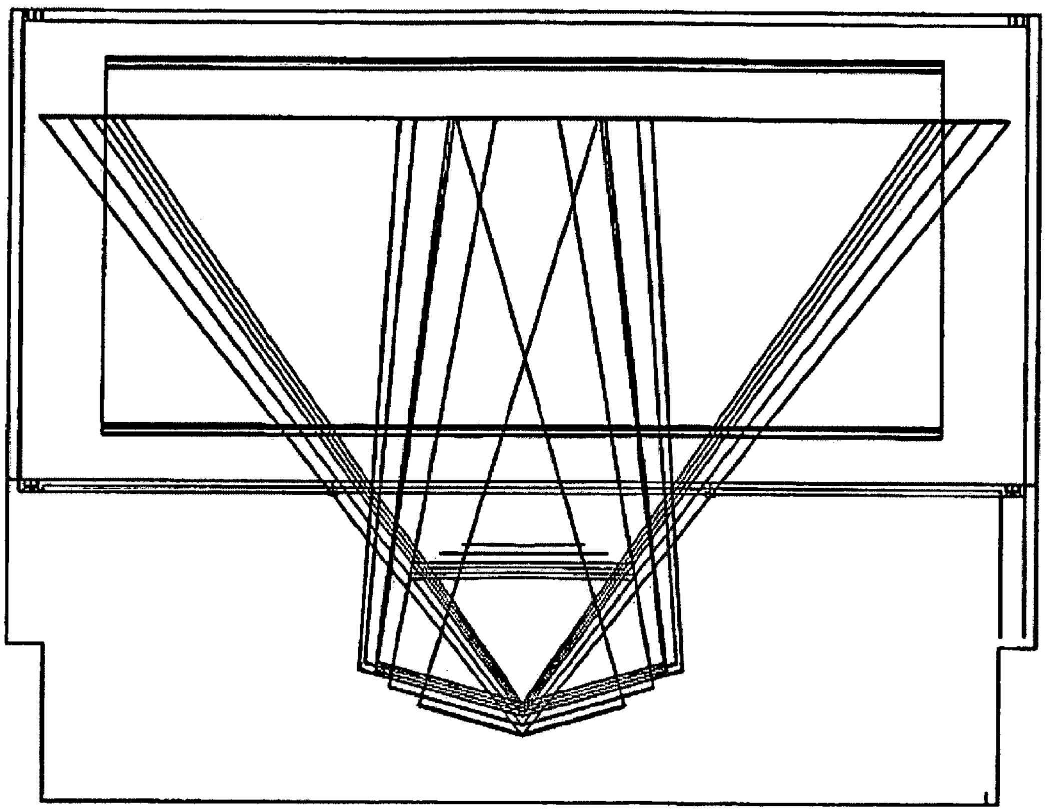
FIG. 5I3

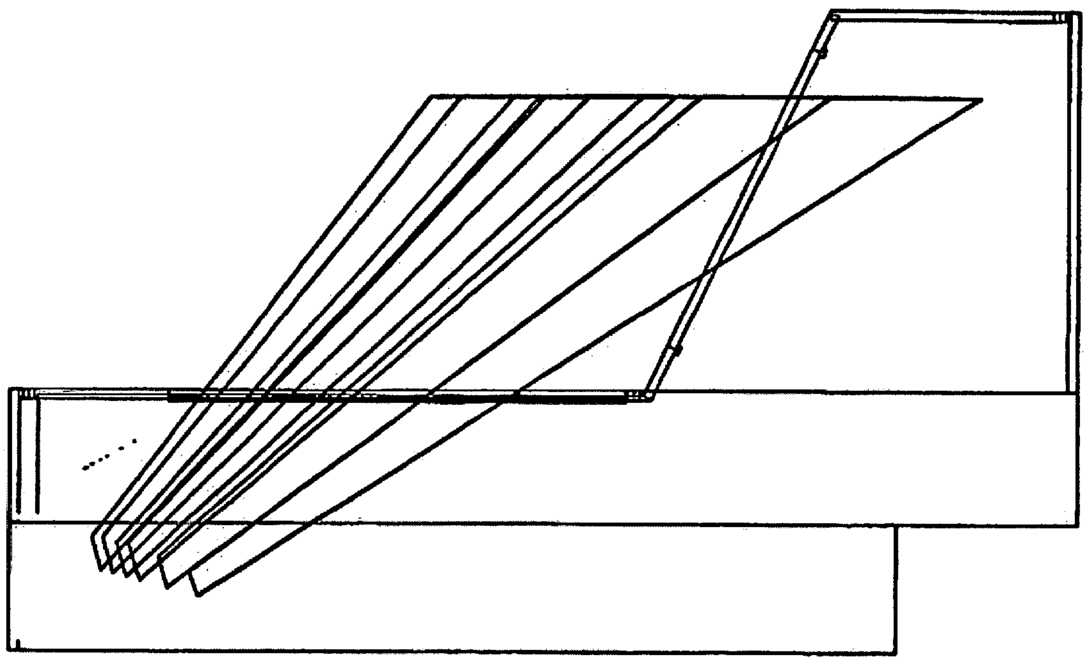
FIG. 5I4

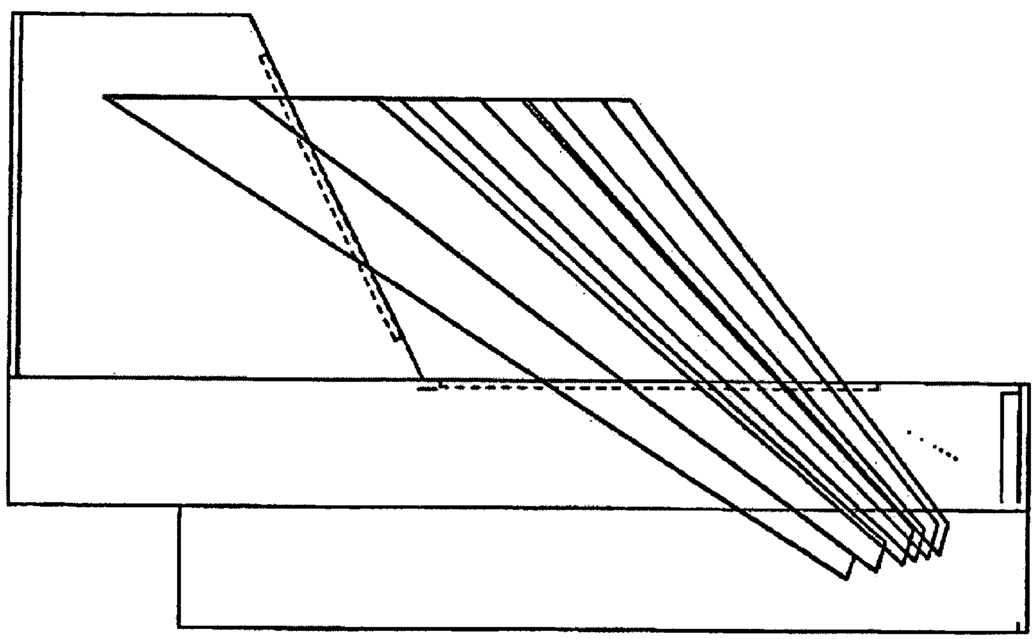
FIG. 5I5

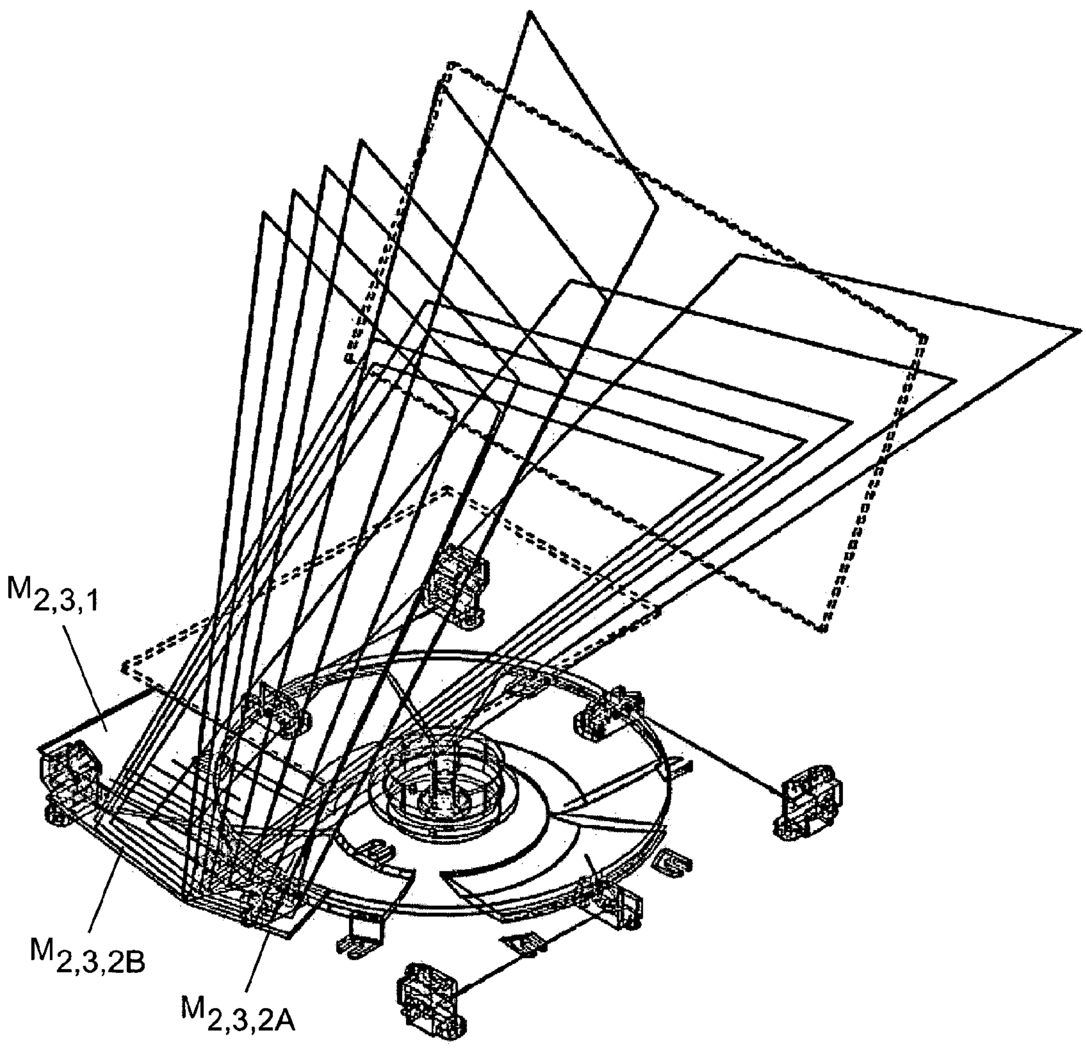
FIG. 5J1

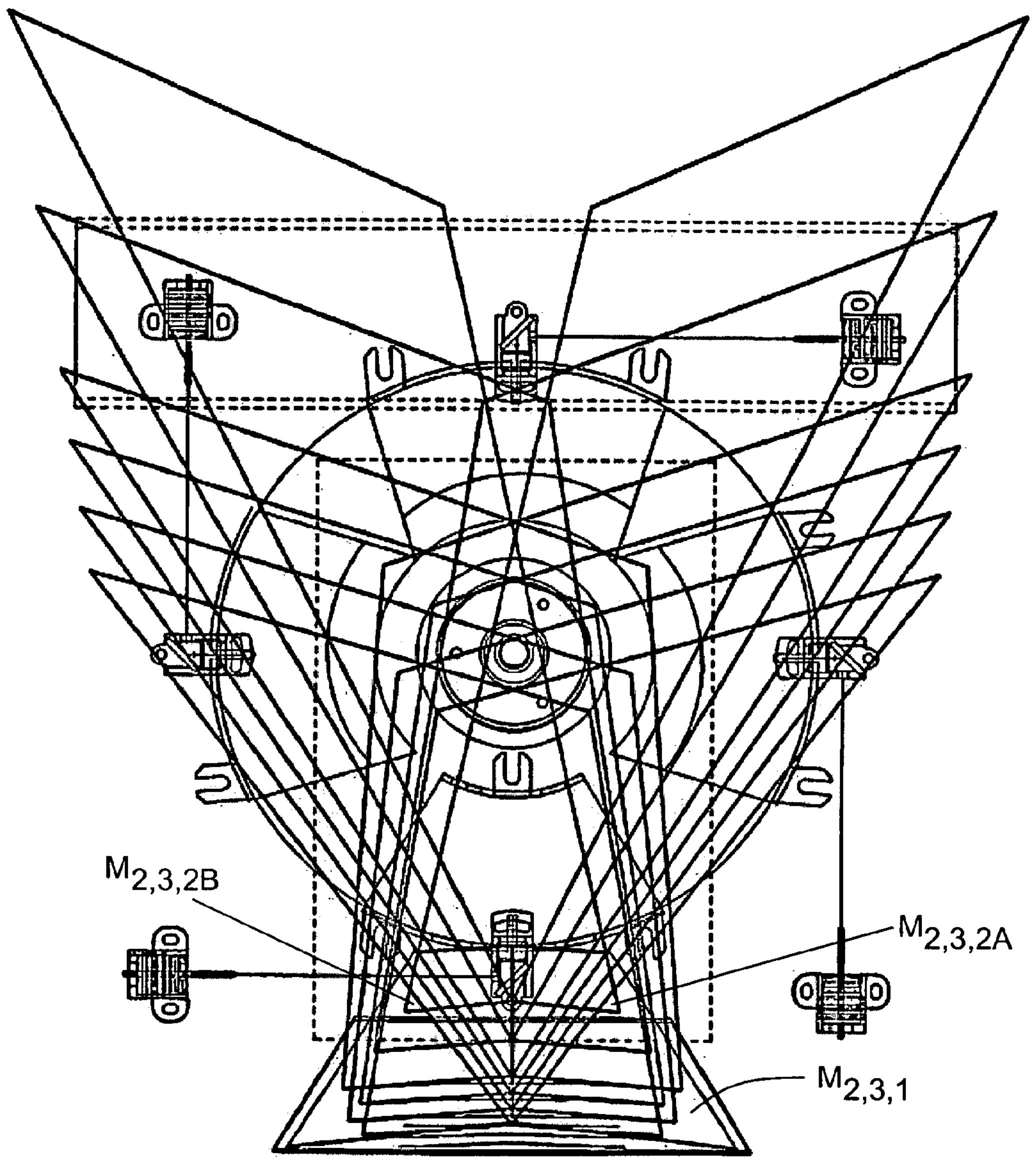
FIG. 5J2

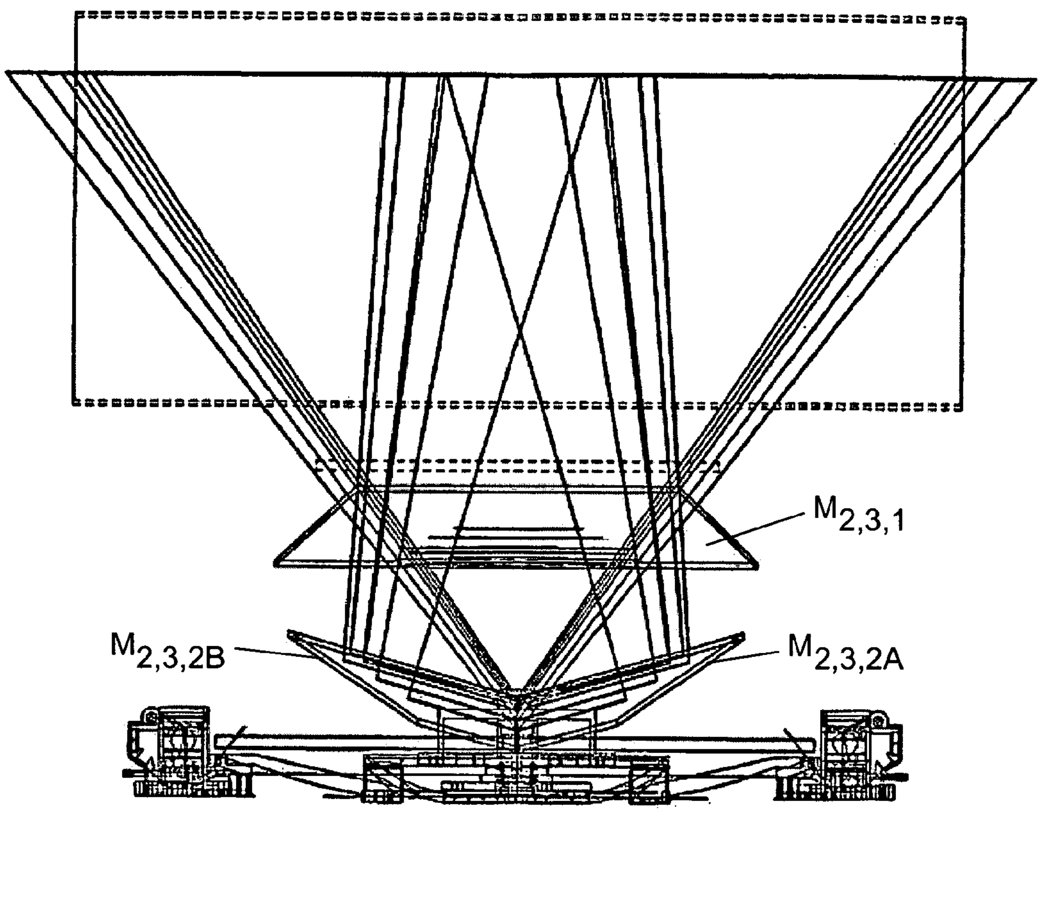
FIG. 5J3

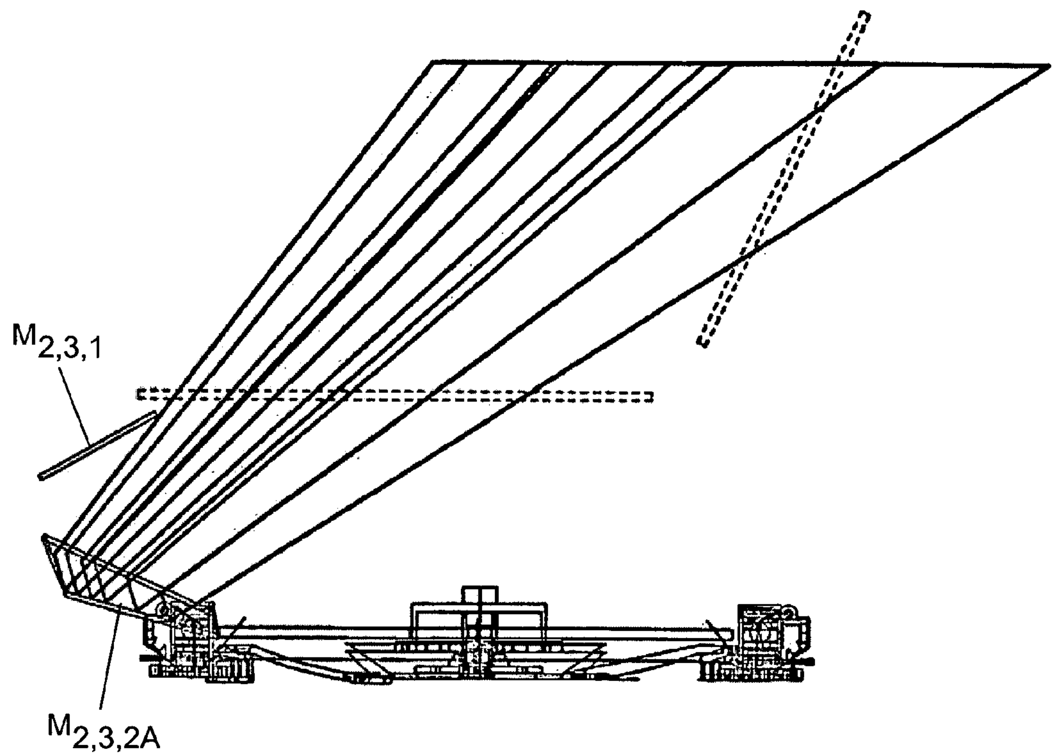
FIG. 5J4

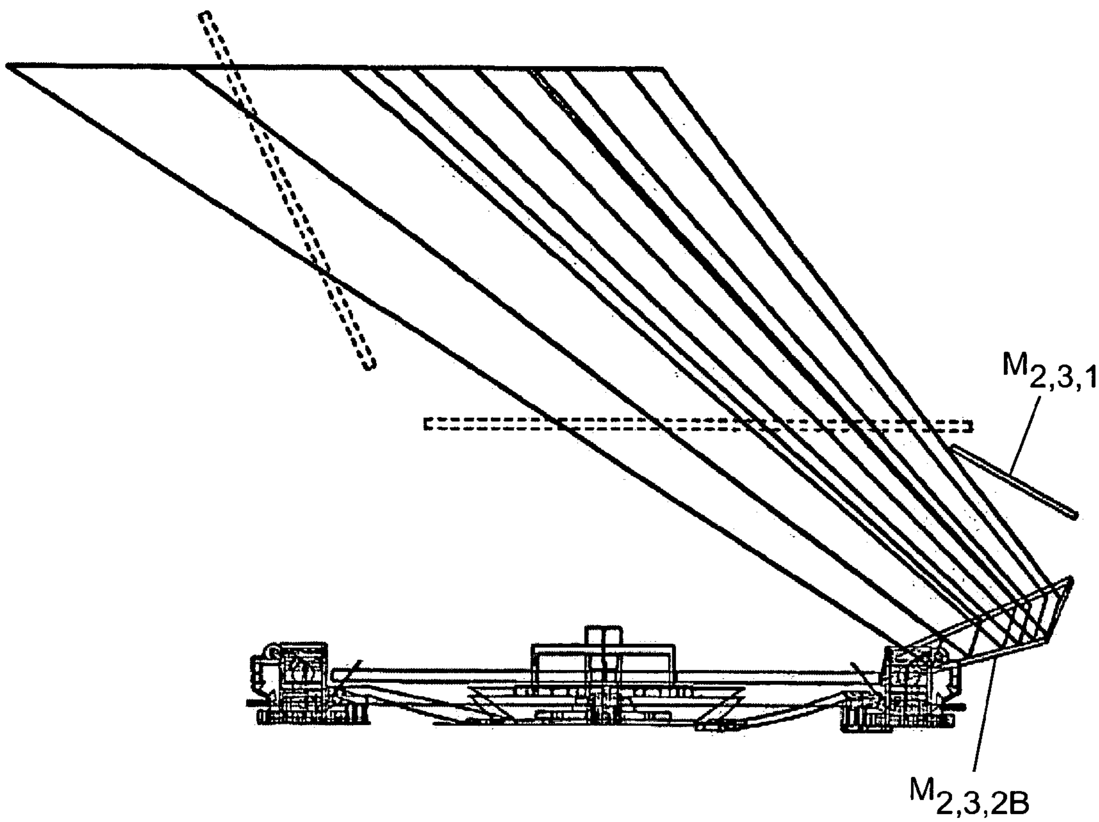
FIG. 5J5

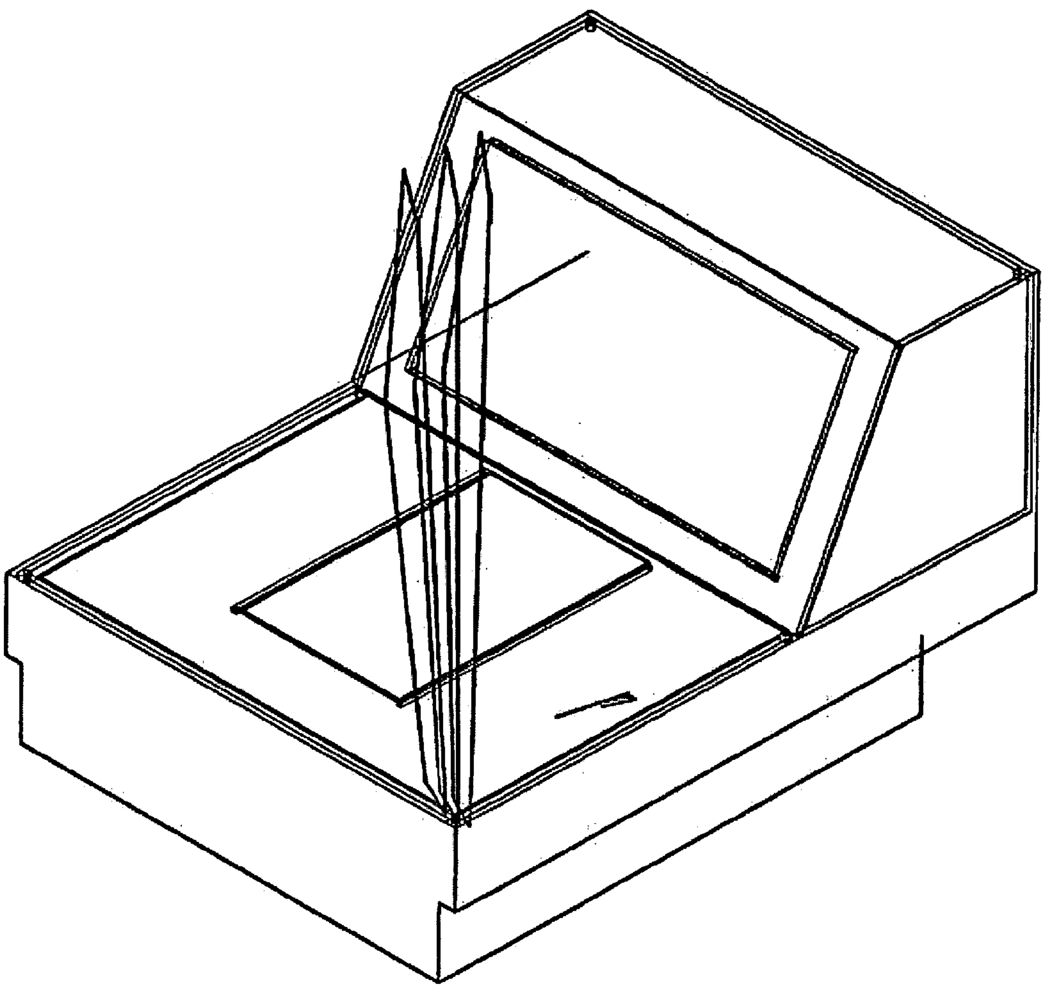
FIG. 5K1

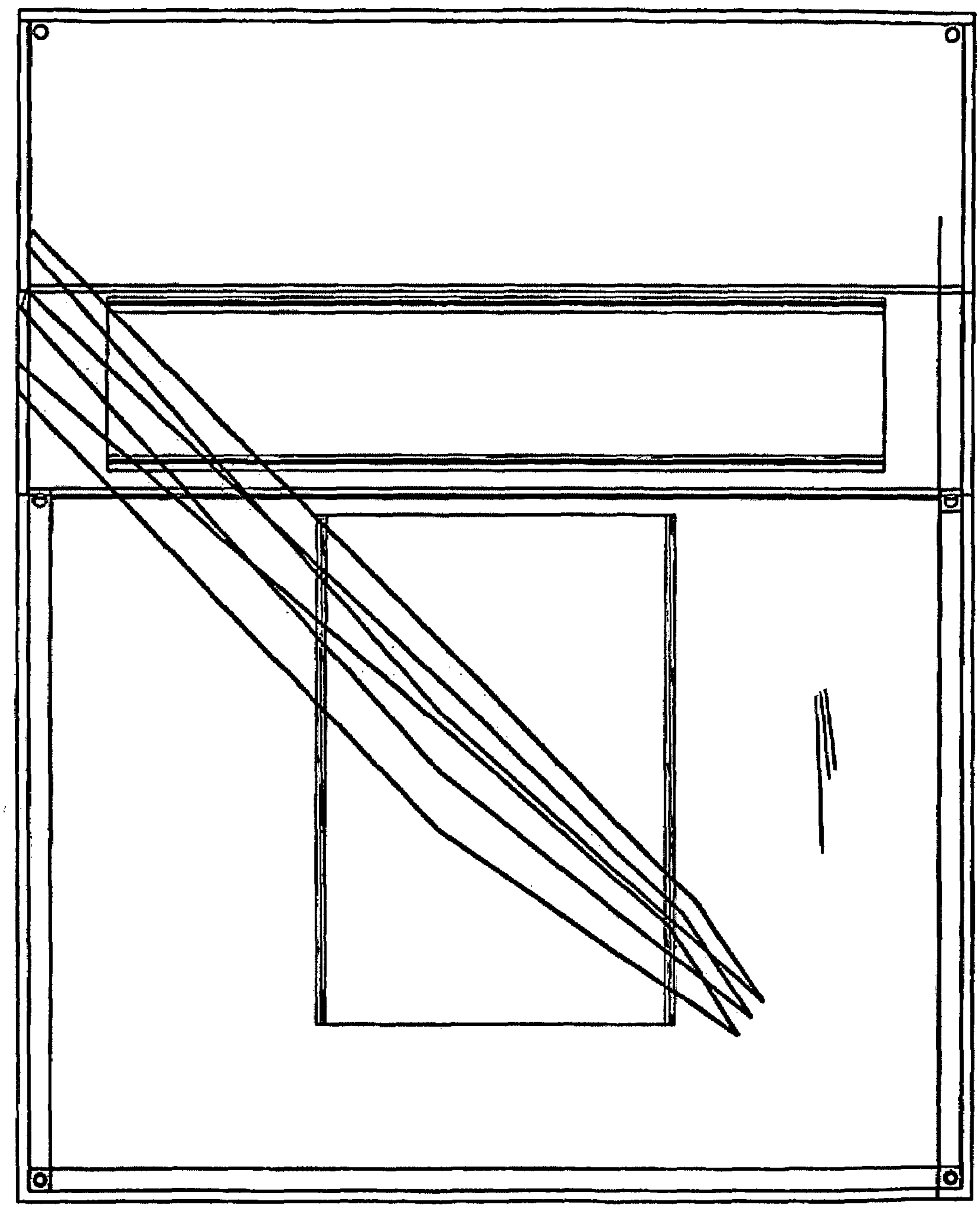
FIG. 5K2

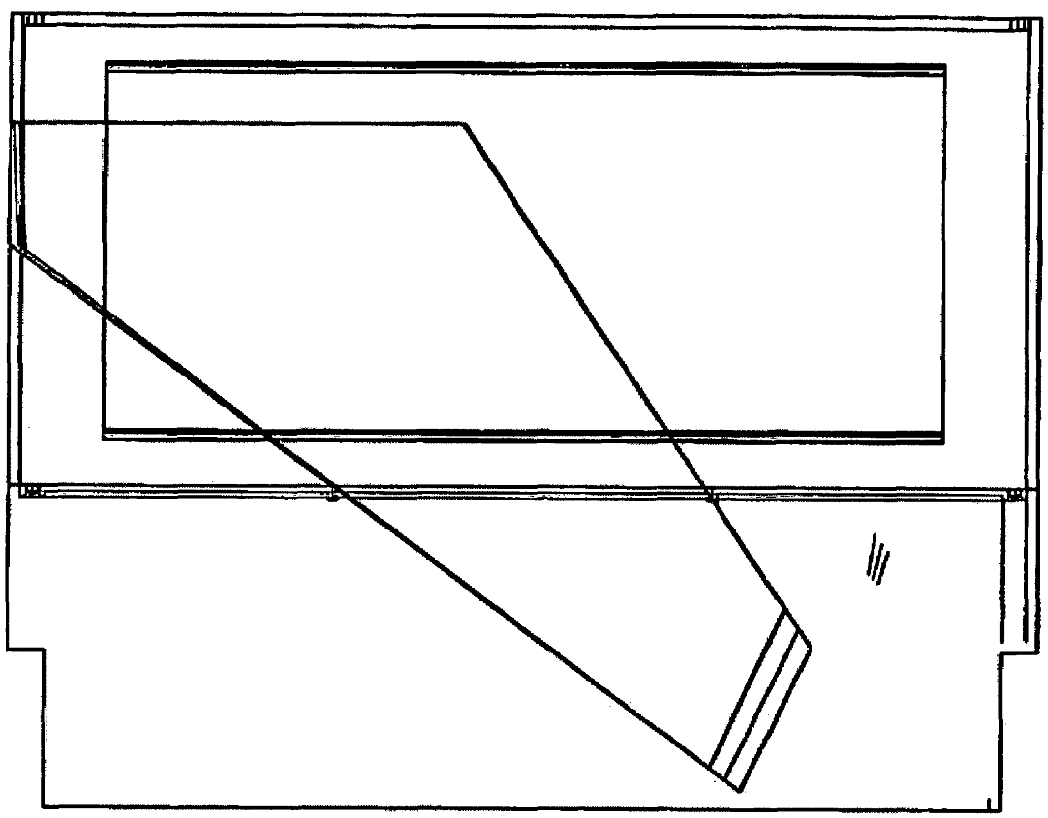
FIG. 5K3

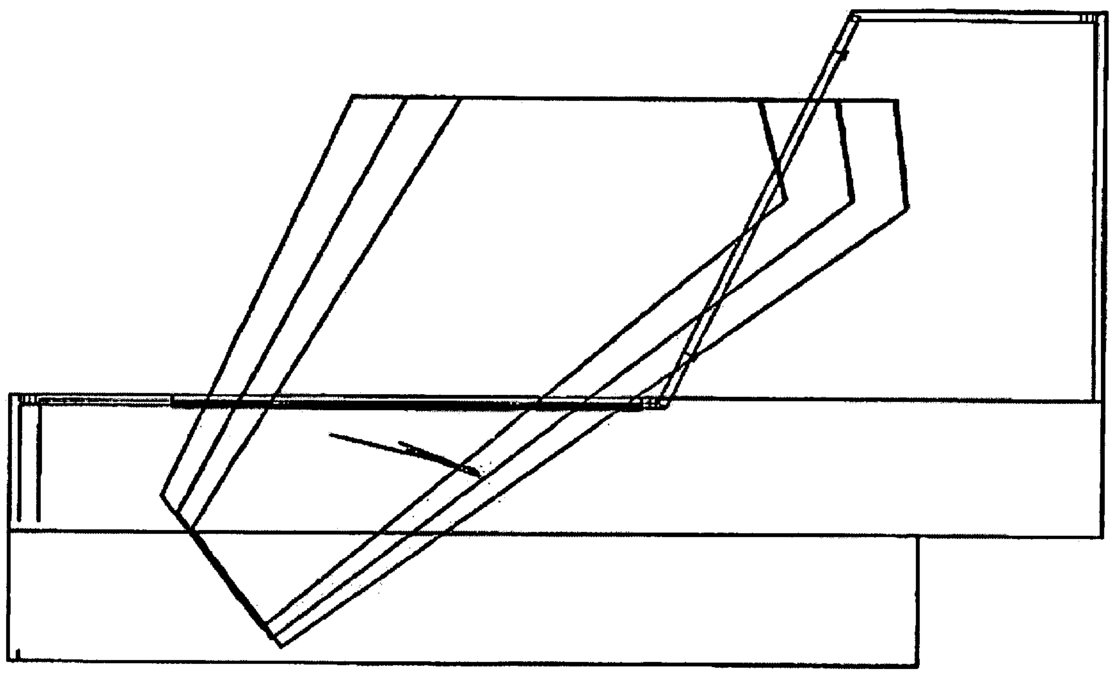
FIG. 5K4

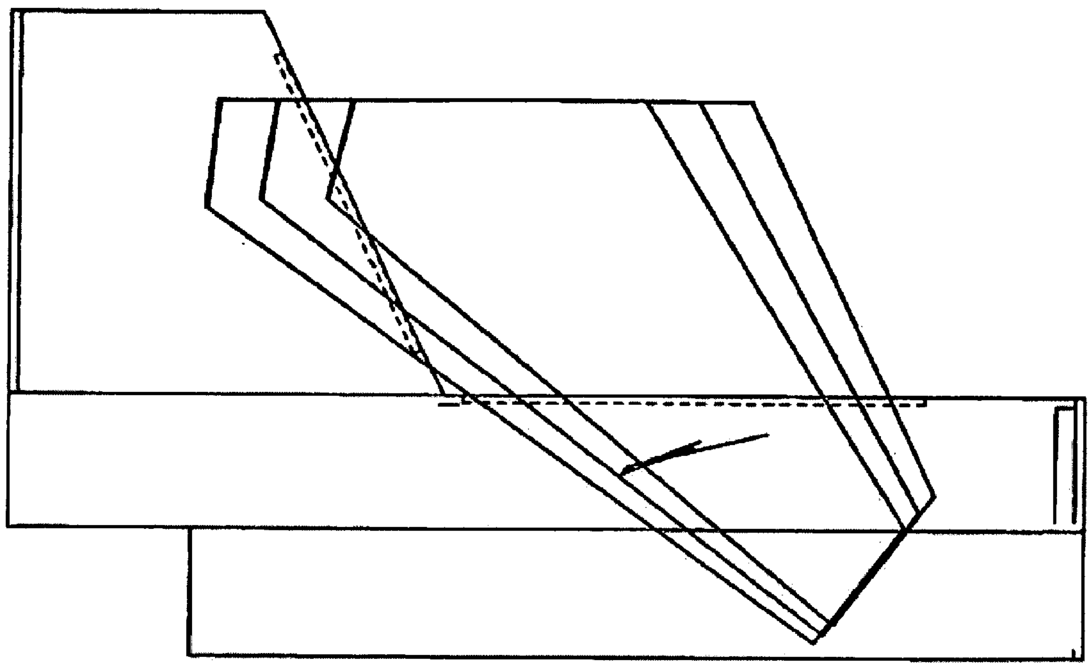
FIG. 5K5

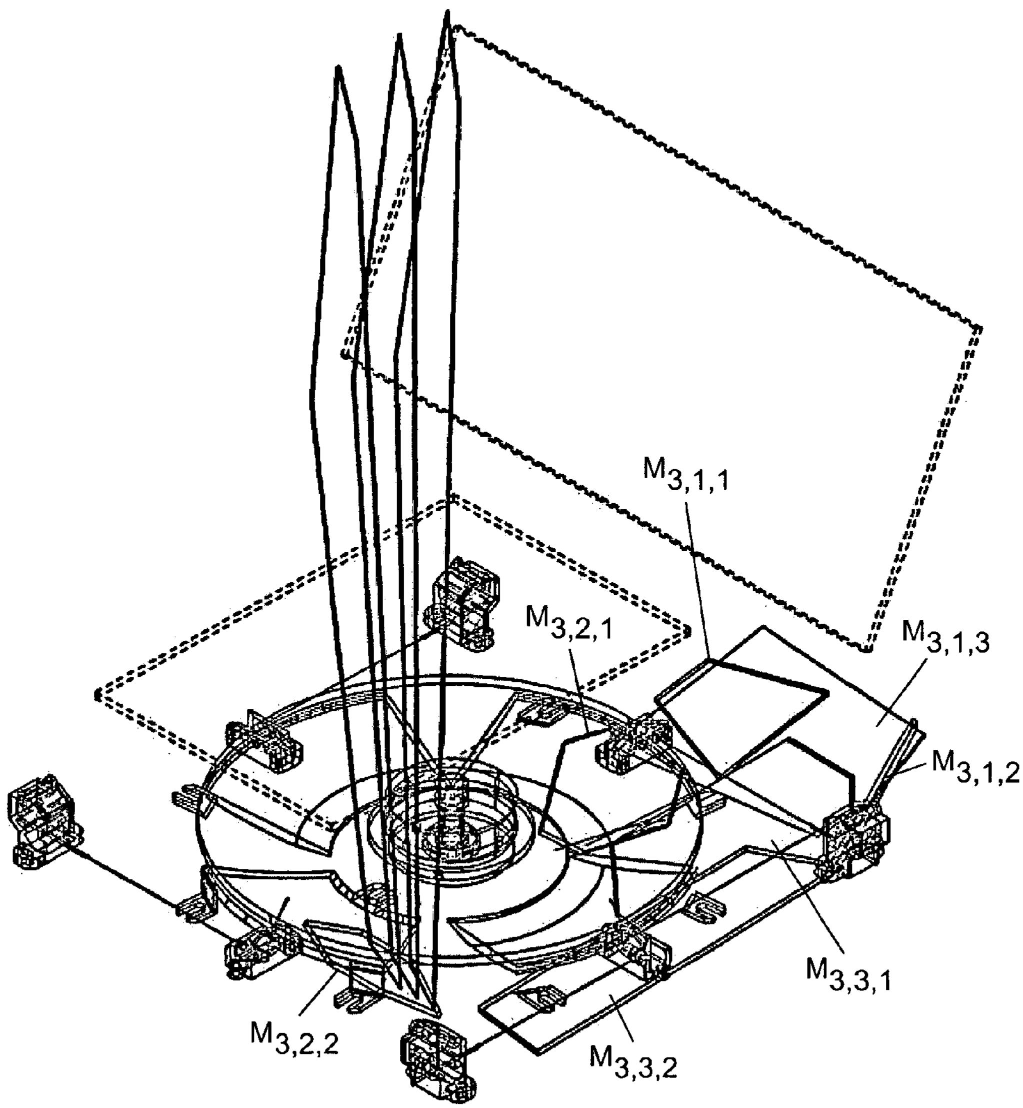
FIG. 5L1

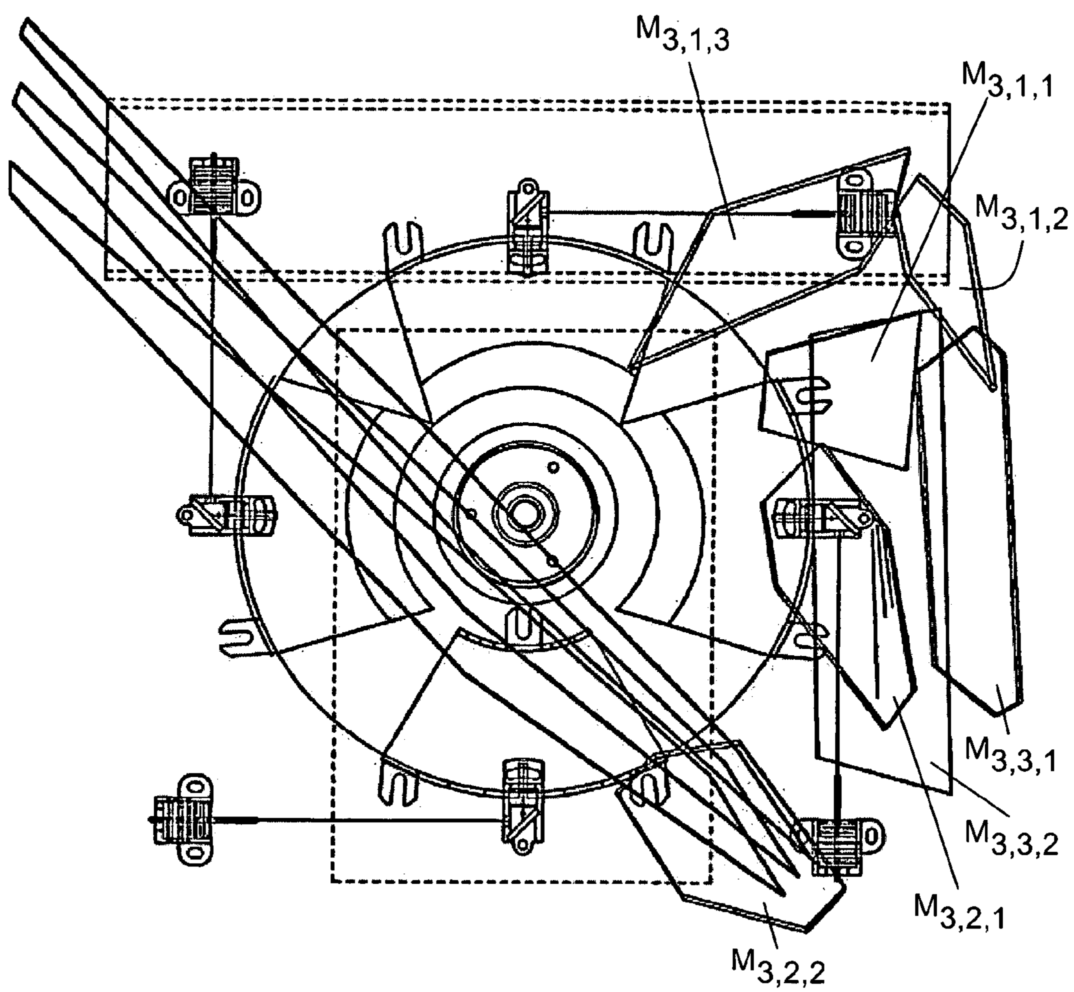
FIG. 5L2

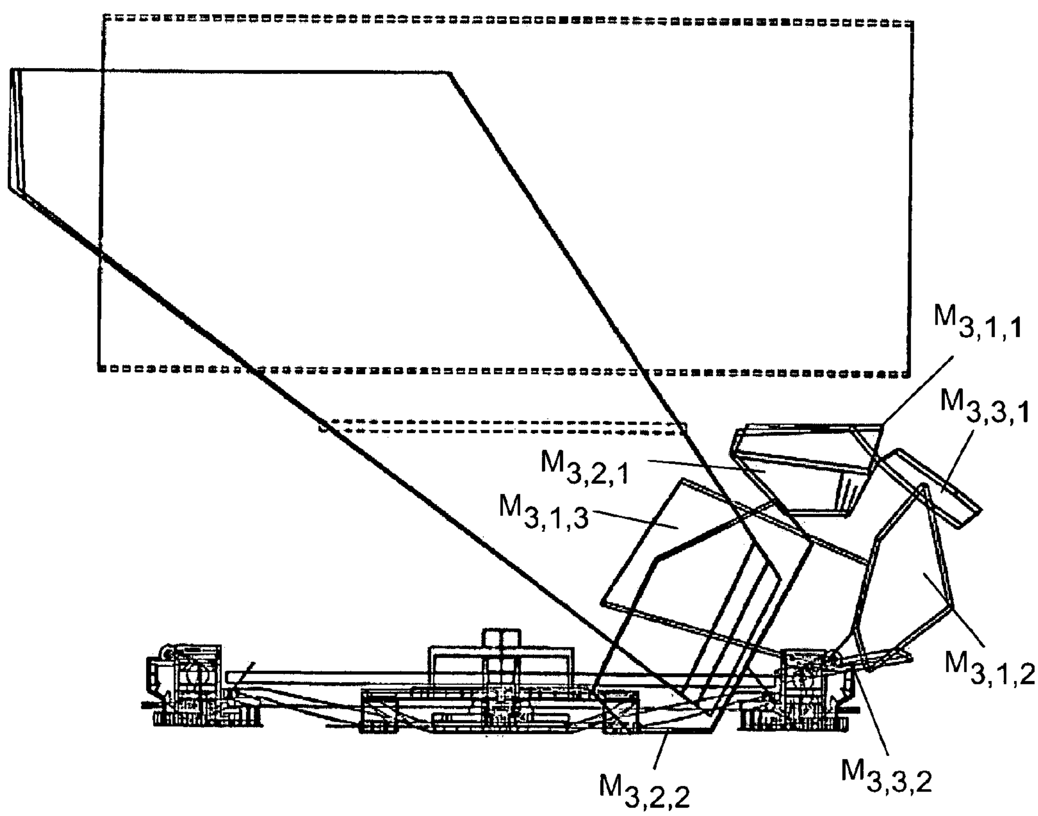
FIG. 5L3

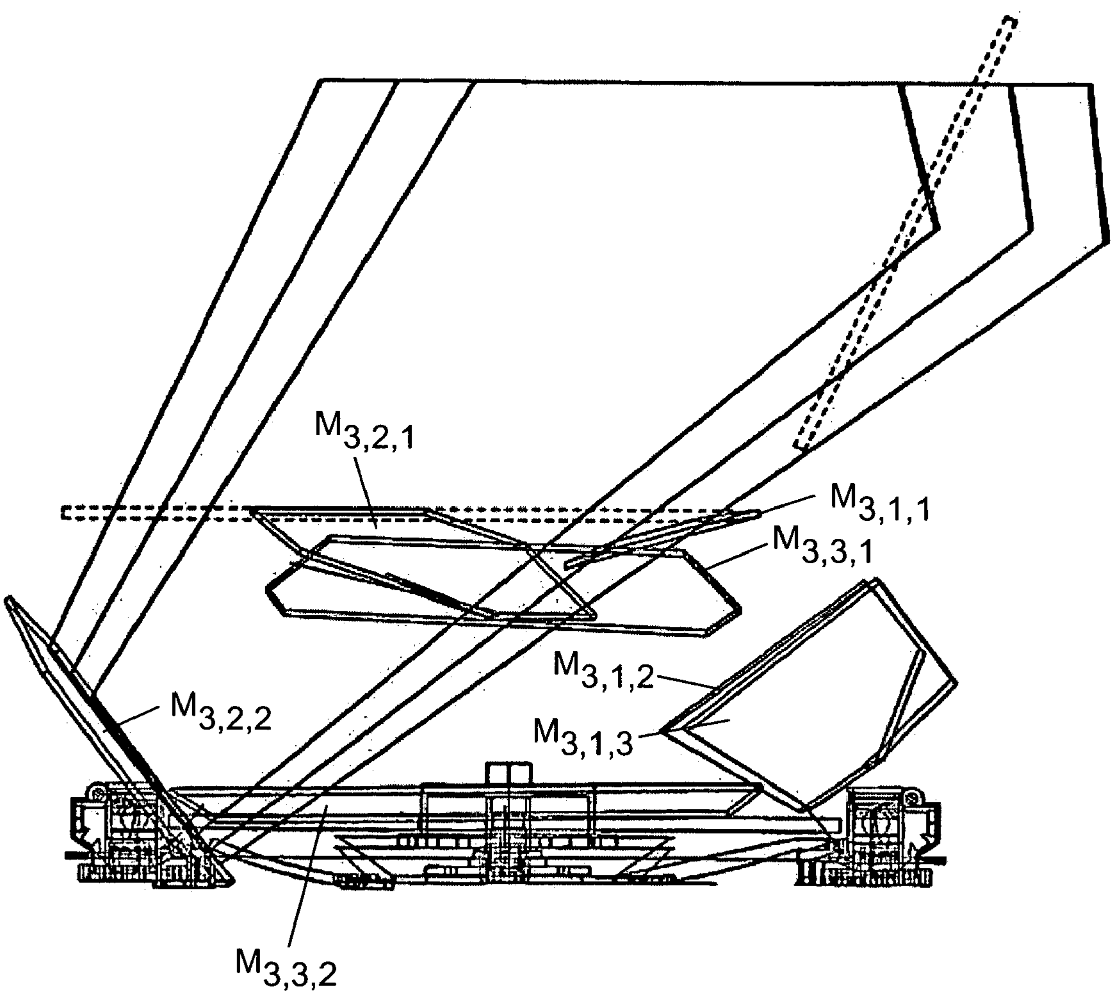
FIG. 5L4

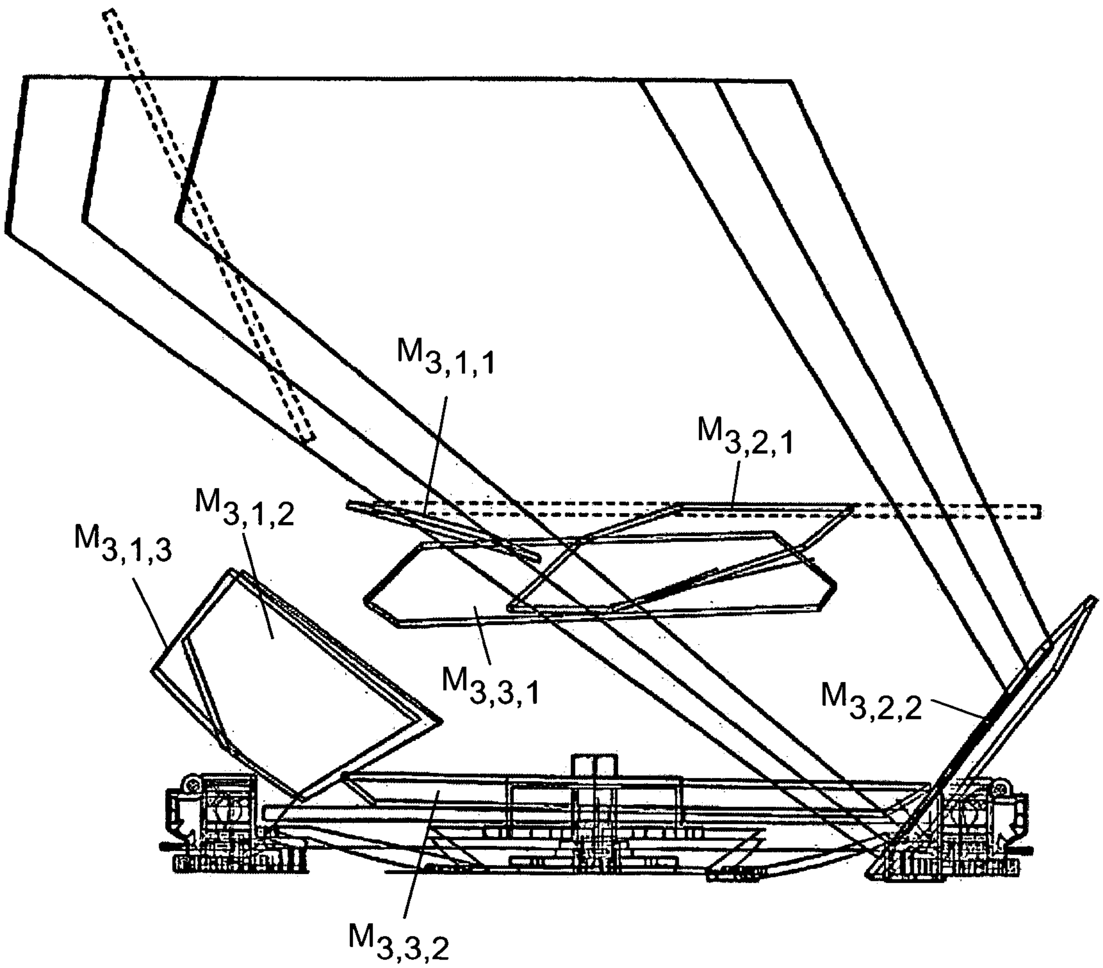
FIG. 5L5

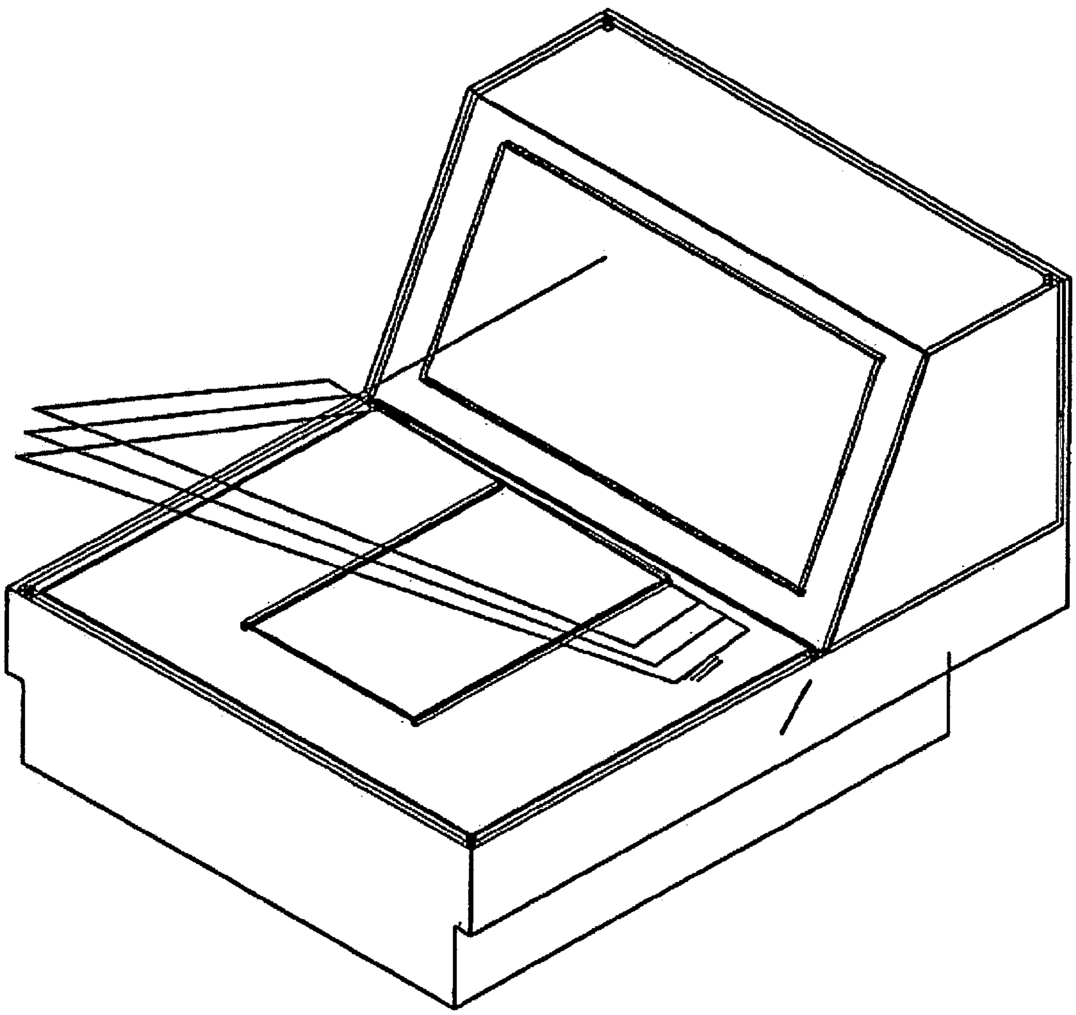
FIG. 5M1

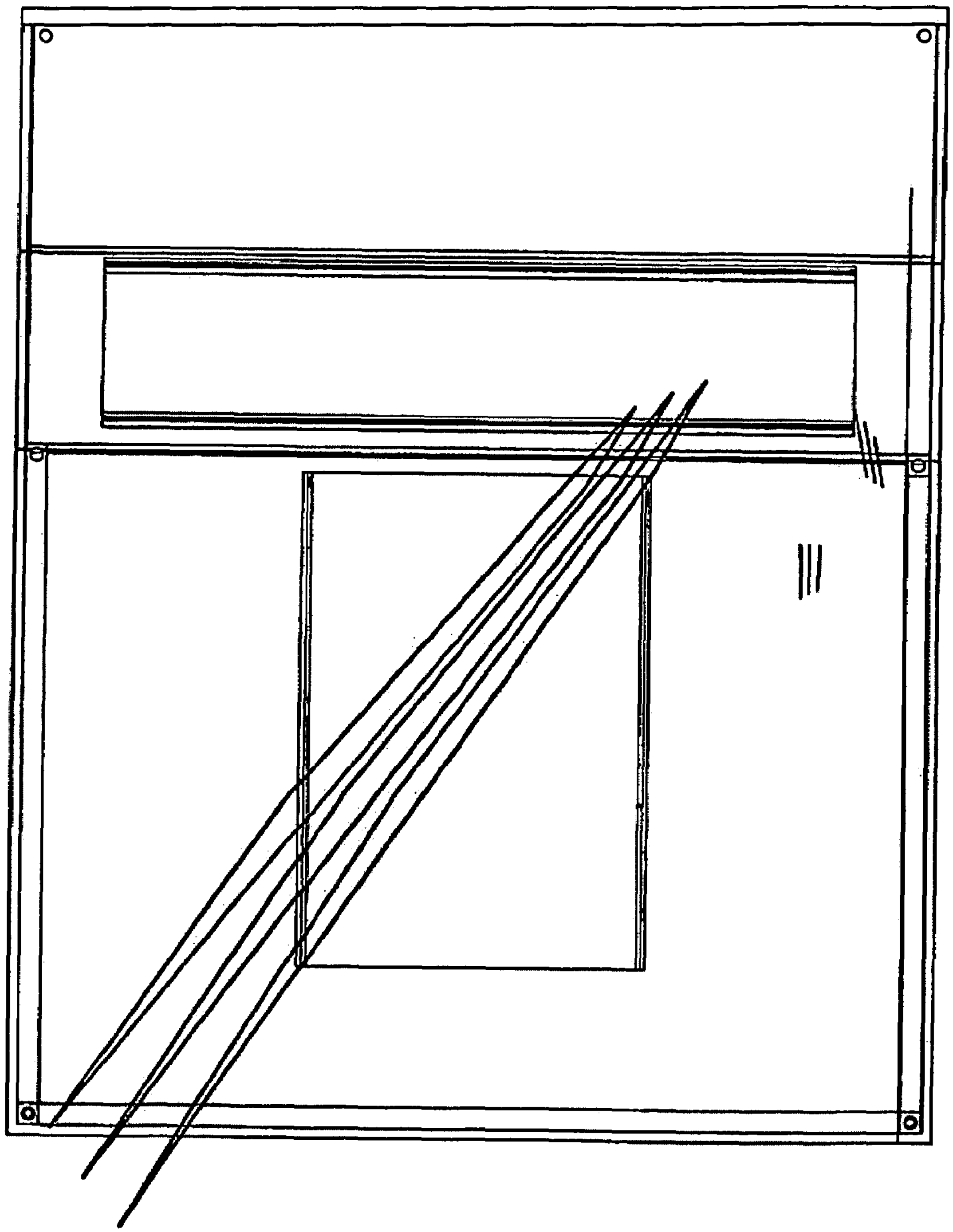
FIG. 5M2

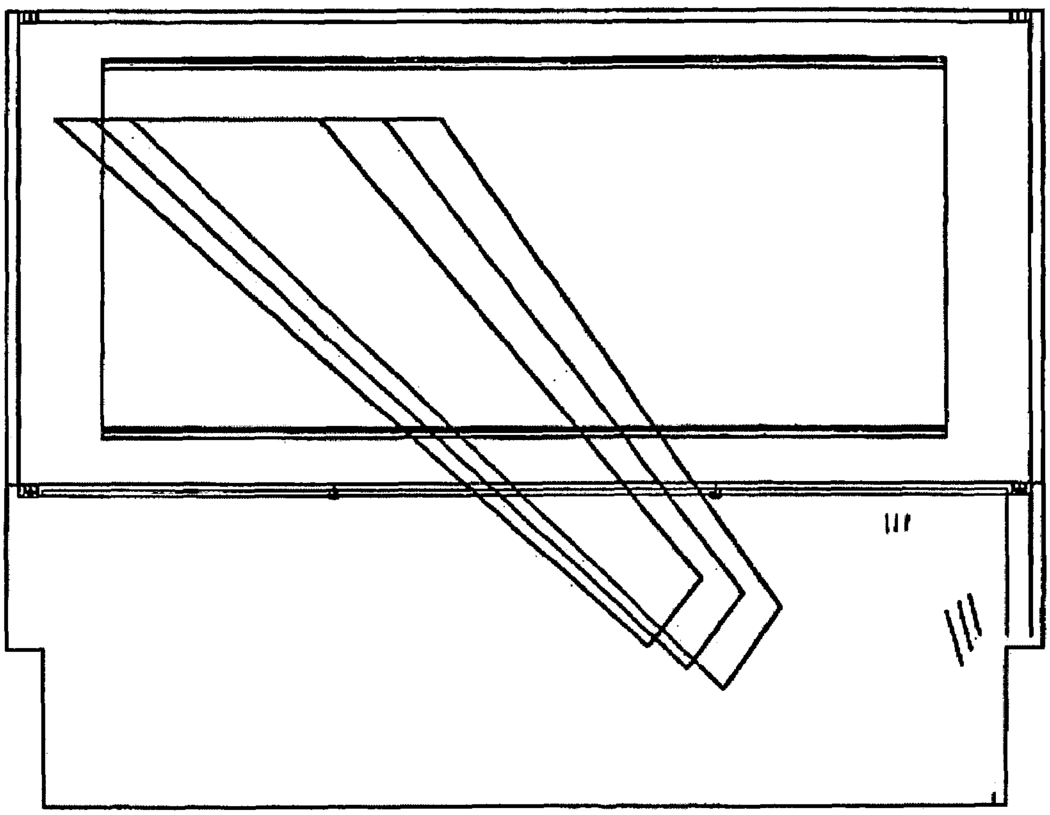
FIG. 5M3

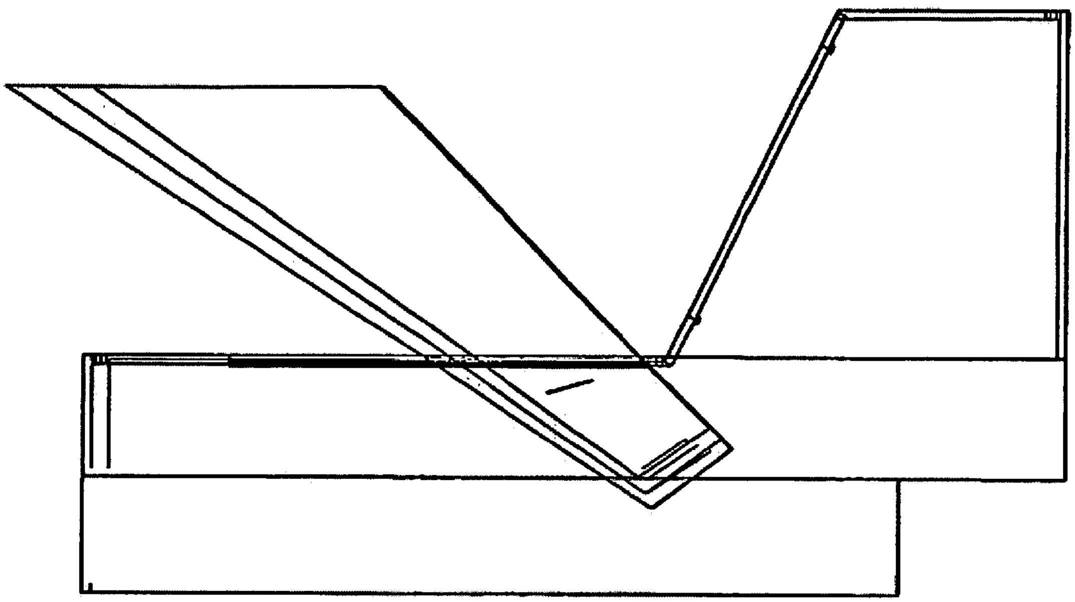
FIG. 5M4

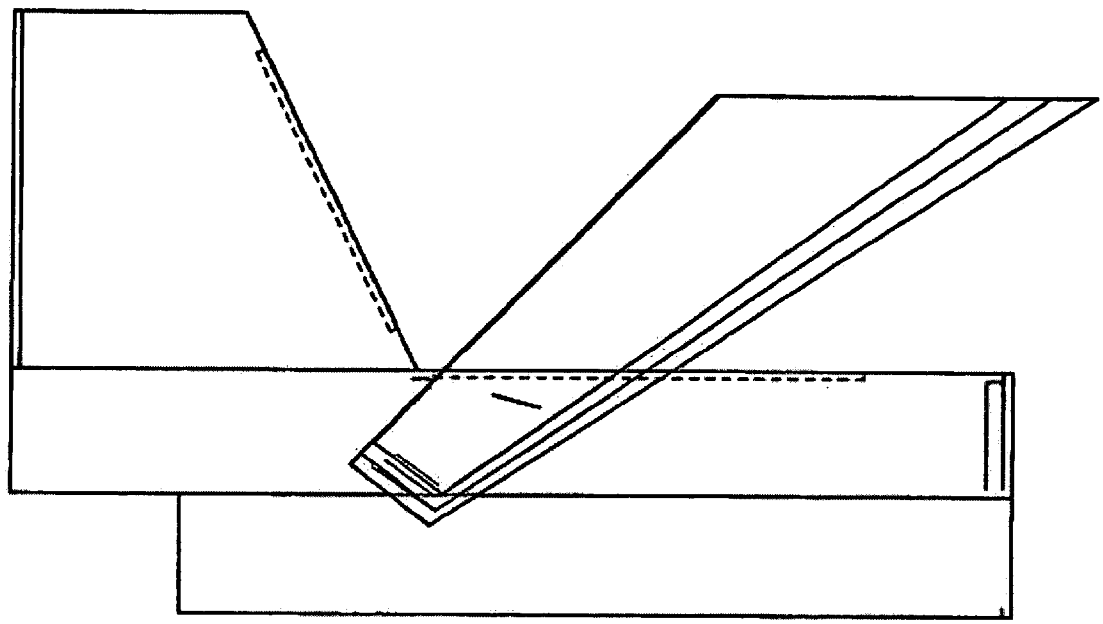
FIG. 5M5

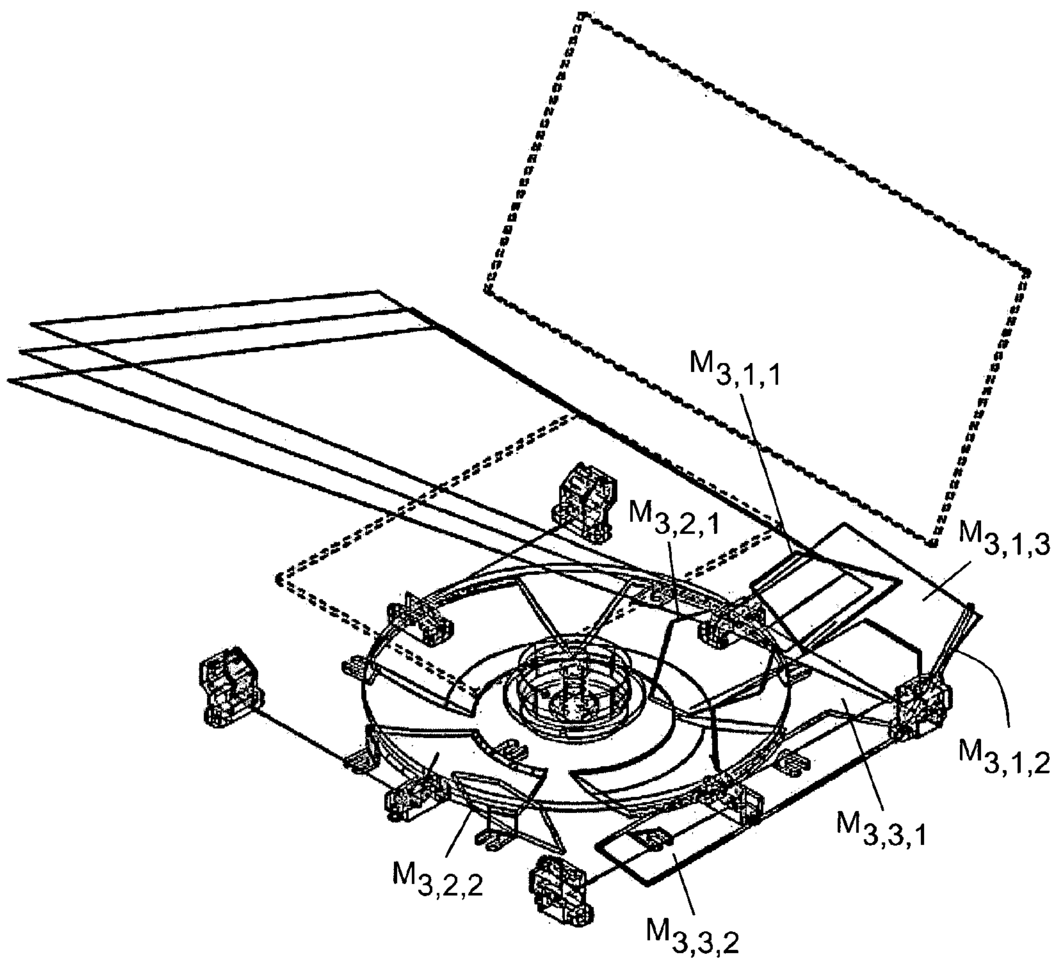
FIG. 5N1

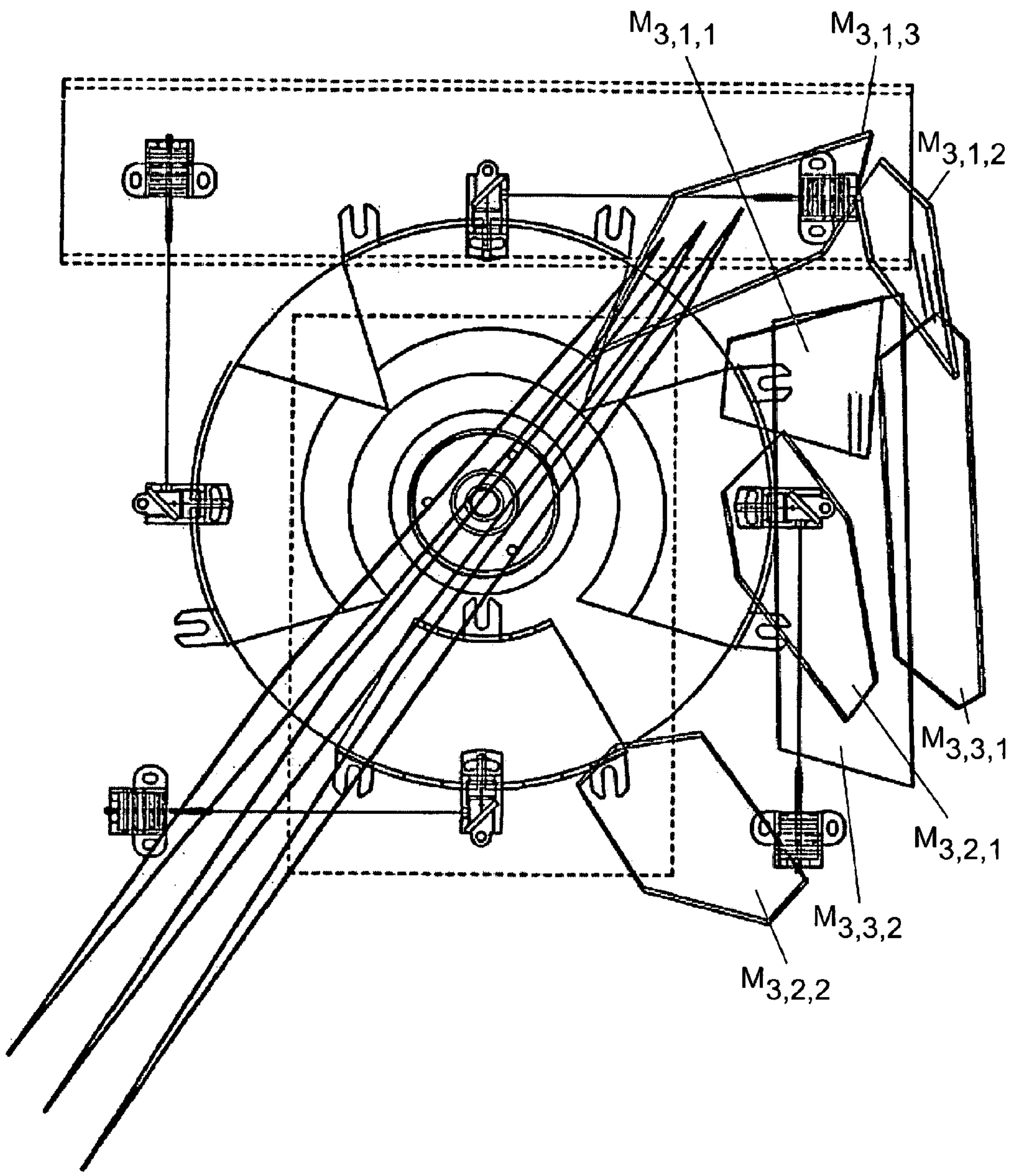
FIG. 5N2

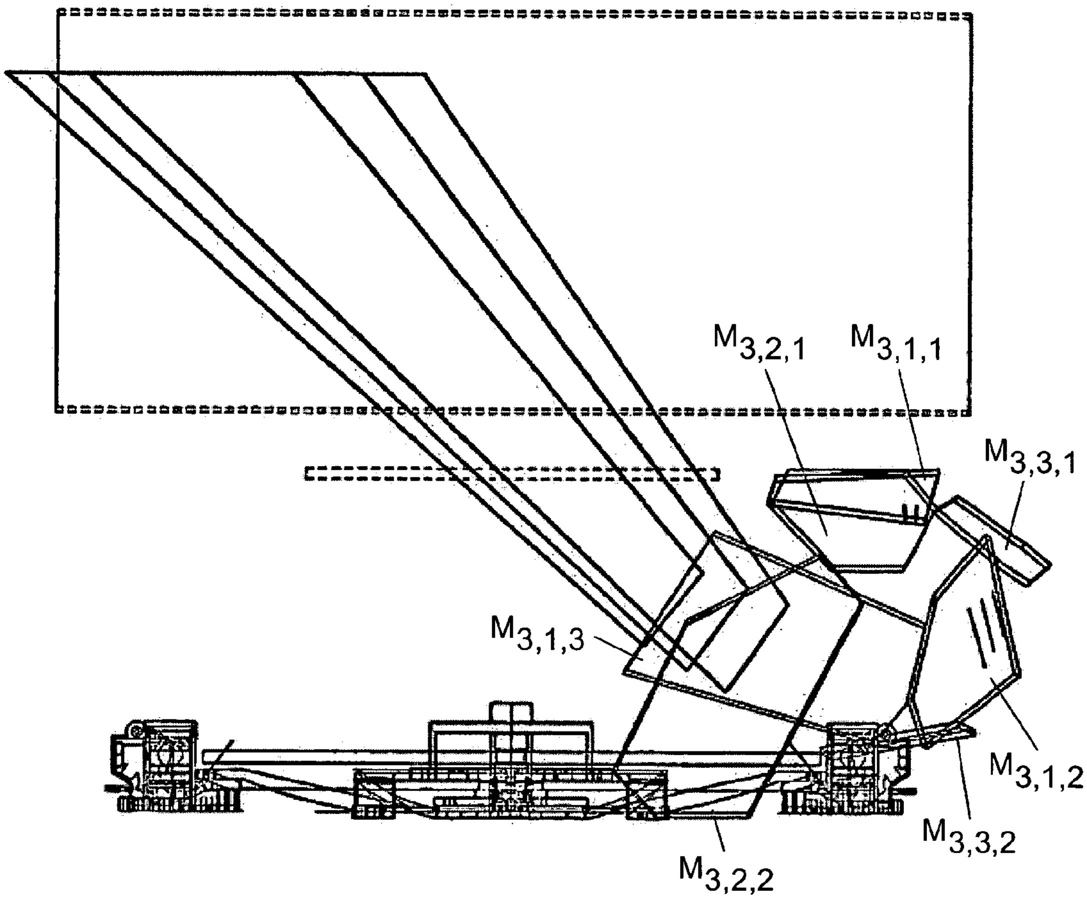
FIG. 5N3

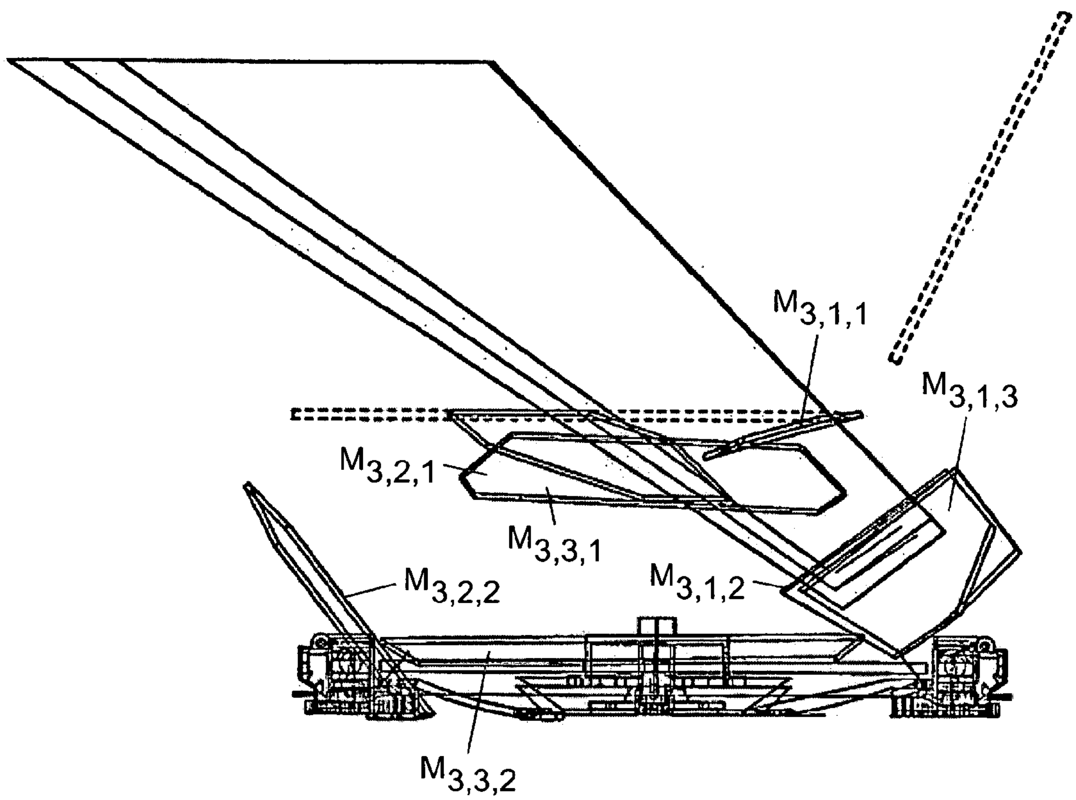
FIG. 5N4

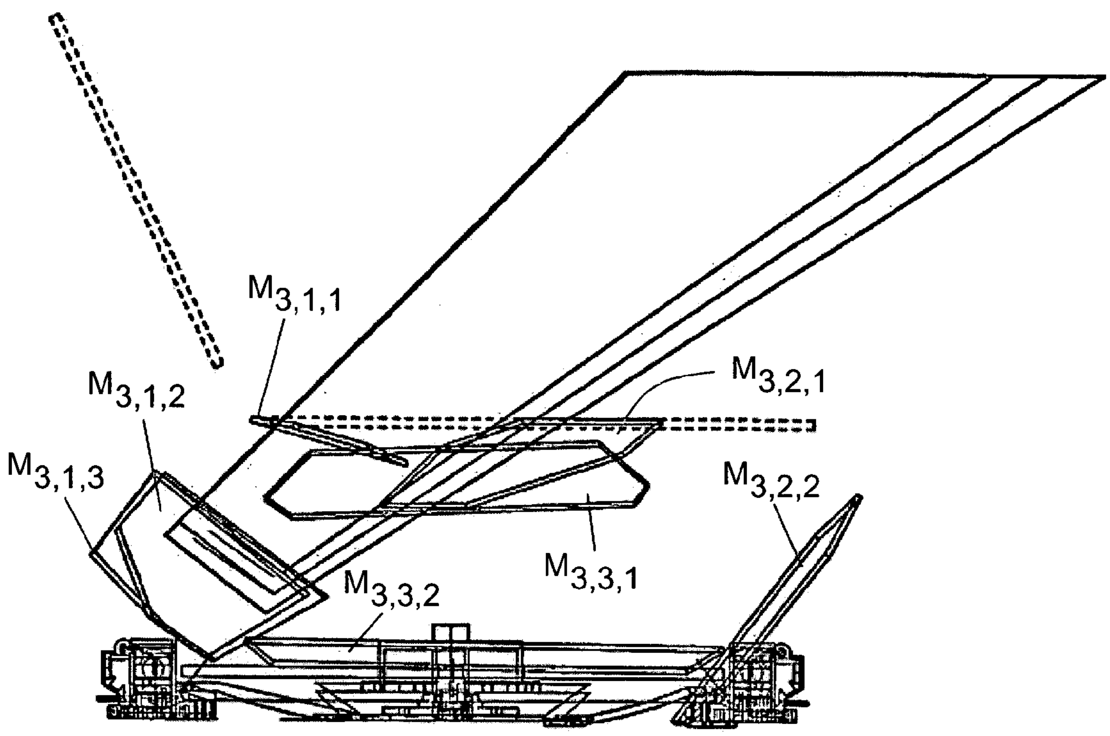
FIG. 5N5

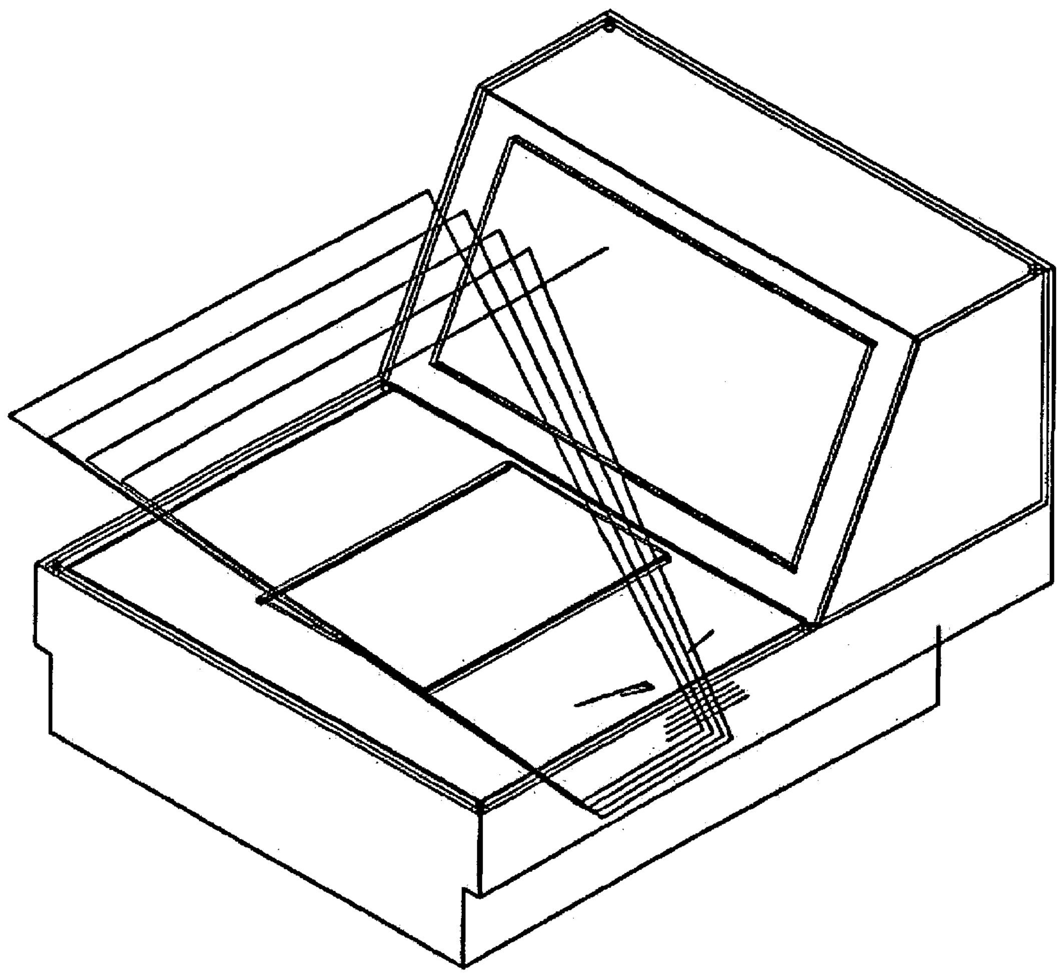
FIG. 5O1

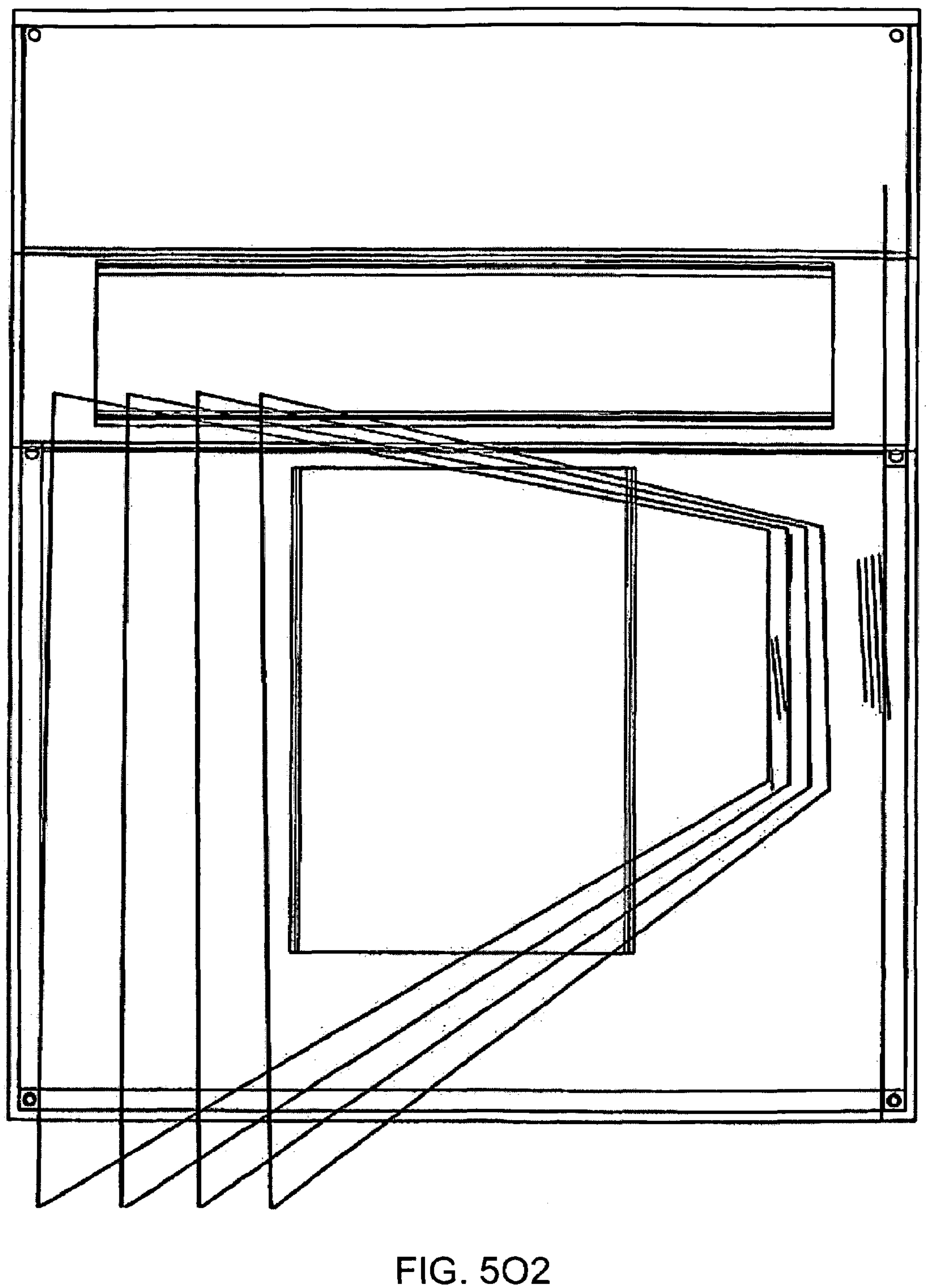
FIG. 5O2

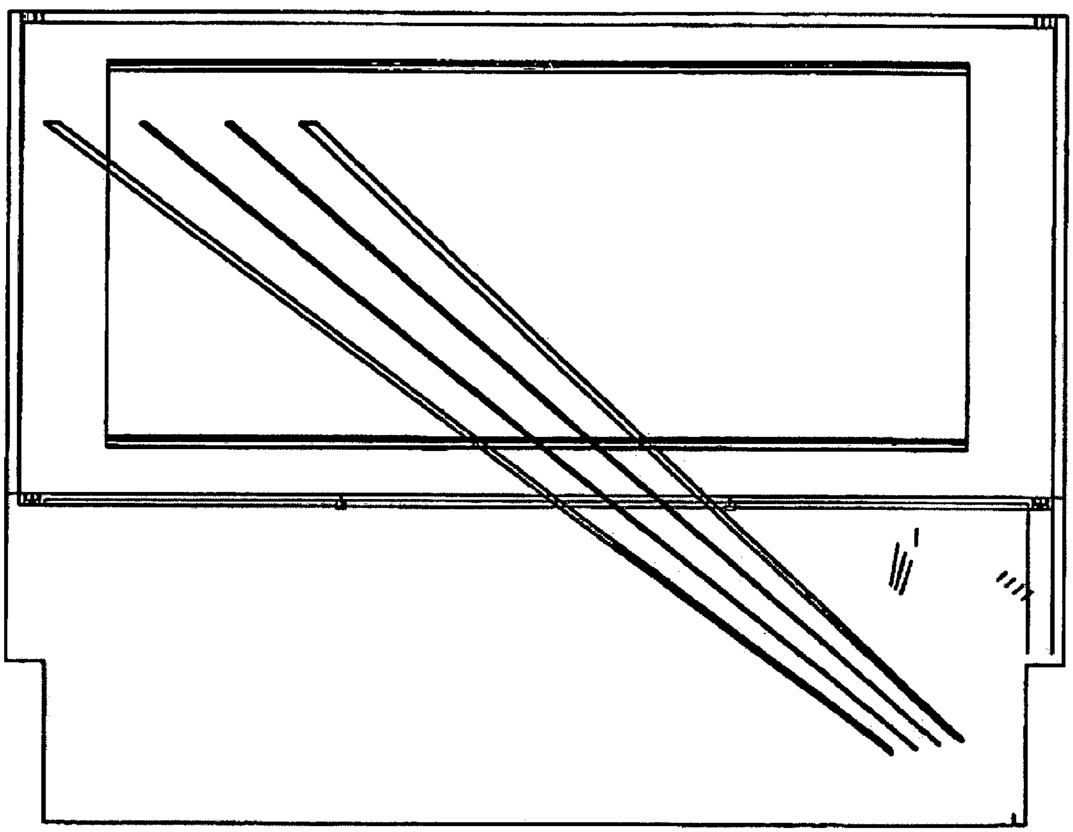
FIG. 5O3

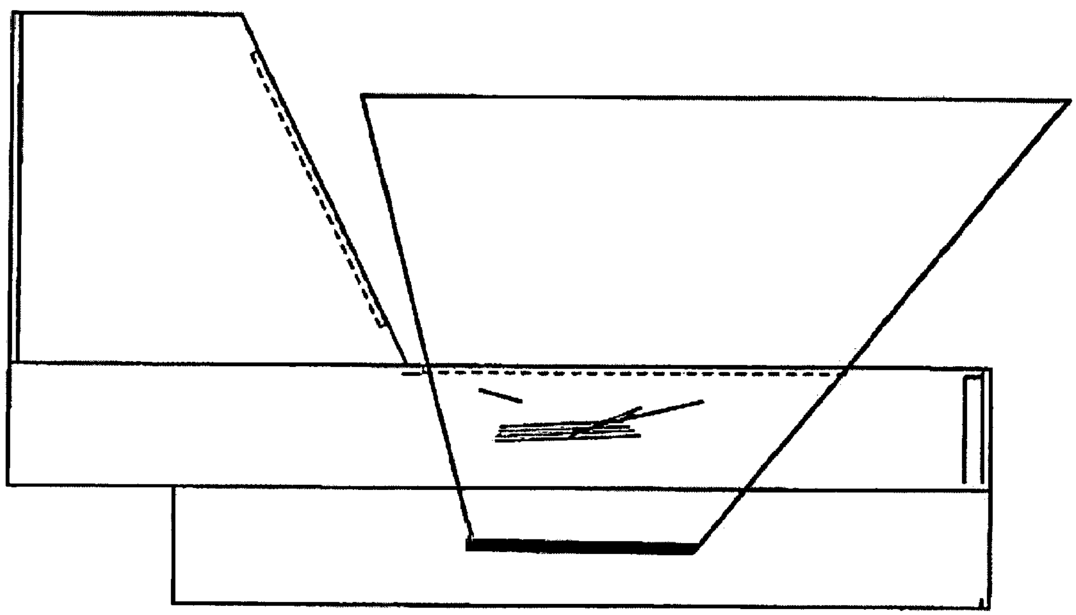
FIG. 5O5

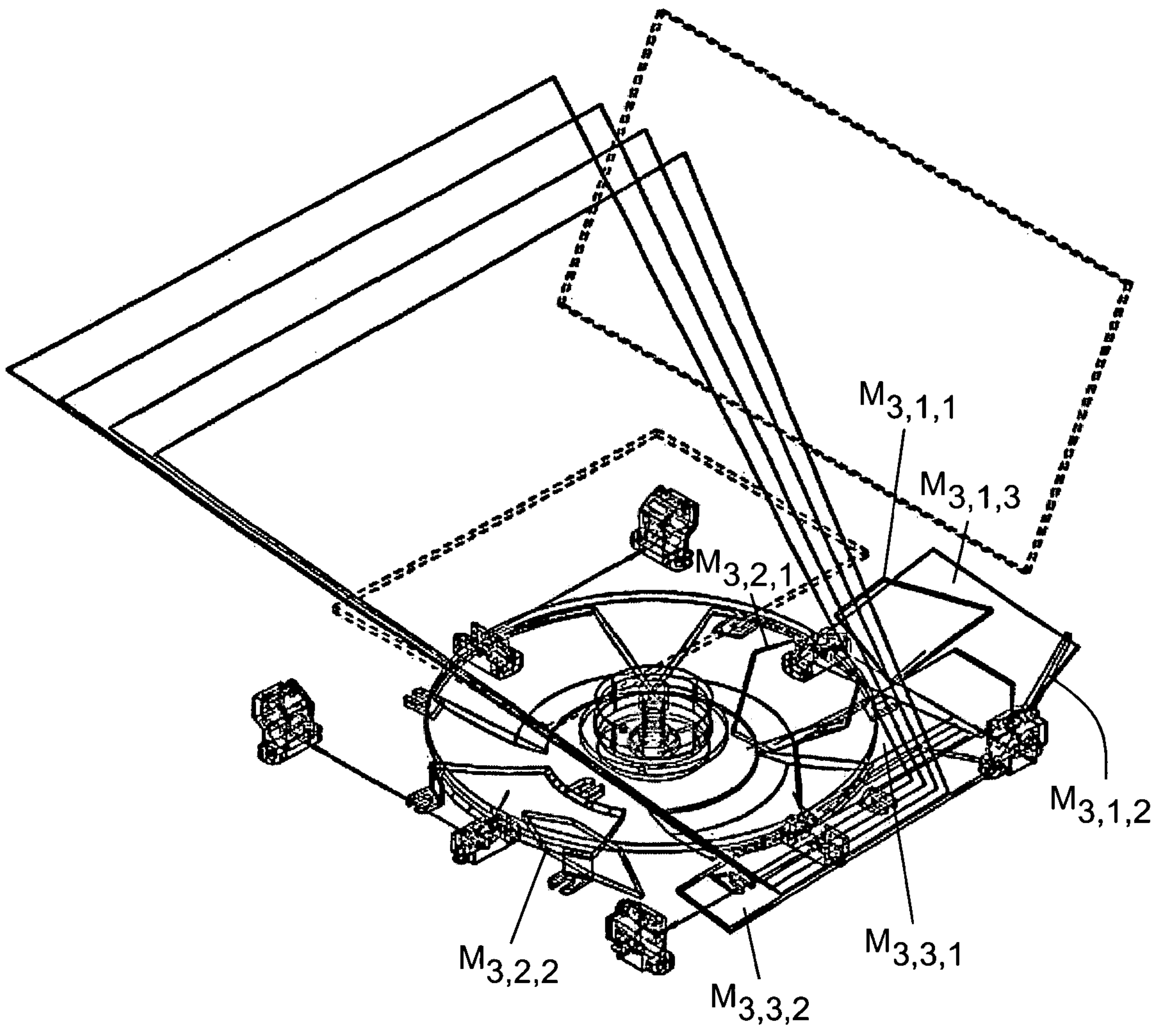
FIG. 5P1

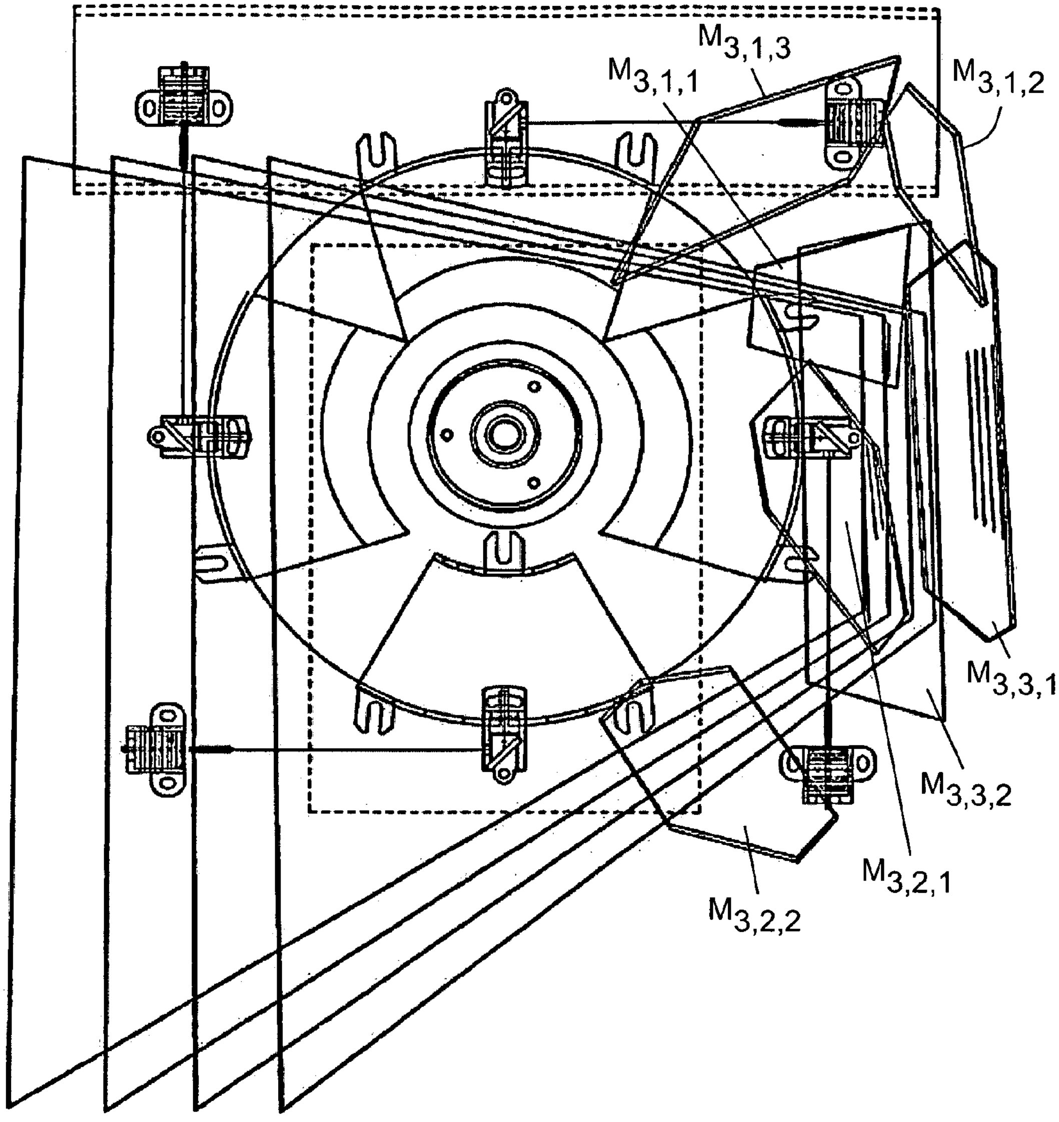
FIG. 5P2

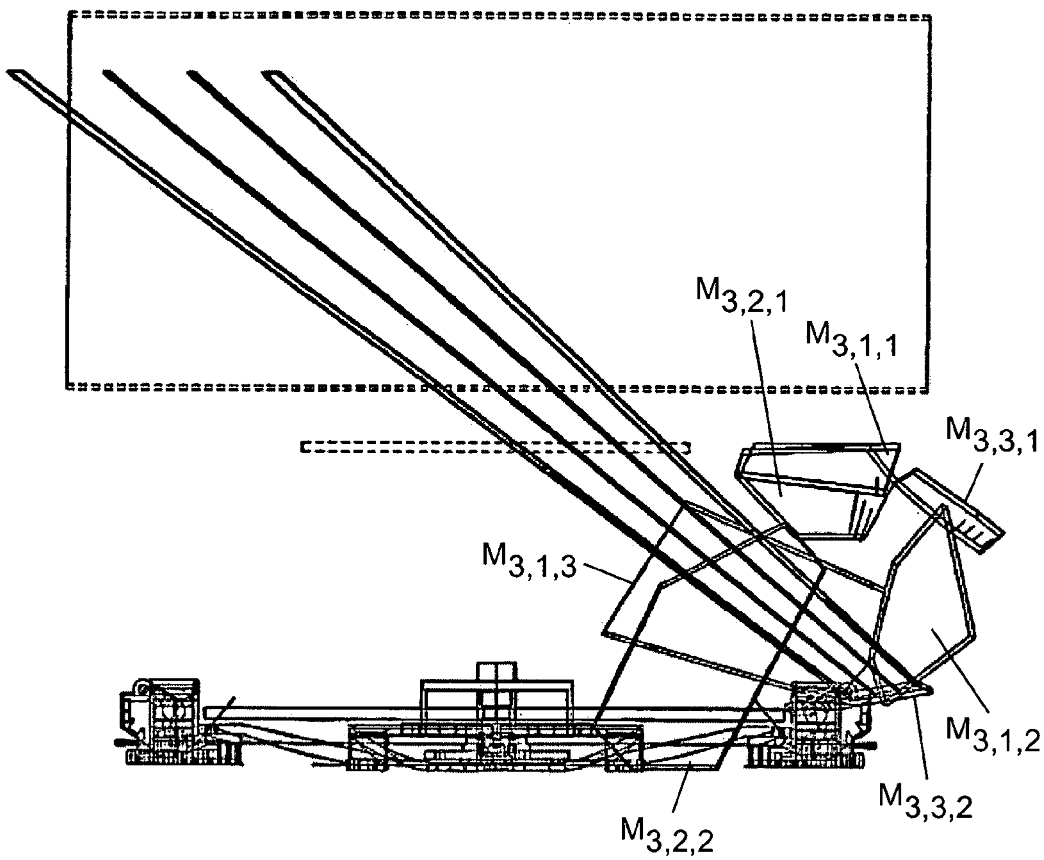
FIG. 5P3

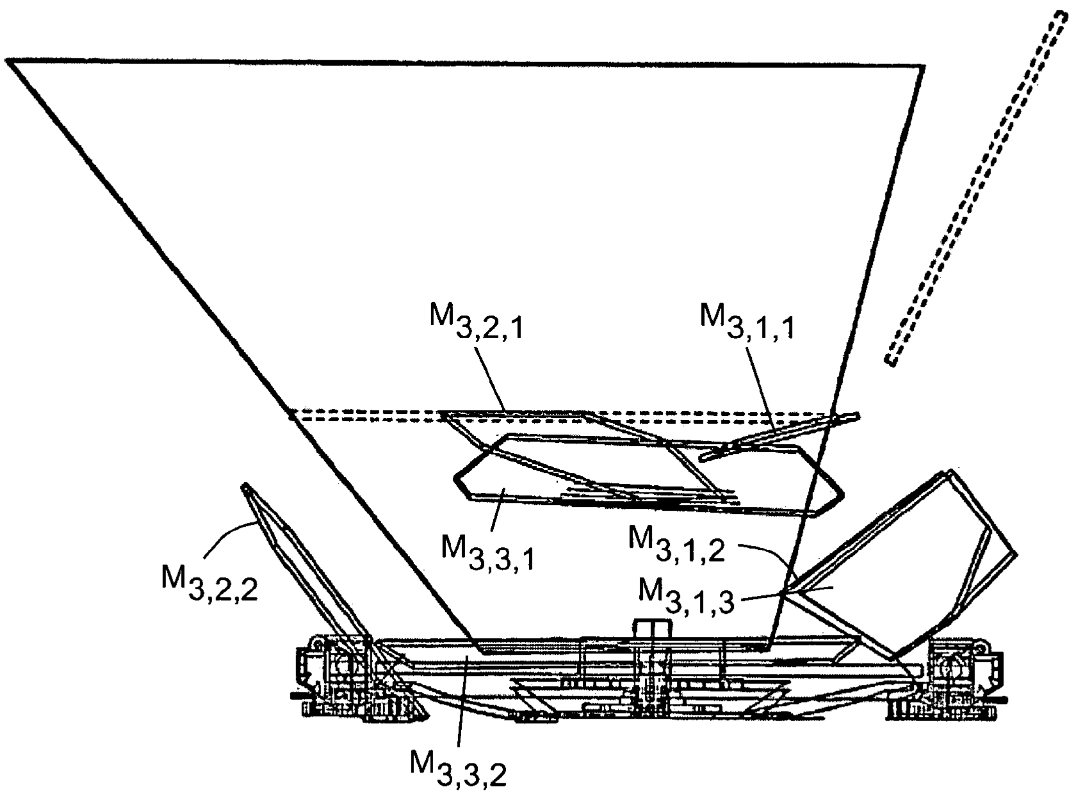
FIG. 5P4

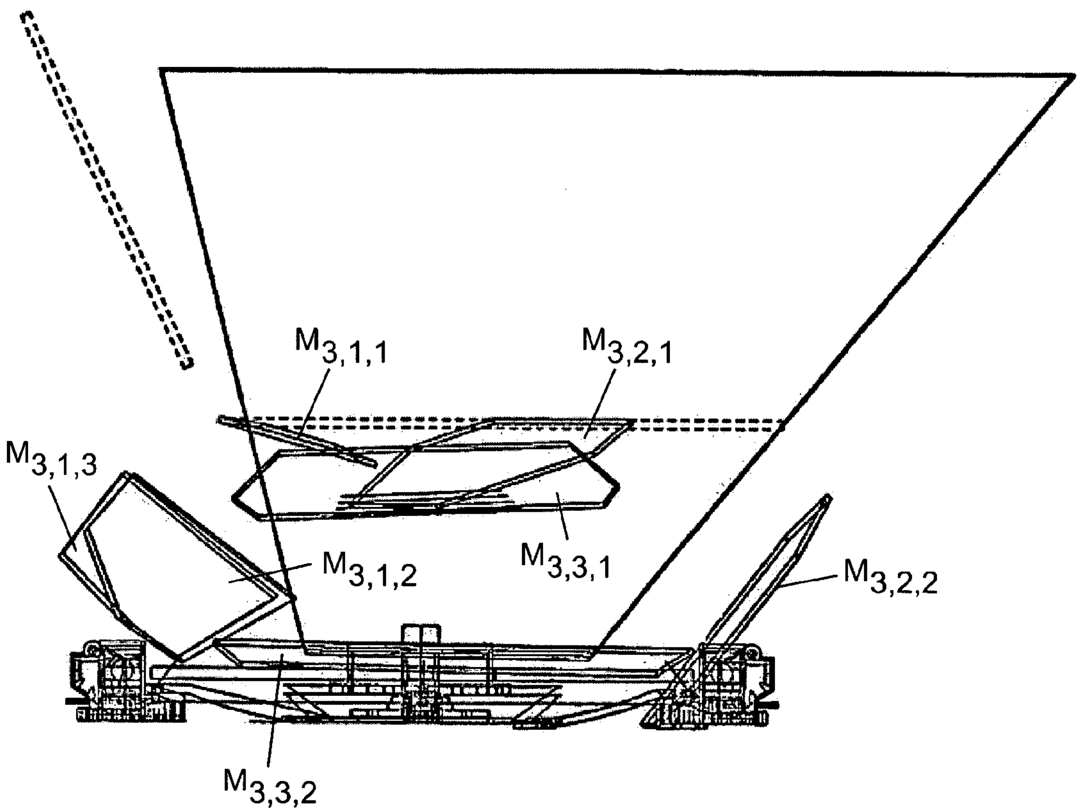
FIG. 5P5

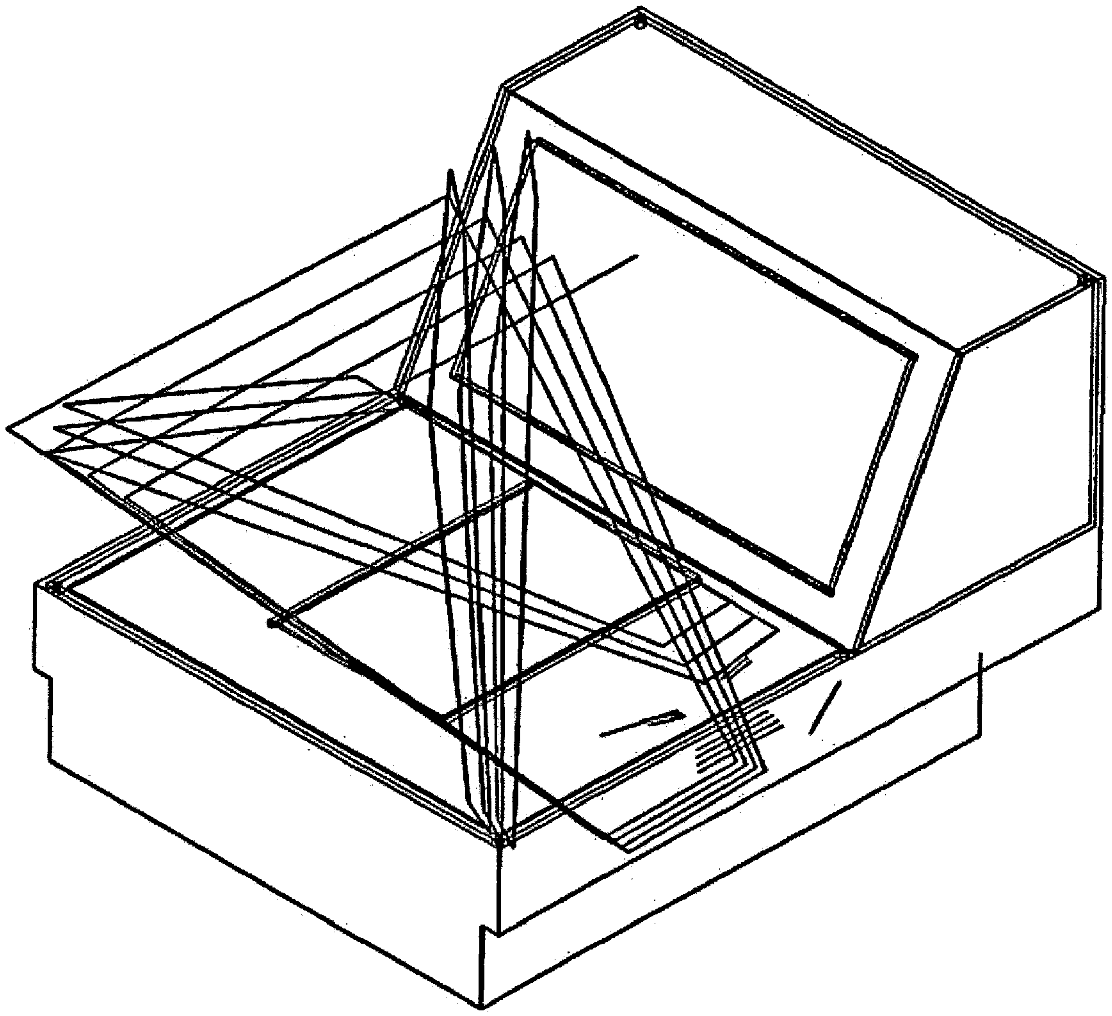
FIG. 5Q1

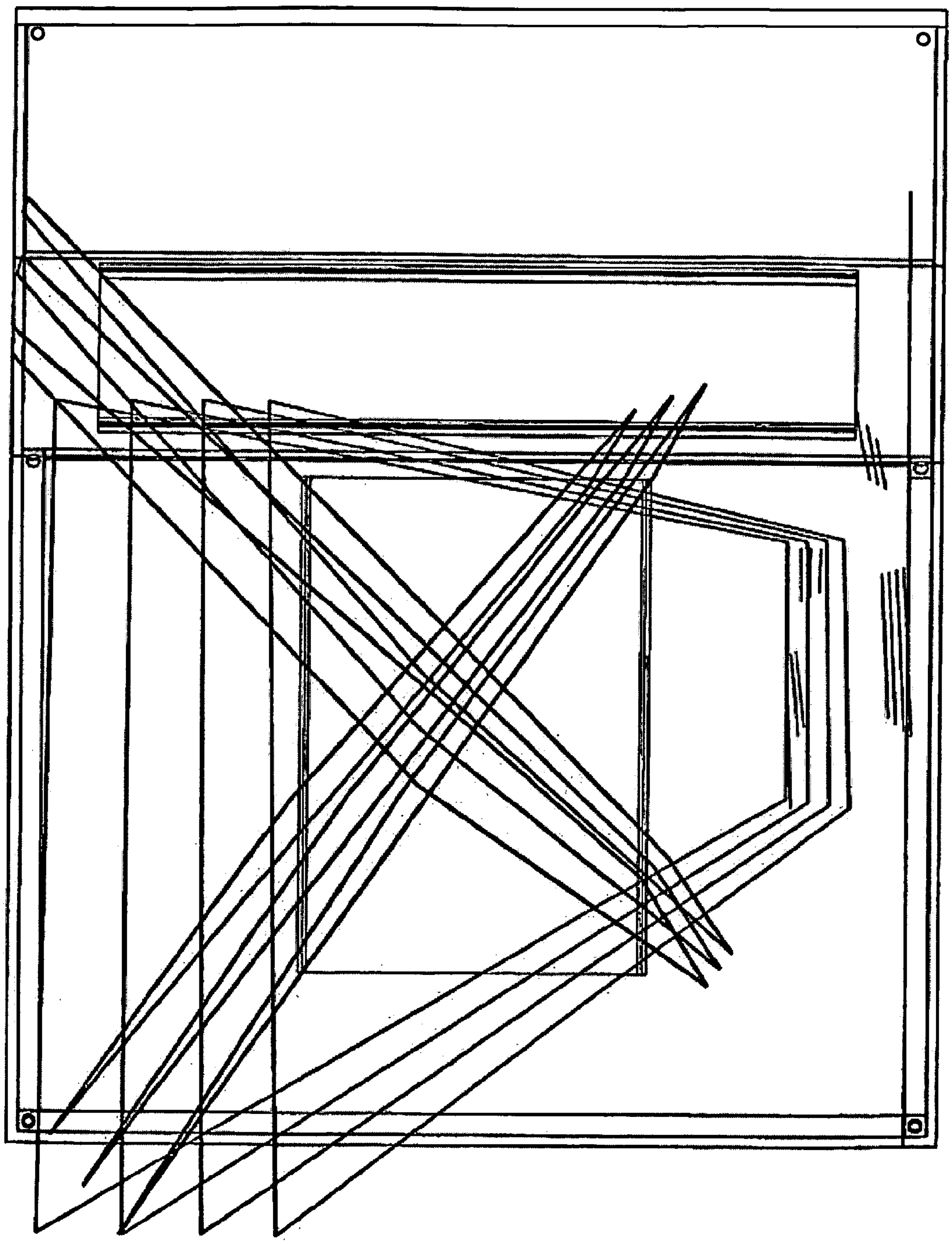
FIG. 5Q2

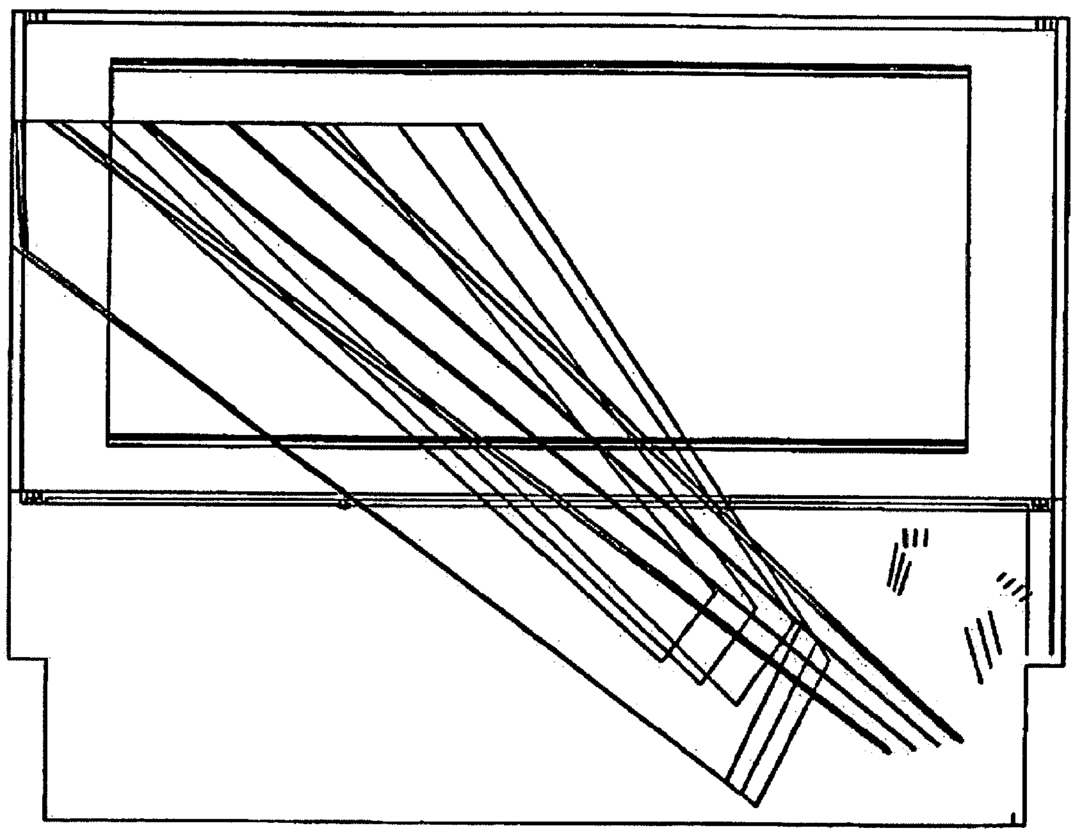
FIG. 5Q3

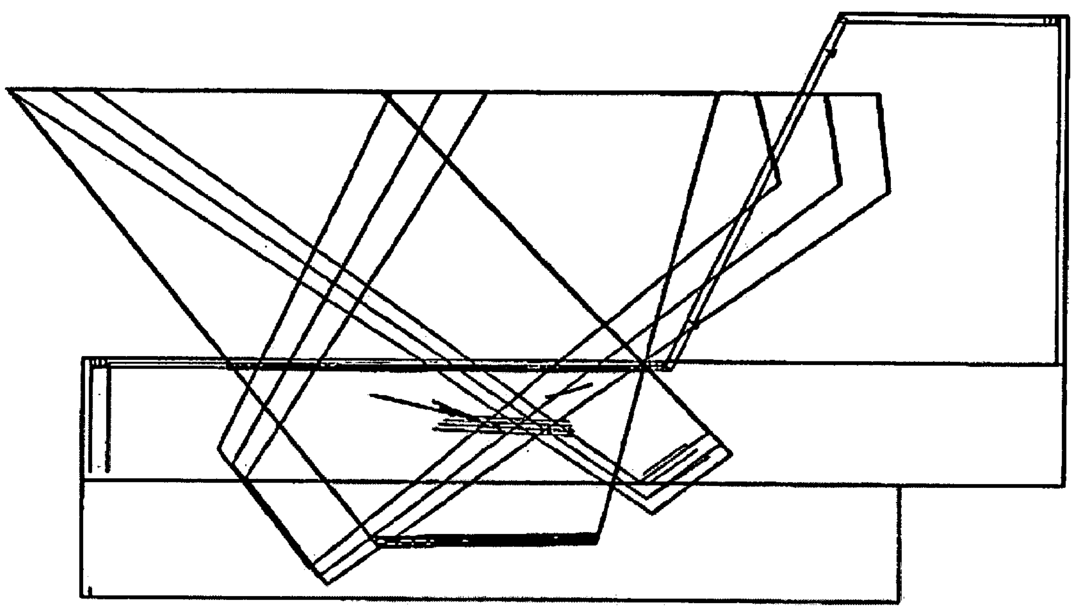
FIG. 5Q4

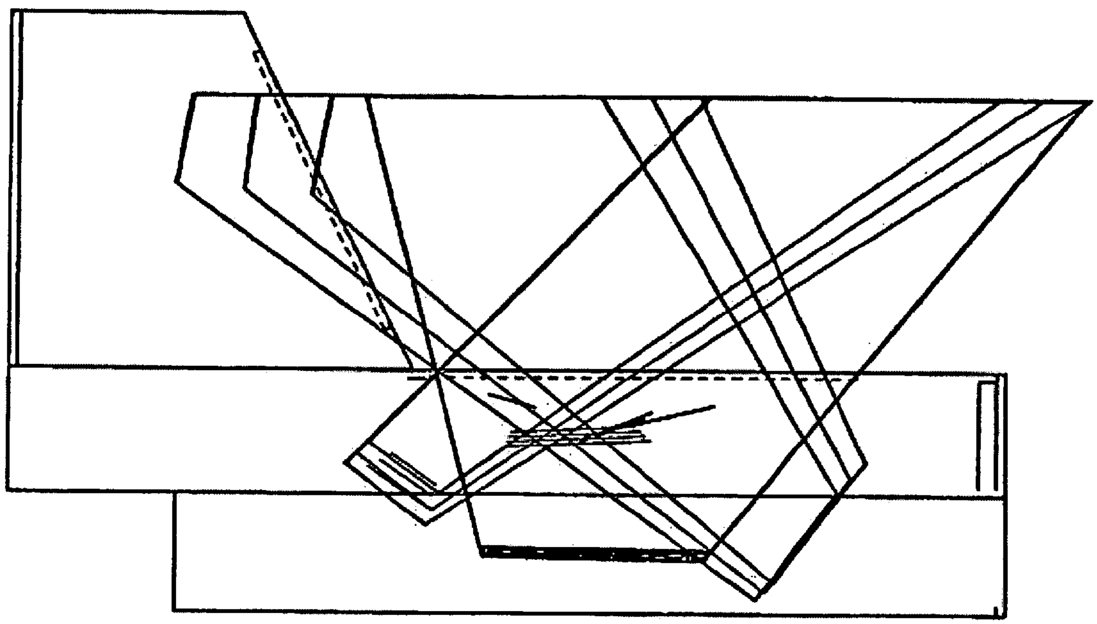
FIG. 5Q5

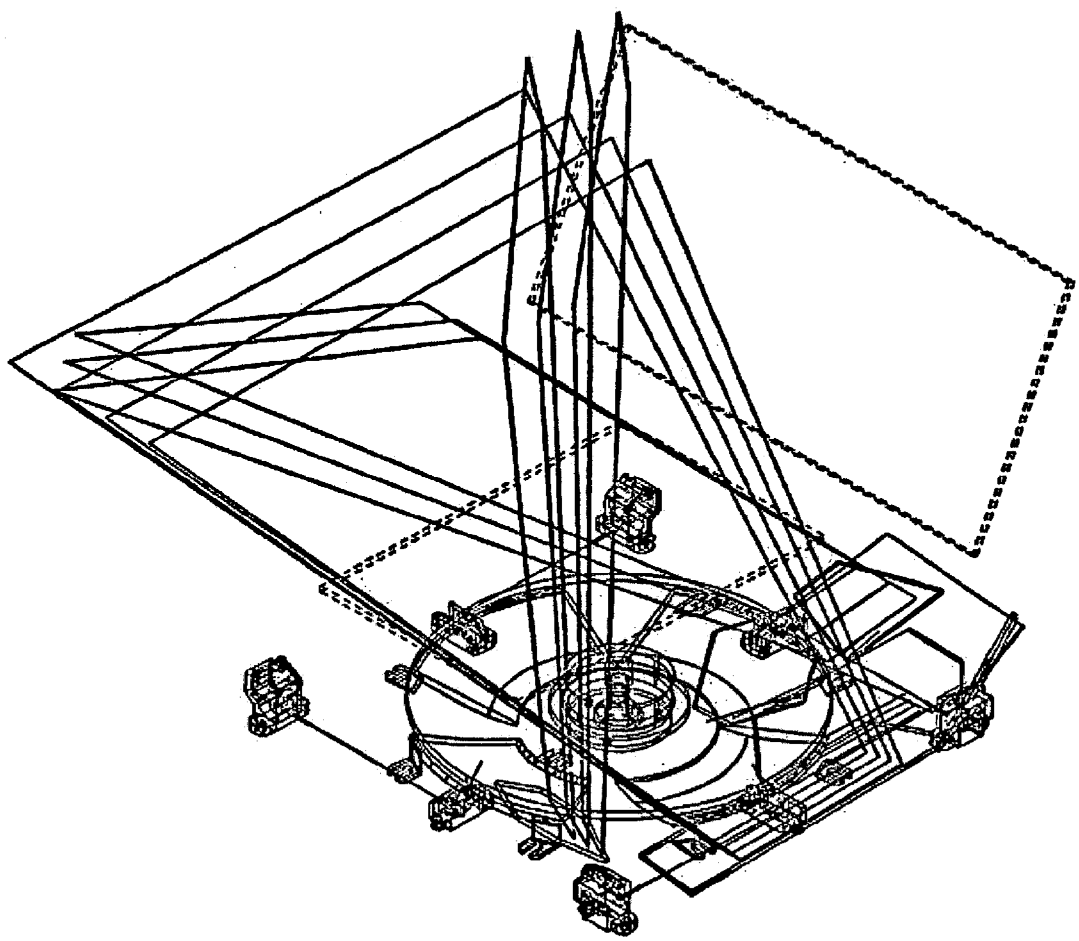
FIG. 5R1

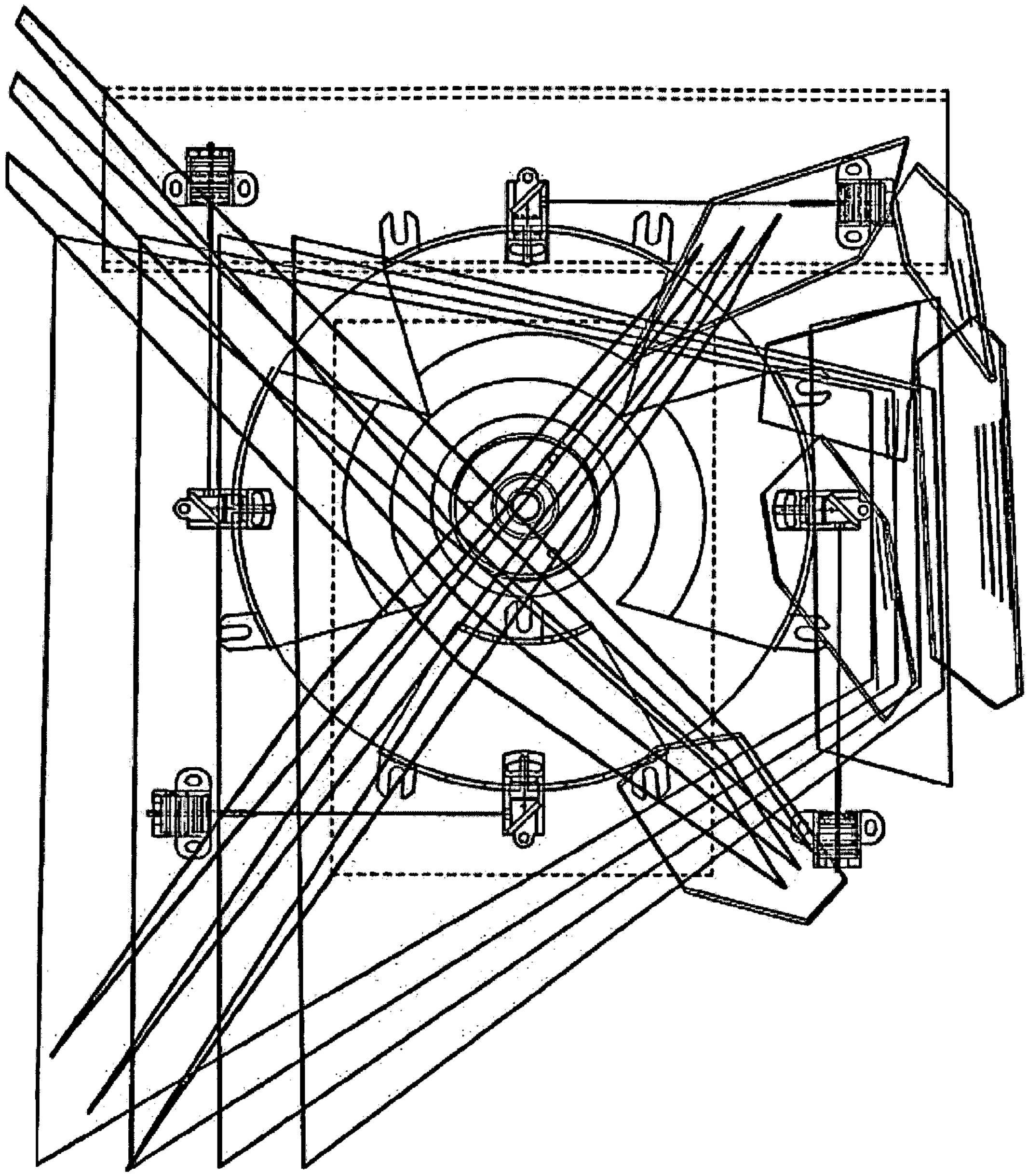
FIG. 5R2

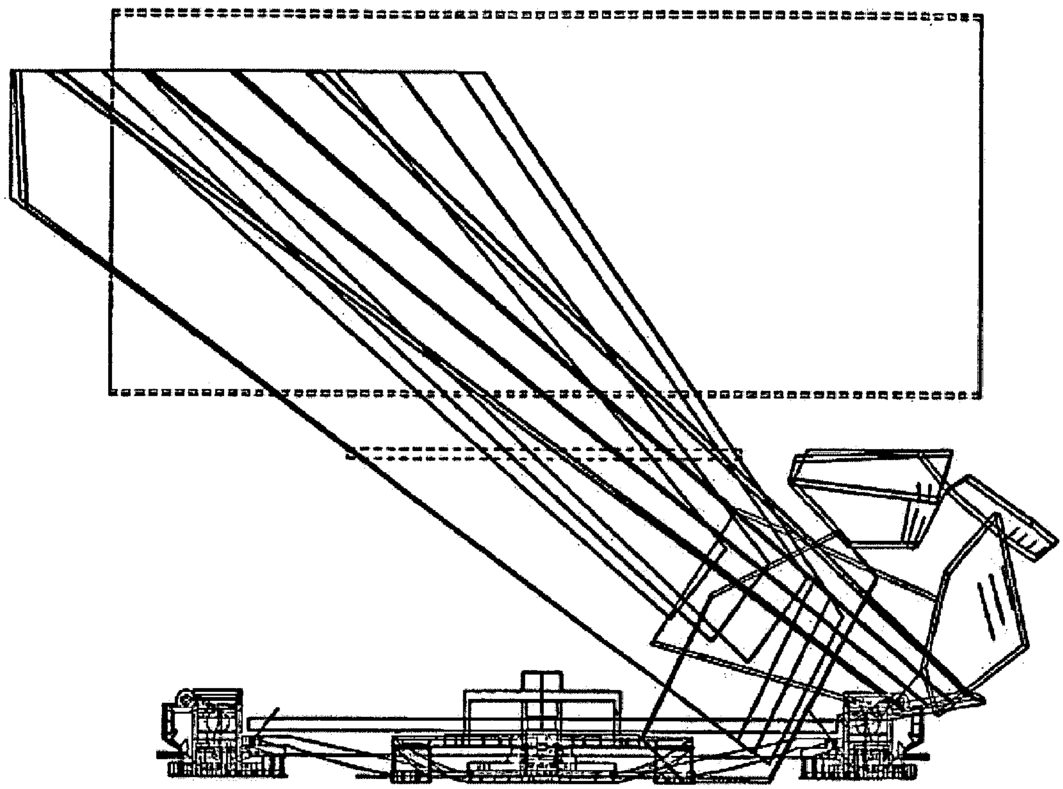
FIG. 5R3

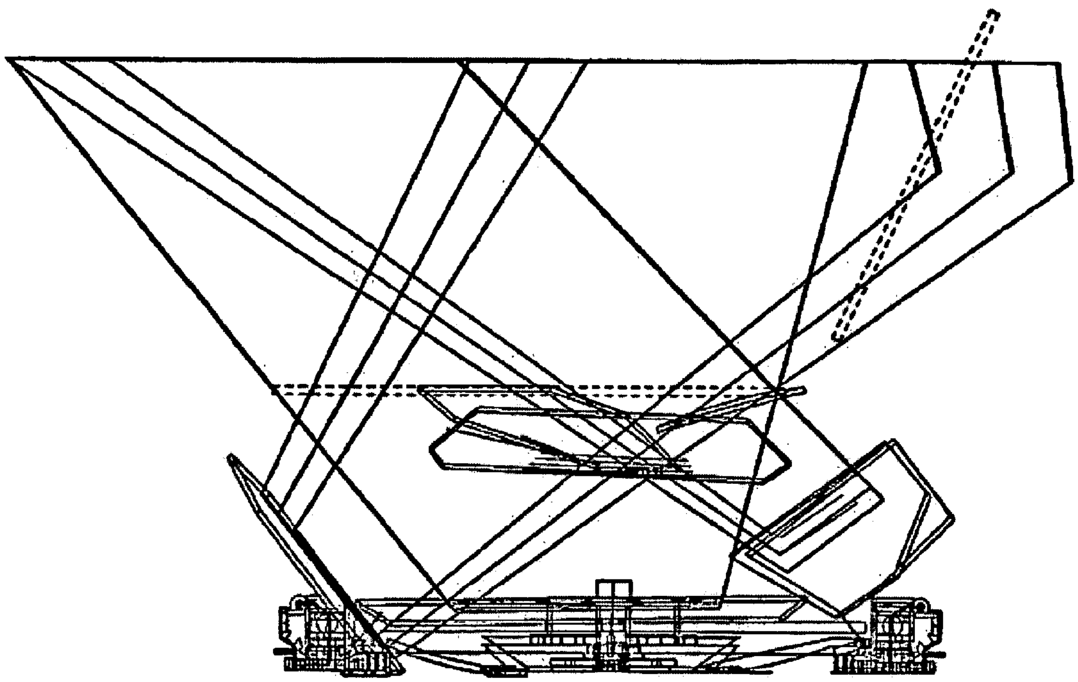
FIG. 5R4

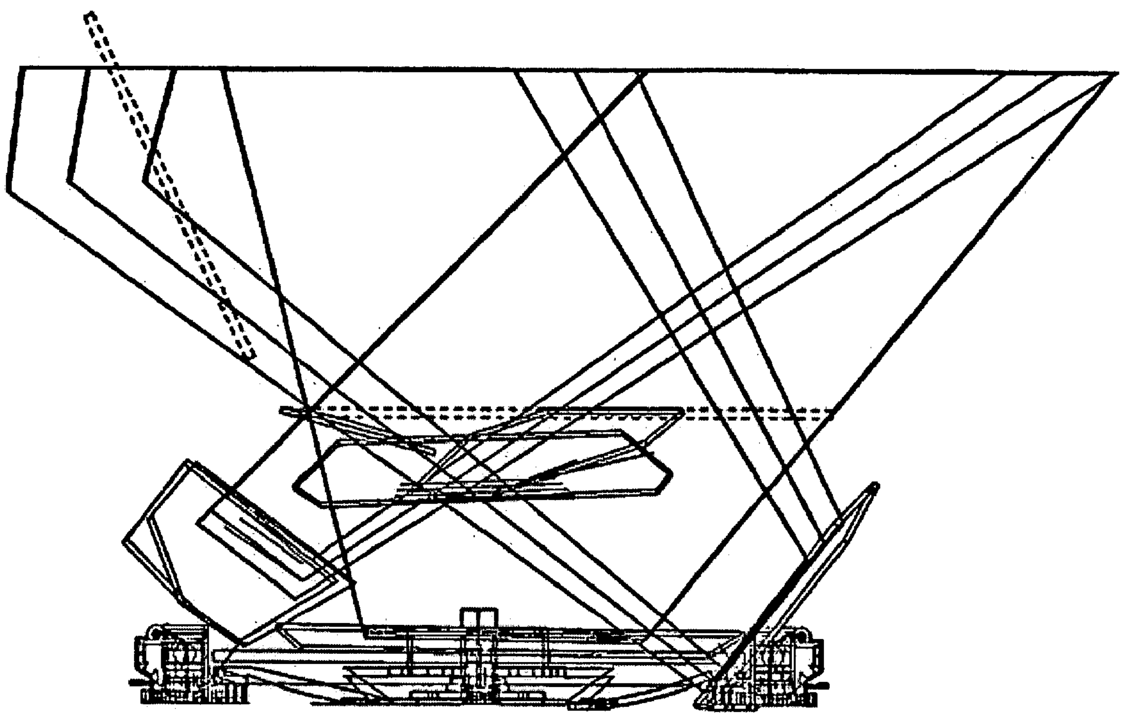
FIG. 5R5

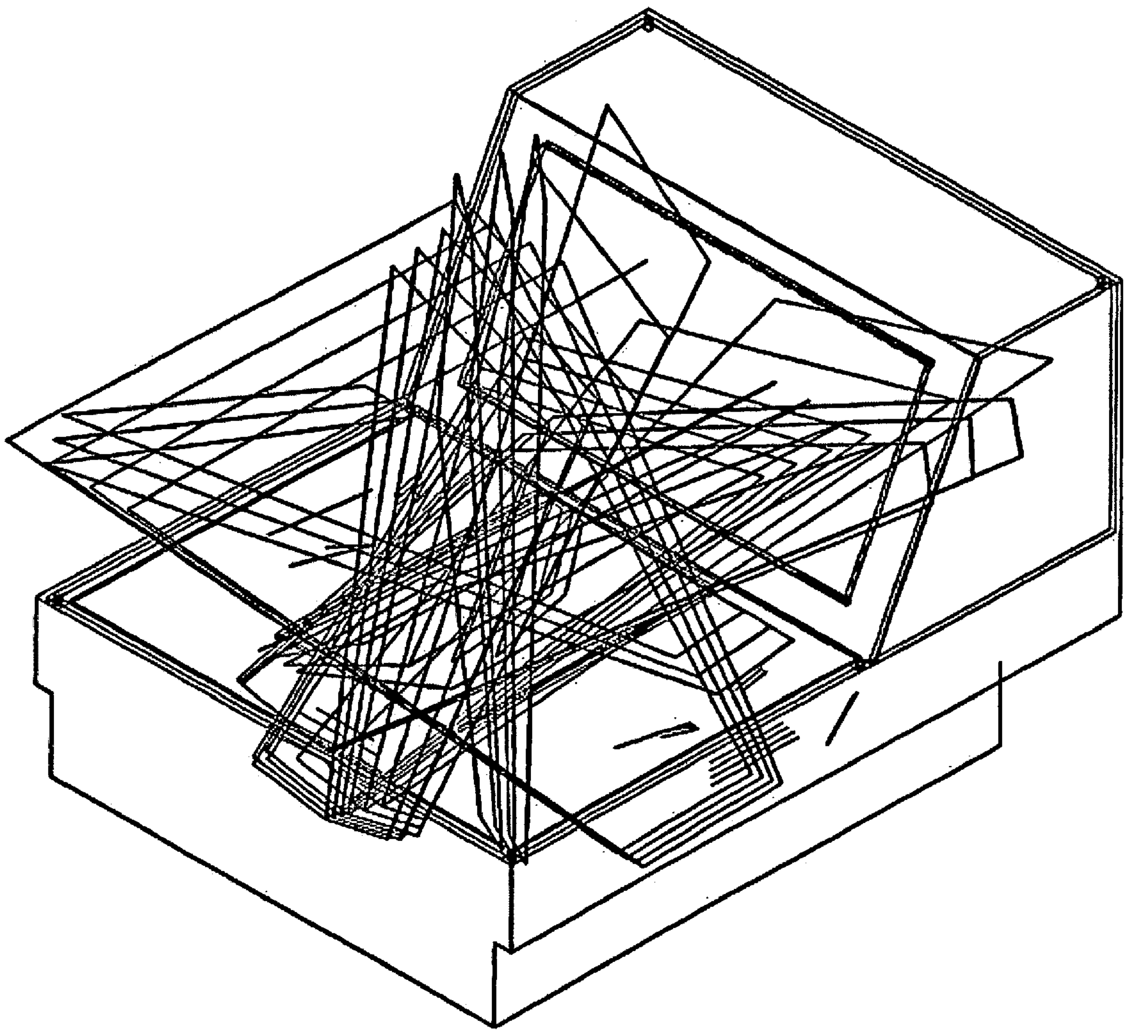
FIG. 5S1

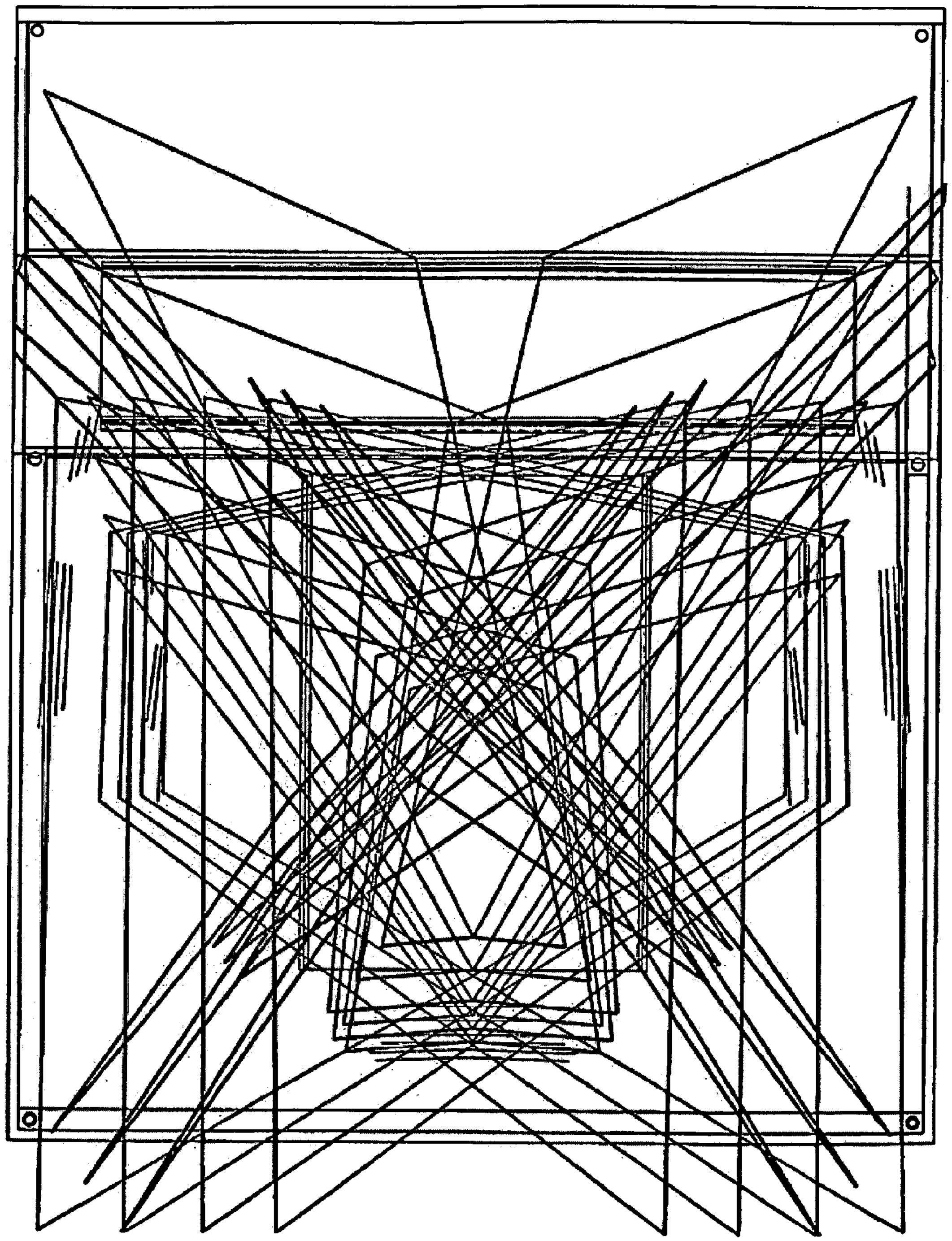
FIG. 5S2

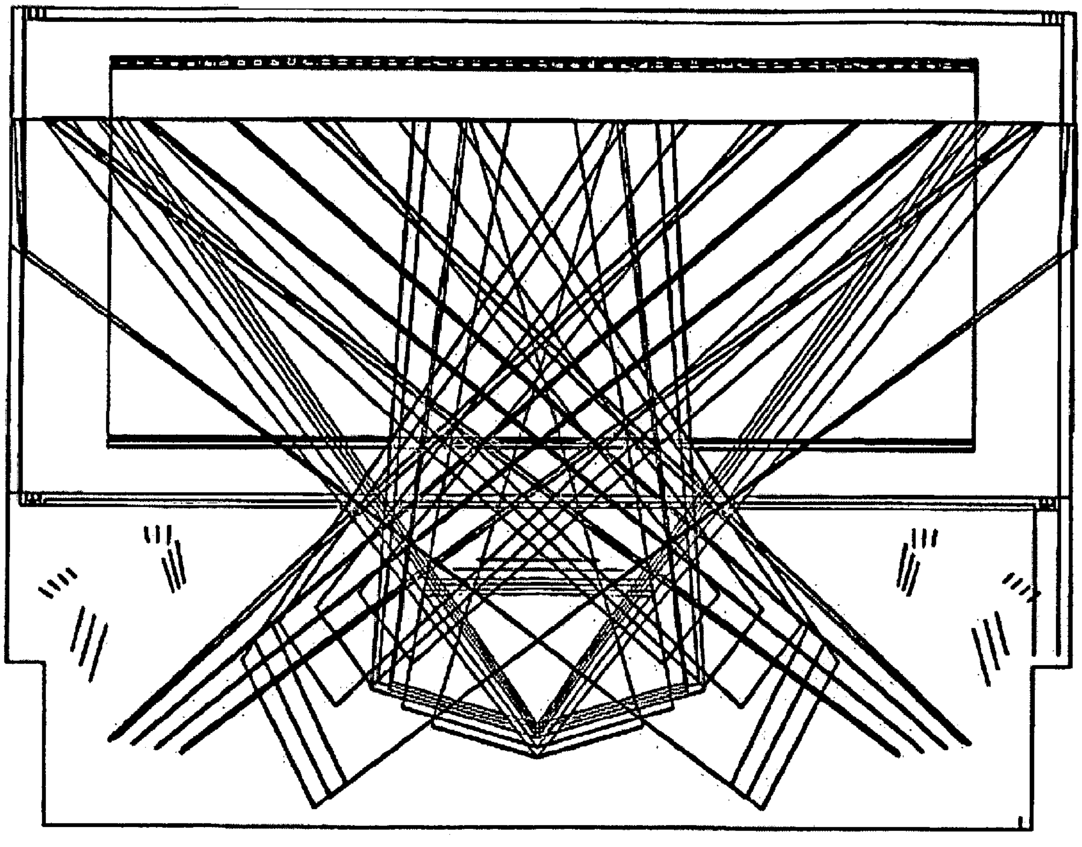
FIG. 5S3

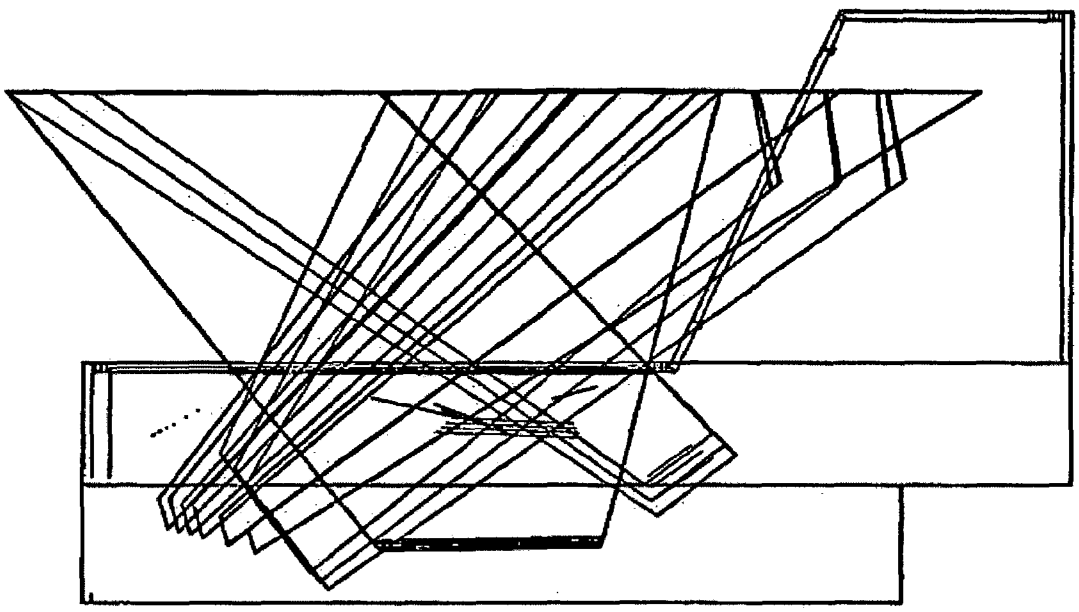
FIG. 5S4

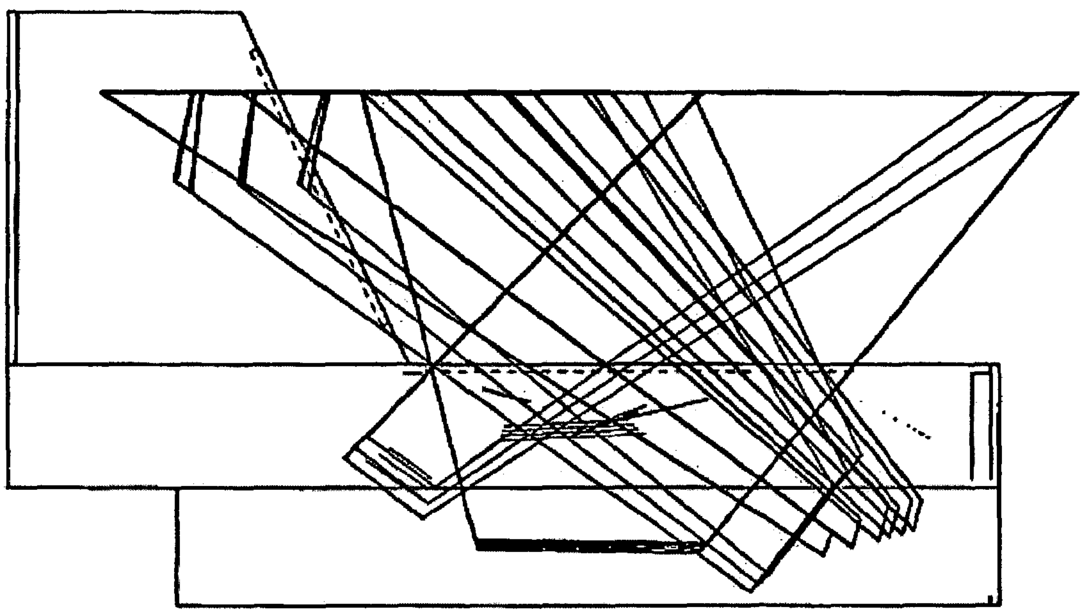
FIG. 5S5

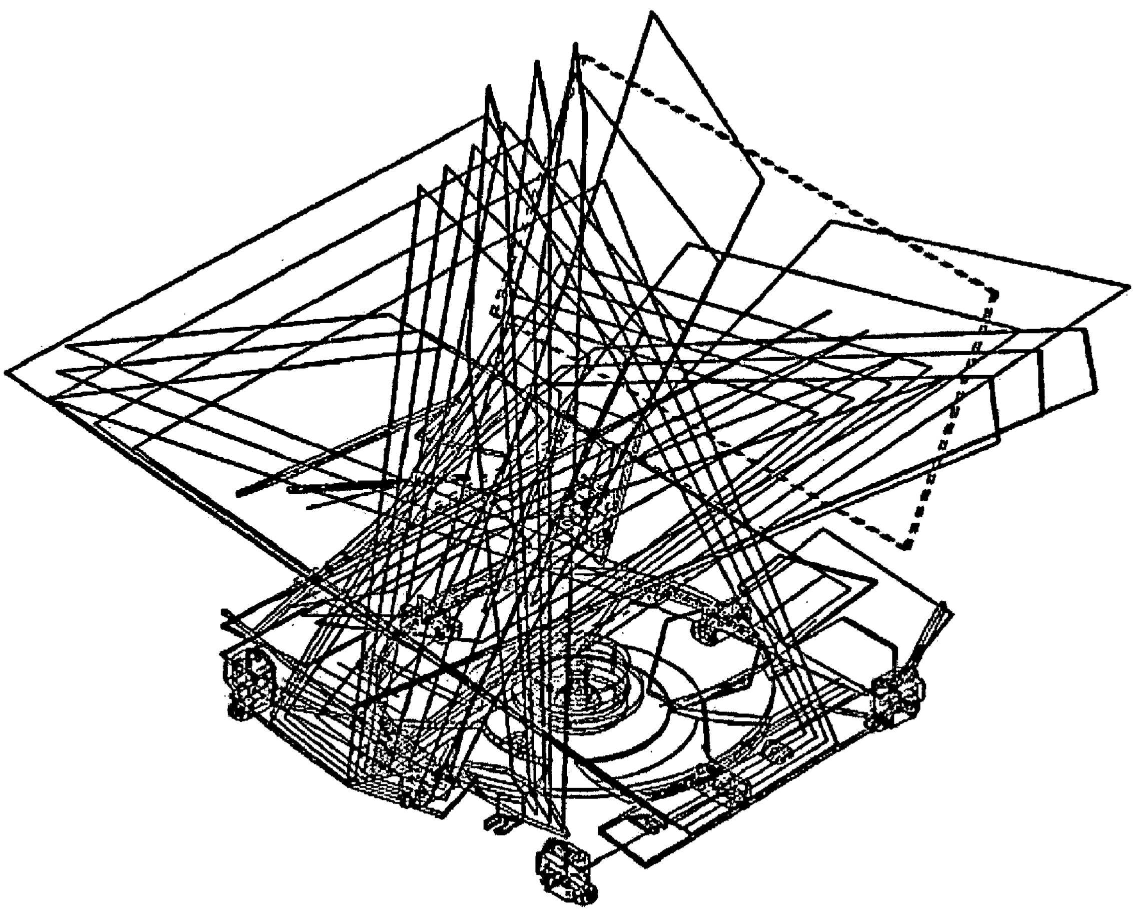
FIG. 5T1

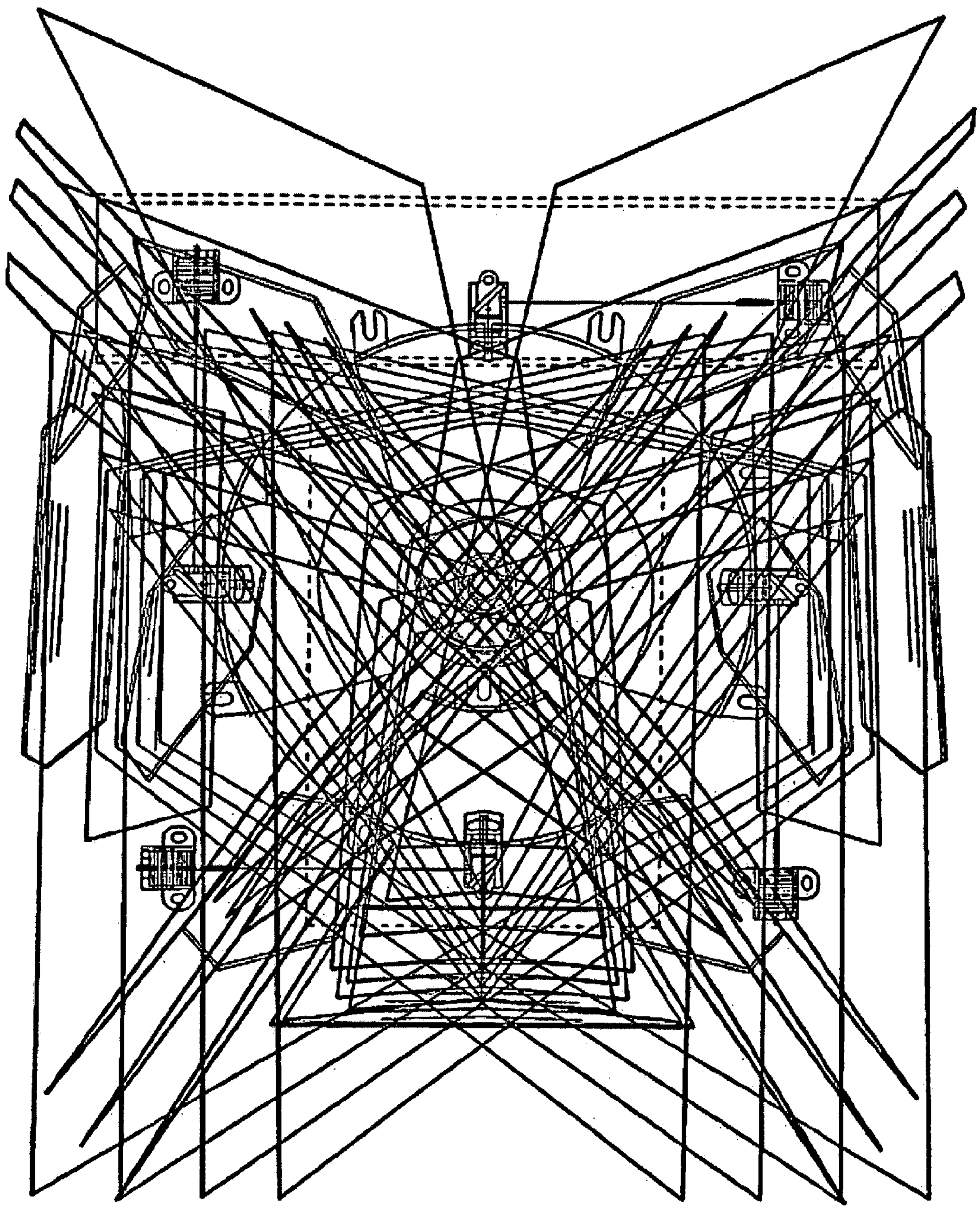
FIG. 5T2

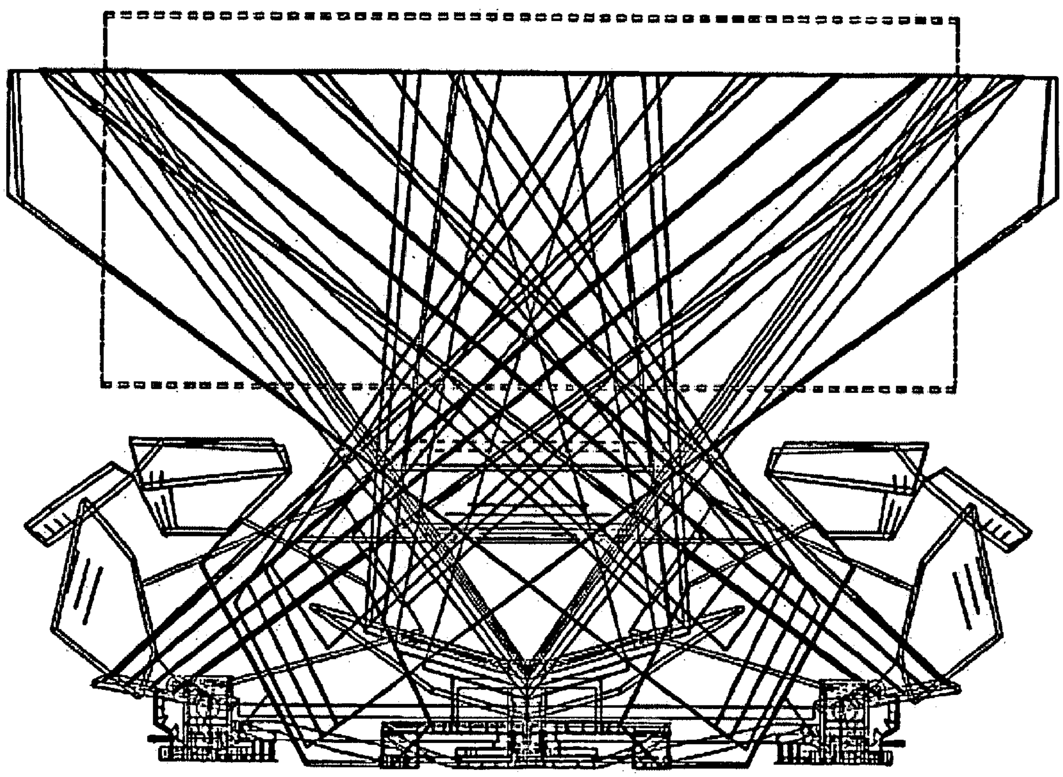
FIG. 5T3

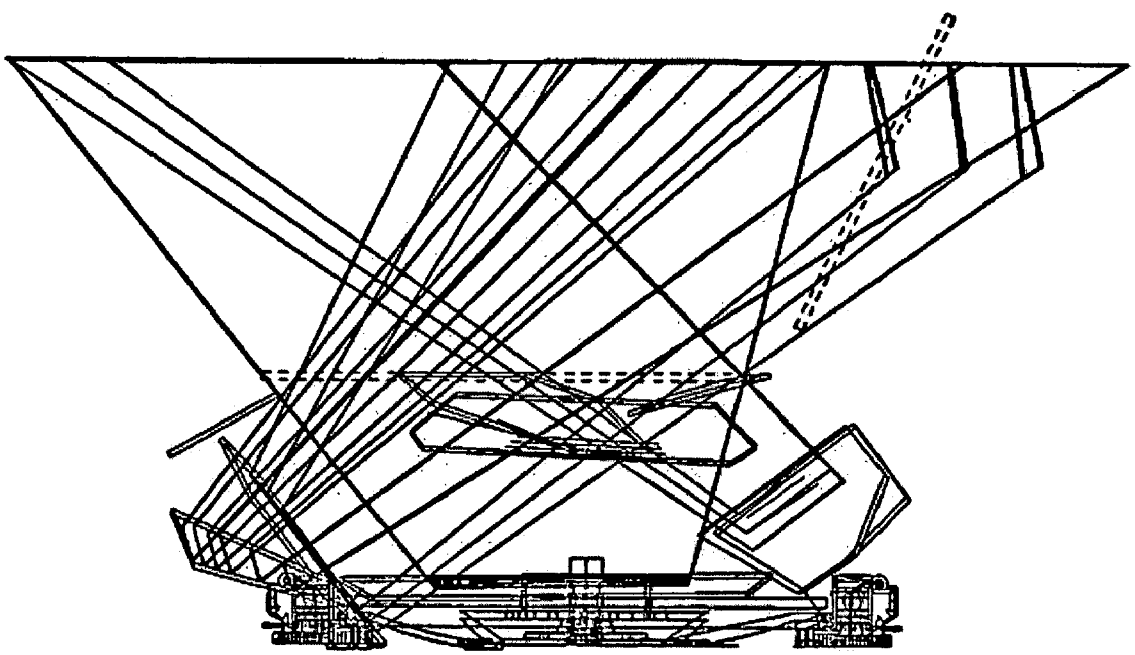
FIG. 5T4

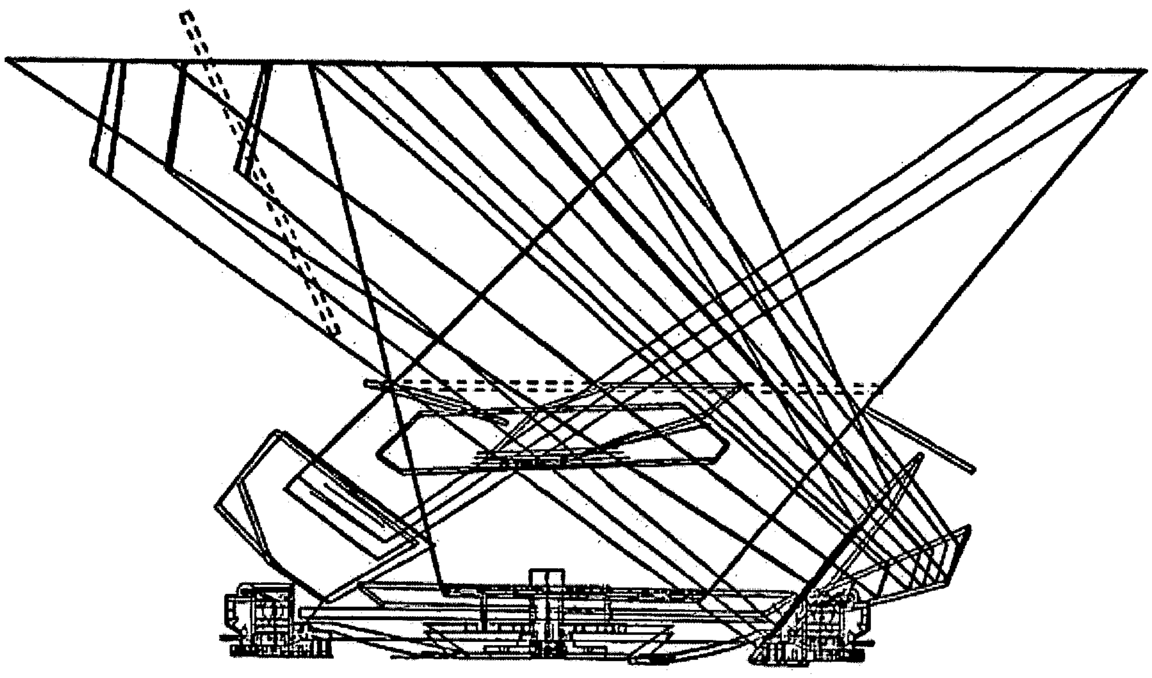
FIG. 5T5

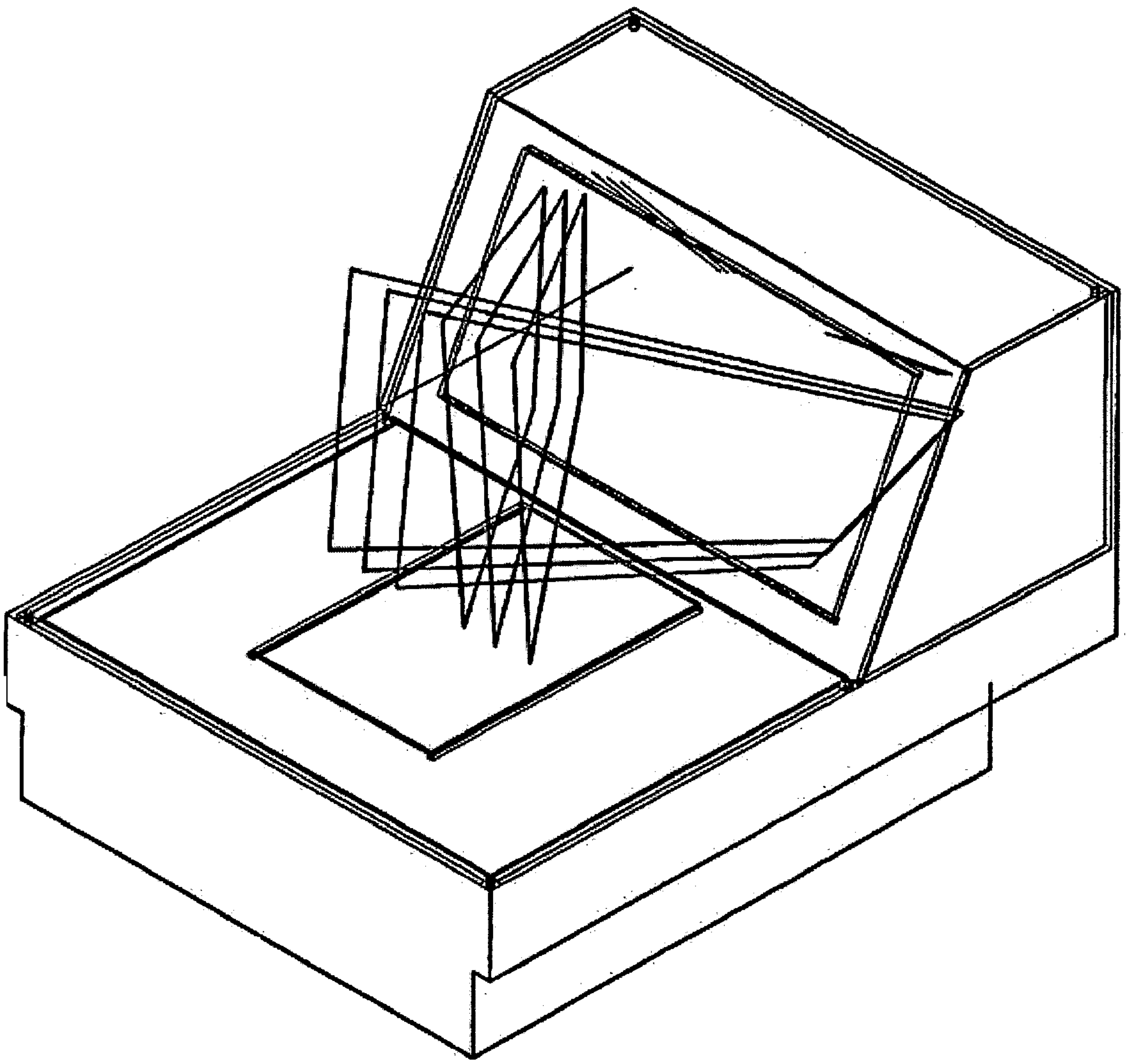
FIG. 5U1

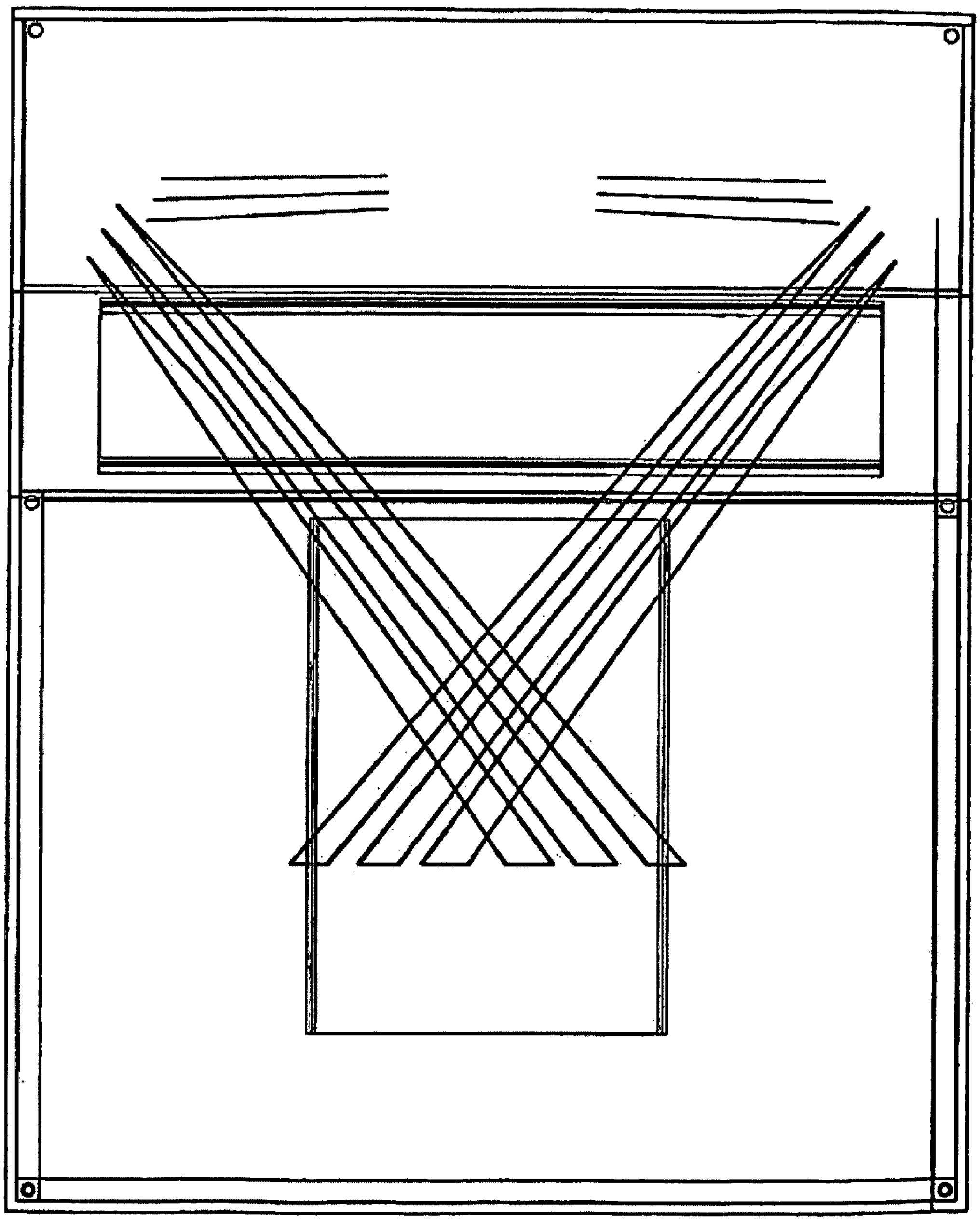
FIG. 5U2

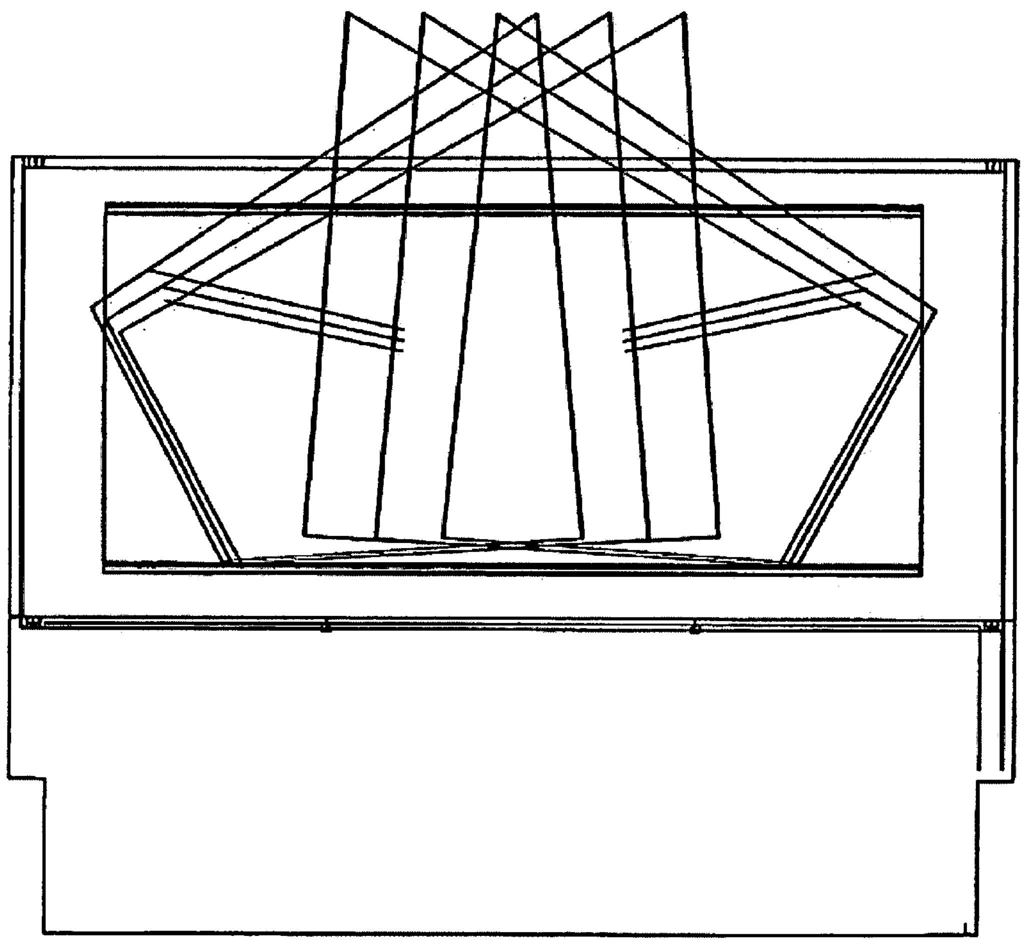
FIG. 5U3

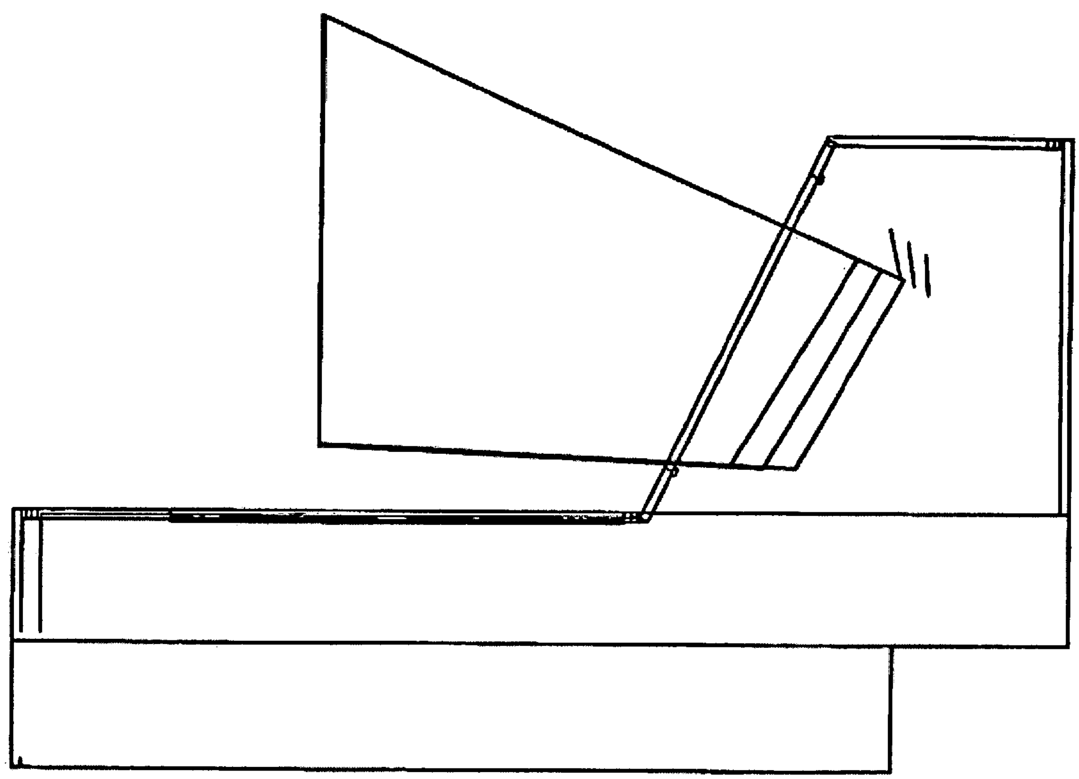
FIG. 5U4

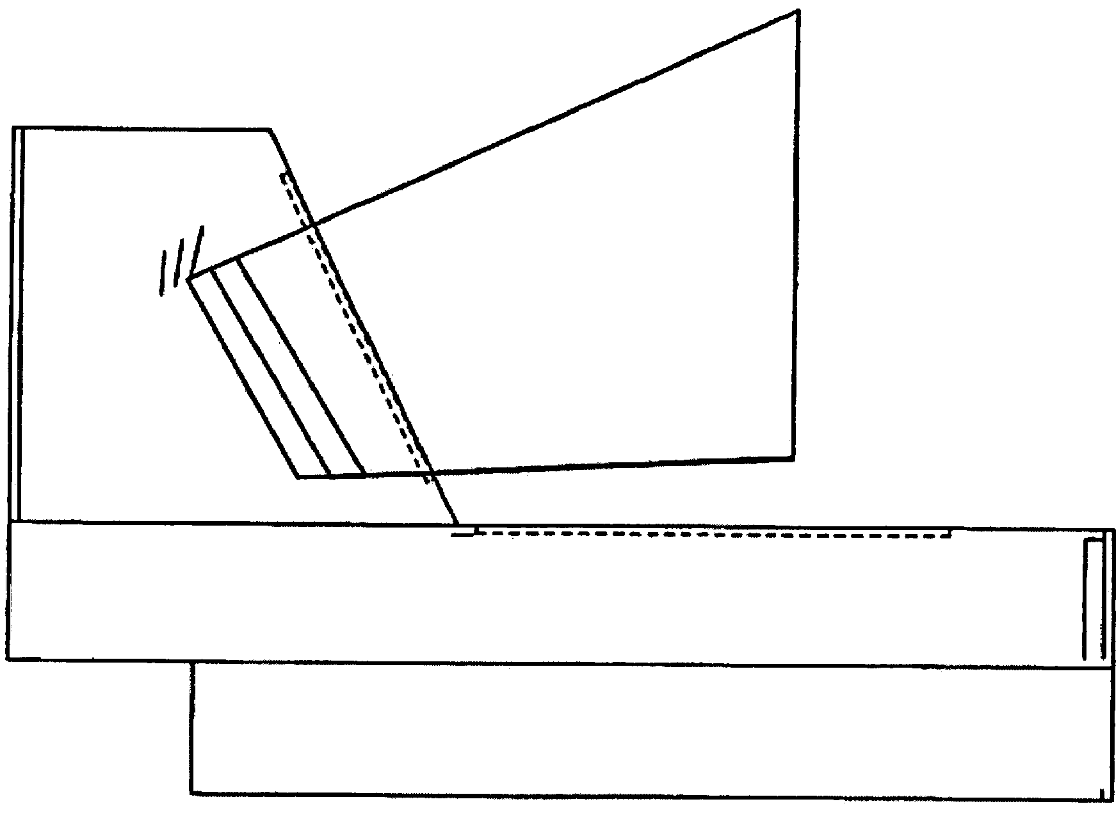
FIG. 5U5

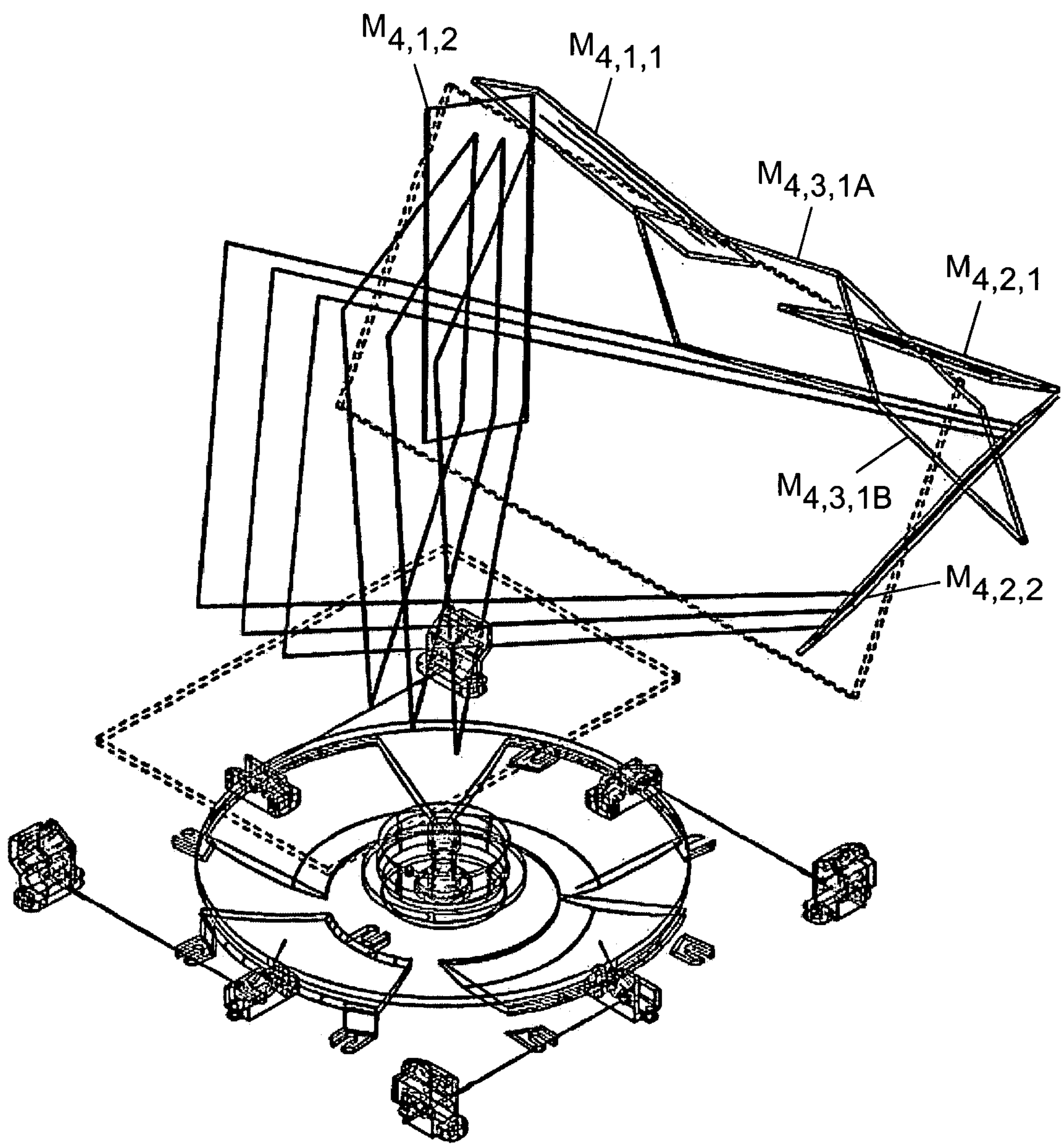
FIG. 5V1

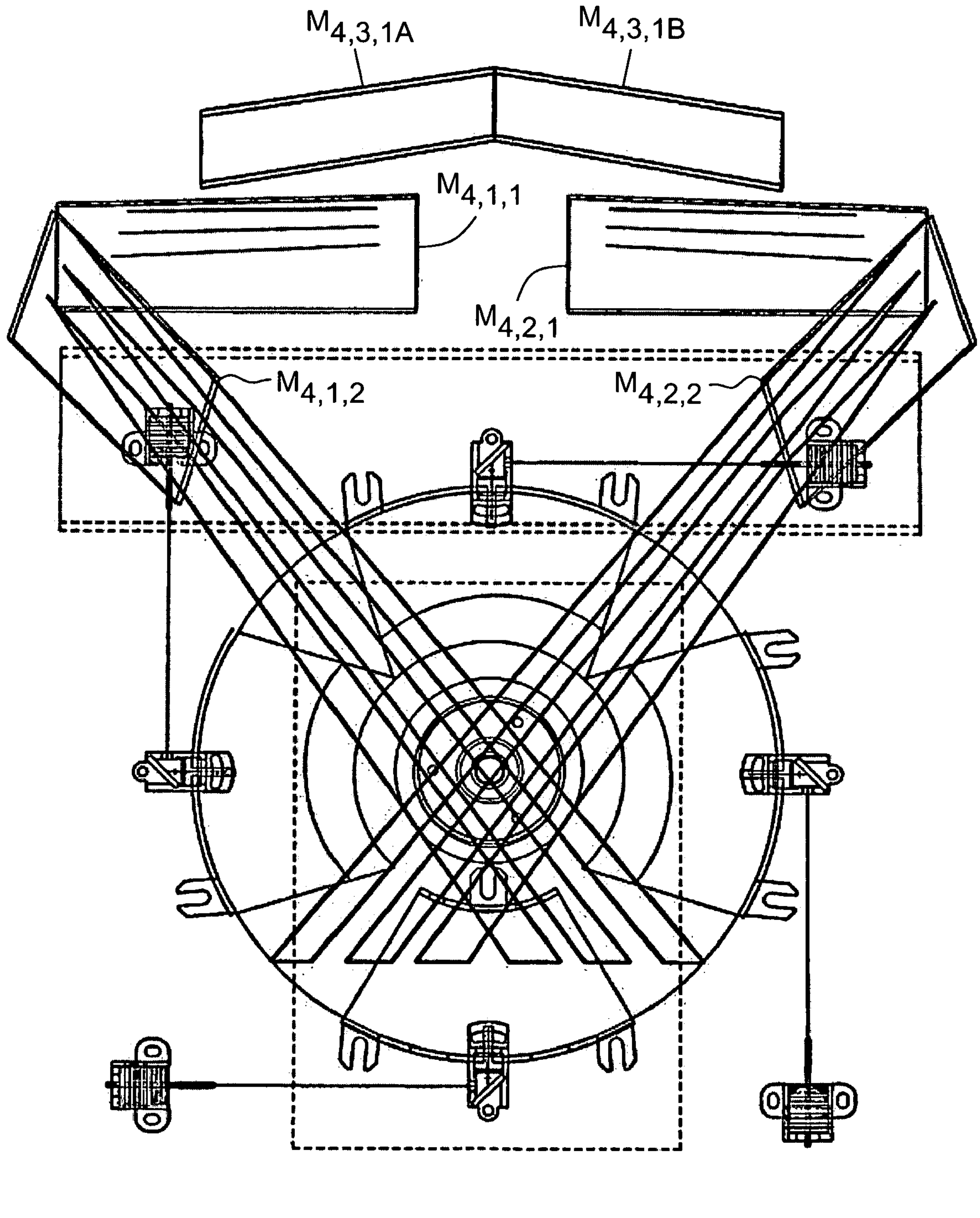
FIG. 5V2

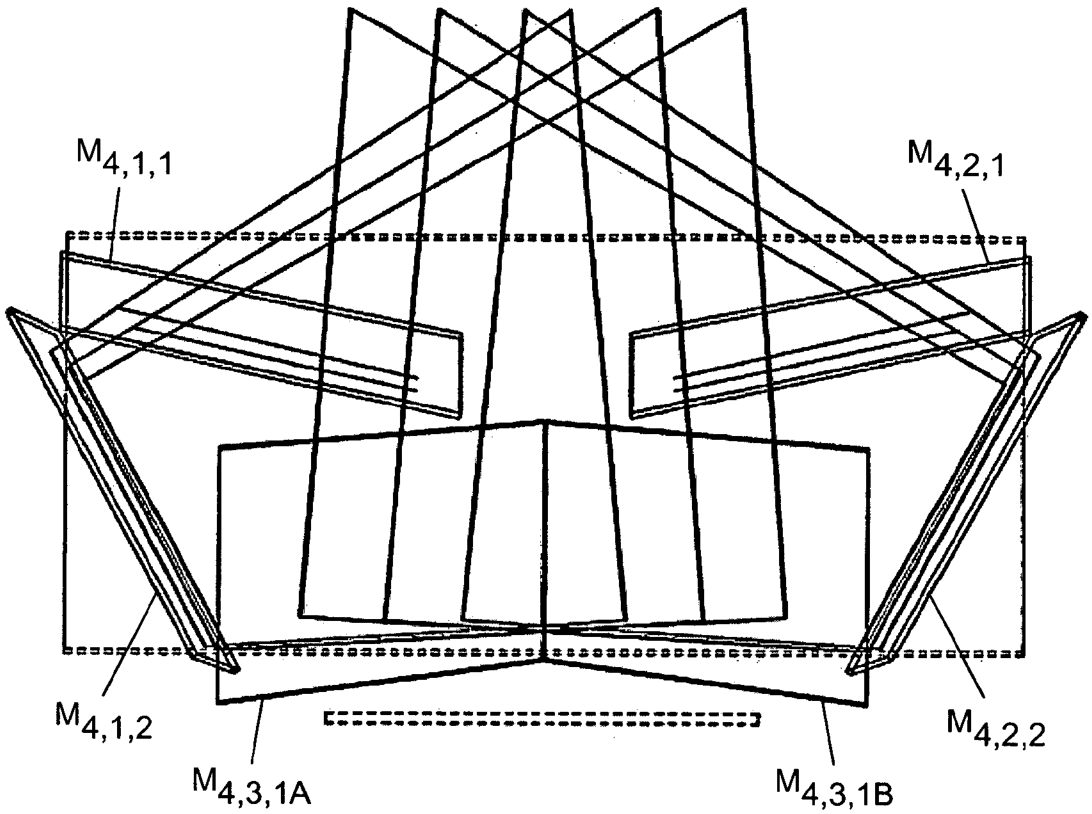
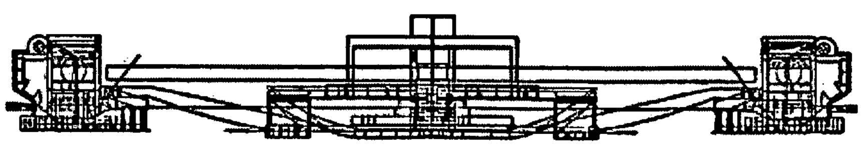
FIG. 5V3

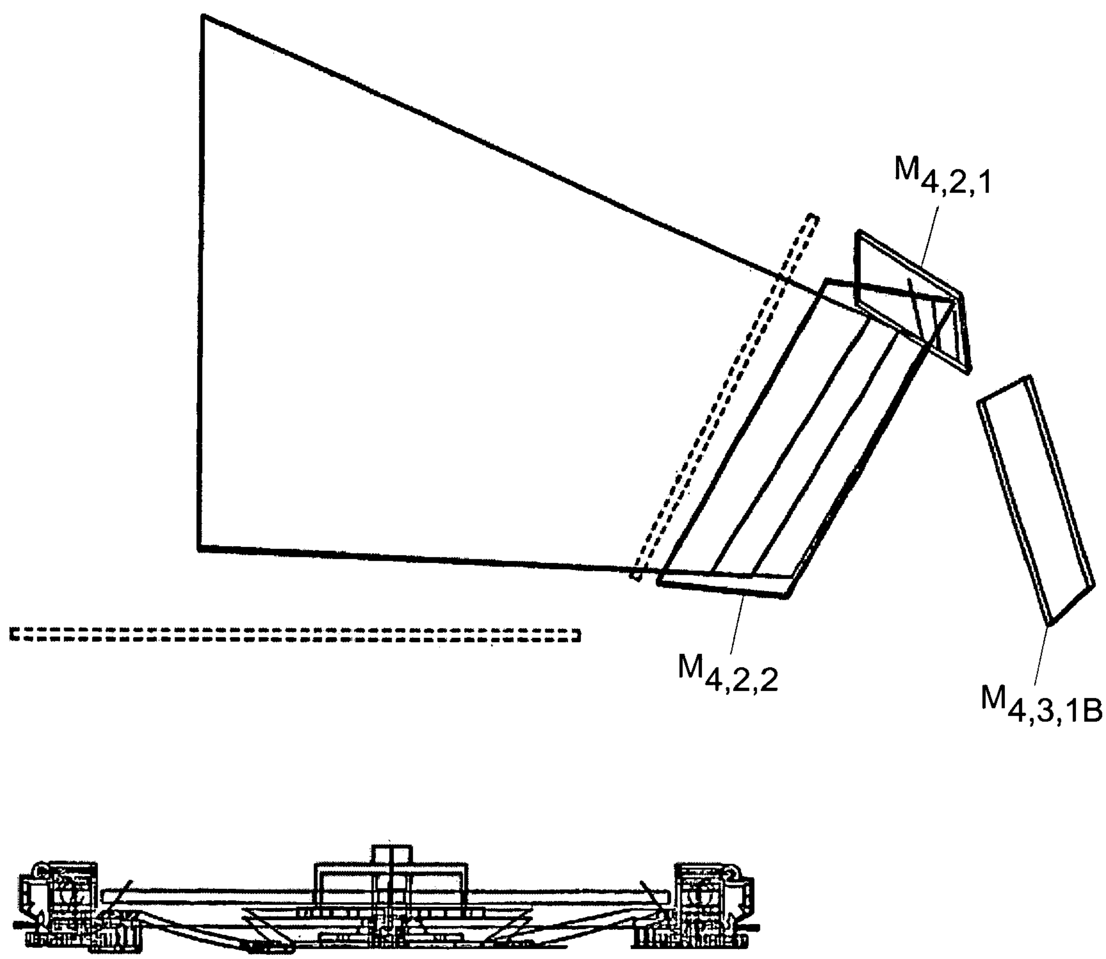
FIG. 5V4

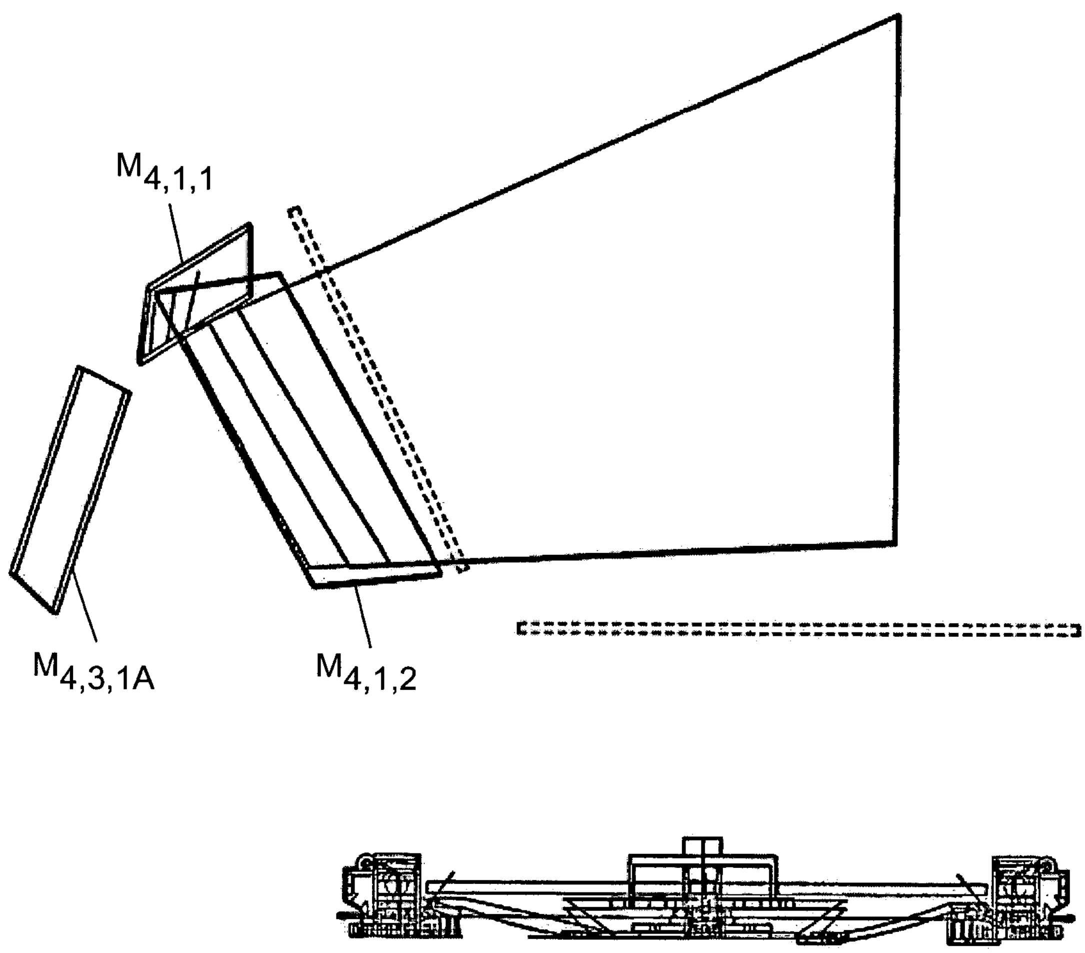
FIG. 5V5

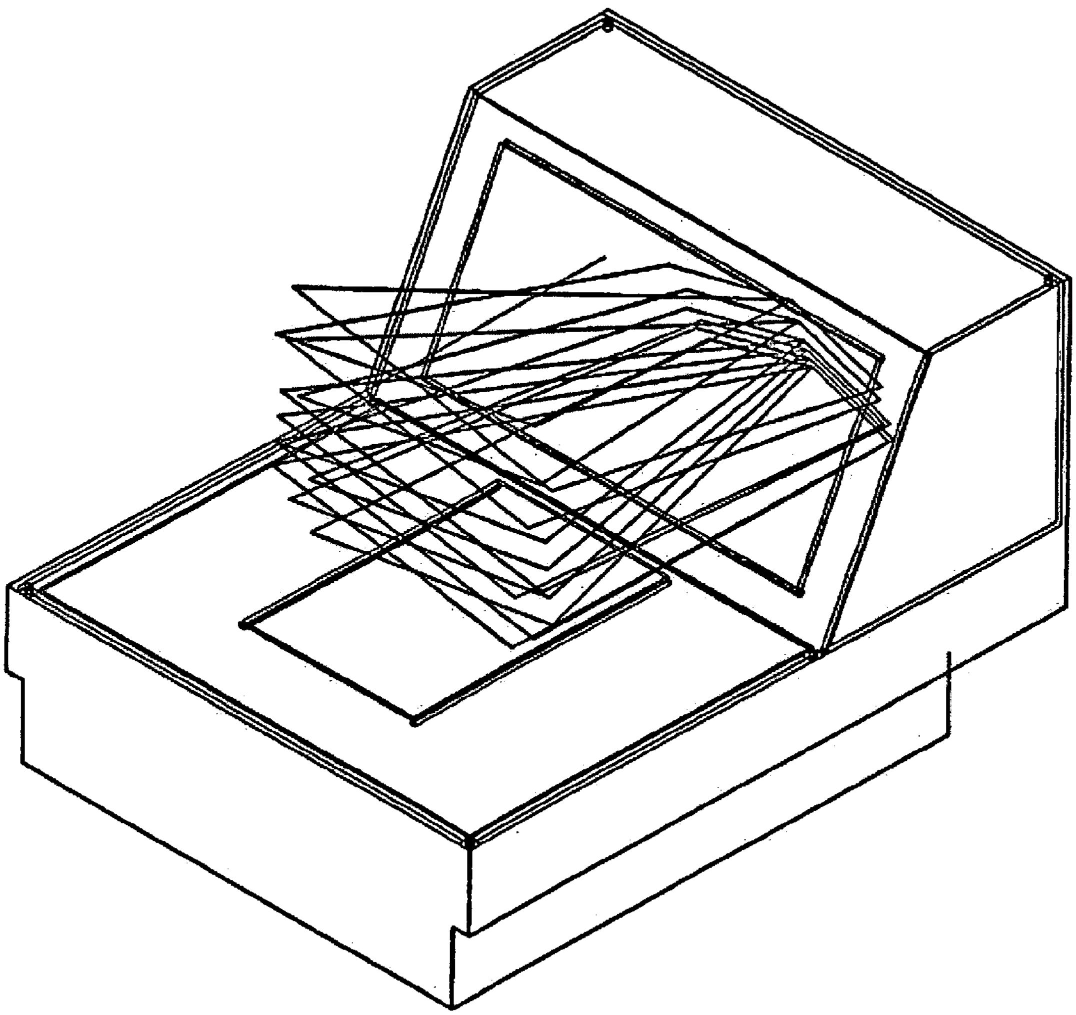
FIG. 5W1

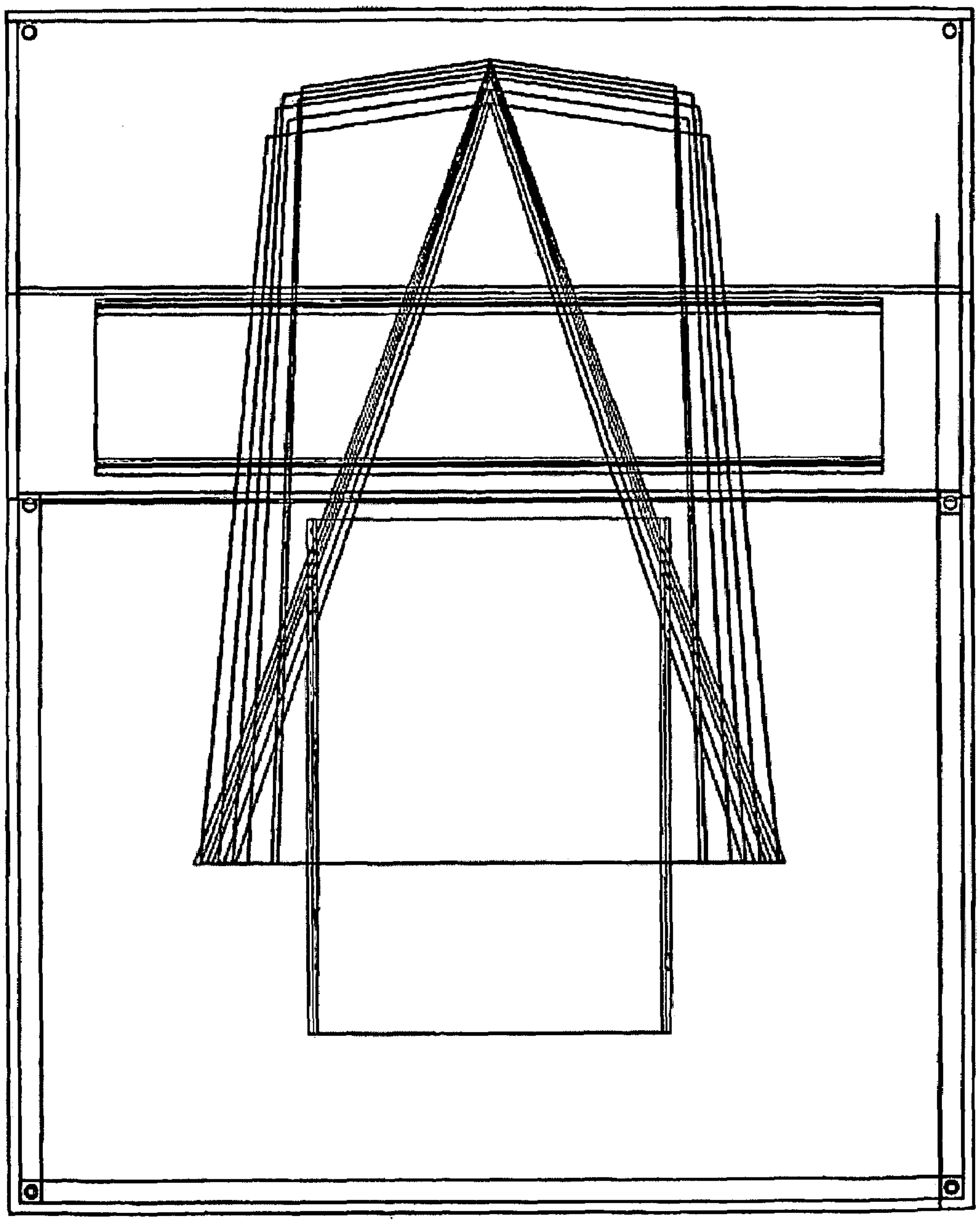
FIG. 5W2

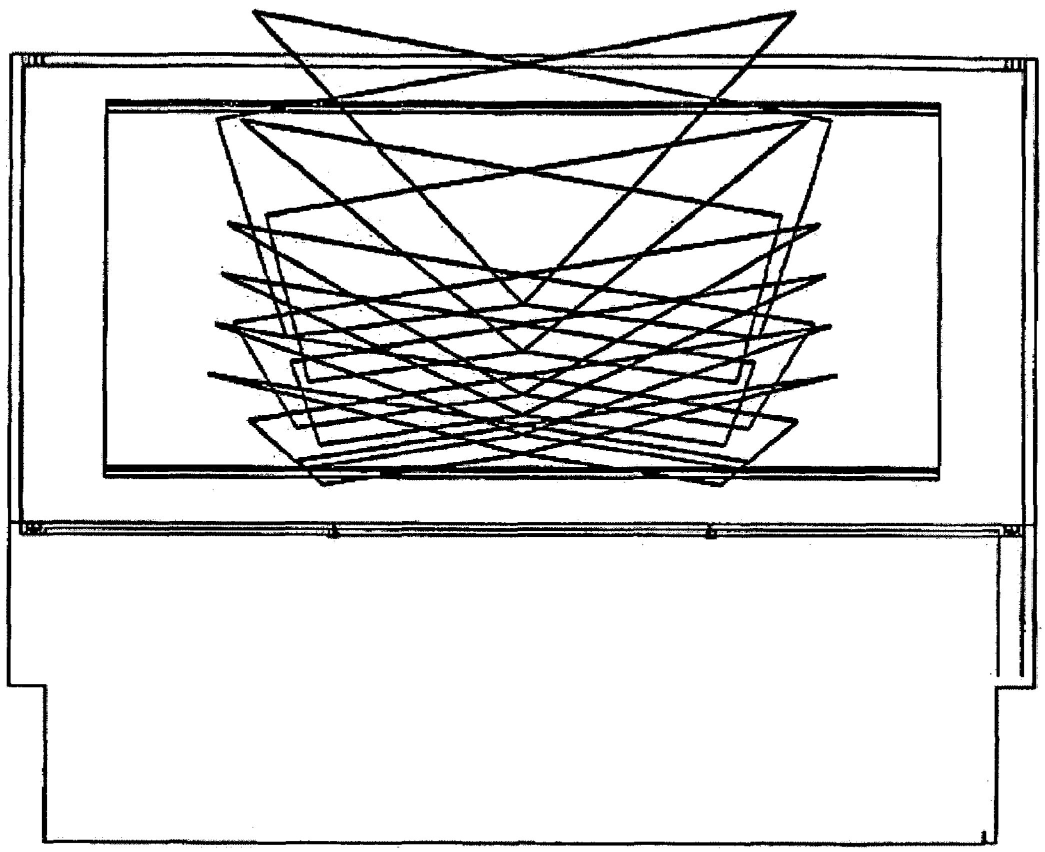
FIG. 5W3

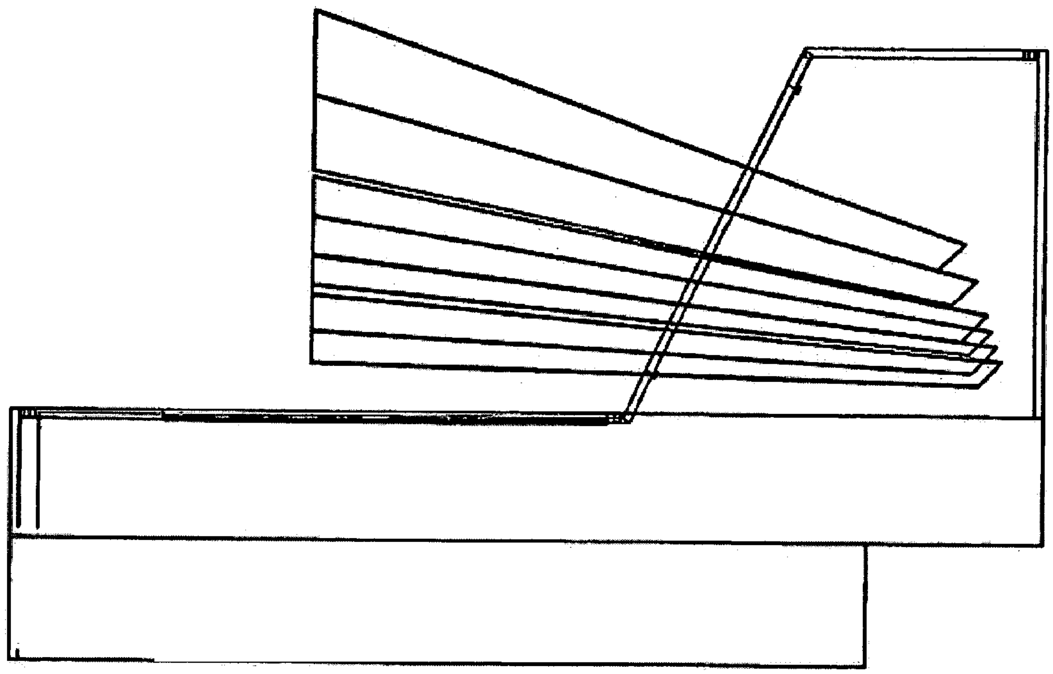
FIG. 5W4

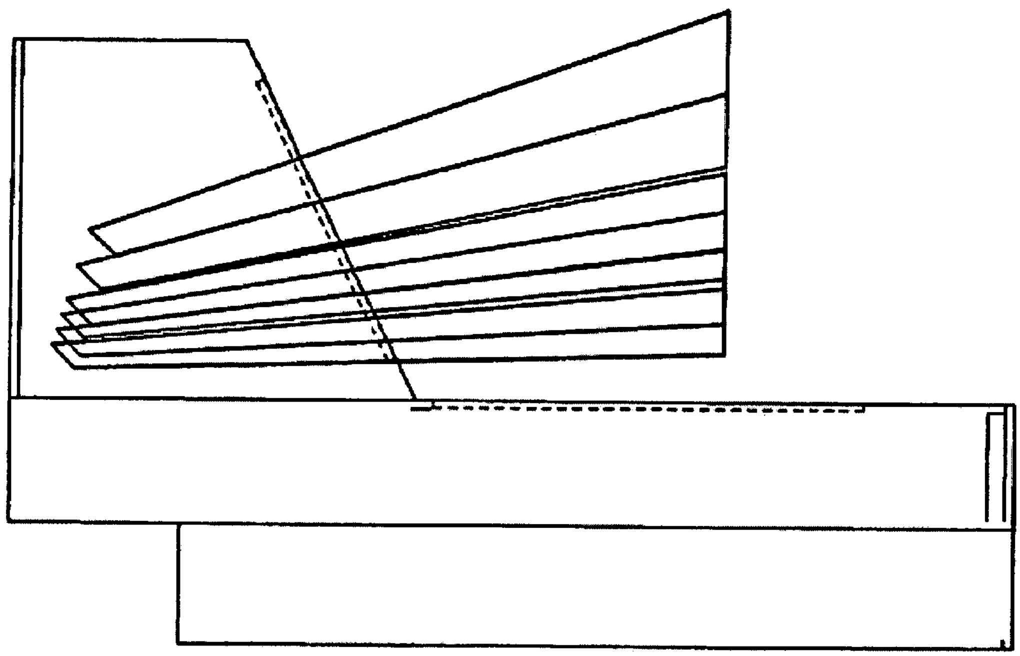
FIG. 5W5

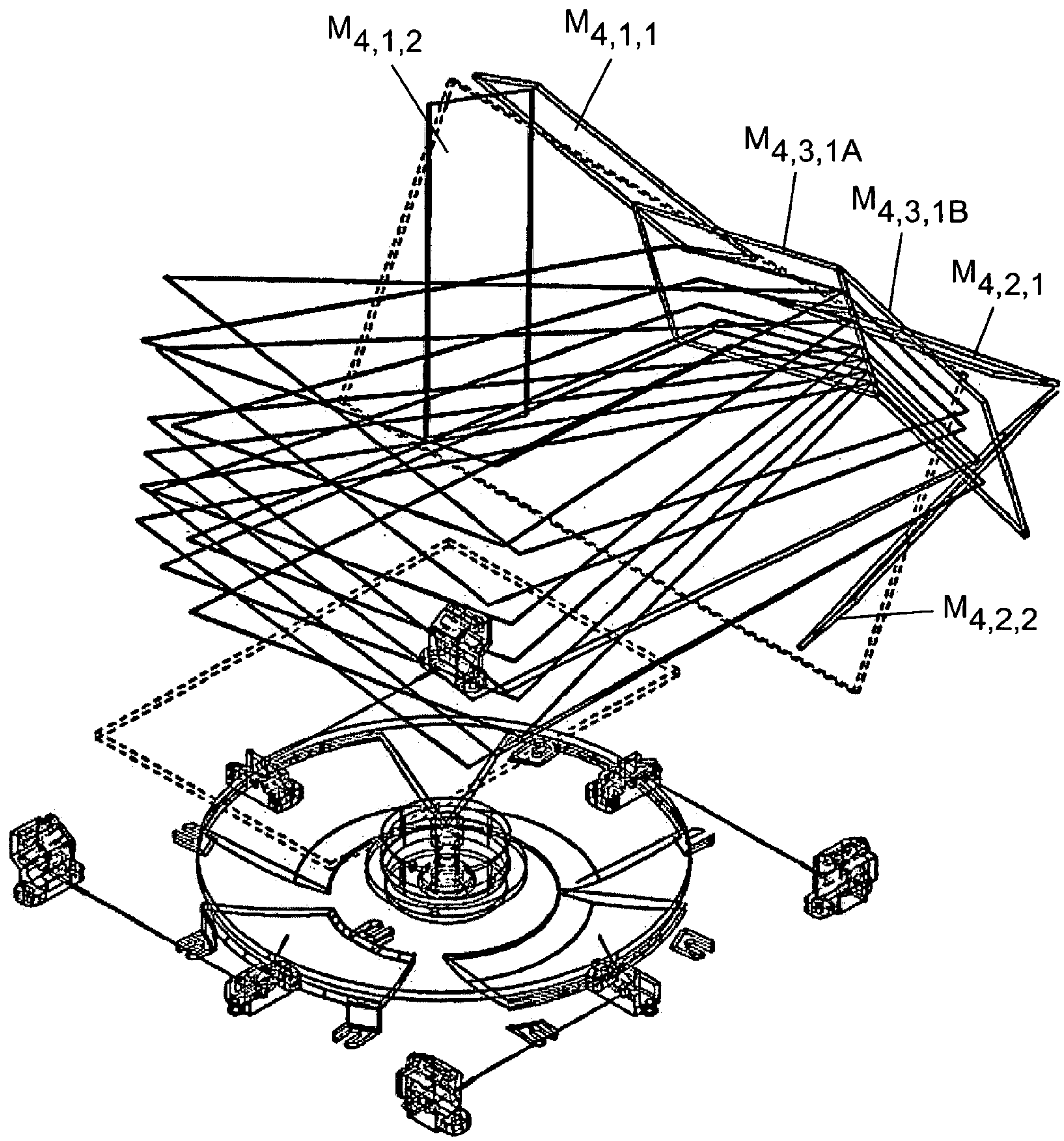
FIG. 5X1

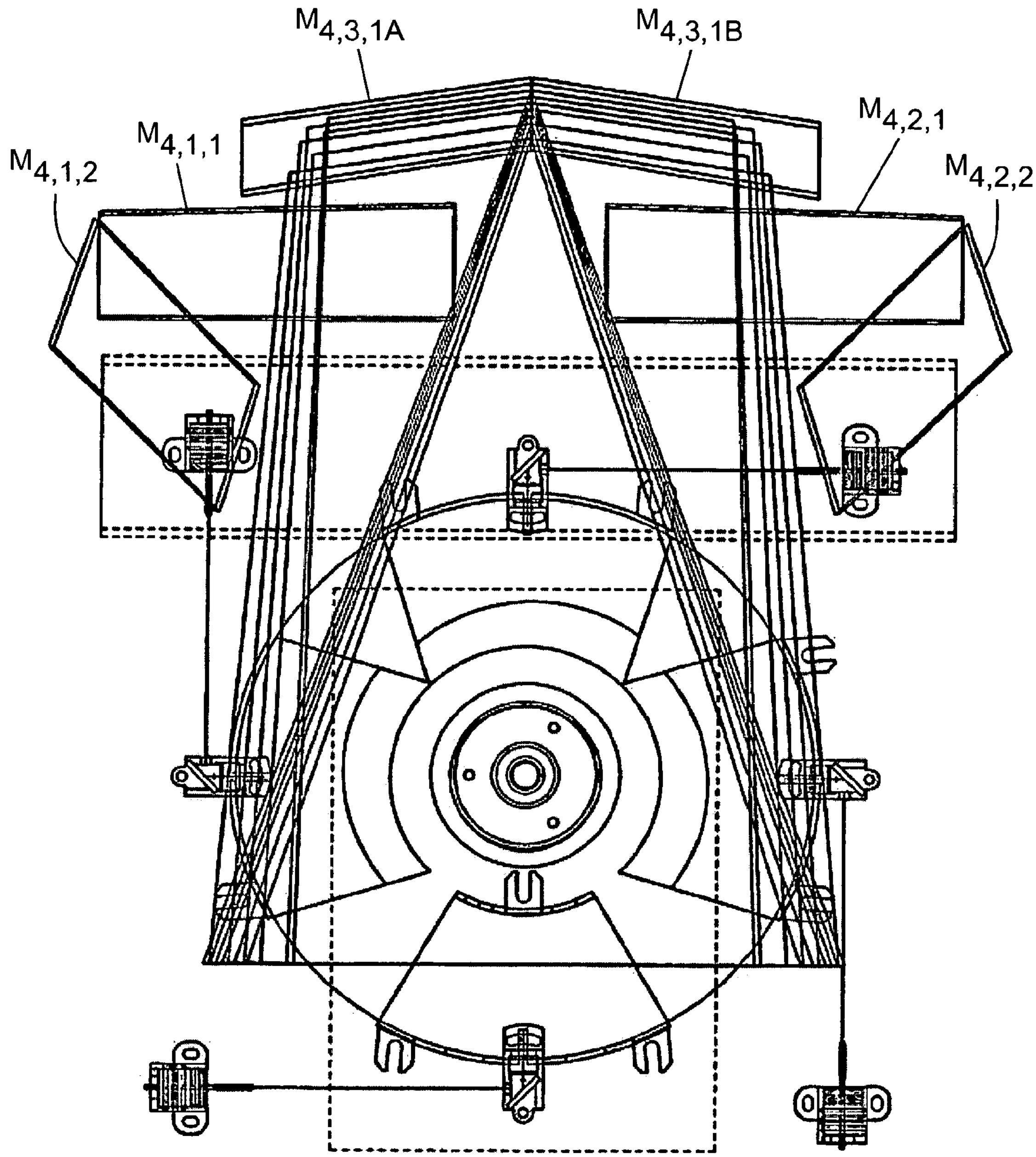
FIG. 5X2

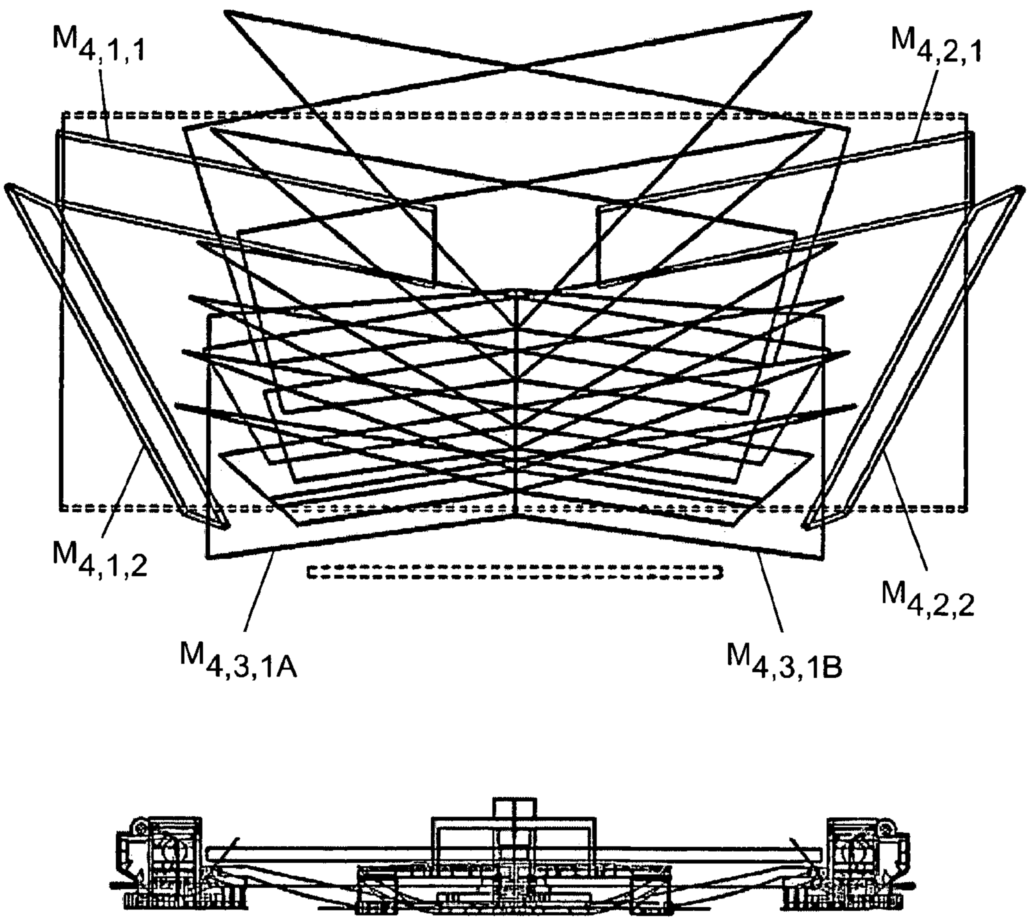
FIG. 5X3

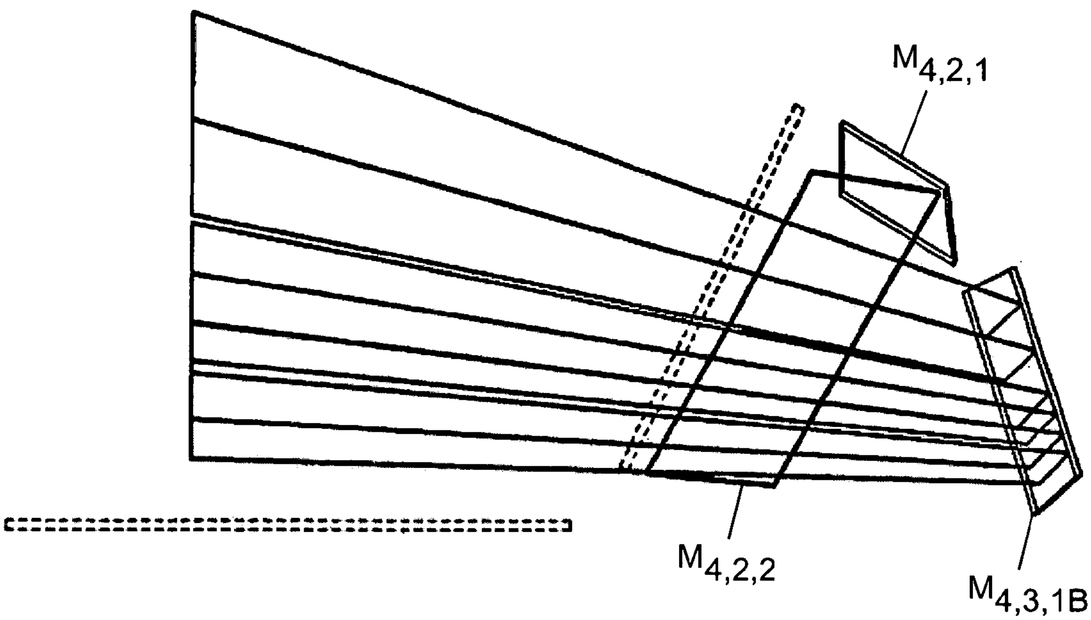
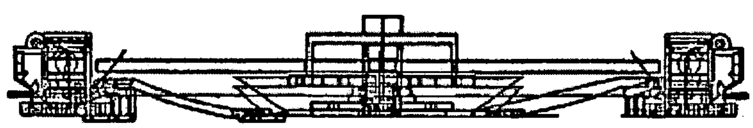
FIG. 5X4

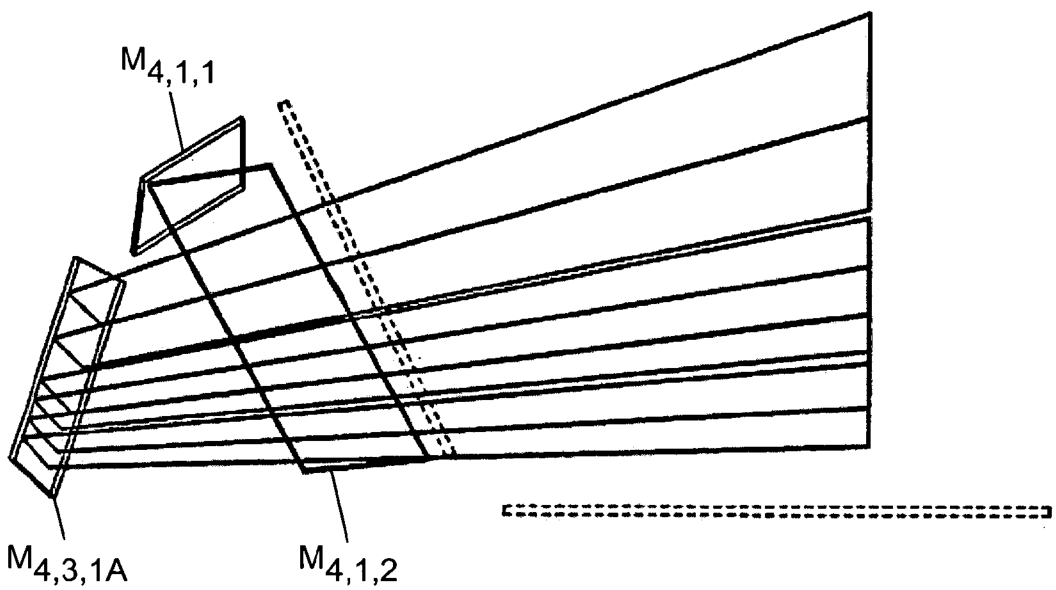
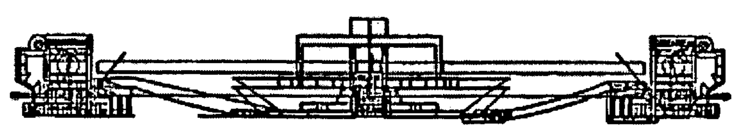
FIG. 5X5

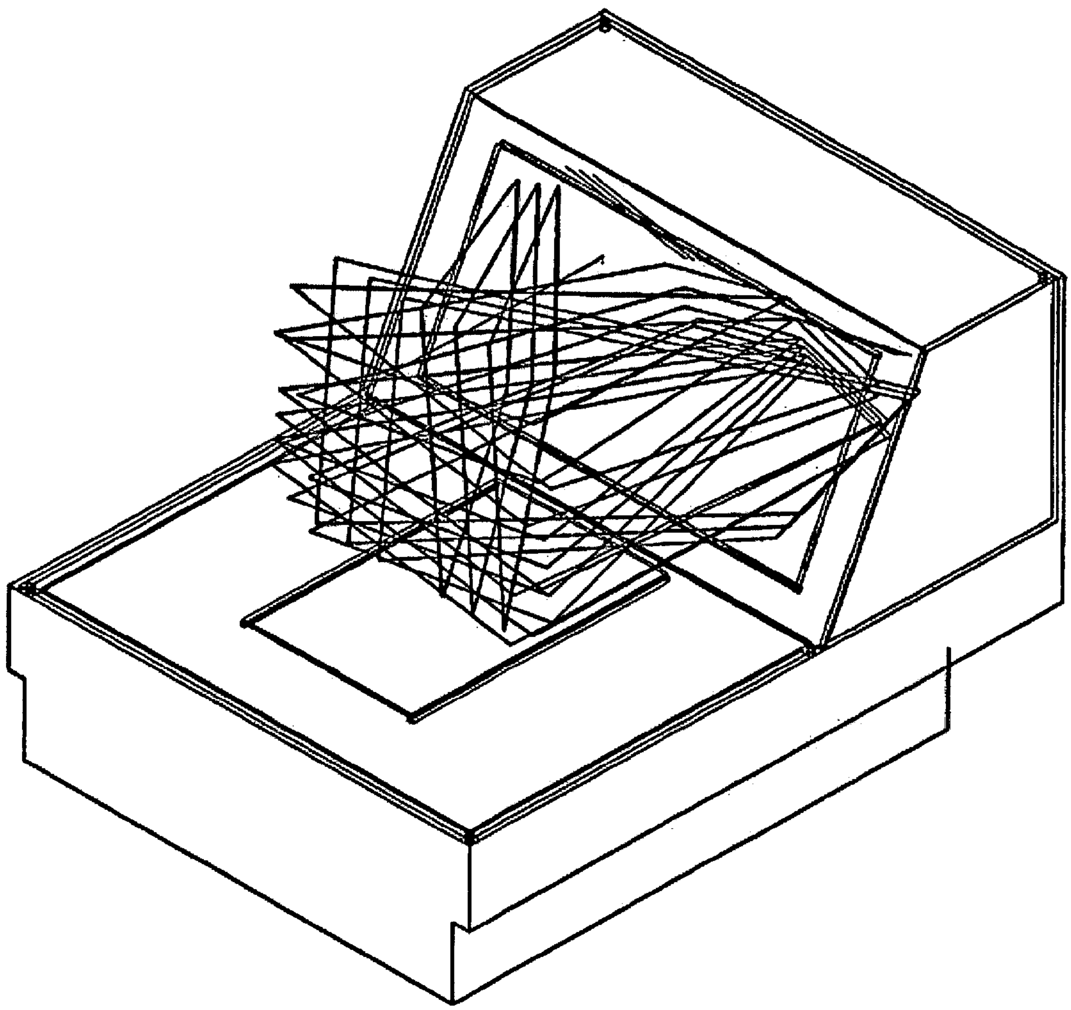
FIG. 5Y1

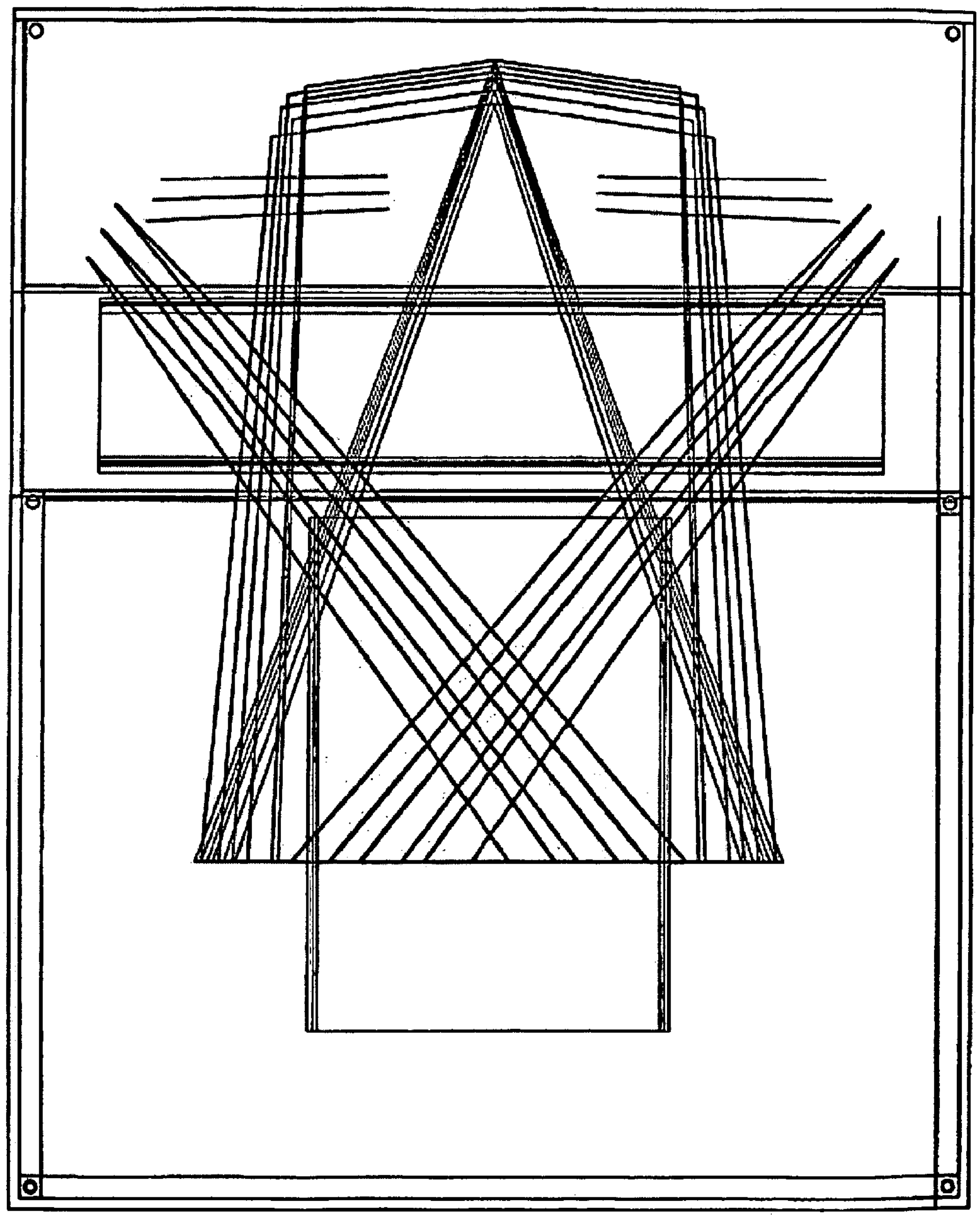
FIG. 5Y2

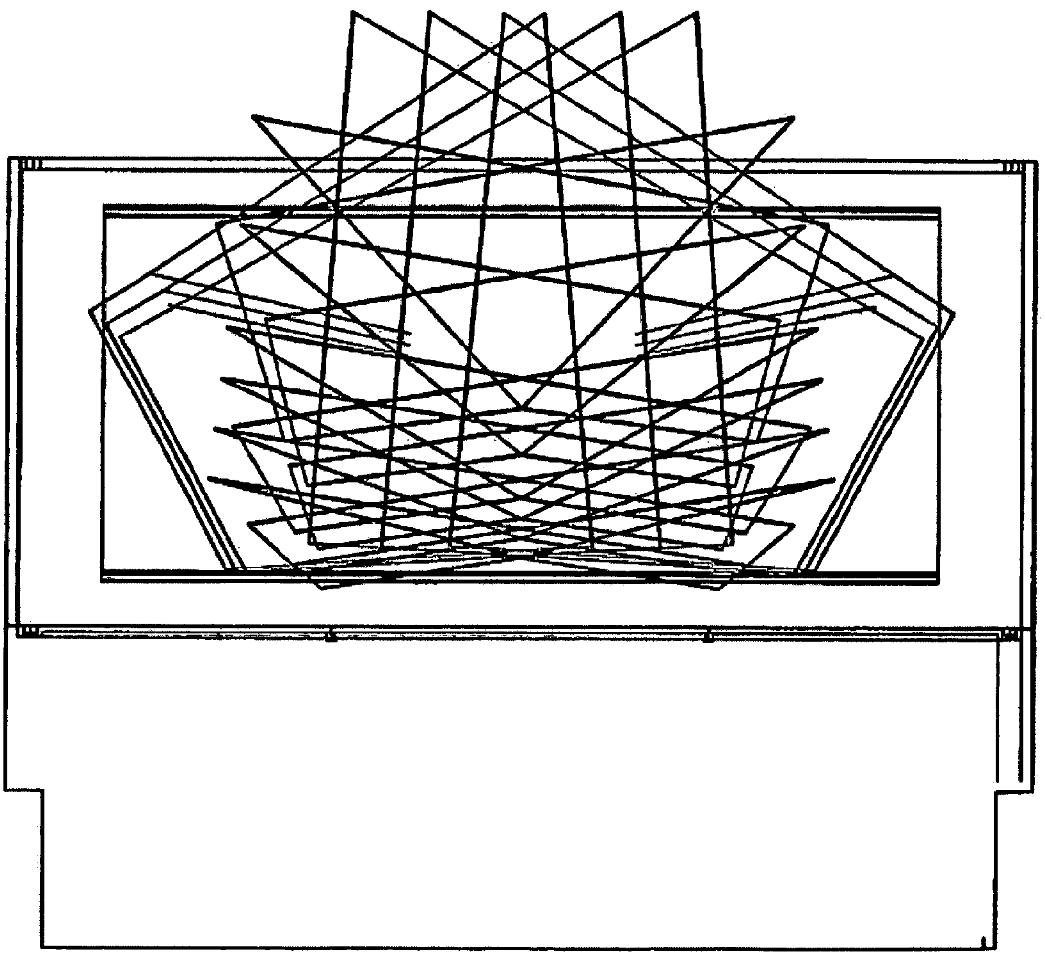
FIG. 5Y3

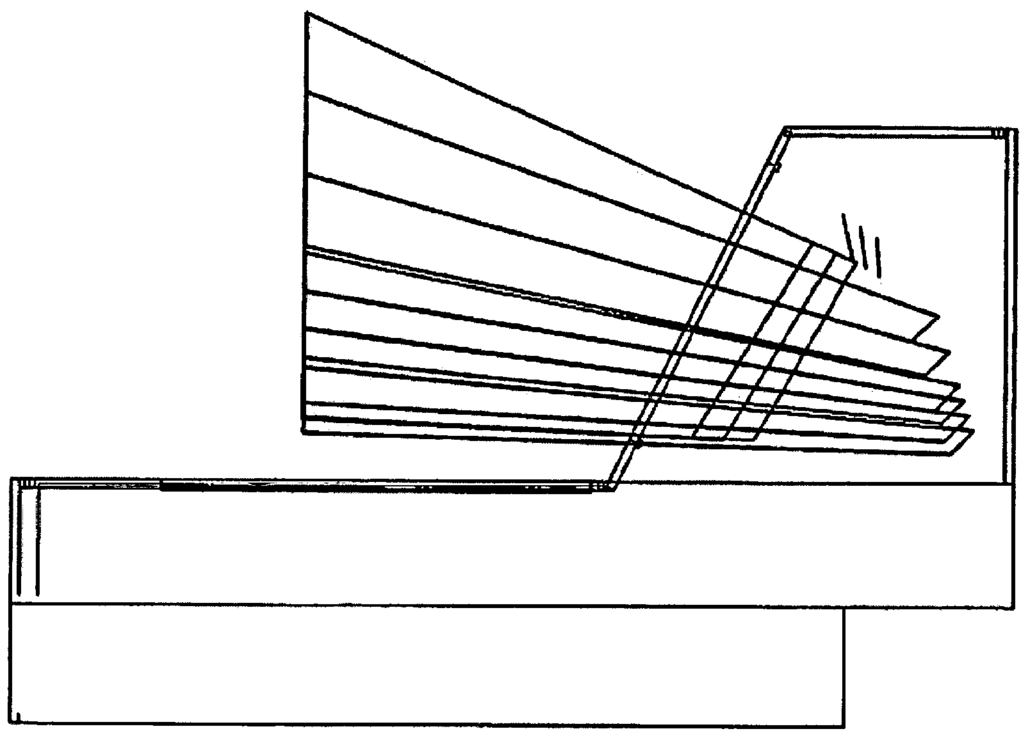
FIG. 5Y4

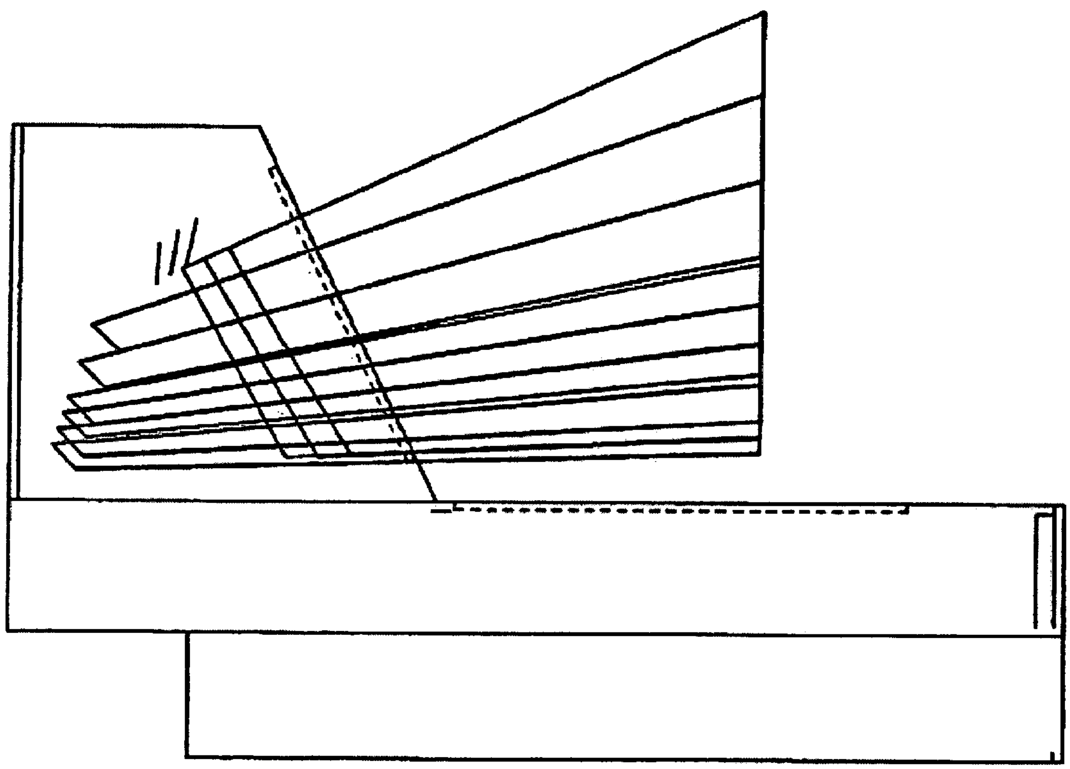
FIG. 5Y5

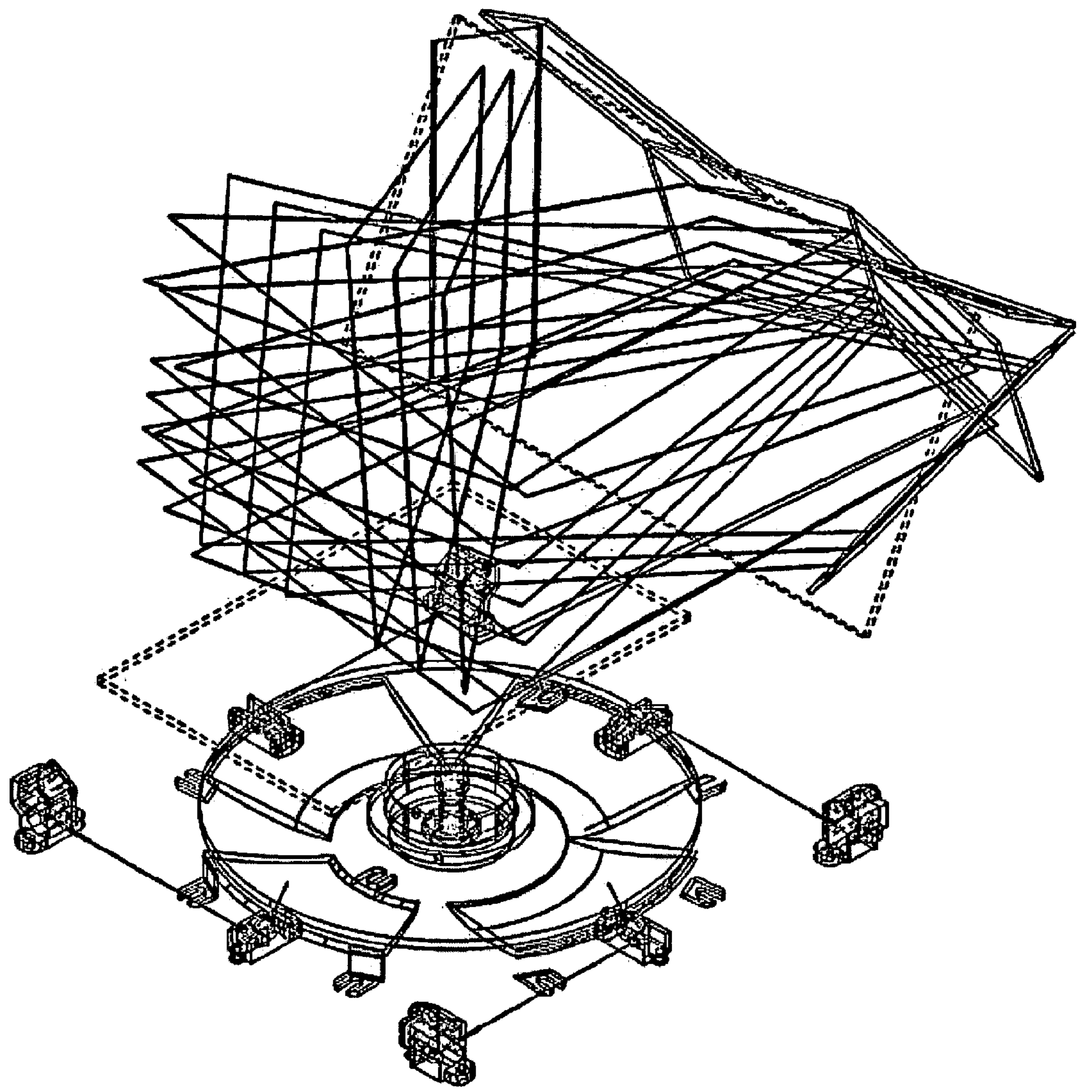
FIG. 5Z1

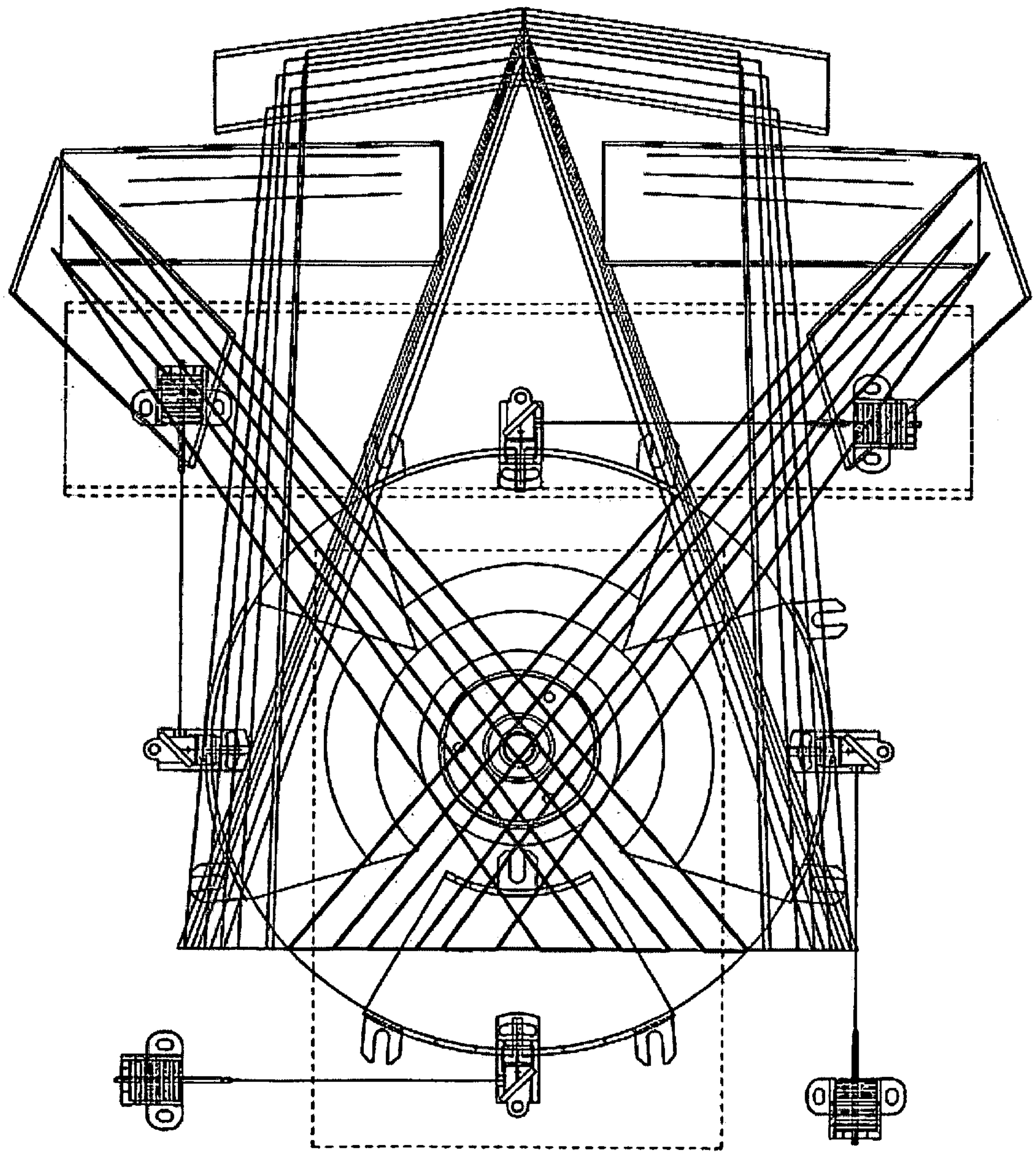
FIG. 5Z2

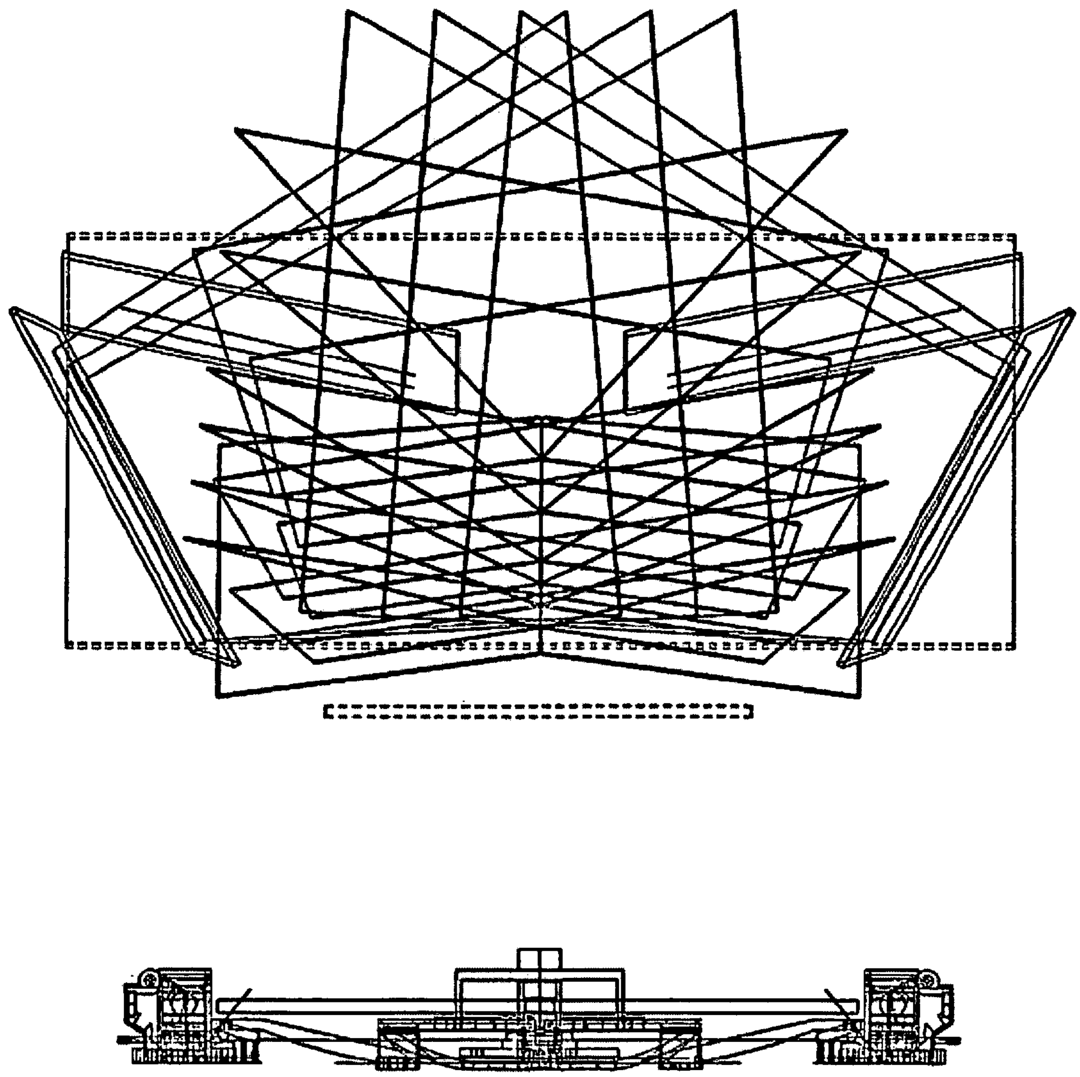
FIG. 5Z3

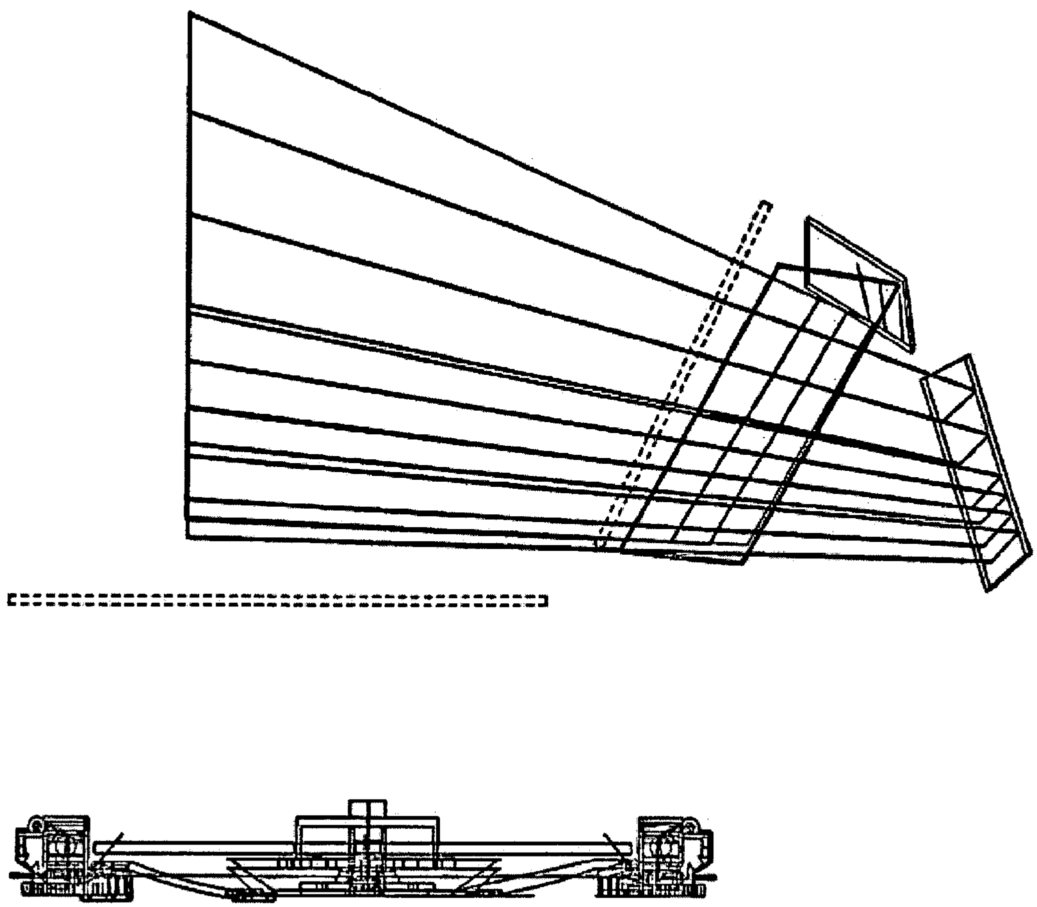
FIG. 5Z4

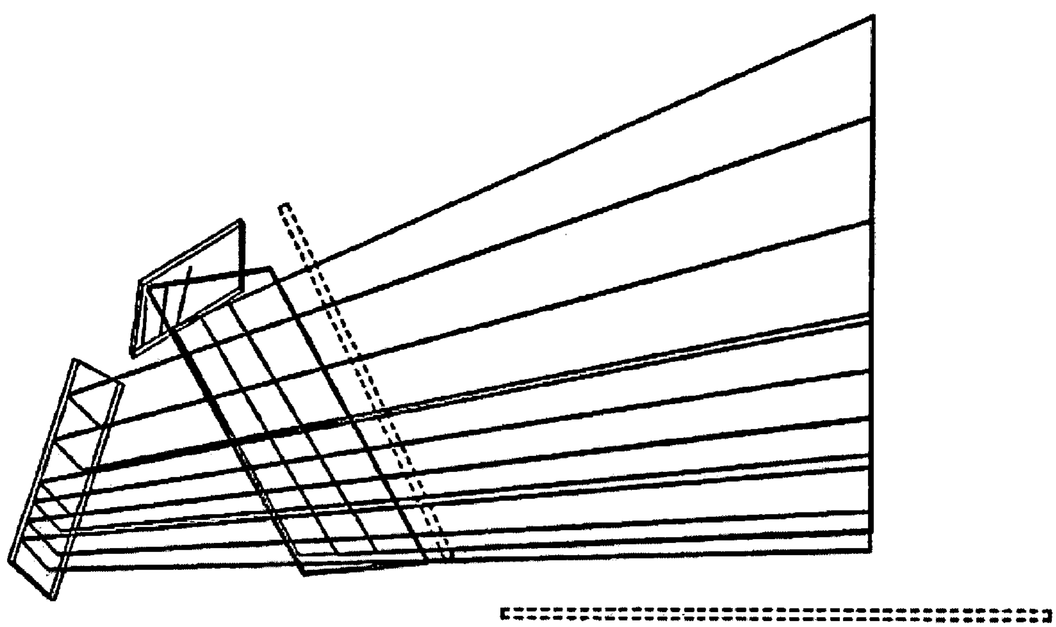
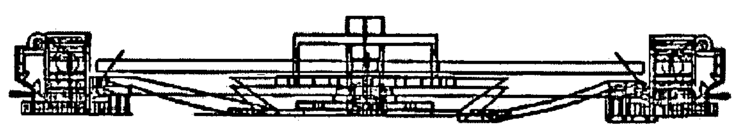
FIG. 5Z5

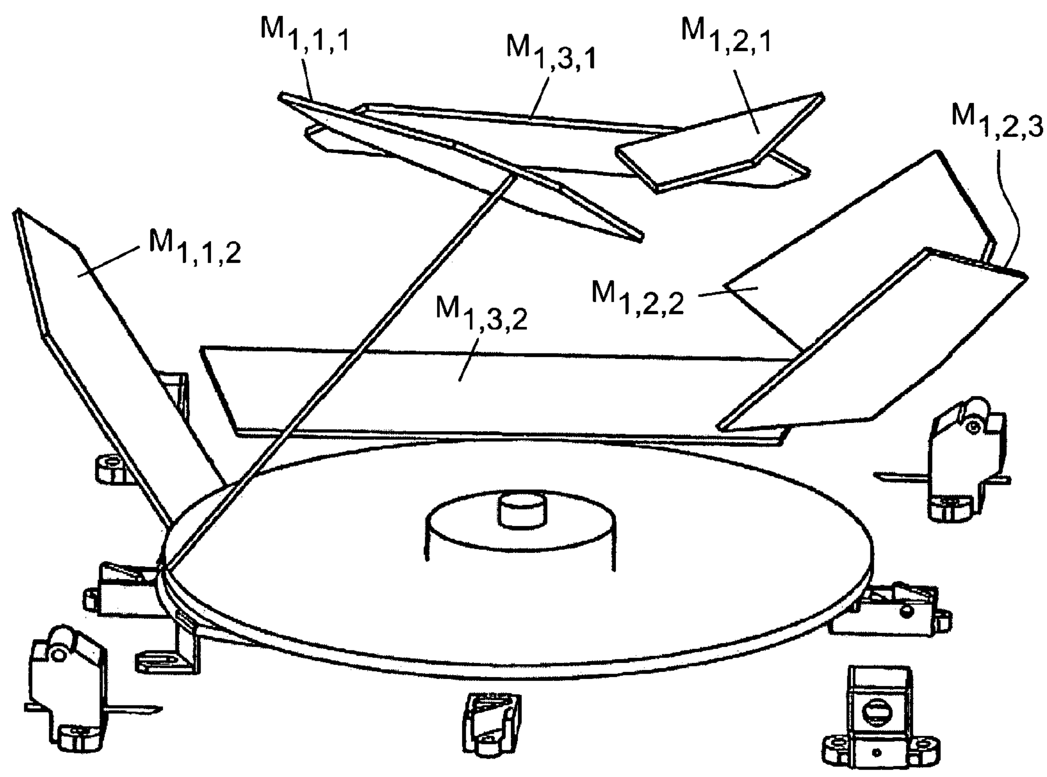
FIG. 6A1

| | N | O | P | Q | R | S | T | U | V | W | X |
|---|---|---|---|---|---|---|---|---|---|---|---|
| 1 | | | | | | | | | | | |
| 2 | | | | | | | | | | | |
| 3 | | | | | | | | | | | |
| 4 | Facet | 7 | | | | | | | | | |
| 5 | x | y | z | | | | | | | | |
| 6 | -0.616 | 0.000 | 0.788 | | | | | | | | |
| 7 | | End | | | | Middle | | | | End | |
| 8 | x | y | z | | x | y | z | | x | y | z |
| 9 | 0.419 | 0.416 | 0.807 | | 0.468 | 0.249 | 0.848 | | 0.494 | 0.048 | 0.868 |
| 10 | -0.253 | 0.917 | -0.310 | | -0.316 | 0.832 | -0.455 | | -0.387 | 0.704 | -0.596 |
| 11 | -0.469 | -0.414 | 0.781 | | -0.537 | -0.527 | 0.659 | | -0.603 | -0.626 | 0.494 |
| 12 | | | | | | | | | | | |
| 13 | | | | | | | | | | | |
| 14 | | Mirror 1 Corners | | | | Mirror 2 Corners | | | | Mirror 3 Corners | |
| 15 | x | y | z | | x | y | z | | x | y | z |
| 16 | 3.900 | 2.436 | 2.770 | | 1.700 | 4.102 | 1.300 | | | | |
| 17 | 4.100 | 1.879 | 2.400 | | 3.300 | 4.400 | 1.980 | | | | |
| 18 | 3.800 | 0.137 | 1.800 | | 3.400 | 3.990 | 1.500 | | | | |
| 19 | 3.150 | -0.737 | 1.800 | | 2.300 | 2.427 | -0.625 | | | | |
| 20 | 2.500 | -0.159 | 2.450 | | 1.700 | 2.524 | -0.625 | | | | |
| 21 | 2.650 | 0.757 | 2.770 | | 1.050 | 3.101 | -0.050 | | | | |
| 22 | | | | | | | | | | | |
| 23 | | | | | | | | | | | |
| 24 | | | | | | | | | | | |

FIG. 6A2

| | A | B | C | D | E | F | G | H | I | J | K | L |
|---|---|---|---|---|---|---|---|---|---|---|---|---|
| 1 | Station 1 | | | | | | | | | | | |
| 2 | | | | | | | | | | | | |
| 3 | | | | | | | | | | | | |
| 4 | High Elevation Left Skew | Facet | 9 | | | | | | | | | |
| 5 | (G2) | x | y | z | | | | | | | | |
| 6 | Vector from Module | -0.616 | 0.000 | 0.788 | | | | | | | | |
| 7 | | | End | | | | Middle | | | | End | |
| 8 | | x | y | z | | x | y | z | | x | y | z |
| 9 | Output Vectors From Disk | 0.378 | 0.445 | 0.812 | | 0.441 | 0.235 | 0.866 | | 0.464 | 0.068 | 0.883 |
| 10 | First Mirror Reflected Directions | -0.269 | 0.927 | -0.263 | | -0.349 | 0.823 | -0.448 | | -0.408 | 0.717 | -0.565 |
| 11 | Second Mirror Reflected Directions | -0.479 | -0.367 | 0.797 | | -0.566 | -0.512 | 0.647 | | -0.621 | -0.595 | 0.510 |
| 12 | Third Mirror Reflected Directions | | | | | | | | | | | |
| 13 | | | | | | | | | | | | |
| 14 | | | Mirror 1 Corners | | | | Mirror 2 Corners | | | | Mirror 3 Corners | |
| 15 | | x | y | z | | x | y | z | | x | y | z |
| 16 | 1 | 3.900 | 2.436 | 2.770 | | 1.700 | 4.102 | 1.300 | | | | |
| 17 | 2 | 4.100 | 1.879 | 2.400 | | 3.300 | 4.400 | 1.980 | | | | |
| 18 | 3 | 3.800 | 0.137 | 1.800 | | 3.400 | 3.990 | 1.500 | | | | |
| 19 | 4 | 3.150 | -0.737 | 1.800 | | 2.300 | 2.427 | -0.625 | | | | |
| 20 | 5 | 2.500 | -0.159 | 2.450 | | 1.700 | 2.524 | -0.625 | | | | |
| 21 | 6 | 2.650 | 0.757 | 2.770 | | 1.050 | 3.101 | -0.050 | | | | |
| 22 | 7 | | | | | | | | | | | |
| 23 | 8 | | | | | | | | | | | |

FIG. 6A3

| | Z | AA | AB | AC | AD | AE | AF | AG | AH | AI | AJ |
|---|---|---|---|---|---|---|---|---|---|---|---|
| 1 | | | | | | | | | | | |
| 2 | | | | | | | | | | | |
| 3 | | | | | | | | | | | |
| 4 | Facet | 11 | | | | | | | | | |
| 5 | x | y | z | | | | | | | | |
| 6 | -0.616 | 0.000 | 0.788 | | | | | | | | |
| 7 | | End | | | | Middle | | | | End | |
| 8 | x | y | z | | x | y | z | | x | y | z |
| 9 | 0.333 | 0.476 | 0.814 | | 0.415 | 0.220 | 0.883 | | 0.433 | 0.086 | 0.897 |
| 10 | -0.284 | 0.935 | -0.211 | | -0.382 | 0.813 | -0.440 | | -0.429 | 0.728 | -0.535 |
| 11 | -0.487 | -0.316 | 0.814 | | -0.594 | -0.496 | 0.633 | | -0.638 | -0.564 | 0.524 |
| 12 | | | | | | | | | | | |
| 13 | | | | | | | | | | | |
| 14 | | Mirror 1 Corners | | | | Mirror 2 Corners | | | | Mirror 3 Corners | |
| 15 | x | y | z | | x | y | z | | x | y | z |
| 16 | 3.900 | 2.436 | 2.770 | | 1.700 | 4.102 | 1.300 | | | | |
| 17 | 4.100 | 1.879 | 2.400 | | 3.300 | 4.400 | 1.980 | | | | |
| 18 | 3.800 | 0.137 | 1.800 | | 3.400 | 3.990 | 1.500 | | | | |
| 19 | 3.150 | -0.737 | 1.800 | | 2.300 | 2.427 | -0.625 | | | | |
| 20 | 2.500 | -0.159 | 2.450 | | 1.700 | 2.524 | -0.625 | | | | |
| 21 | 2.650 | 0.757 | 2.770 | | 1.050 | 3.101 | -0.050 | | | | |
| 22 | | | | | | | | | | | |
| 23 | | | | | | | | | | | |
| 24 | | | | | | | | | | | |

FIG. 6A4

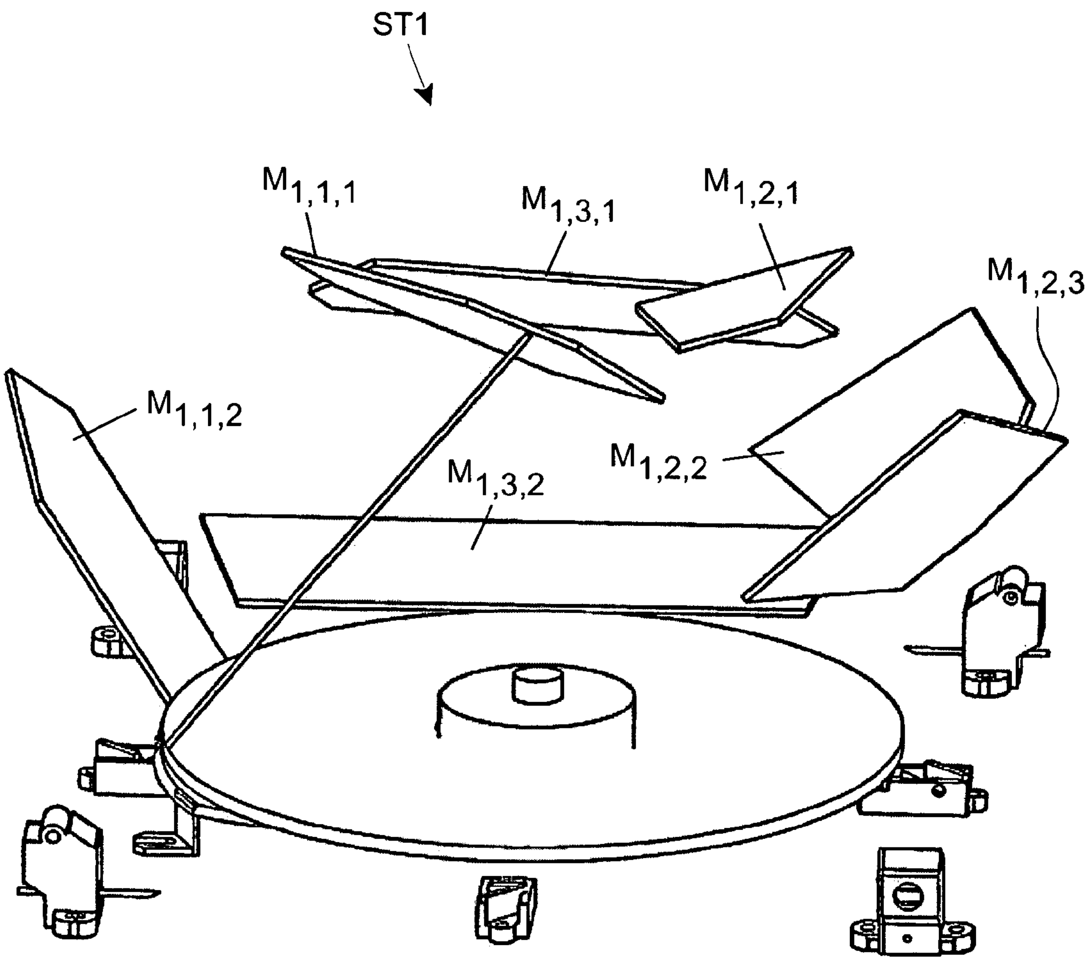
FIG. 6B1

| | N | O | P | Q | R | S | T | U | V | W | X |
|---|---|---|---|---|---|---|---|---|---|---|---|
| 25 | Facet | 8 | | | | | | | | | |
| 26 | x | y | z | | | | | | | | |
| 27 | -0.616 | 0.000 | 0.788 | | | | | | | | |
| 28 | | End | | | | Middle | | | | End | |
| 29 | x | y | z | | x | y | z | | x | y | z |
| 30 | 0.468 | -0.249 | 0.848 | | 0.468 | -0.249 | 0.848 | | 0.430 | -0.387 | 0.816 |
| 31 | 0.408 | -0.675 | -0.614 | | 0.408 | -0.675 | -0.614 | | 0.375 | -0.774 | -0.510 |
| 32 | -0.999 | 0.012 | -0.034 | | -0.999 | 0.012 | -0.034 | | -0.993 | -0.106 | 0.054 |
| 33 | -0.616 | 0.531 | 0.582 | | -0.616 | 0.531 | 0.582 | | -0.605 | 0.419 | 0.677 |
| 34 | | | | | | | | | | | |
| 35 | | | | | | | | | | | |
| 36 | | | | | | | | | | | |
| 37 | | | | | | | | | | | |
| 38 | | | | | | | | | | | |
| 39 | | | | | | | | | | | |
| 40 | | | | | | | | | | | |
| 41 | | | | | | | | | | | |
| 42 | | | | | | | | | | | |
| 43 | | | | | | | | | | | |
| 44 | | | | | | | | | | | |
| 45 | | | | | | | | | | | |

FIG. 6B2

| | A | B | C | D | E | F | G | H | I | J | K | L |
|---|---|---|---|---|---|---|---|---|---|---|---|---|
| 25 | High Elevation Right Skew | Facet | 10 | | | | | | | | | |
| 26 | (G1) | x | y | z | | | | | | | | |
| 27 | Vector from Module | -0.616 | 0.000 | 0.788 | | | | | | | | |
| 28 | | | End | | | | Middle | | | | End | |
| 29 | | x | y | z | | x | y | z | | x | y | z |
| 30 | Output Vectors From Disk | 0.441 | -0.235 | 0.866 | | 0.441 | -0.235 | 0.866 | | 0.398 | -0.391 | 0.830 |
| 31 | First Mirror Reflected Directions | 0.380 | -0.673 | -0.635 | | 0.380 | -0.673 | -0.635 | | 0.343 | -0.784 | -0.517 |
| 32 | Second Mirror Reflected Directions | -0.998 | 0.000 | -0.067 | | -0.998 | 0.000 | -0.067 | | -0.991 | -0.133 | 0.033 |
| 33 | Third Mirror Reflected Directions | -0.589 | 0.553 | 0.589 | | -0.589 | 0.553 | 0.589 | | -0.578 | 0.426 | 0.697 |
| 34 | | | | | | | | | | | | |
| 35 | | | Mirror 1 Corners | | | | Mirror 2 Corners | | | | Mirror 3 Corners | |
| 36 | | x | y | z | | x | y | z | | x | y | z |
| 37 | 1 | 2.550 | -1.630 | 2.650 | | 4.000 | -2.630 | 0.049 | | 3.746 | -3.750 | 1.000 |
| 38 | 2 | 4.150 | -2.267 | 2.770 | | 4.900 | -1.400 | 0.775 | | 1.371 | -3.300 | 2.100 |
| 39 | 3 | 3.950 | 0.196 | 2.060 | | 4.600 | -3.150 | 2.118 | | 1.159 | -1.600 | 0.800 |
| 40 | 4 | 2.420 | -0.309 | 2.270 | | 3.800 | -3.900 | 1.067 | | 2.824 | -2.000 | 0.100 |
| 41 | 5 | | | | | | | | | 3.771 | -2.700 | 0.100 |
| 42 | 6 | | | | | | | | | | | |
| 43 | 7 | | | | | | | | | | | |
| 44 | 8 | | | | | | | | | | | |
| 45 | | | | | | | | | | | | |

FIG. 6B3

| | Z | AA | AB | AC | AD | AE | AF | AG | AH | AI | AJ |
|---|---|---|---|---|---|---|---|---|---|---|---|
| 25 | Facet | 12 | | | | | | | | | |
| 26 | x | y | z | | | | | | | | |
| 27 | -0.616 | 0.000 | 0.788 | | | | | | | | |
| 28 | | End | | | | Middle | | | | End | |
| 29 | x | y | z | | x | y | z | | x | y | z |
| 30 | 0.415 | -0.220 | 0.883 | | 0.415 | -0.220 | 0.883 | | 0.369 | -0.387 | 0.845 |
| 31 | 0.351 | -0.669 | -0.655 | | 0.351 | -0.669 | -0.655 | | 0.312 | -0.788 | -0.530 |
| 32 | -0.995 | -0.012 | -0.099 | | -0.995 | -0.012 | -0.099 | | -0.988 | -0.153 | 0.007 |
| 33 | -0.562 | 0.574 | 0.596 | | -0.562 | 0.574 | 0.596 | | -0.550 | 0.439 | 0.710 |
| 34 | | | | | | | | | | | |
| 35 | | Mirror 1 Corners | | | | Mirror 2 Corners | | | | Mirror 3 Corners | |
| 36 | x | y | z | | x | y | z | | x | y | z |
| 37 | 2.550 | -1.630 | 2.650 | | 4.000 | -2.630 | 0.049 | | 3.746 | -3.750 | 1.000 |
| 38 | 4.150 | -2.267 | 2.770 | | 4.900 | -1.400 | 0.775 | | 1.371 | -3.300 | 2.100 |
| 39 | 3.950 | 0.196 | 2.060 | | 4.600 | -3.150 | 2.118 | | 1.159 | -1.600 | 0.800 |
| 40 | 2.420 | -0.309 | 2.270 | | 3.800 | -3.900 | 1.067 | | 2.824 | -2.000 | 0.100 |
| 41 | | | | | | | | | 3.771 | -2.700 | 0.100 |
| 42 | | | | | | | | | | | |
| 43 | | | | | | | | | | | |
| 44 | | | | | | | | | | | |
| 45 | | | | | | | | | | | |

FIG. 6B4

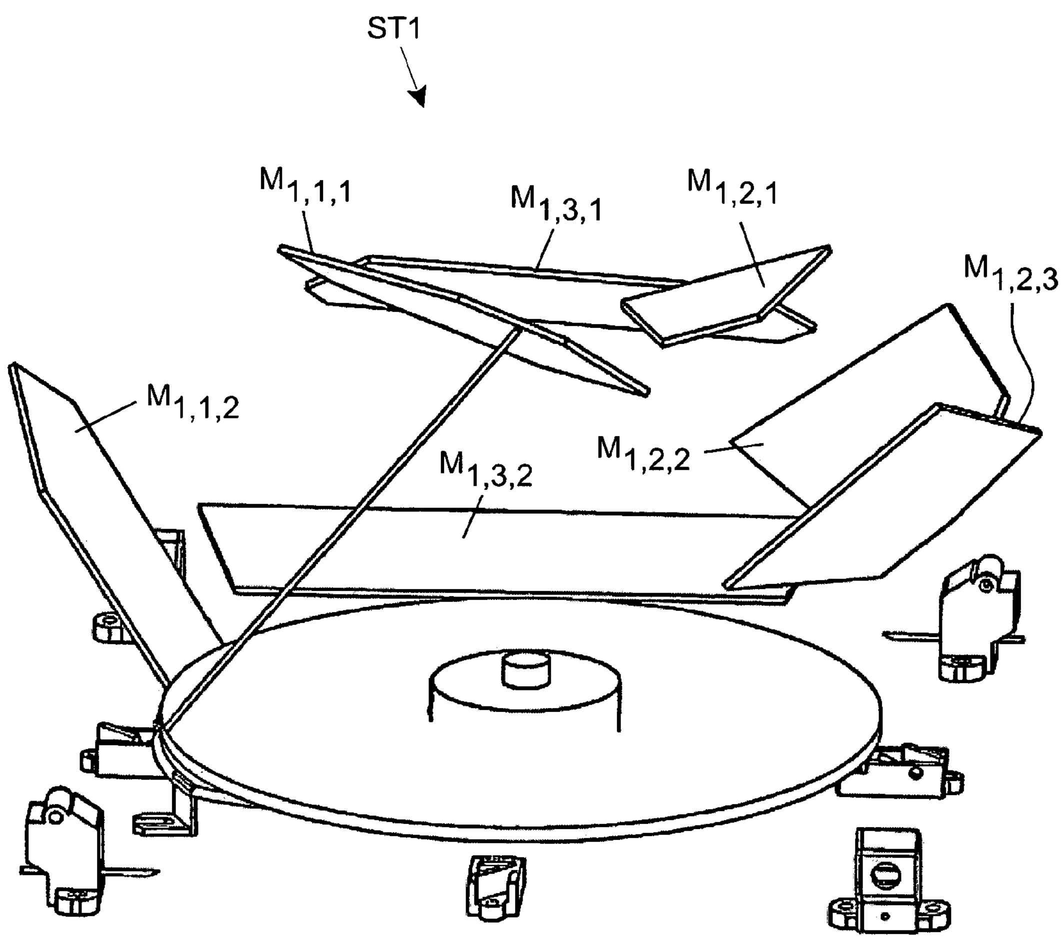
FIG. 6C1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.753 | 0.321 | 0.575 | | 0.788 | 0.000 | 0.616 | | 0.753 | -0.321 | 0.575 |
| 52 | -0.366 | 0.443 | -0.819 | | -0.425 | 0.132 | -0.896 | | -0.421 | -0.193 | -0.887 |
| 53 | -0.574 | 0.468 | 0.672 | | -0.653 | 0.160 | 0.740 | | -0.648 | -0.165 | 0.743 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 4.250 | 1.500 | 2.547 | | 3.150 | 2.450 | 0.030 | | | | |
| 59 | 4.950 | 2.000 | 2.029 | | 4.500 | 2.800 | 0.213 | | | | |
| 60 | 5.150 | 1.800 | 1.851 | | 4.350 | -2.200 | 0.277 | | | | |
| 61 | 5.000 | -1.800 | 1.656 | | 3.050 | -1.850 | 0.089 | | | | |
| 62 | 4.750 | -1.950 | 1.844 | | | | | | | | |
| 63 | 4.100 | -1.500 | 2.405 | | | | | | | | |
| 64 | | | | | | | | | | | |
| 65 | | | | | | | | | | | |

FIG. 6C2

| | A | B | C | D | E | F | G | H | I | J | K | L |
|---|---|---|---|---|---|---|---|---|---|---|---|---|
| 46 | Low Elevation | Facet | 2 | | | | | | | | | |
| 47 | (G3) | x | y | z | | | | | | | | |
| 48 | Vector from Module | -0.616 | 0.000 | 0.788 | | | | | | | | |
| 49 | | | End | | | | Middle | | | | End | |
| 50 | | x | y | z | | x | y | z | | x | y | z |
| 51 | Output Vectors From Disk | 0.734 | 0.305 | 0.607 | | 0.766 | 0.000 | 0.643 | | 0.731 | -0.319 | 0.604 |
| 52 | First Mirror Reflected Directions | -0.402 | 0.429 | -0.809 | | -0.456 | 0.133 | -0.880 | | -0.453 | -0.190 | -0.871 |
| 53 | Second Mirror Reflected Directions | -0.607 | 0.454 | 0.653 | | -0.679 | 0.161 | 0.716 | | -0.675 | -0.162 | 0.719 |
| 54 | Third Mirror Reflected Directions | | | | | | | | | | | |
| 55 | | | | | | | | | | | | |
| 56 | | | Mirror 1 Corners | | | | Mirror 2 Corners | | | | Mirror 3 Corners | |
| 57 | | x | y | z | | x | y | z | | x | y | z |
| 58 | 1 | 4.250 | 1.500 | 2.547 | | 3.150 | 2.450 | 0.030 | | | | |
| 59 | 2 | 4.950 | 2.000 | 2.029 | | 4.500 | 2.800 | 0.213 | | | | |
| 60 | 3 | 5.150 | 1.800 | 1.851 | | 4.350 | -2.200 | 0.277 | | | | |
| 61 | 4 | 5.000 | -1.800 | 1.656 | | 3.050 | -1.850 | 0.089 | | | | |
| 62 | 5 | 4.750 | -1.950 | 1.844 | | | | | | | | |
| 63 | 6 | 4.100 | -1.500 | 2.405 | | | | | | | | |
| 64 | 7 | | | | | | | | | | | |
| 65 | 8 | | | | | | | | | | | |

FIG. 6C3

| | Z | AA | AB | AC | AD | AE | AF | AG | AH | AI | AJ |
|---|---|---|---|---|---|---|---|---|---|---|---|
| 46 | Facet | 3 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.714 | 0.290 | 0.638 | | 0.743 | 0.000 | 0.669 | | 0.709 | -0.311 | 0.633 |
| 52 | -0.438 | 0.416 | -0.797 | | -0.487 | 0.134 | -0.863 | | -0.485 | -0.181 | -0.855 |
| 53 | -0.638 | 0.440 | 0.632 | | -0.704 | 0.161 | 0.692 | | -0.702 | -0.155 | 0.695 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 4.250 | 1.500 | 2.547 | | 3.150 | 2.450 | 0.030 | | | | |
| 59 | 4.950 | 2.000 | 2.029 | | 4.500 | 2.800 | 0.213 | | | | |
| 60 | 5.150 | 1.800 | 1.851 | | 4.350 | -2.200 | 0.277 | | | | |
| 61 | 5.000 | -1.800 | 1.656 | | 3.050 | -1.850 | 0.089 | | | | |
| 62 | 4.750 | -1.950 | 1.844 | | | | | | | | |
| 63 | 4.100 | -1.500 | 2.405 | | | | | | | | |
| 64 | | | | | | | | | | | |
| 65 | | | | | | | | | | | |

FIG. 6C4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.692 | 0.275 | 0.667 | | 0.719 | 0.000 | 0.695 | | 0.686 | -0.307 | 0.660 |
| 52 | -0.472 | 0.402 | -0.784 | | -0.517 | 0.135 | -0.846 | | -0.516 | -0.176 | -0.838 |
| 53 | -0.667 | 0.426 | 0.611 | | -0.728 | 0.161 | 0.666 | | -0.727 | -0.151 | 0.670 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 4.250 | 1.500 | 2.547 | | 3.150 | 2.450 | 0.030 | | | | |
| 59 | 4.950 | 2.000 | 2.029 | | 4.500 | 2.800 | 0.213 | | | | |
| 60 | 5.150 | 1.800 | 1.851 | | 4.350 | -2.200 | 0.277 | | | | |
| 61 | 5.000 | -1.800 | 1.656 | | 3.050 | -1.850 | 0.089 | | | | |
| 62 | 4.750 | -1.950 | 1.844 | | | | | | | | |
| 63 | 4.100 | -1.500 | 2.405 | | | | | | | | |
| 64 | | | | | | | | | | | |
| 65 | | | | | | | | | | | |

FIG. 6C5

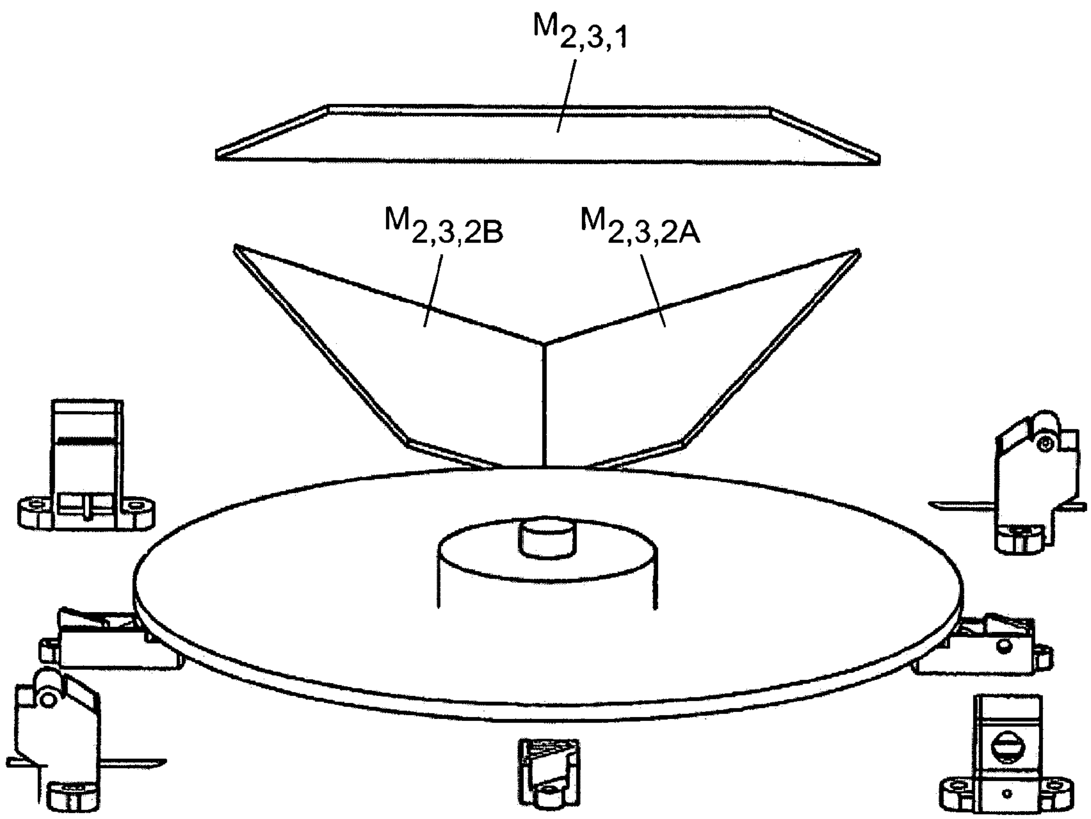
FIG. 6D1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.788 | 0.000 | 0.616 | | 0.788 | 0.000 | 0.616 | | 0.741 | -0.367 | 0.562 |
| 52 | -0.140 | 0.000 | -0.990 | | -0.140 | 0.000 | -0.990 | | -0.117 | -0.367 | -0.923 |
| 53 | -0.595 | 0.448 | 0.667 | | -0.595 | 0.448 | 0.667 | | -0.590 | 0.098 | 0.801 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D2

| | Z | AA | AB | AC | AD | AE | AF | AG | AH | AI | AJ |
|---|---|---|---|---|---|---|---|---|---|---|---|
| 46 | Facet | 2 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.766 | 0.000 | 0.643 | | 0.766 | 0.000 | 0.643 | | 0.711 | -0.395 | 0.581 |
| 52 | -0.175 | 0.000 | -0.985 | | -0.175 | 0.000 | -0.985 | | -0.149 | -0.395 | -0.907 |
| 53 | -0.623 | 0.440 | 0.647 | | -0.623 | 0.440 | 0.647 | | -0.614 | 0.062 | 0.787 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D3

| | A | B | C | D | E | F | G | H | I | J | K | L |
|---|---|---|---|---|---|---|---|---|---|---|---|---|
| 46 | Low Elevation | Facet | 3 | | | | | | | | | |
| 47 | | x | y | z | | | | | | | | |
| 48 | Vector from Module | -0.616 | 0.000 | 0.788 | | | | | | | | |
| 49 | | | End | | | | Middle | | | | End | |
| 50 | | x | y | z | | x | y | z | | x | y | z |
| 51 | Output Vectors From Disk | 0.743 | 0.000 | 0.669 | | 0.743 | 0.000 | 0.669 | | 0.697 | -0.362 | 0.619 |
| 52 | First Mirror Reflected Directions | -0.209 | 0.000 | -0.978 | | -0.209 | 0.000 | -0.978 | | -0.189 | -0.362 | -0.913 |
| 53 | Second Mirror Reflected Directions | -0.649 | 0.433 | 0.625 | | -0.649 | 0.433 | 0.625 | | -0.648 | 0.089 | 0.757 |
| 54 | Third Mirror Reflected Directions | | | | | | | | | | | |
| 55 | | | | | | | | | | | | |
| 56 | | | Mirror 1 Corners | | | | Mirror 2 Corners | | | | Mirror 3 Corners | |
| 57 | | x | y | z | | x | y | z | | x | y | z |
| 58 | 1 | 3.750 | -1.600 | 2.509 | | 3.000 | 0.000 | -0.112 | | | | |
| 59 | 2 | 5.100 | -2.400 | 1.728 | | 4.800 | 0.000 | 0.382 | | | | |
| 60 | 3 | 5.100 | 2.400 | 1.728 | | 5.071 | -2.256 | 1.066 | | | | |
| 61 | 4 | 3.750 | 1.600 | 2.509 | | 5.071 | -2.256 | 1.066 | | | | |
| 62 | 5 | | | | | 3.060 | -1.000 | 0.175 | | | | |
| 63 | 6 | | | | | | | | | | | |
| 64 | 7 | | | | | | | | | | | |
| 65 | 8 | | | | | | | | | | | |
| 66 | | | | | | | | | | | | |
| 67 | | | | | | | | | | | | |
| 68 | | | | | | | | | | | | |
| 69 | **Note: Special Case!** | | | | | | | | | | | |
| 70 | | | | | | | | | | | | |
| 71 | **Second Part of Mirror 2** | | | | | 3.000 | 0.000 | -0.112 | | | | |
| 72 | | | | | | 4.800 | 0.000 | 0.382 | | | | |
| 73 | | | | | | 5.071 | 2.256 | 1.066 | | | | |
| 74 | | | | | | 5.071 | 2.256 | 1.066 | | | | |
| 75 | | | | | | 3.060 | 1.000 | 0.175 | | | | |
| 76 | | | | | | | | | | | | |
| 77 | | | | | | | | | | | | |

FIG. 6D4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.719 | 0.000 | 0.695 | | 0.719 | 0.000 | 0.695 | | 0.664 | -0.395 | 0.635 |
| 52 | -0.243 | 0.000 | -0.970 | | -0.243 | 0.000 | -0.970 | | -0.220 | -0.395 | -0.892 |
| 53 | -0.675 | 0.425 | 0.603 | | -0.675 | 0.425 | 0.603 | | -0.668 | 0.046 | 0.742 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D5

| | AX | AY | AZ | BA | BB | BC | BD | BE | BF | BG | BH |
|---|---|---|---|---|---|---|---|---|---|---|---|
| 46 | Facet | 5 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.669 | 0.000 | 0.743 | | 0.669 | 0.000 | 0.743 | | 0.634 | -0.311 | 0.708 |
| 52 | -0.310 | 0.000 | -0.951 | | -0.310 | 0.000 | -0.951 | | -0.298 | -0.311 | -0.903 |
| 53 | -0.724 | 0.407 | 0.557 | | -0.724 | 0.407 | 0.557 | | -0.730 | 0.114 | 0.673 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D6

| | BJ | BK | BL | BM | BN | BO | BP | BQ | BR | BS | BT | BU | BV | BW | BX |
|---|---|---|---|---|---|---|---|---|---|---|---|---|---|---|---|
| 46 | Facet | 6 | | | | | | | | | | | | | |
| 47 | x | y | z | | | | | | | | | | | | |
| 48 | -0.616 | 0.000 | 0.788 | | | | | | | | | | | | |
| 49 | End | | | | Middle | | | | End | | | | | | |
| 50 | x | y | z | | x | y | z | | x | y | z | | | | |
| 51 | 0.616 | 0.000 | 0.788 | | 0.616 | 0.000 | 0.788 | | 0.596 | -0.232 | 0.769 | | | | |
| 52 | -0.376 | 0.000 | -0.927 | | -0.376 | 0.000 | -0.927 | | -0.369 | -0.232 | -0.900 | | | | |
| 53 | -0.770 | 0.387 | 0.508 | | -0.770 | 0.387 | 0.508 | | -0.781 | 0.173 | 0.600 | | | | |
| 54 | | | | | | | | | | | | | | | |
| 55 | | | | | | | | | | | | | | | |
| 56 | Mirror 1 Corners | | | | Mirror 2 Corners | | | | Mirror 3 Corners | | | | | | |
| 57 | x | y | z | | x | y | z | | x | y | z | | | | |
| 58 | 3.750 | -1.600 | 2.509 | | 3.000 | 0.000 | -0.112 | | | | | | | | |
| 59 | 5.100 | -2.400 | 1.728 | | 4.800 | 0.000 | 0.382 | | | | | | | | |
| 60 | 5.100 | 2.400 | 1.728 | | 5.071 | -2.256 | 1.066 | | | | | | | | |
| 61 | 3.750 | 1.600 | 2.509 | | 5.071 | -2.256 | 1.066 | | | | | | | | |
| 62 | | | | | 3.060 | -1.000 | 0.175 | | | | | | | | |
| 63 | | | | | | | | | | | | | | | |
| 64 | | | | | | | | | | | | | | | |
| 65 | | | | | | | | | | | | | | | |
| 66 | | | | | | | | | | | | | | | |
| 67 | | | | | | | | | | | | | | | |
| 68 | | | | | | | | | | | | | | | |
| 69 | | | | | | | | | | | | | | | |
| 70 | | | | | | | | | | | | | | | |
| 71 | | | | | 3.000 | 0.000 | -0.112 | | | | | | | | |
| 72 | | | | | 4.800 | 0.000 | 0.382 | | | | | | | | |
| 73 | | | | | 5.071 | 2.256 | 1.066 | | | | | | | | |
| 74 | | | | | 5.071 | 2.256 | 1.066 | | | | | | | | |
| 75 | | | | | 3.060 | 1.000 | 0.175 | | | | | | | | |

FIG. 6D7

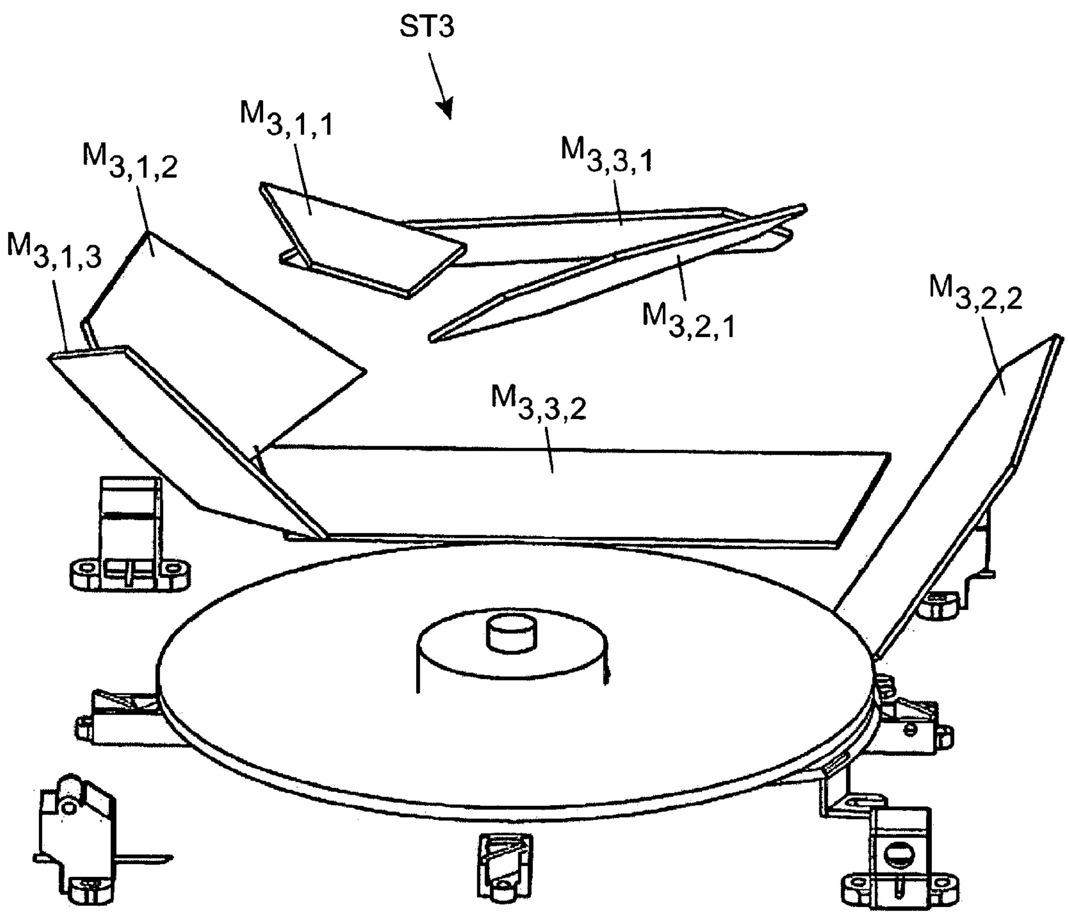
FIG. 6E1

| | N | O | P | Q | R | S | T | U | V | W | X |
|---|---|---|---|---|---|---|---|---|---|---|---|
| 1 | | | | | | | | | | | |
| 2 | | | | | | | | | | | |
| 3 | | | | | | | | | | | |
| 4 | Facet | 7 | | | | | | | | | |
| 5 | x | y | z | | | | | | | | |
| 6 | -0.616 | 0.000 | 0.788 | | | | | | | | |
| 7 | | End | | | | Middle | | | | End | |
| 8 | x | y | z | | x | y | z | | x | y | z |
| 9 | 0.468 | 0.249 | 0.848 | | 0.468 | 0.249 | 0.848 | | 0.430 | 0.387 | 0.816 |
| 10 | 0.408 | 0.675 | -0.614 | | 0.408 | 0.675 | -0.614 | | 0.375 | 0.774 | -0.510 |
| 11 | -0.999 | -0.012 | -0.034 | | -0.999 | -0.012 | -0.034 | | -0.993 | 0.106 | 0.054 |
| 12 | -0.616 | -0.531 | 0.582 | | -0.616 | -0.531 | 0.582 | | -0.605 | -0.419 | 0.677 |
| 13 | | | | | | | | | | | |
| 14 | | Mirror 1 Corners | | | | Mirror 2 Corners | | | | Mirror 3 Corners | |
| 15 | x | y | z | | x | y | z | | x | y | z |
| 16 | 2.550 | 1.630 | 2.650 | | 4.000 | 2.630 | 0.049 | | 3.746 | 3.750 | 1.000 |
| 17 | 4.150 | 2.267 | 2.770 | | 4.900 | 1.400 | 0.775 | | 1.371 | 3.300 | 2.100 |
| 18 | 3.950 | -0.196 | 2.060 | | 4.600 | 3.150 | 2.118 | | 1.159 | 1.600 | 0.800 |
| 19 | 2.420 | 0.309 | 2.270 | | 3.800 | 3.900 | 1.067 | | 2.824 | 2.000 | 0.100 |
| 20 | | | | | | | | | 3.771 | 2.700 | 0.100 |
| 21 | | | | | | | | | | | |
| 22 | | | | | | | | | | | |
| 23 | | | | | | | | | | | |
| 24 | | | | | | | | | | | |

FIG. 6E2

| | A | B | C | D | E | F | G | H | I | J | K | L |
|---|---|---|---|---|---|---|---|---|---|---|---|---|
| 1 | Station 3 | | | | | | | | | | | |
| 2 | | | | | | | | | | | | |
| 3 | | | | | | | | | | | | |
| 4 | High Elevation Left Skew | Facet | 9 | | | | | | | | | |
| 5 | (G2) | x | y | z | | | | | | | | |
| 6 | Vector from Module | -0.616 | 0.000 | 0.788 | | | | | | | | |
| 7 | | | End | | | | Middle | | | | End | |
| 8 | | x | y | z | | x | y | z | | x | y | z |
| 9 | Output Vectors From Disk | 0.441 | 0.235 | 0.866 | | 0.441 | 0.235 | 0.866 | | 0.398 | 0.391 | 0.830 |
| 10 | First Mirror Reflected Directions | 0.380 | 0.673 | -0.635 | | 0.380 | 0.673 | -0.635 | | 0.343 | 0.784 | -0.517 |
| 11 | Second Mirror Reflected Directions | -0.998 | 0.000 | -0.067 | | -0.998 | 0.000 | -0.067 | | -0.991 | 0.133 | 0.033 |
| 12 | Third Mirror Reflected Directions | -0.589 | -0.553 | 0.589 | | -0.589 | -0.553 | 0.589 | | -0.578 | -0.426 | 0.697 |
| 13 | | | | | | | | | | | | |
| 14 | | | Mirror 1 Corners | | | | Mirror 2 Corners | | | | Mirror 3 Corners | |
| 15 | | x | y | z | | x | y | z | | x | y | z |
| 16 | 1 | 2.550 | 1.630 | 2.650 | | 4.000 | 2.630 | 0.049 | | 3.746 | 3.750 | 1.000 |
| 17 | 2 | 4.150 | 2.267 | 2.770 | | 4.900 | 1.400 | 0.775 | | 1.371 | 3.300 | 2.100 |
| 18 | 3 | 3.950 | -0.196 | 2.060 | | 4.600 | 3.150 | 2.118 | | 1.159 | 1.600 | 0.800 |
| 19 | 4 | 2.420 | 0.309 | 2.270 | | 3.800 | 3.900 | 1.067 | | 2.824 | 2.000 | 0.100 |
| 20 | 5 | | | | | | | | | 3.771 | 2.700 | 0.100 |
| 21 | 6 | | | | | | | | | | | |
| 22 | 7 | | | | | | | | | | | |
| 23 | 8 | | | | | | | | | | | |

FIG. 6E3

| | Z | AA | AB | AC | AD | AE | AF | AG | AH | AI | AJ |
|---|---|---|---|---|---|---|---|---|---|---|---|
| 1 | | | | | | | | | | | |
| 2 | | | | | | | | | | | |
| 3 | | | | | | | | | | | |
| 4 | Facet | 11 | | | | | | | | | |
| 5 | x | y | z | | | | | | | | |
| 6 | -0.616 | 0.000 | 0.788 | | | | | | | | |
| 7 | | End | | | | Middle | | | | End | |
| 8 | x | y | z | | x | y | z | | x | y | z |
| 9 | 0.415 | 0.220 | 0.883 | | 0.415 | 0.220 | 0.883 | | 0.369 | 0.387 | 0.845 |
| 10 | 0.351 | 0.669 | -0.655 | | 0.351 | 0.669 | -0.655 | | 0.312 | 0.788 | -0.530 |
| 11 | -0.995 | 0.012 | -0.099 | | -0.995 | 0.012 | -0.099 | | -0.988 | 0.153 | 0.007 |
| 12 | -0.562 | -0.574 | 0.596 | | -0.562 | -0.574 | 0.596 | | -0.550 | -0.439 | 0.710 |
| 13 | | | | | | | | | | | |
| 14 | | Mirror 1 Corners | | | | Mirror 2 Corners | | | | Mirror 3 Corners | |
| 15 | x | y | z | | x | y | z | | x | y | z |
| 16 | 2.550 | 1.630 | 2.650 | | 4.000 | 2.630 | 0.049 | | 3.746 | 3.750 | 1.000 |
| 17 | 4.150 | 2.267 | 2.770 | | 4.900 | 1.400 | 0.775 | | 1.371 | 3.300 | 2.100 |
| 18 | 3.950 | -0.196 | 2.060 | | 4.600 | 3.150 | 2.118 | | 1.159 | 1.600 | 0.800 |
| 19 | 2.420 | 0.309 | 2.270 | | 3.800 | 3.900 | 1.067 | | 2.824 | 2.000 | 0.100 |
| 20 | | | | | | | | | 3.771 | 2.700 | 0.100 |
| 21 | | | | | | | | | | | |
| 22 | | | | | | | | | | | |
| 23 | | | | | | | | | | | |
| 24 | | | | | | | | | | | |

FIG. 6E4

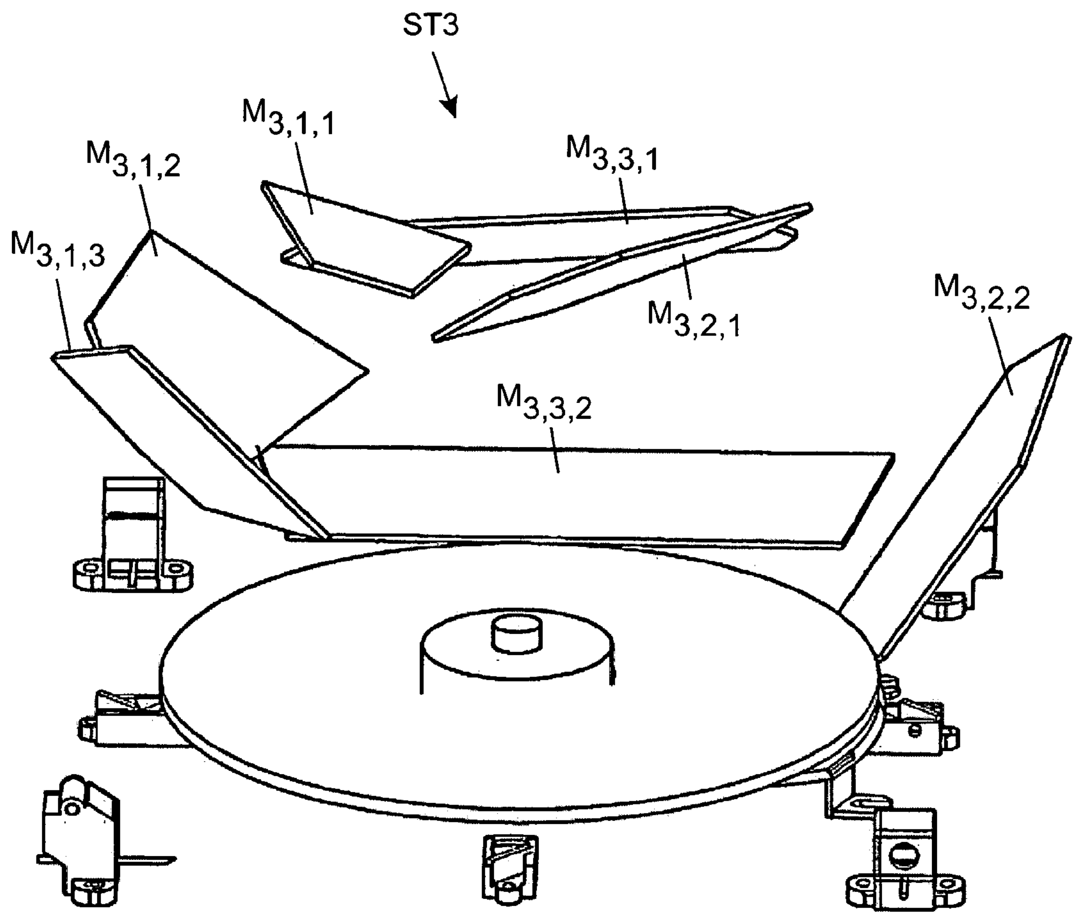
FIG. 6F1

| | N | O | P | Q | R | S | T | U | V | W | X |
|---|---|---|---|---|---|---|---|---|---|---|---|
| 25 | Facet | 8 | | | | | | | | | |
| 26 | x | y | z | | | | | | | | |
| 27 | -0.616 | 0.000 | 0.788 | | | | | | | | |
| 28 | End | | | | Middle | | | | End | | |
| 29 | x | y | z | | x | y | z | | x | y | z |
| 30 | 0.419 | -0.416 | 0.807 | | 0.468 | -0.249 | 0.848 | | 0.494 | -0.048 | 0.868 |
| 31 | -0.253 | -0.917 | -0.310 | | -0.316 | -0.832 | -0.455 | | -0.387 | -0.704 | -0.596 |
| 32 | -0.469 | 0.414 | 0.781 | | -0.537 | 0.527 | 0.659 | | -0.603 | 0.626 | 0.494 |
| 33 | | | | | | | | | | | |
| 34 | | | | | | | | | | | |
| 35 | Mirror 1 Corners | | | | Mirror 2 Corners | | | | Mirror 3 Corners | | |
| 36 | x | y | z | | x | y | z | | x | y | z |
| 37 | 3.900 | -2.436 | 2.770 | | 1.700 | -4.102 | 1.300 | | | | |
| 38 | 4.100 | -1.879 | 2.400 | | 3.300 | -4.400 | 1.980 | | | | |
| 39 | 3.800 | -0.137 | 1.800 | | 3.400 | -3.990 | 1.500 | | | | |
| 40 | 3.150 | 0.737 | 1.800 | | 2.300 | -2.427 | -0.625 | | | | |
| 41 | 2.500 | 0.159 | 2.450 | | 1.700 | -2.524 | -0.625 | | | | |
| 42 | 2.650 | -0.757 | 2.770 | | 1.050 | -3.101 | -0.050 | | | | |
| 43 | | | | | | | | | | | |
| 44 | | | | | | | | | | | |

FIG. 6F2

| | A | B | C | D | E | F | G | H | I | J | K | L |
|---|---|---|---|---|---|---|---|---|---|---|---|---|
| 25 | High Elevation Right Skew | Facet | 10 | | | | | | | | | |
| 26 | (G1) | x | y | z | | | | | | | | |
| 27 | Vector from Module | -0.616 | 0.000 | 0.788 | | | | | | | | |
| 28 | | | End | | | | Middle | | | | End | |
| 29 | | x | y | z | | x | y | z | | x | y | z |
| 30 | Output Vectors From Disk | 0.378 | -0.445 | 0.812 | | 0.441 | -0.235 | 0.866 | | 0.464 | -0.068 | 0.883 |
| 31 | First Mirror Reflected Directions | -0.269 | -0.927 | -0.263 | | -0.349 | -0.823 | -0.448 | | -0.408 | -0.717 | -0.565 |
| 32 | Second Mirror Reflected Directions | -0.479 | 0.367 | 0.797 | | -0.566 | 0.512 | 0.647 | | -0.621 | 0.595 | 0.510 |
| 33 | Third Mirror Reflected Directions | | | | | | | | | | | |
| 34 | | | | | | | | | | | | |
| 35 | | | Mirror 1 Corners | | | | Mirror 2 Corners | | | | Mirror 3 Corners | |
| 36 | | x | y | z | | x | y | z | | x | y | z |
| 37 | 1 | 3.900 | -2.436 | 2.770 | | 1.700 | -4.102 | 1.300 | | | | |
| 38 | 2 | 4.100 | -1.879 | 2.400 | | 3.300 | -4.400 | 1.980 | | | | |
| 39 | 3 | 3.800 | -0.137 | 1.800 | | 3.400 | -3.990 | 1.500 | | | | |
| 40 | 4 | 3.150 | 0.737 | 1.800 | | 2.300 | -2.427 | -0.625 | | | | |
| 41 | 5 | 2.500 | 0.159 | 2.450 | | 1.700 | -2.524 | -0.625 | | | | |
| 42 | 6 | 2.650 | -0.757 | 2.770 | | 1.050 | -3.101 | -0.050 | | | | |
| 43 | 7 | | | | | | | | | | | |
| 44 | 8 | | | | | | | | | | | |

FIG. 6F3

| | Z | AA | AB | AC | AD | AE | AF | AG | AH | AI | AJ |
|---|---|---|---|---|---|---|---|---|---|---|---|
| 25 | Facet | 12 | | | | | | | | | |
| 26 | x | y | z | | | | | | | | |
| 27 | -0.616 | 0.000 | 0.788 | | | | | | | | |
| 28 | | End | | | | Middle | | | | End | |
| 29 | x | y | z | | x | y | z | | x | y | z |
| 30 | 0.333 | -0.476 | 0.814 | | 0.415 | -0.220 | 0.883 | | 0.433 | -0.086 | 0.897 |
| 31 | -0.284 | -0.935 | -0.211 | | -0.382 | -0.813 | -0.440 | | -0.429 | -0.728 | -0.535 |
| 32 | -0.487 | 0.316 | 0.814 | | -0.594 | 0.496 | 0.633 | | -0.638 | 0.564 | 0.524 |
| 33 | | | | | | | | | | | |
| 34 | | | | | | | | | | | |
| 35 | | Mirror 1 Corners | | | | Mirror 2 Corners | | | | Mirror 3 Corners | |
| 36 | x | y | z | | x | y | z | | x | y | z |
| 37 | 3.900 | -2.436 | 2.770 | | 1.700 | -4.102 | 1.300 | | | | |
| 38 | 4.100 | -1.879 | 2.400 | | 3.300 | -4.400 | 1.980 | | | | |
| 39 | 3.800 | -0.137 | 1.800 | | 3.400 | -3.990 | 1.500 | | | | |
| 40 | 3.150 | 0.737 | 1.800 | | 2.300 | -2.427 | -0.625 | | | | |
| 41 | 2.500 | 0.159 | 2.450 | | 1.700 | -2.524 | -0.625 | | | | |
| 42 | 2.650 | -0.757 | 2.770 | | 1.050 | -3.101 | -0.050 | | | | |
| 43 | | | | | | | | | | | |
| 44 | | | | | | | | | | | |
| 45 | | | | | | | | | | | |

FIG. 6F4

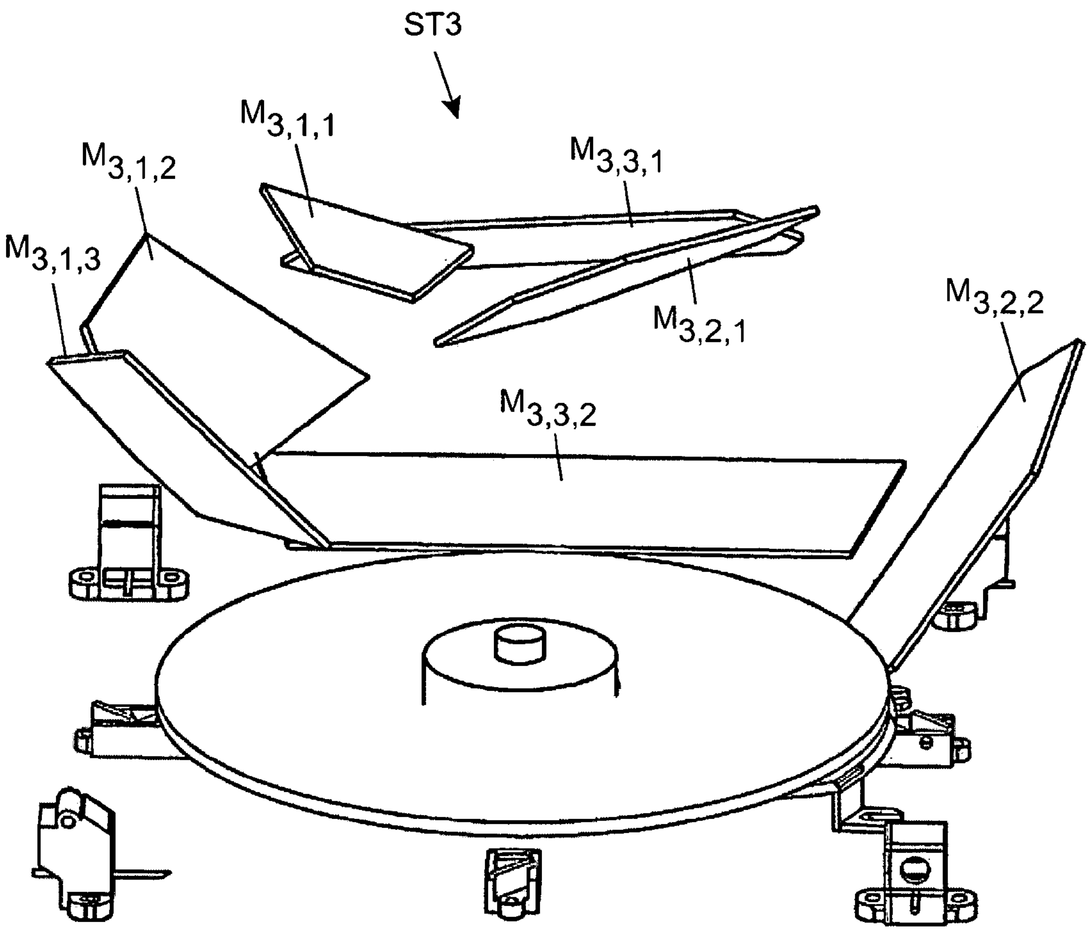
FIG. 6G1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.753 | -0.321 | 0.575 | | 0.788 | 0.000 | 0.616 | | 0.753 | 0.321 | 0.575 |
| 52 | -0.366 | -0.443 | -0.819 | | -0.425 | -0.132 | -0.896 | | -0.421 | 0.193 | -0.887 |
| 53 | -0.574 | -0.468 | 0.672 | | -0.653 | -0.160 | 0.740 | | -0.648 | 0.165 | 0.743 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 4.250 | -1.500 | 2.547 | | 3.150 | -2.450 | 0.030 | | | | |
| 59 | 4.950 | -2.000 | 2.029 | | 4.500 | -2.800 | 0.213 | | | | |
| 60 | 5.150 | -1.800 | 1.851 | | 4.350 | 2.200 | 0.277 | | | | |
| 61 | 5.000 | 1.800 | 1.656 | | 3.050 | 1.850 | 0.089 | | | | |
| 62 | 4.750 | 1.950 | 1.844 | | | | | | | | |
| 63 | 4.100 | 1.500 | 2.405 | | | | | | | | |
| 64 | | | | | | | | | | | |
| 65 | | | | | | | | | | | |

FIG. 6G2

| | A | B | C | D | E | F | G | H | I | J | K | L |
|---|---|---|---|---|---|---|---|---|---|---|---|---|
| 46 | Low Elevation | Facet | 2 | | | | | | | | | |
| 47 | (G3) | x | y | z | | | | | | | | |
| 48 | Vector from Module | -0.616 | 0.000 | 0.788 | | | | | | | | |
| 49 | | | End | | | | Middle | | | | End | |
| 50 | | x | y | z | | x | y | z | | x | y | z |
| 51 | Output Vectors From Disk | 0.734 | -0.305 | 0.607 | | 0.766 | 0.000 | 0.643 | | 0.731 | 0.319 | 0.604 |
| 52 | First Mirror Reflected Directions | -0.402 | -0.429 | -0.809 | | -0.456 | -0.133 | -0.880 | | -0.453 | 0.190 | -0.871 |
| 53 | Second Mirror Reflected Directions | -0.607 | -0.454 | 0.653 | | -0.679 | -0.161 | 0.716 | | -0.675 | 0.162 | 0.719 |
| 54 | Third Mirror Reflected Directions | | | | | | | | | | | |
| 55 | | | | | | | | | | | | |
| 56 | | | Mirror 1 Corners | | | | Mirror 2 Corners | | | | Mirror 3 Corners | |
| 57 | | x | y | z | | x | y | z | | x | y | z |
| 58 | 1 | 4.250 | -1.500 | 2.547 | | 3.150 | -2.450 | 0.030 | | | | |
| 59 | 2 | 4.950 | -2.000 | 2.029 | | 4.500 | -2.800 | 0.213 | | | | |
| 60 | 3 | 5.150 | -1.800 | 1.851 | | 4.350 | 2.200 | 0.277 | | | | |
| 61 | 4 | 5.000 | 1.800 | 1.656 | | 3.050 | 1.850 | 0.089 | | | | |
| 62 | 5 | 4.750 | 1.950 | 1.844 | | | | | | | | |
| 63 | 6 | 4.100 | 1.500 | 2.405 | | | | | | | | |
| 64 | 7 | | | | | | | | | | | |
| 65 | 8 | | | | | | | | | | | |
| 66 | | | | | | | | | | | | |

FIG. 6G3

| | Z | AA | AB | AC | AD | AE | AF | AG | AH | AI | AJ |
|---|---|---|---|---|---|---|---|---|---|---|---|
| 46 | Facet | 3 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.714 | -0.290 | 0.638 | | 0.743 | 0.000 | 0.669 | | 0.709 | 0.311 | 0.633 |
| 52 | -0.438 | -0.416 | -0.797 | | -0.487 | -0.134 | -0.863 | | -0.485 | 0.181 | -0.855 |
| 53 | -0.638 | -0.440 | 0.632 | | -0.704 | -0.161 | 0.692 | | -0.702 | 0.155 | 0.695 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 4.250 | -1.500 | 2.547 | | 3.150 | -2.450 | 0.030 | | | | |
| 59 | 4.950 | -2.000 | 2.029 | | 4.500 | -2.800 | 0.213 | | | | |
| 60 | 5.150 | -1.800 | 1.851 | | 4.350 | 2.200 | 0.277 | | | | |
| 61 | 5.000 | 1.800 | 1.656 | | 3.050 | 1.850 | 0.089 | | | | |
| 62 | 4.750 | 1.950 | 1.844 | | | | | | | | |
| 63 | 4.100 | 1.500 | 2.405 | | | | | | | | |
| 64 | | | | | | | | | | | |
| 65 | | | | | | | | | | | |

FIG. 6G4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.692 | -0.275 | 0.667 | | 0.719 | 0.000 | 0.695 | | 0.686 | 0.307 | 0.660 |
| 52 | -0.472 | -0.402 | -0.784 | | -0.517 | -0.135 | -0.846 | | -0.516 | 0.176 | -0.838 |
| 53 | -0.667 | -0.426 | 0.611 | | -0.728 | -0.161 | 0.666 | | -0.727 | 0.151 | 0.670 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 4.250 | -1.500 | 2.547 | | 3.150 | -2.450 | 0.030 | | | | |
| 59 | 4.950 | -2.000 | 2.029 | | 4.500 | -2.800 | 0.213 | | | | |
| 60 | 5.150 | -1.800 | 1.851 | | 4.350 | 2.200 | 0.277 | | | | |
| 61 | 5.000 | 1.800 | 1.656 | | 3.050 | 1.850 | 0.089 | | | | |
| 62 | 4.750 | 1.950 | 1.844 | | | | | | | | |
| 63 | 4.100 | 1.500 | 2.405 | | | | | | | | |
| 64 | | | | | | | | | | | |
| 65 | | | | | | | | | | | |

FIG. 6G5

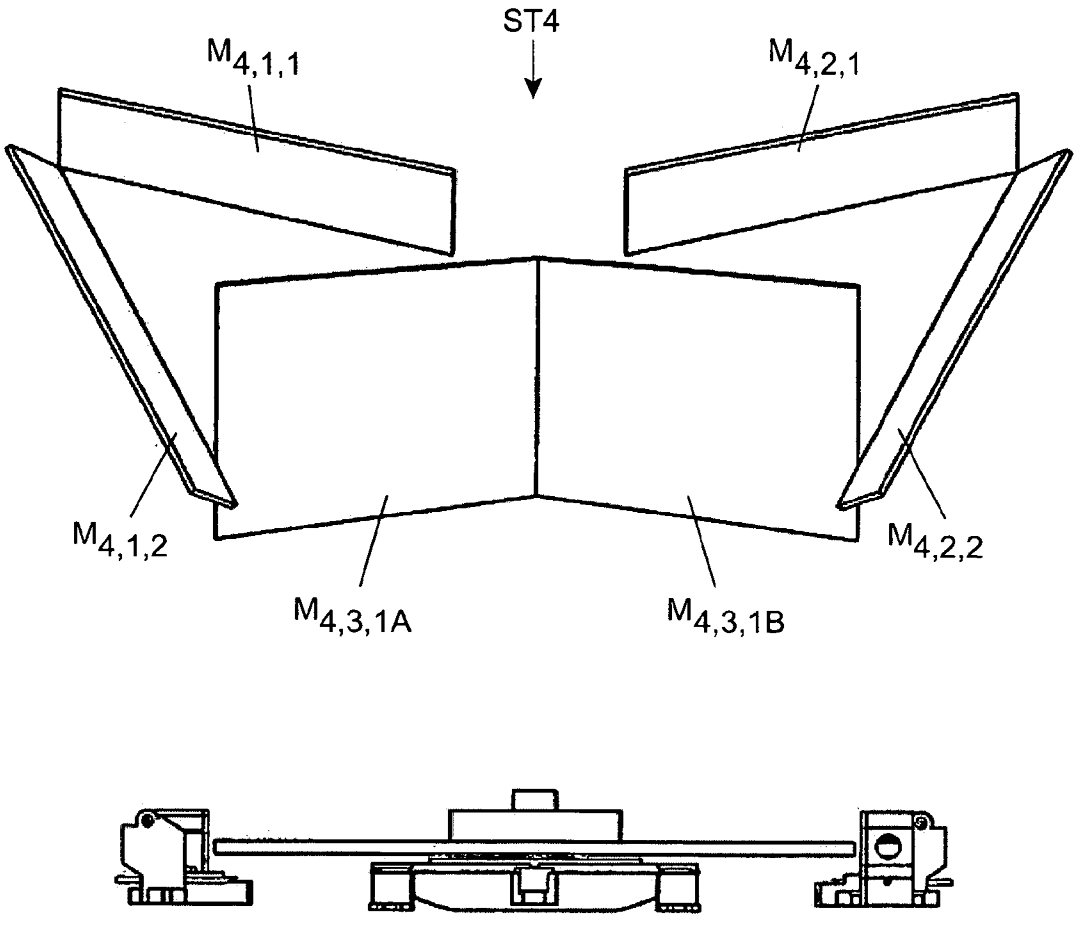
FIG. 6H1

| | N | O | P | Q | R | S | T | U | V | W | X |
|---|---|---|---|---|---|---|---|---|---|---|---|
| 1 | | | | | | | | | | | |
| 2 | | | | | | | | | | | |
| 3 | | | | | | | | | | | |
| 4 | Facet | 7 | | | | | | | | | |
| 5 | x | y | z | | | | | | | | |
| 6 | -0.616 | 0.000 | 0.788 | | | | | | | | |
| 7 | | End | | | | Middle | | | | End | |
| 8 | x | y | z | | x | y | z | | x | y | z |
| 9 | 0.399 | 0.468 | 0.789 | | 0.468 | 0.249 | 0.848 | | 0.481 | 0.180 | 0.858 |
| 10 | -0.433 | 0.736 | -0.519 | | -0.495 | 0.559 | -0.665 | | -0.511 | 0.500 | -0.700 |
| 11 | -0.737 | -0.585 | 0.339 | | -0.768 | -0.631 | 0.108 | | -0.771 | -0.636 | 0.038 |
| 12 | | | | | | | | | | | |
| 13 | | | | | | | | | | | |
| 14 | | Mirror 1 Corners | | | | Mirror 2 Corners | | | | Mirror 3 Corners | |
| 15 | x | y | z | | x | y | z | | x | y | z |
| 16 | 4.900 | 0.800 | 6.409 | | 2.850 | 3.200 | 3.370 | | | | |
| 17 | 6.100 | 0.800 | 5.645 | | 4.200 | 2.800 | 3.231 | | | | |
| 18 | 6.000 | 4.500 | 6.468 | | 5.950 | 4.500 | 6.464 | | | | |
| 19 | 4.900 | 4.500 | 7.168 | | 4.600 | 4.950 | 6.680 | | | | |
| 20 | | | | | | | | | | | |
| 21 | | | | | | | | | | | |
| 22 | | | | | | | | | | | |
| 23 | | | | | | | | | | | |

FIG. 6H2

| | A | B | C | D | E | F | G | H | I | J | K | L |
|---|---|---|---|---|---|---|---|---|---|---|---|---|
| 1 | Station 4 | | | | | | | | | | | |
| 2 | | | | | | | | | | | | |
| 3 | | | | | | | | | | | | |
| 4 | High Elevation Left Skew | Facet | 9 | | | | | | | | | |
| 5 | | x | y | z | | | | | | | | |
| 6 | Vector from Module | -0.616 | 0.000 | 0.788 | | | | | | | | |
| 7 | | | End | | | | Middle | | | | End | |
| 8 | | x | y | z | | x | y | z | | x | y | z |
| 9 | Output Vectors From Disk | 0.366 | 0.474 | 0.801 | | 0.441 | 0.235 | 0.866 | | 0.452 | 0.177 | 0.874 |
| 10 | First Mirror Reflected Directions | -0.458 | 0.739 | -0.494 | | -0.525 | 0.546 | -0.653 | | -0.538 | 0.496 | -0.681 |
| 11 | Second Mirror Reflected Directions | -0.755 | -0.556 | 0.348 | | -0.789 | -0.606 | 0.096 | | -0.792 | -0.610 | 0.037 |
| 12 | Third Mirror Reflected Directions | | | | | | | | | | | |
| 13 | | | | | | | | | | | | |
| 14 | | | Mirror 1 Corners | | | | Mirror 2 Corners | | | | Mirror 3 Corners | |
| 15 | | x | y | z | | x | y | z | | x | y | z |
| 16 | 1 | 4.900 | 0.800 | 6.409 | | 2.850 | 3.200 | 3.370 | | | | |
| 17 | 2 | 6.100 | 0.800 | 5.645 | | 4.200 | 2.800 | 3.231 | | | | |
| 18 | 3 | 6.000 | 4.500 | 6.468 | | 5.950 | 4.500 | 6.464 | | | | |
| 19 | 4 | 4.900 | 4.500 | 7.168 | | 4.600 | 4.950 | 6.680 | | | | |
| 20 | 5 | | | | | | | | | | | |
| 21 | 6 | | | | | | | | | | | |
| 22 | 7 | | | | | | | | | | | |

FIG. 6H3

| | Z | AA | AB | AC | AD | AE | AF | AG | AH | AI | AJ |
|---|---|---|---|---|---|---|---|---|---|---|---|
| 1 | | | | | | | | | | | |
| 2 | | | | | | | | | | | |
| 3 | | | | | | | | | | | |
| 4 | Facet | 11 | | | | | | | | | |
| 5 | x | y | z | | | | | | | | |
| 6 | -0.616 | 0.000 | 0.788 | | | | | | | | |
| 7 | End | | | | Middle | | | | End | | |
| 8 | x | y | z | | x | y | z | | x | y | z |
| 9 | 0.332 | 0.478 | 0.813 | | 0.415 | 0.220 | 0.883 | | 0.422 | 0.176 | 0.889 |
| 10 | -0.482 | 0.741 | -0.467 | | -0.554 | 0.533 | -0.640 | | -0.564 | 0.494 | -0.661 |
| 11 | -0.773 | -0.526 | 0.356 | | -0.810 | -0.581 | 0.084 | | -0.811 | -0.583 | 0.039 |
| 12 | | | | | | | | | | | |
| 13 | | | | | | | | | | | |
| 14 | Mirror 1 Corners | | | | Mirror 2 Corners | | | | Mirror 3 Corners | | |
| 15 | x | y | z | | x | y | z | | x | y | z |
| 16 | 4.900 | 0.800 | 6.409 | | 2.850 | 3.200 | 3.370 | | | | |
| 17 | 6.100 | 0.800 | 5.645 | | 4.200 | 2.800 | 3.231 | | | | |
| 18 | 6.000 | 4.500 | 6.468 | | 5.950 | 4.500 | 6.464 | | | | |
| 19 | 4.900 | 4.500 | 7.168 | | 4.600 | 4.950 | 6.680 | | | | |
| 20 | | | | | | | | | | | |
| 21 | | | | | | | | | | | |
| 22 | | | | | | | | | | | |
| 23 | | | | | | | | | | | |
| 24 | | | | | | | | | | | |

FIG. 6H4

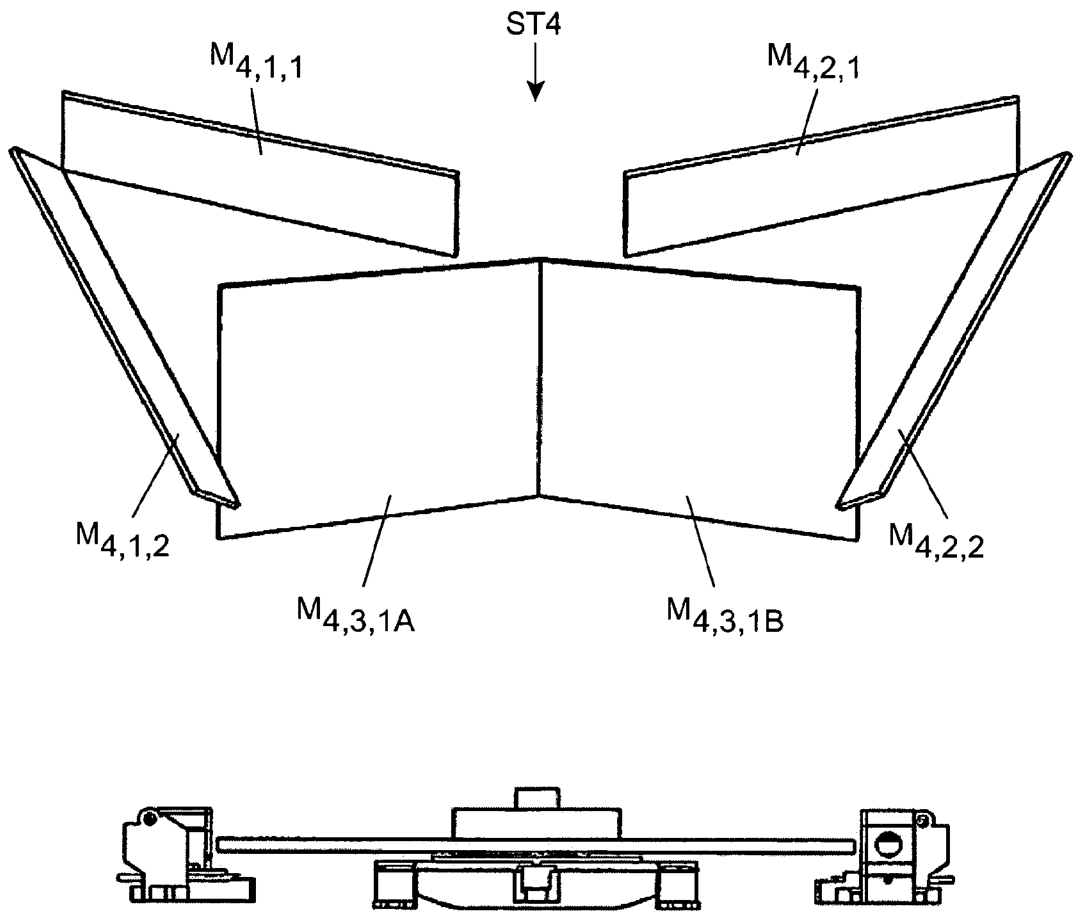
FIG. 6I1

| | N | O | P | Q | R | S | T | U | V | W | X |
|---|---|---|---|---|---|---|---|---|---|---|---|
| 25 | Facet | 8 | | | | | | | | | |
| 26 | x | y | z | | | | | | | | |
| 27 | -0.616 | 0.000 | 0.788 | | | | | | | | |
| 28 | | End | | | | Middle | | | | End | |
| 29 | x | y | z | | x | y | z | | x | y | z |
| 30 | 0.481 | -0.180 | 0.858 | | 0.468 | -0.249 | 0.848 | | 0.399 | -0.468 | 0.789 |
| 31 | -0.511 | -0.500 | -0.700 | | -0.495 | -0.559 | -0.665 | | -0.433 | -0.736 | -0.519 |
| 32 | -0.771 | 0.636 | 0.038 | | -0.768 | 0.631 | 0.108 | | -0.737 | 0.585 | 0.339 |
| 33 | | | | | | | | | | | |
| 34 | | | | | | | | | | | |
| 35 | | Mirror 1 Corners | | | | Mirror 2 Corners | | | | Mirror 3 Corners | |
| 36 | x | y | z | | x | y | z | | x | y | z |
| 37 | 4.900 | -0.800 | 6.409 | | 2.850 | -3.200 | 3.370 | | | | |
| 38 | 6.100 | -0.800 | 5.645 | | 4.200 | -2.800 | 3.231 | | | | |
| 39 | 6.000 | -4.500 | 6.468 | | 5.950 | -4.500 | 6.464 | | | | |
| 40 | 4.900 | -4.500 | 7.168 | | 4.600 | -4.950 | 6.680 | | | | |
| 41 | | | | | | | | | | | |
| 42 | | | | | | | | | | | |
| 43 | | | | | | | | | | | |

FIG. 6I2

| | A | B | C | D | E | F | G | H | I | J | K | L |
|---|---|---|---|---|---|---|---|---|---|---|---|---|
| 25 | High Elevation Right Skew | Facet | 10 | | | | | | | | | |
| 26 | | x | y | z | | | | | | | | |
| 27 | Vector from Module | -0.616 | 0.000 | 0.788 | | | | | | | | |
| 28 | | End | | | | Middle | | | | End | | |
| 29 | | x | y | z | | x | y | z | | x | y | z |
| 30 | Output Vectors From Disk | 0.452 | -0.177 | 0.874 | | 0.441 | -0.235 | 0.866 | | 0.366 | -0.474 | 0.801 |
| 31 | First Mirror Reflected Directions | -0.538 | -0.496 | -0.681 | | -0.525 | -0.546 | -0.653 | | -0.458 | -0.739 | -0.494 |
| 32 | Second Mirror Reflected Directions | -0.792 | 0.610 | 0.037 | | -0.789 | 0.606 | 0.096 | | -0.755 | 0.556 | 0.348 |
| 33 | Third Mirror Reflected Directions | | | | | | | | | | | |
| 34 | | | | | | | | | | | | |
| 35 | | Mirror 1 Corners | | | | Mirror 2 Corners | | | | Mirror 3 Corners | | |
| 36 | | x | y | z | | x | y | z | | x | y | z |
| 37 | 1 | 4.900 | -0.800 | 6.409 | | 2.850 | -3.200 | 3.370 | | | | |
| 38 | 2 | 6.100 | -0.800 | 5.645 | | 4.200 | -2.800 | 3.231 | | | | |
| 39 | 3 | 6.000 | -4.500 | 6.468 | | 5.950 | -4.500 | 6.464 | | | | |
| 40 | 4 | 4.900 | -4.500 | 7.168 | | 4.600 | -4.950 | 6.680 | | | | |
| 41 | 5 | | | | | | | | | | | |
| 42 | 6 | | | | | | | | | | | |
| 43 | 7 | | | | | | | | | | | |
| 44 | 8 | | | | | | | | | | | |

FIG. 6I3

| | Z | AA | AB | AC | AD | AE | AF | AG | AH | AI | AJ |
|---|---|---|---|---|---|---|---|---|---|---|---|
| 25 | Facet | 12 | | | | | | | | | |
| 26 | x | y | z | | | | | | | | |
| 27 | -0.616 | 0.000 | 0.788 | | | | | | | | |
| 28 | End | | | | Middle | | | | End | | |
| 29 | x | y | z | | x | y | z | | x | y | z |
| 30 | 0.422 | -0.176 | 0.889 | | 0.415 | -0.220 | 0.883 | | 0.332 | -0.478 | 0.813 |
| 31 | -0.564 | -0.494 | -0.661 | | -0.554 | -0.533 | -0.640 | | -0.482 | -0.741 | -0.467 |
| 32 | -0.811 | 0.583 | 0.039 | | -0.810 | 0.581 | 0.084 | | -0.773 | 0.526 | 0.356 |
| 33 | | | | | | | | | | | |
| 34 | | | | | | | | | | | |
| 35 | Mirror 1 Corners | | | | Mirror 2 Corners | | | | Mirror 3 Corners | | |
| 36 | x | y | z | | x | y | z | | x | y | z |
| 37 | 4.900 | -0.800 | 6.409 | | 2.850 | -3.200 | 3.370 | | | | |
| 38 | 6.100 | -0.800 | 5.645 | | 4.200 | -2.800 | 3.231 | | | | |
| 39 | 6.000 | -4.500 | 6.468 | | 5.950 | -4.500 | 6.464 | | | | |
| 40 | 4.900 | -4.500 | 7.168 | | 4.600 | -4.950 | 6.680 | | | | |
| 41 | | | | | | | | | | | |
| 42 | | | | | | | | | | | |
| 43 | | | | | | | | | | | |
| 44 | | | | | | | | | | | |

FIG. 6I4

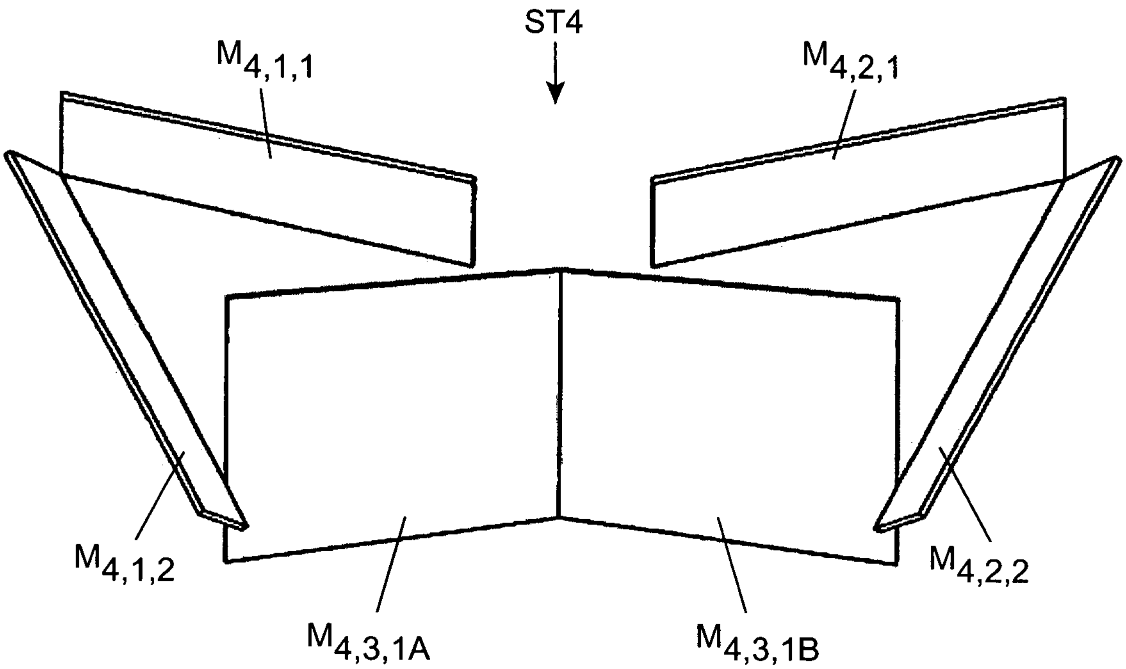
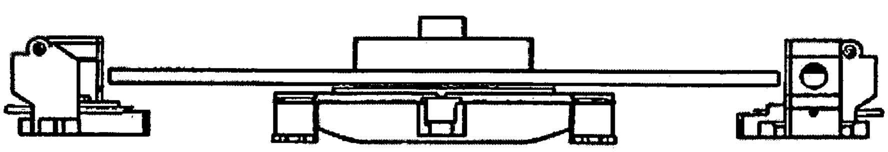
FIG. 6J1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.788 | 0.001 | 0.616 | | 0.788 | 0.000 | 0.616 | | 0.741 | -0.367 | 0.562 |
| 52 | -0.938 | 0.335 | 0.087 | | -0.939 | 0.334 | 0.087 | | -0.999 | -0.031 | 0.029 |
| 53 | | | | | | | | | | | |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |
| 66 | | | | | | | | | | | |

FIG. 6J2

| | Z | AA | AB | AC | AD | AE | AF | AG | AH | AI | AJ |
|---|---|---|---|---|---|---|---|---|---|---|---|
| 46 | Facet | 2 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.766 | 0.000 | 0.643 | | 0.766 | 0.000 | 0.643 | | 0.711 | -0.395 | 0.581 |
| 52 | -0.936 | 0.329 | 0.121 | | -0.936 | 0.329 | 0.121 | | -0.996 | -0.065 | 0.058 |
| 53 | | | | | | | | | | | |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |
| 66 | | | | | | | | | | | |

FIG. 6J3

| | A | B | C | D | E | F | G | H | I | J | K | L |
|---|---|---|---|---|---|---|---|---|---|---|---|---|
| 46 | Low Elevation | Facet | 3 | | | | | | | | | |
| 47 | | x | y | z | | | | | | | | |
| 48 | Vector from Module | -0.616 | 0.000 | 0.788 | | | | | | | | |
| 49 | | | End | | | | Middle | | | | End | |
| 50 | | x | y | z | | x | y | z | | x | y | z |
| 51 | Output Vectors From Disk | 0.743 | 0.000 | 0.669 | | 0.743 | 0.000 | 0.669 | | 0.697 | -0.362 | 0.619 |
| 52 | First Mirror Reflected Directions | -0.933 | 0.324 | 0.156 | | -0.933 | 0.324 | 0.156 | | -0.994 | -0.035 | 0.101 |
| 53 | Second Mirror Reflected Directions | | | | | | | | | | | |
| 54 | Third Mirror Reflected Directions | | | | | | | | | | | |
| 55 | | | | | | | | | | | | |
| 56 | | | Mirror 1 Corners | | | | Mirror 2 Corners | | | | Mirror 3 Corners | |
| 57 | | x | y | z | | x | y | z | | x | y | z |
| 58 | 1 | 6.700 | 0.000 | 5.608 | | | | | | | | |
| 59 | 2 | 7.400 | 0.000 | 3.322 | | | | | | | | |
| 60 | 3 | 6.950 | -3.000 | 2.897 | | | | | | | | |
| 61 | 4 | 6.200 | -3.000 | 5.345 | | | | | | | | |
| 62 | 5 | | | | | | | | | | | |
| 63 | 6 | | | | | | | | | | | |
| 64 | 7 | | | | | | | | | | | |
| 65 | 8 | | | | | | | | | | | |
| 66 | | | | | | | | | | | | |

FIG. 6J4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.719 | 0.000 | 0.695 | | 0.719 | 0.000 | 0.695 | | 0.664 | -0.395 | 0.635 |
| 52 | -0.929 | 0.319 | 0.190 | | -0.929 | 0.319 | 0.190 | | -0.989 | -0.075 | 0.129 |
| 53 | | | | | | | | | | | |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |
| 66 | | | | | | | | | | | |

FIG. 6J5

| | AX | AY | AZ | BA | BB | BC | BD | BE | BF | BG | BH |
|---|---|---|---|---|---|---|---|---|---|---|---|
| 46 | Facet | 5 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.669 | 0.000 | 0.743 | | 0.669 | 0.000 | 0.743 | | 0.621 | -0.362 | 0.695 |
| 52 | -0.916 | 0.307 | 0.257 | | -0.916 | 0.307 | 0.257 | | -0.977 | -0.052 | 0.206 |
| 53 | | | | | | | | | | | |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |

FIG. 6J6

| | BJ | BK | BL | BM | BN | BO | BP | BQ | BR | BS | BT | BU |
|---|---|---|---|---|---|---|---|---|---|---|---|---|
| 46 | Facet | 6 | | | | | | | | | | |
| 47 | x | y | z | | | | | | | | | |
| 48 | -0.616 | 0.000 | 0.788 | | | | | | | | | |
| 49 | End | | | | Middle | | | | End | | | |
| 50 | x | y | z | | x | y | z | | x | y | z | |
| 51 | 0.616 | 0.000 | 0.788 | | 0.616 | 0.000 | 0.788 | | 0.561 | -0.380 | 0.735 | |
| 52 | -0.900 | 0.293 | 0.324 | | -0.900 | 0.293 | 0.324 | | -0.959 | -0.086 | 0.270 | |
| 53 | | | | | | | | | | | | |
| 54 | | | | | | | | | | | | |
| 55 | | | | | | | | | | | | |
| 56 | Mirror 1 Corners | | | | Mirror 2 Corners | | | | Mirror 3 Corners | | | |
| 57 | x | y | z | | x | y | z | | x | y | z | |
| 58 | 6.700 | 0.000 | 5.608 | | | | | | | | | |
| 59 | 7.400 | 0.000 | 3.322 | | | | | | | | | |
| 60 | 6.950 | -3.000 | 2.897 | | | | | | | | | |
| 61 | 6.200 | -3.000 | 5.345 | | | | | | | | | |
| 62 | | | | | | | | | | | | |
| 63 | | | | | | | | | | | | |
| 64 | | | | | | | | | | | | |
| 65 | | | | | | | | | | | | |

Figure 7C:
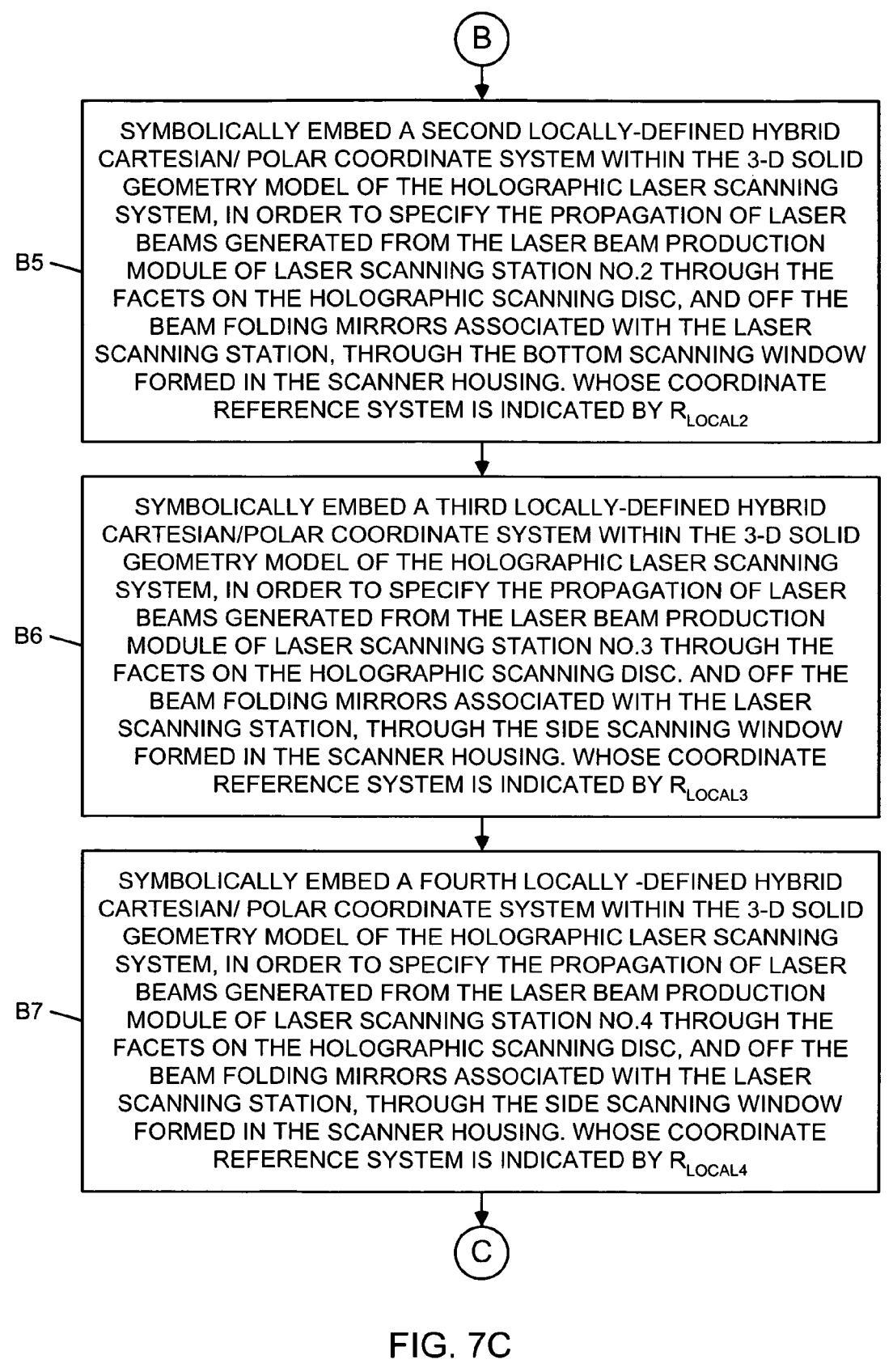

B5 — SYMBOLICALLY EMBED A SECOND LOCALLY-DEFINED HYBRID CARTESIAN/ POLAR COORDINATE SYSTEM WITHIN THE 3-D SOLID GEOMETRY MODEL OF THE HOLOGRAPHIC LASER SCANNING SYSTEM, IN ORDER TO SPECIFY THE PROPAGATION OF LASER BEAMS GENERATED FROM THE LASER BEAM PRODUCTION MODULE OF LASER SCANNING STATION NO.2 THROUGH THE FACETS ON THE HOLOGRAPHIC SCANNING DISC, AND OFF THE BEAM FOLDING MIRRORS ASSOCIATED WITH THE LASER SCANNING STATION, THROUGH THE BOTTOM SCANNING WINDOW FORMED IN THE SCANNER HOUSING. WHOSE COORDINATE REFERENCE SYSTEM IS INDICATED BY $R_{LOCAL2}$

B6 — SYMBOLICALLY EMBED A THIRD LOCALLY-DEFINED HYBRID CARTESIAN/POLAR COORDINATE SYSTEM WITHIN THE 3-D SOLID GEOMETRY MODEL OF THE HOLOGRAPHIC LASER SCANNING SYSTEM, IN ORDER TO SPECIFY THE PROPAGATION OF LASER BEAMS GENERATED FROM THE LASER BEAM PRODUCTION MODULE OF LASER SCANNING STATION NO.3 THROUGH THE FACETS ON THE HOLOGRAPHIC SCANNING DISC. AND OFF THE BEAM FOLDING MIRRORS ASSOCIATED WITH THE LASER SCANNING STATION, THROUGH THE SIDE SCANNING WINDOW FORMED IN THE SCANNER HOUSING. WHOSE COORDINATE REFERENCE SYSTEM IS INDICATED BY $R_{LOCAL3}$

B7 — SYMBOLICALLY EMBED A FOURTH LOCALLY -DEFINED HYBRID CARTESIAN/ POLAR COORDINATE SYSTEM WITHIN THE 3-D SOLID GEOMETRY MODEL OF THE HOLOGRAPHIC LASER SCANNING SYSTEM, IN ORDER TO SPECIFY THE PROPAGATION OF LASER BEAMS GENERATED FROM THE LASER BEAM PRODUCTION MODULE OF LASER SCANNING STATION NO.4 THROUGH THE FACETS ON THE HOLOGRAPHIC SCANNING DISC, AND OFF THE BEAM FOLDING MIRRORS ASSOCIATED WITH THE LASER SCANNING STATION, THROUGH THE SIDE SCANNING WINDOW FORMED IN THE SCANNER HOUSING. WHOSE COORDINATE REFERENCE SYSTEM IS INDICATED BY $R_{LOCAL4}$

(1) THE RADIUS TO BEAM-INCIDENT-POINT ON THE HOLOGRAPHIC SCANNING DISC, ASSIGNED THE SYMBOLIC NOTATION "$\mathbf{r_0}$"

(2) THE DISTANCE FROM RADIUS TO BEAM-INCIDENT-POINT $\mathbf{r_0}$ TO BEAM FOLDING MIRROR, ASSIGNED THE SYMBOLIC NOTATION "L"

(3) THE FACET NO. ON THE HOLOGRAPHIC SCANNING DISC, ASSIGNED THE SYMBOLIC NOTATION "i"

(4) THE DISTANCE FROM THE BEAM INCIDENT POINT ON THE VIRTUAL SCANNING DISC TO THE FOCAL PLANE WITHIN WHICH THE (i, j)-TH SCANLINE RESIDES, ASSIGNED THE SYMBOLIC NOTATION "$\mathbf{f_i}$"

(5) THE DIAMETER OF THE CROSS-SECTION OF THE LASER BEAM SCANNING STATION, ASSIGNED THE SYMBOLIC NOTATION "$\mathbf{d_{BEAM}}$"

(6) THE ANGULAR GAP BETWEEN ADJACENT HOLOGRAPHIC SCANNING FACETS, ASSIGNED THE SYMBOLIC NOTATION "$\mathbf{d_{GAP}}$"

(7) THE OUTER RADIUS OF THE AVAILABLE LIGHT COLLECTION REGION ON THE HOLOGRAPHIC SCANNING DISC, ASSIGNED THE SYMBOLIC NOTATION "$\mathbf{r_{OUTER}}$"

(8) THE INNER RADIUS OF THE AVAILABLE LIGHT COLLECTION REGION ON THE HOLOGRAPHIC SCANNING FACET, ASSIGNED THE SYMBOLIC NOTATION "$\mathbf{r_{INNER}}$"

(9) THE FOCAL LENGTH OF THE i-TH HOLOGRAPHIC SCANNING FACET FROM THE SCANNING FACET TO THE CORRESPONDING FOCAL PLANE WITHIN THE SCANNING VOLUME, ASSIGNED THE SYMBOLIC NOTATION "$\mathbf{f_i}$"

(10) INCIDENT BEAM ANGLE, ASSIGNED THE SYMBOLIC NOTATION "$\mathbf{A_i}$"

FIG. 8D1

(11) DIFFRACTED BEAM ANGLE, ASSIGNED THE SYMBOLIC NOTATION "$\mathbf{B_i}$"

(12) THE SCAN ANGLE OF THE LASER BEAM, ASSIGNED THE SYMBOLIC NOTATION "$\theta_{Si}$"

(13) THE SCAN MULTIPLICATION FACTOR FOR THE i-TH HOLOGRAPHIC FACET, ASSIGNED THE SYMBOLIC NOTATION "$\mathbf{M_i}$"

(14) THE FACET ROTATION ANGLE FOR THE i-TH HOLOGRAPHIC FACET, ASSIGNED THE SYMBOLIC NOTATION "$\theta_{ROTi}$"

(15) ADJUSTED FACET ROTATION ANGLE ACCOUNTING FOR DEADTIME, ASSIGNED THE SYMBOLIC NOTATION "$\theta'_{ROTi}$"

(16) THE LIGHT COLLECTION EFFICIENCY FACTOR FOR THE i-TH HOLOGRAPHIC FACET, NORMALIZED RELATIVE TO THE 16TH FACET, ASSIGNED THE SYMBOLIC NOTATION "$\xi_i$"

(17) THE MAXIMUM LIGHT COLLECTION AREA FOR THE i-TH HOLOGRAPHIC FACET, ASSIGNED THE SYMBOLIC NOTATION "$\mathbf{Area_i}$"

(18) THE ANGLE OF SKEW OF THE DIFFRACTED LASER BEAM AT THE CENTER OF THE i-TH HOLOGRAPHIC FACET, ASSIGNED THE SYMBOLIC NOTATION "$\phi_{SKEW}$"

FIG. 8D2

PARAMETER EQUATION USED IN THE SPREADSHEET DESIGN OF THE SCANNER

(1) $f_i$ Focal Length - $f_{i\text{-th}}$ facet (2) $B_i$ Elevation Angle; $\theta_{dif}\,i = 90 - B_i$ (3) $\theta_{Si}$ (4) $$M_i := \frac{r_0}{r_i} \cos(\theta_{skew}) + \cos(\lambda_i) + \cos(B_i)$$

(5) $$\theta_{roti} := \frac{\theta_{Si}}{M_i}$$

(6) $$\theta'_{roti} := \theta_{roti} + \underbrace{\frac{d_{beam}}{r_0} + \frac{d_{gap}}{r_0}}_{\Theta_{dead}}$$

(7) $$\xi_i := \left[\frac{f_i}{f_{20}}\right] \frac{\sin[B_{20}]}{\sin(B_i)} H_i$$

(8) $$\text{Area}_i := \pi \left[r^2_{outer} + r^2_{inner}\right] \frac{\xi_i}{\sum_{i=1}^{20} [\xi_i]} \qquad i = 1, 2, \ldots 20$$

FIG. 8E

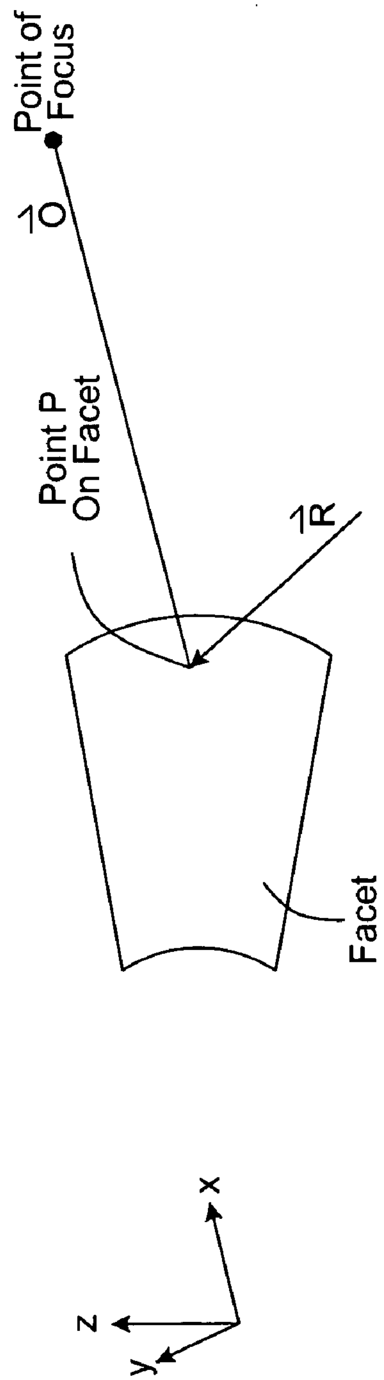
FIG. 8F1
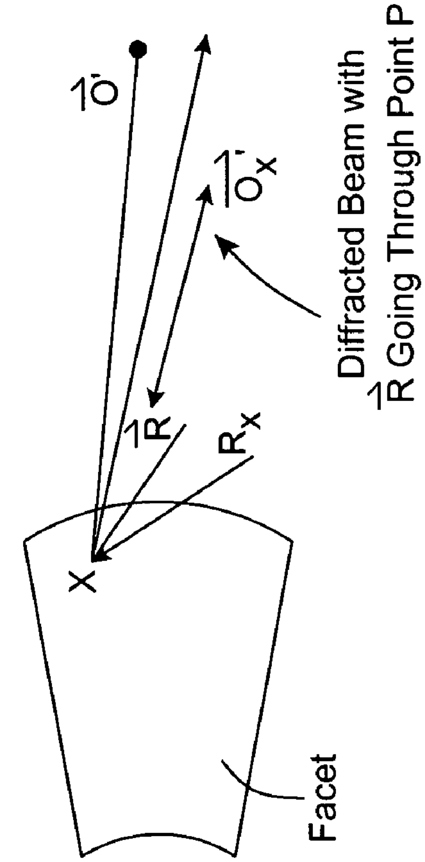
FIG. 8F2

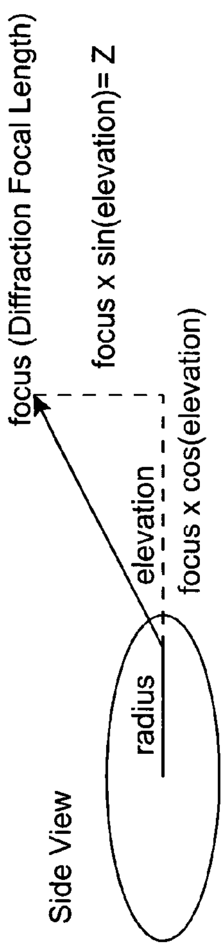
FIG. 8F3
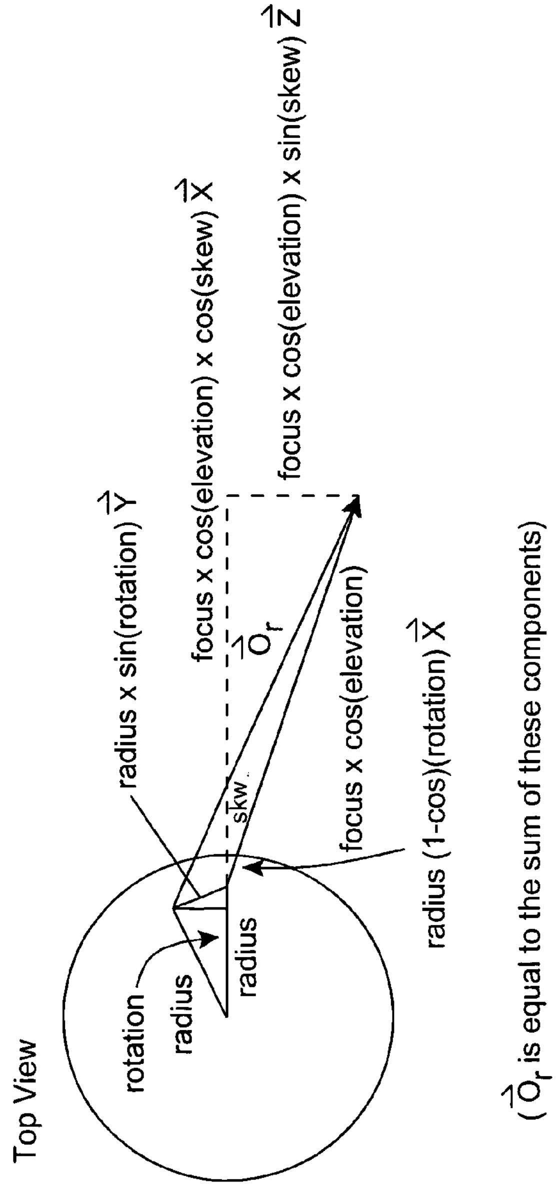
FIG. 8F4

Object Ray $\vec{O}_P$ Composition:

$$\vec{O}_P = [\text{focus} \times \cos(\text{elevation}) \times \cos(\text{skew}) + \text{radius}(1 - \cos(\text{rotation})]\vec{X}$$

$$+ [\text{focus} \times \cos(\text{elevation}) \times \sin(\text{skew}) + \text{radius} \times \sin(\text{rotation})]\,\vec{Y}$$

$$+ [\text{focus} - \sin(\text{elevation})]\vec{Z}$$

Where focus = the diffraction
elevation = elevation angle of facet
skew = skew angle of facet
radius = radius to point P
rotation = start-middle-end of scan angles

FIG. 8F5

| | A | B | C | D | E | F | G | H | I |
|---|---|---|---|---|---|---|---|---|---|
| 788 | *** Optical Power at the Data Detector and Resulting Signal Levels *** | | | | | | | | |
| 789 | | | | | | | | | |
| 790 | Calculation of the power at the data detector for targets located at the focal planes | | | | | | | | |
| 791 | and targets located at the maximum depth of field limits for each facet. | | | | | | | | |
| 792 | Assumes average angular offset of: | | | 0.7 | degrees | | | | |
| 793 | (Offset of outgoing beam from center of facet) | | | | | | | | ( At focal |
| 794 | | | | | | | | | plane) |
| 795 | | Laser | Transm. of | Refl. of | Diff. Eff. of | S - diff. eff. of | S - refl. of | Trans. of | Lambertian |
| 796 | Facet | Power | collimating | first | MF plate | holographic | second, third | Window | reflectance |
| 797 | | (mW) | lens | mirror | | facet | & fourth mirror | | factor |
| 798 | | | | | | | | | |
| 799 | | 3.36 | 0.46 | 0.95 | 0.85 | | 0.97 | 0.8 | |
| 800 | 1 | | (This includes the | | | 0.89 | | | 0.0027739 |
| 801 | 2 | | truncation losses) | | | 0.89 | | | 0.0027279 |
| 802 | 3 | | | | | 0.89 | | | 0.0026841 |
| 803 | 4 | | | | | 0.90 | | | 0.0026424 |
| 804 | 5 | | | | | 0.90 | | | 0.0025657 |
| 805 | 6 | | | | | 0.90 | | | 0.0024980 |
| 806 | 7 | | | | | 0.90 | | | 0.0024122 |
| 807 | 8 | | | | | 0.90 | | | 0.0024122 |
| 808 | 9 | | | | | 0.90 | | | 0.0023874 |
| 809 | 10 | | | | | 0.90 | | | 0.0023874 |
| 810 | 11 | | | | | 0.90 | | | 0.0023645 |
| 811 | 12 | | | | | 0.90 | | | 0.0023645 |

FIG. 9A

| | J | K | L | M | N | O | P | Q | R | S |
|---|---|---|---|---|---|---|---|---|---|---|
| 788 | | | | | | | | | | |
| 789 | | | | | | | | | | |
| 790 | | | | | | | | | | |
| 791 | | | | | | | | Detector sensitivity (mV/nW): | | |
| 792 | (At maximum | | | | | | | | (Targets lo | (At maximum |
| 793 | depth of | | | | | | | | facet foca | depth of |
| 794 | field) | | Average of P | Average of P | | | Trans. of | Power at | Power at | field) |
| 795 | Lambertian | Diffuse Refl. | and S - refl. of | and S - diff. eff. | Refl. of | Trans. of | polarizing | window | detector | Lambertian |
| 796 | reflectance | of bar code | second, third | of holographic | parabolic | hol. facet | filter | (mW) | (nW) | reflectance |
| 797 | factor | | & fourth mirror | facet | mirror | off-Bragg | (none used) | | | factor |
| 798 | | | | | | | | | | |
| 799 | | 0.9 | 0.86 | | 0.92 | 0.93 | 1 | | | |
| 800 | 0.0018058 | | | 0.69 | | | | 0.86 | 872 | |
| 801 | 0.0017176 | | | 0.70 | | | | 0.86 | 873 | |
| 802 | 0.0017579 | | | 0.71 | | | | 0.86 | 874 | |
| 803 | 0.0016637 | | | 0.72 | | | | 0.86 | 874 | |
| 804 | 0.0016804 | | | 0.75 | | | | 0.86 | 876 | |
| 805 | 0.0016002 | | | 0.77 | | | | 0.87 | 877 | |
| 806 | 0.0016650 | | | 0.79 | | | | 0.87 | 879 | |
| 807 | 0.0016650 | | | 0.79 | | | | 0.87 | 879 | |
| 808 | 0.0015995 | | | 0.80 | | | | 0.87 | 880 | |
| 809 | 0.0015995 | | | 0.80 | | | | 0.87 | 880 | |
| 810 | 0.0016358 | | | 0.81 | | | | 0.87 | 880 | |
| 811 | 0.0016358 | | | 0.81 | | | | 0.87 | 880 | |

FIG. 9B

| | T | U | V | W | X | Y | Z | AA |
|---|---|---|---|---|---|---|---|---|
| 788 | | | | | | | | |
| 789 | | | | | | | | |
| 790 | | | | | | | | (From |
| 791 | 6.27 | | | | | | (From | maximum |
| 792 | (Targets located at the | | | | | | focal | depth of |
| 793 | depth of field limits) | | | | | | plane) | field) |
| 794 | Power at | Detector | | | Diffraction | Effective | Light | Light |
| 795 | detector | signal | | Facet | Angle from | Radius of | Collection | Collection |
| 796 | (nW) | (Volts) | | Collection | Center of | Collection | Half- | Half- |
| 797 | | | | Area | Facet | Area | Angle | Angle |
| 798 | | | | (sq. in.) | (degrees) | (inches) | (degrees) | (degrees) |
| 799 | | | | | | | | |
| 800 | 567 | 3.56 | | 2.25 | 52.70 | 0.66 | 3.02 | 2.44 |
| 801 | 549 | 3.45 | | 1.79 | 50.70 | 0.60 | 2.99 | 2.38 |
| 802 | 572 | 3.59 | | 2.07 | 48.70 | 0.66 | 2.97 | 2.40 |
| 803 | 551 | 3.45 | | 1.61 | 46.70 | 0.59 | 2.95 | 2.34 |
| 804 | 574 | 3.60 | | 1.77 | 42.70 | 0.64 | 2.90 | 2.35 |
| 805 | 562 | 3.52 | | 1.45 | 38.70 | 0.60 | 2.86 | 2.29 |
| 806 | 607 | 3.80 | | 1.95 | 32.70 | 0.72 | 2.82 | 2.34 |
| 807 | 607 | 3.80 | | 1.95 | 32.70 | 0.72 | 2.82 | 2.34 |
| 808 | 589 | 3.69 | | 1.59 | 30.70 | 0.66 | 2.80 | 2.29 |
| 809 | 589 | 3.69 | | 1.59 | 30.70 | 0.66 | 2.80 | 2.29 |
| 810 | 609 | 3.82 | | 1.86 | 28.70 | 0.72 | 2.79 | 2.32 |
| 811 | 609 | 3.82 | | 1.86 | 28.70 | 0.72 | 2.79 | 2.32 |

FIG. 9C

Geometrical Optics Model For Holographic (Total Out And Back) Light Diffraction Efficiency Calculations
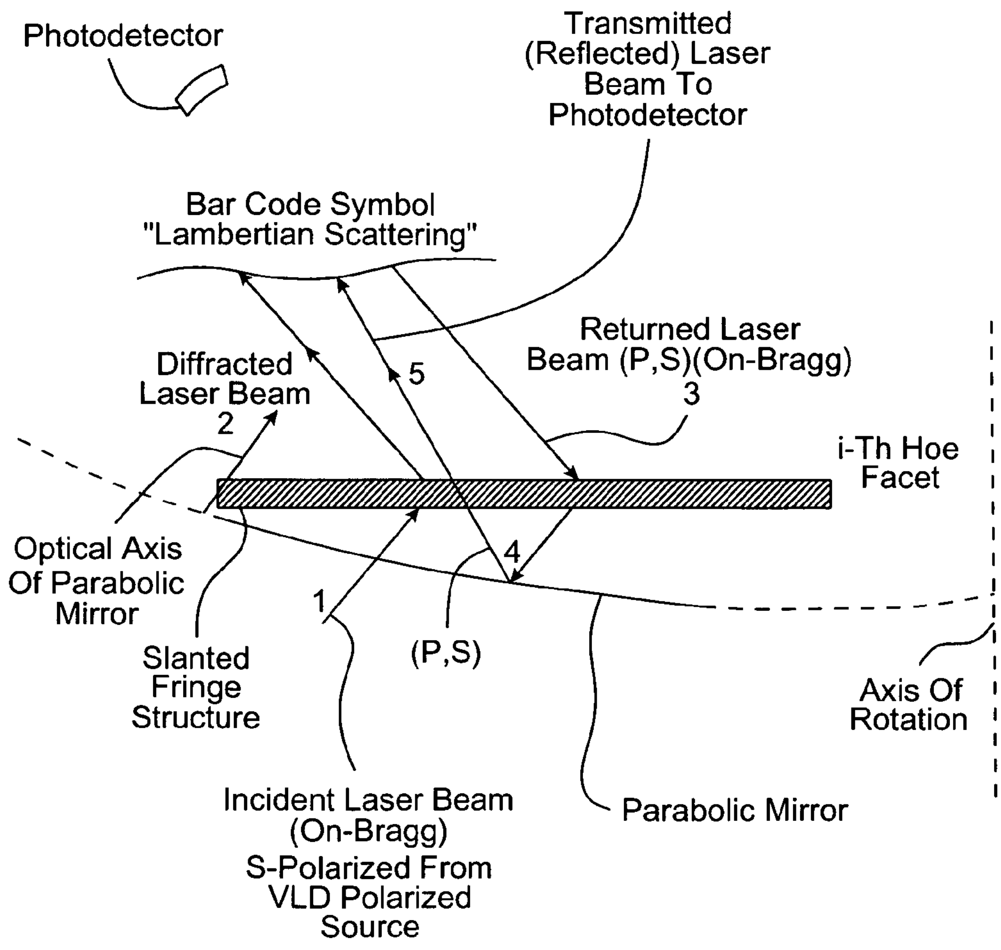
FIG. 10A1

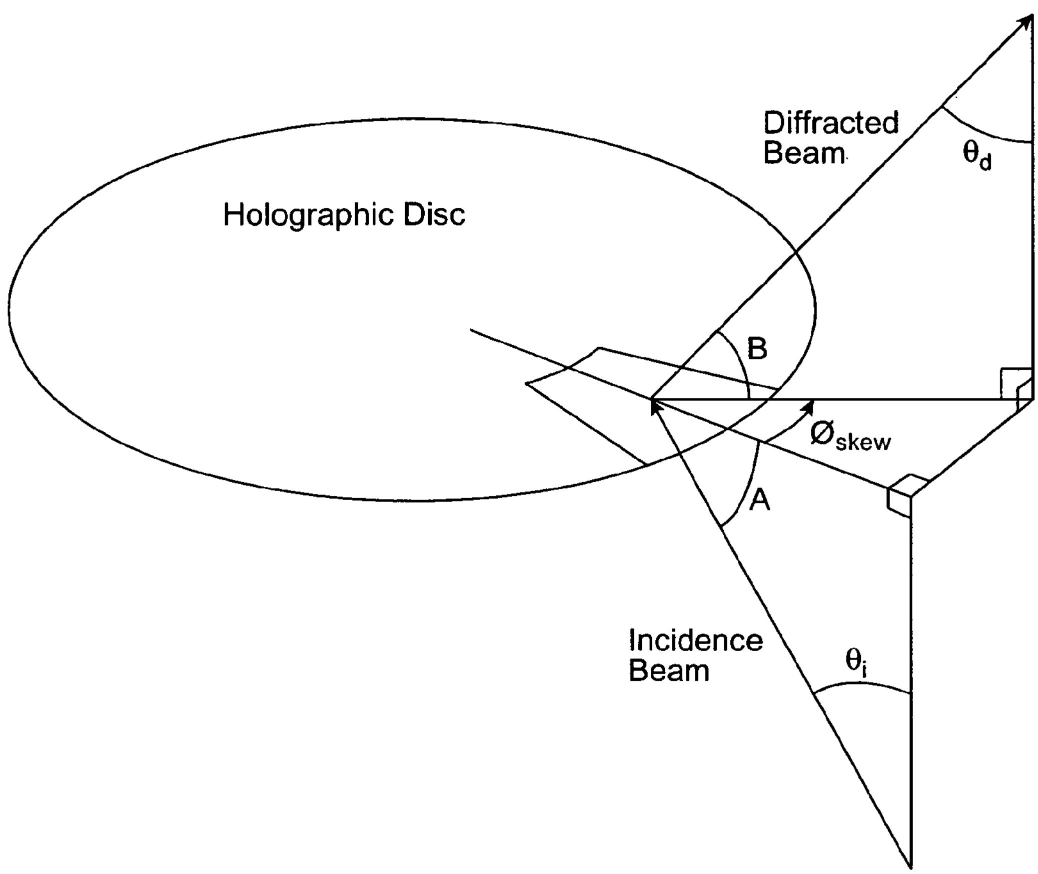
FIG. 10A2

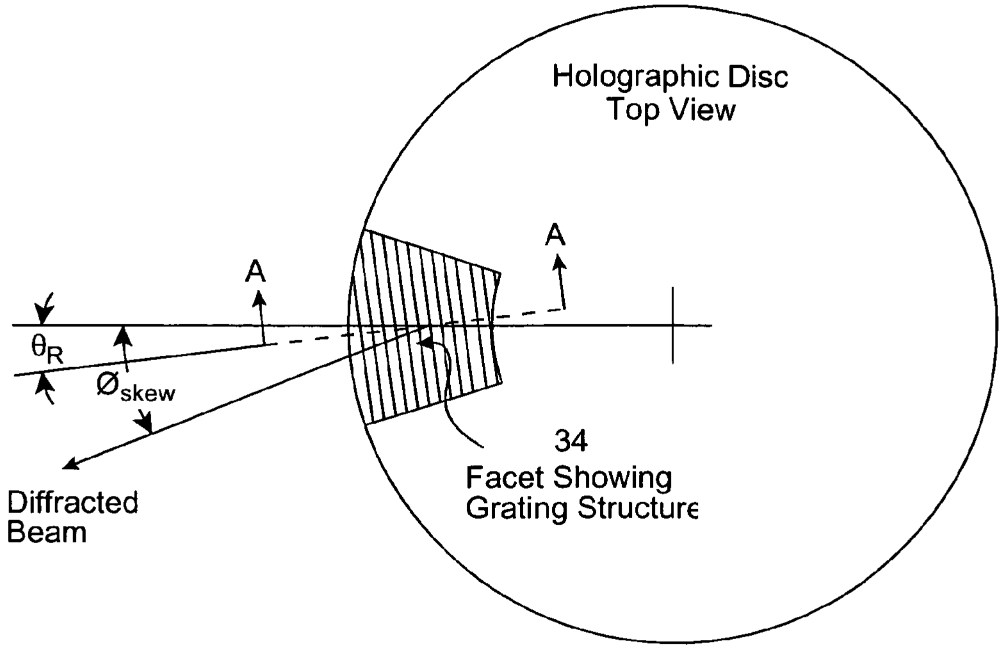
FIG. 10A3
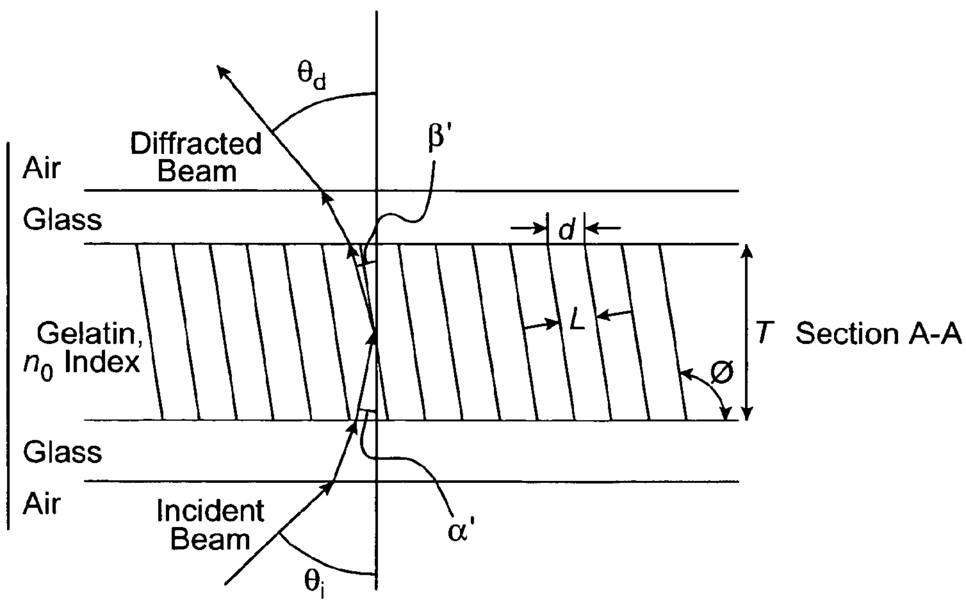
Note: The Prime Attached To The Angles (e.g. α')
Indicates They Are Projected Into The viewing Plane A-A
FIG. 10A4

S AND P DIFFRACTION EFFICIENCY ANALYSIS FOR THE MOST GENERAL CASE

The following analysis takes into consideration slanted fringes, skewed design, off-Bragg effects, and disc rotation effects. It is assumed that the wavelength does not deviate from the design, and that all scattering, absorption, and reflection losses are taken into account by the transmission coefficients, $t_s$ and $t_p$, which are determined by measurement.

Definitions:

$\theta_i$ = Angle of incidence outside the HOE ($\theta_i = 90° - A$);

$\alpha$ = Angle of incidence inside the HOE;

$\theta_d$ = Angle of diffraction outside the HOE ($\theta_i = 90° - B$);

$\beta$ = Angle of diffraction inside the HOE;

$\phi_{skew}$ = Skew angle of the HOE;

$\phi$ = Tilt of Bragg planes ($\phi = \pi/2$ for no tilt);

$\theta_R$ = Rotation angle of HOE grating ( $\theta_R = \theta_{Ro}$ when facet is centered)

$L$ = Separation of the Bragg planes;

$T$ = Thickness of the HOE medium;

$d$ = HOE surface fringe spacing;

$n_0$ = Average refractive index of HOE medium;

$n_1$ = Modulation (i.e. amplitude of periodic variation) of refractive index;

$\lambda_a$ = Laser wavelength in air;

$t_s$ = Transmission of S-polariztion through disc considering losses;

$t_p$ = Transmission of P-polariztion through disc considering losses.

FIG. 10B (1) $\alpha = \arcsin\left(\frac{\sin\theta_i}{n_0}\right)$ (2) $\beta = \arcsin\left(\frac{\sin\theta_d}{n_0}\right)$ (3) $\phi = \arcsin\left(\frac{\cos\beta - \cos\alpha}{\sqrt{2(1 + \sin\alpha\sin\beta\cos\phi_{skew} - \cos\alpha\cos\beta)}}\right) + 90$ (4) $d = \sqrt{\frac{\lambda_a^2}{\sin^2\theta_d\sin^2\phi_{skew} + (\sin\theta_i + \sin\theta_d\cos\phi_{skew})^2}}$ (5) $L = d\sin\phi$ (6) $C_R = \cos\alpha$ (7) $C_S = \cos\alpha - \frac{\lambda_a}{n_0 L}\cos\phi$ (8) $N = \pi n_1 \frac{T}{\lambda_a\sqrt{C_R C_S}}$ (9) $\theta_{Ro} = \arcsin\left(\frac{d}{\lambda_a}\sin\theta_d\sin\phi_{skew}\right)$

(10) $\Gamma = \frac{2\pi(\sin\alpha\sin\phi\cos\theta_{Ro} + \cos\alpha\cos\phi)}{L} - \frac{\pi\lambda_a}{n_0 L^2}$

(11) $S = \Gamma\frac{T}{2C_S}$

FIG. 10C1

(12) $\kappa = -\sin\alpha \sin\beta \cos\phi_{skew} + \cos\alpha \cos\beta$

(13) $$E_{par} = \frac{\left(\sin\left(\sqrt{N^2 + S^2}\right)\right)^2}{1 + \frac{S^2}{N^2}}$$

(14) $$E_{perp} = \frac{\left(\sin\left(\sqrt{(N\kappa)^2 + S^2}\right)\right)^2}{1 + \frac{S^2}{(N\kappa)^2}}$$

(15) $$P_{par} = \frac{-\sin\phi \sin\theta_{Ro}}{\sin(\arccos(-\sin\alpha \sin\phi \cos + \cos\alpha \cos\phi))}$$

(16) $P_{perp} = 1 - P_{par}$

Diffraction efficiencies $E_s$ and $E_p$, given losses $t_s$ and $t_p$ which are specific to each polarization and include absorption, scattering, and reflection losses from AR coatings on the outer surfaces of the disc glass.

(17) $E_s = (E_{perp}P_{par} + E_{par}P_{perp})t_s$

(18) $E_p = (E_{perp}P_{perp} + E_{par}P_{par})t_p$

Total out-and-back efficiency is given by $t_s$, assuming no polarizer in front of the photodetector

(18) $$T_s = E_s \frac{E_s + E_p}{2}$$

FIG. 10C2

(20) $\theta_d\{\theta_R\} = \arcsin\sqrt{\left(\frac{\lambda_a}{d}\right)^2 - 2\frac{\lambda_a}{d}\cos\theta_R\sin\theta_i + \sin^2\theta_i}$

(21) $\phi_{skew}\{\theta_R\} = \arctan\left[\frac{\sin\theta_R}{\cos\theta_R - (d/\lambda_a)\sin\theta_i}\right]$

(22) $T_s\{\theta_{imax}\}\cos\theta_d|_{\theta_R = \theta_{Ro} - ½\theta_{ROTi}} = T_s\{\theta_{imax}\}\cos\theta_d|_{\theta_R = \theta_{Ro} - ½\theta_{ROTi}}$ The design efficiency of the i-th facet is given by evaluating $T_s$ at the design incidence angle, $\theta_i$, the design rotation angle, $\theta_{Ro}$, and the index modulation that maximizes the efficiency, $n_{1max}$, given the true maximum efficiency incidence angle, $\theta_{imax}$, that results from equation (22). The relative efficiency, $H_i$, is then given by dividing the total efficiency of the first facet by that of the i-th facet.

(23) $H_i = \frac{T_{s1}}{T_{si}\{\theta_i, \theta_{imax}, \theta_{Ro}, n_{1max}\}}$

FIG. 10C3

Diffraction Efficiency Variation with Disc Rotation

Facet 1: before optimization

Fixed design parameters:
$\theta_i = 38°$ $\theta_d = 52°$ $\phi_{skew} = 0°$ $\lambda_a = 650$ nm DCG parameters:
$T = 2.5$ microns $n_0 = 1.40$ $n_1 = 0.121$ Relative signal is equal to $T_s\cos\theta_d$. Note that the relative signal falls off as the rotation angle goes away from zero. This is for a maximum efficiency incidence angle, $\theta_{imax}$, equal to $\theta_i$ (38°). This indicates a non-optimum configuration.

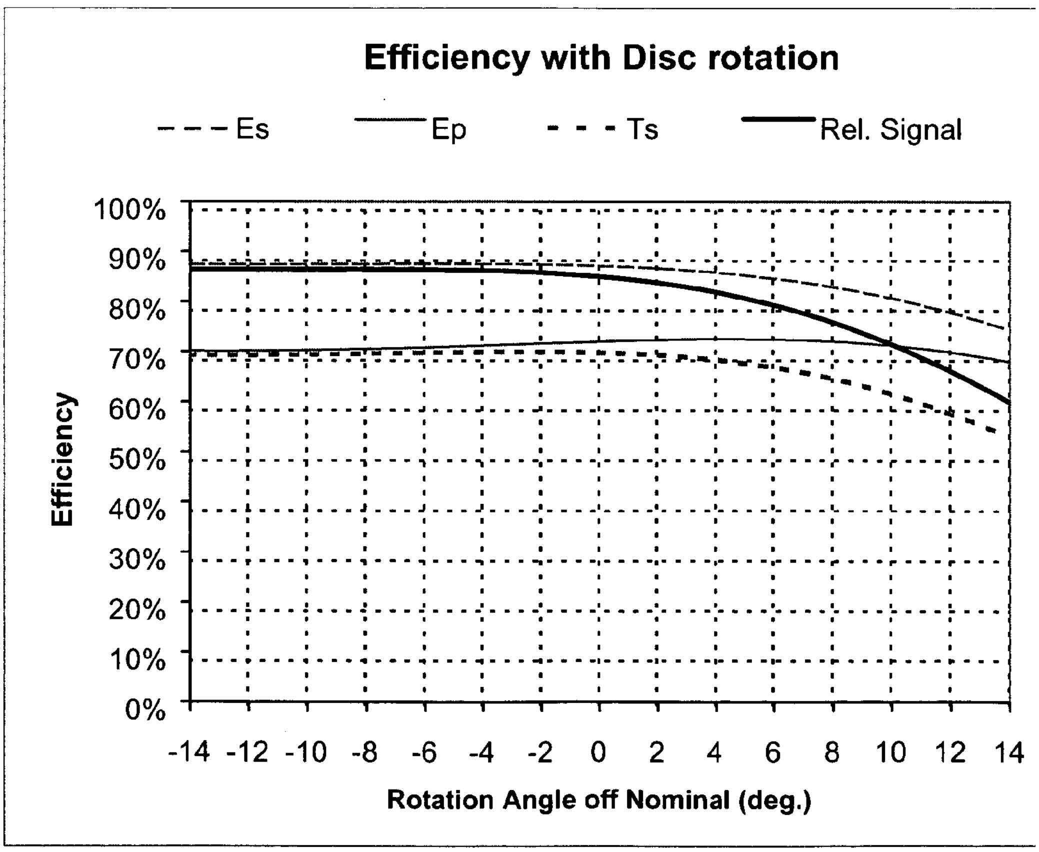

FIG. 10D1

Diffraction Efficiency Variation with Disc Rotation

Facet 1: after optimization

Fixed design parameters:
$\theta_i = 38°$ $\theta_d = 52°$ $\phi_{skew} = 0°$ $\lambda_a = 650$ nm DCG parameters:
$T = 2.5$ microns $n_0 = 1.40$ $n_1 = 0.121$ Relative signal is equal to $T_s \cos\theta_d$. Note that the relative signal at a rotation angle of +/-13° is equal to the relative signal at 0°. This is achieved when the maximum efficiency incidence angle, $\theta_{imax}$, is 36.3°.

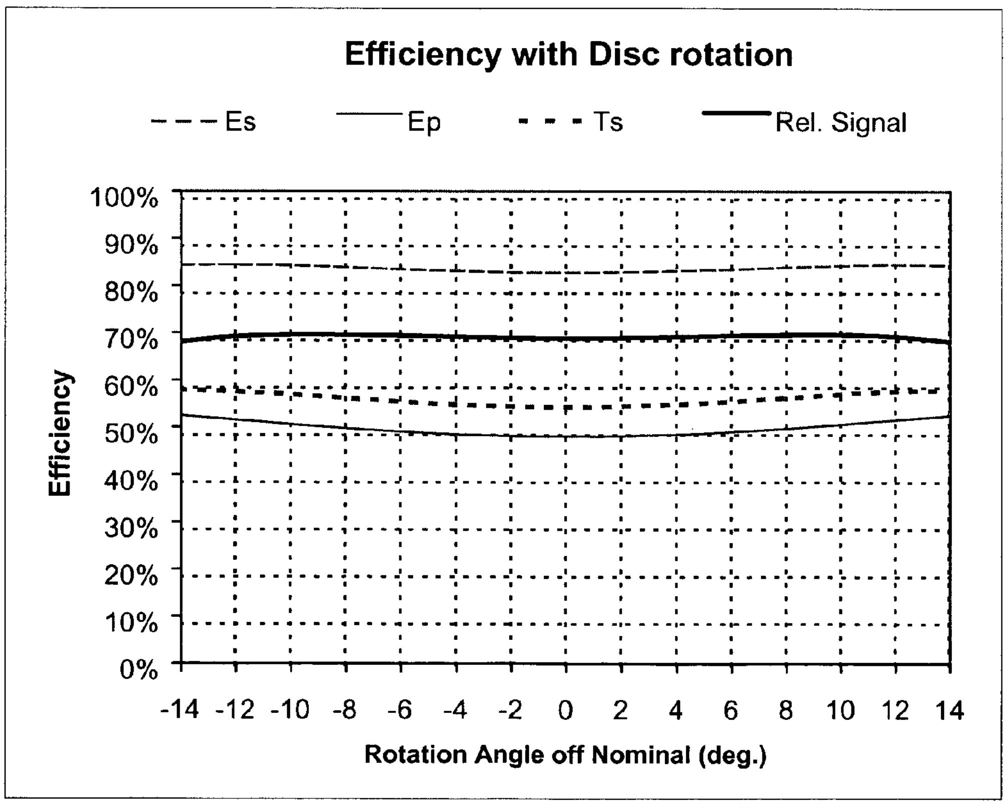

FIG. 10D2

Diffraction Efficiency Variation with Disc Rotation

Facet 7: before optimization

Fixed design parameters:
$\theta_i = 38^o$ $\theta_d = 32^o$ $\phi_{skew} = 28^o$ $\lambda_a = 650$ nm DCG parameters:
$T = 2.5$ microns $n_0 = 1.40$ $n_1 = 0.121$ Relative signal is equal to $T_s \cos\theta_d$. Note that the relative signal falls off as the rotation angle goes from negative to positive. This is for a maximum efficiency incidence angle, $\theta_{imax}$, equal to $\theta_i$ (38°). This indicates a non-optimum configuration.

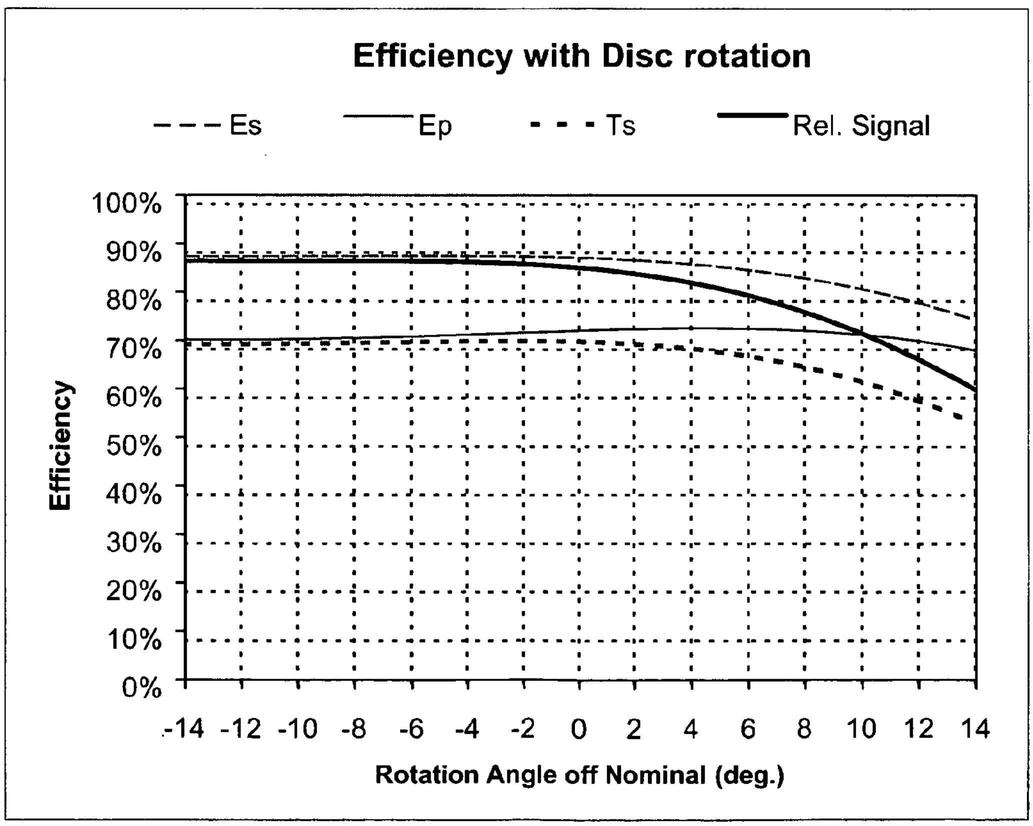

FIG. 10E1

Diffraction Efficiency Variation with Disc Rotation

Facet 7: after optimization

Fixed design parameters:
$\theta_i = 38°$ $\theta_d = 32°$ $\phi_{skew} = 28°$ $\lambda_a = 650$ nm DCG parameters:
$T = 2.5$ microns $n_0 = 1.40$ $n_1 = 0.121$ Relative signal is equal to $T_s \cos\theta_d$. Note that the relative signal at a rotation angle of -14° is equal to the relative signal at +14°. This is achieved when the maximum efficiency incidence angle, $\theta_{imax}$, is 35.8°.

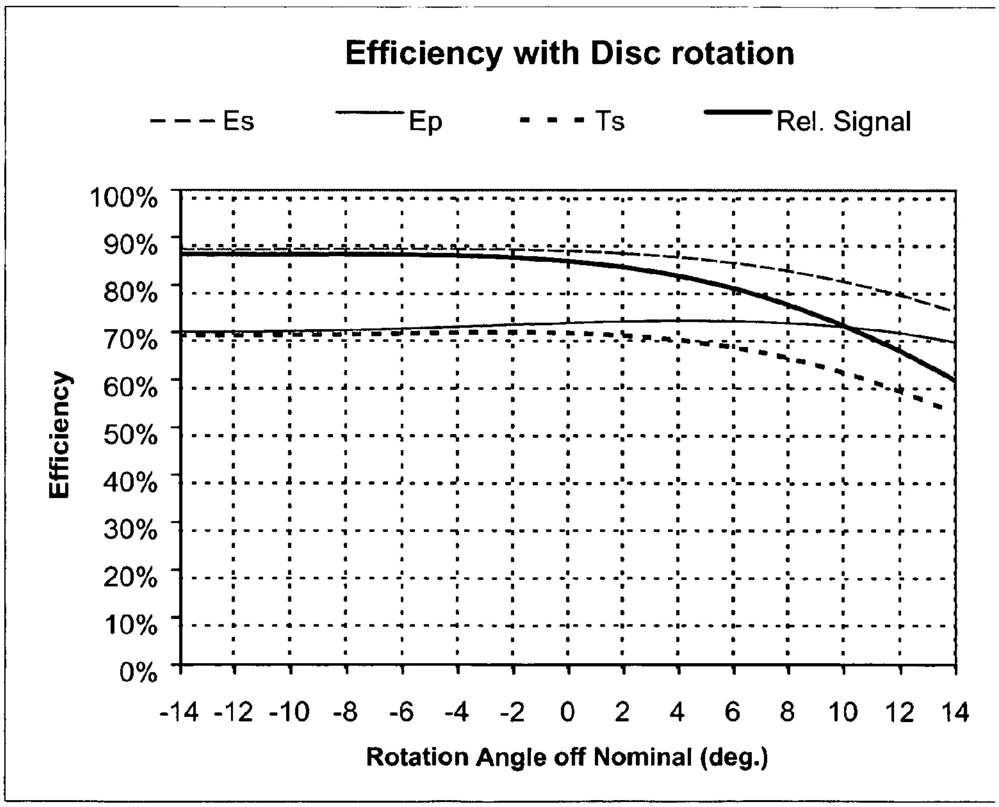

FIG. 10E2

S and P Diffraction Efficiency Calculations

It is assumed that there is no deviation from the nominal wavelength.

Facet-independent design parameters:

| | |
|---|---|
| Design wavelength: | 650 nm |
| External incidence angle: | 38 deg |
| Internal incidence angle: | 26.09 deg |
| Geletin effective thickness: | 2.5 microns |
| Average bulk refractive index: | 1.4 |
| Refractive index modulation: | 0.121 |
| S-polarization losses: | 10% |
| P-polarization losses: | 10% |
| degrees to radians conversion: | 0.017453 |

| Facet | $\theta_d$ (deg.) | $\beta$ (deg.) | $\phi_{skew}$ (deg.) | $d$ (nm) | $\theta_{Ro}$ (deg.) | $\theta_{i\,max}$ (deg.) | $\alpha_{max}$ (deg.) | $\beta_{max}$ (deg.) | $\phi_{s\,max}$ (deg.) | $\phi$ (deg.) | $L$ (nm) | $\theta_{ROT}$ (deg.) |
|---|---|---|---|---|---|---|---|---|---|---|---|---|
| 1 | 52.00 | 34.25 | 0 | 463.1 | 0.00 | 36.30 | 25.02 | 35.43 | 0.00 | 84.79 | 461.2 | 26.24 |
| 2 | 50.00 | 33.17 | 0 | 470.4 | 0.00 | 36.30 | 25.02 | 34.34 | 0.00 | 85.34 | 468.9 | 28.35 |
| 3 | 48.00 | 32.06 | 0 | 478.4 | 0.00 | 36.30 | 25.02 | 33.21 | 0.00 | 85.90 | 477.1 | 26.66 |
| 4 | 46.00 | 30.92 | 0 | 486.9 | 0.00 | 36.30 | 25.02 | 32.05 | 0.00 | 86.48 | 486.0 | 29.19 |
| 5 | 42.00 | 28.55 | 0 | 505.9 | 0.00 | 36.30 | 25.02 | 29.66 | 0.00 | 87.68 | 505.5 | 27.97 |
| 6 | 38.00 | 26.09 | 0 | 527.9 | 0.00 | 36.30 | 25.02 | 27.17 | 0.00 | 88.92 | 527.8 | 30.28 |
| 7 | 32.00 | 22.24 | 28 | 584.7 | 12.93 | 35.80 | 24.70 | 23.45 | 26.52 | 90.64 | 584.6 | 27.99 |
| 8 | 32.00 | 22.24 | -28 | 584.7 | -12.93 | 35.80 | 24.70 | 23.45 | -26.52 | 90.64 | 584.6 | 27.99 |
| 9 | 30.00 | 20.92 | 28 | 600.2 | 12.52 | 35.56 | 24.55 | 22.26 | 26.27 | 91.17 | 600.1 | 30.65 |
| 10 | 30.00 | 20.92 | -28 | 600.2 | -12.52 | 35.56 | 24.55 | 22.26 | -26.27 | 91.17 | 600.1 | 30.65 |
| 11 | 28.00 | 19.59 | 28 | 617.0 | 12.08 | 35.72 | 24.65 | 20.83 | 26.28 | 91.96 | 616.6 | 29.19 |
| 12 | 28.00 | 19.59 | -28 | 617.0 | -12.08 | 35.72 | 24.65 | 20.83 | -26.28 | 91.96 | 616.6 | 29.19 |

| $C_S$ | $N$ | $\theta_d$ | | $\beta$ | | $\phi_{skew}$ | | $\Gamma$ | | | $S$ | | |
|---|---|---|---|---|---|---|---|---|---|---|---|---|---|
| | | $-½\theta_{ROT}$ | $+½\theta_{ROT}$ | $-½\theta_{ROT}$ | $+½\theta_{ROT}$ | $-½\theta_{ROT}$ | $+½\theta_{ROT}$ | $-½\theta_{ROT}$ | $\theta_{Ro}$ | $+½\theta_{ROT}$ | $-½\theta_{ROT}$ | $\theta_{Ro}$ | $+½\theta_{ROT}$ |
| 0.807 | 1.718 | 54.70 | 54.70 | 35.66 | 35.66 | -22.98 | 22.98 | 0.0634 | 0.2192 | 0.0634 | 0.0982 | 0.3397 | 0.0982 |
| 0.818 | 1.706 | 53.05 | 53.05 | 34.81 | 34.81 | -25.05 | 25.05 | 0.0380 | 0.2168 | 0.0380 | 0.0581 | 0.3315 | 0.0581 |
| 0.829 | 1.695 | 50.61 | 50.61 | 33.51 | 33.51 | -23.91 | 23.91 | 0.0586 | 0.2143 | 0.0586 | 0.0885 | 0.3232 | 0.0885 |
| 0.839 | 1.684 | 49.05 | 49.05 | 32.65 | 32.65 | -26.45 | 26.45 | 0.0285 | 0.2116 | 0.0285 | 0.0424 | 0.3150 | 0.0424 |
| 0.861 | 1.663 | 44.69 | 44.69 | 30.16 | 30.16 | -26.20 | 26.20 | 0.0438 | 0.2057 | 0.0438 | 0.0636 | 0.2987 | 0.0636 |
| 0.882 | 1.643 | 41.07 | 41.07 | 27.99 | 27.99 | -29.30 | 29.30 | 0.0176 | 0.1992 | 0.0176 | 0.0250 | 0.2825 | 0.0250 |
| 0.907 | 1.620 | 29.76 | 38.91 | 20.76 | 26.66 | -2.39 | 53.28 | 0.3498 | 0.2307 | -0.1618 | 0.4820 | 0.3180 | -0.2230 |
| 0.907 | 1.620 | 38.91 | 29.76 | 26.66 | 20.76 | -53.28 | 2.39 | -0.1618 | 0.2307 | 0.3498 | -0.2230 | 0.3180 | 0.4820 |
| 0.914 | 1.614 | 27.96 | 37.62 | 19.57 | 25.85 | -6.49 | 55.95 | 0.3549 | 0.2510 | -0.1726 | 0.4854 | 0.3432 | -0.2360 |
| 0.914 | 1.614 | 37.62 | 27.96 | 25.85 | 19.57 | -55.95 | 6.49 | -0.1726 | 0.2510 | 0.3549 | -0.2360 | 0.3432 | 0.4854 |
| 0.924 | 1.605 | 26.06 | 35.04 | 18.29 | 24.21 | -6.05 | 55.44 | 0.3252 | 0.2304 | -0.1470 | 0.4400 | 0.3118 | -0.1988 |
| 0.924 | 1.605 | 35.04 | 26.06 | 24.21 | 18.29 | -55.44 | 6.05 | -0.1470 | 0.2304 | 0.3252 | -0.1988 | 0.3118 | 0.4400 |

FIG. 10F2

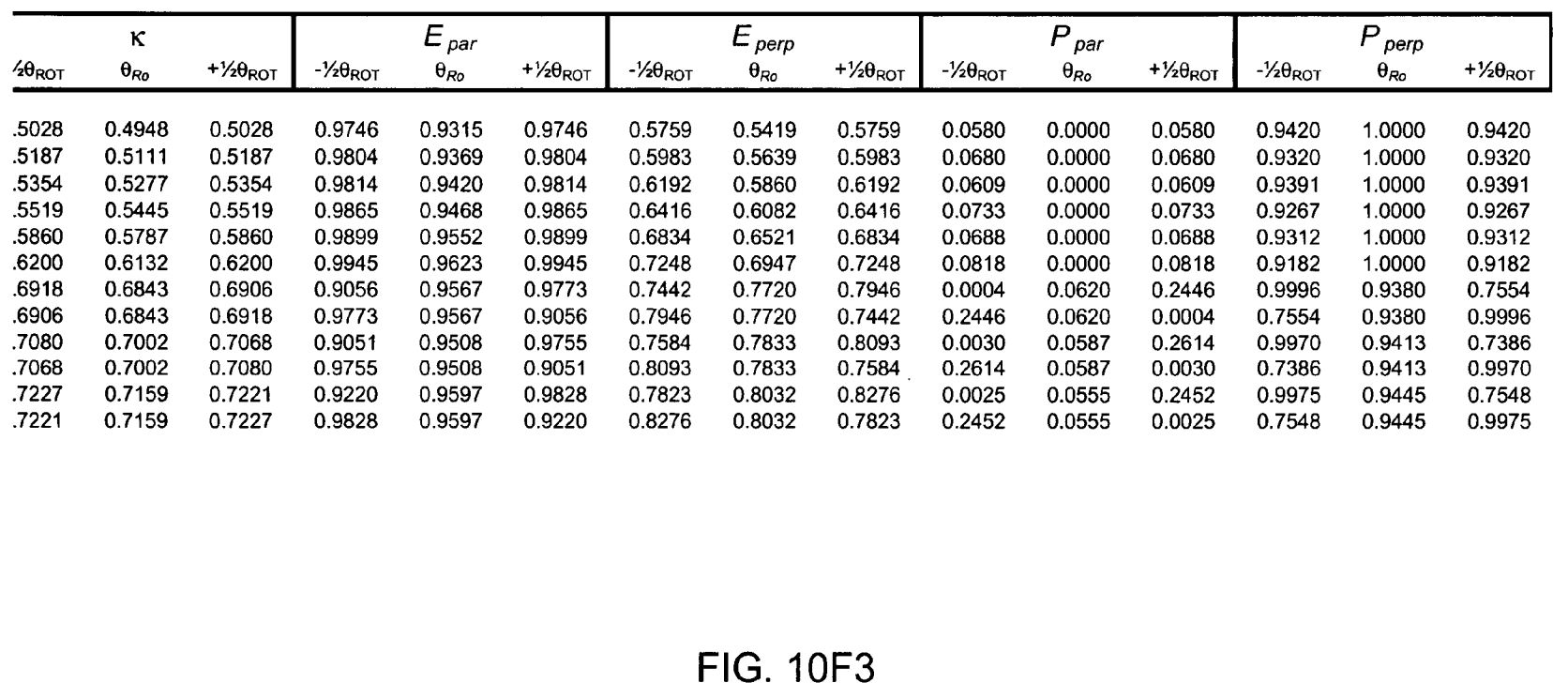

| | κ | | $E_{par}$ | | | $E_{perp}$ | | | $P_{par}$ | | | $P_{perp}$ | | |
|---|---|---|---|---|---|---|---|---|---|---|---|---|---|---|
| $½\theta_{ROT}$ | $\theta_{Ro}$ | $+½\theta_{ROT}$ | $-½\theta_{ROT}$ | $\theta_{Ro}$ | $+½\theta_{ROT}$ | $-½\theta_{ROT}$ | $\theta_{Ro}$ | $+½\theta_{ROT}$ | $-½\theta_{ROT}$ | $\theta_{Ro}$ | $+½\theta_{ROT}$ | $-½\theta_{ROT}$ | $\theta_{Ro}$ | $+½\theta_{ROT}$ |
| .5028 | 0.4948 | 0.5028 | 0.9746 | 0.9315 | 0.9746 | 0.5759 | 0.5419 | 0.5759 | 0.0580 | 0.0000 | 0.0580 | 0.9420 | 1.0000 | 0.9420 |
| .5187 | 0.5111 | 0.5187 | 0.9804 | 0.9369 | 0.9804 | 0.5983 | 0.5639 | 0.5983 | 0.0680 | 0.0000 | 0.0680 | 0.9320 | 1.0000 | 0.9320 |
| .5354 | 0.5277 | 0.5354 | 0.9814 | 0.9420 | 0.9814 | 0.6192 | 0.5860 | 0.6192 | 0.0609 | 0.0000 | 0.0609 | 0.9391 | 1.0000 | 0.9391 |
| .5519 | 0.5445 | 0.5519 | 0.9865 | 0.9468 | 0.9865 | 0.6416 | 0.6082 | 0.6416 | 0.0733 | 0.0000 | 0.0733 | 0.9267 | 1.0000 | 0.9267 |
| .5860 | 0.5787 | 0.5860 | 0.9899 | 0.9552 | 0.9899 | 0.6834 | 0.6521 | 0.6834 | 0.0688 | 0.0000 | 0.0688 | 0.9312 | 1.0000 | 0.9312 |
| .6200 | 0.6132 | 0.6200 | 0.9945 | 0.9623 | 0.9945 | 0.7248 | 0.6947 | 0.7248 | 0.0818 | 0.0000 | 0.0818 | 0.9182 | 1.0000 | 0.9182 |
| .6918 | 0.6843 | 0.6906 | 0.9056 | 0.9567 | 0.9773 | 0.7442 | 0.7720 | 0.7946 | 0.0004 | 0.0620 | 0.2446 | 0.9996 | 0.9380 | 0.7554 |
| .6906 | 0.6843 | 0.6918 | 0.9773 | 0.9567 | 0.9056 | 0.7946 | 0.7720 | 0.7442 | 0.2446 | 0.0620 | 0.0004 | 0.7554 | 0.9380 | 0.9996 |
| .7080 | 0.7002 | 0.7068 | 0.9051 | 0.9508 | 0.9755 | 0.7584 | 0.7833 | 0.8093 | 0.0030 | 0.0587 | 0.2614 | 0.9970 | 0.9413 | 0.7386 |
| .7068 | 0.7002 | 0.7080 | 0.9755 | 0.9508 | 0.9051 | 0.8093 | 0.7833 | 0.7584 | 0.2614 | 0.0587 | 0.0030 | 0.7386 | 0.9413 | 0.9970 |
| .7227 | 0.7159 | 0.7221 | 0.9220 | 0.9597 | 0.9828 | 0.7823 | 0.8032 | 0.8276 | 0.0025 | 0.0555 | 0.2452 | 0.9975 | 0.9445 | 0.7548 |
| .7221 | 0.7159 | 0.7227 | 0.9828 | 0.9597 | 0.9220 | 0.8276 | 0.8032 | 0.7823 | 0.2452 | 0.0555 | 0.0025 | 0.7548 | 0.9445 | 0.9975 |

FIG. 10F3

| $E_s$ | | | $E_p$ | | | $Ts$ | | | $H_i$ | Solver |
|---|---|---|---|---|---|---|---|---|---|---|
| $-½\theta_{ROT}$ | $\theta_{Ro}$ | $+½\theta_{ROT}$ | $-½\theta_{ROT}$ | $\theta_{Ro}$ | $+½\theta_{ROT}$ | $-½\theta_{ROT}$ | $\theta_{Ro}$ | $+½\theta_{ROT}$ | | (=0) |
| 85.6% | 83.8% | 85.6% | 53.9% | 48.8% | 53.9% | 59.7% | 55.6% | 59.7% | 1.000 | 0 |
| 85.9% | 84.3% | 85.9% | 56.2% | 50.8% | 56.2% | 61.0% | 57.0% | 61.0% | 0.976 | 0 |
| 86.3% | 84.8% | 86.3% | 57.7% | 52.7% | 57.7% | 62.2% | 58.3% | 62.2% | 0.953 | 0 |
| 86.5% | 85.2% | 86.5% | 60.0% | 54.7% | 60.0% | 63.4% | 59.6% | 63.4% | 0.932 | 0 |
| 87.2% | 86.0% | 87.2% | 63.4% | 58.7% | 63.4% | 65.7% | 62.2% | 65.7% | 0.894 | 0 |
| 87.5% | 86.6% | 87.5% | 67.2% | 62.5% | 67.2% | 67.7% | 64.6% | 67.7% | 0.861 | 0 |
| 81.5% | 85.1% | 83.9% | 67.0% | 70.5% | 75.5% | 60.5% | 66.2% | 66.9% | 0.840 | 0.020396813 |
| 83.9% | 85.1% | 81.5% | 75.5% | 70.5% | 67.0% | 66.9% | 66.2% | 60.5% | 0.840 | 0.020396813 |
| 81.4% | 84.7% | 83.9% | 68.3% | 71.4% | 76.7% | 60.9% | 66.1% | 67.4% | 0.841 | 0.02187036 |
| 83.9% | 84.7% | 81.4% | 76.7% | 71.4% | 68.3% | 67.4% | 66.1% | 60.9% | 0.841 | 0.02187036 |
| 82.9% | 85.6% | 85.0% | 70.4% | 73.1% | 77.9% | 63.6% | 67.9% | 69.3% | 0.819 | 0.019325482 |
| 85.0% | 85.6% | 82.9% | 77.9% | 73.1% | 70.4% | 69.3% | 67.9% | 63.6% | 0.819 | 0.019325482 |
| | | | | | | | | | | 0.255193744 |

FIG. 10F4

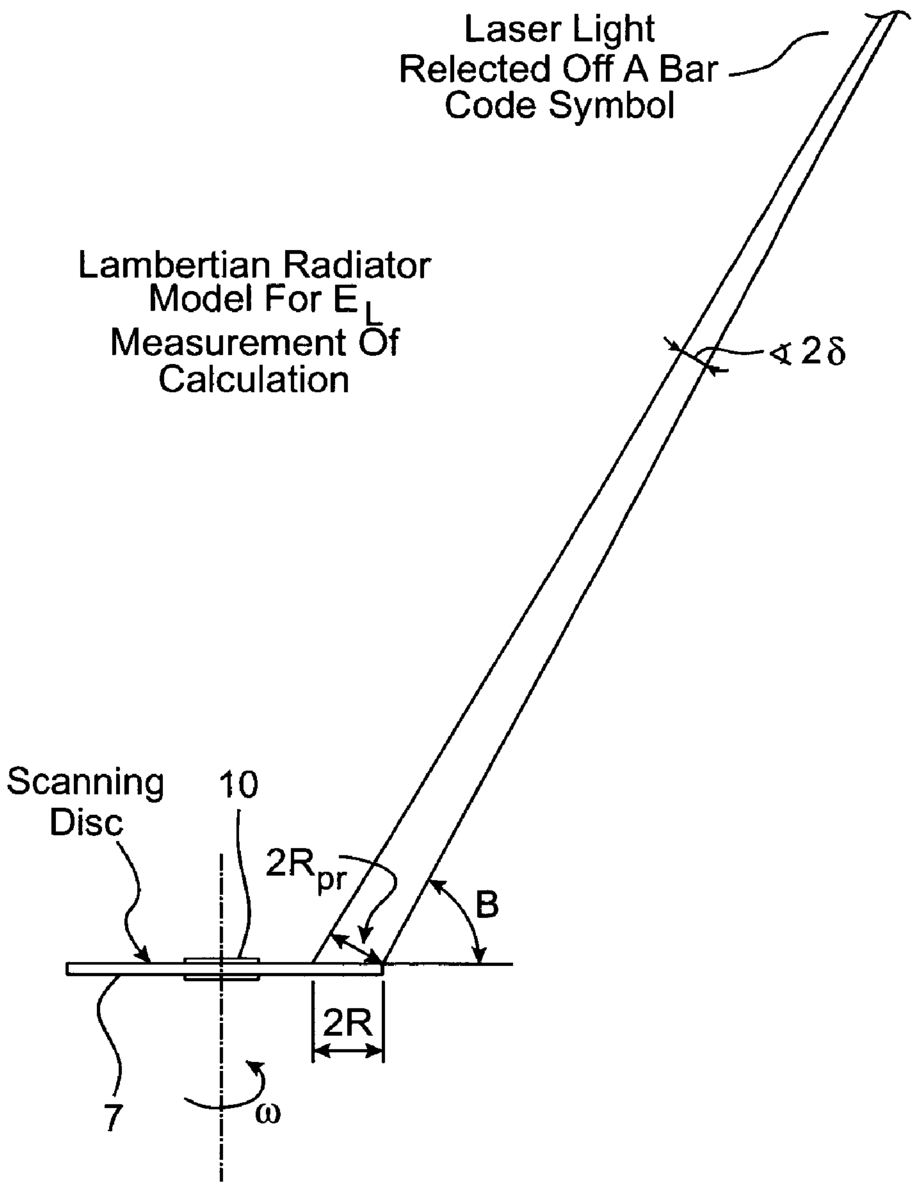
FIG. 10G1

FACET LIGHT COLLECTION EFFICIENCY

Z = DISTANCE FROM SCAN POINT ON LABEL ( MAX = FOCAL) LENGTH PLUS 5 INCHES

Area = AREA OF CORRESPONDING FACET

R = RADIUS OF EFFECTIVE CIRCULAR APERTURE

R.pr = RADIUS OF PROJECTED EFFECTIVE CIRCULAR APERTURE

B = ANGLE BETWEEN OUTGOING BEAM AND THE DISC $\delta$ = HALF-ANGLE SUBTENDED BY EFFECTIVE PROJECTED CIRCULAR APERTURE

E.L = LAMBERTIAN LIGHT COLLECTION EFFICIENCY

FIG. 10G2

$$R_{pr} := \sqrt{\frac{\text{Area} \sin B}{\pi}} \qquad \delta := \text{atan}\left[\frac{R_{pr}}{Z}\right]$$

$$E_L := (\sin(\delta))^2$$

FIG. 10G3

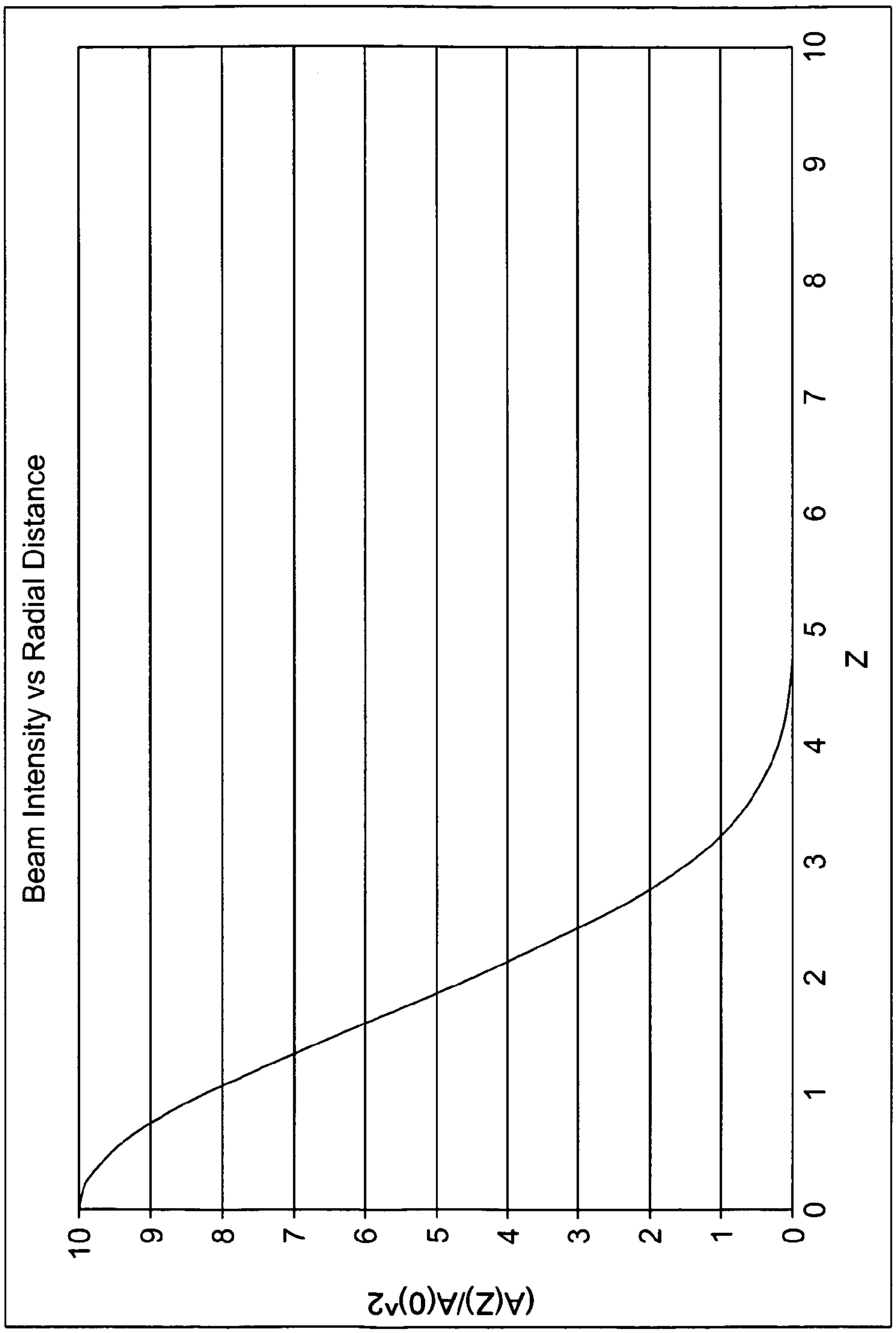
FIG. 11A2

| | A | B | C | D | E | F | G | H | I | J | K | L |
|---|---|---|---|---|---|---|---|---|---|---|---|---|
| 1 | Gaussian beam analysis for a multi-focal-plane scanner GausStratos_4.xls | | | | | | | | LDD 12/7/99 RPH | | | |
| 2 | | | | | | | Pi: | 3.1415927 | | | | |
| 3 | Beam diameter as a function of the distance from the focusing holographic facet | | | | | | | | | | | |
| 4 | | | | | | | | | | | | |
| 5 | | | | | | | | | | | | |
| 6 | Wavelength (nm): | | 650 | (Linked from Disk spreadsheet) | | | | | | | | |
| 7 | | | | | | | | | | | | |
| 8 | Beam diameter | | | | | | | | | | | |
| 9 | at the facet (mm): | | 1.31 | (Linked from Trunc spreadsheet) | | | | | | | | |
| 10 | | | | | | | | | | | | |
| 11 | P2: | | 0.505384 | 60% | Resolution criterion (% of peak intensity) | | | | | | | |
| 12 | (P2 is the ratio of the | | 60% | intensity diameter to the 1/e-squared diameter) | | | | | | | | |
| 13 | | | | | | | | | | | | |
| 14 | Rayleigh range (in.): | | 82 | | | | | | | | | |
| 15 | | | | | | | | | | | | |
| 16 | Total number of focal planes: | | | 4 | <--- Do <u>not</u> enter a value here. Entered automatically. | | | | | | | |
| 17 | (See note at cell A196) | | | | Enter values in the row below. | | | | | | | |
| 18 | Focal plane: | | 1 | 2 | 3 | 4 | | | | | | |
| 19 | | | | | | | | | | | | |
| 20 | Waist location (Zmin): | | 11.5 | 13.5 | 15.6 | 17.7 | | | | | | |
| 21 | (inches) | Rot. Angle: | 26.24 | | | Volts===> | 5.42 | 9.3 | <==Overall DOF | | | |
| 22 | Geom. focal length: | | 11.7 | 13.9 | 16.2 | 18.6 | | | | | | |
| 23 | (inches) | | | | | | | | | | | |
| 24 | Total facet angular sweep (degrees): | | | | 358.14 | (Linked from Disk spreadsheet) | | | | | | |
| 25 | Beam diameter | | 7.40 | 8.76 | 10.22 | 11.74 | | | | | | |
| 26 | at focal point (mils) | | | | | | | | | | | |
| 27 | (1/e-squared) | | | | | | | | | | | |
| 28 | | | | | | | | | | | | |
| 29 | Required resolution (mils) | | | 7.5 | | | | | | | | |
| 30 | (Minimum bar width - X) | | | | | | | | | | | |
| 31 | | | | | | | | | | | | |
| 32 | Distance from disk | | Half power beam diameters (in mils) for each scan line | | | | | | | | | |
| 33 | (inches) | | | | | | | | | | | |
| 34 | | | 1 | 2 | 3 | 4 | | | | | | |
| 35 | | | | | | | | | | | | |

FIG. 11B1A

| | M | N | O | P | Q | R | S | T | U | V | W | X |
|---|---|---|---|---|---|---|---|---|---|---|---|---|
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |
| 13 | | | | | | | | | | | | |
| 14 | | | | | | | | | | | | |
| 15 | | | | | | | | | | | | |
| 16 | | | | | | | | | | | | |
| 17 | | | | | | | | | | | | |
| 18 | | | | | | | | | | | | |
| 19 | | | | | | | | | | | | |
| 20 | | | | | | | **11.85** | | | | | |
| 21 | | | | | | | | | | | | |
| 22 | | | | | | | **12.1** | | | | | |
| 23 | | | | | | | | | | | | |
| 24 | | | | | | | | | | | | |
| 25 | | | | | | | **7.63** | | | | | |
| 26 | | | | | | | | | | | | |
| 27 | | | | | | | | | | | | |
| 28 | | | | | | | | | | | | |
| 29 | | | | | | | | | | | | |
| 30 | | | | | | | | | | | | |
| 31 | | | | | | | | | | | | |
| 32 | | | | | | | | | | | | |
| 33 | | | | | | | **Facet 2** | | | Measured values | | |
| 34 | | | | | | | | | zero deg. | 7.5 deg. CCW | 7.5 deg. CW | |
| 35 | | | | | | | | | | | | |

FIG. 11B1B

| | A | B | C | D | E | F | G | H | I | J | K | L |
|---|---|---|---|---|---|---|---|---|---|---|---|---|
| 36 | 8 | | 8.70 | 11.36 | 13.47 | 15.11 | | | | | | |
| 37 | 8.1 | | 8.49 | 11.19 | 13.32 | 14.98 | | | | | | |
| 38 | 8.2 | | 8.29 | 11.01 | 13.17 | 14.84 | | | | | | |
| 39 | 8.3 | | 8.09 | 10.84 | 13.02 | 14.71 | | | | | | |
| 40 | 8.4 | | 7.89 | 10.66 | 12.87 | 14.58 | | | | | | |
| 41 | 8.5 | | 7.69 | 10.49 | 12.71 | 14.45 | | | | | | |
| 42 | 8.6 | | 7.50 | 10.31 | 12.56 | 14.31 | | | | | | |
| 43 | 8.7 | | 7.30 | 10.14 | 12.41 | 14.18 | | | | | | |
| 44 | 8.8 | | 7.11 | 9.97 | 12.26 | 14.05 | | | | | | |
| 45 | 8.9 | | 6.92 | 9.80 | 12.11 | 13.92 | | | | | | |
| 46 | 9 | | 6.73 | 9.63 | 11.97 | 13.79 | | | | | | |
| 47 | 9.1 | | 6.54 | 9.46 | 11.82 | 13.66 | | | | | | |
| 48 | 9.2 | | 6.36 | 9.29 | 11.67 | 13.53 | | | | | | |
| 49 | 9.3 | | 6.18 | 9.12 | 11.52 | 13.40 | | | | | | |
| 50 | 9.4 | | 6.00 | 8.96 | 11.37 | 13.27 | | | | | | |
| 51 | 9.5 | | 5.82 | 8.79 | 11.23 | 13.14 | | | | | | |
| 52 | 9.6 | | 5.65 | 8.62 | 11.08 | 13.01 | | | | | | |
| 53 | 9.7 | | 5.48 | 8.46 | 10.93 | 12.88 | | | | | | |
| 54 | 9.8 | | 5.32 | 8.30 | 10.79 | 12.75 | | | | | | |
| 55 | 9.9 | | 5.16 | 8.14 | 10.64 | 12.63 | | | | | | |
| 56 | 10 | | 5.01 | 7.98 | 10.50 | 12.50 | | | | | | |
| 57 | 10.1 | | 4.86 | 7.82 | 10.36 | 12.37 | | | | | | |
| 58 | 10.2 | | 4.72 | 7.66 | 10.21 | 12.24 | | | | | | |
| 59 | 10.3 | | 4.58 | 7.50 | 10.07 | 12.12 | | | | | | |
| 60 | 10.4 | | 4.45 | 7.35 | 9.93 | 11.99 | | | | | | |
| 61 | 10.5 | | 4.33 | 7.20 | 9.79 | 11.87 | | | | | | |
| 62 | 10.6 | | 4.22 | 7.05 | 9.65 | 11.74 | | | | | | |
| 63 | 10.7 | | 4.12 | 6.90 | 9.51 | 11.61 | | | | | | |
| 64 | 10.8 | | 4.02 | 6.75 | 9.37 | 11.49 | | | | | | |
| 65 | 10.9 | | 3.94 | 6.61 | 9.23 | 11.37 | | | | | | |
| 66 | 11 | | 3.87 | 6.46 | 9.10 | 11.24 | | | | | | |
| 67 | 11.1 | | 3.81 | 6.32 | 8.96 | 11.12 | | | | | | |
| 68 | 11.2 | | 3.76 | 6.19 | 8.83 | 11.00 | | | | | | |
| 69 | 11.3 | | 3.73 | 6.05 | 8.69 | 10.87 | | | | | | |
| 70 | 11.4 | | 3.71 | 5.92 | 8.56 | 10.75 | | | | | | |

FIG. 11B1C

| | M | N | O | P | Q | R | S | T | U | V | W | X |
|---|---|---|---|---|---|---|---|---|---|---|---|---|
| 36 | 221 | 289 | 342 | 384 | #VALUE! | | 9.22 | 234 | | | | |
| 37 | 216 | 284 | 338 | 380 | #VALUE! | | 9.02 | 229 | | | | |
| 38 | 211 | 280 | 334 | 377 | #VALUE! | | 8.83 | 224 | | | | |
| 39 | 206 | 275 | 331 | 374 | #VALUE! | | 8.63 | 219 | | | | |
| 40 | 200 | 271 | 327 | 370 | #VALUE! | | 8.44 | 214 | | | | |
| 41 | 195 | 266 | 323 | 367 | #VALUE! | | 8.24 | 209 | | | | |
| 42 | 190 | 262 | 319 | 364 | #VALUE! | | 8.05 | 204 | | | | |
| 43 | 185 | 258 | 315 | 360 | #VALUE! | | 7.86 | 200 | | | | |
| 44 | 181 | 253 | 312 | 357 | #VALUE! | | 7.67 | 195 | | | | |
| 45 | 176 | 249 | 308 | 354 | #VALUE! | | 7.48 | 190 | | | | |
| 46 | 171 | 245 | 304 | 350 | #VALUE! | | 7.29 | 185 | | | | |
| 47 | 166 | 240 | 300 | 347 | #VALUE! | | 7.11 | 181 | | | | |
| 48 | 162 | 236 | 296 | 344 | #VALUE! | | 6.92 | 176 | | | | |
| 49 | 157 | 232 | 293 | 340 | #VALUE! | | 6.74 | 171 | | | | |
| 50 | 152 | 227 | 289 | 337 | #VALUE! | | 6.57 | 167 | | | | |
| 51 | 148 | 223 | 285 | 334 | #VALUE! | | 6.39 | 162 | | 200 | 200 | |
| 52 | 144 | 219 | 281 | 330 | #VALUE! | | 6.22 | 158 | | | | |
| 53 | 139 | 215 | 278 | 327 | #VALUE! | | 6.05 | 154 | | | | |
| 54 | 135 | 211 | 274 | 324 | #VALUE! | | 5.88 | 149 | | | | |
| 55 | 131 | 207 | 270 | 321 | #VALUE! | | 5.71 | 145 | | | | |
| 56 | 127 | 203 | 267 | 317 | #VALUE! | | 5.55 | 141 | | | | |
| 57 | 123 | 199 | 263 | 314 | #VALUE! | | 5.40 | 137 | | | | |
| 58 | 120 | 195 | 259 | 311 | #VALUE! | | 5.25 | 133 | | | | |
| 59 | 116 | 191 | 256 | 308 | #VALUE! | | 5.10 | 129 | | | | |
| 60 | 113 | 187 | 252 | 305 | #VALUE! | | 4.96 | 126 | | | | |
| 61 | 110 | 183 | 249 | 301 | #VALUE! | | 4.82 | 122 | | | | |
| 62 | 107 | 179 | 245 | 298 | #VALUE! | | 4.69 | 119 | | | | |
| 63 | 105 | 175 | 242 | 295 | #VALUE! | | 4.57 | 116 | | | | |
| 64 | 102 | 171 | 238 | 292 | #VALUE! | | 4.45 | 113 | | | | |
| 65 | 100 | 168 | 235 | 289 | #VALUE! | | 4.34 | 110 | | | | |
| 66 | 98 | 164 | 231 | 286 | #VALUE! | | 4.24 | 108 | | 185 | 144 | |
| 67 | 97 | 161 | 228 | 282 | #VALUE! | | 4.15 | 105 | | | | |
| 68 | 96 | 157 | 224 | 279 | #VALUE! | | 4.07 | 103 | | | | |
| 69 | 95 | 154 | 221 | 276 | #VALUE! | | 4.00 | 102 | | | | |

FIG. 11B1D

| | A | B | C | D | E | F | G | H | I | J | K |
|---|---|---|---|---|---|---|---|---|---|---|---|
| 70 | 11.4 | | 3.71 | 5.92 | 8.56 | 10.75 | | | | | |
| 71 | 11.5 | | 3.70 | 5.80 | 8.43 | 10.63 | | | | | |
| 72 | 11.6 | | 3.71 | 5.67 | 8.30 | 10.51 | | | | | |
| 73 | 11.7 | | 3.73 | 5.55 | 8.17 | 10.39 | | | | | |
| 74 | 11.8 | | 3.76 | 5.44 | 8.04 | 10.27 | | | | | |
| 75 | 11.9 | | 3.81 | 5.32 | 7.91 | 10.15 | | | | | |
| 76 | 12 | | 3.87 | 5.22 | 7.79 | 10.04 | | | | | |
| 77 | 12.1 | | 3.94 | 5.12 | 7.66 | 9.92 | | | | | |
| 78 | 12.2 | | 4.02 | 5.02 | 7.54 | 9.80 | | | | | |
| 79 | 12.3 | | 4.12 | 4.93 | 7.42 | 9.69 | | | | | |
| 80 | 12.4 | | 4.22 | 4.84 | 7.30 | 9.57 | | | | | |
| 81 | 12.5 | | 4.33 | 4.76 | 7.18 | 9.46 | | | | | |
| 82 | 12.6 | | 4.45 | 4.69 | 7.07 | 9.34 | | | | | |
| 83 | 12.7 | | 4.58 | 4.62 | 6.95 | 9.23 | | | | | |
| 84 | 12.8 | | 4.72 | 4.56 | 6.84 | 9.12 | | | | | |
| 85 | 12.9 | | 4.86 | 4.51 | 6.73 | 9.01 | | | | | |
| 86 | 13 | | 5.01 | 4.47 | 6.63 | 8.90 | | | | | |
| 87 | 13.1 | | 5.16 | 4.43 | 6.52 | 8.79 | | | | | |
| 88 | 13.2 | | 5.32 | 4.40 | 6.42 | 8.68 | | | | | |
| 89 | 13.3 | | 5.48 | 4.38 | 6.32 | 8.58 | | | | | |
| 90 | 13.4 | | 5.65 | 4.37 | 6.22 | 8.47 | | | | | |
| 91 | 13.5 | | 5.82 | 4.36 | 6.13 | 8.36 | | | | | |
| 92 | 13.6 | | 6.00 | 4.37 | 6.04 | 8.26 | | | | | |
| 93 | 13.7 | | 6.18 | 4.38 | 5.95 | 8.16 | | | | | |
| 94 | 13.8 | | 6.36 | 4.40 | 5.87 | 8.06 | | | | | |
| 95 | 13.9 | | 6.54 | 4.43 | 5.79 | 7.96 | | | | | |
| 96 | 14 | | 6.73 | 4.47 | 5.71 | 7.86 | | | | | |
| 97 | 14.1 | | 6.92 | 4.51 | 5.63 | 7.76 | | | | | |
| 98 | 14.2 | | 7.11 | 4.56 | 5.56 | 7.67 | | | | | |
| 99 | 14.3 | | 7.30 | 4.62 | 5.50 | 7.58 | | | | | |
| 100 | 14.4 | | 7.50 | 4.69 | 5.44 | 7.48 | | | | | |

FIG. 11B1E

| | L | M | N | O | P | Q | R | S | T | U | V | W | X |
|---|---|---|---|---|---|---|---|---|---|---|---|---|---|
| 70 | | 94 | 150 | 217 | 273 | #VALUE! | | 3.94 | 100 | | | | |
| 71 | | 94 | 147 | 214 | 270 | #VALUE! | | 3.89 | 99 | | | | |
| 72 | | 94 | 144 | 211 | 267 | #VALUE! | | 3.86 | 98 | | | | |
| 73 | | 95 | 141 | 207 | 264 | #VALUE! | | 3.83 | 97 | | | | |
| 74 | | 96 | 138 | 204 | 261 | #VALUE! | | 3.82 | 97 | | | | |
| 75 | | 97 | 135 | 201 | 258 | #VALUE! | | 3.82 | 97 | | | | |
| 76 | | 98 | 133 | 198 | 255 | #VALUE! | | 3.83 | 97 | | 185 | 143 | |
| 77 | | 100 | 130 | 195 | 252 | #VALUE! | | 3.86 | 98 | | | | |
| 78 | | 102 | 127 | 192 | 249 | #VALUE! | | 3.89 | 99 | | | | |
| 79 | | 105 | 125 | 188 | 246 | #VALUE! | | 3.94 | 100 | | | | |
| 80 | | 107 | 123 | 185 | 243 | #VALUE! | | 4.00 | 102 | | | | |
| 81 | | 110 | 121 | 182 | 240 | #VALUE! | | 4.07 | 103 | | | | |
| 82 | | 113 | 119 | 180 | 237 | #VALUE! | | 4.15 | 105 | | | | |
| 83 | | 116 | 117 | 177 | 234 | #VALUE! | | 4.24 | 108 | | | | |
| 84 | | 120 | 116 | 174 | 232 | #VALUE! | | 4.34 | 110 | | | | |
| 85 | | 123 | 115 | 171 | 229 | #VALUE! | | 4.45 | 113 | | | | |
| 86 | | 127 | 113 | 168 | 226 | #VALUE! | | 4.57 | 116 | | 194 | 149 | |
| 87 | | 131 | 113 | 166 | 223 | #VALUE! | | 4.69 | 119 | | | | |
| 88 | | 135 | 112 | 163 | 221 | #VALUE! | | 4.82 | 122 | | | | |
| 89 | | 139 | 111 | 161 | 218 | #VALUE! | | 4.96 | 126 | | | | |
| 90 | | 144 | 111 | 158 | 215 | #VALUE! | | 5.10 | 129 | | | | |
| 91 | | 148 | 111 | 156 | 212 | #VALUE! | | 5.25 | 133 | | | | |
| 92 | | 152 | 111 | 153 | 210 | #VALUE! | | 5.40 | 137 | | | | |
| 93 | | 157 | 111 | 151 | 207 | #VALUE! | | 5.55 | 141 | | | | |
| 94 | | 162 | 112 | 149 | 205 | #VALUE! | | 5.71 | 145 | | | | |
| 95 | | 166 | 113 | 147 | 202 | #VALUE! | | 5.88 | 149 | | | | |
| 96 | | 171 | 113 | 145 | 200 | #VALUE! | | 6.05 | 154 | | 200 | 162 | |
| 97 | | 176 | 115 | 143 | 197 | #VALUE! | | 6.22 | 158 | | | | |
| 98 | | 181 | 116 | 141 | 195 | #VALUE! | | 6.39 | 162 | | | | |
| 99 | | 185 | 117 | 140 | 192 | #VALUE! | | 6.57 | 167 | | | | |
| 100 | | 190 | 119 | 138 | 190 | #VALUE! | | 6.74 | 171 | | | | |

FIG. 11B1F

| | A | B | C | D | E | F | G | H | I | J | K | L |
|---|---|---|---|---|---|---|---|---|---|---|---|---|
| 101 | 14.5 | | 7.69 | 4.76 | 5.38 | 7.39 | | | | | | |
| 102 | 14.6 | | 7.89 | 4.84 | 5.33 | 7.30 | | | | | | |
| 103 | 14.7 | | 8.09 | 4.93 | 5.28 | 7.22 | | | | | | |
| 104 | 14.8 | | 8.29 | 5.02 | 5.23 | 7.13 | | | | | | |
| 105 | 14.9 | | 8.49 | 5.12 | 5.20 | 7.05 | | | | | | |
| 106 | 15 | | 8.70 | 5.22 | 5.16 | 6.97 | | | | | | |
| 107 | 15.1 | | 8.90 | 5.32 | 5.13 | 6.89 | | | | | | |
| 108 | 15.2 | | 9.10 | 5.44 | 5.11 | 6.81 | | | | | | |
| 109 | 15.3 | | 9.31 | 5.55 | 5.09 | 6.74 | | | | | | |
| 110 | 15.4 | | 9.52 | 5.67 | 5.08 | 6.66 | | | | | | |
| 111 | 15.5 | | 9.72 | 5.80 | 5.07 | 6.59 | | | | | | |
| 112 | 15.6 | | 9.93 | 5.92 | 5.07 | 6.53 | | | | | | |
| 113 | 15.7 | | 10.14 | 6.05 | 5.07 | 6.46 | | | | | | |
| 114 | 15.8 | | 10.35 | 6.19 | 5.08 | 6.40 | | | | | | |

FIG. 11B1G

| | M | N | O | P | Q | R | S | T | U | V | W | X |
|---|---|---|---|---|---|---|---|---|---|---|---|---|
| 101 | 195 | 121 | 137 | 188 | #VALUE! | | 6.92 | 176 | | | | |
| 102 | 200 | 123 | 135 | 186 | #VALUE! | | 7.11 | 181 | | | | |
| 103 | 206 | 125 | 134 | 183 | #VALUE! | | 7.29 | 185 | | | | |
| 104 | 211 | 127 | 133 | 181 | #VALUE! | | 7.48 | 190 | | | | |
| 105 | 216 | 130 | 132 | 179 | #VALUE! | | 7.67 | 195 | | | | |
| 106 | 221 | 133 | 131 | 177 | #VALUE! | | 7.86 | 200 | | 178 | 178 | |
| 107 | 226 | 135 | 130 | 175 | #VALUE! | | 8.05 | 204 | | | | |
| 108 | 231 | 138 | 130 | 173 | #VALUE! | | 8.24 | 209 | | | | |
| 109 | 236 | 141 | 129 | 171 | #VALUE! | | 8.44 | 214 | | | | |
| 110 | 242 | 144 | 129 | 169 | #VALUE! | | 8.63 | 219 | | | | |
| 111 | 247 | 147 | 129 | 167 | #VALUE! | | 8.83 | 224 | | | | |
| 112 | 252 | 150 | 129 | 166 | #VALUE! | | 9.02 | 229 | | | | |
| 113 | 258 | 154 | 129 | 164 | #VALUE! | | 9.22 | 234 | | | | |
| 114 | 263 | 157 | 129 | 162 | #VALUE! | | 9.42 | 239 | | | | |

FIG. 11B1H

| | A | B | C | D | E | F | G | H | I | J | K | L |
|---|---|---|---|---|---|---|---|---|---|---|---|---|
| 115 | 15.9 | | 10.56 | 6.32 | 5.09 | 6.34 | | | | | | |
| 116 | 16 | | 10.77 | 6.46 | 5.11 | 6.28 | | | | | | |
| 117 | 16.1 | | 10.98 | 6.61 | 5.13 | 6.22 | | | | | | |
| 118 | 16.2 | | 11.20 | 6.75 | 5.16 | 6.17 | | | | | | |
| 119 | 16.3 | | 11.41 | 6.90 | 5.20 | 6.12 | | | | | | |
| 120 | 16.4 | | 11.62 | 7.05 | 5.23 | 6.08 | | | | | | |
| 121 | 16.5 | | 11.83 | 7.20 | 5.28 | 6.04 | | | | | | |
| 122 | 16.6 | | 12.05 | 7.35 | 5.33 | 6.00 | | | | | | |
| 123 | 16.7 | | 12.26 | 7.50 | 5.38 | 5.96 | | | | | | |
| 124 | 16.8 | | 12.48 | 7.66 | 5.44 | 5.93 | | | | | | |
| 125 | 16.9 | | 12.69 | 7.82 | 5.50 | 5.90 | | | | | | |
| 126 | 17 | | 12.91 | 7.98 | 5.56 | 5.87 | | | | | | |
| 127 | 17.1 | | 13.12 | 8.14 | 5.63 | 5.85 | | | | | | |
| 128 | 17.2 | | 13.34 | 8.30 | 5.71 | 5.83 | | | | | | |
| 129 | 17.3 | | 13.55 | 8.46 | 5.79 | 5.81 | | | | | | |
| 130 | 17.4 | | 13.77 | 8.62 | 5.87 | 5.80 | | | | | | |
| 131 | 17.5 | | 13.99 | 8.79 | 5.95 | 5.79 | | | | | | |
| 132 | 17.6 | | 14.20 | 8.96 | 6.04 | 5.79 | | | | | | |
| 133 | 17.7 | | 14.42 | 9.12 | 6.13 | 5.78 | | | | | | |
| 134 | 17.8 | | 14.64 | 9.29 | 6.22 | 5.79 | | | | | | |
| 135 | 17.9 | | 14.86 | 9.46 | 6.32 | 5.79 | | | | | | |
| 136 | 18 | | 15.07 | 9.63 | 6.42 | 5.80 | | | | | | |
| 137 | 18.1 | | 15.29 | 9.80 | 6.52 | 5.81 | | | | | | |
| 138 | 18.2 | | 15.51 | 9.97 | 6.63 | 5.83 | | | | | | |
| 139 | 18.3 | | 15.73 | 10.14 | 6.73 | 5.85 | | | | | | |
| 140 | 18.4 | | 15.95 | 10.31 | 6.84 | 5.87 | | | | | | |
| 141 | 18.5 | | 16.17 | 10.49 | 6.95 | 5.90 | | | | | | |
| 142 | 18.6 | | 16.39 | 10.66 | 7.07 | 5.93 | | | | | | |
| 143 | 18.7 | | 16.60 | 10.84 | 7.18 | 5.96 | | | | | | |
| 144 | 18.8 | | 16.82 | 11.01 | 7.30 | 6.00 | | | | | | |
| 145 | 18.9 | | 17.04 | 11.19 | 7.42 | 6.04 | | | | | | |
| 146 | 19 | | 17.26 | 11.36 | 7.54 | 6.08 | | | | | | |
| 147 | 19.1 | | 17.48 | 11.54 | 7.66 | 6.12 | | | | | | |
| 148 | 19.2 | | 17.70 | 11.72 | 7.79 | 6.17 | | | | | | |
| 149 | 19.3 | | 17.92 | 11.89 | 7.91 | 6.22 | | | | | | |
| 150 | 19.4 | | 18.14 | 12.07 | 8.04 | 6.28 | | | | | | |

FIG. 11B2A

| | M | N | O | P | Q | R | S | T | U | V | W | X |
|---|---|---|---|---|---|---|---|---|---|---|---|---|
| 115 | 268 | 161 | 129 | 161 | #VALUE! | | 9.62 | 244 | | | | |
| 116 | 274 | 164 | 130 | 160 | #VALUE! | | 9.82 | 249 | | 199 | 199 | |
| 117 | 279 | 168 | 130 | 158 | #VALUE! | | 10.02 | 255 | | | | |
| 118 | 284 | 171 | 131 | 157 | #VALUE! | | 10.22 | 260 | | | | |
| 119 | 290 | 175 | 132 | 156 | #VALUE! | | 10.43 | 265 | | | | |
| 120 | 295 | 179 | 133 | 154 | #VALUE! | | 10.63 | 270 | | | | |
| 121 | 301 | 183 | 134 | 153 | #VALUE! | | 10.83 | 275 | | | | |
| 122 | 306 | 187 | 135 | 152 | #VALUE! | | 11.04 | 280 | | | | |
| 123 | 311 | 191 | 137 | 151 | #VALUE! | | 11.24 | 286 | | | | |
| 124 | 317 | 195 | 138 | 151 | #VALUE! | | 11.45 | 291 | | | | |
| 125 | 322 | 199 | 140 | 150 | #VALUE! | | 11.65 | 296 | | | | |
| 126 | 328 | 203 | 141 | 149 | #VALUE! | | 11.86 | 301 | | | | |
| 127 | 333 | 207 | 143 | 149 | #VALUE! | | 12.07 | 306 | | | | |
| 128 | 339 | 211 | 145 | 148 | #VALUE! | | 12.27 | 312 | | | | |
| 129 | 344 | 215 | 147 | 148 | #VALUE! | | 12.48 | 317 | | | | |
| 130 | 350 | 219 | 149 | 147 | #VALUE! | | 12.69 | 322 | | | | |
| 131 | 355 | 223 | 151 | 147 | #VALUE! | | 12.90 | 328 | | | | |
| 132 | 361 | 227 | 153 | 147 | #VALUE! | | 13.11 | 333 | | | | |
| 133 | 366 | 232 | 156 | 147 | #VALUE! | | 13.31 | 338 | | | | |
| 134 | 372 | 236 | 158 | 147 | #VALUE! | | 13.52 | 343 | | | | |
| 135 | 377 | 240 | 161 | 147 | #VALUE! | | 13.73 | 349 | | | | |
| 136 | 383 | 245 | 163 | 147 | #VALUE! | | 13.94 | 354 | | | | |
| 137 | 388 | 249 | 166 | 148 | #VALUE! | | 14.15 | 359 | | | | |
| 138 | 394 | 253 | 168 | 148 | #VALUE! | | 14.36 | 365 | | | | |
| 139 | 400 | 258 | 171 | 149 | #VALUE! | | 14.57 | 370 | | | | |
| 140 | 405 | 262 | 174 | 149 | #VALUE! | | 14.78 | 375 | | | | |
| 141 | 411 | 266 | 177 | 150 | #VALUE! | | 14.99 | 381 | | | | |
| 142 | 416 | 271 | 180 | 151 | #VALUE! | | 15.20 | 386 | | | | |
| 143 | 422 | 275 | 182 | 151 | #VALUE! | | 15.42 | 392 | | | | |
| 144 | 427 | 280 | 185 | 152 | #VALUE! | | 15.63 | 397 | | | | |
| 145 | 433 | 284 | 188 | 153 | #VALUE! | | 15.84 | 402 | | | | |
| 146 | 438 | 289 | 192 | 154 | #VALUE! | | 16.05 | 408 | | | | |
| 147 | 444 | 293 | 195 | 156 | #VALUE! | | 16.26 | 413 | | | | |
| 148 | 450 | 298 | 198 | 157 | #VALUE! | | 16.47 | 418 | | | | |
| 149 | 455 | 302 | 201 | 158 | #VALUE! | | 16.69 | 424 | | | | |
| 150 | 461 | 307 | 204 | 160 | #VALUE! | | 16.90 | 429 | | | | |

FIG. 11B2B

| | A | B | C | D | E | F | G | H | I | J | K | L |
|---|---|---|---|---|---|---|---|---|---|---|---|---|
| 151 | 19.5 | | 18.36 | 12.25 | 8.17 | 6.34 | | | | | | |
| 152 | 19.6 | | 18.58 | 12.43 | 8.30 | 6.40 | | | | | | |
| 153 | 19.7 | | 18.80 | 12.61 | 8.43 | 6.46 | | | | | | |
| 154 | 19.8 | | 19.02 | 12.78 | 8.56 | 6.53 | | | | | | |
| 155 | 19.9 | | 19.24 | 12.96 | 8.69 | 6.59 | | | | | | |
| 156 | 20 | | 19.46 | 13.14 | 8.83 | 6.66 | | | | | | |
| 157 | | Minima (mils): | 3.70 | 4.36 | 5.07 | 5.79 | | | | | | |
| 158 | | DOF (inches): | 5.80 | 6.40 | 6.73 | 6.64 | | | | | | |
| 159 | | Maximum Possible Total DOF with no overlap (inches): | | | | | 25.57 | 16.57 | <== Estimate of achievable overall DOF | | | |
| 160 | | | | | | | | | 6.76 | inches | (Maximum possible | |
| 161 | | | | | | | | | | | | |
| 162 | | | | | | | | | | | | |
| 163 | | | | | | | | | | | | |
| 164 | | | | | | | | | | | | |
| 165 | | | | | | | | | | | | |
| 166 | | | | | | | | | | | | |
| 167 | | | | | | | | | | | | |
| 168 | | | | | | | | | | | | |
| 169 | | | | | | | | | | | | |
| 170 | | | | | | | | | | | | |
| 171 | | | | | | | | | | | | |
| 172 | | | | | | | | | | | | |
| 173 | | | | | | | | | | | | |
| 174 | | | | | | | | | | | | |
| 175 | | | | | | | | | | | | |
| 176 | | | | | | | | | | | | |
| 177 | | | | | | | | | | | | |
| 178 | | | | | | | | | | | | |
| 179 | | | | | | | | | | | | |
| 180 | | | | | | | | | | | | |
| 181 | | | | | | | | | | | | |
| 182 | | | | | | | | | | Max f.l. = | 17.7 | |
| 183 | Focal distances (in.): | | | 11.5 | 13.5 | 15.6 | 17.7 | 0 | 0 | | | |
| 184 | Total facet angular sweep (degrees): | | | | 358.14 | (Linked from Disk spreadsheet) | | | | | | |
| 185 | Nominal length of scan lines (in.): | | | | N/A | | | | | | | |
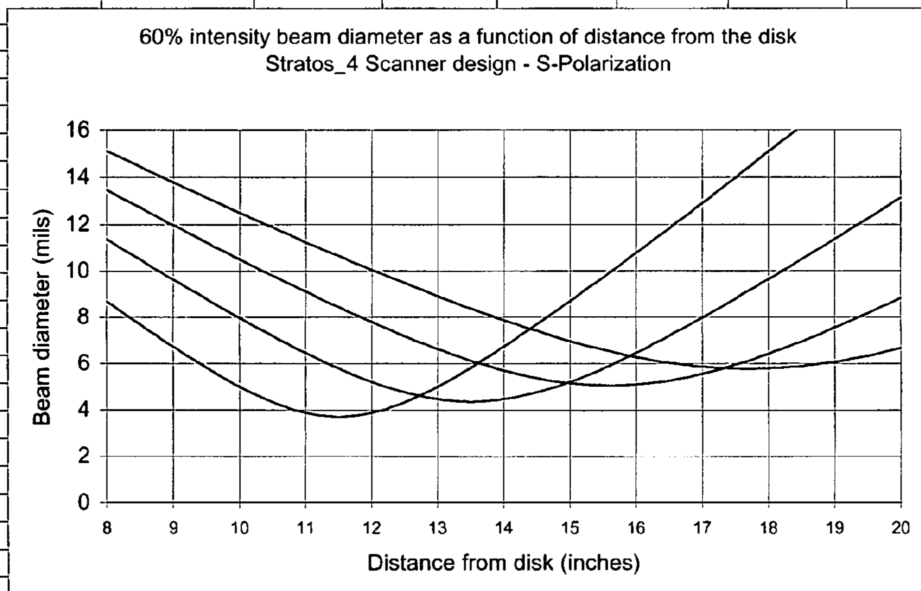
FIG. 11B2C

| | M | N | O | P | Q | R | S | T | U | V | W | X |
|---|---|---|---|---|---|---|---|---|---|---|---|---|
| 151 | 466 | 311 | 207 | 161 | #VALUE! | | 17.11 | 435 | | | | |
| 152 | 472 | 316 | 211 | 162 | #VALUE! | | 17.32 | 440 | | | | |
| 153 | 478 | 320 | 214 | 164 | #VALUE! | | 17.54 | 445 | | | | |
| 154 | 483 | 325 | 217 | 166 | #VALUE! | | 17.75 | 451 | | | | |
| 155 | 489 | 329 | 221 | 167 | #VALUE! | | 17.96 | 456 | | | | |
| 156 | 494 | 334 | 224 | 169 | #VALUE! | | 18.18 | 462 | | | | |
| 157 | | | | | | | | | | | | |
| 158 | | | | | | | | | | | | |
| 159 | | | | | | | | | | | | |
| 160 | single-focal-plane DOF | | | | | | | | | | | |
| 161 | | | | | | | | | | | | |
| 162 | | | | | | | | | | | | |
| 163 | | | | | | | | | | | | |
| 164 | | | | | | | | | | | | |
| 165 | | | | | | | | | | | | |
| 166 | | | | | | | | | | | | |
| 167 | | | | | | | | | | | | |
| 168 | | | | | | | | | | | | |
| 169 | | | | | | | | | | | | |
| 170 | | | | | | | | | | | | |
| 171 | | | | | | | | | | | | |
| 172 | | | | | | | | | | | | |
| 173 | | | | | | | | | | | | |
| 174 | | | | | | | | | | | | |
| 175 | | | | | | | | | | | | |
| 176 | | | | | | | | | | | | |
| 177 | | | | | | | | | | | | |
| 178 | | | | | | | | | | | | |
| 179 | | | | | | | | | | | | |
| 180 | | | | | | | | | | | | |
| 181 | | | | | | | | | | | | |
| 182 | | | | | | | | | | | | |
| 183 | | | | | | | | | | | | |
| 184 | | | | | | | | | | | | |
| 185 | | | | | | | | | | | | |

FIG. 11B2D

| | A | B | C | D | E | F | G | H | I | J | K | L |
|---|---|---|---|---|---|---|---|---|---|---|---|---|
| 186 | Nominal scan width (in.): | | | | N/A | | | | | | | |
| 187 | Read range (7 mil bars): | | 0.4 | to | 9.7 | | | | | | | |
| 188 | (from scanner window) | | | | | | | | | | | |
| 189 | Scanner window = 10 inches from disk | | | | | | | | | | | |
| 190 | Overall depth of field (in.): | | | | 9.3 | | | | | | | |
| 191 | | | | | | | | | | | | |
| 192 | Signal | | | | 5.42 | volts | (Linked from Disk spreadsheet) | | | | | |
| 193 | Bandwidth (MHz): | | | | 0.91 | MHz | (Linked from Disk spreadsheet) | | | | | |
| 194 | Minimum signal | | | | 3.42 | volts | (Linked from Disk spreadsheet) | | | | | |
| 195 | | | | | | | | | | | | |
| 196 | Note: If the scan pattern is repeated N times per disk revolution, the focal distances should | | | | | | | | | | | |
| 197 | be repeated N times. This will result in filling the disk with a repeated facet layout. | | | | | | | | | | | |
| 198 | | | | | | | | | | | | |
| 199 | | | | | | | | | | | | |
| 200 | | | | | | | | | | | | |
| 201 | | | | | | | | | | | | |
| 202 | | | | | | | | | | | | |
| 203 | | | | | | | | | | | | |
| 204 | | | | | | | | | | | | |
| 205 | | | | | | | | | | | | |
| 206 | | | | | | | | | | | | |
| 207 | | | | | | | | | | | | |
| 208 | | | | | | | | | | | | |
| 209 | | | | | | | | | | | | |
| 210 | | | | | | | | | | | | |
| 211 | | | | | | | | | | | | |
| 212 | | | | | | | | | | | | |
| 213 | | | | | | | | | | | | |
| 214 | | | | | | | | | | | | |
| 215 | | | | | | | | | | | | |
| 216 | | | | | | | | | | | | |
| 217 | | | | | | | | | | | | |
| 218 | | | | | | | | | | | | |
| 219 | | | | | | | | | | | | |
| 220 | | | | | | | | | | | | |
| 221 | | | | | | | | | | | | |

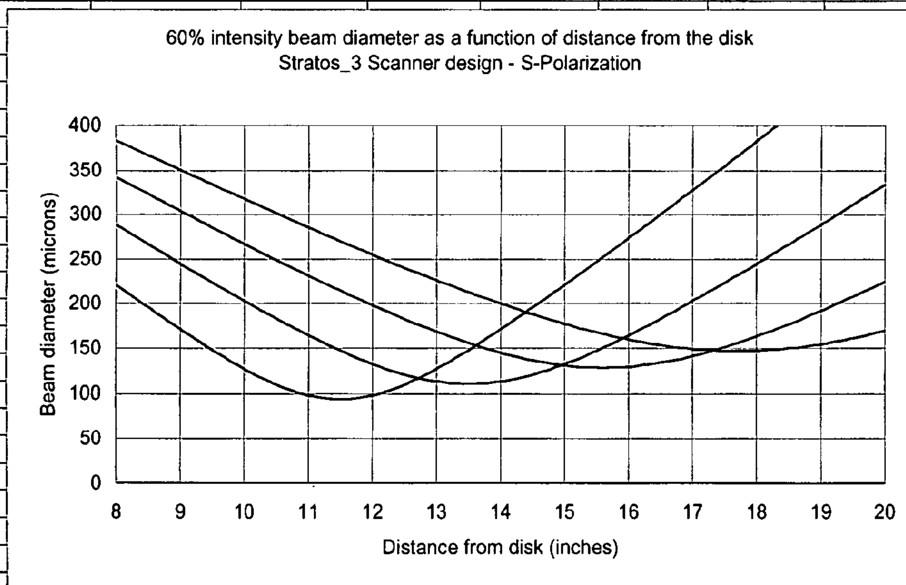

FIG. 11B2E

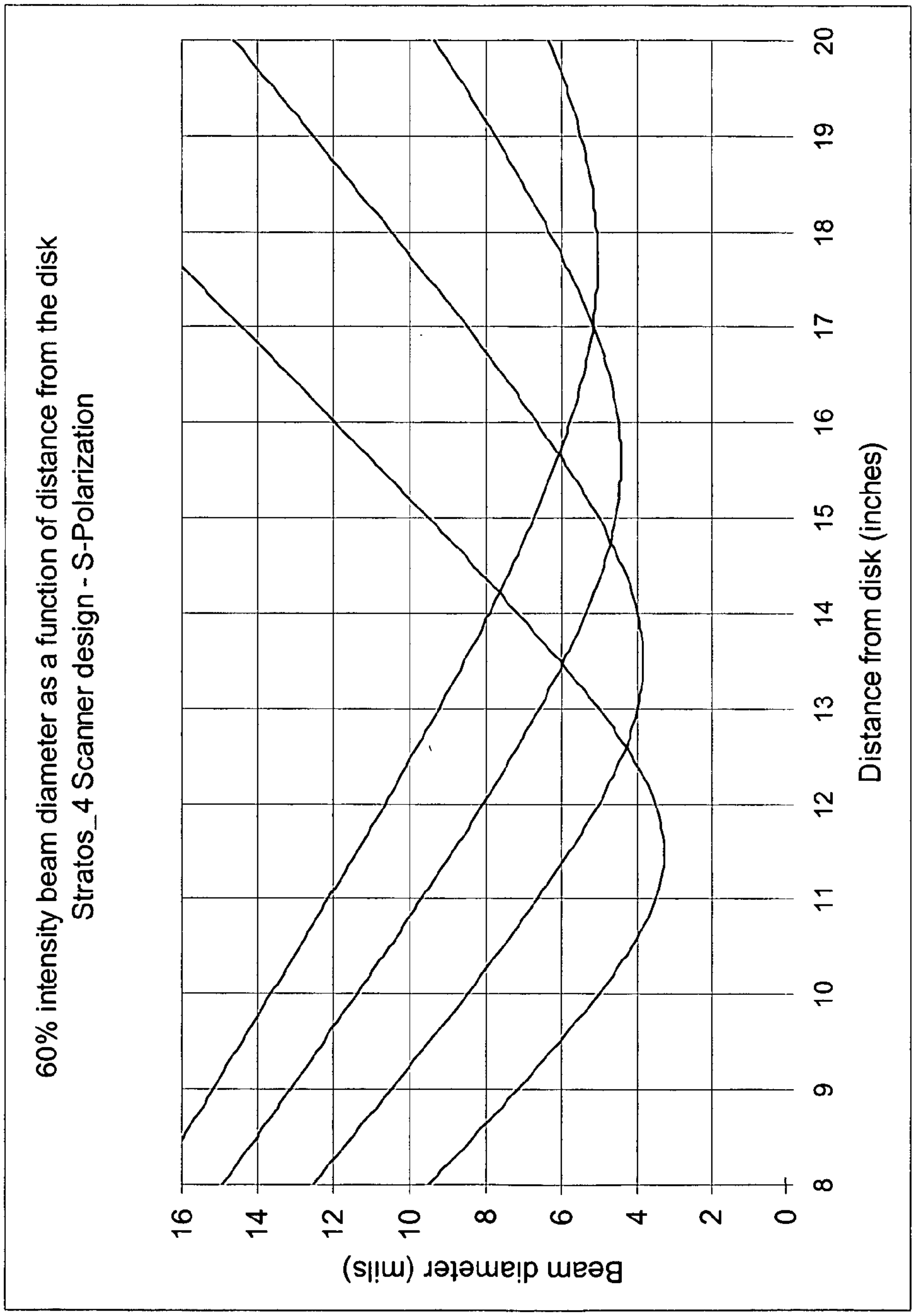
FIG. 11B3

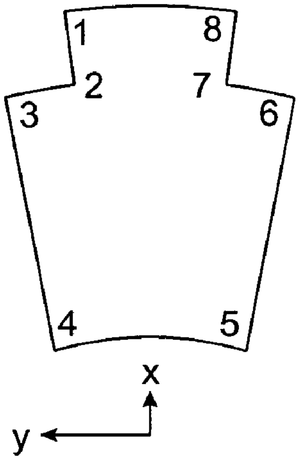
FIG. 12A1
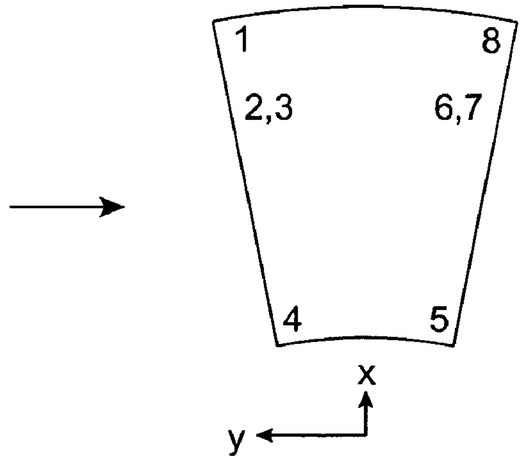
FIG. 12A2
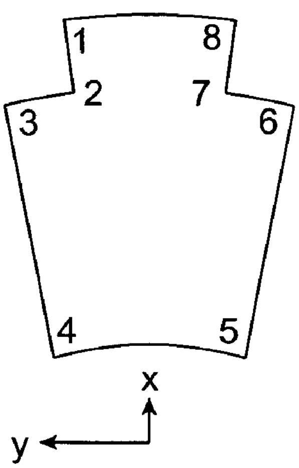
FIG. 12B1
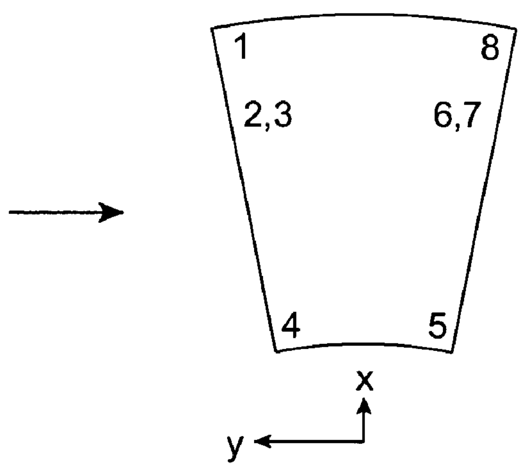
FIG. 12B2

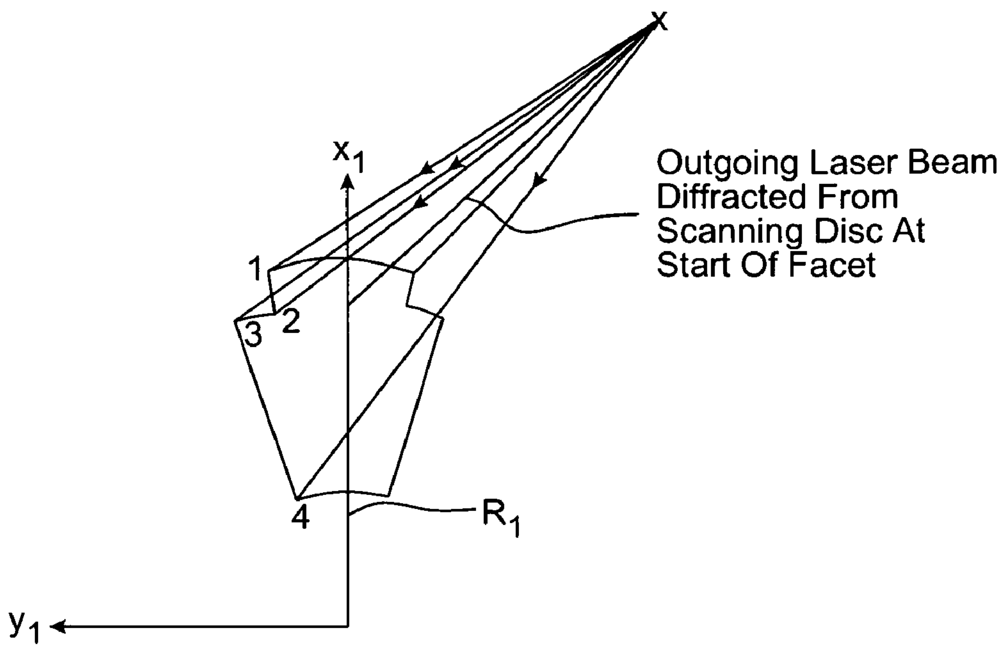
FIG. 12C1
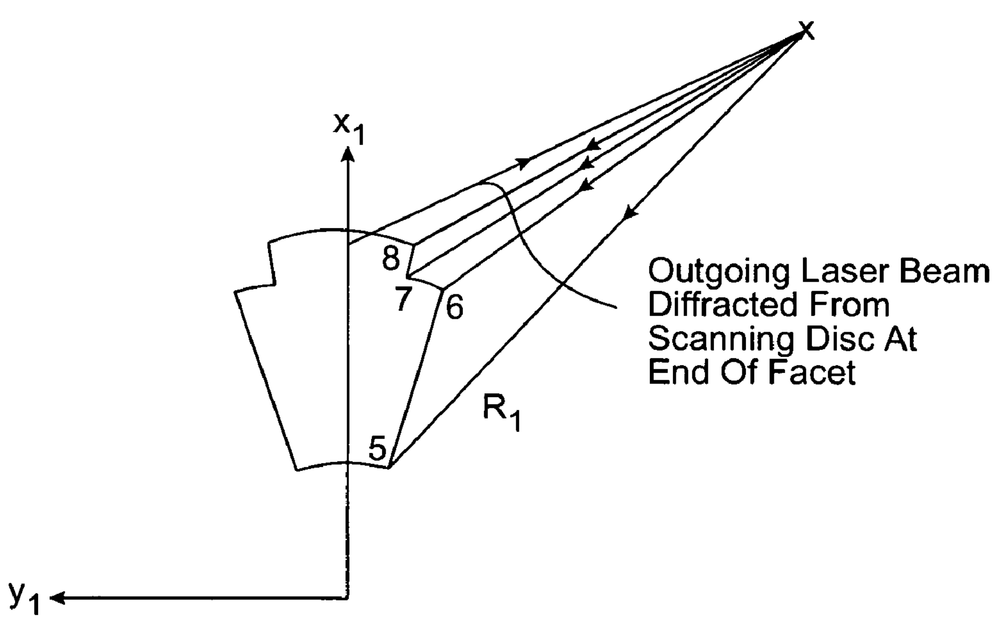
FIG. 12C2

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 3.94874 | -0.02294 | 2.12380 | 3.83250 | 0.07718 | 2.09937 | 3.75358 | 0.10925 | 2.09325 |
| 79 | Point 2 | 3.65113 | -0.12038 | 2.16443 | 3.53978 | -0.02665 | 2.14166 | 3.45010 | 0.00887 | 2.13498 |
| 80 | Point 3 | 3.61581 | -0.03502 | 2.14098 | 3.53978 | -0.02665 | 2.14166 | 3.44555 | 0.02059 | 2.13175 |
| 81 | Point 4 | 2.64691 | -0.40575 | 2.28887 | 2.88384 | -0.25930 | 2.23643 | 2.44051 | -0.31915 | 2.27208 |
| 82 | Point 5 | 2.79472 | -1.59304 | 2.62907 | 3.02644 | -1.72489 | 2.65801 | 2.54066 | -1.56107 | 2.63017 |
| 83 | Point 6 | 3.81419 | -2.04371 | 2.71867 | 3.69455 | -2.02106 | 2.71697 | 3.56179 | -2.02254 | 2.72286 |
| 84 | Point 7 | 3.82907 | -1.96478 | 2.69504 | 3.69455 | -2.02106 | 2.71697 | 3.56439 | -2.01174 | 2.71960 |
| 85 | Point 8 | 4.13065 | -2.08452 | 2.71758 | 3.98553 | -2.15005 | 2.74265 | 3.86380 | -2.14515 | 2.74622 |
| 86 | Point 9 | 3.94874 | -0.02294 | 2.12380 | 3.83250 | 0.07718 | 2.09937 | 3.75358 | 0.10925 | 2.09325 |
| 87 | Start of scan line | 4.02545 | -0.67817 | 2.31174 | 3.92247 | -0.62341 | 2.30000 | 3.82454 | -0.57134 | 2.28883 |
| 88 | Middle of rotation | 4.02545 | -0.67817 | 2.31174 | 3.92247 | -0.62341 | 2.30000 | 3.82454 | -0.57134 | 2.28883 |
| 89 | End of scan line | 4.04162 | -1.16307 | 2.45250 | 3.92934 | -1.15860 | 2.45580 | 3.81937 | -1.12321 | 2.44999 |
| 90 | | | | | | | | | | |

FIG. 13A1

| | A | B | C | D | E | F | G | H | I | J |
|---|---|---|---|---|---|---|---|---|---|---|
| 91 | | Facet | | | Facet | | | Facet | | |
| 92 | G2 | 7 | | | 9 | | | 11 | | |
| 93 | Point 1 | 4.02247 | 2.19033 | 2.58609 | 3.91799 | 2.45353 | 2.76685 | 3.80802 | 2.74420 | 2.96322 |
| 94 | Point 2 | 3.79236 | 2.11753 | 2.69195 | 3.69690 | 2.36537 | 2.86040 | 3.58337 | 2.64904 | 3.05579 |
| 95 | Point 3 | 3.78639 | 2.20453 | 2.73451 | 3.69690 | 2.36537 | 2.86040 | 3.58162 | 2.66095 | 3.06217 |
| 96 | Point 4 | 3.05197 | 1.92230 | 3.05003 | 3.21262 | 2.17226 | 3.06533 | 2.85731 | 2.34705 | 3.35743 |
| 97 | Point 5 | 2.64347 | -0.27369 | 2.31221 | 2.81913 | -0.34045 | 2.17660 | 2.54140 | -0.10460 | 2.44937 |
| 98 | Point 6 | 3.25774 | -0.84215 | 1.68794 | 3.25935 | -0.70440 | 1.74867 | 3.23044 | -0.61969 | 1.80401 |
| 99 | Point 7 | 3.29896 | -0.76438 | 1.69797 | 3.25935 | -0.70440 | 1.74867 | 3.23562 | -0.60869 | 1.80582 |
| 100 | Point 8 | 3.50262 | -0.93172 | 1.50046 | 3.46547 | -0.87482 | 1.54830 | 3.45674 | -0.77127 | 1.59994 |
| 101 | Point 9 | 4.02247 | 2.19033 | 2.58609 | 3.91799 | 2.45353 | 2.76685 | 3.80802 | 2.74420 | 2.96322 |
| 102 | Start of scan line | 3.88910 | 1.13139 | 2.19201 | 3.81752 | 1.25640 | 2.29108 | 3.73628 | 1.40993 | 2.40874 |
| 103 | Middle of rotation | 3.83943 | 0.57926 | 1.97459 | 3.76954 | 0.54210 | 2.00000 | 3.70069 | 0.50549 | 2.02503 |
| 104 | End of scan line | 3.77386 | 0.09914 | 1.79899 | 3.72144 | 0.14315 | 1.85024 | 3.66728 | 0.18290 | 1.90064 |
| 105 | | | | | | | | | | |

FIG. 13A2

| | A | B | C | D | E | F | G |
|---|---|---|---|---|---|---|---|
| 106 | | Facet | | | Facet | | |
| 107 | G3 | 1 | | | 2 | | |
| 108 | Point 1 | 5.11617 | 1.95380 | 1.89155 | 5.01400 | 1.88093 | 1.96715 |
| 109 | Point 2 | 4.98460 | 1.86904 | 1.98969 | 4.88136 | 1.79109 | 2.06571 |
| 110 | Point 3 | 4.94695 | 2.08109 | 2.03847 | 4.88064 | 1.79549 | 2.06667 |
| 111 | Point 4 | 4.55990 | 1.69707 | 2.31542 | 4.46955 | 1.51422 | 2.37191 |
| 112 | Point 5 | 4.35785 | -1.63559 | 2.18575 | 4.29296 | -1.52325 | 2.24765 |
| 113 | Point 6 | 4.71038 | -2.01784 | 1.86940 | 4.68022 | -1.80322 | 1.91239 |
| 114 | Point 7 | 4.77395 | -1.80620 | 1.83693 | 4.68147 | -1.79883 | 1.91177 |
| 115 | Point 8 | 4.89971 | -1.89063 | 1.72862 | 4.80732 | -1.88882 | 1.80291 |
| 116 | Point 9 | 5.11617 | 1.95380 | 1.89155 | 5.01400 | 1.88093 | 1.96715 |
| 117 | Start of scan line | 5.11614 | 1.00830 | 1.80878 | 5.02116 | 0.94389 | 1.87935 |
| 118 | Middle of rotation | 5.03523 | 0.00000 | 1.78542 | 4.95474 | 0.00000 | 1.85000 |
| 119 | End of scan line | 5.00607 | -0.96140 | 1.72464 | 4.92129 | -0.94701 | 1.79393 |
| 120 | | | | | | | |

FIG. 13A3A

| | H | I | J | K | L | M |
|---|---|---|---|---|---|---|
| 106 | Facet | | | Facet | | |
| 107 | 3 | | | 4 | | |
| 108 | 4.92433 | 1.81870 | 2.03365 | 4.82799 | 1.75935 | 2.10576 |
| 109 | 4.77964 | 1.72980 | 2.14196 | 4.68407 | 1.66502 | 2.21298 |
| 110 | 4.75362 | 1.86942 | 2.17507 | 4.68407 | 1.66502 | 2.21298 |
| 111 | 4.31720 | 1.51260 | 2.49402 | 4.34215 | 1.44090 | 2.46771 |
| 112 | 4.14486 | -1.55897 | 2.36336 | 4.17995 | -1.53887 | 2.33696 |
| 113 | 4.54753 | -1.91413 | 2.00915 | 4.50146 | -1.76326 | 2.05933 |
| 114 | 4.59009 | -1.77513 | 1.98718 | 4.50146 | -1.76326 | 2.05933 |
| 115 | 4.72764 | -1.86391 | 1.86903 | 4.63750 | -1.85821 | 1.94186 |
| 116 | 4.92433 | 1.81870 | 2.03365 | 4.82799 | 1.75935 | 2.10576 |
| 117 | 4.92928 | 0.88565 | 1.94798 | 4.84129 | 0.83137 | 2.01383 |
| 118 | 4.87537 | 0.00000 | 1.91369 | 4.79689 | 0.00000 | 1.97666 |
| 119 | 4.83778 | -0.91710 | 1.86356 | 4.75656 | -0.89961 | 1.93026 |
| 120 | | | | | | |

FIG. 13A3B

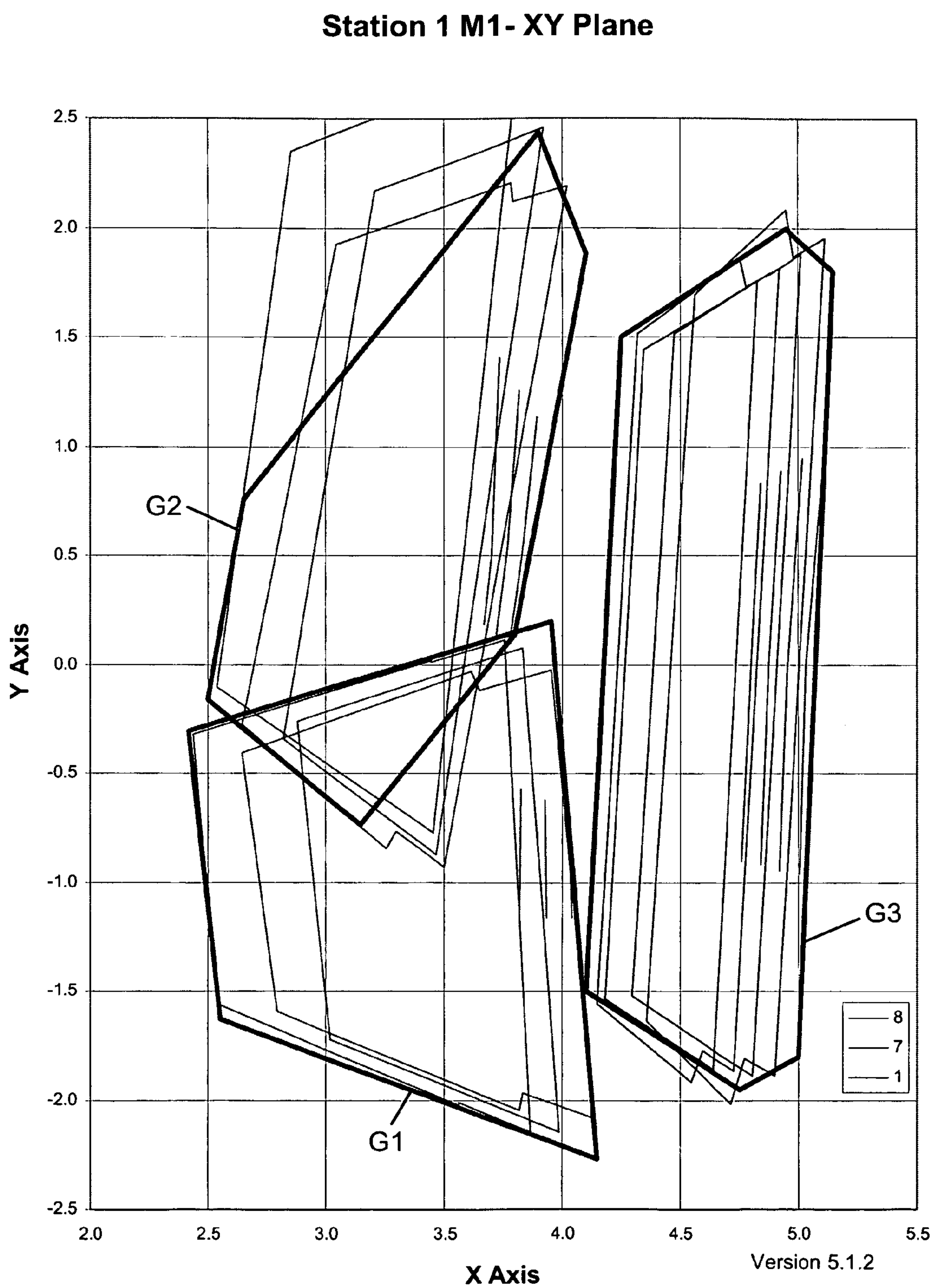
FIG. 13A4

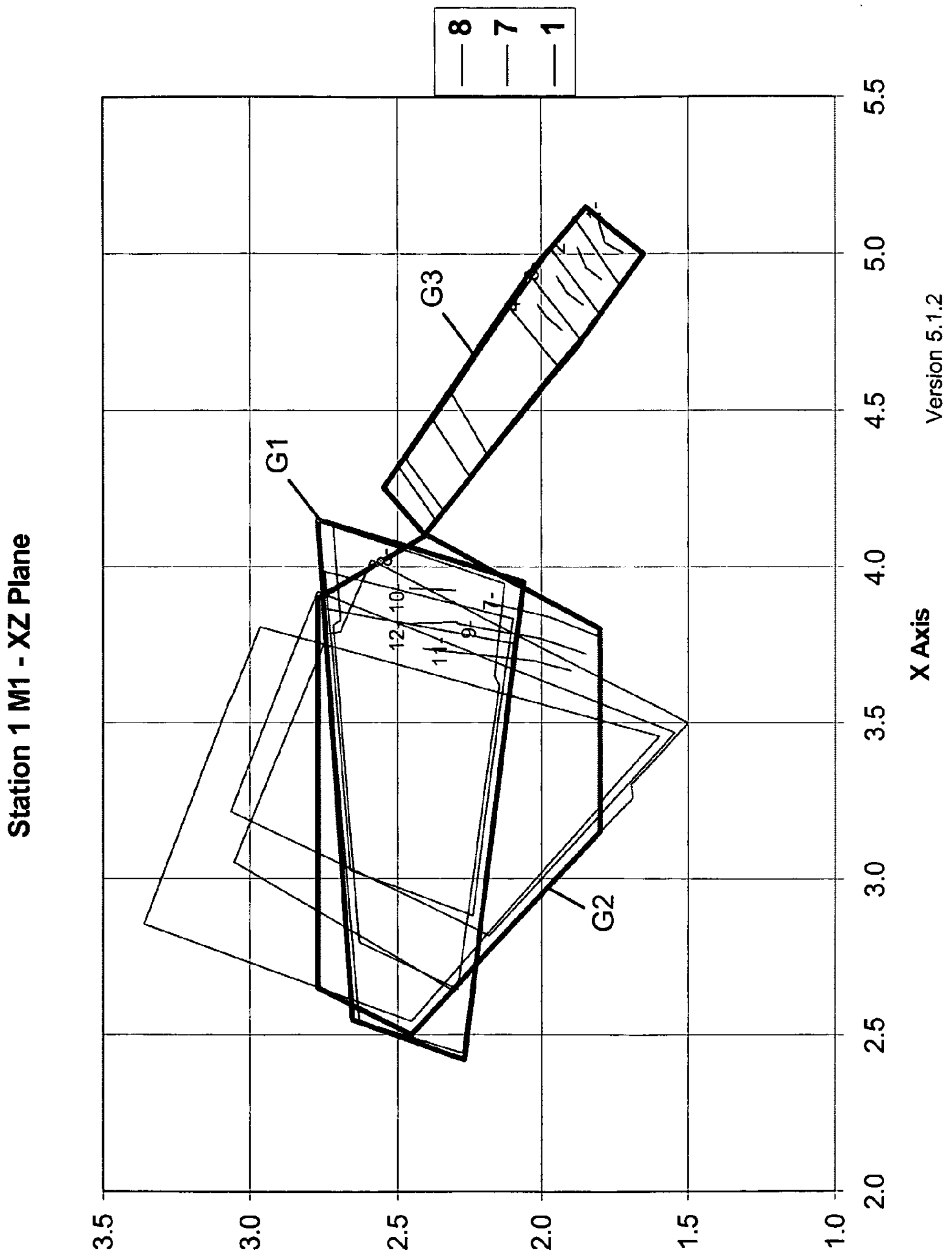
FIG. 13A5

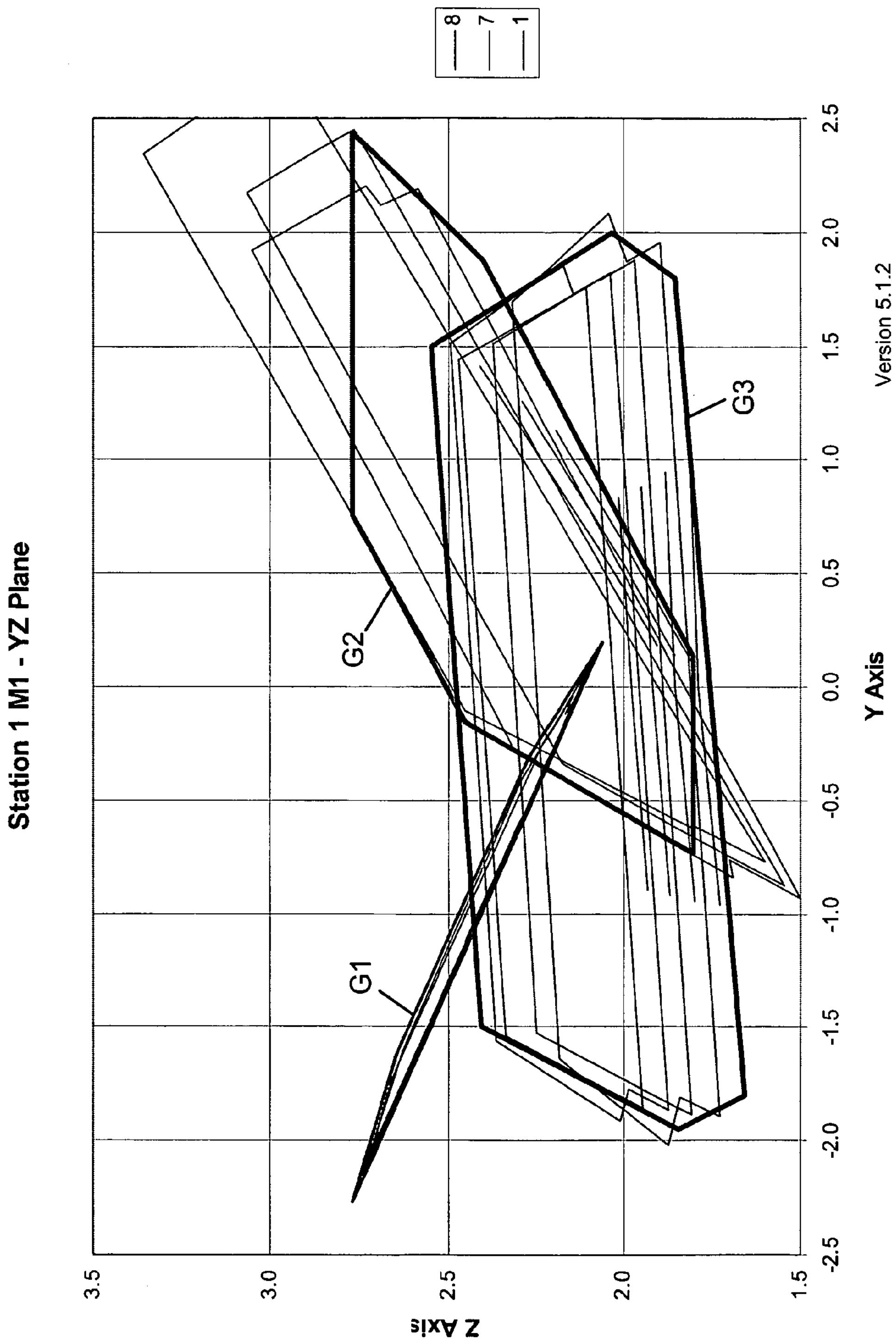
FIG. 13A6

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 4.83616 | -1.58677 | 0.84115 | 4.73669 | -1.63993 | 0.66301 | 4.64314 | -1.69543 | 0.50201 |
| 79 | Point 2 | 4.68429 | -1.81884 | 0.74767 | 4.58926 | -1.86587 | 0.57304 | 4.48446 | -1.93076 | 0.39587 |
| 80 | Point 3 | 4.67878 | -1.78796 | 0.69779 | 4.58926 | -1.86587 | 0.57304 | 4.48358 | -1.92664 | 0.38888 |
| 81 | Point 4 | 4.22223 | -2.50841 | 0.44377 | 4.28260 | -2.33583 | 0.38592 | 4.00469 | -2.63997 | 0.07232 |
| 82 | Point 5 | 4.05858 | -3.52592 | 1.25078 | 4.08790 | -3.53306 | 1.33026 | 3.80481 | -3.82416 | 0.98868 |
| 83 | Point 6 | 4.46417 | -3.19384 | 1.84067 | 4.36259 | -3.30509 | 1.72614 | 4.23639 | -3.46214 | 1.60614 |
| 84 | Point 7 | 4.48187 | -3.13482 | 1.81374 | 4.36259 | -3.30509 | 1.72614 | 4.23895 | -3.45403 | 1.60276 |
| 85 | Point 8 | 4.62128 | -3.01193 | 2.00617 | 4.49650 | -3.19395 | 1.91915 | 4.38465 | -3.33064 | 1.80981 |
| 86 | Point 9 | 4.83616 | -1.58677 | 0.84115 | 4.73669 | -1.63993 | 0.66301 | 4.64314 | -1.69543 | 0.50201 |
| 87 | Start of scan line | 4.79136 | -1.94631 | 1.15786 | 4.70000 | -2.00000 | 1.00000 | 4.60451 | -2.05611 | 0.83500 |
| 88 | Middle of rotation | 4.79136 | -1.94631 | 1.15786 | 4.70000 | -2.00000 | 1.00000 | 4.60451 | -2.05611 | 0.83500 |
| 89 | End of scan line | 4.69056 | -2.50111 | 1.56984 | 4.58033 | -2.64637 | 1.47458 | 4.46974 | -2.76462 | 1.34651 |
| 90 | | | | | | | | | | |

FIG. 13B1

| | A | B | C | D | E | F | G | H | I | J |
|---|---|---|---|---|---|---|---|---|---|---|
| 91 | | Facet | | | Facet | | | Facet | | |
| 92 | G2 | 7 | | | 9 | | | 11 | | |
| 93 | Point 1 | 3.38194 | 4.20092 | 1.75395 | 3.24016 | 4.43917 | 2.01655 | 3.11010 | 4.72655 | 2.34142 |
| 94 | Point 2 | 3.16298 | 4.26385 | 1.78738 | 3.03125 | 4.49361 | 2.04162 | 2.88665 | 4.78740 | 2.37142 |
| 95 | Point 3 | 3.16739 | 4.30137 | 1.83403 | 3.03125 | 4.49361 | 2.04162 | 2.88663 | 4.79258 | 2.37774 |
| 96 | Point 4 | 2.50443 | 4.46930 | 1.90767 | 2.59900 | 4.60627 | 2.09349 | 2.21545 | 4.97231 | 2.46415 |
| 97 | Point 5 | 1.39822 | 2.79582 | -0.35302 | 1.44696 | 2.82994 | -0.30174 | 1.08385 | 3.11226 | -0.02918 |
| 98 | Point 6 | 1.81707 | 2.39729 | -0.75633 | 1.73748 | 2.57459 | -0.55577 | 1.56833 | 2.71448 | -0.41858 |
| 99 | Point 7 | 1.85962 | 2.41646 | -0.72451 | 1.73748 | 2.57459 | -0.55577 | 1.57414 | 2.71711 | -0.41422 |
| 100 | Point 8 | 2.00251 | 2.29151 | -0.84867 | 1.87437 | 2.45426 | -0.67547 | 1.73191 | 2.58895 | -0.53935 |
| 101 | Point 9 | 3.38194 | 4.20092 | 1.75395 | 3.24016 | 4.43917 | 2.01655 | 3.11010 | 4.72655 | 2.34142 |
| 102 | Start of scan line | 3.14045 | 3.84670 | 1.27398 | 3.00728 | 4.05126 | 1.49719 | 2.86346 | 4.28889 | 1.75864 |
| 103 | Middle of rotation | 2.81784 | 3.26851 | 0.50471 | 2.60000 | 3.30000 | 0.50000 | 2.37384 | 3.33269 | 0.49511 |
| 104 | End of scan line | 2.37758 | 2.63817 | -0.35149 | 2.22734 | 2.77029 | -0.22004 | 2.06736 | 2.89843 | -0.09537 |
| 105 | | | | | | | | | | |

FIG. 13B2

| | A | B | C | D | E | F | G |
|---|---|---|---|---|---|---|---|
| 106 | | Facet | | | Facet | | |
| 107 | G3 | 1 | | | 2 | | |
| 108 | Point 1 | 4.36645 | 2.65376 | 0.19632 | 4.13039 | 2.57939 | 0.16456 |
| 109 | Point 2 | 4.22328 | 2.62785 | 0.17673 | 3.98981 | 2.54937 | 0.14541 |
| 110 | Point 3 | 4.17479 | 2.80928 | 0.16686 | 3.98888 | 2.55291 | 0.14522 |
| 111 | Point 4 | 3.78746 | 2.62732 | 0.11577 | 3.58353 | 2.46410 | 0.09002 |
| 112 | Point 5 | 3.59706 | -1.89846 | 0.16625 | 3.42901 | -1.80124 | 0.14108 |
| 113 | Point 6 | 4.00140 | -2.16622 | 0.22737 | 3.86105 | -1.97527 | 0.20449 |
| 114 | Point 7 | 4.06710 | -1.99138 | 0.23359 | 3.86230 | -1.97181 | 0.20460 |
| 115 | Point 8 | 4.22016 | -2.04815 | 0.25597 | 4.01328 | -2.03180 | 0.22675 |
| 116 | Point 9 | 4.36645 | 2.65376 | 0.19632 | 4.13039 | 2.57939 | 0.16456 |
| 117 | Start of scan line | 4.40361 | 1.87032 | 0.21487 | 4.17745 | 1.84317 | 0.18369 |
| 118 | Middle of rotation | 4.29670 | 0.23013 | 0.22786 | 4.10000 | 0.25000 | 0.20000 |
| 119 | End of scan line | 4.30920 | -1.28070 | 0.25535 | 4.10701 | -1.28789 | 0.22718 |
| 120 | | | | | | | |

FIG. 13B3A

| | H | I | J | K | L | M |
|---|---|---|---|---|---|---|
| 106 | Facet | | | Facet | | |
| 107 | 3 | | | 4 | | |
| 108 | 3.89207 | 2.57127 | 0.13136 | 3.63985 | 2.49916 | 0.09731 |
| 109 | 3.72893 | 2.54596 | 0.10897 | 3.48464 | 2.46924 | 0.07610 |
| 110 | 3.69351 | 2.66161 | 0.10205 | 3.48464 | 2.46924 | 0.07610 |
| 111 | 3.24144 | 2.51989 | 0.04122 | 3.13971 | 2.40274 | 0.02898 |
| 112 | 3.10957 | -1.84718 | 0.09718 | 3.03925 | -1.79742 | 0.08649 |
| 113 | 3.58373 | -2.08109 | 0.16749 | 3.40752 | -1.93323 | 0.14032 |
| 114 | 3.62849 | -1.96992 | 0.17186 | 3.40752 | -1.93323 | 0.14032 |
| 115 | 3.80192 | -2.02808 | 0.19711 | 3.57430 | -1.99474 | 0.16470 |
| 116 | 3.89207 | 2.57127 | 0.13136 | 3.63985 | 2.49916 | 0.09731 |
| 117 | 3.94222 | 1.82246 | 0.15114 | 3.70025 | 1.80404 | 0.11760 |
| 118 | 3.89313 | 0.27090 | 0.17070 | 3.67474 | 0.29297 | 0.13978 |
| 119 | 3.89234 | -1.26997 | 0.19685 | 3.66999 | -1.27076 | 0.16575 |
| 120 | | | | | | |

FIG. 13B3B

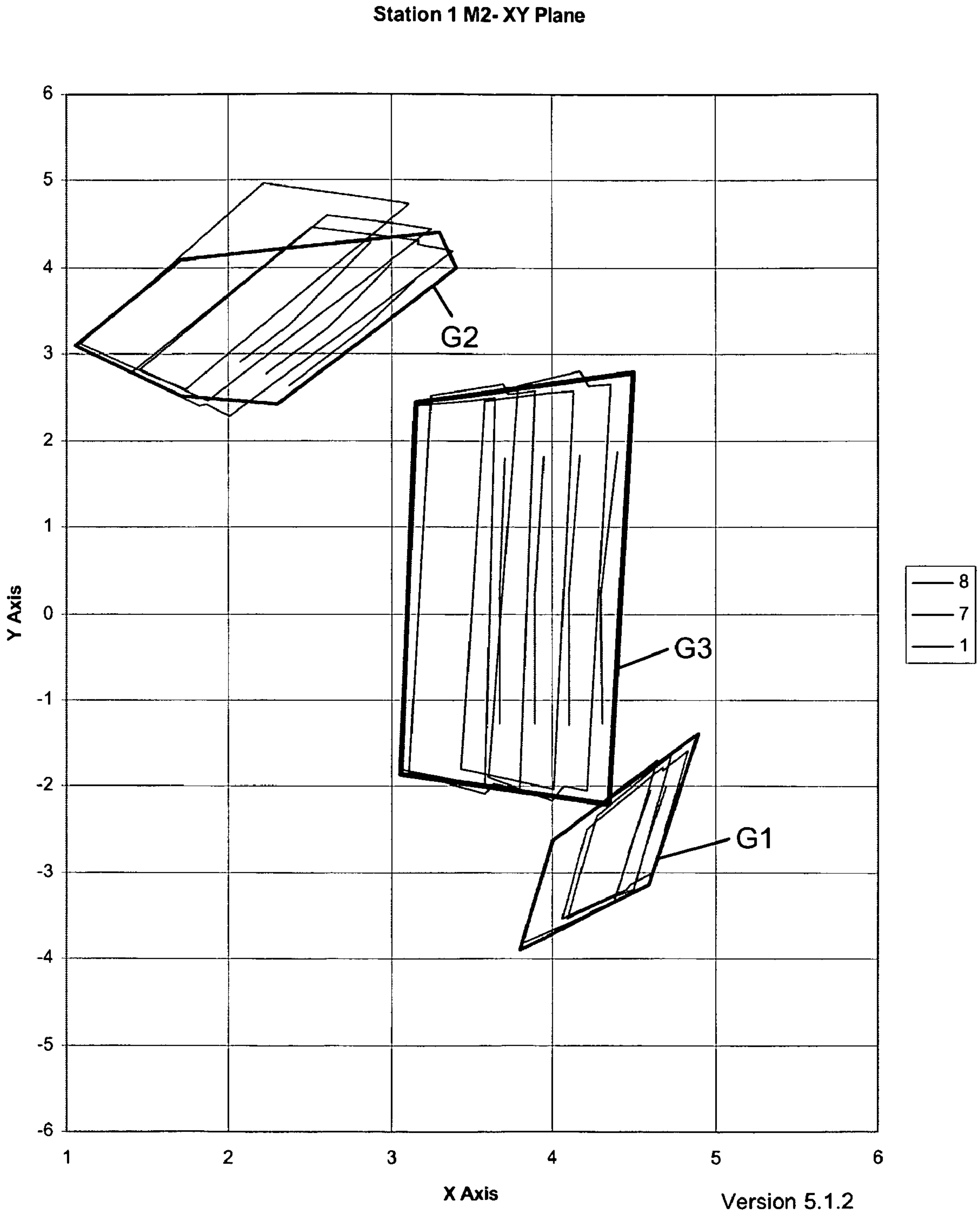
FIG. 13B4

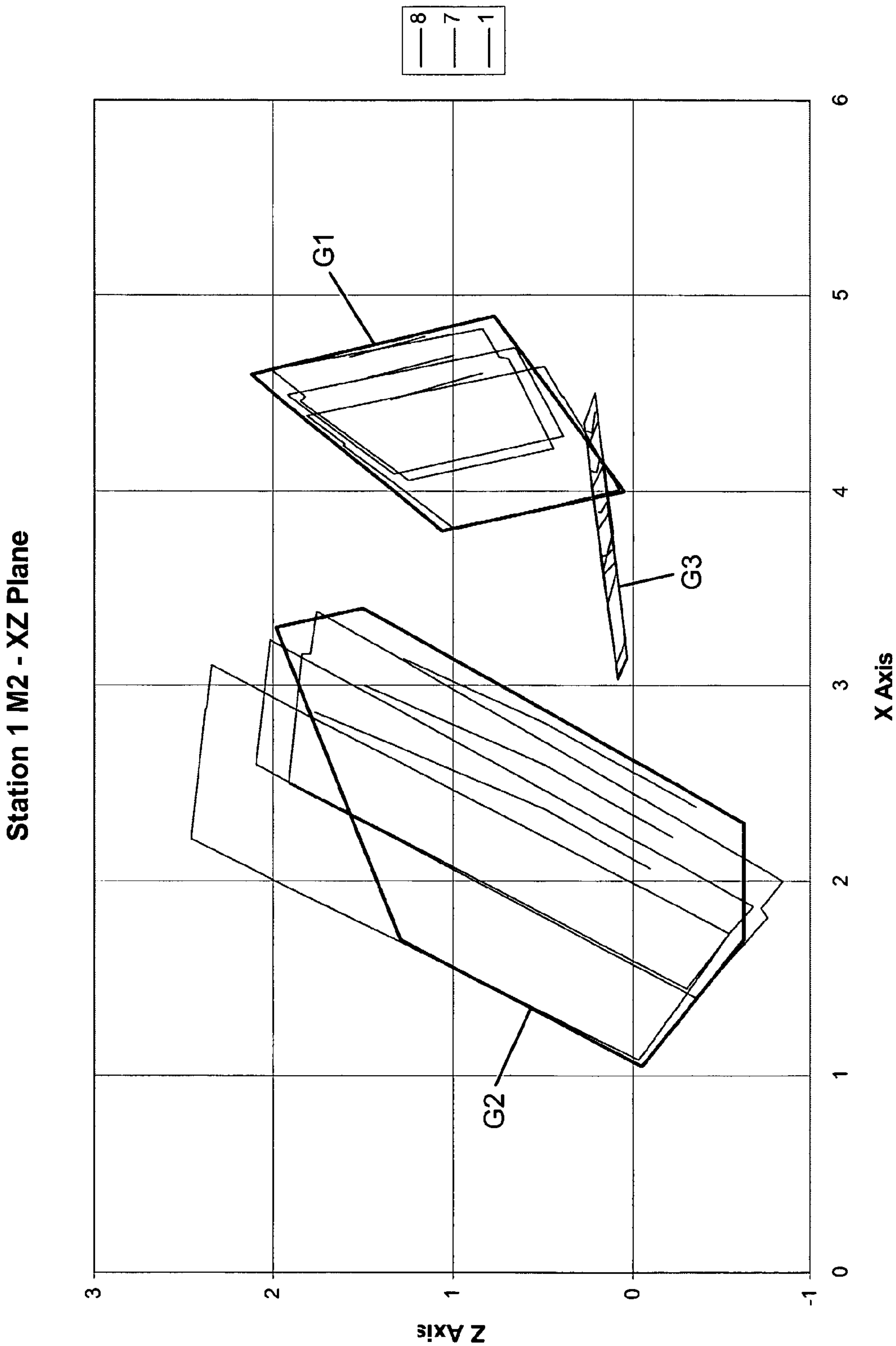
FIG. 13B5

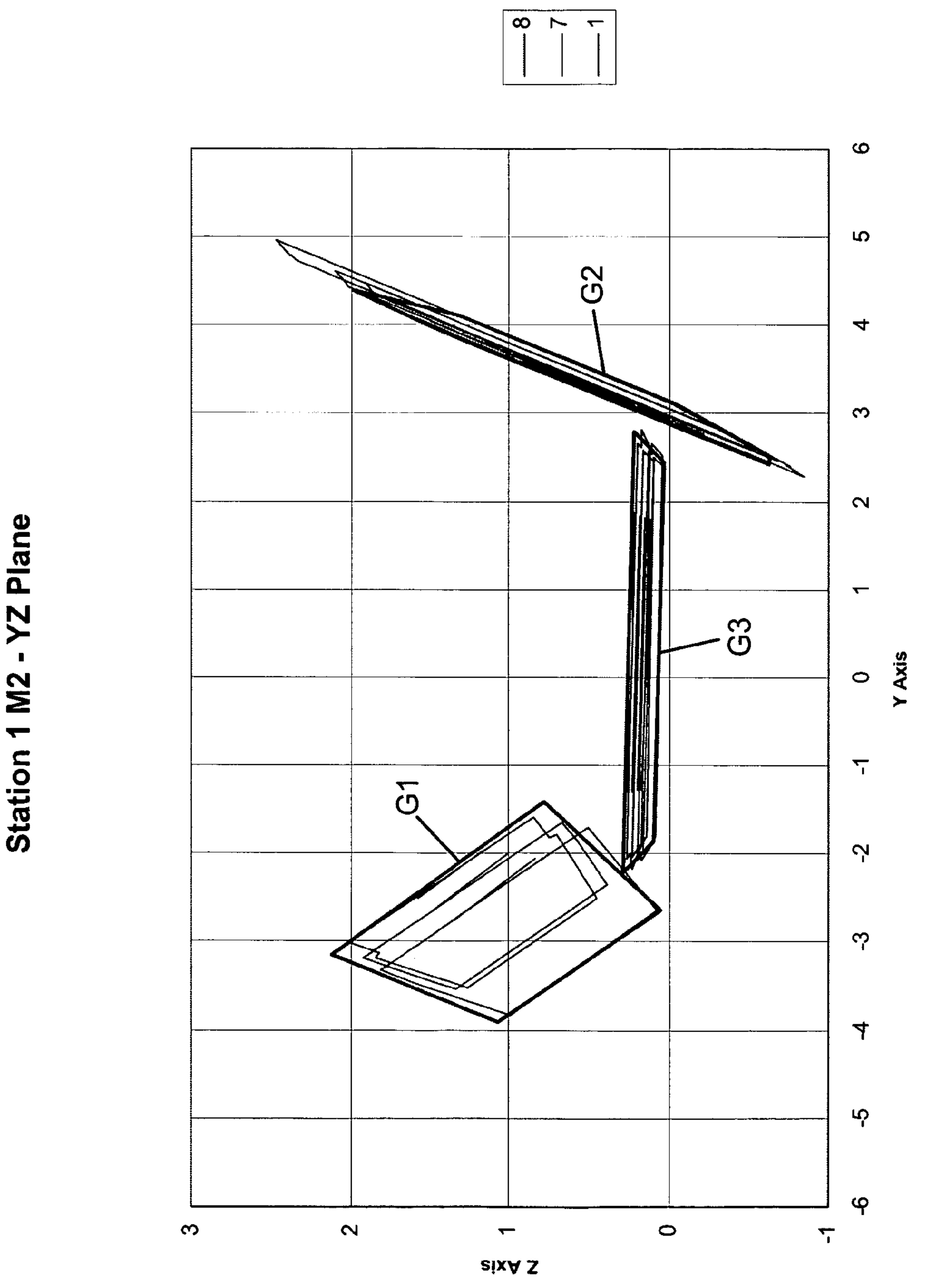
FIG. 13B6

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 1.20537 | -1.67340 | 0.83287 | 1.73454 | -1.76256 | 0.57847 | 2.18607 | -1.81295 | 0.33975 |
| 79 | Point 2 | 1.50717 | -1.82194 | 0.77007 | 2.01252 | -1.90575 | 0.52600 | 2.50076 | -1.97962 | 0.28421 |
| 80 | Point 3 | 1.53373 | -1.80077 | 0.73570 | 2.01252 | -1.90575 | 0.52600 | 2.50470 | -1.97622 | 0.27888 |
| 81 | Point 4 | 2.71992 | -2.40114 | 0.50283 | 2.72609 | -2.27331 | 0.39129 | 3.72651 | -2.62604 | 0.06549 |
| 82 | Point 5 | 2.86809 | -3.52973 | 1.36131 | 2.87153 | -3.57274 | 1.39541 | 3.86534 | -3.82116 | 0.98584 |
| 83 | Point 6 | 1.66004 | -3.29877 | 1.91900 | 2.13984 | -3.43596 | 1.73579 | 2.62296 | -3.60007 | 1.57321 |
| 84 | Point 7 | 1.63442 | -3.25853 | 1.90105 | 2.13984 | -3.43596 | 1.73579 | 2.61924 | -3.59386 | 1.57029 |
| 85 | Point 8 | 1.32257 | -3.19447 | 2.04127 | 1.85089 | -3.38194 | 1.87021 | 2.29384 | -3.53522 | 1.72352 |
| 86 | Point 9 | 1.20537 | -1.67340 | 0.83287 | 1.73454 | -1.76256 | 0.57847 | 2.18607 | -1.81295 | 0.33975 |
| 87 | Start of scan line | 1.19058 | -1.90430 | 1.03659 | 1.70000 | -2.00000 | 0.80000 | 2.15170 | -2.08486 | 0.59022 |
| 88 | Middle of rotation | 1.19058 | -1.90430 | 1.03659 | 1.70000 | -2.00000 | 0.80000 | 2.15170 | -2.08486 | 0.59022 |
| 89 | End of scan line | 1.33110 | -2.85916 | 1.75349 | 1.84105 | -3.01433 | 1.56667 | 2.29073 | -3.10310 | 1.36142 |
| 90 | | | | | | | | | | |

FIG. 13C1

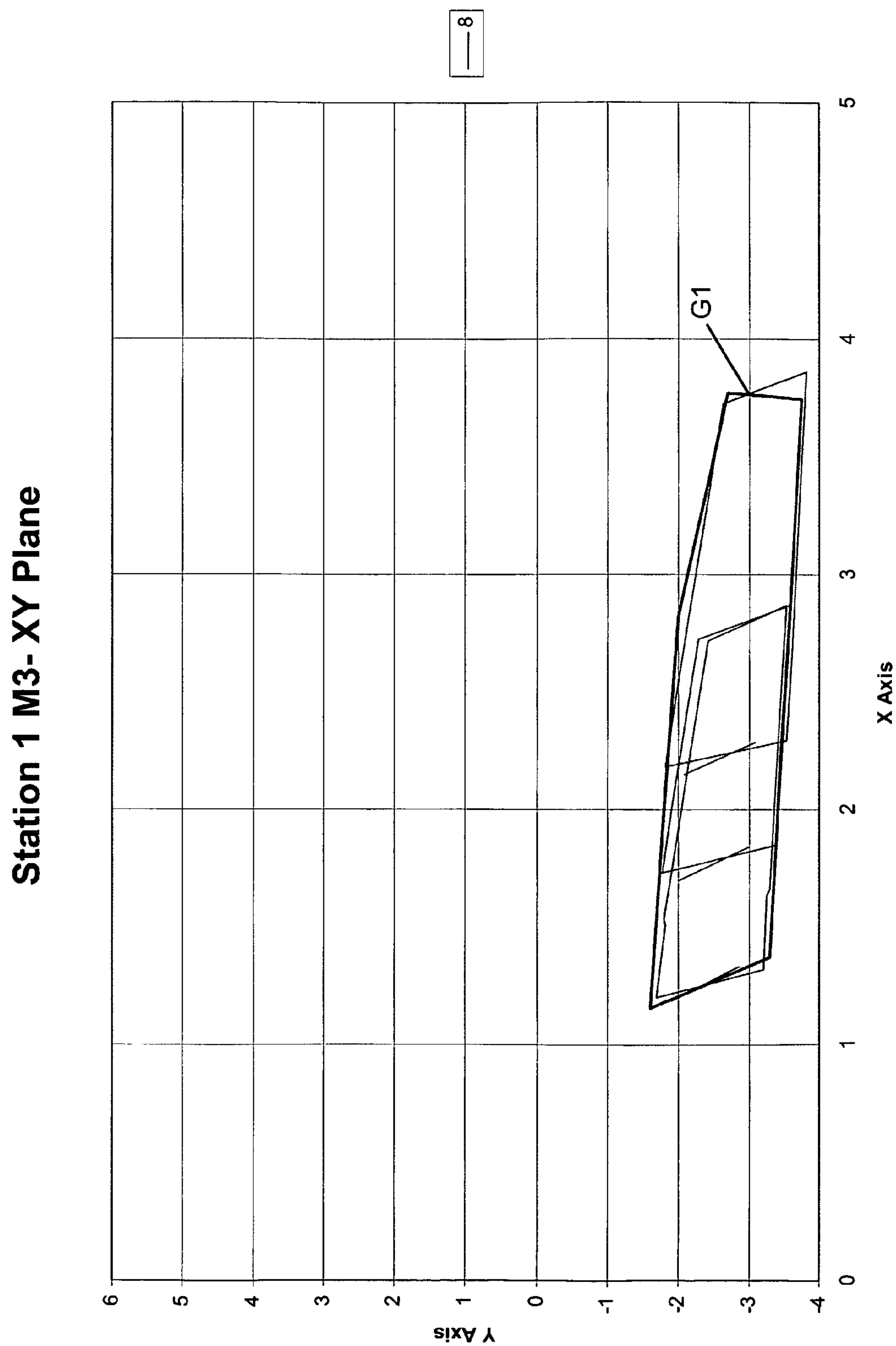
FIG. 13C2

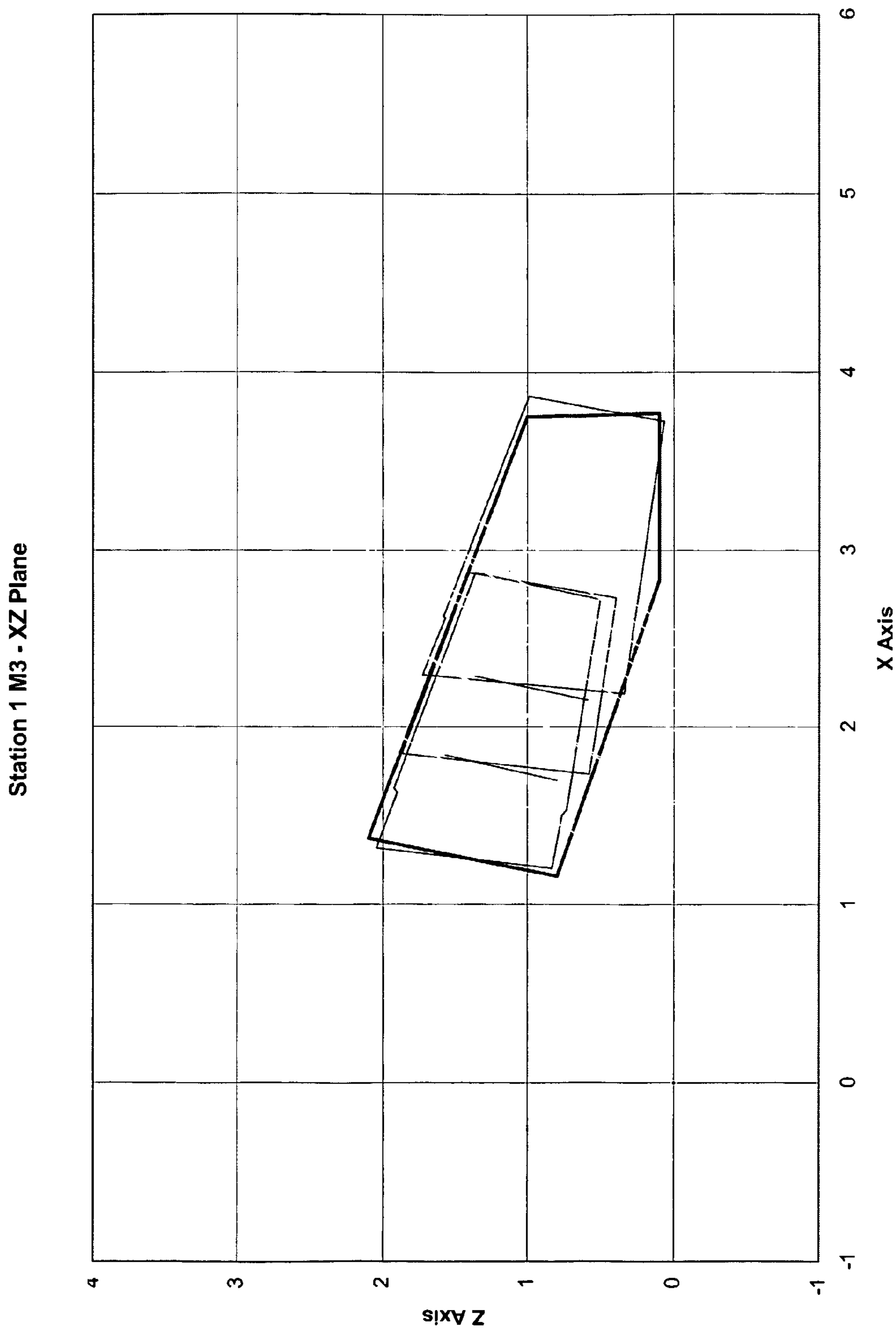
FIG. 13C3

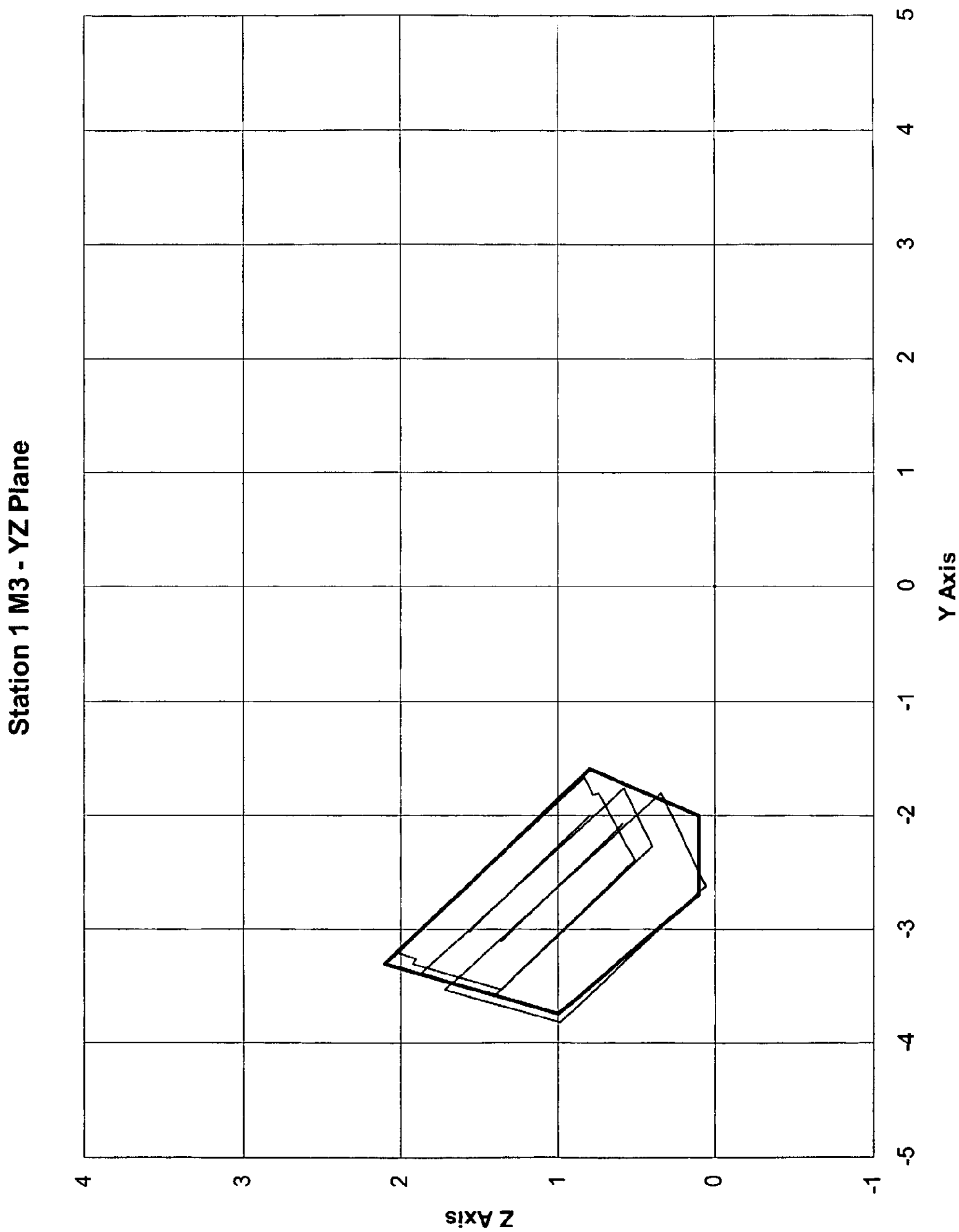
FIG. 13C4

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 1.20537 | -1.67340 | 0.83287 | 1.73454 | -1.76256 | 0.57847 | 2.18607 | -1.81295 | 0.33975 |
| 79 | Point 2 | 1.50717 | -1.82194 | 0.77007 | 2.01252 | -1.90575 | 0.52600 | 2.50076 | -1.97962 | 0.28421 |
| 80 | Point 3 | 1.53373 | -1.80077 | 0.73570 | 2.01252 | -1.90575 | 0.52600 | 2.50470 | -1.97622 | 0.27888 |
| 81 | Point 4 | 2.71992 | -2.40114 | 0.50283 | 2.72609 | -2.27331 | 0.39129 | 3.72651 | -2.62604 | 0.06549 |
| 82 | Point 5 | 2.86809 | -3.52973 | 1.36131 | 2.87153 | -3.57274 | 1.39541 | 3.86534 | -3.82116 | 0.98584 |
| 83 | Point 6 | 1.66004 | -3.29877 | 1.91900 | 2.13984 | -3.43596 | 1.73579 | 2.62296 | -3.60007 | 1.57321 |
| 84 | Point 7 | 1.63442 | -3.25853 | 1.90105 | 2.13984 | -3.43596 | 1.73579 | 2.61924 | -3.59386 | 1.57029 |
| 85 | Point 8 | 1.32257 | -3.19447 | 2.04127 | 1.85089 | -3.38194 | 1.87021 | 2.29384 | -3.53522 | 1.72352 |
| 86 | Point 9 | 1.20537 | -1.67340 | 0.83287 | 1.73454 | -1.76256 | 0.57847 | 2.18607 | -1.81295 | 0.33975 |
| 87 | Start of scan line | 1.19058 | -1.90430 | 1.03659 | 1.70000 | -2.00000 | 0.80000 | 2.15170 | -2.08486 | 0.59022 |
| 88 | Middle of rotation | 1.19058 | -1.90430 | 1.03659 | 1.70000 | -2.00000 | 0.80000 | 2.15170 | -2.08486 | 0.59022 |
| 89 | End of scan line | 1.33110 | -2.85916 | 1.75349 | 1.84105 | -3.01433 | 1.56667 | 2.29073 | -3.10310 | 1.36142 |
| 90 | | | | | | | | | | |

FIG. 13D1

| | A | B | C | D | E | F | G | H | I | J |
|---|---|---|---|---|---|---|---|---|---|---|
| 105 | | | | | | | | | | |
| 106 | | Facet | | | Facet | | | Facet | | |
| 107 | G3 | 1 | | | 2 | | | 3 | | |
| 108 | Point 1 | 5.04006 | 0.52476 | 1.76314 | 4.94178 | 0.55167 | 1.81997 | 4.85731 | 0.53894 | 1.86881 |
| 109 | Point 2 | 4.87042 | 0.44428 | 1.86123 | 4.77196 | 0.46655 | 1.91816 | 4.67548 | 0.45660 | 1.97394 |
| 110 | Point 3 | 4.83173 | 0.66283 | 1.88360 | 4.77125 | 0.47110 | 1.91857 | 4.65020 | 0.60068 | 1.98856 |
| 111 | Point 4 | 4.32129 | 0.28599 | 2.17873 | 4.24022 | 0.20212 | 2.22561 | 4.09186 | 0.25949 | 2.31139 |
| 112 | Point 5 | 4.34770 | -1.84845 | 2.16347 | 4.26992 | -1.86717 | 2.20844 | 4.08721 | -1.77102 | 2.31408 |
| 113 | Point 6 | 4.77372 | -2.25670 | 1.91714 | 4.71924 | -2.17652 | 1.94864 | 4.56410 | -2.15769 | 2.03834 |
| 114 | Point 7 | 4.83579 | -2.04739 | 1.88125 | 4.72049 | -2.17219 | 1.94791 | 4.60668 | -2.01968 | 2.01372 |
| 115 | Point 8 | 4.98278 | -2.13965 | 1.79626 | 4.86407 | -2.27009 | 1.86490 | 4.76563 | -2.11752 | 1.92182 |
| 116 | Point 9 | 5.04006 | 0.52476 | 1.76314 | 4.94178 | 0.55167 | 1.81997 | 4.85731 | 0.53894 | 1.86881 |
| 117 | Start of scan line | 5.02090 | 0.00000 | 1.77422 | 4.92826 | 0.00000 | 1.82778 | 4.83795 | 0.00000 | 1.88000 |
| 118 | Middle of rotation | 5.02090 | 0.00000 | 1.77422 | 4.92826 | 0.00000 | 1.82778 | 4.83795 | 0.00000 | 1.88000 |
| 119 | End of scan line | 5.06055 | -1.14492 | 1.75129 | 4.96268 | -1.22889 | 1.80788 | 4.85432 | -1.09333 | 1.87053 |
| 120 | | | | | | | | | | |

FIG. 14A1A

| | K | L | M | N | O | P | Q | R | S |
|---|---|---|---|---|---|---|---|---|---|
| 105 | | | | | | | | | |
| 106 | Facet | | | Facet | | | Facet | | |
| 107 | 4 | | | 5 | | | 6 | | |
| 108 | 4.76146 | 0.57105 | 1.92423 | 4.59494 | 0.56809 | 2.02051 | 4.42086 | 0.60393 | 2.12116 |
| 109 | 4.58109 | 0.48315 | 2.02852 | 4.39766 | 0.48153 | 2.13458 | 4.21826 | 0.51160 | 2.23831 |
| 110 | 4.58109 | 0.48315 | 2.02852 | 4.39672 | 0.48704 | 2.13512 | 4.21826 | 0.51160 | 2.23831 |
| 111 | 4.14950 | 0.27280 | 2.27807 | 3.77405 | 0.21047 | 2.49515 | 3.84486 | 0.34144 | 2.45421 |
| 112 | 4.12497 | -1.92124 | 2.29225 | 3.74166 | -1.46848 | 2.51388 | 3.79316 | -1.27109 | 2.48410 |
| 113 | 4.49172 | -2.17143 | 2.08019 | 4.30150 | -1.80374 | 2.19018 | 4.13935 | -1.47056 | 2.28393 |
| 114 | 4.49172 | -2.17143 | 2.08019 | 4.30312 | -1.79844 | 2.18924 | 4.13935 | -1.47056 | 2.28393 |
| 115 | 4.64469 | -2.27578 | 1.99174 | 4.48021 | -1.90337 | 2.08685 | 4.32687 | -1.57861 | 2.17551 |
| 116 | 4.76146 | 0.57105 | 1.92423 | 4.59494 | 0.56809 | 2.02051 | 4.42086 | 0.60393 | 2.12116 |
| 117 | 4.74966 | 0.00000 | 1.93105 | 4.57806 | 0.00000 | 2.03027 | 4.41147 | 0.00000 | 2.12659 |
| 118 | 4.74966 | 0.00000 | 1.93105 | 4.57806 | 0.00000 | 2.03027 | 4.41147 | 0.00000 | 2.12659 |
| 119 | 4.76001 | -1.19617 | 1.92507 | 4.57039 | -0.89357 | 2.03470 | 4.40142 | -0.64218 | 2.13240 |
| 120 | | | | | | | | | |

FIG. 14A1B

| | A | B | C | D | E | F | G | H | I | J |
|---|---|---|---|---|---|---|---|---|---|---|
| 105 | | | | | | | | | | |
| 106 | | Facet | | | Facet | | | Facet | | |
| 107 | G3 | 1 | | | 2 | | | 3 | | |
| 108 | Point 1 | 4.82498 | 0.44237 | 0.26978 | 4.65503 | 0.44811 | 0.22157 | 4.49179 | 0.44459 | 0.17770 |
| 109 | Point 2 | 4.66874 | 0.36963 | 0.24652 | 4.50103 | 0.37345 | 0.19944 | 4.31949 | 0.37132 | 0.15017 |
| 110 | Point 3 | 4.62719 | 0.54611 | 0.18746 | 4.50022 | 0.37701 | 0.19826 | 4.28911 | 0.48536 | 0.11104 |
| 111 | Point 4 | 4.18842 | 0.22763 | 0.15299 | 4.04652 | 0.15472 | 0.13371 | 3.79612 | 0.20147 | 0.05234 |
| 112 | Point 5 | 4.29176 | -2.24588 | 0.84926 | 4.17480 | -2.32513 | 0.83855 | 3.90727 | -2.24907 | 0.74455 |
| 113 | Point 6 | 4.69167 | -2.49257 | 1.02567 | 4.59519 | -2.46863 | 0.99272 | 4.37431 | -2.45821 | 0.92926 |
| 114 | Point 7 | 4.74716 | -2.30530 | 0.99034 | 4.59627 | -2.46486 | 0.99200 | 4.41150 | -2.33743 | 0.90686 |
| 115 | Point 8 | 4.89443 | -2.35176 | 1.04332 | 4.74099 | -2.51341 | 1.04484 | 4.57811 | -2.38443 | 0.96529 |
| 116 | Point 9 | 4.82498 | 0.44237 | 0.26978 | 4.65503 | 0.44811 | 0.22157 | 4.49179 | 0.44459 | 0.17770 |
| 117 | Start of scan line | 4.82442 | 0.00000 | 0.38908 | 4.66490 | 0.00000 | 0.34528 | 4.50000 | -0.00001 | 0.30000 |
| 118 | Middle of rotation | 4.82442 | 0.00000 | 0.38907 | 4.66490 | 0.00000 | 0.34528 | 4.50000 | 0.00000 | 0.30000 |
| 119 | End of scan line | 4.94361 | -1.51167 | 0.82998 | 4.80210 | -1.65515 | 0.82987 | 4.62188 | -1.53817 | 0.74880 |
| 120 | | | | | | | | | | |

FIG. 14B1A

| | K | L | M | N | O | P | Q | R | S |
|---|---|---|---|---|---|---|---|---|---|
| 105 | | | | | | | | | |
| 106 | Facet | | | Facet | | | Facet | | |
| 107 | 4 | | | 5 | | | 6 | | |
| 108 | 4.30775 | 0.44954 | 0.12583 | 3.93952 | 0.44834 | 0.02505 | 3.52125 | 0.44891 | -0.08994 |
| 109 | 4.14124 | 0.37427 | 0.10044 | 3.74647 | 0.37385 | -0.00784 | 3.32508 | 0.37322 | -0.12337 |
| 110 | 4.14124 | 0.37427 | 0.10044 | 3.74516 | 0.37803 | -0.00933 | 3.32508 | 0.37322 | -0.12337 |
| 111 | 3.76359 | 0.20355 | 0.04285 | 3.17535 | 0.15541 | -0.10566 | 2.98199 | 0.24084 | -0.18182 |
| 112 | 3.89193 | -2.41913 | 0.78626 | 3.29187 | -2.00085 | 0.50856 | 3.10607 | -1.64117 | 0.36043 |
| 113 | 4.25097 | -2.52955 | 0.91466 | 3.86517 | -2.15630 | 0.70794 | 3.47166 | -1.74831 | 0.48974 |
| 114 | 4.25097 | -2.52955 | 0.91466 | 3.86651 | -2.15188 | 0.70712 | 3.47166 | -1.74831 | 0.48974 |
| 115 | 4.41114 | -2.57881 | 0.97193 | 4.06339 | -2.20429 | 0.77533 | 3.68342 | -1.81036 | 0.56463 |
| 116 | 4.30775 | 0.44954 | 0.12583 | 3.93952 | 0.44834 | 0.02505 | 3.52125 | 0.44891 | -0.08994 |
| 117 | 4.32901 | 0.00000 | 0.25305 | 3.96553 | 0.00000 | 0.15325 | 3.56687 | 0.00000 | 0.04380 |
| 118 | 4.32901 | 0.00000 | 0.25305 | 3.96553 | 0.00000 | 0.15325 | 3.56687 | 0.00000 | 0.04380 |
| 119 | 4.47185 | -1.71403 | 0.75509 | 4.08537 | -1.40033 | 0.56428 | 3.67805 | -1.09574 | 0.37020 |
| 120 | | | | | | | | | |

FIG. 14B1B

| | A | B | C | D | E | F | G | H | I | J |
|---|---|---|---|---|---|---|---|---|---|---|
| 105 | | | | | | | | | | |
| 106 | | Facet | | | Facet | | | Facet | | |
| 107 | G3 | 1 | | | 2 | | | 3 | | |
| 108 | Point 1 | 4.82498 | 0.44237 | 0.26978 | 4.65503 | 0.44811 | 0.22157 | 4.49179 | 0.44459 | 0.17770 |
| 109 | Point 2 | 4.66874 | 0.36963 | 0.24652 | 4.50103 | 0.37345 | 0.19944 | 4.31949 | 0.37132 | 0.15017 |
| 110 | Point 3 | 4.62719 | 0.54611 | 0.18746 | 4.50022 | 0.37701 | 0.19826 | 4.28911 | 0.48536 | 0.11104 |
| 111 | Point 4 | 4.18842 | 0.22763 | 0.15299 | 4.04652 | 0.15472 | 0.13371 | 3.79612 | 0.20147 | 0.05234 |
| 112 | Point 5 | 4.29176 | -2.24588 | 0.84926 | 4.17480 | -2.32513 | 0.83855 | 3.90727 | -2.24907 | 0.74455 |
| 113 | Point 6 | 4.69167 | -2.49257 | 1.02567 | 4.59519 | -2.46863 | 0.99272 | 4.37431 | -2.45821 | 0.92926 |
| 114 | Point 7 | 4.74716 | -2.30530 | 0.99034 | 4.59627 | -2.46486 | 0.99200 | 4.41150 | -2.33743 | 0.90686 |
| 115 | Point 8 | 4.89443 | -2.35176 | 1.04332 | 4.74099 | -2.51341 | 1.04484 | 4.57811 | -2.38443 | 0.96529 |
| 116 | Point 9 | 4.82498 | 0.44237 | 0.26978 | 4.65503 | 0.44811 | 0.22157 | 4.49179 | 0.44459 | 0.17770 |
| 117 | Start of scan line | 4.82442 | 0.00000 | 0.38908 | 4.66490 | 0.00000 | 0.34528 | 4.50000 | -0.00001 | 0.30000 |
| 118 | Middle of rotation | 4.82442 | 0.00000 | 0.38907 | 4.66490 | 0.00000 | 0.34528 | 4.50000 | 0.00000 | 0.30000 |
| 119 | End of scan line | 4.94361 | -1.51167 | 0.82998 | 4.80210 | -1.65515 | 0.82987 | 4.62188 | -1.53817 | 0.74880 |
| 120 | | | | | | | | | | |

FIG. 14C1A

| | K | L | M | N | O | P | Q | R | S |
|---|---|---|---|---|---|---|---|---|---|
| 105 | | | | | | | | | |
| 106 | Facet | | | Facet | | | Facet | | |
| 107 | 4 | | | 5 | | | 6 | | |
| 108 | 4.30775 | 0.44954 | 0.12583 | 3.93952 | 0.44834 | 0.02505 | 3.52125 | 0.44891 | -0.08994 |
| 109 | 4.14124 | 0.37427 | 0.10044 | 3.74647 | 0.37385 | -0.00784 | 3.32508 | 0.37322 | -0.12337 |
| 110 | 4.14124 | 0.37427 | 0.10044 | 3.74516 | 0.37803 | -0.00933 | 3.32508 | 0.37322 | -0.12337 |
| 111 | 3.76359 | 0.20355 | 0.04285 | 3.17535 | 0.15541 | -0.10566 | 2.98199 | 0.24084 | -0.18182 |
| 112 | 3.89193 | -2.41913 | 0.78626 | 3.29187 | -2.00085 | 0.50856 | 3.10607 | -1.64117 | 0.36043 |
| 113 | 4.25097 | -2.52955 | 0.91466 | 3.86517 | -2.15630 | 0.70794 | 3.47166 | -1.74831 | 0.48974 |
| 114 | 4.25097 | -2.52955 | 0.91466 | 3.86651 | -2.15188 | 0.70712 | 3.47166 | -1.74831 | 0.48974 |
| 115 | 4.41114 | -2.57881 | 0.97193 | 4.06339 | -2.20429 | 0.77533 | 3.68342 | -1.81036 | 0.56463 |
| 116 | 4.30775 | 0.44954 | 0.12583 | 3.93952 | 0.44834 | 0.02505 | 3.52125 | 0.44891 | -0.08994 |
| 117 | 4.32901 | 0.00000 | 0.25305 | 3.96553 | 0.00000 | 0.15325 | 3.56687 | 0.00000 | 0.04380 |
| 118 | 4.32901 | 0.00000 | 0.25305 | 3.96553 | 0.00000 | 0.15325 | 3.56687 | 0.00000 | 0.04380 |
| 119 | 4.47185 | -1.71403 | 0.75509 | 4.08537 | -1.40033 | 0.56428 | 3.67805 | -1.09574 | 0.37020 |
| 120 | | | | | | | | | |

FIG. 14C1B

| | A | B | C | D | E | F | G | H | I | J |
|---|---|---|---|---|---|---|---|---|---|---|
| 105 | | | | | | | | | | |
| 106 | | Facet | | | Facet | | | Facet | | |
| 107 | G3 | 1 | | | 2 | | | 3 | | |
| 108 | Point 1 | 4.82498 | 0.44237 | 0.26978 | 4.65503 | 0.44811 | 0.22157 | 4.49179 | 0.44459 | 0.17770 |
| 109 | Point 2 | 4.66874 | 0.36963 | 0.24652 | 4.50103 | 0.37345 | 0.19944 | 4.31949 | 0.37132 | 0.15017 |
| 110 | Point 3 | 4.62719 | 0.54611 | 0.18746 | 4.50022 | 0.37701 | 0.19826 | 4.28911 | 0.48536 | 0.11104 |
| 111 | Point 4 | 4.18842 | 0.22763 | 0.15299 | 4.04652 | 0.15472 | 0.13371 | 3.79612 | 0.20147 | 0.05234 |
| 112 | Point 5 | 4.29176 | -2.24588 | 0.84926 | 4.17480 | -2.32513 | 0.83855 | 3.90727 | -2.24907 | 0.74455 |
| 113 | Point 6 | 4.69167 | -2.49257 | 1.02567 | 4.59519 | -2.46863 | 0.99272 | 4.37431 | -2.45821 | 0.92926 |
| 114 | Point 7 | 4.74716 | -2.30530 | 0.99034 | 4.59627 | -2.46486 | 0.99200 | 4.41150 | -2.33743 | 0.90686 |
| 115 | Point 8 | 4.89443 | -2.35176 | 1.04332 | 4.74099 | -2.51341 | 1.04484 | 4.57811 | -2.38443 | 0.96529 |
| 116 | Point 9 | 4.82498 | 0.44237 | 0.26978 | 4.65503 | 0.44811 | 0.22157 | 4.49179 | 0.44459 | 0.17770 |
| 117 | Start of scan line | 4.82442 | 0.00000 | 0.38908 | 4.66490 | 0.00000 | 0.34528 | 4.50000 | -0.00001 | 0.30000 |
| 118 | Middle of rotation | 4.82442 | 0.00000 | 0.38907 | 4.66490 | 0.00000 | 0.34528 | 4.50000 | 0.00000 | 0.30000 |
| 119 | End of scan line | 4.94361 | -1.51167 | 0.82998 | 4.80210 | -1.65515 | 0.82987 | 4.62188 | -1.53817 | 0.74880 |
| 120 | | | | | | | | | | |

FIG. 14D1A

| | K | L | M | N | O | P | Q | R | S |
|---|---|---|---|---|---|---|---|---|---|
| 105 | | | | | | | | | |
| 106 | Facet | | | Facet | | | Facet | | |
| 107 | 4 | | | 5 | | | 6 | | |
| 108 | 4.30775 | 0.44954 | 0.12583 | 3.93952 | 0.44834 | 0.02505 | 3.52125 | 0.44891 | -0.08994 |
| 109 | 4.14124 | 0.37427 | 0.10044 | 3.74647 | 0.37385 | -0.00784 | 3.32508 | 0.37322 | -0.12337 |
| 110 | 4.14124 | 0.37427 | 0.10044 | 3.74516 | 0.37803 | -0.00933 | 3.32508 | 0.37322 | -0.12337 |
| 111 | 3.76359 | 0.20355 | 0.04285 | 3.17535 | 0.15541 | -0.10566 | 2.98199 | 0.24084 | -0.18182 |
| 112 | 3.89193 | -2.41913 | 0.78626 | 3.29187 | -2.00085 | 0.50856 | 3.10607 | -1.64117 | 0.36043 |
| 113 | 4.25097 | -2.52955 | 0.91466 | 3.86517 | -2.15630 | 0.70794 | 3.47166 | -1.74831 | 0.48974 |
| 114 | 4.25097 | -2.52955 | 0.91466 | 3.86651 | -2.15188 | 0.70712 | 3.47166 | -1.74831 | 0.48974 |
| 115 | 4.41114 | -2.57881 | 0.97193 | 4.06339 | -2.20429 | 0.77533 | 3.68342 | -1.81036 | 0.56463 |
| 116 | 4.30775 | 0.44954 | 0.12583 | 3.93952 | 0.44834 | 0.02505 | 3.52125 | 0.44891 | -0.08994 |
| 117 | 4.32901 | 0.00000 | 0.25305 | 3.96553 | 0.00000 | 0.15325 | 3.56687 | 0.00000 | 0.04380 |
| 118 | 4.32901 | 0.00000 | 0.25305 | 3.96553 | 0.00000 | 0.15325 | 3.56687 | 0.00000 | 0.04380 |
| 119 | 4.47185 | -1.71403 | 0.75509 | 4.08537 | -1.40033 | 0.56428 | 3.67805 | -1.09574 | 0.37020 |
| 120 | | | | | | | | | |

FIG. 14D1B

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 5.95032 | -0.72592 | 5.72516 | 5.75912 | -0.72344 | 5.84633 | 5.57831 | -0.71341 | 5.95933 |
| 79 | Point 2 | 5.80752 | -0.82205 | 5.83575 | 5.62511 | -0.81564 | 5.95052 | 5.42747 | -0.80763 | 6.07464 |
| 80 | Point 3 | 5.79099 | -0.77284 | 5.83618 | 5.62511 | -0.81564 | 5.95052 | 5.42531 | -0.80078 | 6.07461 |
| 81 | Point 4 | 5.35054 | -1.10363 | 6.18430 | 5.33722 | -1.01369 | 6.17433 | 4.95130 | -1.10154 | 6.43794 |
| 82 | Point 5 | 5.44406 | -4.23150 | 6.76631 | 5.37166 | -4.30055 | 6.82654 | 4.94319 | -4.40584 | 7.12079 |
| 83 | Point 6 | 5.82668 | -4.38204 | 6.55370 | 5.60403 | -4.39100 | 6.69722 | 5.33088 | -4.56037 | 6.90578 |
| 84 | Point 7 | 5.83655 | -4.33627 | 6.53803 | 5.60403 | -4.39100 | 6.69722 | 5.33250 | -4.55423 | 6.90349 |
| 85 | Point 8 | 5.95867 | -4.37550 | 6.46837 | 5.71110 | -4.43267 | 6.63764 | 5.45432 | -4.60159 | 6.83568 |
| 86 | Point 9 | 5.95032 | -0.72592 | 5.72516 | 5.75912 | -0.72344 | 5.84633 | 5.57831 | -0.71341 | 5.95933 |
| 87 | Start of scan line | 5.99623 | -1.21758 | 5.79678 | 5.80609 | -1.19815 | 5.91380 | 5.61623 | -1.19501 | 6.03397 |
| 88 | Middle of rotation | 6.00363 | -1.72998 | 5.89717 | 5.80862 | -1.62630 | 6.00000 | 5.61481 | -1.52325 | 6.10220 |
| 89 | End of scan line | 5.95828 | -3.76722 | 6.34386 | 5.72650 | -3.84809 | 6.50794 | 5.48105 | -3.93033 | 6.68100 |
| 90 | | | | | | | | | | |

FIG. 15A1

| | A | B | C | D | E | F | G | H | I | J |
|---|---|---|---|---|---|---|---|---|---|---|
| 91 | | Facet | | | Facet | | | Facet | | |
| 92 | G2 | 7 | | | 9 | | | 11 | | |
| 93 | Point 1 | 5.95867 | 4.37550 | 6.46837 | 5.71110 | 4.43267 | 6.63764 | 5.45432 | 4.60159 | 6.83568 |
| 94 | Point 2 | 5.83655 | 4.33627 | 6.53803 | 5.60403 | 4.39100 | 6.69722 | 5.33250 | 4.55423 | 6.90349 |
| 95 | Point 3 | 5.82668 | 4.38204 | 6.55370 | 5.60403 | 4.39100 | 6.69722 | 5.33088 | 4.56037 | 6.90578 |
| 96 | Point 4 | 5.44406 | 4.23150 | 6.76631 | 5.37166 | 4.30055 | 6.82654 | 4.94319 | 4.40584 | 7.12079 |
| 97 | Point 5 | 5.35054 | 1.10363 | 6.18430 | 5.33722 | 1.01369 | 6.17433 | 4.95130 | 1.10154 | 6.43794 |
| 98 | Point 6 | 5.79099 | 0.77284 | 5.83618 | 5.62511 | 0.81564 | 5.95052 | 5.42531 | 0.80078 | 6.07461 |
| 99 | Point 7 | 5.80752 | 0.82205 | 5.83575 | 5.62511 | 0.81564 | 5.95052 | 5.42747 | 0.80763 | 6.07464 |
| 100 | Point 8 | 5.95032 | 0.72592 | 5.72516 | 5.75912 | 0.72344 | 5.84633 | 5.57831 | 0.71341 | 5.95933 |
| 101 | Point 9 | 5.95867 | 4.37550 | 6.46837 | 5.71110 | 4.43267 | 6.63764 | 5.45432 | 4.60159 | 6.83568 |
| 102 | Start of scan line | 5.95828 | 3.76722 | 6.34386 | 5.72650 | 3.84809 | 6.50794 | 5.48105 | 3.93033 | 6.68100 |
| 103 | Middle of rotation | 6.00363 | 1.72998 | 5.89717 | 5.80862 | 1.62630 | 6.00000 | 5.61481 | 1.52325 | 6.10220 |
| 104 | End of scan line | 5.99623 | 1.21758 | 5.79678 | 5.80609 | 1.19815 | 5.91380 | 5.61623 | 1.19501 | 6.03397 |
| 105 | | | | | | | | | | |

FIG. 15A2

| | A | B | C | D | E | F | G | H | I | J |
|---|---|---|---|---|---|---|---|---|---|---|
| 106 | | Facet | | | Facet | | | Facet | | |
| 107 | G3 | 1 | | | 2 | | | 3 | | |
| 108 | Point 1 | 7.38483 | 0.36621 | 3.60327 | 7.31635 | 0.35437 | 3.81936 | 7.25212 | 0.36293 | 4.03445 |
| 109 | Point 2 | 7.33669 | 0.30677 | 3.72290 | 7.27018 | 0.29548 | 3.93289 | 7.20014 | 0.30320 | 4.16642 |
| 110 | Point 3 | 7.35085 | 0.45214 | 3.76848 | 7.27046 | 0.29830 | 3.93374 | 7.20860 | 0.39685 | 4.19794 |
| 111 | Point 4 | 7.19969 | 0.19089 | 4.09695 | 7.13404 | 0.12287 | 4.26827 | 7.04932 | 0.16475 | 4.57132 |
| 112 | Point 5 | 6.76168 | -2.71194 | 3.69330 | 6.69289 | -2.84072 | 3.83654 | 6.61109 | -2.72069 | 4.17939 |
| 113 | Point 6 | 6.82335 | -2.91744 | 3.36219 | 6.76969 | -2.95787 | 3.51184 | 6.69286 | -2.89597 | 3.80174 |
| 114 | Point 7 | 6.86196 | -2.76529 | 3.33225 | 6.77043 | -2.95493 | 3.51128 | 6.71818 | -2.79811 | 3.78090 |
| 115 | Point 8 | 6.89054 | -2.80469 | 3.21407 | 6.79682 | -2.99436 | 3.40022 | 6.75093 | -2.83803 | 3.64875 |
| 116 | Point 9 | 7.38483 | 0.36621 | 3.60327 | 7.31635 | 0.35437 | 3.81936 | 7.25212 | 0.36293 | 4.03445 |
| 117 | Start of scan line | 7.32381 | 0.00361 | 3.57345 | 7.25890 | 0.00056 | 3.78342 | 7.19246 | 0.00004 | 4.00001 |
| 118 | Middle of rotation | 7.32325 | 0.00000 | 3.57301 | 7.25882 | 0.00000 | 3.78335 | 7.19245 | 0.00000 | 4.00000 |
| 119 | End of scan line | 7.01771 | -2.11473 | 3.23472 | 6.92439 | -2.31840 | 3.41071 | 6.87855 | -2.14504 | 3.66987 |
| 120 | | | | | | | | | | |

FIG. 15A3A

| | K | L | M | N | O | P | Q | R | S |
|---|---|---|---|---|---|---|---|---|---|
| 106 | Facet | | | Facet | | | Facet | | |
| 107 | 4 | | | 5 | | | 6 | | |
| 108 | 7.17887 | 0.35054 | 4.26573 | 7.03508 | 0.35981 | 4.74102 | 6.87159 | 0.34512 | 5.26544 |
| 109 | 7.13030 | 0.29192 | 4.38726 | 6.97894 | 0.30016 | 4.88659 | 6.81701 | 0.28708 | 5.40695 |
| 110 | 7.13030 | 0.29192 | 4.38726 | 6.97921 | 0.30354 | 4.88784 | 6.81701 | 0.28708 | 5.40695 |
| 111 | 7.02005 | 0.15884 | 4.66313 | 6.81288 | 0.12498 | 5.31804 | 6.72143 | 0.18544 | 5.65479 |
| 112 | 6.55131 | -2.93734 | 4.23771 | 6.36745 | -2.80040 | 4.92441 | 6.22148 | -3.06048 | 5.23666 |
| 113 | 6.61699 | -3.02659 | 3.96692 | 6.47664 | -2.92071 | 4.49196 | 6.28421 | -3.12902 | 4.98858 |
| 114 | 6.61699 | -3.02659 | 3.96692 | 6.47758 | -2.91719 | 4.49112 | 6.28421 | -3.12902 | 4.98858 |
| 115 | 6.64613 | -3.06618 | 3.84679 | 6.51493 | -2.95743 | 4.34377 | 6.32024 | -3.16838 | 4.84610 |
| 116 | 7.17887 | 0.35054 | 4.26573 | 7.03508 | 0.35981 | 4.74102 | 6.87159 | 0.34512 | 5.26544 |
| 117 | 7.12389 | -0.00002 | 4.22381 | 6.97902 | 0.00007 | 4.69680 | 6.82144 | 0.00006 | 5.21121 |
| 118 | 7.12389 | 0.00000 | 4.22382 | 6.97901 | 0.00000 | 4.69679 | 6.82143 | 0.00000 | 5.21120 |
| 119 | 6.77390 | -2.39464 | 3.85384 | 6.64346 | -2.26763 | 4.35990 | 6.44831 | -2.50435 | 4.84743 |
| 120 | | | | | | | | | |

FIG. 15A3B

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 4.09124 | -2.79379 | 3.18258 | 3.69818 | -2.92223 | 3.24153 | 3.24420 | -3.02504 | 3.23954 |
| 79 | Point 2 | 4.01214 | -2.84817 | 3.23834 | 3.63983 | -2.96298 | 3.28365 | 3.16721 | -3.07489 | 3.28909 |
| 80 | Point 3 | 3.98793 | -2.83938 | 3.21628 | 3.63983 | -2.96298 | 3.28365 | 3.16395 | -3.07385 | 3.28633 |
| 81 | Point 4 | 3.75453 | -3.01427 | 3.40306 | 3.51489 | -3.05022 | 3.37382 | 2.92561 | -3.22999 | 3.44252 |
| 82 | Point 5 | 5.22942 | -4.63324 | 6.41511 | 5.13129 | -4.70247 | 6.48702 | 4.61719 | -4.94977 | 6.68618 |
| 83 | Point 6 | 5.73352 | -4.52709 | 6.42964 | 5.43660 | -4.63666 | 6.49349 | 5.13524 | -4.83496 | 6.69231 |
| 84 | Point 7 | 5.72839 | -4.50585 | 6.39515 | 5.43660 | -4.63666 | 6.49349 | 5.13464 | -4.83220 | 6.68785 |
| 85 | Point 8 | 5.89808 | -4.46565 | 6.39317 | 5.58735 | -4.60417 | 6.49668 | 5.31142 | -4.79243 | 6.68904 |
| 86 | Point 9 | 4.09124 | -2.79379 | 3.18258 | 3.69818 | -2.92223 | 3.24153 | 3.24420 | -3.02504 | 3.23954 |
| 87 | Start of scan line | 4.26503 | -2.91167 | 3.42532 | 3.84166 | -3.00957 | 3.42658 | 3.41287 | -3.12422 | 3.45169 |
| 88 | Middle of rotation | 4.65630 | -3.25182 | 4.08689 | 4.20000 | -3.30000 | 4.00000 | 3.71220 | -3.35150 | 3.90711 |
| 89 | End of scan line | 5.66800 | -4.26040 | 5.99609 | 5.37598 | -4.41413 | 6.12962 | 5.05851 | -4.57920 | 6.27163 |
| 90 | | | | | | | | | | |

FIG. 15B1

| | A | B | C | D | E | F | G | H | I | J |
|---|---|---|---|---|---|---|---|---|---|---|
| 90 | | | | | | | | | | |
| 91 | | Facet | | | Facet | . | | Facet | | |
| 92 | G2 | 7 | | | 9 | | | 11 | | |
| 93 | Point 1 | 5.89808 | 4.46565 | 6.39317 | 5.58735 | 4.60417 | 6.49668 | 5.31142 | 4.79243 | 6.68904 |
| 94 | Point 2 | 5.72839 | 4.50585 | 6.39515 | 5.43660 | 4.63666 | 6.49349 | 5.13464 | 4.83220 | 6.68785 |
| 95 | Point 3 | 5.73352 | 4.52709 | 6.42964 | 5.43660 | 4.63666 | 6.49349 | 5.13524 | 4.83496 | 6.69231 |
| 96 | Point 4 | 5.22942 | 4.63324 | 6.41511 | 5.13129 | 4.70247 | 6.48702 | 4.61719 | 4.94977 | 6.68618 |
| 97 | Point 5 | 3.75453 | 3.01427 | 3.40306 | 3.51489 | 3.05022 | 3.37382 | 2.92561 | 3.22999 | 3.44252 |
| 98 | Point 6 | 3.98793 | 2.83938 | 3.21628 | 3.63983 | 2.96298 | 3.28365 | 3.16395 | 3.07385 | 3.28633 |
| 99 | Point 7 | 4.01214 | 2.84817 | 3.23834 | 3.63983 | 2.96298 | 3.28365 | 3.16721 | 3.07489 | 3.28909 |
| 100 | Point 8 | 4.09124 | 2.79379 | 3.18258 | 3.69818 | 2.92223 | 3.24153 | 3.24420 | 3.02504 | 3.23954 |
| 101 | Point 9 | 5.89808 | 4.46565 | 6.39317 | 5.58735 | 4.60417 | 6.49668 | 5.31142 | 4.79243 | 6.68904 |
| 102 | Start of scan line | 5.66800 | 4.26040 | 5.99609 | 5.37598 | 4.41413 | 6.12962 | 5.05851 | 4.57920 | 6.27163 |
| 103 | Middle of rotation | 4.65630 | 3.25182 | 4.08689 | 4.20000 | 3.30000 | 4.00000 | 3.71220 | 3.35150 | 3.90711 |
| 104 | End of scan line | 4.26503 | 2.91167 | 3.42532 | 3.84166 | 3.00957 | 3.42658 | 3.41287 | 3.12422 | 3.45169 |
| 105 | | | | | | | | | | |

FIG. 15B2

| | A | B | C | D | E | F | G | H | I | J |
|---|---|---|---|---|---|---|---|---|---|---|
| 106 | | Facet | | | Facet | | | Facet | | |
| 107 | G3 | 1 | | | 2 | | | 3 | | |
| 108 | Point 1 | 7.38483 | 0.36621 | 3.60327 | 7.31635 | 0.35437 | 3.81936 | 7.25212 | 0.36293 | 4.03445 |
| 109 | Point 2 | 7.33669 | 0.30677 | 3.72290 | 7.27018 | 0.29548 | 3.93289 | 7.20014 | 0.30320 | 4.16642 |
| 110 | Point 3 | 7.35085 | 0.45214 | 3.76848 | 7.27046 | 0.29830 | 3.93374 | 7.20860 | 0.39685 | 4.19794 |
| 111 | Point 4 | 7.19969 | 0.19089 | 4.09695 | 7.13404 | 0.12287 | 4.26827 | 7.04932 | 0.16475 | 4.57132 |
| 112 | Point 5 | 6.76168 | -2.71194 | 3.69330 | 6.69289 | -2.84072 | 3.83654 | 6.61109 | -2.72069 | 4.17939 |
| 113 | Point 6 | 6.82335 | -2.91744 | 3.36219 | 6.76969 | -2.95787 | 3.51184 | 6.69286 | -2.89597 | 3.80174 |
| 114 | Point 7 | 6.86196 | -2.76529 | 3.33225 | 6.77043 | -2.95493 | 3.51128 | 6.71818 | -2.79811 | 3.78090 |
| 115 | Point 8 | 6.89054 | -2.80469 | 3.21407 | 6.79682 | -2.99436 | 3.40022 | 6.75093 | -2.83803 | 3.64875 |
| 116 | Point 9 | 7.38483 | 0.36621 | 3.60327 | 7.31635 | 0.35437 | 3.81936 | 7.25212 | 0.36293 | 4.03445 |
| 117 | Start of scan line | 7.32381 | 0.00361 | 3.57345 | 7.25890 | 0.00056 | 3.78342 | 7.19246 | 0.00004 | 4.00001 |
| 118 | Middle of rotation | 7.32325 | 0.00000 | 3.57301 | 7.25882 | 0.00000 | 3.78335 | 7.19245 | 0.00000 | 4.00000 |
| 119 | End of scan line | 7.01771 | -2.11473 | 3.23472 | 6.92439 | -2.31840 | 3.41071 | 6.87855 | -2.14504 | 3.66987 |
| 120 | | | | | | | | | | |

FIG. 15B3A

| | K | L | M | N | O | P | Q | R | S |
|---|---|---|---|---|---|---|---|---|---|
| 106 | Facet | | | Facet | | | Facet | | |
| 107 | 4 | | | 5 | | | 6 | | |
| 108 | 7.17887 | 0.35054 | 4.26573 | 7.03508 | 0.35981 | 4.74102 | 6.87159 | 0.34512 | 5.26544 |
| 109 | 7.13030 | 0.29192 | 4.38726 | 6.97894 | 0.30016 | 4.88659 | 6.81701 | 0.28708 | 5.40695 |
| 110 | 7.13030 | 0.29192 | 4.38726 | 6.97921 | 0.30354 | 4.88784 | 6.81701 | 0.28708 | 5.40695 |
| 111 | 7.02005 | 0.15884 | 4.66313 | 6.81288 | 0.12498 | 5.31804 | 6.72143 | 0.18544 | 5.65479 |
| 112 | 6.55131 | -2.93734 | 4.23771 | 6.36745 | -2.80040 | 4.92441 | 6.22148 | -3.06048 | 5.23666 |
| 113 | 6.61699 | -3.02659 | 3.96692 | 6.47664 | -2.92071 | 4.49196 | 6.28421 | -3.12902 | 4.98858 |
| 114 | 6.61699 | -3.02659 | 3.96692 | 6.47758 | -2.91719 | 4.49112 | 6.28421 | -3.12902 | 4.98858 |
| 115 | 6.64613 | -3.06618 | 3.84679 | 6.51493 | -2.95743 | 4.34377 | 6.32024 | -3.16838 | 4.84610 |
| 116 | 7.17887 | 0.35054 | 4.26573 | 7.03508 | 0.35981 | 4.74102 | 6.87159 | 0.34512 | 5.26544 |
| 117 | 7.12389 | -0.00002 | 4.22381 | 6.97902 | 0.00007 | 4.69680 | 6.82144 | 0.00006 | 5.21121 |
| 118 | 7.12389 | 0.00000 | 4.22382 | 6.97901 | 0.00000 | 4.69679 | 6.82143 | 0.00000 | 5.21120 |
| 119 | 6.77390 | -2.39464 | 3.85384 | 6.64346 | -2.26763 | 4.35990 | 6.44831 | -2.50435 | 4.84743 |
| 120 | | | | | | | | | |

FIG. 15B3B

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 4.09124 | -2.79379 | 3.18258 | 3.69818 | -2.92223 | 3.24153 | 3.24420 | -3.02504 | 3.23954 |
| 79 | Point 2 | 4.01214 | -2.84817 | 3.23834 | 3.63983 | -2.96298 | 3.28365 | 3.16721 | -3.07489 | 3.28909 |
| 80 | Point 3 | 3.98793 | -2.83938 | 3.21628 | 3.63983 | -2.96298 | 3.28365 | 3.16395 | -3.07385 | 3.28633 |
| 81 | Point 4 | 3.75453 | -3.01427 | 3.40306 | 3.51489 | -3.05022 | 3.37382 | 2.92561 | -3.22999 | 3.44252 |
| 82 | Point 5 | 5.22942 | -4.63324 | 6.41511 | 5.13129 | -4.70247 | 6.48702 | 4.61719 | -4.94977 | 6.68618 |
| 83 | Point 6 | 5.73352 | -4.52709 | 6.42964 | 5.43660 | -4.63666 | 6.49349 | 5.13524 | -4.83496 | 6.69231 |
| 84 | Point 7 | 5.72839 | -4.50585 | 6.39515 | 5.43660 | -4.63666 | 6.49349 | 5.13464 | -4.83220 | 6.68785 |
| 85 | Point 8 | 5.89808 | -4.46565 | 6.39317 | 5.58735 | -4.60417 | 6.49668 | 5.31142 | -4.79243 | 6.68904 |
| 86 | Point 9 | 4.09124 | -2.79379 | 3.18258 | 3.69818 | -2.92223 | 3.24153 | 3.24420 | -3.02504 | 3.23954 |
| 87 | Start of scan line | 4.26503 | -2.91167 | 3.42532 | 3.84166 | -3.00957 | 3.42658 | 3.41287 | -3.12422 | 3.45169 |
| 88 | Middle of rotation | 4.65630 | -3.25182 | 4.08689 | 4.20000 | -3.30000 | 4.00000 | 3.71220 | -3.35150 | 3.90711 |
| 89 | End of scan line | 5.66800 | -4.26040 | 5.99609 | 5.37598 | -4.41413 | 6.12962 | 5.05851 | -4.57920 | 6.27163 |
| 90 | | | | | | | | | | |

FIG. 15C1

| | A | B | C | D | E | F | G | H | I | J |
|---|---|---|---|---|---|---|---|---|---|---|
| 91 | | Facet | | | Facet | | | Facet | | |
| 92 | G2 | 7 | | | 9 | | | 11 | | |
| 93 | Point 1 | 5.89808 | 4.46565 | 6.39317 | 5.58735 | 4.60417 | 6.49668 | 5.31142 | 4.79243 | 6.68904 |
| 94 | Point 2 | 5.72839 | 4.50585 | 6.39515 | 5.43660 | 4.63666 | 6.49349 | 5.13464 | 4.83220 | 6.68785 |
| 95 | Point 3 | 5.73352 | 4.52709 | 6.42964 | 5.43660 | 4.63666 | 6.49349 | 5.13524 | 4.83496 | 6.69231 |
| 96 | Point 4 | 5.22942 | 4.63324 | 6.41511 | 5.13129 | 4.70247 | 6.48702 | 4.61719 | 4.94977 | 6.68618 |
| 97 | Point 5 | 3.75453 | 3.01427 | 3.40306 | 3.51489 | 3.05022 | 3.37382 | 2.92561 | 3.22999 | 3.44252 |
| 98 | Point 6 | 3.98793 | 2.83938 | 3.21628 | 3.63983 | 2.96298 | 3.28365 | 3.16395 | 3.07385 | 3.28633 |
| 99 | Point 7 | 4.01214 | 2.84817 | 3.23834 | 3.63983 | 2.96298 | 3.28365 | 3.16721 | 3.07489 | 3.28909 |
| 100 | Point 8 | 4.09124 | 2.79379 | 3.18258 | 3.69818 | 2.92223 | 3.24153 | 3.24420 | 3.02504 | 3.23954 |
| 101 | Point 9 | 5.89808 | 4.46565 | 6.39317 | 5.58735 | 4.60417 | 6.49668 | 5.31142 | 4.79243 | 6.68904 |
| 102 | Start of scan line | 5.66800 | 4.26040 | 5.99609 | 5.37598 | 4.41413 | 6.12962 | 5.05851 | 4.57920 | 6.27163 |
| 103 | Middle of rotation | 4.65630 | 3.25182 | 4.08689 | 4.20000 | 3.30000 | 4.00000 | 3.71220 | 3.35150 | 3.90711 |
| 104 | End of scan line | 4.26503 | 2.91167 | 3.42532 | 3.84166 | 3.00957 | 3.42658 | 3.41287 | 3.12422 | 3.45169 |
| 105 | | | | | | | | | | |

FIG. 15C2

| | A | B | C | D | E | F | G | H | I | J |
|---|---|---|---|---|---|---|---|---|---|---|
| 106 | | Facet | | | Facet | | | Facet | | |
| 107 | G3 | 1 | | | 2 | | | 3 | | |
| 108 | Point 1 | 7.38483 | 0.36621 | 3.60327 | 7.31635 | 0.35437 | 3.81936 | 7.25212 | 0.36293 | 4.03445 |
| 109 | Point 2 | 7.33669 | 0.30677 | 3.72290 | 7.27018 | 0.29548 | 3.93289 | 7.20014 | 0.30320 | 4.16642 |
| 110 | Point 3 | 7.35085 | 0.45214 | 3.76848 | 7.27046 | 0.29830 | 3.93374 | 7.20860 | 0.39685 | 4.19794 |
| 111 | Point 4 | 7.19969 | 0.19089 | 4.09695 | 7.13404 | 0.12287 | 4.26827 | 7.04932 | 0.16475 | 4.57132 |
| 112 | Point 5 | 6.76168 | -2.71194 | 3.69330 | 6.69289 | -2.84072 | 3.83654 | 6.61109 | -2.72069 | 4.17939 |
| 113 | Point 6 | 6.82335 | -2.91744 | 3.36219 | 6.76969 | -2.95787 | 3.51184 | 6.69286 | -2.89597 | 3.80174 |
| 114 | Point 7 | 6.86196 | -2.76529 | 3.33225 | 6.77043 | -2.95493 | 3.51128 | 6.71818 | -2.79811 | 3.78090 |
| 115 | Point 8 | 6.89054 | -2.80469 | 3.21407 | 6.79682 | -2.99436 | 3.40022 | 6.75093 | -2.83803 | 3.64875 |
| 116 | Point 9 | 7.38483 | 0.36621 | 3.60327 | 7.31635 | 0.35437 | 3.81936 | 7.25212 | 0.36293 | 4.03445 |
| 117 | Start of scan line | 7.32381 | 0.00361 | 3.57345 | 7.25890 | 0.00056 | 3.78342 | 7.19246 | 0.00004 | 4.00001 |
| 118 | Middle of rotation | 7.32325 | 0.00000 | 3.57301 | 7.25882 | 0.00000 | 3.78335 | 7.19245 | 0.00000 | 4.00000 |
| 119 | End of scan line | 7.01771 | -2.11473 | 3.23472 | 6.92439 | -2.31840 | 3.41071 | 6.87855 | -2.14504 | 3.66987 |
| 120 | | | | | | | | | | |

FIG. 15C3A

| | K | L | M | N | O | P | Q | R | S |
|---|---|---|---|---|---|---|---|---|---|
| 106 | Facet | | | Facet | | | Facet | | |
| 107 | 4 | | | 5 | | | 6 | | |
| 108 | 7.17887 | 0.35054 | 4.26573 | 7.03508 | 0.35981 | 4.74102 | 6.87159 | 0.34512 | 5.26544 |
| 109 | 7.13030 | 0.29192 | 4.38726 | 6.97894 | 0.30016 | 4.88659 | 6.81701 | 0.28708 | 5.40695 |
| 110 | 7.13030 | 0.29192 | 4.38726 | 6.97921 | 0.30354 | 4.88784 | 6.81701 | 0.28708 | 5.40695 |
| 111 | 7.02005 | 0.15884 | 4.66313 | 6.81288 | 0.12498 | 5.31804 | 6.72143 | 0.18544 | 5.65479 |
| 112 | 6.55131 | -2.93734 | 4.23771 | 6.36745 | -2.80040 | 4.92441 | 6.22148 | -3.06048 | 5.23666 |
| 113 | 6.61699 | -3.02659 | 3.96692 | 6.47664 | -2.92071 | 4.49196 | 6.28421 | -3.12902 | 4.98858 |
| 114 | 6.61699 | -3.02659 | 3.96692 | 6.47758 | -2.91719 | 4.49112 | 6.28421 | -3.12902 | 4.98858 |
| 115 | 6.64613 | -3.06618 | 3.84679 | 6.51493 | -2.95743 | 4.34377 | 6.32024 | -3.16838 | 4.84610 |
| 116 | 7.17887 | 0.35054 | 4.26573 | 7.03508 | 0.35981 | 4.74102 | 6.87159 | 0.34512 | 5.26544 |
| 117 | 7.12389 | -0.00002 | 4.22381 | 6.97902 | 0.00007 | 4.69680 | 6.82144 | 0.00006 | 5.21121 |
| 118 | 7.12389 | 0.00000 | 4.22382 | 6.97901 | 0.00000 | 4.69679 | 6.82143 | 0.00000 | 5.21120 |
| 119 | 6.77390 | -2.39464 | 3.85384 | 6.64346 | -2.26763 | 4.35990 | 6.44831 | -2.50435 | 4.84743 |
| 120 | | | | | | | | | |

FIG. 15C3B

| | A | B | C | D | E | F | G | H | I | J |
|---|---|---|---|---|---|---|---|---|---|---|
| 75 | | 1 | | | 2 | | | 3 | | |
| 76 | | Facet | | | Facet | | | Facet | | |
| 77 | G1 | 8 | | | 10 | | | 12 | | |
| 78 | Point 1 | 4.09124 | -2.79379 | 3.18258 | 3.69818 | -2.92223 | 3.24153 | 3.24420 | -3.02504 | 3.23954 |
| 79 | Point 2 | 4.01214 | -2.84817 | 3.23834 | 3.63983 | -2.96298 | 3.28365 | 3.16721 | -3.07489 | 3.28909 |
| 80 | Point 3 | 3.98793 | -2.83938 | 3.21628 | 3.63983 | -2.96298 | 3.28365 | 3.16395 | -3.07385 | 3.28633 |
| 81 | Point 4 | 3.75453 | -3.01427 | 3.40306 | 3.51489 | -3.05022 | 3.37382 | 2.92561 | -3.22999 | 3.44252 |
| 82 | Point 5 | 5.22942 | -4.63324 | 6.41511 | 5.13129 | -4.70247 | 6.48702 | 4.61719 | -4.94977 | 6.68618 |
| 83 | Point 6 | 5.73352 | -4.52709 | 6.42964 | 5.43660 | -4.63666 | 6.49349 | 5.13524 | -4.83496 | 6.69231 |
| 84 | Point 7 | 5.72839 | -4.50585 | 6.39515 | 5.43660 | -4.63666 | 6.49349 | 5.13464 | -4.83220 | 6.68785 |
| 85 | Point 8 | 5.89808 | -4.46565 | 6.39317 | 5.58735 | -4.60417 | 6.49668 | 5.31142 | -4.79243 | 6.68904 |
| 86 | Point 9 | 4.09124 | -2.79379 | 3.18258 | 3.69818 | -2.92223 | 3.24153 | 3.24420 | -3.02504 | 3.23954 |
| 87 | Start of scan line | 4.26503 | -2.91167 | 3.42532 | 3.84166 | -3.00957 | 3.42658 | 3.41287 | -3.12422 | 3.45169 |
| 88 | Middle of rotation | 4.65630 | -3.25182 | 4.08689 | 4.20000 | -3.30000 | 4.00000 | 3.71220 | -3.35150 | 3.90711 |
| 89 | End of scan line | 5.66800 | -4.26040 | 5.99609 | 5.37598 | -4.41413 | 6.12962 | 5.05851 | -4.57920 | 6.27163 |
| 90 | | | | | | | | | | |

FIG. 15D1

| | A | B | C | D | E | F | G | H | I | J |
|---|---|---|---|---|---|---|---|---|---|---|
| 91 | | Facet | | | Facet | | | Facet | | |
| 92 | G2 | 7 | | | 9 | | | 11 | | |
| 93 | Point 1 | 5.89808 | 4.46565 | 6.39317 | 5.58735 | 4.60417 | 6.49668 | 5.31142 | 4.79243 | 6.68904 |
| 94 | Point 2 | 5.72839 | 4.50585 | 6.39515 | 5.43660 | 4.63666 | 6.49349 | 5.13464 | 4.83220 | 6.68785 |
| 95 | Point 3 | 5.73352 | 4.52709 | 6.42964 | 5.43660 | 4.63666 | 6.49349 | 5.13524 | 4.83496 | 6.69231 |
| 96 | Point 4 | 5.22942 | 4.63324 | 6.41511 | 5.13129 | 4.70247 | 6.48702 | 4.61719 | 4.94977 | 6.68618 |
| 97 | Point 5 | 3.75453 | 3.01427 | 3.40306 | 3.51489 | 3.05022 | 3.37382 | 2.92561 | 3.22999 | 3.44252 |
| 98 | Point 6 | 3.98793 | 2.83938 | 3.21628 | 3.63983 | 2.96298 | 3.28365 | 3.16395 | 3.07385 | 3.28633 |
| 99 | Point 7 | 4.01214 | 2.84817 | 3.23834 | 3.63983 | 2.96298 | 3.28365 | 3.16721 | 3.07489 | 3.28909 |
| 100 | Point 8 | 4.09124 | 2.79379 | 3.18258 | 3.69818 | 2.92223 | 3.24153 | 3.24420 | 3.02504 | 3.23954 |
| 101 | Point 9 | 5.89808 | 4.46565 | 6.39317 | 5.58735 | 4.60417 | 6.49668 | 5.31142 | 4.79243 | 6.68904 |
| 102 | Start of scan line | 5.66800 | 4.26040 | 5.99609 | 5.37598 | 4.41413 | 6.12962 | 5.05851 | 4.57920 | 6.27163 |
| 103 | Middle of rotation | 4.65630 | 3.25182 | 4.08689 | 4.20000 | 3.30000 | 4.00000 | 3.71220 | 3.35150 | 3.90711 |
| 104 | End of scan line | 4.26503 | 2.91167 | 3.42532 | 3.84166 | 3.00957 | 3.42658 | 3.41287 | 3.12422 | 3.45169 |
| 105 | | | | | | | | | | |

FIG. 15D2

| | A | B | C | D | E | F | G | H | I | J |
|---|---|---|---|---|---|---|---|---|---|---|
| 106 | | Facet | | | Facet | | | Facet | | |
| 107 | G3 | 1 | | | 2 | | | 3 | | |
| 108 | Point 1 | 7.38483 | 0.36621 | 3.60327 | 7.31635 | 0.35437 | 3.81936 | 7.25212 | 0.36293 | 4.03445 |
| 109 | Point 2 | 7.33669 | 0.30677 | 3.72290 | 7.27018 | 0.29548 | 3.93289 | 7.20014 | 0.30320 | 4.16642 |
| 110 | Point 3 | 7.35085 | 0.45214 | 3.76848 | 7.27046 | 0.29830 | 3.93374 | 7.20860 | 0.39685 | 4.19794 |
| 111 | Point 4 | 7.19969 | 0.19089 | 4.09695 | 7.13404 | 0.12287 | 4.26827 | 7.04932 | 0.16475 | 4.57132 |
| 112 | Point 5 | 6.76168 | -2.71194 | 3.69330 | 6.69289 | -2.84072 | 3.83654 | 6.61109 | -2.72069 | 4.17939 |
| 113 | Point 6 | 6.82335 | -2.91744 | 3.36219 | 6.76969 | -2.95787 | 3.51184 | 6.69286 | -2.89597 | 3.80174 |
| 114 | Point 7 | 6.86196 | -2.76529 | 3.33225 | 6.77043 | -2.95493 | 3.51128 | 6.71818 | -2.79811 | 3.78090 |
| 115 | Point 8 | 6.89054 | -2.80469 | 3.21407 | 6.79682 | -2.99436 | 3.40022 | 6.75093 | -2.83803 | 3.64875 |
| 116 | Point 9 | 7.38483 | 0.36621 | 3.60327 | 7.31635 | 0.35437 | 3.81936 | 7.25212 | 0.36293 | 4.03445 |
| 117 | Start of scan line | 7.32381 | 0.00361 | 3.57345 | 7.25890 | 0.00056 | 3.78342 | 7.19246 | 0.00004 | 4.00001 |
| 118 | Middle of rotation | 7.32325 | 0.00000 | 3.57301 | 7.25882 | 0.00000 | 3.78335 | 7.19245 | 0.00000 | 4.00000 |
| 119 | End of scan line | 7.01771 | -2.11473 | 3.23472 | 6.92439 | -2.31840 | 3.41071 | 6.87855 | -2.14504 | 3.66987 |

FIG. 15D3A

| | K | L | M | N | O | P | Q | R | S |
|---|---|---|---|---|---|---|---|---|---|
| 106 | Facet | | | Facet | | | Facet | | |
| 107 | 4 | | | 5 | | | 6 | | |
| 108 | 7.17887 | 0.35054 | 4.26573 | 7.03508 | 0.35981 | 4.74102 | 6.87159 | 0.34512 | 5.26544 |
| 109 | 7.13030 | 0.29192 | 4.38726 | 6.97894 | 0.30016 | 4.88659 | 6.81701 | 0.28708 | 5.40695 |
| 110 | 7.13030 | 0.29192 | 4.38726 | 6.97921 | 0.30354 | 4.88784 | 6.81701 | 0.28708 | 5.40695 |
| 111 | 7.02005 | 0.15884 | 4.66313 | 6.81288 | 0.12498 | 5.31804 | 6.72143 | 0.18544 | 5.65479 |
| 112 | 6.55131 | -2.93734 | 4.23771 | 6.36745 | -2.80040 | 4.92441 | 6.22148 | -3.06048 | 5.23666 |
| 113 | 6.61699 | -3.02659 | 3.96692 | 6.47664 | -2.92071 | 4.49196 | 6.28421 | -3.12902 | 4.98858 |
| 114 | 6.61699 | -3.02659 | 3.96692 | 6.47758 | -2.91719 | 4.49112 | 6.28421 | -3.12902 | 4.98858 |
| 115 | 6.64613 | -3.06618 | 3.84679 | 6.51493 | -2.95743 | 4.34377 | 6.32024 | -3.16838 | 4.84610 |
| 116 | 7.17887 | 0.35054 | 4.26573 | 7.03508 | 0.35981 | 4.74102 | 6.87159 | 0.34512 | 5.26544 |
| 117 | 7.12389 | -0.00002 | 4.22381 | 6.97902 | 0.00007 | 4.69680 | 6.82144 | 0.00006 | 5.21121 |
| 118 | 7.12389 | 0.00000 | 4.22382 | 6.97901 | 0.00000 | 4.69679 | 6.82143 | 0.00000 | 5.21120 |
| 119 | 6.77390 | -2.39464 | 3.85384 | 6.64346 | -2.26763 | 4.35990 | 6.44831 | -2.50435 | 4.84743 |

FIG. 15D3B

COMPACT BIOPTICAL LASER SCANNING SYSTEM

RELATED CASES

This is a Continuation-in-Part of U.S. application Ser. No. 09/551,887 filed Apr. 18, 2000; copending application Ser. No. 08/949,915 filed Oct. 14, 1997 now U.S. Pat. No. 6,158,659; copending application Ser. No. 08/726,522 filed Oct. 7, 1996 now U.S. Pat. No. 6,073,846; which is a Continuation of application Ser. No. 08/573,949 filed Dec. 18, 1995, now abandoned; which is a Continuation-in-Part of application Ser. Nos. 08/615,054 filed Mar. 12, 1996 now U.S. Pat. No. 6,286,760; U.S. Pat. No. 08/476,069 filed Jun. 7, 1995, now U.S. Pat. No. 5,591,953; Ser. No. 08/561,479 filed Nov. 20, 1995, now U.S. Pat. No. 5,661,292; which is a Continuation of Ser. No. 08/293,695 filed Aug. 19, 1994, now U.S. Pat. No. 5,468,951; Ser. No. 08/293,493 filed Aug. 19, 1994, now U.S. Pat. Nos. 5,525,789; Ser. No. 08/475,376 filed Jun. 7, 1995, now U.S. Pat. No. 5,637,852; Ser. No. 08/439,224 filed May 11, 1995, now U.S. Pat. No. 5,627,359; and Ser. No. 08/292,237 filed Aug. 17, 1994 now U.S. Pat. No. 5,868,285, each commonly owned by Assignee, Metrologic Instruments, Inc., of Blackwood, N.J., and is incorporated herein by reference as if fully set forth herein.

BACKGROUND OF THE INVENTION

1. Field of Invention

The present invention relates generally to holographic laser scanners of ultra-compact design capable of reading bar code symbols in point-of-sale (POS) and other demanding scanning environments.

2. Brief Description of the Prior Art

The use of bar code symbols for product and article identification is well known in the art.

Presently, various types of bar code symbol scanners have been developed. In general, these bar code symbol readers can be classified into two distinct classes.

The first class of bar code symbol reader simultaneously illuminates all of the bars and spaces of a bar code symbol with light of a specific wavelength(s) in order to capture an image thereof for recognition and decoding purposes. Such scanners are commonly known as CCD scanners because they use CCD image detectors to detect images of the bar code symbols being read.

The second class of bar code symbol reader uses a focused light beam, typically a focused laser beam, to sequentially scan the bars and spaces of a bar code symbol to be read. This type of bar code symbol scanner is commonly called a "flying spot" scanner as the focused laser beam appears as "a spot of light that flies" across the bar code symbol being read. In general, laser bar code symbol scanners are subclassified further by the type of mechanism used to focus and scan the laser beam across bar code symbols.

Polygon-based laser scanning systems employ lenses and moving (i.e. rotating or oscillating) polygon mirrors and/or other optical elements in order to focus and scan laser beams across bar code symbols during code symbol reading operations. Examples of such polygon-based laser scanning systems is described in U.S. Pat. Nos. 4,006,343; 4,093,865; 4,960,985; 5,073,702; 5,229,588; and JP-54-33740, each incorporated herein by reference in its entirety.

Holographic-based laser scanning systems employ lenses and moving (i.e. rotating) holographic elements and/or other optical elements in order to focus and scan laser beams across bar code symbols during code symbol reading operations. Examples of such holographic-based laser scanning systems is described in U.S. Pat. Nos. 4,415,224; 4,758,058; 4,748,316; 4,591,242; 4,548,463; 4,652,732; 4,794,237; 4,647,143; 5,331,445; 5,416,505; 5,475,207; 5,705,802; 5,837,988; and JP64-48017, each incorporated herein by reference in its entirety.

In demanding retail scanning environments, it is common to employ polygon-based laser scanning systems that have both bottom and side scanning windows to enable highly aggressive scanner performance, whereby the cashier need only drag a bar coded product past these scanning windows for the bar code thereon to be automatically read with minimal assistance of the cashier or checkout personal. Such dual scanning window systems are typically referred to as "bioptical" laser scanning systems as such systems employ two sets of optics disposed behind the bottom and side scanning windows thereof. Examples of polygon-based bioptical laser scanning systems are disclosed in U.S. Pat. Nos. 5,206,491; 5,229,588; 5,684,289; 5,705,802; 5,801,370; and 5,886,336, each incorporated herein by reference in its entirety.

In general, prior art bioptical laser scanning systems are generally more aggressive that conventional single scanning window systems. For this reason, bioptical scanning system are often deployed in demanding retail environments, such as supermarkets and high-volume department stores, where high check-out throughput is critical to achieving store profitability and customer satisfaction.

While prior art bioptical scanning systems represent a technological advance over most single scanning window system, prior art bioptical scanning systems in general suffered from various shortcomings and drawbacks.

In particular, by virtue of the dual scanning windows and supporting optics required by prior art bioptical laser scanning systems, such scanning systems have been physically larger than many retail environments would otherwise desire, as space near the point-of-sale is the most valuable space within the retail environment. Also, the laser scanning patterns of prior art bioptical laser scanning systems are not optimized in terms of scanning coverage and performance, and are generally expensive to manufacture by virtue of the large number of optical components presently required to constructed such laser scanning systems.

Thus, there is a great need in the art for an improved bioptical-type laser scanning bar code symbol reading system, while avoiding the shortcomings and drawbacks of prior art laser scanning systems and methodologies.

OBJECTS AND SUMMARY OF THE PRESENT INVENTION

Accordingly, a primary object of the present invention is to provide a novel bioptical-type holographic laser scanning system which is free of the shortcomings and drawbacks of prior art bioptical laser scanning systems and methodologies.

Another object of the present invention is to provide a bioptical holographic laser scanning system, wherein a plurality of pairs of quasi-orthogonal laser scanning planes are projected within predetermined regions of space contained within a 3-D scanning volume defined between the bottom and side scanning windows of the system.

Another object of the present invention is to provide a novel bioptical holographic laser scanning system, wherein the plurality of pairs of quasi-orthogonal laser scanning planes are produced using a holographic scanning disc having holographic scanning facets that have high and low elevation angle characteristics as well as left, right and zero skew angle characteristics.

Another object of the present invention is to provide a bioptical holographic laser scanning system, wherein the each pair of quasi-orthogonal laser scanning planes comprises a plurality of substantially-vertical laser scanning planes for reading bar code symbols having bar code elements (i.e. ladder-type bar code symbols) that are oriented substantially horizontal with respect to the bottom scanning window, and a plurality of substantially-horizontal laser scanning planes for reading bar code symbols having bar code elements (i.e. picket-fence type bar code symbols) that are oriented substantially vertical with respect to the bottom scanning window.

Another object of the present invention is to provide a bioptical holographic laser scanning system comprising a plurality of laser scanning stations, each of which produces a plurality of pairs of quasi-orthogonal laser scanning planes are projected within predetermined regions of space contained within a 3-D scanning volume defined between the bottom and side scanning windows of the system.

Another object of the present invention is to provide a bioptical holographic laser scanning system, wherein the plurality of pairs of quasi-orthogonal laser scanning planes are produced using a holographic scanning disc supporting holographic scanning facets having high and low elevation angle characteristics and left, right and zero skew angle characteristics.

Another object of the present invention is to provide a bioptical holographic laser scanning system, wherein each laser scanning station produces a plurality of pairs of quasi-orthogonal laser scanning planes which can read bar code symbol that is orientated with bar code elements arranged in either a substantially vertical (i.e. picket-fence) or substantially horizontal (i.e. ladder) configuration with respect to the horizontal scanning window of the system.

Another object of the present invention is to provide such a bioptical holographic laser scanning system employing four laser scanning systems, wherein the first and third laser scanning stations employ mirror groups and scanning facets having only high elevation characteristics and left and right skew angle characteristics so as to produce from each station a plurality of pairs of quasi-orthogonal laser scanning planes capable of reading bar code symbol orientated with bar code elements arranged in either a substantially vertical (i.e. picket-fence) or substantially horizontal (i.e. ladder) configuration with respect to the horizontal scanning window of the system.

Another object of the present invention is to provide such a bioptical holographic laser scanning system, wherein the second laser scanning station employs mirror groups and scanning facets having only low elevation characteristics and zero skew angle characteristics so as to produce from each station a plurality of pairs of quasi-orthogonal laser scanning planes capable of reading bar code symbol orientated with bar code elements arranged in either a substantially vertical (i.e. picket-fence) or substantially horizontal (i.e. ladder) configuration with respect to the horizontal scanning window of the system.

Another object of the present invention is to provide such a bioptical holographic laser scanning system, wherein the fourth laser scanning station employs mirror groups and scanning facets having only high elevation characteristics and zero skew angle characteristics so as to produce from each station a plurality of laser scanning planes capable of reading bar code symbol orientated with bar code elements arranged in either a substantially vertical (i.e. picket-fence) configuration with respect to the horizontal scanning window of the system.

Another object of the present invention is to provide a bioptical holographic laser scanning system, wherein the plurality of pairs of quasi-orthogonal laser scanning planes are produced using S-polarized laser beams directed incident the holographic scanning disc.

Another object of the present invention is to provide a bioptical holographic laser scanning system, wherein four symmetrically placed visible laser diodes (VLDs) are used to create the plurality of pairs of quasi-orthogonal laser scanning planes.

Another object of the present invention is to provide a bioptical holographic laser scanning system, wherein a single VLD is used to create the vertical window scan pattern, thereby minimizing crosstalk.

Another object of the present invention is to provide a bioptical holographic laser scanning system, wherein the sizes of the laser beam folding mirrors employed at each laser scanning station of the present invention are minimized.

Another object of the present invention is to provide a bioptical holographic laser scanning system, wherein blocking of light return paths by the laser beam folding mirrors has been eliminated.

Another object of the present invention is to provide a bioptical holographic laser scanning system, wherein mechanical interference between individual laser beam folding mirrors within the system has been eliminated.

Another object of the present invention is to provide a bioptical holographic laser scanning system, wherein the angles of incidence of the laser scanning beams at the horizontal scanning window have been optimized.

Another object of the present invention is to provide a bioptical holographic laser scanning system which generates a laser scanning pattern providing 360 degrees of scan coverage at a POS station, while the internal mirror-space volume of the scanning system has been minimized.

Another object of the present invention is to provide such a bioptical holographic laser scanning system, wherein the "sweet spot" of the 360 laser scanning pattern is located at and above the center of the horizontal (i.e. bottom) scanning window, regardless of the item orientation or location of the bar code on the item.

Another object of the present invention is to provide such a bioptical holographic laser scanning system, wherein the center of all groups of laser scanning planes generated by the system is directed toward the center of the horizontal scanning window, or to a line normal to the horizontal scanning window at the center thereof, thereby enhancing operator productivity by providing the feedback "beep" at substantially the same location above the horizontal scanning window for each and every item being scanned.

Another object of the present invention is to provide a bioptical holographic laser scanning system, wherein the size of the scan data collecting photodetector at each laser scanning station is minimized.

Another object of the present invention is to provide a bioptical holographic laser scanning system, wherein the location of the scan data collecting photodetector at each laser scanning station is determined using a novel spreadsheet-based design process that minimizes the vertical space required for placement of the parabolic light collection mirror beneath the scanning disc.

Another object of the present invention is to provide a bioptical holographic laser scanning system, wherein the size, shape and orientation of the scan data collecting photodetector at each laser scanning station is designed so that the lateral shift of the reflected beam image across the light sensitive surface of the photo detector, as a scanned item moves through the depth of field of the scanning region of the scanning station, which results in a relatively uniform light level reaching the light sensitive surface of the photodetector.

Another object of the present invention is to provide a bioptical holographic laser scanning system, wherein the shift of the collected light across the data detector (as the item moves through the depth of field of the scanning region) minimizes variation in signal.

Another object of the present invention is to provide a bioptical holographic laser scanning system comprising a holographic scanning disc with multiple facets which simultaneously focus multiple scanning beams to overlapping regions in the 3-D scanning volume at varying focal distances (preferably, less than 2 inches or less difference in focal distance), which minimizes the effects of paper noise.

Another object of the present invention is to provide a bioptical holographic laser scanning system, which allows the same facets to be used for both the horizontal and vertical windows even though the distances to the items to be scanned is different for the two windows.

Another object of the present invention is to provide a bioptical holographic laser scanning system, wherein use of a 12 facet disk design to increase the signal level for a 6 inch disk, necessary for POS scanners, which must provide lower laser power levels at the scan windows.

Another object of the present invention is to provide a bioptical holographic laser scanning system, wherein use of an S-polarized beam at the disk to maximize signal and provide better resolution throughout the DOF region.

Another object of the present invention is to provide a bioptical holographic laser scanning system, wherein use of skew facets with symmetric Left/Right skew, which allows the same scan pattern to be produced by both the fore and aft scanning stations.

Another object of the present invention is to provide a bioptical holographic laser scanning system, wherein the vertical-window horizontal scan lines and the operator-side-station horizontal scan lines are split and tilted for enhanced scan coverage.

Another object of the present invention is to provide a bioptical holographic laser scanning system, wherein recessing selected portions of the scanner base plate allow reduction of the box height.

Another object of the present invention is to provide a bioptical holographic laser scanning system, wherein parabolic mirror with modified, non-sector-shaped, cross-section maximize light collection efficiency.

Another object of the present invention is to provide a bioptical holographic laser scanning system, wherein use of optimum skew angle for each of the skew facets provides maximum scan coverage while minimizing the mirror-space volume.

Another object of the present invention is to provide a bioptical holographic laser scanning system, wherein diffraction angles are selected to provide maximum scan coverage while still allowing complete blockage of the facet from undesired ambient light.

Another object of the present invention is to provide a bioptical holographic laser scanning system, wherein a fixed beam blocker with optimum shape prohibits ambient light from entering the facets at the zero order beam angle, which light would otherwise be directed to the data detector by the parabolic mirror thereby increasing the noise level.

Another object of the present invention is to provide a bioptical holographic laser scanning system, wherein undercut box design allows for a smaller scanner footprint in both the X-dimension and the Y-dimension.

Another object of the present invention is to provide a bioptical holographic laser scanning system, wherein turning the VLD off when the scan line is no longer in the window, thereby eliminating unwanted internal scattering of the laser light and extends the life of the laser.

Another object of the present invention is to provide a bioptical holographic laser scanning system capable of generating a complex of pairs of quasi-orthogonal laser scanning planes, each composed by a plurality of substantially-vertical laser scanning planes for reading bar code symbols having bar code elements (i.e. ladder-type bar code symbols) that are oriented substantially horizontal with respect to the bottom scanning window, and a plurality of substantially-horizontal laser scanning planes for reading bar code symbols having bar code elements (i.e. picket-fence type bar code symbols) that are oriented substantially vertical with respect to the bottom scanning window.

Another object of the present invention is to provide a bioptical holographic laser scanning system, wherein each scan data collecting photodetector is positioned behind a beam folding mirror having a small hole formed therethrough to allow the return light from a parabolic mirror beneath the scanning disc to reach the photodetector, thereby enabling optimum placement of the photodetector and nearly maximum use of the surface of the beam folding mirror for light collection while providing a light shield for the data detector.

Another object of the present invention is to provide a bioptical holographic laser scanning system, wherein the light collection efficiency of each scanning facet is optimized in order to compensate for variations in facet collection area during laser scanning operations.

Another object of the present invention is to provide a bioptical holographic laser scanning system, wherein a beam deflecting mirror is supported on the back side of each parabolic collection mirror, beneath a notch formed therein, to allow an incident laser beam, produced beyond the scanning disc, to be directed through the light collection mirror and onto the point of incidence of the scanning disc during scanning operation.

Another object of the present invention is to provide a bioptical holographic laser scanning system, wherein a single beam folding mirror is used as the last outgoing mirror to produce a plurality of different laser scanning planes that are projected out through the vertical scanning window, thereby allowing greater light collection for a given amount of space (or potentially less space).

Another object of the present invention is to provide a bioptical holographic laser scanning system, wherein a light pipe or other light guiding structure can be used to conduct collected light at a point of collection within the system, and guiding such light to a photodetector located at a convenient location within the system.

Another object of the present invention is to provide a bioptical holographic laser scanning system, wherein a light-collection cone can be used to reduce the size of the photodetector.

Another object of the present invention is to provide a bioptical holographic laser scanning system which produces a three-dimensional laser scanning volume that is substantially greater than the volume of the housing of the holographic laser scanner itself, and provides full omni-directional scanning within the laser scanning volume.

A further object of the present invention is to provide such a bioptical holographic laser scanning system, in which the three-dimensional laser scanning volume has multiple focal planes and a highly confined geometry extending about a projection axis extending from the scanning windows of the holographic scanning system.

A further object of the present invention is to provide such a bioptical holographic laser scanning system, in which laser light produced from a particular holographic optical element reflects off a bar code symbol, passes through the same holographic optical element, and is thereafter collimated for light intensity detection.

A further object of the present invention is to provide such a bioptical holographic laser scanning system, in which a plurality of lasers simultaneously produce a plurality of laser beams which are focused and scanned through the scanning volume by a rotating disc that supports a plurality of holographic facets.

A further object of the present invention is to provide such a bioptical holographic laser scanning system, in which the holographic optical elements on the rotating disc maximize the use of the disk space for light collection, while minimizing the laser beam velocity at the focal planes of each of the laser scan patterns, in order to minimize the electronic bandwidth required by the light detection and signal processing circuitry.

A further object of the present invention is to provide a compact bioptical holographic laser scanning system, in which substantially all of the available light collecting surface area on the scanning disc is utilized and the light collection efficiency of each holographic facet on the holographic scanning disc is substantially equal, thereby allowing the holographic laser scanner to use a holographic scanning disc having the smallest possible disc diameter.

A further object of the present invention is to provide such a bioptical holographic laser scanning system, in which laser beam astigmatism caused by the inherent astigmatic difference in each visible laser diode is effectively eliminated prior to the passage of the laser beam through the holographic optical elements on the rotating scanning disc.

A further object of the present invention is to provide such a bioptical holographic laser scanning system, in which the dispersion of the relatively broad spectral output of each visible laser diode by the holographic optical elements on the scanning disc is effectively automatically compensated for as the laser beam propagates from the visible laser diode, through an integrated optics assembly, and through the holographic optical elements on the rotating disc of the holographic laser scanner.

A further object of the present invention is to provide such a bioptical holographic laser scanning system, in which a conventional visible laser diode is used to produce a laser scanning beam, and a simple and inexpensive arrangement is provided for eliminating or minimizing the effects of the dispersion caused by the holographic disc of the laser scanner.

A further object of the present invention is to provide such a bioptical holographic laser scanning system, in which the inherent astigmatic difference in each visible laser diode is effectively eliminated prior to the laser beam passing through the holographic optical elements on the rotating disc.

A further object of the present invention is to provide such a bioptical holographic laser scanning system, in which the laser beam produced from each laser diode is processed by a single, ultra-compact optics module in order to circularize the laser beam produced by the laser diode, eliminate the inherent astigmatic difference therein, as well as compensate for wavelength-dependent variations in the spectral output of each visible laser diode, such as superluminescence, multi-mode lasing, and laser mode hopping, thereby allowing the use of the resulting laser beam in holographic scanning applications demanding large depths of field.

A further object of the present invention is to provide such a bioptical holographic laser scanning system, in which an independent light collection/detection subsystem is provided for each laser diode employed within the holographic laser scanner.

A further object of the present invention is to provide such a bioptical holographic laser scanning system, in which an independent signal processing channel is provided for each laser diode and light collection/detection subsystem in order to improve the signal processing speed of the system.

A further object of the present invention is to provide such a bioptical holographic laser scanning system, in which a plurality of signal processors are used for simultaneously processing the scan data signals produced from each of the photodetectors within the holographic laser scanner.

A further object of the present invention is to provide such a bioptical holographic laser scanning system, in which each facet on the holographic disc has an identification code which is encoded by the zero-th diffraction order of the outgoing laser beam and detected so as to determine which scanning planes are to be selectively filtered during the symbol decoding operations.

A further object of the present invention is to provide such a bioptical holographic laser scanning system, in which the zero-th diffractive order of the laser beam which passes directly through the respective holographic optical elements on the rotating disc is used to produce a start/home pulse for use with stitching-type decoding processes carried out within the scanner.

These and other objects of the present invention will become apparent hereinafter and in the claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIG. 1A1 is a perspective view of the bioptical holographic laser scanning system of the present invention showing its bottom and side scanning windows formed with its compact scanner housing;

FIG. 1A2 is an elevated side view of the bioptical holographic laser scanning system of FIG. 1A;

FIG. 1B1 is a perspective view of the bioptical holographic laser scanning system of the present invention shown installed in a Point-Of-Sale (POS) retail environment FIG. 1B2 is an exploded perspective view of the bioptical holographic laser scanning system of the present invention shown installed in a Point-Of-Sale (POS) retail environment FIG. 1C is a perspective view of the bioptical holographic laser scanning system of the present invention shown installed above a work surface (e.g. a conveyor belt structure) employed, for example, in manual sortation operations or the like;

FIG. 1D is a perspective view of the bioptical holographic scanning system of the illustrative embodiment of the present invention, shown with the top panels of its housing removed in order to reveal the holographic scanning disc mounted on its optical bench, and the first, second, third and fourth laser scanning stations disposed thereabout, wherein each laser scanning station comprises a laser beam production module, a set of laser beam folding mirrors, a light collecting/focusing mirror disposed beneath the scanning disc, a photodetector disposed above the scanning disc, and pair of analog/digital signal processing boards associated with the laser scanning station;

FIG. 1D2 is a perspective view of a wire-frame graphics model of the bioptical holographic scanning system of FIG. 1D, wherein the components thereof are shown using wire-frame modeling and the bottom and side scanning windows are indicated in dotted lines;

FIG. 2A1 is a perspective view of the bioptical holographic scanning system of the illustrative embodiment of the present invention, shown with its housing removed in order to reveal the holographic scanning disc rotatably mounted on its optical bench, and the first, second, third and fourth laser scanning stations disposed thereabout, wherein each laser scanning station comprises a laser beam production module, a set of laser beam folding mirrors, a light collecting/focusing mirror disposed beneath the scanning disc, a photodetector disposed above the scanning disc, and pair of analog/digital signal processing boards associated with the laser scanning station;

FIG. 2A2 is a perspective view of the bioptical holographic scanning system shown in FIG. 2A1, wherein the components thereof are shown using wire-frame graphics modeling and the bottom and side scanning windows are indicated in dotted lines;

FIG. 2B1 is a plan view of the bioptical holographic scanning system of the illustrative embodiment shown in FIG. 2A1;

FIG. 2B2 is a plan view of graphics the bioptical holographic scanning system shown in FIG. 2A1, wherein the components thereof are shown using wire-frame graphics modeling and the bottom and side scanning windows are indicated in dotted lines;

FIG. 2C1 is a first elevated side view of the bioptical holographic scanning system of FIG. 2A1, taken along the longitudinally extending reference plane passing through the axis of rotation of the scanning disc axis and disposed normal to the bottom scanning window indicated in dotted lines, wherein the components thereof are shown using solid modeling while the side scanning window is not shown;

FIG. 2C2 is a first elevated side view of the bioptical holographic scanning system shown in FIG. 2C1, wherein the components thereof are shown using wire-frame graphics modeling and the bottom and side scanning windows are indicated in dotted lines;

FIG. 2D1 is a second elevated side view of the bioptical holographic scanning system of FIG. 2A1, taken along the longitudinally extending reference plane passing through the axis of rotation of the scanning disc axis and disposed normal to the bottom scanning window indicated in dotted lines, wherein the components thereof are shown using solid modeling while the side scanning window is not shown;

FIG. 2D2 is a second elevated side view of the bioptical holographic scanning system shown in FIG. 2D1, wherein the components thereof are shown using wire-frame graphics modeling and the bottom and side scanning windows are indicated in dotted lines;

FIG. 2E1 is a third elevated side view of the bioptical holographic scanning system of FIG. 2A1, taken along the longitudinally extending reference plane passing through the axis of rotation of the scanning disc axis and disposed normal to the bottom scanning window indicated in dotted lines, wherein the components thereof are shown using solid modeling while the side scanning window is not shown;

FIG. 2E2 is a third elevated side view of the bioptical holographic scanning system shown in FIG. 2E1, wherein the components thereof are shown using wire-frame graphics modeling and the bottom and side scanning windows are indicated in dotted lines;

FIG. 2F1 is a perspective view of a subassembly from the bioptical holographic scanning system of the illustrative embodiment, comprising the optical bench of the system, the holographic scanning disc mounted thereon, the first, second, third and fourth laser beam production modules mounted about the perimeter of the holographic scanning disc, and the first, second, third and fourth associated parabolic light collection mirror structures mounted beneath the holographic scanning disc, adjacent the respective laser beam production modules;

FIG. 2F2 is a plan view of the subassembly of FIG. 2F2, showing the subcomponents thereof using wire-frame modeling;

FIG. 2G1 is a perspective view of the laser beam production module employed in each of the laser scanning stations in the biopticals holographic laser scanning system of FIG. 1A, wherein the components thereof are shown using solid graphics modeling techniques;

FIG. 2G2 is cross-sectional view of the laser beam production module depicted in FIG. 2G1, showing its subcomponents using wire-frame modeling techniques, as well as the propagation of the laser beam from its visible laser diode source, through its multi-function light diffractive grating, and reflected off its light reflective mirror, out towards the laser beam deflecting mirror adjacent the holographic scanning disc;

FIG. 2H1 is a perspective view of the laser beam deflection module employed in each of the laser scanning stations in the biopticals holographic laser scanning system of FIG. 1A, wherein the components thereof are shown using solid graphics modeling techniques;

FIG. 2H2 is a perspective view of the laser beam deflection module employed in each of the laser scanning stations in the biopticals holographic laser scanning system of FIG. 1A, using wire-frame graphics modeling techniques to show the spatial location of the subcomponents thereof within the laser beam reflection module;

FIG. 2I is an elevated side view of the holographic laser scanning disc and laser scanning stations associated with the bioptical holographic laser scanning system depicted in FIG. 1A, using wire-frame modeling techniques to show the position of the photodetector directly above the point of incidence of the laser beam on each holographic scanning disc in each laser scanning station thereof;

FIG. 2I2 is an elevated side view of the holographic laser scanning disc, a light blocking element, and laser scanning stations of the bioptical holographic laser scanning system depicted in FIG. 1A, using wire-frame modeling techniques to show the position of the light blocking element with respect to the holographic scanning disc, the bottom window, and the photodetectors in each laser scanning station thereof;

FIG. 2I3 is a perspective view of a wire frame model of the holographic laser scanning disc and light blocking element of FIG. 2I2;

FIG. 2J1 is a plan view of the holographic laser scanning disc and laser scanning stations associated with the bioptical holographic laser scanning system depicted in FIG. 1A, using solid graphics modeling techniques to show the position of the photodetector directly above the point of incidence of the laser beam on the holographic scanning disc in each laser scanning station thereof;

FIG. 2J2 is a plan view of the holographic laser scanning disc and laser scanning stations associated with the bioptical holographic laser scanning system depicted in FIG. 1A, using wire-frame graphics modeling techniques to show the position of the photodetector directly above the point of incidence of the laser beam on the holographic scanning disc in each laser scanning station thereof;

FIG. 3A1 is a plan view of the holographic scanning disc of the illustrative embodiment of the present invention, showing the boundaries of each i-th holographic optical facet mounted thereon about its axis of rotation, with the assigned facet number and selected disc design parameters imposed thereon for illustrative purposes;

FIG. 3A2 is a geometrical optics model of the process of producing the P(i,j)-th laser scanning plane of the system by directing the output laser beam from the j-th laser beam production module through i-th holographic scanning facet supported upon the holographic scanning disc as it rotates about its axis, wherein various parameters employed in the model, including diffraction angle, beam elevation angle and scan angle, are schematically defined;

FIG. 3A3 is a plan view of the geometrical optics model of FIG. 3A2, defining the skew angle of the scanning facet, also employed therein;

FIG. 3A4 is a table categorizing the twelve facets on the holographic scanning disc of the illustrative embodiment as either having (i) high elevation angle characteristics and left (i.e. positive) skew angle characteristics, (ii) high elevation angle characteristics and right (i.e. negative) skew angle characteristics and (iii) low elevation angle characteristics and no (i.e. zero) skew angle characteristics;

FIGS. 3B1 and 3B2, taken together, collectively provide a vector-based specification of the vertices of each laser beam folding mirrors employed in the first laser scanning station (ST1) of the bioptical holographic scanning system using position vectors defined with respect to local coordinate reference system $R_{local\ 1}$ symbolically embedded within the holographic scanning disc, as shown in FIG. 2A1;

FIGS. 3C1 through 3C2, taken together, collectively provide a vector-based specification of the vertices of each laser beam folding mirrors employed in the second laser scanning station (ST2) of the bioptical holographic scanning system using position vectors defined with respect to local coordinate reference system $R_{local\ 2}$ symbolically embedded within the holographic scanning disc, as shown in FIG. 2A1;

FIGS. 3D1 through 3D2, taken together, collectively provide a vector-based specification of the vertices of each laser beam folding mirrors employed in the third laser scanning station (ST3) of the bioptical holographic scanning system using position vectors defined with respect to local coordinate reference system $R_{local\ 3}$ symbolically embedded within the holographic scanning disc, as shown in FIG. 2A;

FIGS. 3E1 through 3E2, taken together, collectively provide a vector-based specification of the vertices of each laser beam folding mirrors employed in the fourth laser scanning station (ST4) of the bioptical holographic scanning system using position vectors defined with respect to local coordinate reference system $R_{local\ 4}$ symbolically embedded within the holographic scanning disc, as shown in FIG. 2A1;

FIGS. 3F1 and 3F2, taken together, provide a table setting forth major physical, optical and electrical parameters which can be used to characterize to the bioptical holographic laser scanning system of the illustrative embodiment of the present invention;

FIGS. 3G1A through 3G2B, taken collectively, provide a table setting forth various physical and optical parameters characteristic of the holographic laser scanning disc employed in the illustrative embodiment of the bioptical holographic laser scanning system of the present invention;

FIGS. 3H1 through 3H3, taken collectively, provide a table setting forth the holographic exposure/recording angles (i.e. facet construction parameters) for mastering at 488 nanometers the holographic laser scanning disc employed in the illustrative embodiment of the bioptical holographic laser scanning system of the present invention;

FIGS. 3I1 and 3I2, taken together, provide a table setting forth the "modified" holographic exposure/recording angles (i.e. facet construction parameters) for mastering at 488 nanometers the holographic laser scanning disc employed in the illustrative embodiment, while correcting/compensating for post-processing residual gelatin swell associated with the holographic recording medium;

FIGS. 3J1 and 3J2, taken together, provide a table setting forth parameters used to analyze the focus shift and out-of-focus spot size for a converging laser reference beam;

FIG. 3K is a table setting forth the focal distances of each scanning facet on the holographic scanning disc of the illustrative embodiment of the present invention, as well as optical distances from each facet to the horizontal and vertical windows of the bioptical holographic scanning system of the illustrative embodiment;

FIGS. 3L1A through 3L2B, taken collective, provide a table setting forth CDRH/IEC calculations which verify that the bioptical holographic laser scanning system of the illustrative embodiment satisfies Laser Class requirements;

FIG. 5A1 is a perspective view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5A2 is an elevated side view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5A3 is a plan view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5A4 is an elevated side end view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5B1 is a perspective view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5B2 is a side view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5B3 is a plan view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5B4 is an elevated end view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C1 is a perspective view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C2 is a plan view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C3 is an elevated end view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C4 is a first elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C5 is a second elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5D1 is a perspective view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5D2 is a side view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5D3 is a plan view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5D4 is an elevated end view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E1 is a perspective view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E2 is a plan view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E3 is an elevated end view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E4 is a first elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E5 is a second elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5F1 is a perspective view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F2 is a plan view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence-type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F3 is an end view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F4 is a first side view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F5 is a second side view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5G1 is a perspective view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5G2 is a plan view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5G3 is an elevated end view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5G4 is a first elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5G5 is a second elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5H1 is a perspective view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H2 is a plan view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H3 is an elevated end view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H4 is a first elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG@ST1) associated therewith during system operation;

FIG. 5H5 is a second elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H6 is a perspective view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H7 is a plan view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H8 is an elevated end view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H9 is a first elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H10 is a second elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5I1 is a perspective view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I2 is a plan view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I3 is an elevated end view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I4 is a first elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I5 is a second elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J1 is a perspective view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J2 is a side view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J3 is a plan view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J4 is a first elevated end view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J5 is a second elevated end view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5K1 is a perspective view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K2 is a plan view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K3 is an elevated end view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K4 is a first elevated side view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K5 is a second elevated side view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5L1 is a perspective view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5L2 is a plan view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the group of beam folding mirrors (MG1@ST3) associated therewith during system operation;

FIG. 5L3 is an end view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5L4 is a first side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the group of beam folding mirrors (MG1@ST3) associated therewith during system operation;

FIG. 5L5 is a second side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5M1 is a perspective view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5M2 is a plan view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5M3 is an elevated end view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

Figure 1B:
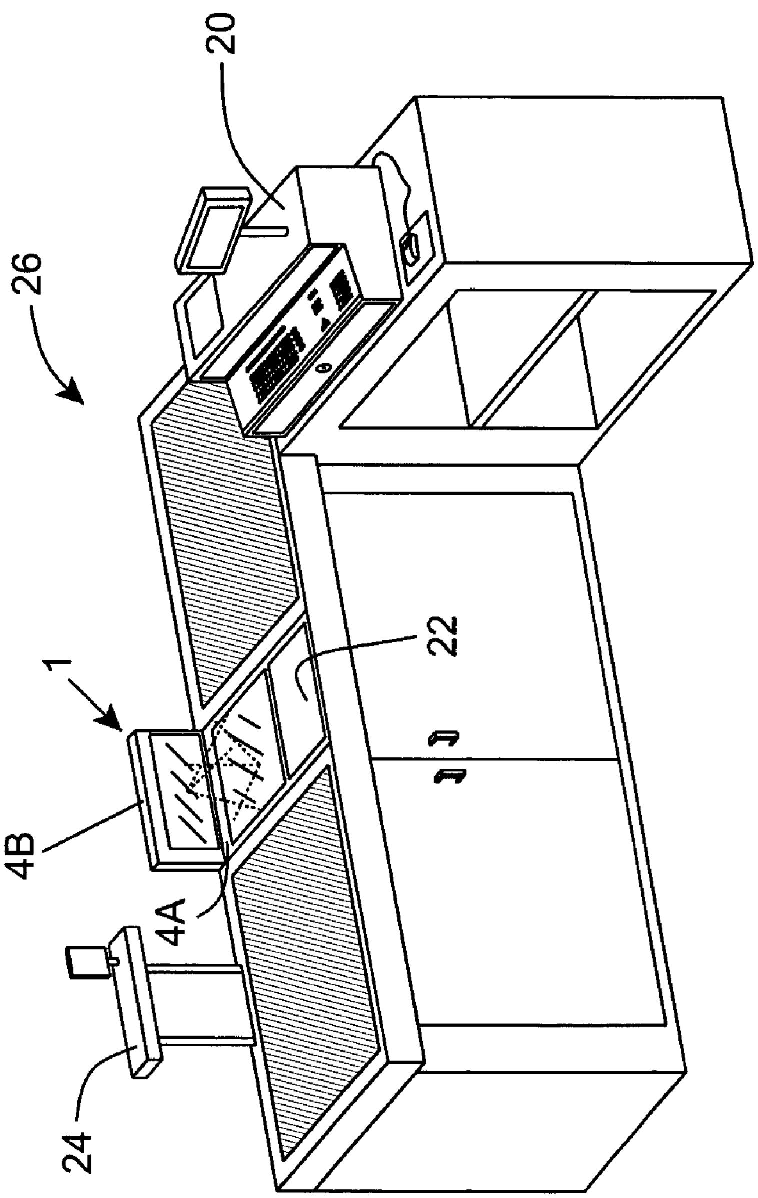
Figure 6K:
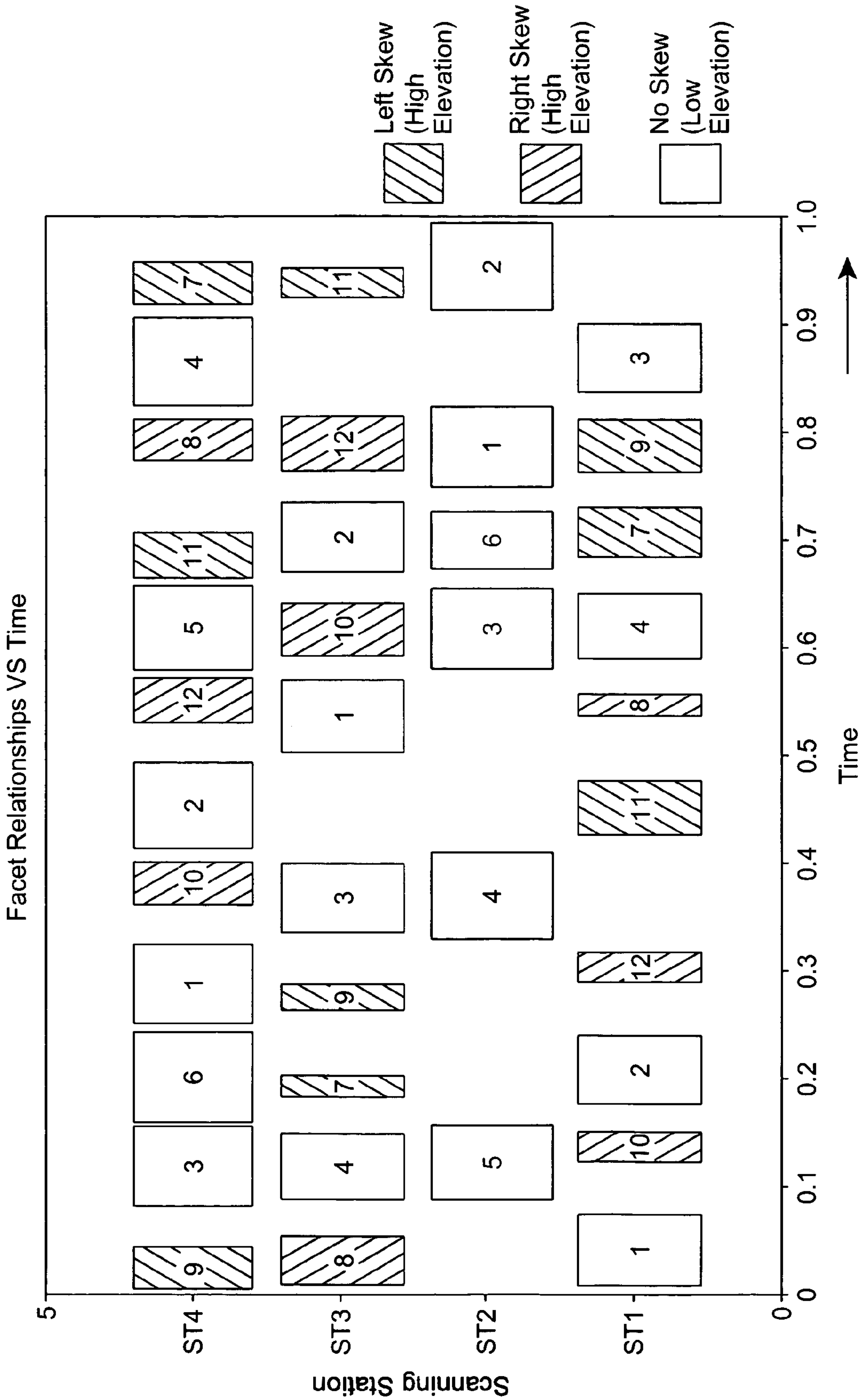

FIG. 5M4 is a first elevated side view of a wire-frame model of the laser scanning platform within the bioptical holographic laser scanning system of the illustrative embodiment;

FIG. 5M5 is a second elevated side view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N1 is a perspective view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N2 is a plan view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N3 is an elevated end view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N4 is a first elevated side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N5 is a second elevated side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5O1 is a perspective view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O2 is a plan view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O3 is an elevated end view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O4 is a first elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O5 is a second elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5H1 is a perspective view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P2 is a plan view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P3 is an elevated end view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P4 is a first elevated side view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P5 is a second elevated side view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5Q1 is a perspective view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5Q2 is a plan view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5Q3 is an elevated end view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5Q4 is a first elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder-type) bar code symbols, respectively, when scanning facets (Nos. 1–4 and 7–12) pass through the third laser scanning station (ST3) and generate laser scanning beams the reflect off the first, second and third groups of beam folding mirrors (MG1@ST3, MG2@ST3 and MG3@ST3) associated therewith during system operation;

FIG. 5Q5 is a second elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder-type) bar code symbols, respectively, when scanning facets (Nos. 1–4 and 7–12) pass through the first laser scanning station (ST1) and generate laser scanning beams the reflect off the first, second and third groups of beam folding mirrors (MG1@ST3, MG2@ST3 and MG3@ST3) associated therewith during system operation;

FIG. 5R1 is a perspective view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams the reflect off the first, second and groups of beam folding mirrors (MG1@ST3, MG2@ST3 and MG3@ST3) associated therewith during system operation;

FIG. 5R2 is a plan view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5R3 is an elevated end view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5R4 is a first elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5R5 is a second elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5S1 is a perspective view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S2 is a plan view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S3 is an elevated end view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S4 is a first elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S5 is a second elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T1 is a perspective view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T2 is a plan view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T3 is an elevated end view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T4 is a first elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T5 is a second elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5U1 is a perspective view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the groups of beam folding mirrors (MG1@ST4 and MG2@ST4) associated therewith during system operation;

FIG. 5U2 is a plan view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5U3 is an elevated end view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5U4 is a first elevated side view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5U5 is a second elevated side view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V1 is a perspective view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V3 is an elevated end view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V4 is a first elevated side view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V5 is a second elevated side view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5W1 is a perspective view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5W2 is a plan view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5W4 is a first elevated side view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5W5 is a second elevated side view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X1 is a perspective view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X2 is a plan view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X3 is an elevated end view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X4 is a first elevated side view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X5 is a second elevated side view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5Y1 is a perspective view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Y2 is a plan view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Y4 is a first elevated side view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Y5 is a second elevated side view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z1 is a perspective view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z2 is a plan view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z3 is an elevated end view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z4 is a first elevated side view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z5 is a second elevated side view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 6A1 is a perspective view of a solid model of the first laser scanning station (ST1) and holographic scanning disc in the bioptical holographic laser scanning system of the illustrative embodiment, showing the generalized outgoing optical path of a laser beam produced by a scanning facet (i.e. Facet Nos. 7, 9 and 11) having high elevation angle characteristics and positive (i.e. left) skew angle characteristics, causing the laser beam to be reflected off the first group of beam folding mirrors (MG1@ST1) associated with the first laser scanning station (ST1) and projected out the bottom scanning window of the system;

FIG. 6A2 is a spreadsheet-type information table listing (i) the unit coordinates specifying, relative to the first local coordinate reference system R1, the direction of the laser beam incident the scanning disc at laser scanning station ST1, and (ii) four sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by rotating scanning facet No. 7, reflected off the two beam folding mirrors in group MG1@ST1 thereof, and ultimately projected through the bottom scanning window of the system towards the focal point of the scanning facet, as illustrated in FIGS. 5B1 through 5C5;

FIG. 6A3 is a spreadsheet-type information table listing (i) the unit coordinates specifying, relative to the first local coordinate reference system R1, the direction of the laser beam incident the scanning disc at laser scanning station ST1, and (ii) four sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by rotating scanning facet No. 9, reflected off the two beam folding mirrors in group MG1@ST1 thereof, and ultimately projected through the bottom scanning window of the system towards the focal point of the scanning facet, as illustrated in FIGS. 5B1 through 5C5;

FIG. 6A4 is a spreadsheet-type information table listing (i) the unit coordinates specifying, relative to the first local coordinate reference system R1, the direction of the laser beam incident the scanning disc at laser scanning station ST1, and (ii) four sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by rotating scanning facet No. 11, reflected off the two beam folding mirrors in group MG1@ST1 thereof, and ultimately projected through the bottom scanning window of the system towards the focal point of the scanning facet, as illustrated in FIGS. 5B1 through 5C5;

FIG. 6B1 is a perspective view of a solid model of the first laser scanning station (ST1) and holographic scanning disc in the bioptical holographic laser scanning system of the illustrative embodiment, showing the generalized outgoing optical path of a laser beam produced by a scanning facet (i.e. Facet Nos. 8, 10 and 12) having high elevation angle characteristics and negative (i.e. right) skew angle characteristics, causing the laser beam to be reflected off the second group of beam folding mirrors (MG2@ST1) associated with the first laser scanning station (ST1) and projected out the bottom scanning window of the system;

FIG. 6B2 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 8, reflected off the three beam folding mirrors in group MG2@ST1 thereof, and ultimately projected through the bottom scanning window of the system towards the focal point of the scanning facet, as illustrated in FIGS. 5D1 through 5E5;

FIG. 6B3 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 10, reflected off the three beam folding mirrors in group MG2@ST1 thereof, and ultimately projected through the bottom scanning window of the system towards the focal point of the scanning facet, as illustrated in FIGS. 5D1 through 5E5;

FIG. 6B4 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 12, reflected off the three beam folding mirrors in group MG2@ST1 thereof, and ultimately projected through the bottom scanning window of the system towards the focal point of the scanning facet, as illustrated in FIGS. 5D1 through 5E5;

FIG. 6C1 is a perspective view of a solid model of the first laser scanning station (ST1) and holographic scanning disc in the bioptical holographic laser scanning system of the illustrative embodiment, showing the generalized outgoing optical path of a laser beam produced by a scanning facet (i.e. Facet Nos. 1–4) having low elevation angle characteristics and no (i.e. zero) skew angle characteristics, causing the laser beam to be reflected off the third group of beam folding mirrors (MG3@ST1) associated with the first laser scanning station (ST1) and projected out the bottom scanning window of the system;

FIG. 6C2 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 1, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6C3 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 2, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6C4 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 3, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6C5 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 4, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6D1 is a perspective view of a solid model of the second laser scanning station (ST2) and holographic scanning disc in the bioptical holographic laser scanning system of the illustrative embodiment, showing the generalized outgoing optical path of a laser beam produced by a scanning facet (i.e. Facet Nos. 1–6) having low elevation angle characteristics and no (i.e. zero) skew angle characteristics, causing the laser beam to be reflected off the group of beam folding mirrors (MG3@ST2) associated with the first laser scanning station (ST2) and projected out the bottom scanning window of the system;

FIG. 6D2 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 1, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D3 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 2, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D4 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 3, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D5 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 4, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D6 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 5, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D7 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 6, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6E1 is a perspective view of a solid model of the third laser scanning station (ST3) and holographic scanning disc in the bioptical holographic laser scanning system of the illustrative embodiment, showing the generalized outgoing optical path of a laser beam produced by a scanning facet (i.e. Facet Nos. 7, 9 and 11) having high elevation angle characteristics and positive (i.e. left) skew angle characteristics, causing the laser beam to be reflected off the first group of beam folding mirrors (MG1@ST3) associated with the third laser scanning station (ST3) and projected out the bottom scanning window of the system;

FIG. 6E2 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 7, reflected off the three beam folding mirrors in group MG1@ST3 thereof, and ultimately projected through the bottom scanning window of the system towards the focal point of the scanning facet, as illustrated in FIGS. 5M1 through 5N5;

FIG. 6E3 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 9, reflected off the three beam folding mirrors in group MG1@ST3 thereof, and ultimately projected through the bottom scanning window of the system towards the focal point of the scanning facet, as illustrated in FIGS. 5M1 through 5N5;

FIG. 6E4 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 11, reflected off the three beam folding mirrors in group MG1@ ST3 thereof, and ultimately projected through the bottom scanning window of the system towards the focal point of the scanning facet, as illustrated in FIGS. 5K1 through 5L5;

FIG. 6F1 is a perspective view of a solid model of the third laser scanning station (ST3) and holographic scanning disc in the bioptical holographic laser scanning system of the illustrative embodiment, showing the generalized outgoing optical path of a laser beam produced by a scanning facet (i.e. Facet Nos. 8, 10 and 12) having high elevation angle characteristics and positive (i.e. left) skew angle characteristics, causing the laser beam to be reflected off the second group of beam folding mirrors (MG2) associated with the third laser scanning station (ST3) and projected out the bottom scanning window of the system;

FIG. 6F2 is a spreadsheet-type information table listing (i) the unit coordinates specifying, relative to the third local coordinate reference system R3, the direction of the laser beam incident the scanning disc at laser scanning station ST3, and (ii) four sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 8, reflected off the two beam folding mirrors in group MG2@ST3 thereof, and ultimately projected through the bottom scanning window of the system towards the focal point of the scanning facet, as illustrated in FIGS. 5M1 through 5M5;

FIG. 6F3 is a spreadsheet-type information table listing (i) the unit coordinates specifying, relative to the third local coordinate reference system R3, the direction of the laser beam incident the scanning disc at laser scanning station ST3, and (ii) four sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 10, reflected off the two beam folding mirrors in group MG2@ST3 thereof, and ultimately projected through the bottom scanning window of the system towards the focal point of the scanning facet, as illustrated in FIGS. 5M1 through 5N5;

FIG. 6F4 is a spreadsheet-type information table listing (i) the unit coordinates specifying, relative to the third local coordinate reference system R3, the direction of the laser beam incident the scanning disc at laser scanning station ST3, and (ii) four sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 12, reflected off the two beam folding mirrors in group MG2@ST3 thereof, and ultimately projected through the bottom scanning window of the system towards the focal point of the scanning facet, as illustrated in FIGS. 5M1 through 5N5;

FIG. 6G1 is a perspective view of a solid model of the third laser scanning station (ST3) and holographic scanning disc in the bioptical holographic laser scanning system of the illustrative embodiment, showing the generalized outgoing optical path of a laser beam produced by a scanning facet (i.e. Facet Nos. 1–4) having low elevation angle characteristics and no (i.e. zero) skew angle characteristics, causing the laser beam to be reflected off the third group of beam folding mirrors (MG3@ST3) associated with the third laser scanning station (ST3) and projected out the bottom scanning window of the system;

FIG. 6G2 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 1, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6G3 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 2, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6G4 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 3, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6G5 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 4, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6H1 is a perspective view of a solid model of the fourth laser scanning station (ST4) and holographic scanning disc in the bioptical holographic laser scanning system of the illustrative embodiment, showing the generalized outgoing optical path of a laser beam produced by a scanning facet (i.e. Facet Nos. 7, 9 and 11) having high elevation angle characteristics and positive (i.e. left) skew angle characteristics, causing the laser beam to be reflected off the first group of beam folding mirrors (MG1@ST4) associated with the third laser scanning station (ST4) and projected out the bottom scanning window of the system;

FIG. 6H2 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 7, reflected off the two beam folding mirrors in group MG1@ST4 thereof, and ultimately projected through the bottom scanning window of the system towards the focal point of the scanning facet, as illustrated in FIGS. 5U1 through 5V5;

FIG. 6H3 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 9, reflected off the two beam folding mirrors in group MG1@ST4 thereof, and ultimately projected through the bottom scanning window of the system towards the focal point of the scanning facet, as illustrated in FIGS. 5U1 through 5V5;

FIG. 6H4 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 11, reflected off the two beam folding mirrors in group MG1@ST4 thereof, and ultimately projected through the bottom scanning window of the system towards the focal point of the scanning facet, as illustrated in FIGS. 5U1 through 5V5;

FIG. 6I1 is a perspective view of a solid model of the fourth laser scanning station (ST4) and holographic scanning disc in the bioptical holographic laser scanning system of the illustrative embodiment, showing the generalized outgoing optical path of a laser beam produced by a scanning facet (i.e. Facet Nos. 8, 10 and 12) having high elevation angle characteristics and negative (i.e. right) skew angle characteristics, causing the laser beam to be reflected off the second group of beam folding mirrors (MG2@ST4) associated with the fourth laser scanning station (ST4) and projected out the bottom scanning window of the system;

FIG. 6I2 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 8, reflected off the two beam folding mirrors in group MG2@ST4 thereof, and ultimately projected through the bottom scanning window of the system towards the focal point of the scanning facet, as illustrated in FIGS. 5U1 through 5V5;

FIG. 6I3 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 10, reflected off the two beam folding mirrors in group MG2@ST4 thereof, and ultimately projected through the bottom scanning window of the system towards the focal point of the scanning facet, as illustrated in FIGS. 5U1 through 5V5;

FIG. 6I4 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 12, reflected off the two beam folding mirrors in group MG2@ST4 thereof, and ultimately projected through the bottom scanning window of the system towards the focal point of the scanning facet, as illustrated in FIGS. 5U1 through 5V5;

FIG. 6J1 is a perspective view of a solid model of the fourth laser scanning station (ST4) and holographic scanning disc in the bioptical holographic laser scanning system of the illustrative embodiment, showing the generalized outgoing optical path of a laser beam produced by a scanning facet (i.e. Facet Nos. 1–6) having low elevation angle characteristics and no (i.e. zero) skew angle characteristics, causing the laser beam to be reflected off the third group of beam folding mirrors (MG3@ST4) associated with the fourth laser scanning station (ST4) and projected out the bottom scanning window of the system;

FIG. 6J2 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 1, reflected off one beam folding mirror in group MG3@ST4, and ultimately projected through the bottom scanning window of the system towards the focal point of the scanning facet, as illustrated in FIGS. 5W1 through 5V5;

FIG. 6J3 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 2, reflected off one beam folding mirror in group MG3@ST4, and ultimately projected through the bottom scanning window of the system towards the focal point of the scanning facet, as illustrated in FIGS. 5W1 through 5V5;

FIG. 6J4 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 3, reflected off one beam folding mirror in group MG3@ST4, and ultimately projected through the bottom scanning window of the system towards the focal point of the scanning facet, as illustrated in FIGS. 5W1 through 5V5;

FIG. 6J5 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 4, reflected off one beam folding mirror in group MG3@ST4, and ultimately projected through the bottom scanning window of the system towards the focal point of the scanning facet, as illustrated in FIGS. 5W1 through 5V5;

FIG. 6J6 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 5, reflected off one beam folding mirror in group MG3@ST4, and ultimately projected through the bottom scanning window of the system towards the focal point of the scanning facet, as illustrated in FIGS. 5W1 through 5V5;

FIG. 6J7 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 6, reflected off one beam folding mirror in group MG3@ST4, and ultimately projected through the bottom scanning window of the system towards the focal point of the scanning facet, as illustrated in FIGS. 5W1 through 5V5; and FIG. 6K is a schematic representation indicating the time sequential order in which each laser scanning facet is used to generate a laser scanning planes from each of the laser scanning stations employed within the bioptical holographic laser scanning system of the illustrative embodiment, wherein each scanning facet is indexed by facet index i and each laser scanning station is indexed by station index j.

Figure 1C:
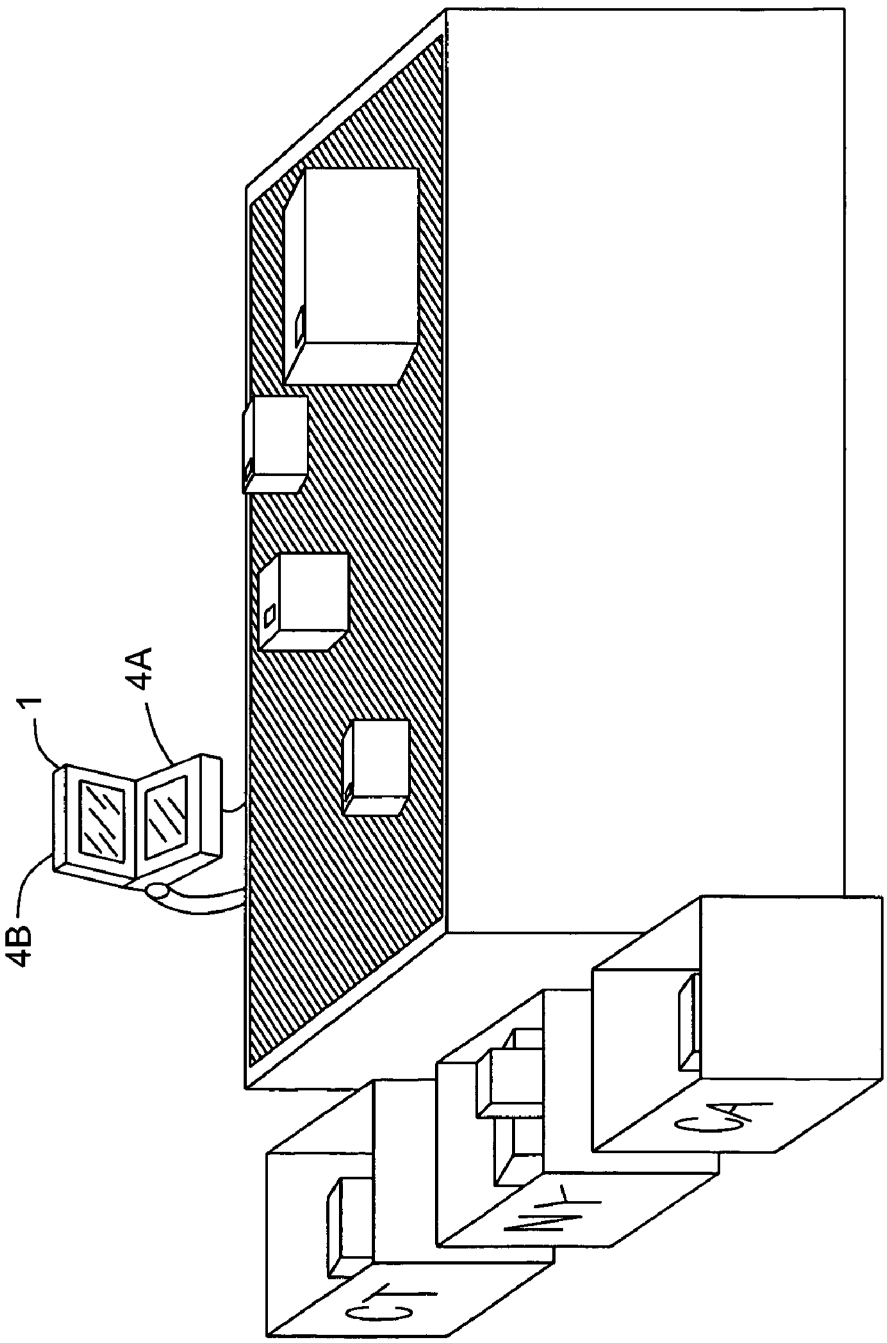
Figure 1E:
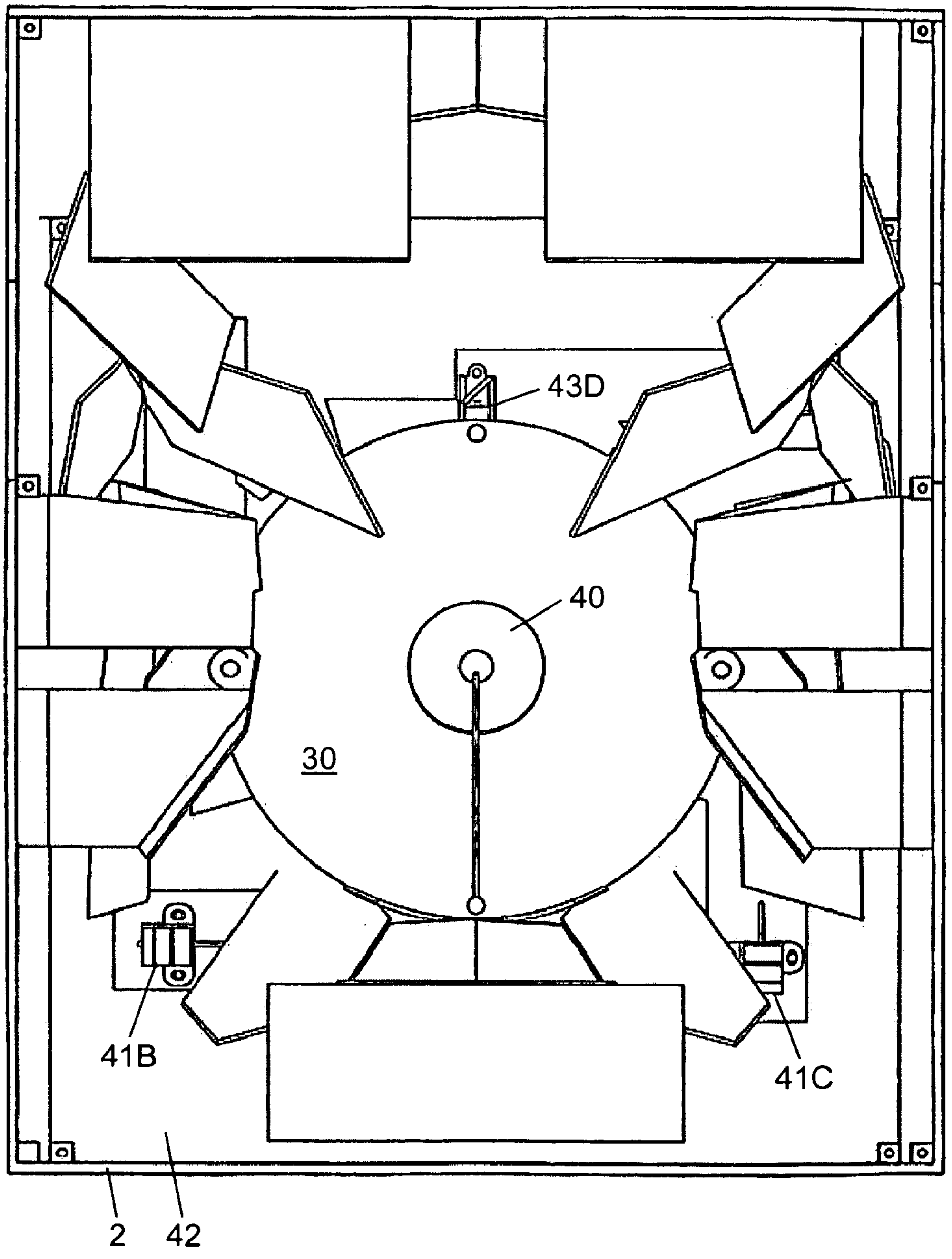
FIG. 1E is a plane view of the bioptical holographic scanning system shown in FIG. 1D.
Figure 1F:
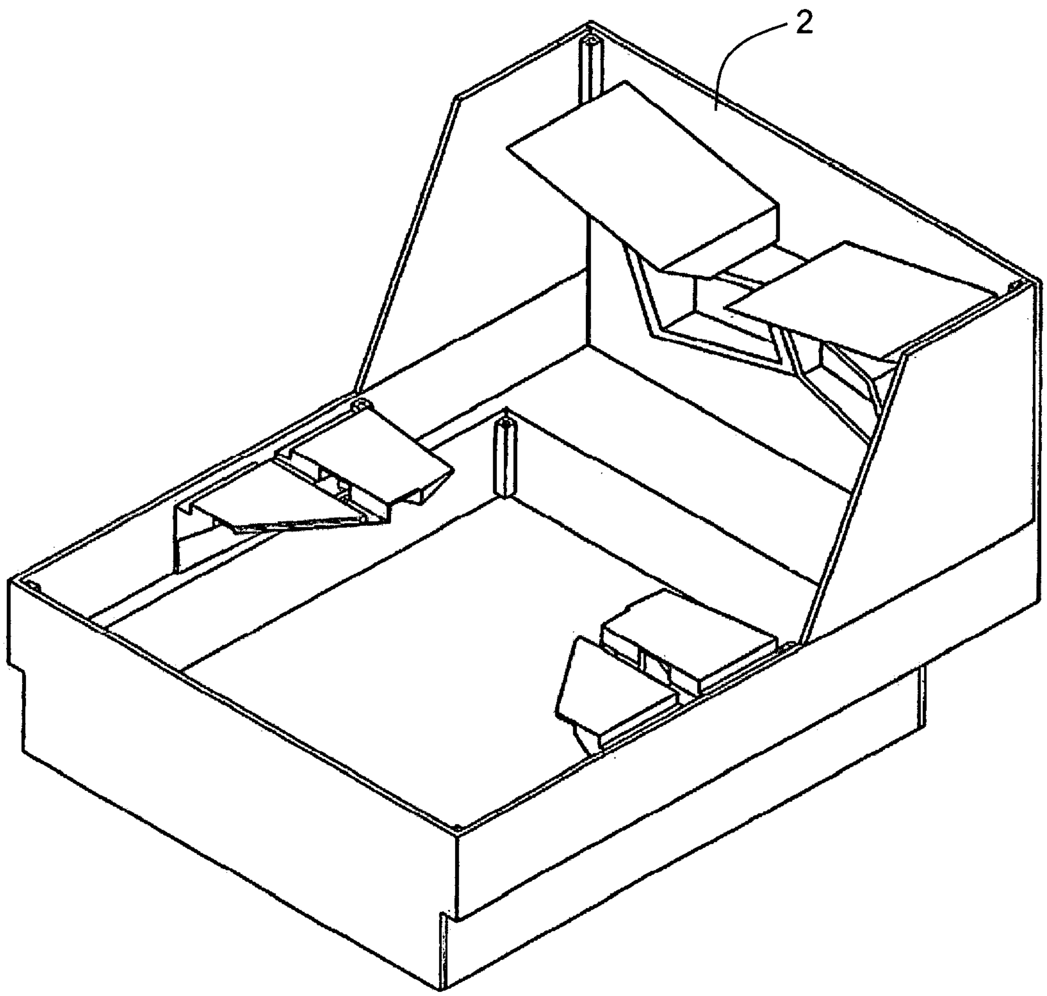
FIG. 1F is a perspective view of the scanner housing employed in the bioptical holographic scanning system of FIG. 1E, show with its top cover panels removed therefrom.
Figure 1G:
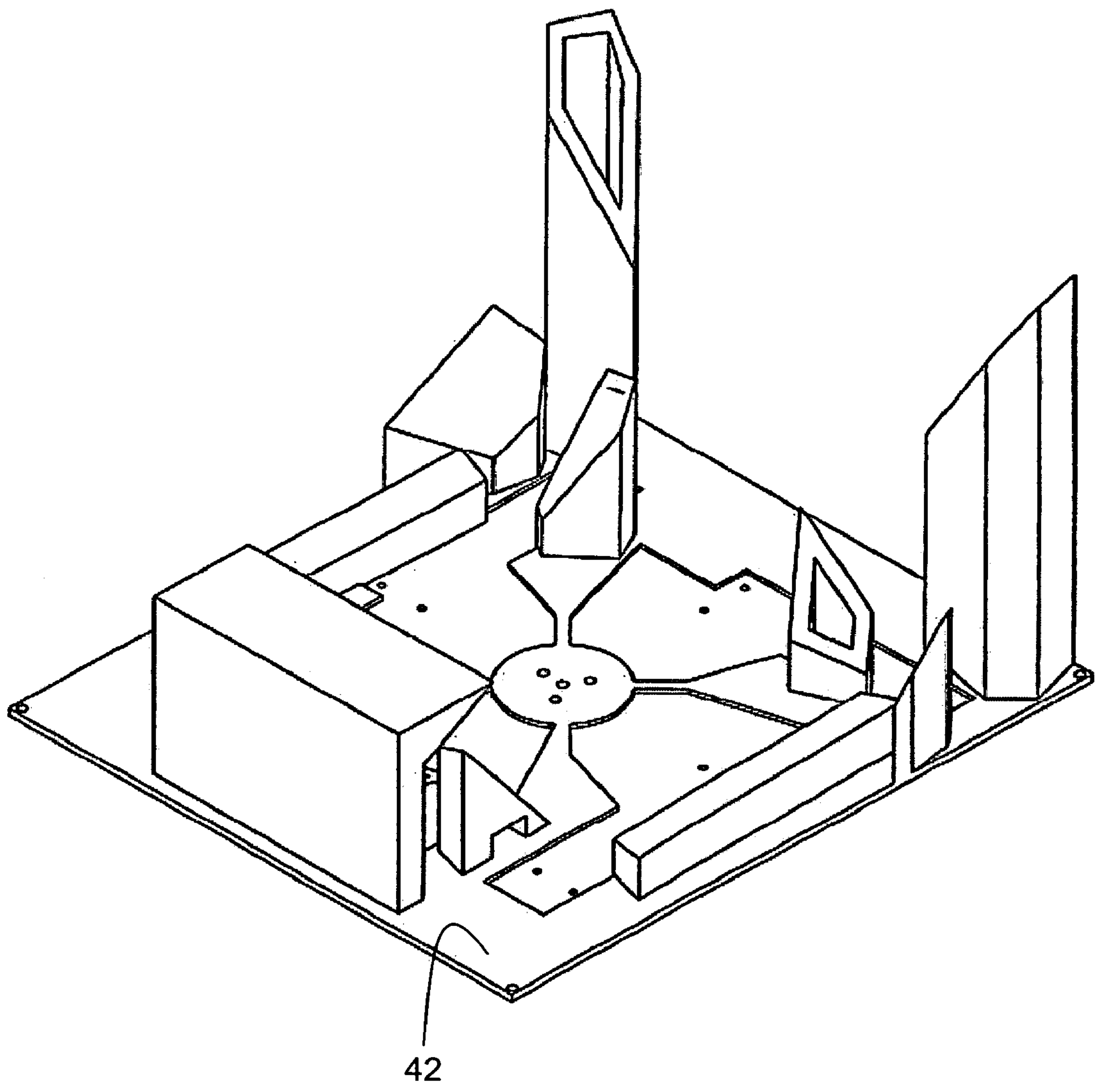
FIG. 1G is a perspective view of the optical bench employed in the bioptical holographic scanning system of FIG. 1D.
Figure 1H:
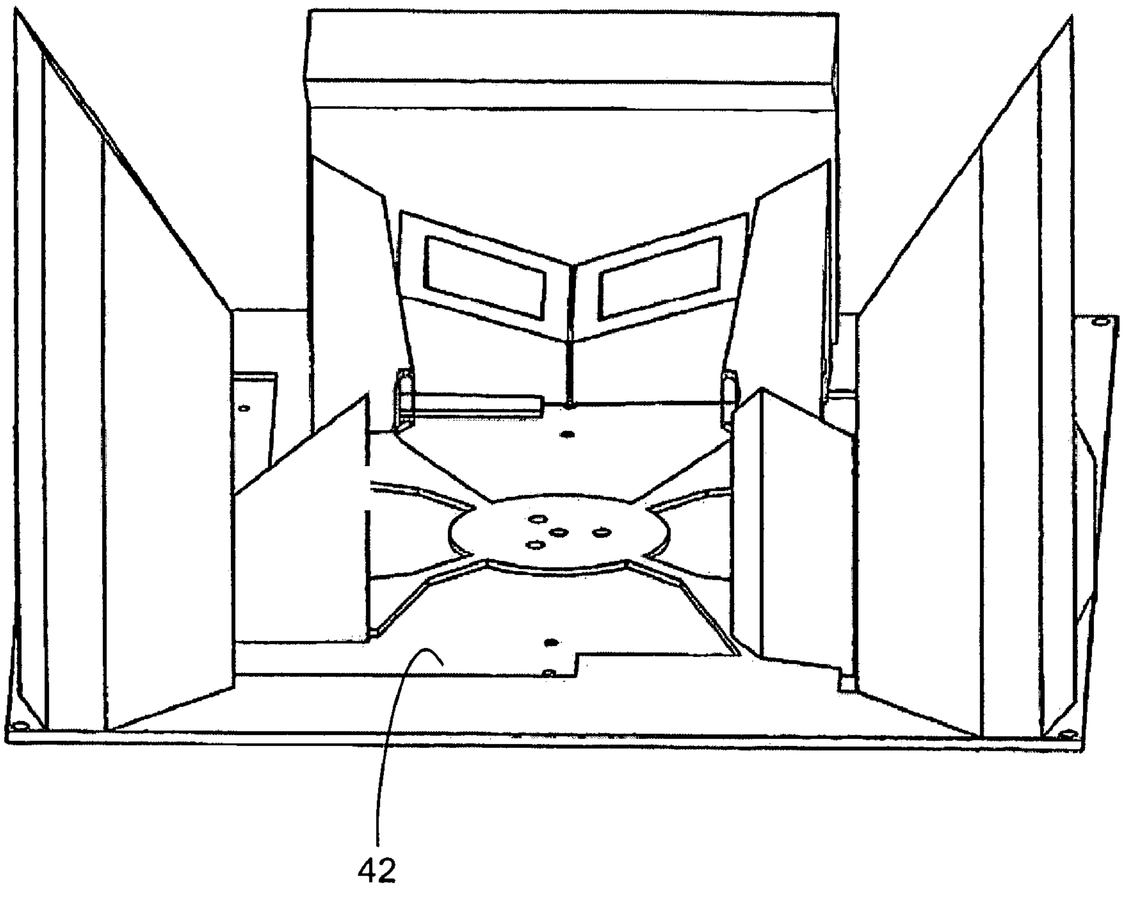
FIG. 1H is a perspective view of the optical bench employed in the bioptical holographic scanning system of FIG. 1D.
Figure 7A:
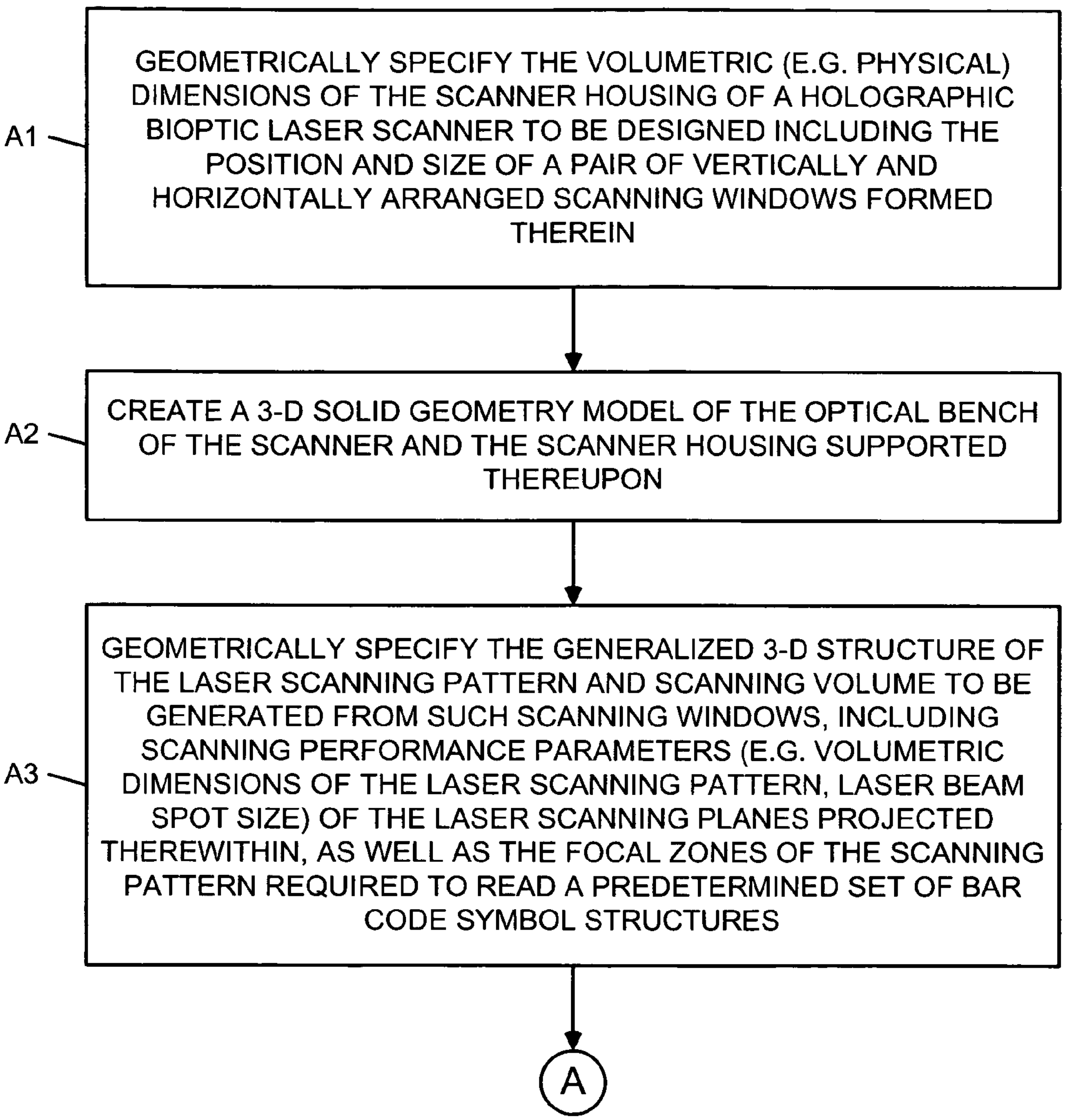
Figure 7B:
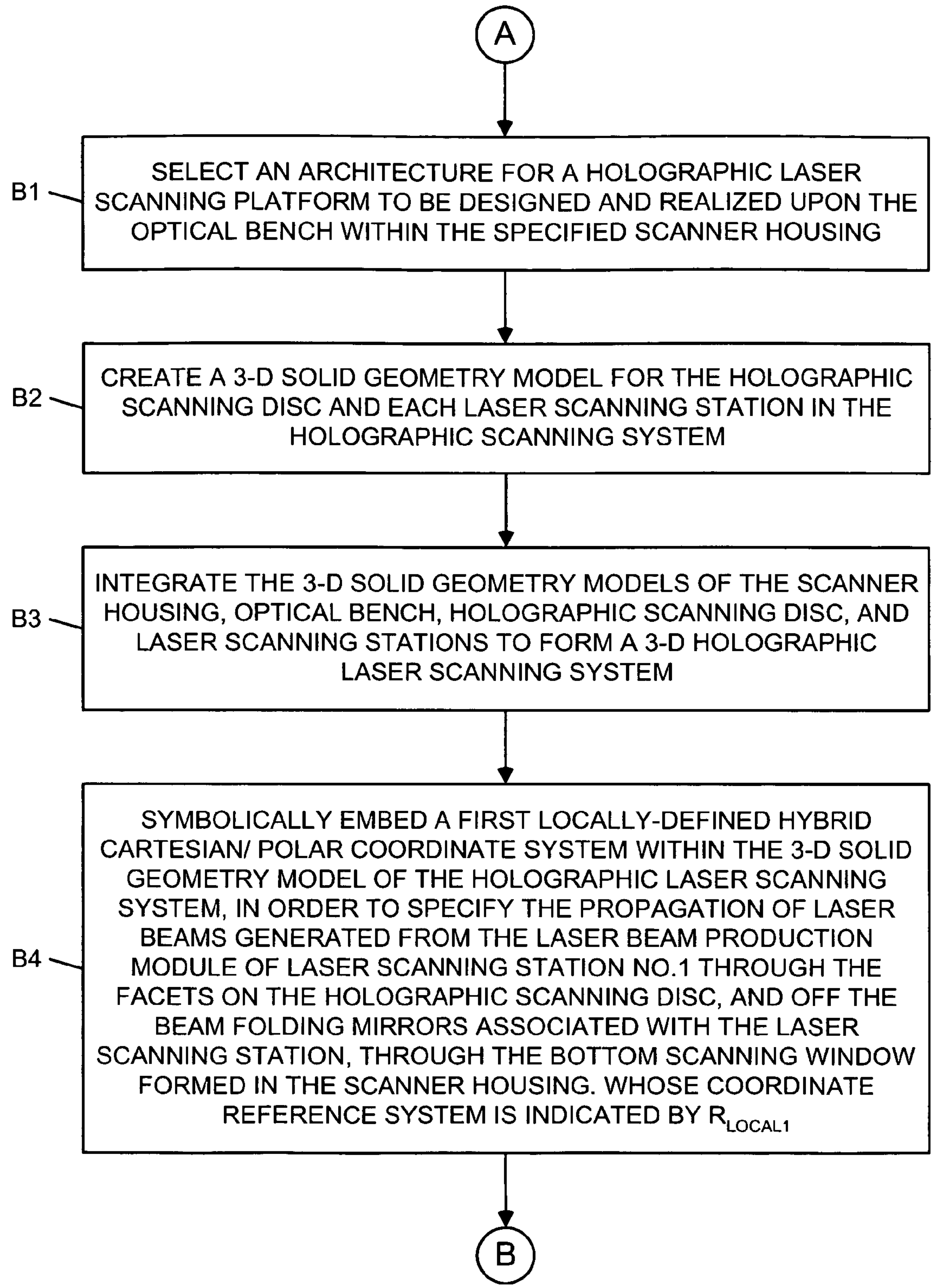
Figure 7D:
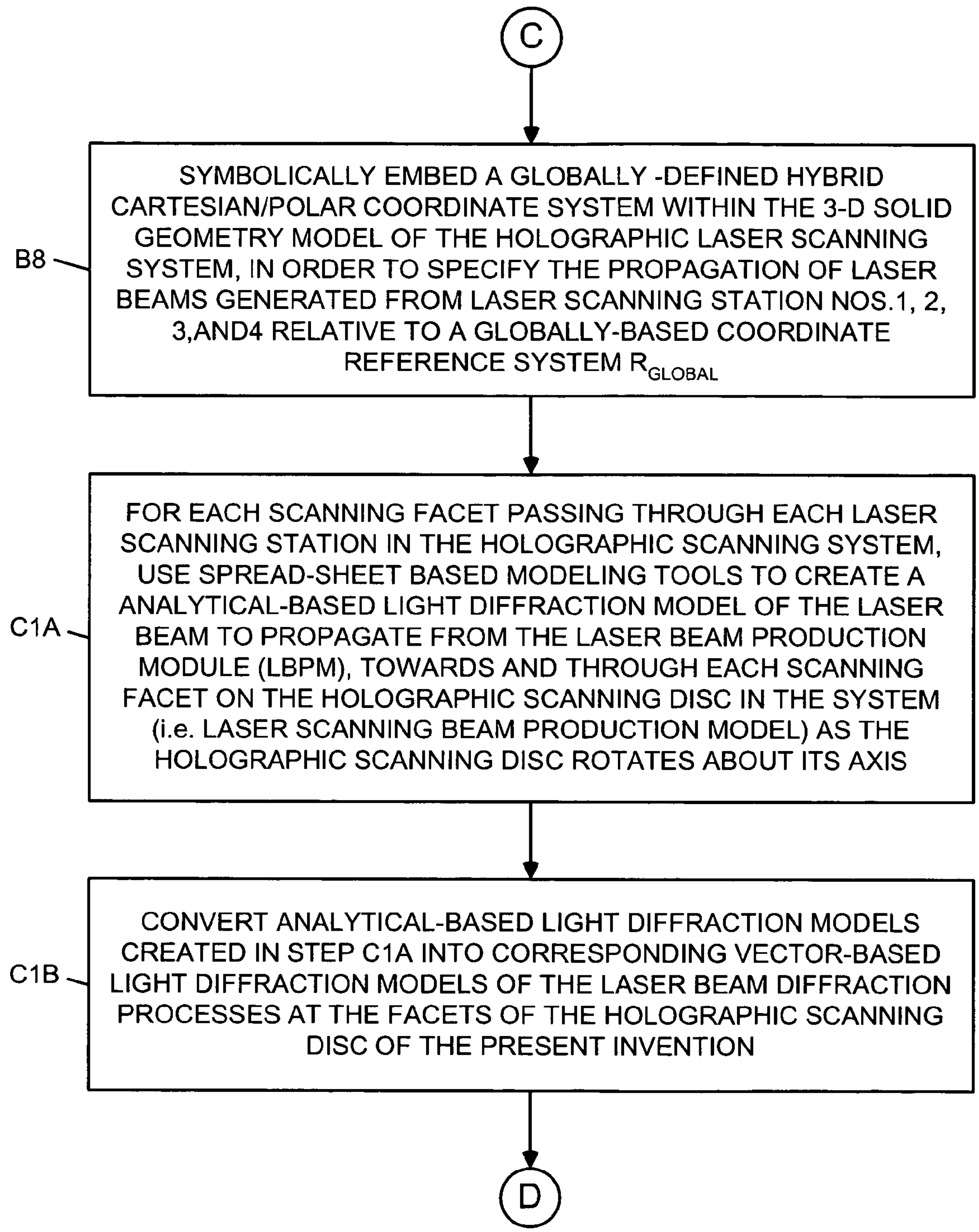
Figure 7E:
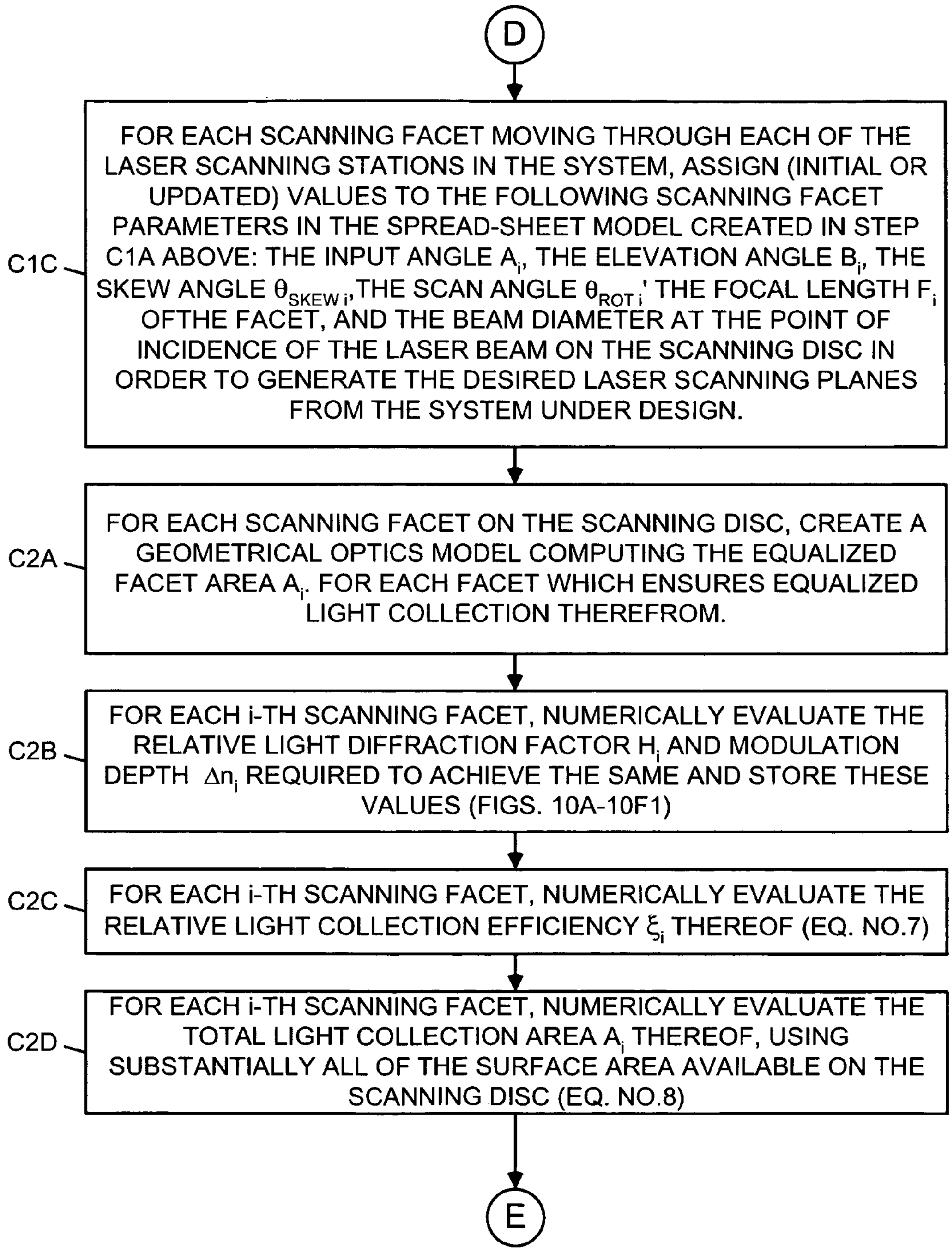
Figure 7F:
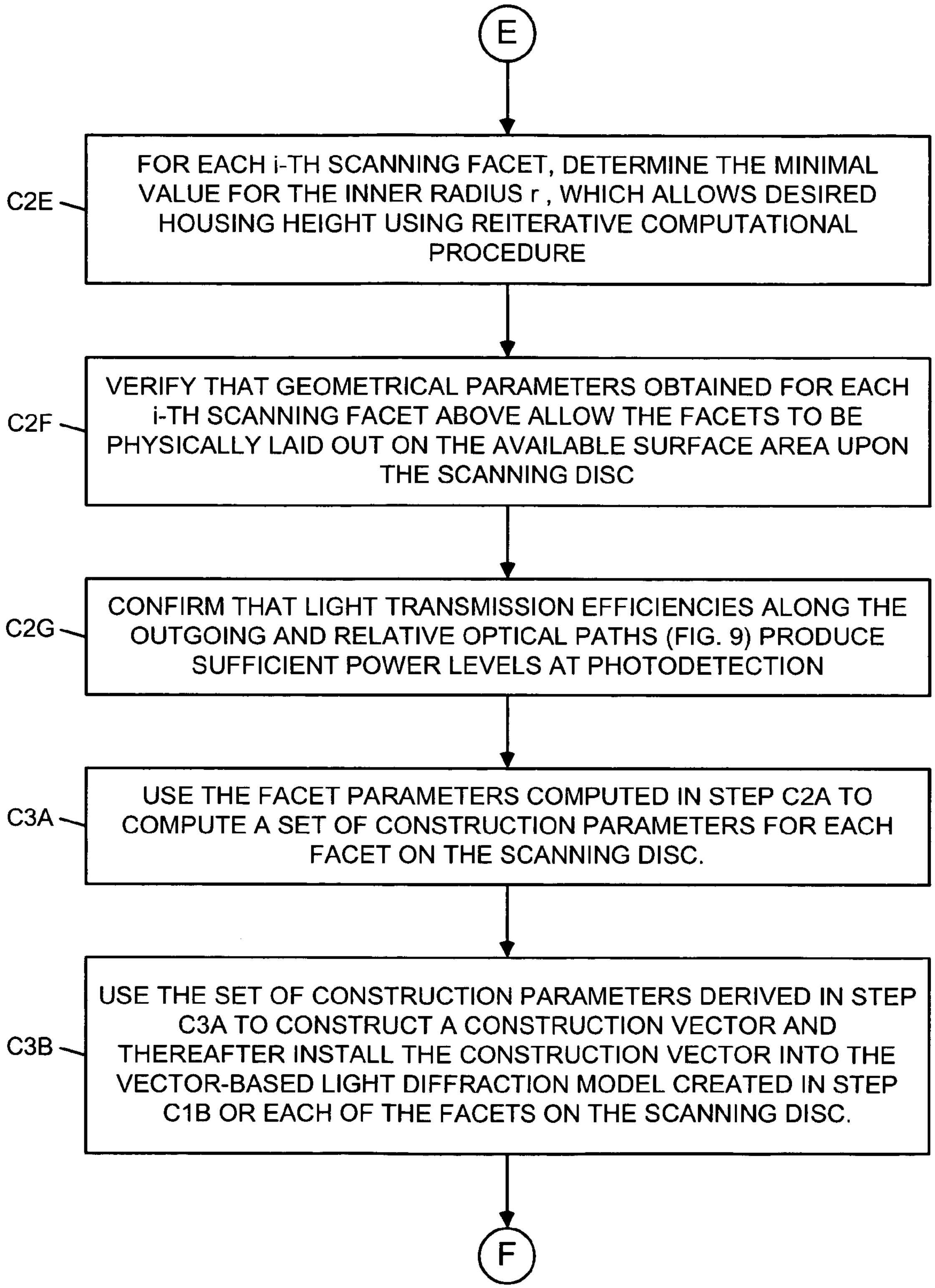
Figure 7G:
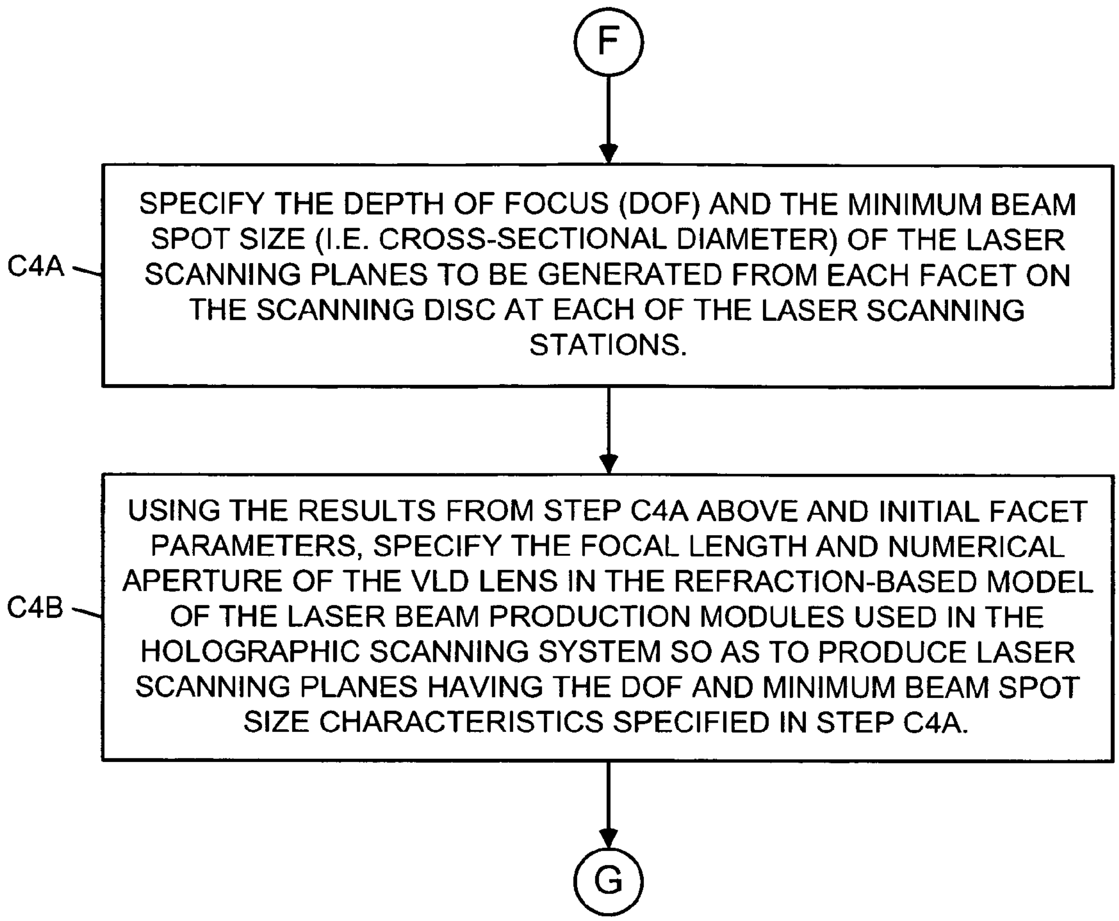
Figure 7H:
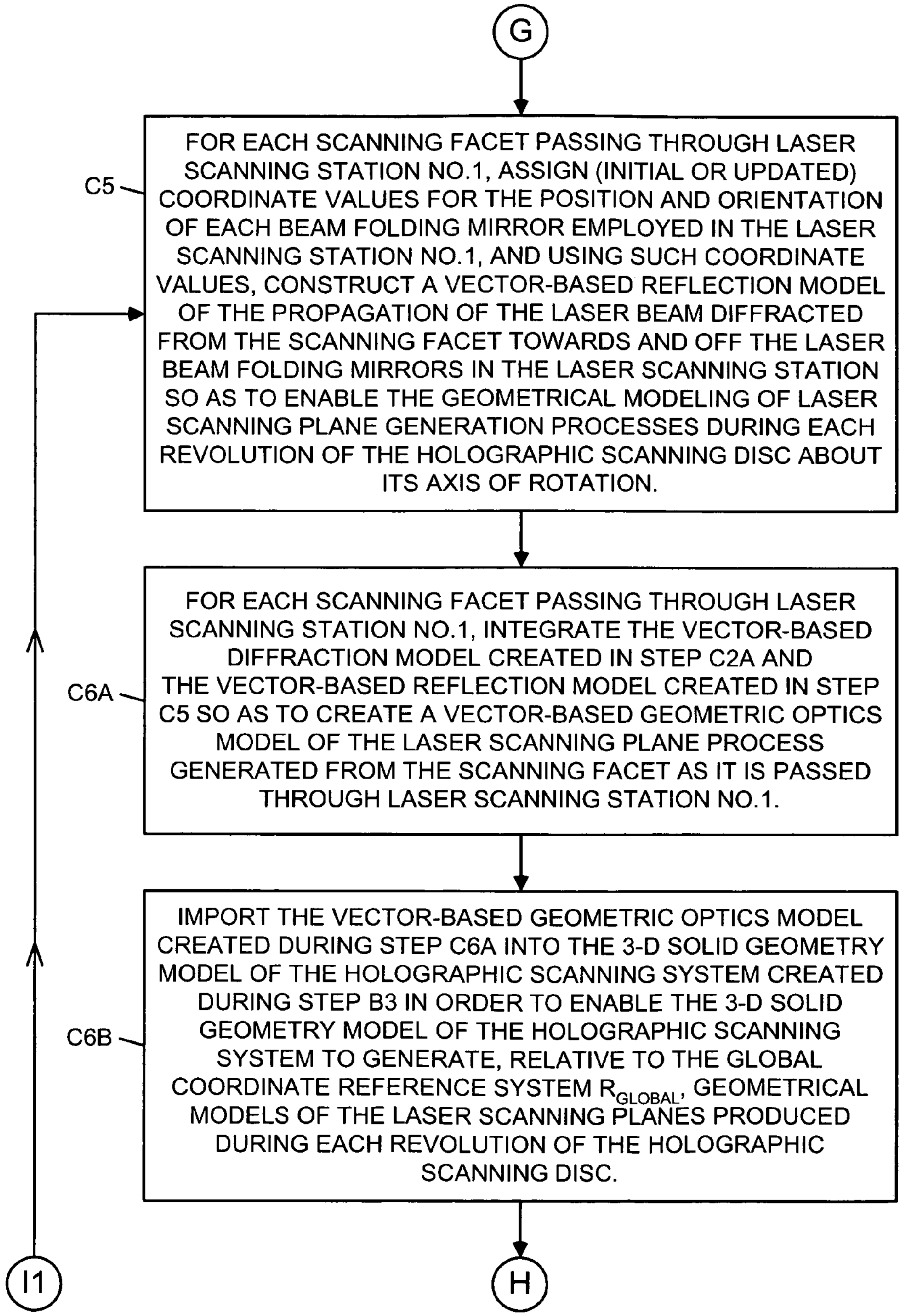
Figure 7I:
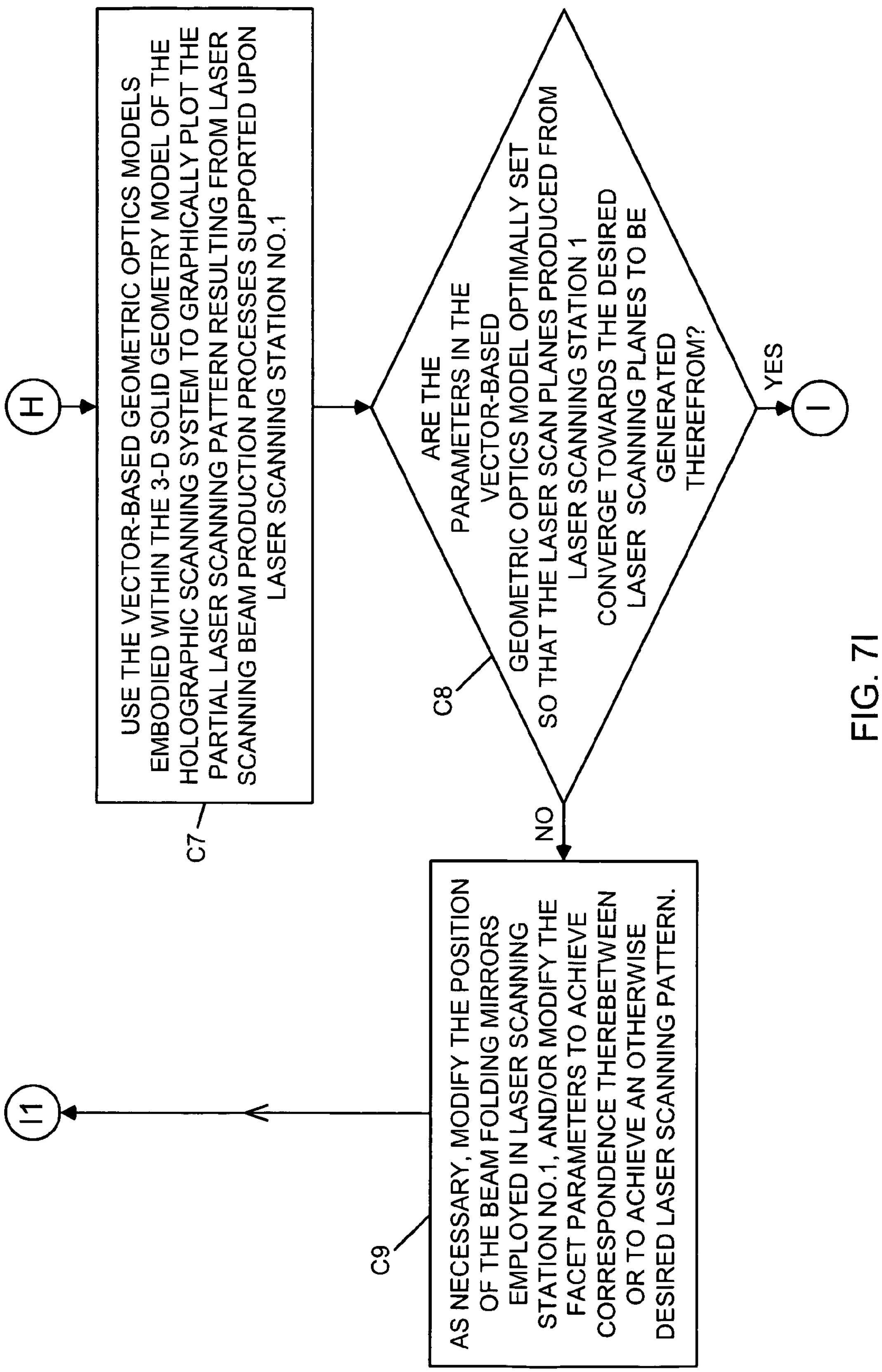
Figure 7J:
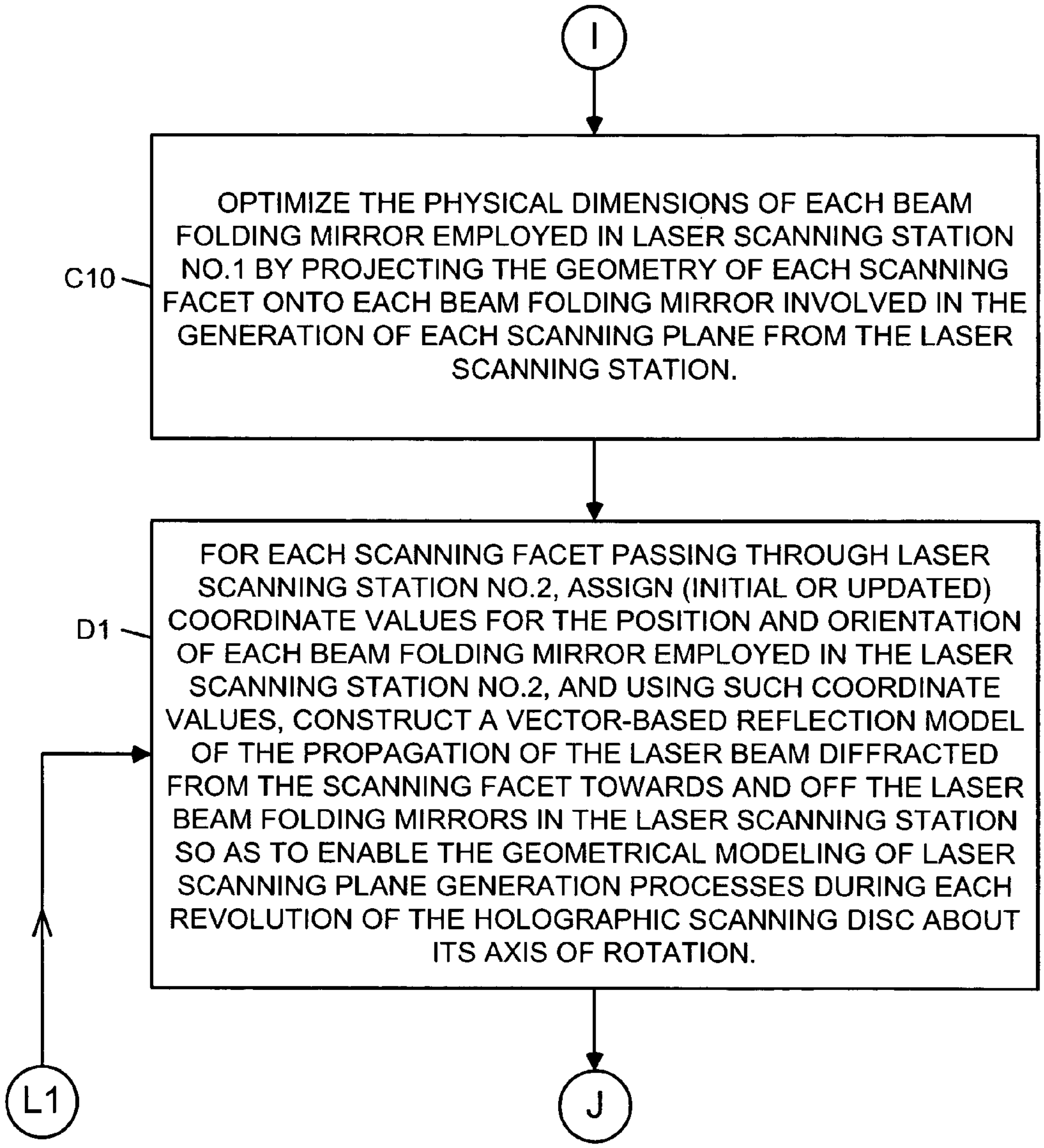
Figure 7K:
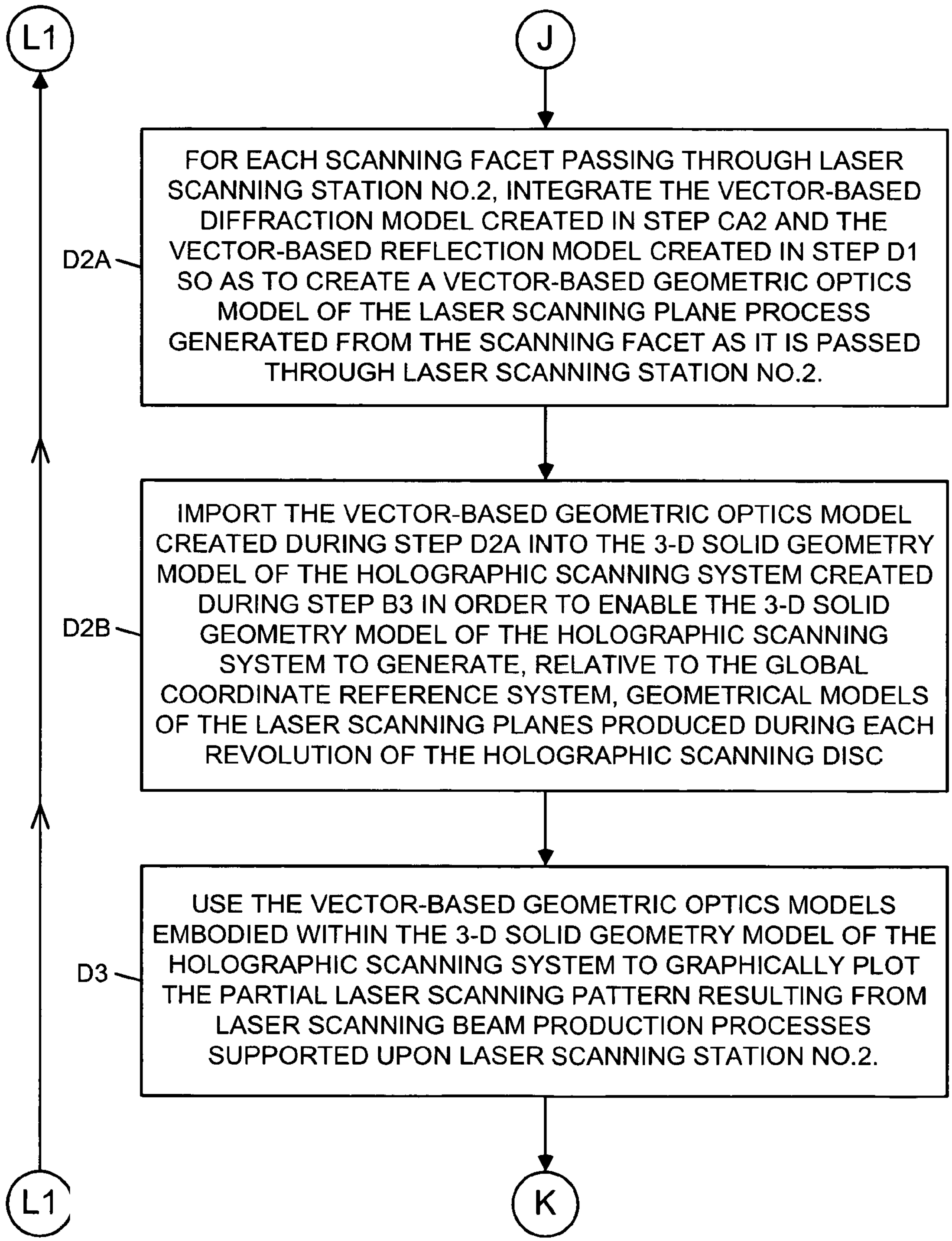
Figure 7L:
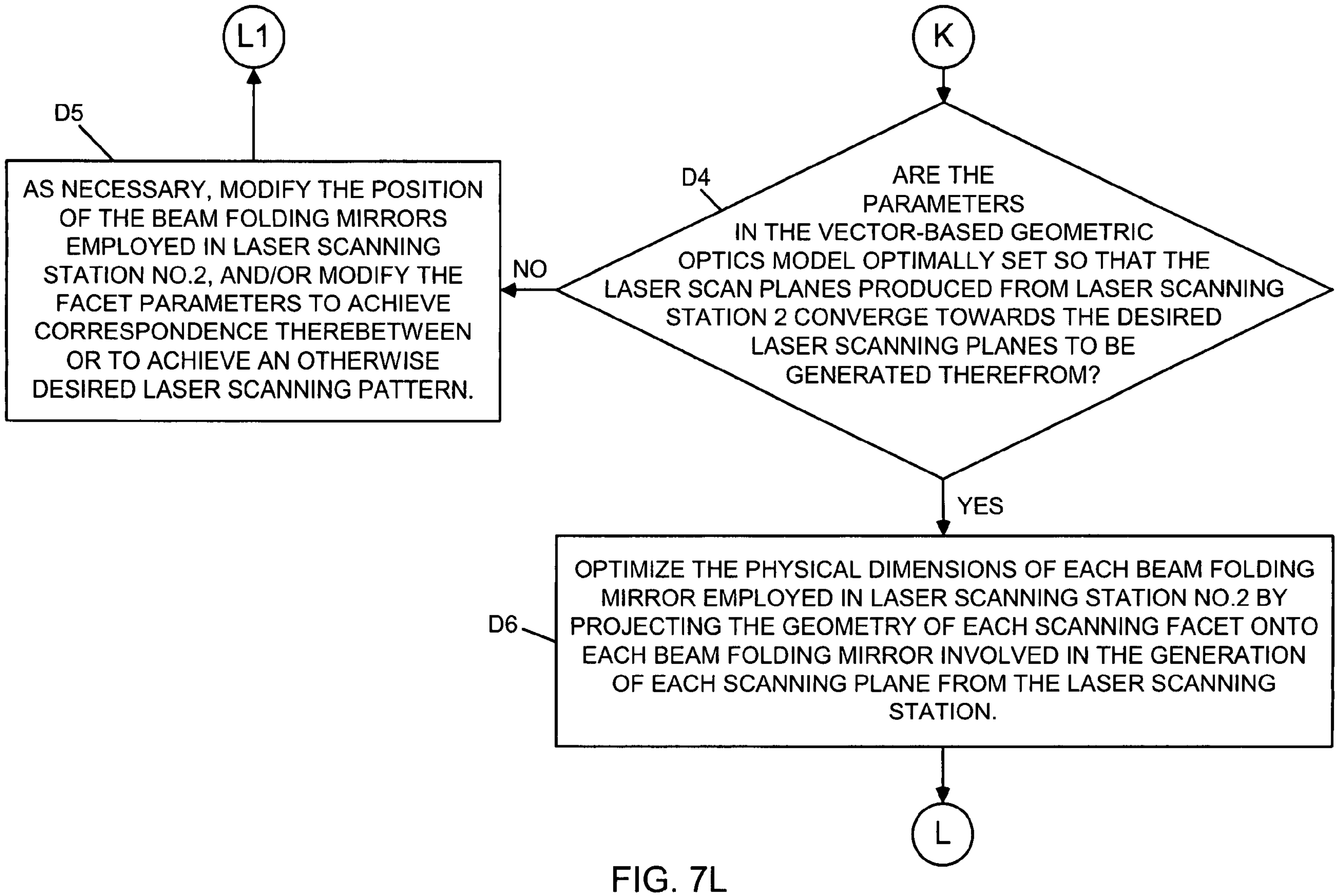
Figure 7M:
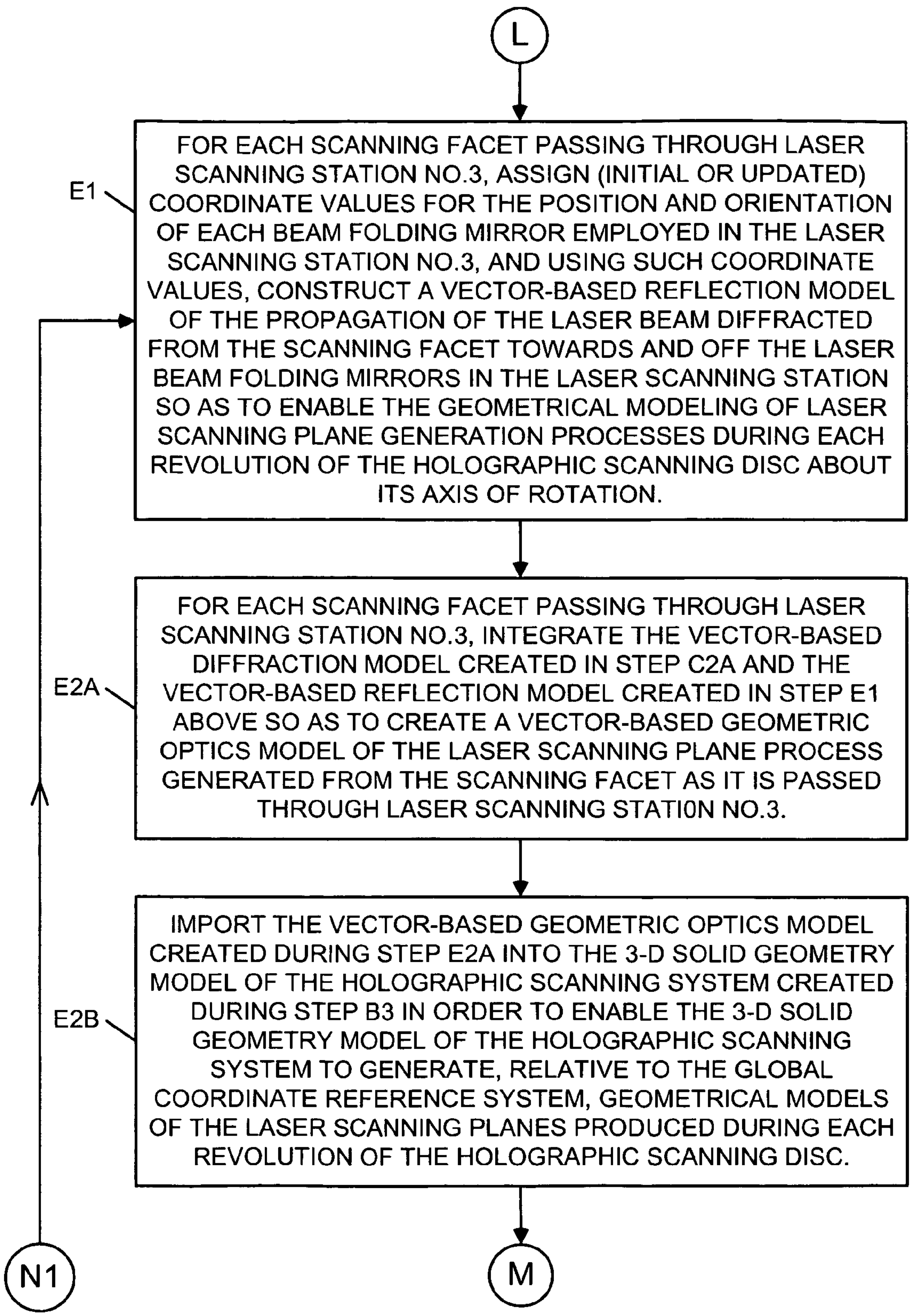
Figure 7N:
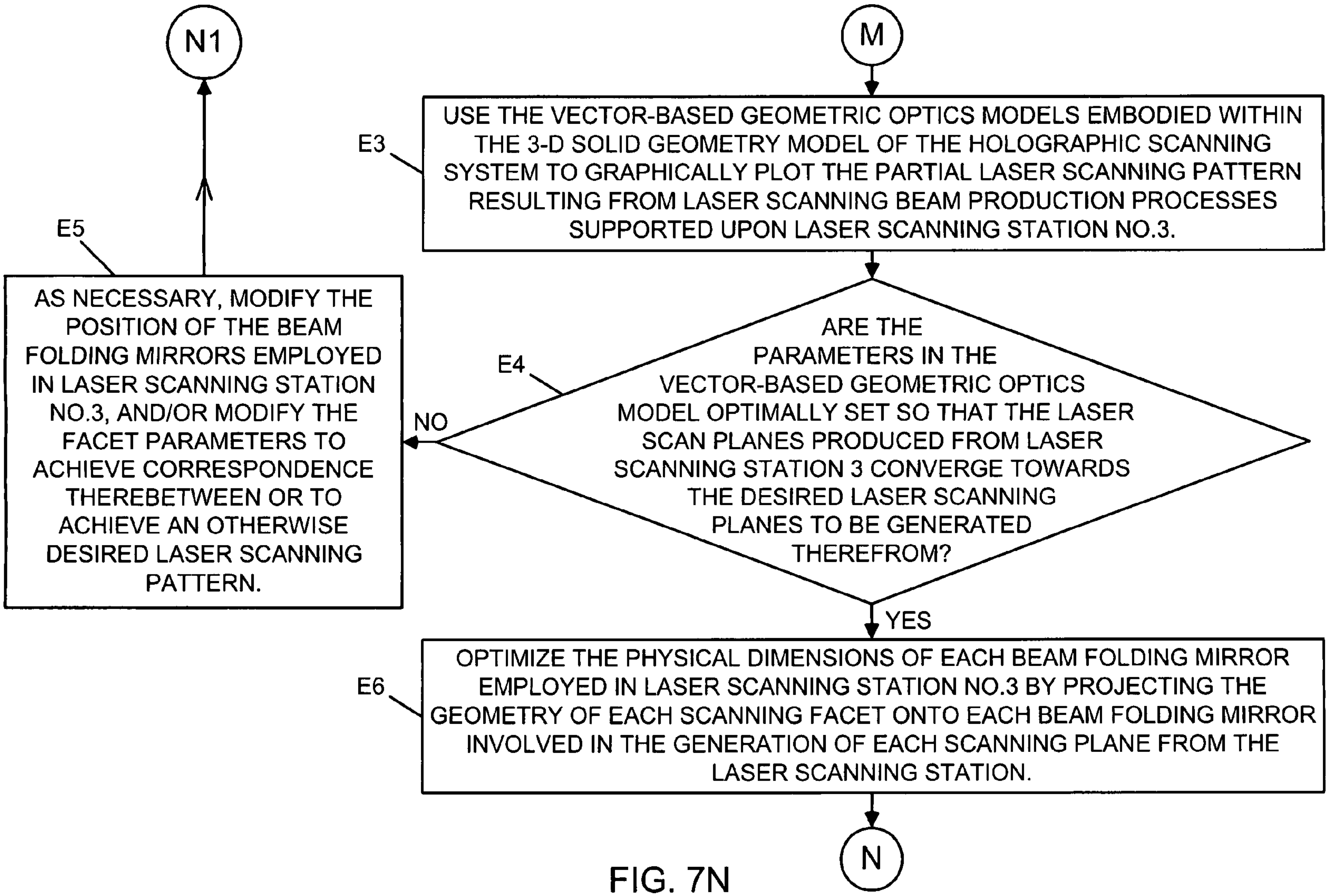
Figure 7O:
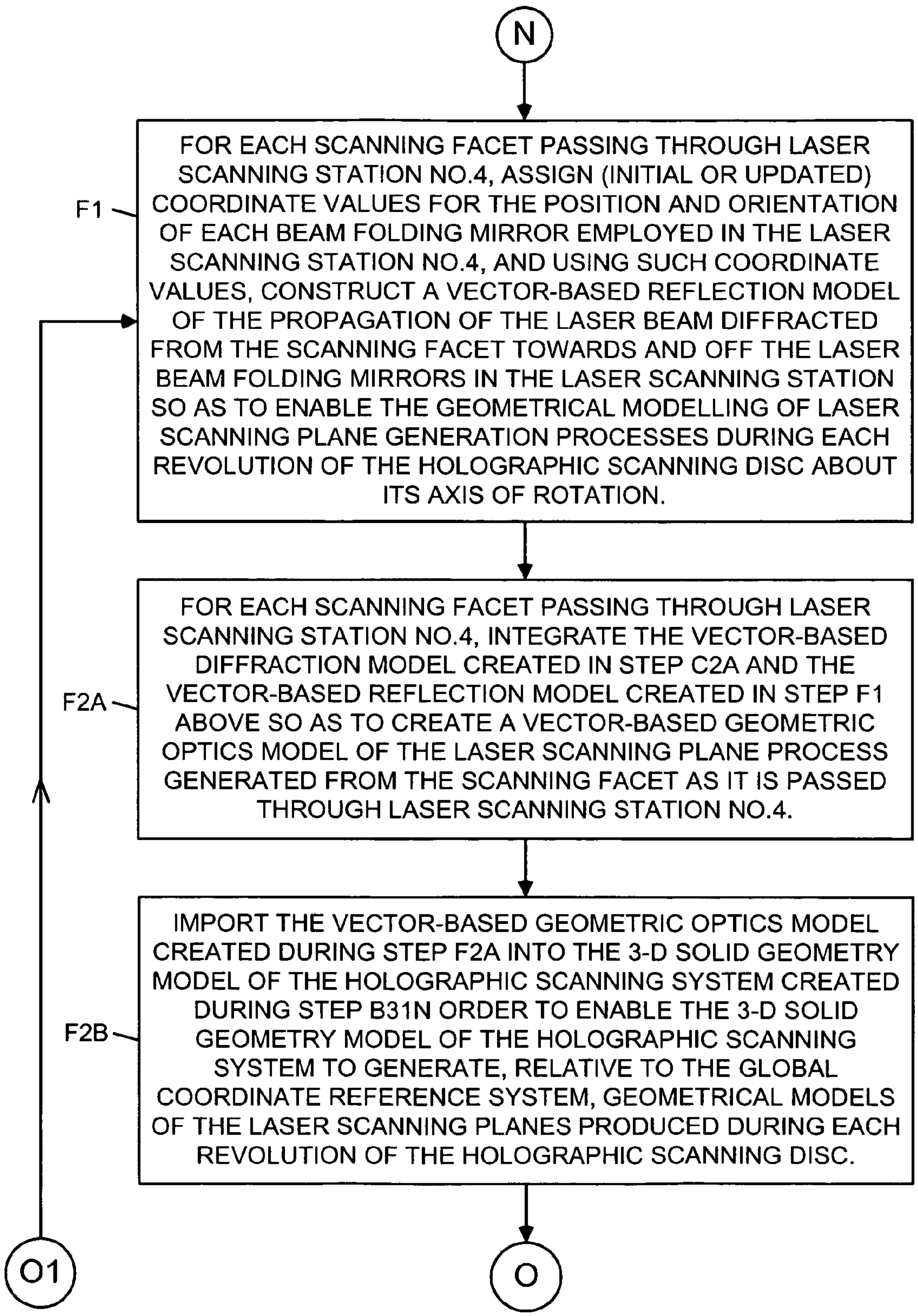
Figure 7P:
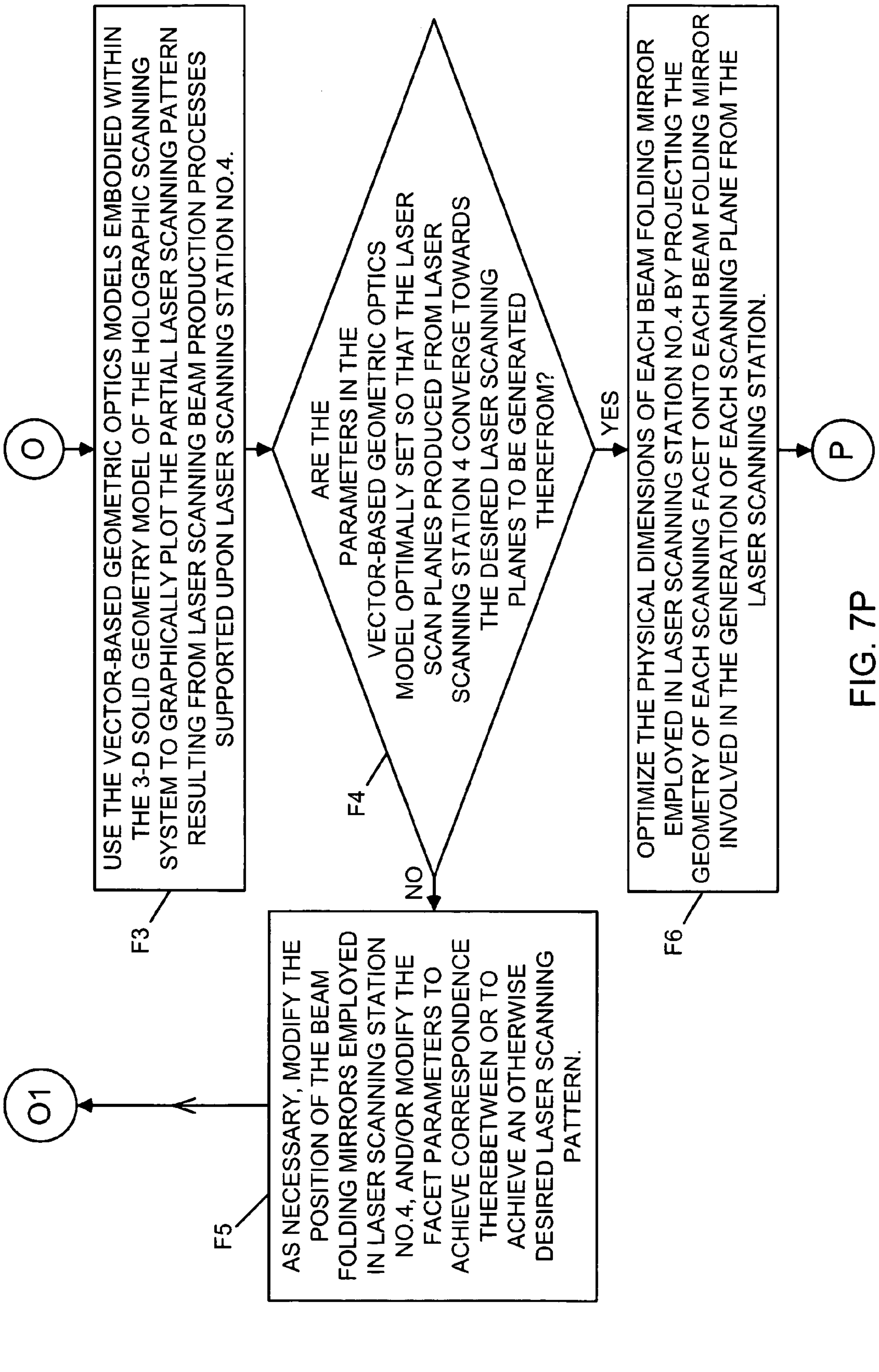
Figure 7Q:
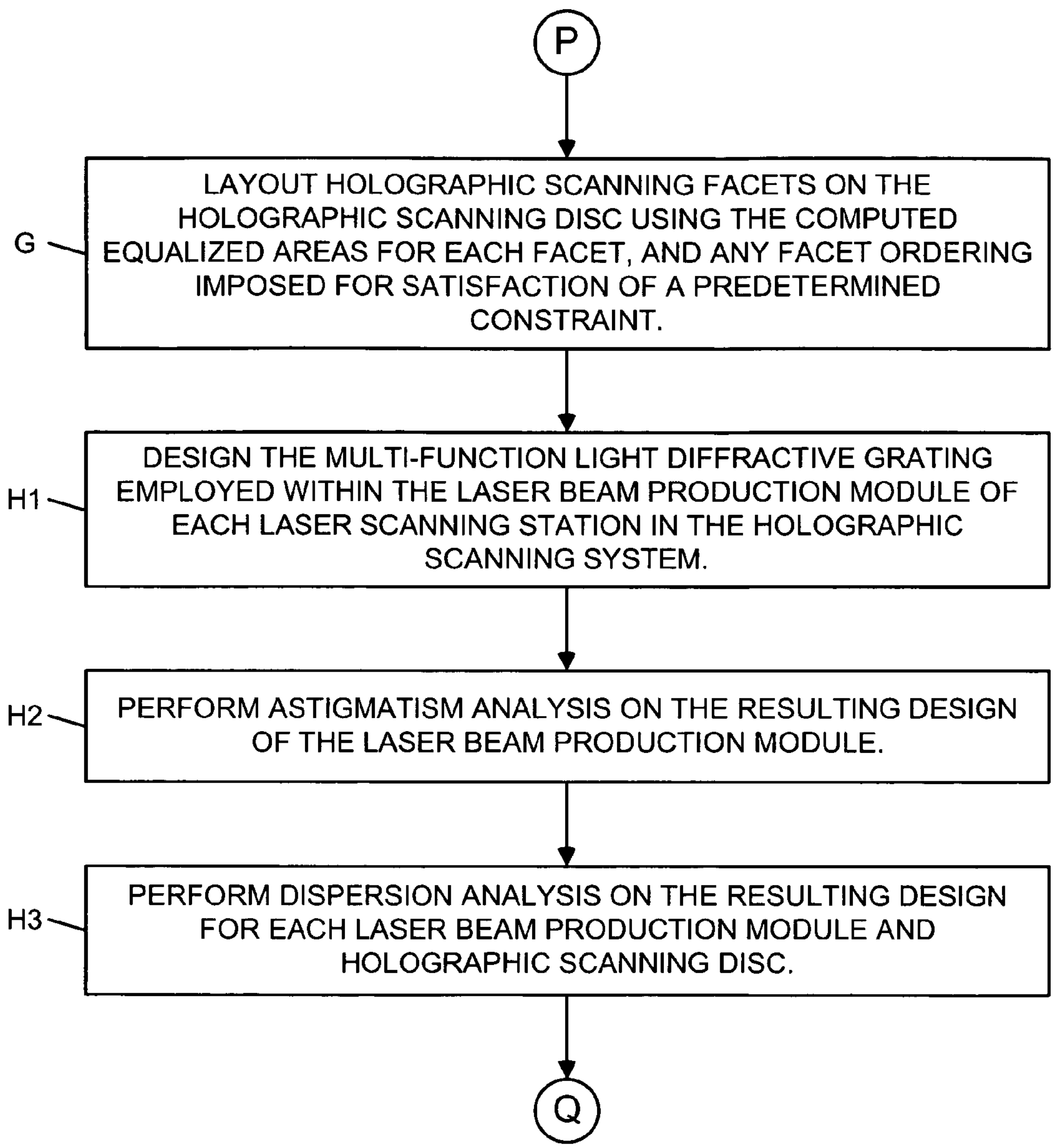
Figure 7R:
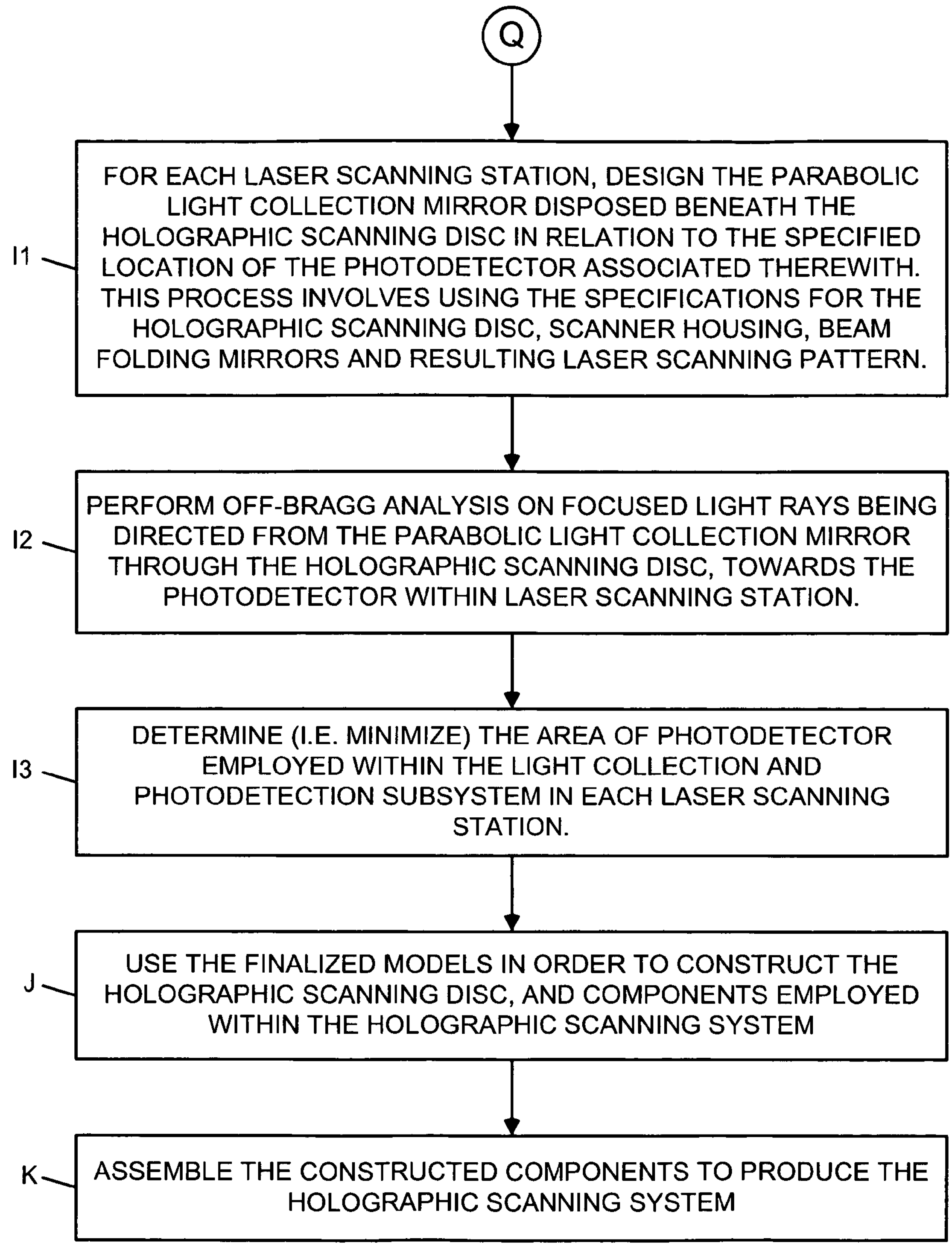
Figure 8A:
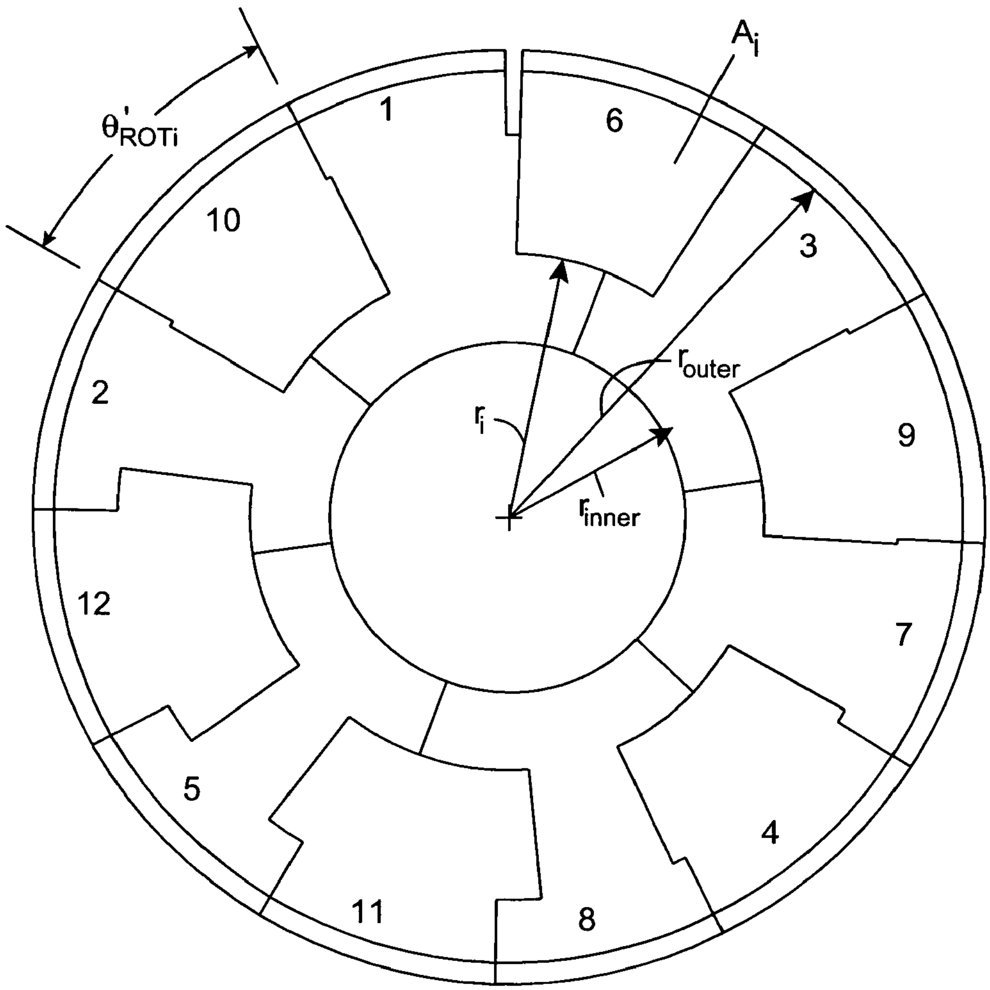
Figure 8B:
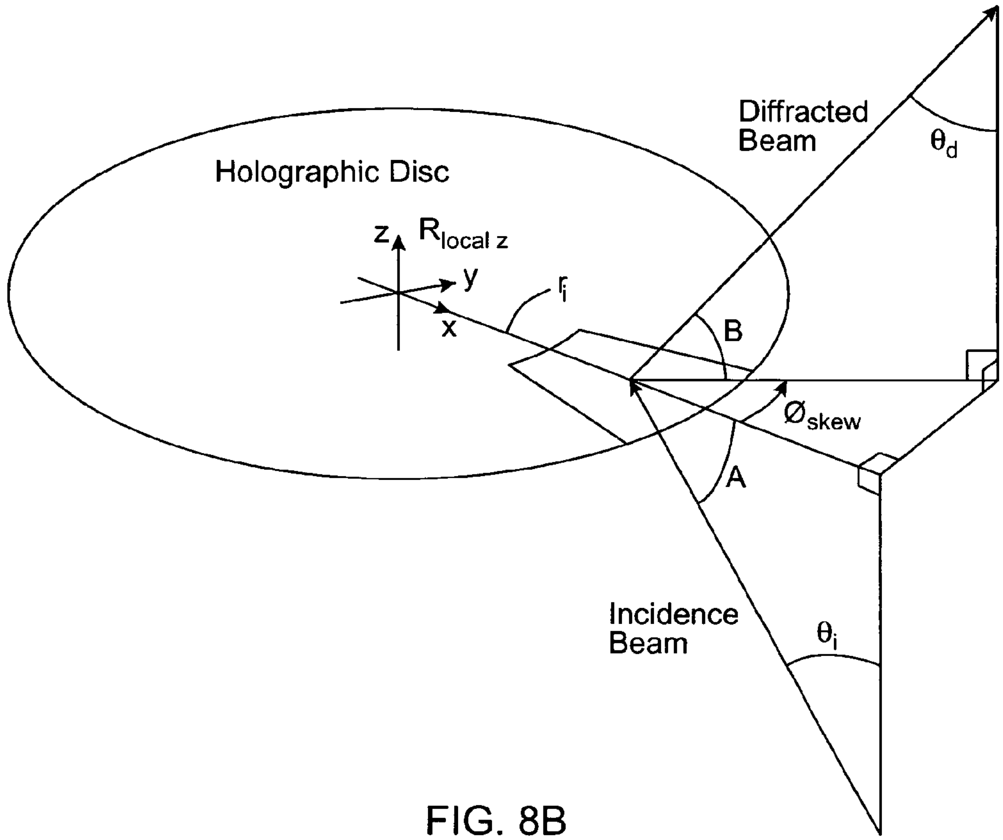
Figure 8C:
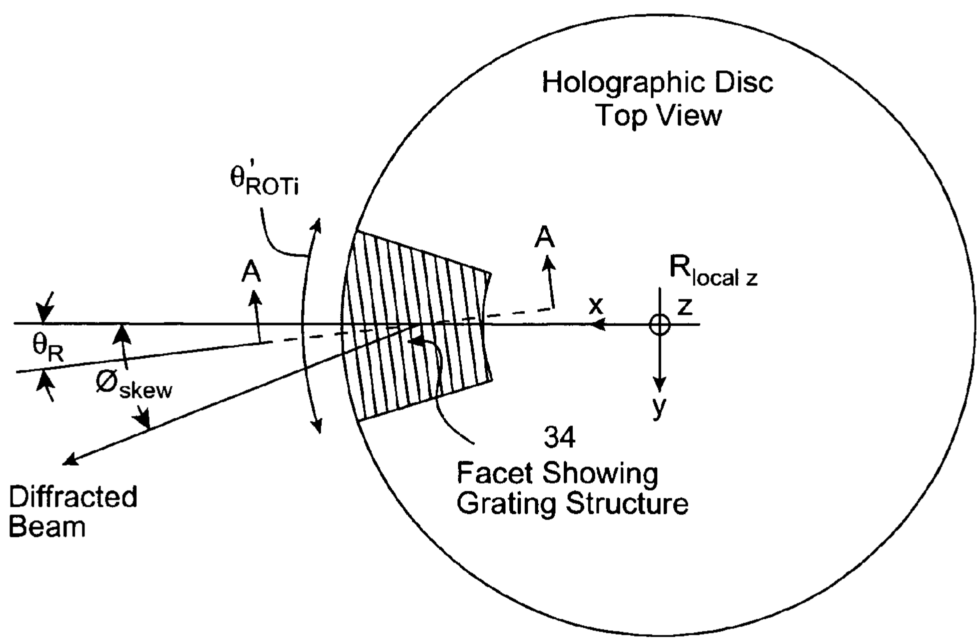
Figure 12D:
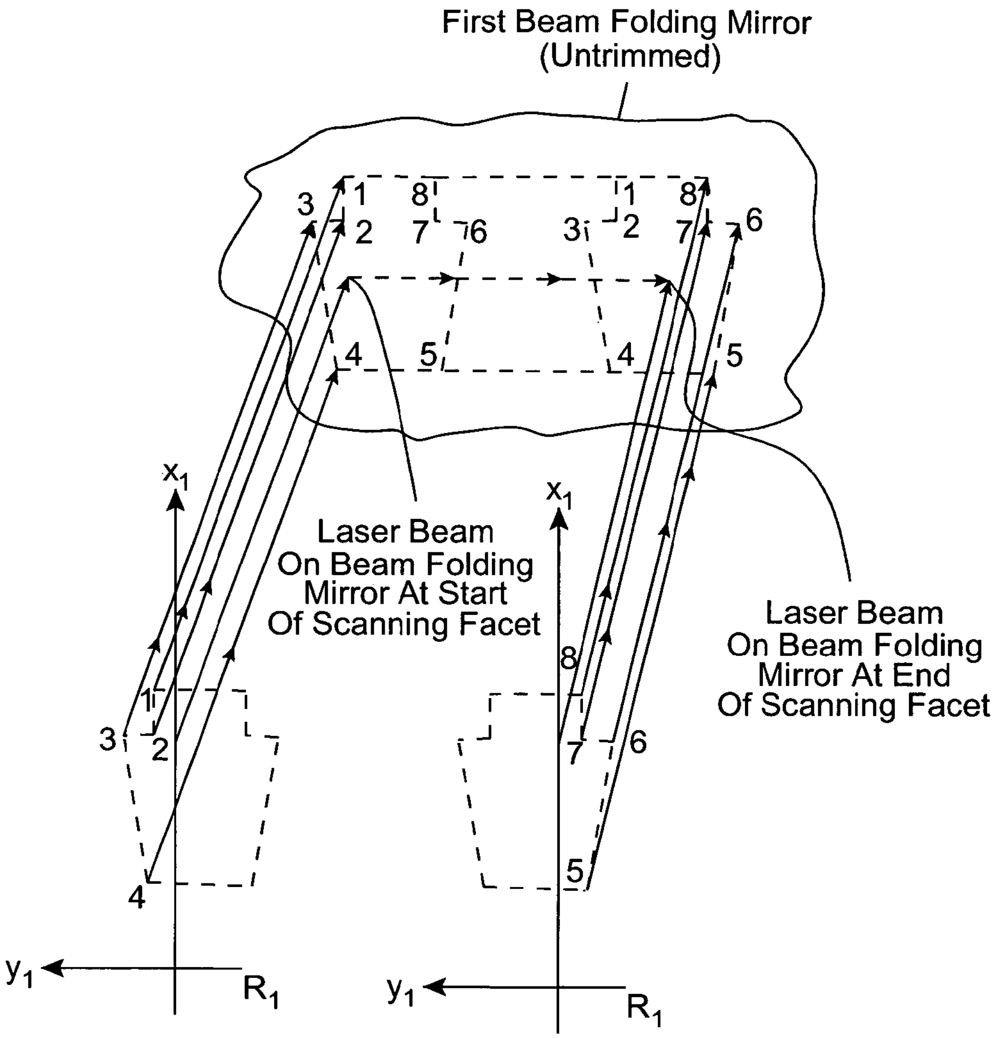
Figure 16A:
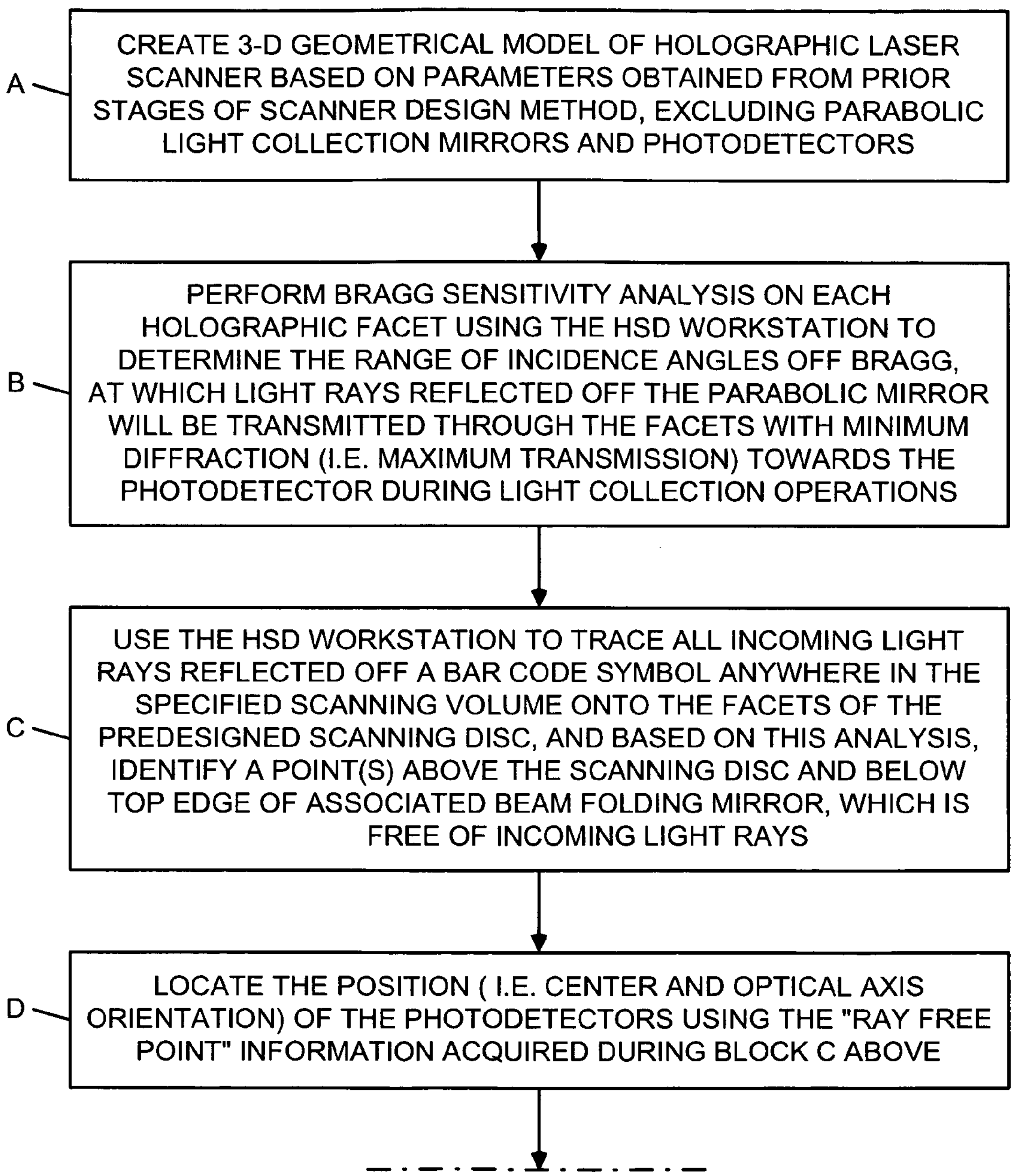
Figure 16B:
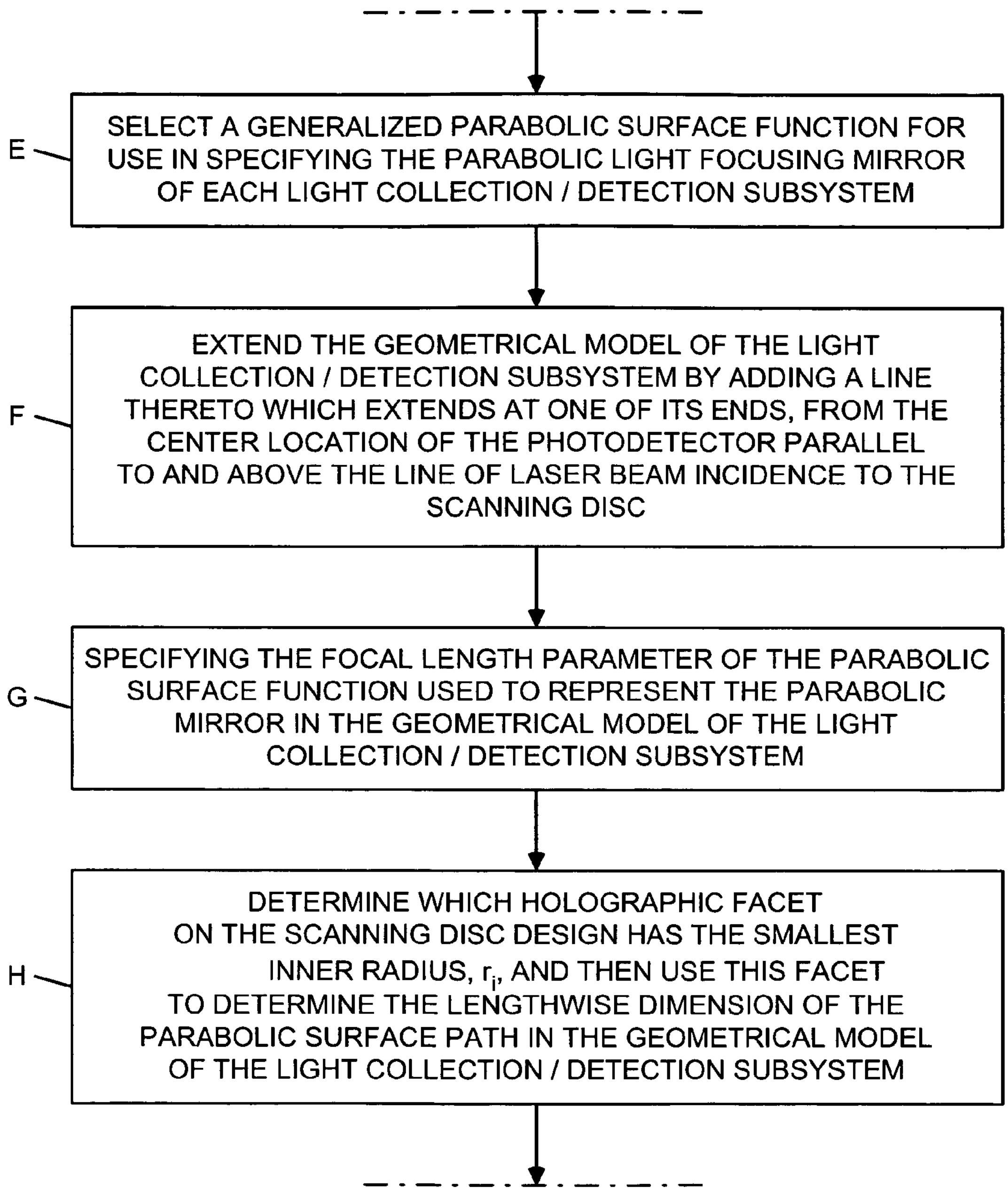
Figure 16C:
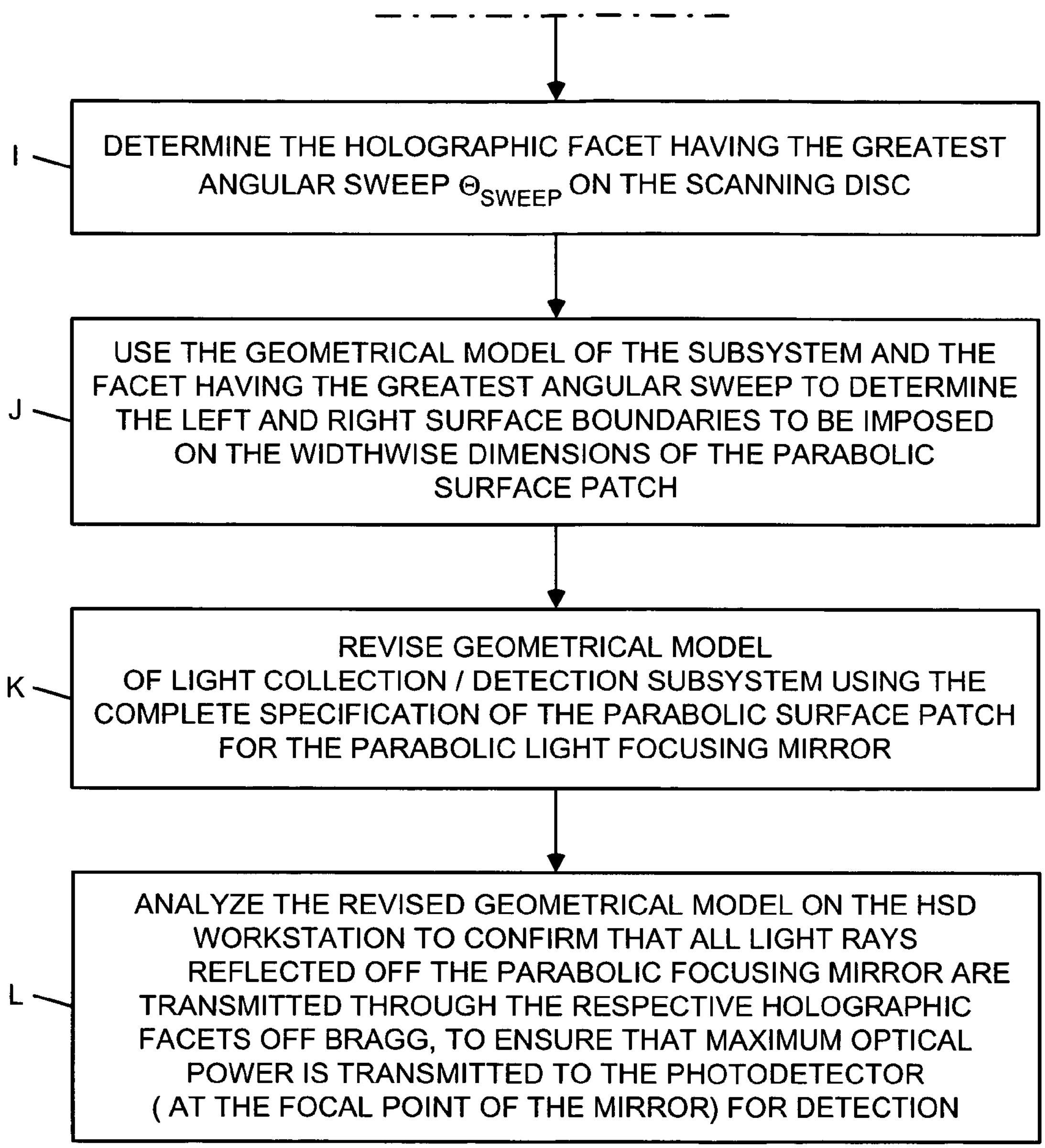
Figure 17A:
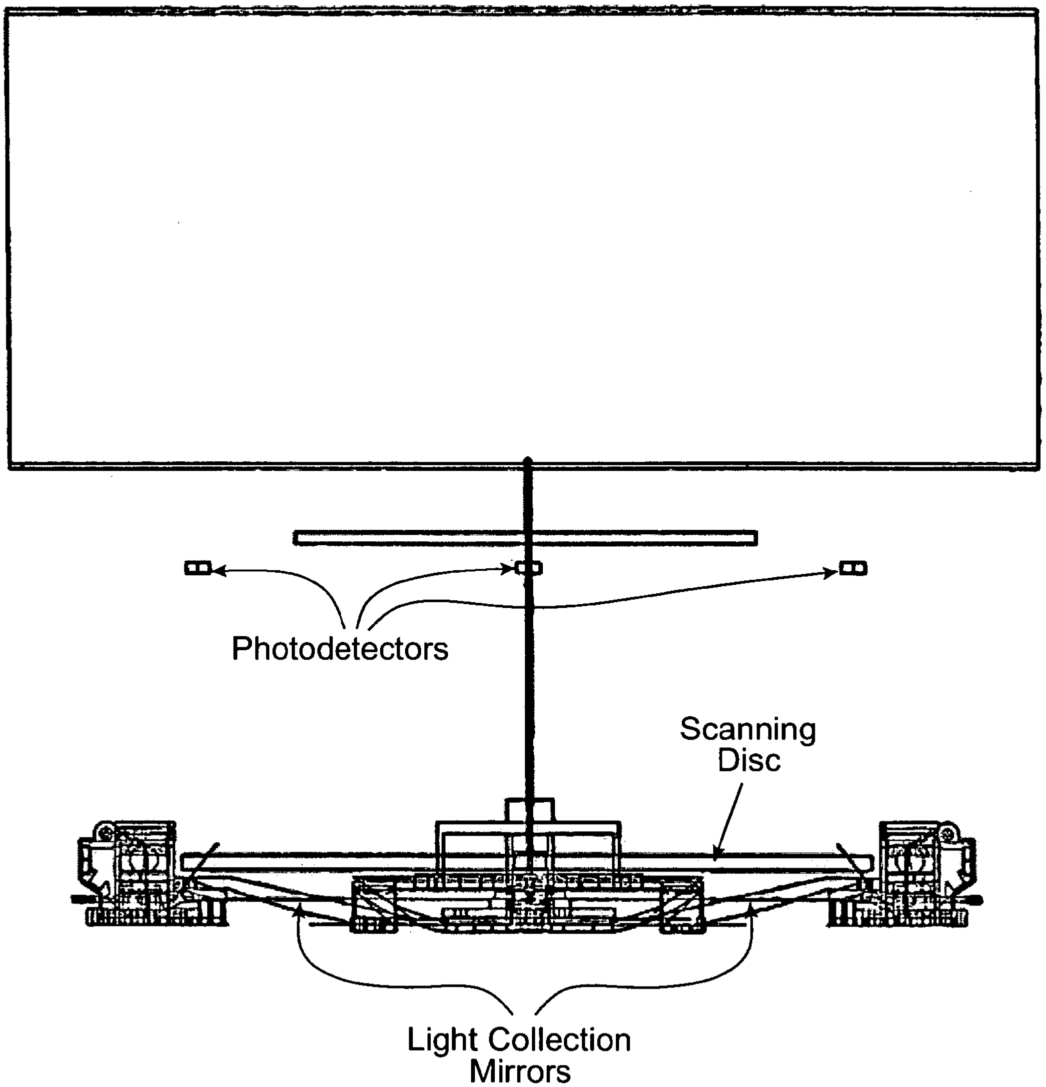
Figure 17B:
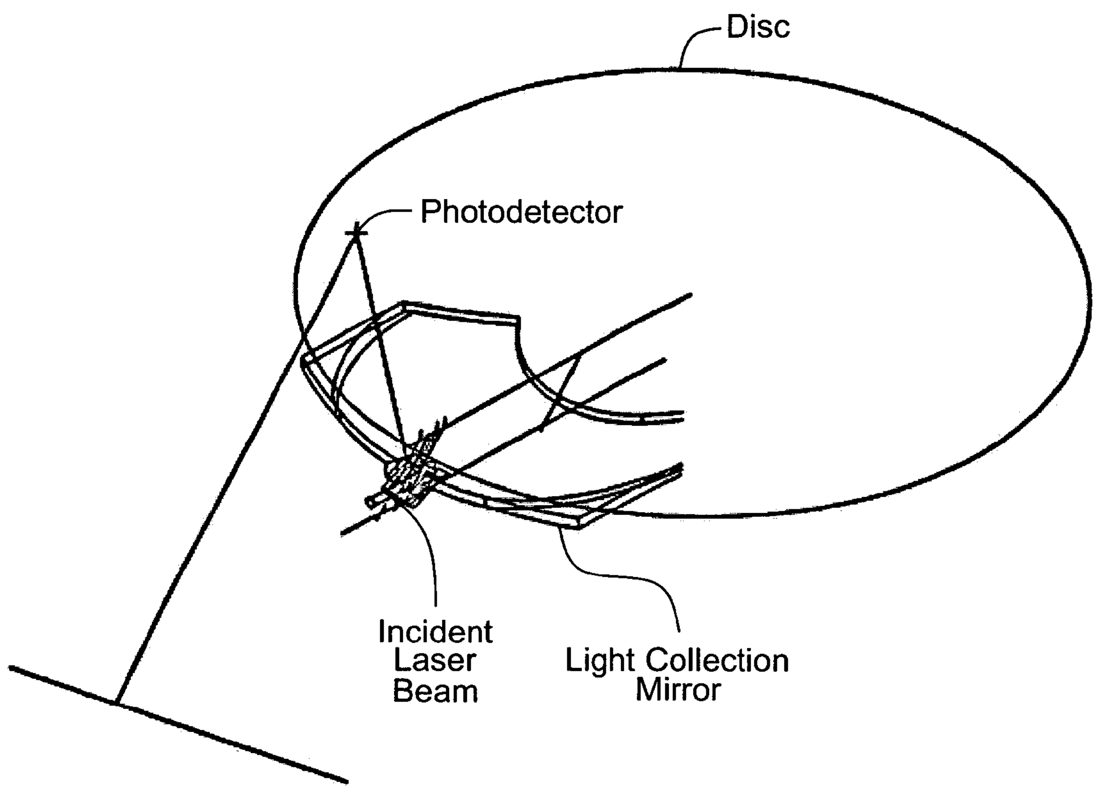
Figure 18:
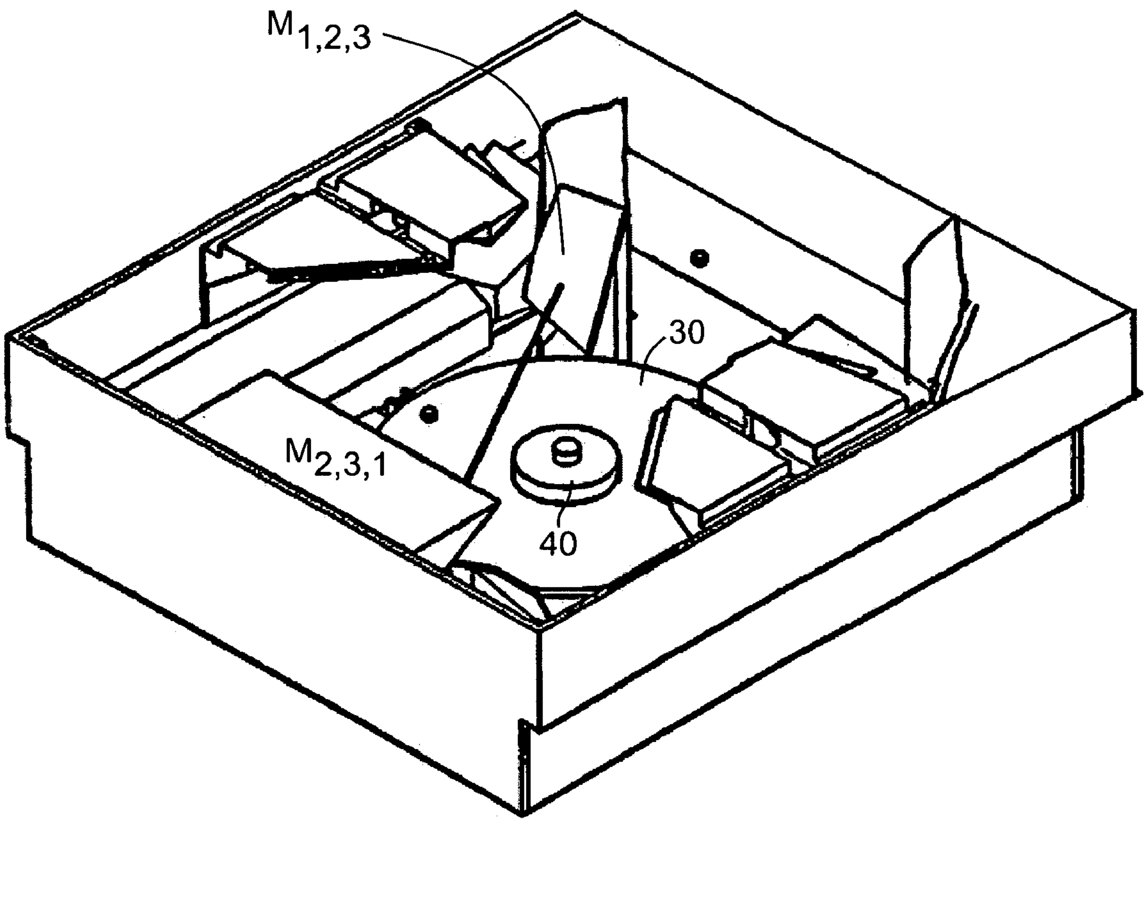

FIGS. 7A through 7R, taken collectively, set forth the steps carried out in a preferred method of designing and constructing the bioptical holographic laser scanning system of the illustrative embodiment;

FIG. 8A is a schematic diagram of the holographic scanning disc of the illustrative embodiment designed and constructed according to the method of the present invention, and indicating the various geometrical parameters used to specify the geometrical optical characteristics of each i-th holographic scanning facet thereof;

FIG. 8B is a perspective view of a geometrical optics model of the process of producing the P(i,j)-th laser scanning plane of the system by directing the output laser beam from the j-th laser beam production module through i-th holographic scanning facet supported upon the holographic scanning disc as it rotates about its axis of rotation, wherein various parameters employed in the model, including the beam angle of incidence, beam diffraction angle, beam elevation angle, beam scan angle, and beam skew angle are schematically defined;

FIG. 8C is a plan view of the geometrical optics model of FIG. 8B, defining, in greater detail, the skew angle and angle of rotation of the scanning facet with respect to the local coordinate reference system symbolically embedded within the exemplary laser scanning station of the present invention;

FIGS. 8D1 and 8D2, collectively, show a table listing parameters used to construct the vector-based geometrical optics model shown in FIGS. 8A, 8B and 8C;

FIG. 8E is a table listing mathematical equations used to describe structural and functional relationships among particular parameters in the geometrical optics model of FIGS. 8A and 8D;

FIG. 8F1 is a vector-based model of the light diffraction process carried out when a substantially collimated laser scanning beam (indicated by $R_x$) is transmitted from its laser beam production model, through an arbitrary point (x) along the center portion of a holographic scanning facet during scanning operations, and diffracted along an outgoing scanning direction specified by vector $O_x$, towards the focal point of the scanning facet, as shown in FIGS. 8A through 8C;

FIG. 8F2 is a vector-based model of the light diffraction process carried out when a substantially collimated laser scanning beam (indicated by $R_x$) is transmitted from its laser beam production model, through an arbitrary point (x) along the center portion of a holographic scanning facet during scanning operations, and diffracted along a prespecified outgoing scanning direction specified by vector $O_x$, towards the focal point of the scanning facet, as shown in FIGS. 8A through 8C;

FIGS. 8F3 and 8F4 set forth a vector-based model of the outgoing laser beam diffracted by an exemplary scanning facet, showing the components of the outgoing laser beam expressed in terms of the focal length, beam elevation angle, beam rotation angle, and beam skew angle characteristics of the scanning facet;

FIG. 8F5 is a table setting forth mathematical expressions defining relationships between the vector components in the models of FIGS. 8F3;

FIGS. 9A through 9C set forth a spreadsheet-type information table listing calculated parameters used to analyze the light transmission efficiency of the laser scanning beam and calculate the optical power of the laser scanning beam at the data photodetector and the resulting signal levels, for targets located at the local planes and targets located at the maximum depth of field limits of each laser scanning facets;

FIG. 10A1 is a geometrical optics model illustrating the path traveled by the light rays associated with an incident laser beam being initially diffracted by a rotating holographic facet towards a bar code symbol, then returning light rays reflected therefrom (according to Lambert's law) being diffracted again by the same holographic facet towards a light focusing parabolic mirror disposed beneath the scanning disc, and finally the focused light rays being transmitted through the same holographic facet without diffraction towards its photodetector disposed substantially above the point of laser beam incidence on the scanning disc;

FIGS. 10A2 through 10A4 set forth geometrical optics models of the process of a laser beam propagating through a holographic facet on the rotating holographic scanning disc shown in FIG. 10A1, which are used during the disc design process of the present invention to compute the normalized total out-and-back light diffraction efficiency of each holographic facet to S and P polarized light when no cross-polarizer is used before the photodetector in the holographic laser scanning system;

FIG. 10B sets forth a set of parameters used to represent the geometrical optics models of FIGS. 10A1 through 10A4;

FIGS. 10C1 and 10C2 set forth a first set of mathematical expressions (Nos. 1–5, 9, 20, 21) which describe structural and functional relationships among particular parameters of the geometrical optics model of FIGS. 10A1 through 10A4, and a second set of equations (Nos. 6-8, 10-19) which are used to define (1) the light diffraction efficiency of the i-th holographic scanning facet to S-polarized outgoing light rays incident on the holographic scanning disc, (2) the light diffraction efficiency of the i-th holographic scanning facet to P-polarized outgoing light rays incident on the holographic scanning disc, and (3) the total out-and-back light diffraction efficiency of the i-th holographic scanning facet to S-polarized outgoing light rays incident on the holographic disc, each being expressed as a function of the modulation-depth (i.e. modulation-index) within a fixed thickness gelatin;

FIG. 10D1 sets forth a set of graphs plotting, as a function of the disc rotation, prior to facet optimization, (1) the light diffraction efficiency of the first holographic scanning facet (No. 1) to S-polarized outgoing light rays incident thereto, (2) the light diffraction efficiency of the first holographic scanning facet to P-polarized outgoing light rays incident thereto, (3) the total out-and-back light diffraction efficiency of the first holographic scanning facet to S-polarized outgoing light rays incident, and (4) an intensity of the relative signal (i.e. $T_s \cos \theta_d$), for use in computing the total out-and-back light diffraction efficiency of the first rotation non-optimized holographic facet relative to the total out-and-back light diffraction efficiency of the twelfth rotation non-optimized holographic facet;

FIG. 10D2 sets forth a set of graphs plotting, as a function of the disc rotation, after facet optimization, (1) the light diffraction efficiency of the first holographic scanning facet (No. 1) to S-polarized outgoing light rays incident thereto, (2) the light diffraction efficiency of the twentieth holographic scanning facet to P-polarized outgoing light rays incident thereto, (3) the total out-and-back light diffraction efficiency of the twentieth holographic scanning facet to S-polarized outgoing light rays incident, and (4) an intensity of the relative signal (i.e. $T_s \cos \theta_d$), for use in computing the total out-and-back light diffraction efficiency of the first rotation-optimized holographic facet relative to the total out-and-back light diffraction efficiency of the twelfth rotation optimized holographic facet;

FIG. 10E1 sets forth a set of graphs plotting, as a function of the disc rotation, prior to facet optimization, (1) the light diffraction efficiency of the seventh holographic scanning facet (No. 7) to S-polarized outgoing light rays incident thereto, (2) the light diffraction efficiency of the first holographic scanning facet to P-polarized outgoing light rays incident thereto, (3) the total out-and-back light diffraction efficiency of the first holographic scanning facet to S-polarized outgoing light rays incident, and (4) an intensity of the relative signal (i.e. $T_s \cos \theta_d$), for use in computing the total out-and-back light diffraction efficiency of the seventh rotation non-optimized holographic facet relative to the total out-and-back light diffraction efficiency of the seventh rotation non-optimized holographic facet;

FIG. 10E2 sets forth a set of graphs plotting, as a function of the disc rotation, after facet optimization, (1) the light diffraction efficiency of the seventh holographic scanning facet (No. 7) to S-polarized outgoing light rays incident thereto, (2) the light diffraction efficiency of the twentieth holographic scanning facet to P-polarized outgoing light rays incident thereto, (3) the total out-and-back light diffraction efficiency of the twentieth holographic scanning facet to S-polarized outgoing light rays incident, and (4) an intensity of the relative signal (i.e. $T_s \cos \theta_d$), for use in computing the total out-and-back light diffraction efficiency of the seventh rotation non-optimized holographic facet relative to the total out-and-back light diffraction efficiency of the seventh rotation non-optimized holographic facet;

FIGS. 10F1 through 10F4, taken together, provide a set of tables setting forth the parameters involved in computation of S and P light diffraction efficiencies of the twelve scanning facets on the holographic scanning disc under design, using the geometrical optics models set forth in FIGS. 10A1 through 10A4;

FIG. 10G1 is a geometrical optics model of the Lambertian light scattering and collection process which occurs when a laser scanning beam produced by the system under design reflects from and scatters off a bar code symbol during laser scanning operations, wherein the geometrical optics model is used to calculate the light collection efficiency factor $E_L$ for use in computing the overall laser scanning beam transmission efficiency schematically depicted by partial light transmission efficiency factors encountered along the outgoing and return optical paths of a laser scanning beam within the holographic scanning system of the present invention;

FIG. 10G2 is a list of parameters employed in the geometrical optics model of FIG. 10G1;

FIG. 10G3 is a set of equations for computing particular parameters specified in the geometrical optics model of FIG. 10G1;

FIGS. 11A1A through 11A1H set forth a table setting forth the results of a runcation Analysis on the effects of diffraction caused by limiting (i.e. truncating) the spot size of a Gaussian laser beam using an aperture-stop, in order to determine the "effective beam diameter" thereof computed in the S and P directions at the collimating lens employed in each laser beam production module within the bioptical holographic laser scanning system under design;

FIG. 11A2 is a graphical representation indicating the intensity of the laser beam computed at different radial distances from the laser beam production module under design;

FIGS. 11B1A through 11B2E provide a table setting forth the results of a Gaussian Analysis on laser beam propagation from the laser beam production module under design through an exemplary light focusing facet on the holographic scanning disc under design, in order to determine the diameter of the laser beam computed at different distances from the light focusing facet;

FIG. 11B3 is a graphical representation indicating the 60% intensity diameter of a S-polarized laser beam computed at different distances from the holographic scanning disc under design, for use in determining the depth of focus (DOF) of each laser scanning plane produced by its respective laser beam when scanned by the holographic scanning disc;

FIG. 12A1 is a schematic representation of an exemplary scanning facet having geometric symmetry about the center of its angle of rotation, and specified by an assigned set of eight (x,y,z) coordinate points representative of its vertices;

FIG. 12A2 is a schematic representation of an exemplary scanning facet having geometric symmetry about the center of its angle of rotation, specified by an assigned set of eight (x,y,z) coordinate points representative of its vertices, and providing an equivalent facet geometry for the symmetric scanning facet shown in FIG. 12A1;

FIG. 12B1 is a schematic representation of an exemplary scanning facet having geometric asymmetry about the center of its angle of rotation, and specified by an assigned set of eight (x,y,z) coordinate points representative of its vertices;

FIG. 12B2 is a schematic representation of an exemplary scanning facet having geometric asymmetry about the center of its angle of rotation, specified by an assigned set of eight (x,y,z) coordinate points representative of its vertices, and providing an equivalent facet geometry for the asymmetric scanning facet shown in FIG. 12B1;

FIG. 12C1 is a schematic representation graphically illustrating the laser scanning and light collection processes carried out by a particular scanning facet on the holographic scanning disc, whereby an incident laser beam is (i) diffracted by the first end (i.e. beginning) portion of a scanning facet, (ii) focused to a first point in 3-D space specified by the focal length of the scanning facet and the elevation and skew angles of the diffracted laser beam, (iii) scattered/reflected as its scans its target (e.g. a bar code symbol), and the scattered/reflected light rays, and (iv) collected by the light collecting area of the scanning facet;

FIG. 12C2 is a schematic representation graphically illustrating the laser scanning and light collection processes carried out by a particular scanning facet on the holographic disc, whereby an incident laser beam is (i) diffracted by the second end (i.e. end) portion of a scanning facet, (ii) focused to a second point in 3-D space specified by the focal length of the scanning facet and the elevation and skew angles of the diffracted laser beam, (iii) scattered/reflected as its scans its target (e.g. a bar code symbol), and the scattered/reflected light rays, and (iv) collected by the light collecting area of the scanning facet;

FIG. 12D is a schematic representation graphically illustrating the process of projecting (i) a first parallel set of vectors from an exemplary scanning facet onto the first geometrically-untrimmed planar beam folding mirror associated with a laser scanning station as an incident laser beam is diffracted by the first end portion of the scanning facet as shown in FIG. 12C1, and (ii) a second parallel set of vectors from the scanning facet onto the first geometrically-untrimmed planar beam folding mirror as the incident laser beam is diffracted by the second end portion of the scanning facet as shown in FIG. 12C2, wherein each vector in the first parallel set of vectors emanates from a different assigned vertex on the scanning facet in a direction parallel to the first diffracted laser beam, and each vector in the second parallel set of vectors emanates from a different assigned vertex on the scanning facet in a direction parallel to the second diffracted laser beam, and wherein the first parallel set of vectors collectively define the light collection area of the scanning facet at the first end (i.e. beginning) of the laser scanning plane being generated, the second parallel set of vectors collectively define the light collection area of the scanning facet at the second end (i.e. beginning) of the laser scanning plane being generated, and the points at which these vectors intersect the first geometrically-untrimmed planar beam folding mirror are used to specify the geometrical boundaries that the final (i.e. geometrically-trimmed) planar beam folding mirror should embody for performing light reflection/collection functions during laser scanning beam operations;

FIG. 13A1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. the second end) portion of the scanning facets, and (ii) the (x,y,z) coordinates of the vertices of scanning facet Nos. 8, 10 and 12 projected onto the first non-trimmed planar beam folding mirror in the first mirror group G1 employed in the first laser scanning station ST1;

FIG. 13A2 is a spreadsheet table listing (i) the (x,y,x) coordinates specifying the elevation and skew angles of the diffracted laser beams produced at the start (i.e. first end) portion of scanning facet Nos. 7, 9, and 11, the middle portion of these scanning facets, and the end (i.e. the second end) portion of the scanning facets, and (ii) the (x,y,z) coordinates of the vertices of scanning facet Nos. 7, 9 and 11 projected onto the first non-trimmed planar beam folding mirror in the second mirror group G2 employed in the first laser scanning station ST1;

FIGS. 13A3A and 13A3B set forth a spreadsheet table listing (i) the (x,y,x) coordinates specifying the elevation and skew angles of the diffracted laser beams produced at the start (i.e. first end) portion of scanning facet Nos. 1–4, the middle portion of these scanning facets, and the end (i.e. the second end) portion of the scanning facets, and (ii) the (x,y,z) coordinates of the vertices of scanning facet Nos. 1–4 projected onto the first non-trimmed planar beam folding mirror in the third mirror group G3 employed in the first laser scanning station ST1;

FIG. 13A4 is a graphical plot showing, in the XY plane of the first local coordinate system R1, (i) the projection of the vertices of scanning facet Nos. 8, 10 and 12 onto the first untrimmed planar beam folding mirror in the first mirror group G1 employed at the first laser scanning station ST1, (ii) the projection of the vertices of scanning facet Nos. 7, 9 and 11 onto the first untrimmed planar beam folding mirror in the second mirror group G2 employed at the first laser scanning station ST1, and (iii) the projection of the vertices of scanning facet Nos. 1–4 onto the first untrimmed planar beam folding mirror in the third mirror group G3 employed at the first laser scanning station ST1;

FIG. 13A5 is a graphical plot showing, in the XZ plane of the first local coordinate system R1, (i) the projection of the vertices of scanning facet Nos. 8, 10 and 12 onto the first untrimmed planar beam folding mirror in the first mirror group G1 employed at the first laser scanning station ST1, (ii) the projection of the vertices of scanning facet Nos. 7, 9 and 11 onto the first untrimmed planar beam folding mirror in the second mirror group G2 employed at the first laser scanning station ST1, and (iii) the projection of the vertices of scanning facet Nos. 1–4 onto the first untrimmed planar beam folding mirror in the third mirror group G3 employed at the first laser scanning station ST1;

FIG. 13A6 is a graphical plot showing, in the YZ plane of the first local coordinate system R1, (i) the projection of scanning facet Nos. 8, 10 and 12 onto the first untrimmed planar beam folding mirror in the first mirror group G1 employed at the first laser scanning station ST1, (ii) the projection of scanning facet Nos. 7, 9 and 11 onto the first untrimmed planar beam folding mirror in the second mirror group G2 employed at the first laser scanning station ST1, and (iii) the projection of scanning facet Nos. 1–4 onto the first untrimmed planar beam folding mirror in the third mirror group G3 employed at the first laser scanning station ST1;

FIG. 13B1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. second end) portion of the scanning facets, and (ii) the (x,y,z) coordinates of the vertices of scanning facet Nos. 8, 10 and 12 projected onto the second non-trimmed planar beam folding mirror in the first mirror group G1 employed in the first laser scanning station ST1;

FIG. 13B2 is a spreadsheet table listing (i) the (x,y,x) coordinates specifying the elevation and skew angles of the diffracted laser beams produced at the start (i.e. first end) portion of scanning facet Nos. 7, 9, and 11, the middle portion of these scanning facets, and the end (i.e. second end) portion of the scanning facets, and (ii) the (x,y,z) coordinates of the vertices of scanning facet Nos. 7, 9 and 11 projected onto the second non-trimmed planar beam folding mirror in the second mirror group G2 employed in the first laser scanning station ST1;

FIGS. 13B3A and 13B3B set forth a spreadsheet table listing (i) the (x,y,x) coordinates specifying the elevation and skew angles of the diffracted laser beams produced at the start (i.e. first end) portion of scanning facet Nos. 1–4, the middle portion of these scanning facets, and the end (i.e. the second end) portion of the scanning facets, and (ii) the (x,y,z) coordinates of the vertices of scanning facet Nos. 1–4 projected onto the second non-trimmed planar beam folding mirror in the third mirror group G3 employed in the first laser scanning station ST1;

FIG. 13B4 is a graphical plot showing, in the XY plane of the first local coordinate system R1, (i) the projection of the vertices of scanning facet Nos. 8, 10 and 12 onto the second untrimmed planar beam folding mirror in the first mirror group G1 employed at the first laser scanning station ST1, (ii) the projection of the vertices of scanning facet Nos. 7, 9 and 11 onto the second untrimmed planar beam folding mirror in the second mirror group G2 employed at the first laser scanning station ST1, and (iii) the projection of the vertices of scanning facet Nos. 1–4 onto the second untrimmed planar beam folding mirror in the third mirror group G3 employed at the first laser scanning station ST1;

FIG. 13B5 is a graphical plot showing, in the XZ plane of the first local coordinate system R1, (i) the projection of the vertices of scanning facet Nos. 8, 10 and 12 onto the second untrimmed planar beam folding mirror in the first mirror group G1 employed at the first laser scanning station ST1, (ii) the projection of the vertices of scanning facet Nos. 7, 9 and 11 onto the second untrimmed planar beam folding mirror in the second mirror group G2 employed at the first laser scanning station ST1, and (iii) the projection of the vertices of scanning facet Nos. 1–4 onto the second untrimmed planar beam folding mirror in the third mirror group G3 employed at the first laser scanning station ST1;

FIG. 13B6 is a graphical plot showing, in the YZ plane of the first local coordinate system R1, (i) the projection of scanning facet Nos. 8, 10 and 12 onto the first untrimmed planar beam folding mirror in the first mirror group G1 employed at the first laser scanning station ST1, (ii) the projection of scanning facet Nos. 7, 9 and 11 onto the first untrimmed planar beam folding mirror in the second mirror group G2 employed at the first laser scanning station ST1, and (iii) the projection of scanning facet Nos. 1–4 onto the second untrimmed planar beam folding mirror in the third mirror group G3 employed at the first laser scanning station ST1;

FIG. 13C1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. the second end) portion of the scanning facets, and (ii) the (x,y,z) coordinates of the vertices of scanning facet Nos. 8, 10 and 12 projected onto the third non-trimmed planar beam folding mirror in the first mirror group G1 employed in the first laser scanning station ST1;

FIG. 13C2 is a spreadsheet table listing (i) the (x,y,x) coordinates specifying the elevation and skew angles of the diffracted laser beams produced at the start (i.e. first end) portion of scanning facet Nos. 7, 9, and 11, the middle portion of these scanning facets, and the end (i.e. the second end) portion of the scanning facets, and (ii) the (x,y,z) coordinates of the vertices of scanning facet Nos. 7, 9 and 11 projected onto the third non-trimmed planar beam folding mirror in the second mirror group G2 employed in the first laser scanning station ST1;

FIG. 13C3 is a spreadsheet table listing (i) the (x,y,x) coordinates specifying the elevation and skew angles of the diffracted laser beams produced at the start (i.e. first end) portion of scanning facet Nos. 1–4, the middle portion of these scanning facets, and the second end (i.e. the end) portion of the scanning facets, and (ii) the (x,y,z) coordinates of the vertices of scanning facet Nos. 1–4 projected onto the third non-trimmed planar beam folding mirror in the third mirror group G3 employed in the first laser scanning station ST1;

FIG. 13C4 is a graphical plot showing, in the XY plane of the first local coordinate system R1, (i) the projection of the vertices of scanning facet Nos. 8, 10 and 12 onto the third untrimmed planar beam folding mirror in the first mirror group G1 employed at the first laser scanning station ST1, (ii) the projection of the vertices of scanning facet Nos. 7, 9 and 11 onto the third untrimmed planar beam folding mirror in the second mirror group G2 employed at the first laser scanning station ST1, and (iii) the projection of the vertices of scanning facet Nos. 1–4 onto the first untrimmed planar beam folding mirror in the third mirror group G3 employed at the first laser scanning station ST1;

FIG. 13C5 is a graphical plot showing, in the XZ plane of the first local coordinate system R1, (i) the projection of the vertices of scanning facet Nos. 8, 10 and 12 onto the third untrimmed planar beam folding mirror in the first mirror group G1 employed at the first laser scanning station ST1, (ii) the projection of the vertices of scanning facet Nos. 7, 9 and 11 onto the third untrimmed planar beam folding mirror in the second mirror group G2 employed at the first laser scanning station ST1, and (iii) the projection of the vertices of scanning facet Nos. 1–4 onto the third untrimmed planar beam folding mirror in the third mirror group G3 employed at the first laser scanning station ST1;

FIG. 13C6 is a graphical plot showing, in the YZ plane of the first local coordinate system R1, (i) the projection of scanning facet Nos. 8, 10 and 12 onto the third untrimmed planar beam folding mirror in the first mirror group G1 employed at the first laser scanning station ST1, (ii) the projection of scanning facet Nos. 7, 9 and 11 onto the third untrimmed planar beam folding mirror in the second mirror group G2 employed at the first laser scanning station ST1, and (iii) the projection of scanning facet Nos. 1–4 onto the third untrimmed planar beam folding mirror in the third mirror group G3 employed at the first laser scanning station ST1;

FIG. 13D1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. the second end) portion of the scanning facets, and (ii) the (x,y,z) coordinates of the vertices of scanning facet Nos. 8, 10 and 12 projected onto the fourth non-trimmed planar beam folding mirror in the first mirror group G1 employed in the first laser scanning station ST1;

FIGS. 14A1A and 14A1B set forth a spreadsheet table listing (i) the (x,y,x) oordinates specifying the elevation and skew angles of the diffracted laser beams produced at the start (i.e. first end) portion of scanning facet Nos. 1–6, the middle portion of these scanning facets, and the end (i.e. second end) portion of the scanning facets, and (ii) the (x,y,z) coordinates of the vertices of scanning facet Nos. 1–6 projected onto the first non-trimmed planar beam folding mirror in the first mirror group G1 employed in the second laser scanning station ST2;

FIGS. 14B1A and 14B1B set forth a spreadsheet table listing (i) the (x,y,x) coordinates specifying the elevation and skew angles of the diffracted laser beams produced at the start (i.e. first end) portion of scanning facet Nos. 1–6, the middle portion of these scanning facets, and the end (i.e. the second end) portion of the scanning facets, and (ii) the (x,y,z) coordinates of the vertices of scanning facet Nos. 1–6 projected onto the second non-trimmed planar beam folding mirror in the mirror group G3 employed in the second laser scanning station ST2;

FIGS. 14C1A and 14C1B set forth a spreadsheet table listing (i) the (x,y,x) coordinates specifying the elevation and skew angles of the diffracted laser beams produced at the start (i.e. first end) portion of scanning facet Nos. 1–6, the middle portion of these scanning facets, and the second end (i.e. the end) portion of the scanning facets, and (ii) the (x,y,z) coordinates of the vertices of scanning facet Nos. 1–6 projected onto the third non-trimmed planar beam folding mirror in the mirror group G3 employed in the second laser scanning station ST2;

FIGS. 14D1A and 14D1B set forth a spreadsheet table listing (i) the (x,y,x) coordinates specifying the elevation and skew angles of the diffracted laser beams produced at the start (i.e. first end) portion of scanning facet Nos. 1–6, the middle portion of these scanning facets, and the end (i.e. the second end) portion of the scanning facets, and (ii) the (x,y,z) coordinates of the vertices of scanning facet Nos. 1–6 projected onto the fourth non-trimmed planar beam folding mirror in the mirror group G3 employed in the second laser scanning station ST2;

FIG. 15A1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. the second end) portion of the scanning facets, and (ii) the (x,y,z) coordinates of the vertices of scanning facet Nos. 8, 10 and 12 projected onto the first non-trimmed planar beam folding mirror in the first mirror group G1 employed in the fourth laser scanning station ST4;

FIG. 15A2 is a spreadsheet table listing (i) the (x,y,x) coordinates specifying the elevation and skew angles of the diffracted laser beams produced at the start (i.e. first end) portion of scanning facet Nos. 7, 9, and 11, the middle portion of these scanning facets, and the end (i.e. the second end) portion of the scanning facets, and (ii) the (x,y,z) coordinates of the vertices of scanning facet Nos. 7, 9 and 11 projected onto the first non-trimmed planar beam folding mirror in the second mirror group G2 employed in the fourth laser scanning station ST4;

FIGS. 15A3A and 15A3B set forth a spreadsheet table listing (i) the (x,y,x) coordinates specifying the elevation and skew angles of the diffracted laser beams produced at the start (i.e. first end) portion of scanning facet Nos. 1–6, the middle portion of these scanning facets, and the second end (i.e. the end) portion of the scanning facets, and (ii) the (x,y,z) coordinates of the vertices of scanning facet Nos. 1–6 projected onto the first non-trimmed planar beam folding mirror in the third mirror group G3 employed in the fourth laser scanning station ST4;

FIG. 15B1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. the second end) portion of the scanning facets, and (ii) the (x,y,z) coordinates of the vertices of scanning facet Nos. 8, 10 and 12 projected onto the second non-trimmed planar beam folding mirror in the first mirror group G1 employed in the fourth laser scanning station ST4;

FIG. 15B2 is a spreadsheet table listing (i) the (x,y,x) coordinates specifying the elevation and skew angles of the diffracted laser beams produced at the start (i.e. first end) portion of scanning facet Nos. 7, 9, and 11, the middle portion of these scanning facets, and the end (i.e. the second end) portion of the scanning facets, and (ii) the (x,y,z) coordinates of the vertices of scanning facet Nos. 7, 9 and 11 projected onto the second non-trimmed planar beam folding mirror in the second mirror group G2 employed in the fourth laser scanning station ST4;

FIGS. 15B3A and 15B3B set forth a spreadsheet table listing (i) the (x,y,x) coordinates specifying the elevation and skew angles of the diffracted laser beams produced at the start (i.e. first end) portion of scanning facet Nos. 1–6, the middle portion of these scanning facets, and the end (i.e. the second end) portion of the scanning facets, and (ii) the (x,y,z) coordinates of the vertices of scanning facet Nos. 1–6 projected onto the second non-trimmed planar beam folding mirror in the third mirror group G3 employed in the fourth laser scanning station ST4;

FIG. 15C1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. the second end) portion of the scanning facets, and (ii) the (x,y,z) coordinates of the vertices of scanning facet Nos. 8, 10 and 12 projected onto the third non-trimmed planar beam folding mirror in the first mirror group G1 employed in the fourth laser scanning station ST4;

FIG. 15C2 is a spreadsheet table listing (i) the (x,y,x) coordinates specifying the elevation and skew angles of the diffracted laser beams produced at the start (i.e. first end) portion of scanning facet Nos. 7, 9, and 11, the middle portion of these scanning facets, and the end (i.e. the second end) portion of the scanning facets, and (ii) the (x,y,z) coordinates of the vertices of scanning facet Nos. 7, 9 and 11 projected onto the third non-trimmed planar beam folding mirror in the second mirror group G2 employed in the fourth laser scanning station ST4;

FIGS. 15C3A and 15C3B set forth a spreadsheet table listing (i) the (x,y,x) coordinates specifying the elevation and skew angles of the diffracted laser beams produced at the start (i.e. first end) portion of scanning facet Nos. 1–6, the middle portion of these scanning facets, and the end (i.e. the second end) portion of the scanning facets, and (ii) the (x,y,z) coordinates of the vertices of scanning facet Nos. 1–6 projected onto the third non-trimmed planar beam folding mirror in the third mirror group G3 employed in the fourth laser scanning station ST4;

FIG. 15D1 is a spreadsheet table listing (i) the (x,y,x) coordinates specifying the elevation and skew angles of the diffracted laser beams produced at the start (i.e. first end) portion of scanning facet Nos. 8, 10 and 12, the middle portion of these scanning facets, and the end (i.e. the second end) portion of the scanning facets, and (ii) the (x,y,z) coordinates of the vertices of scanning facet Nos. 8, 10 and 12 projected onto the fourth non-trimmed planar beam folding mirror in the first mirror group G1 employed in the fourth laser scanning station ST4;

FIG. 15D2 is a spreadsheet table listing (i) the (x,y,x) coordinates specifying the elevation and skew angles of the diffracted laser beams produced at the start (i.e. first end) portion of scanning facet Nos. 7, 9, and 11, the middle portion of these scanning facets, and the end (i.e. the second end) portion of the scanning facets, and (ii) the (x,y,z) coordinates of the vertices of scanning facet Nos. 7, 9 and 11 projected onto the fourth non-trimmed planar beam folding mirror in the second mirror group G2 employed in the fourth laser scanning station ST4;

FIGS. 15D3A and 15D3B set forth a spreadsheet table listing (i) the (x,y,x) coordinates specifying the elevation and skew angles of the diffracted laser beams produced at the start (i.e. first end) portion of scanning facet Nos. 1–6, the middle portion of these scanning facets, and the end (i.e. the second end) portion of the scanning facets, and (ii) the (x,y,z) coordinates of the vertices of scanning facet Nos. 1–6 projected onto the fourth non-trimmed planar beam folding mirror in the third mirror group G3 employed in the fourth laser scanning station 5T4;

FIGS. 16A, 16B and 16C provide a flow chart describing a method of designing a light collection and detection subsystem for a bioptical holographic scanner according to the principles of the present invention;

FIG. 17A is an elevated end view of the bioptical holographic laser scanning system of the illustrative embodiment, showing that, at each laser scanning station, the photodetector is disposed above the point of incidence on the holographic scanning disc, whereas the parabolic light focusing mirror is disposed beneath the holographic scanning disc, in order to reduce the height dimension of the bottom portion of the scanner housing;

FIG. 17B is a 3-D wire-frame type geometrical optics model of the parabolic mirror, photodetector and scanning disc assembly associated with each laser scanning station in the holographic scanning system of the present invention under design;

FIG. 17C is a ray optics diagram showing the paths of the innermost and outermost light rays collected by a holographic scanning facet on the scanning disc associated with the light detection subsystem of the present invention depicted in FIG. 17A; and FIG. 18 is a schematic representation of an alternative embodiment of the holographic laser scanning system of the present invention, wherein only a bottom scanning window is provided in a system having only a bottom portion.

DETAILED DESCRIPTION OF THE ILLUSTRATIVE EMBODIMENTS OF THE PRESENT INVENTION

Referring to the figures in the accompanying Drawings, the various illustrative embodiments of the bioptical holographic laser scanner of the present invention will be described in great detail.

In the illustrative embodiments, the apparatus of the present invention is realized in the form of an automatic code symbol reading system having a high-speed bioptical holographic laser scanning mechanism as well as a scan data processor for decode processing scan data signals produced thereby. However, for the sake of convenience of expression, the term "bioptical holographic laser scanner" shall be used hereinafter to denote the bar code symbol reading system which employs the bioptical holographic laser scanning mechanism of the present invention.

As shown in FIG. 1A, the bioptical holographic laser scanner of the first illustrative embodiment of the present invention 1 has a compact housing 2 having a first housing portion 4A, and a second housing portion 4B which projects from one end of the first housing portion in an orthogonal manner. When the holographic laser scanner 1 is installed within a counter-top surface, as shown in FIGS. 1B1 and 1B2, the first housing portion 4A oriented horizontally, whereas the second housing portion 4B is oriented vertically with respect to the POS station. Thus throughout the Specification and claims hereof, the terms first housing portion and horizontally-disposed housing portion may be used interchangeably but refer to the same structure; likewise, the terms the terms second housing portion and vertically-disposed housing portion may be used interchangeably but refer to the same structure.

In the illustrative embodiment, the total height of the scanner housing is 8.73 inches, with width and length dimensions of 10.90 and 14.86 inches, respectively, to provide a total internal housing volume ("scanner volume") $V_{housing}$ of about 1624.3 cubic inches with a scanner housing depth of 3.41 inches. As will be described in greater detail below, the total three-dimensional scanning volume produced by this ultra-compact housing is about 432 cubic inches with a scanning depth of field of about 6.0 inches measured from the bottom scanning window 16 and about 8.0 inches measured from the side scanning window 18. Importantly, the resolution of the bar code symbol that the scanning pattern of the illustrative embodiment can resolve at any location within the specified three-dimensional laser scanning volume $V_{scanning}$ is on the order of about 0.006 inches minimum element width. It is understood, however, this scanning resolution may be greater or lesser depending on the particular embodiment of the present invention.

Note that in the illustrative embodiment, the depth of the first housing portion 4A (which is disposed under the counter in a POS retail application) is less than 5 inches, and preferably less than 3.5 inches. Moreover, the volume of the scanner housing is less than 1650 cubic inches, and the 3-D scanning volume produced by the scanning system is greater than 400 cubic inches. Such a design reduces the depth of the scanner housing, which is a key benefit in a space constrained environment such as in POS retail applications.

In the illustrative embodiment, the base of the first housing portion 4A is recessed (with respect to the top of the first housing portion 4A) as shown in FIGS. 1A1 and 1A2.

The bioptical holographic laser scanning bar code symbol reading system of the present invention 1 shown in FIG. 1A can be used in a diverse variety of bar code symbol scanning applications. As shown in FIG. 1B1, the bioptical holographic laser scanner 1 can be installed within the countertop of a point-of-sale (POS) station 26, having a computer-based cash register 20, a weigh-scale 22 mounted within the counter adjacent the laser scanner, and an automated transaction terminal (ATM) supported upon a courtesy stand in a conventional manner. Similarly, as shown in FIG. 1B2, the bioptical holographic laser scanner 1 can be mounted on weigh-scale 22, and the scanner/weigh-scale combination installed within the countertop of a point-of-sale (POS) station 26 having a computer-based cash register 20 and an automated transaction terminal (ATM) supported upon a courtesy stand in a conventional manner. In this configuration, items (such as fruit or other produce) that need to be weighed are placed on the first housing portion 4A of the scanner 1 where they are weighed by the weigh-scale 22 disposed beneath the scanner 1.

Alternatively, as shown in FIG. 1C, the bioptical holographic laser scanner can be installed above a conveyor belt structure as part of a manually-assisted parcel sorting operation being carried out, for example, during inventory control and management operations.

As shown in FIGS. 1D, 1E, 2A1, 2B, 2B2 and 2C1, the bioptical holographic scanning system of the illustrative embodiment comprises a holographic scanning disc 30 mounted on an optical bench 32; first, second, third and fourth laser scanning stations indicated by ST1, ST2, ST3 and ST4, respectively, and symmetrically arranged about the holographic laser scanning station at different angular locations. As will be described in greater detail hereinafter, each laser scanning generates a laser scanning beam that is directed through a different, yet fixed point of incidence on laser scanning disc 30. As shown in FIG. 2B1, the point of incidences associated with the second and fourth laser scanning stations ST2 and ST4 are aligned with a (central) longitudinal reference axis LRA disposed within the central plane of the scanning disc and bisecting both the bottom and vertical housing portions of the holographic laser scanning system. As shown in FIG. 2B1, the first and third laser scanning stations ST1 and ST3 are disposed on opposite sides of the longitudinal reference axis, and are aligned with a transverse reference axis TRA, also disposed within the central plane of the scanning disc, and passing through the points of incidence associated with the first and third laser scanning stations ST3 and ST4, as shown.

As will be described in greater detail hereinafter, the position, geometry and orientation of each of the subcomponents of each laser scanning station are locally defined with respect to a hybrid Cartesian/Polar coordinate reference system symbolically embedded within the holographic scanning disc. Thus, four locally-defined (hybrid Cartesian/Polar) coordinate reference systems $R_{local\ 1}$, $R_{local\ 2}$, $R_{local\ 3}$ and $R_{local\ 4}$ are used to specify the position, geometry and orientation of each of the subcomponents of the first, second, third and fourth laser scanning stations ST1, ST2, ST3, and ST4, respectively. However, as will be described in detail hereinafter, each of these coordinate measurements eventually must be translated back to a globally-defined coordinate reference system $R_{global}$ symbolically embedded within the holographic scanning disc of the system. As shown in FIG. 2A1, the global coordinate reference system $R_{global}$ is symbolically embedded within holographic scanning system as follows: the x and y axes of the global coordinate reference system extend within the central plane of the holographic scanning disc, such that the x axis is aligned with the transverse reference axis TRA passing through the point of incidences associated with the first and third laser scanning stations ST3 and ST4, the y axis is aligned with the longitudinal reference axis LRA passing through the point of incidences associated with the second and fourth laser scanning stations ST2 and ST4, while the z axis of the global coordinate reference system is aligned with the axis of rotation of the holographic scanning disc.

With the global coordinate reference system symbolically embedded within the holographic scanning system, as defined hereinabove, each of the four locally defined coordinate reference frames $R_{local\ 1}$, $R_{local\ 2}$, $R_{local\ 3}$ and $R_{local\ 4}$ are defined as follows: the first local coordinate reference system $R_{local\ 1}$ is aligned with the global coordinate reference system $R_{global}$; the second local coordinate reference system $R_{local\ 2}$ is rotated 90 degrees counter-clockwise in the X-Y plane of the global coordinate reference system $R_{global}$, so that its x axis of $R_{local\ 2}$ is aligned with the point of incidence associated with the second laser scanning station ST2 ; the third local coordinate reference system $R_{local\ 3}$ is rotated 180 degrees counter-clockwise in the X-Y plane of the global coordinate reference system $R_{global}$, so that the x axis of $R_{local\ 3}$ is aligned with the point of incidence associated with the third laser scanning station ST3; and the fourth local coordinate reference system $R_{local\ 4}$ is rotated 270 degrees counter-clockwise in the X-Y plane of the global coordinate reference system $R_{global}$, so that the x axis of $R_{local\ 4}$ is aligned with the point of incidence associated with the fourth laser scanning station ST4. Coordinate values of points specified in any one of these local coordinate reference systems using vectors referenced therefrom can be converted into corresponding coordinate values referenced with respect to the global coordinate reference system $R_{global}$ using homogeneous transformations known in the art 3-D geometrical modeling art.

The holographic scanning disc 30 employed in the system hereof comprises two glass plates 32A and 32B, between which are supported a plurality of specially designed holographic optical elements (HOEs), referred to hereinafter as "holographic scanning facets" or "holographic facets". In the illustrative embodiments, twelve holographic scanning facets are supported on the scanning disc. Each holographic facet 34 is preferably realized as a volume transmission-type light diffraction hologram having a slanted fringe structure having variations in spatial frequency to provide a characteristic focal length $f_i$. The light diffraction efficiency of such volume light diffraction holograms, as a function of incidence angle $A_i$, modulation depth $\Delta n_i$, or recording media losses, is described in great detail in the celebrated paper entitled "*Coupled Wave Theory for Thick Hologram Gratings*" by Herwig Kogelnik, published in The Bell System Technical Journal (BSTJ), Volume.8, Number 9, at Pages 2909–2947, in November 1969, incorporated herein by reference in its entirety.

In a conventional manner, the glass support plates 32A and 32B forming part of the holographic scanning disc hereof are mounted to a support hub, as shown in FIGS. 1D1, and 2A2. In turn, the support hub 2 is mounted to the shaft of a high-speed, electric motor 40. For purposes of simplicity of description, when describing the laser scanning stations of the present invention, reference will be made to the first laser scanning station denoted as ST1. While the beam folding mirror arrangement employed in laser scanning stations ST1, ST3 and ST4 are quite different, as will be described in great detail hereinafter, the beam folding mirror arrangement of the third laser scanning station ST3 is similar to the beam folding mirror arrangement employed in laser scanning station ST1, except that the location of these mirror arrangements about the transverse reference axis TRA are reversed. Despite such differences, the laser scanning stations ST2, ST3 and ST4 have substantially similar structure, and operate in substantially the same manner as the first laser scanning station ST1. Thus, when describing the components which each of the laser scanning stations have in common, reference will be made to the first laser station, for purpose of illustration and compact description.

As best shown in FIG. 3A1, the holographic facets on holographic scanning disc 30 are arranged on the surface thereof in a manner which utilizes substantially all of the light collecting surface area provided between the outer radius of the scanning disc, $r_{outer}$, and the inner radius thereof, $r_{inner}$. In the illustrative embodiment, twelve (12) holographic scanning facets are used in conjunction with the four independent laser beam sources provided by the four laser scanning stations of the system, so as to project from the bottom and side scanning windows of the system, an omni-directional laser scanning pattern consisting of 50 laser scanning planes cyclically generated at a rate in excess of 1000 times per second. It is understood, however, this number will vary from embodiment to embodiment of the present invention and thus shall not form a limitation thereof.

In the illustrative embodiment of the present invention, there are three different types of facets on the holographic scanning disc hereof. These facet types are based on (i) beam elevation angle characteristics of the facet, and (ii) skew angle characteristics thereof, schematically defined in FIGS. 3A2 and 3A3, respectively. As shown in the table of FIG. 3A4, the first class of facets have High Elevation (HE) angle characteristics and Left (i.e. positive) Skew (LS) angle characteristics; the second class of facets have High Elevation (HE) angle characteristics and Right (i.e. negative) Skew (RS) angle characteristics; and the third class of facets have Low Elevation (LE) angle characteristics and no (i.e. zero) Skew (LS) angle characteristics. As shown in FIGS. 3A2 and 3A3, skew angle characteristics are referenced by counter-clockwise rotation within the local coordinate reference system of interest. Thus, left (i.e. positive) skew angle characteristics are indicated when the plane, within which the outgoing laser beam is diffracted, deflects towards to left side of the XZ plane as the scanning facets sweeps across the point of incidence of the associated laser scanning station, whereas right (i.e. negative) skew angle characteristics are indicated when he plane, within which the outgoing laser beam is diffracted, deflects towards to right side of the XZ plane as the scanning facets sweeps across the point of incidence of the associated laser scanning station. No (i.e. zero) skew angle characteristics are indicated when the plane, within which the outgoing laser beam is diffracted, is deflected towards neither the left or right side of the XZ plane as the scanning facets sweeps across the point of incidence of the associated laser scanning station, but rather remains centrally disposed about the XZ plane. As will become apparent hereinafter, the use of holographic scanning facets having such diverse elevation and skew characteristics enables the design and construction of a bioptical holographic laser scanning system employing multiple laser scanning stations, each having a plurality of beam folding mirrors that are compactly arranged within a minimized region of volumetric space, required in space-constricted POS-type scanning applications.

Laser beams passing through scanning facets having High Elevation (HE) angle characteristics and Left (i.e. positive) Skew (LS) angle characteristics are deflected towards the beam folding mirrors arranged on the left side of hosting laser scanning station, at a high elevation angle (or low diffraction angle by definition). Laser beams passing through scanning facets having High Elevation (HE) angle characteristics and Right (i.e. negative) Skew (RS) angle characteristics are deflected towards the beam folding mirrors arranged on the right side of hosting laser scanning station, at a high elevation angle (or low diffraction angle by definition). Laser beams passing through scanning facets having Low Elevation (LE) angle characteristics and No Skew (LS) angle characteristics are not deflected towards either side of hosting laser scanning station, at a low elevation angle (or high diffraction angle by definition), but instead remain centered about the point of incidence at the laser scanning station.

As schematically illustrated in FIG. 3A1, each facet on the holographic scanning disc 30 is assigned a unique facet number. As indicated in the table of FIG. 3A4, scanning facets assigned numbers 7, 9 and 11 in the illustrative design are classified into a first facet group (i.e. class) indicated by G1, as each scanning facet in this first facet group has both High Elevation (HE) angle characteristics and Left (i.e. negative) Skew (LS) angle characteristics as indicated in the spreadsheet disc design parameter table of FIGS. 3G1A through 3G2B. Facets assigned numbers 8, 10 and 12 are classified into a second facet group indicated by G2, as each scanning facet in this second facet group has both High Elevation (HE) angle characteristics and Right Skew (RS) angle characteristics, as indicated in the spreadsheet disc design parameter table of FIGS. 3G1A through 3G2B. Facets assigned numbers 1–6 are classified into the third facet group, as each scanning facet in this third facet group has both Low Elevation (LE) angle characteristics and Left Skew (LS) angle characteristics, as indicated in the spreadsheet disc design parameter table of FIGS. 3G1A through 3G2B. By virtue of such characteristics, the scanning facets in each of these three different facet groups produces an outgoing laser beam that is diffracted along a different direction of skew, and therefore, is designed to cooperate with a different group of laser beam folding mirrors in order to generate particular components of the complex omnidirectional laser scanning pattern of the present invention.

Such features of the bioptical holographic scanning system of the present invention will be illustrated in great detail hereinafter.

In addition, the holographic scanning disc 30 preferably includes scanning facets with symmetrical LS and RS angle characteristics. For example, as illustrated in FIGS. 3A4, 3G2A and 3G2B, facets 7, 9 and 11 have LS angle characteristics (+28 degrees) that are symmetrical with respect to the RS angle characteristics (−28 degrees) of facets 8, 10 and 12, respectively. Such features enable different laser scanning stations to produce substantially similar scanning patterns. FIGS. 5B4 and 5L3 illustrate this feature. More specifically, FIG. 5B4 illustrates the scanning pattern produced by facets 7, 9 and 11 in cooperation with laser scanning station ST1. FIG. 5L3 illustrates the scanning pattern produced by facets 8,10 and 12 in cooperation with laser scanning station ST3. Note that these two scanning patterns are substantially similar as shown.

Figure 2K:
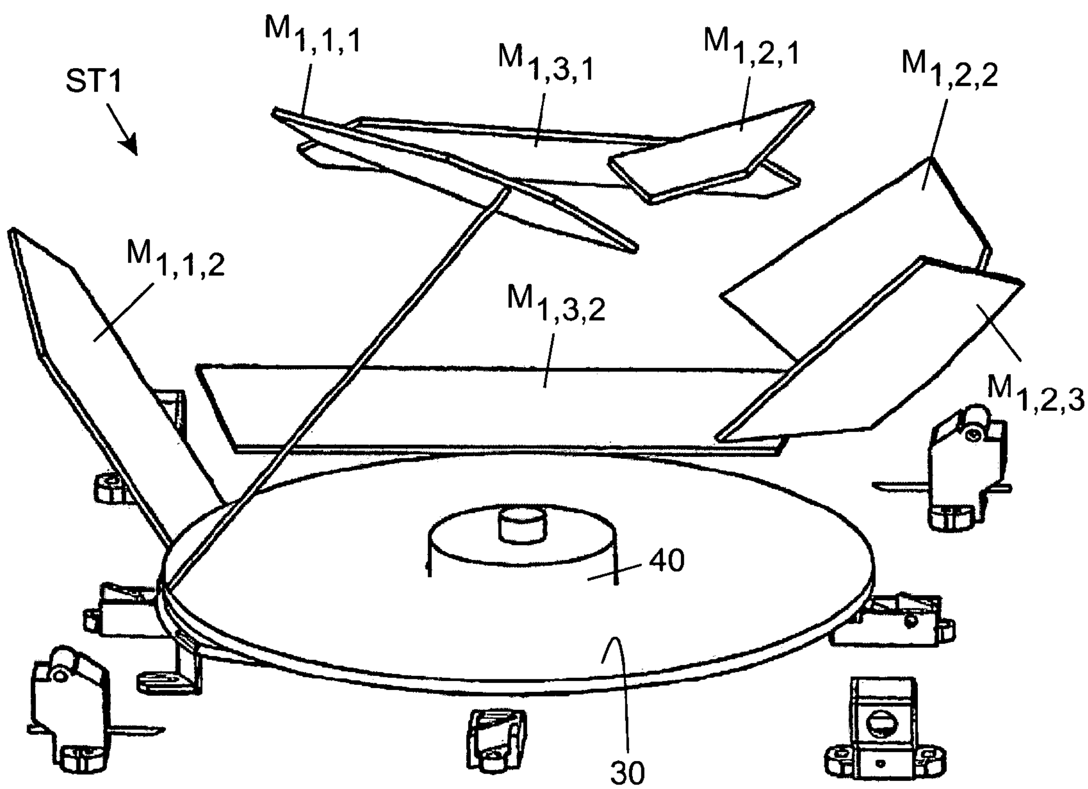
FIG. 2K is a perspective view of the first laser scanning station (ST1) in the bioptical holographic laser scanning system of the present invention, showing solid models of its laser beam production and direction modules disposed about the edge of the holographic laser scanning disc, and associated first, second and third groups of laser beam folding mirrors, wherein the laser beam folding mirrors associated with the first group ($M_{i,j,k}$ where the group index j is i=1) cooperate with laser beams generated from scanning facets having high elevation angle and positive (i.e. left) skew angle characteristics, the laser beam folding mirrors associated with the second group ($M_{i,j,k}$ where the group index j is j=2) cooperate with laser beams generated from scanning facets having high elevation angle and negative (i.e. right) skew angle characteristics, and the laser beam folding mirrors associated with the first group ($M_{i,j,k}$ where the group index j is j=3) cooperate with laser beams generated from scanning facets having low elevation angle and zero (i.e. no) skew angle characteristics.

As best shown in FIGS. 1D1, 1E, 2B2, 2C1, 2K, 2N, and 2O, the first laser scanning station (ST1) comprises: a first laser beam production module 41A mounted on the optical bench 42 of the system, preferably outside the outer periphery of the holographic scanning disc 30, as shown in FIGS. 2A2 and 2B2; a first laser beam directing mirror 43A, disposed beneath the edge of the scanning disc, below the first point of incidence associated with the first scanning station ST1, for directing the laser beam output from the first laser beam production module 41A, through the first point of incidence at a fixed angle of incidence which, as indicated in the spreadsheet of FIGS. 3F1 and 3F2, is substantially equal for each laser scanning station in he system; three groups of laser beam folding mirrors, MG1@ST1, MG2@ST1 and MG3@ST1 which are arranged about the first point of incidence at the first scanning station ST1, and cooperate with the three groups of scanning facets G1, G2 and G3 on the scanning disc, respectively, so as to generate and project different groups of laser scanning planes through the bottom scanning window 16, as graphically illustrated in FIGS. 5B1 through 5H5, and vectorally specified in FIGS. 6A1 through 6C5; a first light collecting/focusing mirror structure (e.g. parabolic light collecting mirror or parabolic surface emulating volume reflection hologram) 70A disposed beneath holographic scanning disc 30 adjacent the first laser beam directing mirror 43A and first point of incidence at scanning station ST1; a first photodetector 45A disposed substantially above the first point of incidence at scanning station ST1 at a predetermined (i.e. minimized) height above the holographic scanning disc 30; and a first set of analog and digital signal processing boards 50 and 55, associated with the first laser scanning station ST1, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

For purposes of illustration and conciseness of description, each laser beam folding mirror in each mirror group arranged at each laser scanning station ST1, ST2, ST3 and ST4, is assigned a unique mirror identification code (i.e. indicator) throughout the drawings hereof. Each mirror identification code conforms to the syntactical structure $M_{i,j,k}$, wherein: index i represents the scanning station number (e.g. i=1 for ST1); index j represents the mirror group number (e.g. j=1 for mirrors which cooperate with scanning facets in group G1); and index k represents the mirror number in the mirror group assigned by the sequential order that the outgoing laser beam reflects off the mirrors during the laser scanning plane generation process (e.g. k=1 for mirrors which cause an outgoing laser beam to undergo its first reflection after diffracting through a scanning facet).

Referring to FIGS. 2K, 2N, 2O and 3B and using the mirror identification conventions set forth above, the laser beam folding mirrors employed at the first scanning station ST1 can be conveniently indexed as follows: mirror group MG1@ST1, containing facets that generate left skewed outgoing laser beams, has two beam folding mirrors indicated by $M_{1,1,1,}$ and $M_{1,1,2}$ in FIGS. 5B1 through 5C5, and 6A1 through 6A4; mirror group MG2@ST1, containing facets that generate right skewed outgoing laser beams, has three beam folding mirrors indicated by $M_{1,2,1,}$ , $M_{1,3,2}$and $M_{1,2,3}$ in FIGS. 5B1 through 5H5, and 6D1 through 6E5; and mirror group MG3@ST1, containing facets that do not generate skewed outgoing laser beams, has two beam folding mirrors indicated by $M_{1,3,1,}$ and $M_{1,3,2}$ in FIGS. 5F1 through 5G5, and 6C1 through 6C5.

The position and orientation of each beam folding mirror employed at scanning station ST1 relative to the first locally-defined coordinate reference system $R_{local\ 1}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3B, organized according to the three mirror groups MG1@ST1, MG2@ST1 and MG3@ST1 employed at laser scanning station ST1. Notably, the first vertex of each facet in these mirror groups is repeated in the table of FIG. 3B, to traverse a closed path in 3-D space, specifying the perimetrical boundaries of these optimally-trimmed beam folding mirrors employed in the scanning system of the illustrative embodiment.

As shown in FIG. 3B, the mirrors in each mirror group of scanning station ST1 are arranged in the order that the beam folding mirror performs its beam folding (i.e. light reflection) function upon the outgoing diffracted laser beam produced by a scanning facet associated with a facet group corresponding to the mirror group. Notably, at scanning station ST1, two light reflection operations are performed by the mirror groups MG1@ST1 and MG3@ST1 upon the outgoing diffracted laser beams, whereas three light reflection operations are performed by mirror group MG2@ST1 upon the outgoing diffracted laser beams. Also, certain beam reflecting mirrors (e.g. $M_{1,1,1}$ and $M_{1,1,2}$) have six vertices, while some mirrors have four vertices (e.g. $M_{1,3,2}$ and $M_{1,1,2}$), and yet other mirrors (e.g. $M_{1,1,2}$) have five vertices. As will be described in greater detail hereinafter, the exact number of vertices of each beam folding mirror will depend on the laser scanning plane being generated by the outgoing laser beam, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the first laser scanning station ST1, it is understood that other mirror surface areas, positions and orientations can and may be used to realize other embodiments of the first laser scanning station ST1 in accordance with the principles of the present invention taught herein.

As best shown in FIGS. 1D, 1E, 2B2, 2C1 and 2L, the second laser scanning station (ST2) comprises: a second laser beam production module 41B mounted on the optical bench 42 of the system, preferably outside the outer periphery of the holographic scanning disc 30, as shown in FIG. 2A2 and 2B2; a second laser beam directing mirror 43B, disposed beneath the edge of the scanning disc, below the second point of incidence associated with the second scanning station ST2, for directing the laser beam output from the first laser beam production module 41B, through the first point of incidence at a fixed angle of incidence; one group of laser beam folding mirrors, MG3@ST2, which are arranged about the second point of incidence at the second scanning station ST2, and cooperate with the corresponding group of scanning facets G3 on the scanning disc so as to generate and project different groups of laser scanning planes through the bottom scanning window 16, as graphically illustrated in FIGS. 5I1 through 5J5, and vectorally specified in FIGS. 6D1 through 6D7; a second light collecting/focusing mirror structure (e.g. parabolic light collecting mirror or parabolic surface emulating volume-type hologram) 70B disposed beneath holographic scanning disc 30 adjacent the second laser beam directing mirror 43B and the second point of incidence at scanning station ST2; a second photodetector 45B disposed substantially above the second point of incidence at scanning station ST2 at a predetermined (i.e. minimized) height above the holographic scanning disc 30; and a second set of analog and digital signal processing boards 50B and 55B, associated with the second laser scanning station ST2, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

Figure 2L:
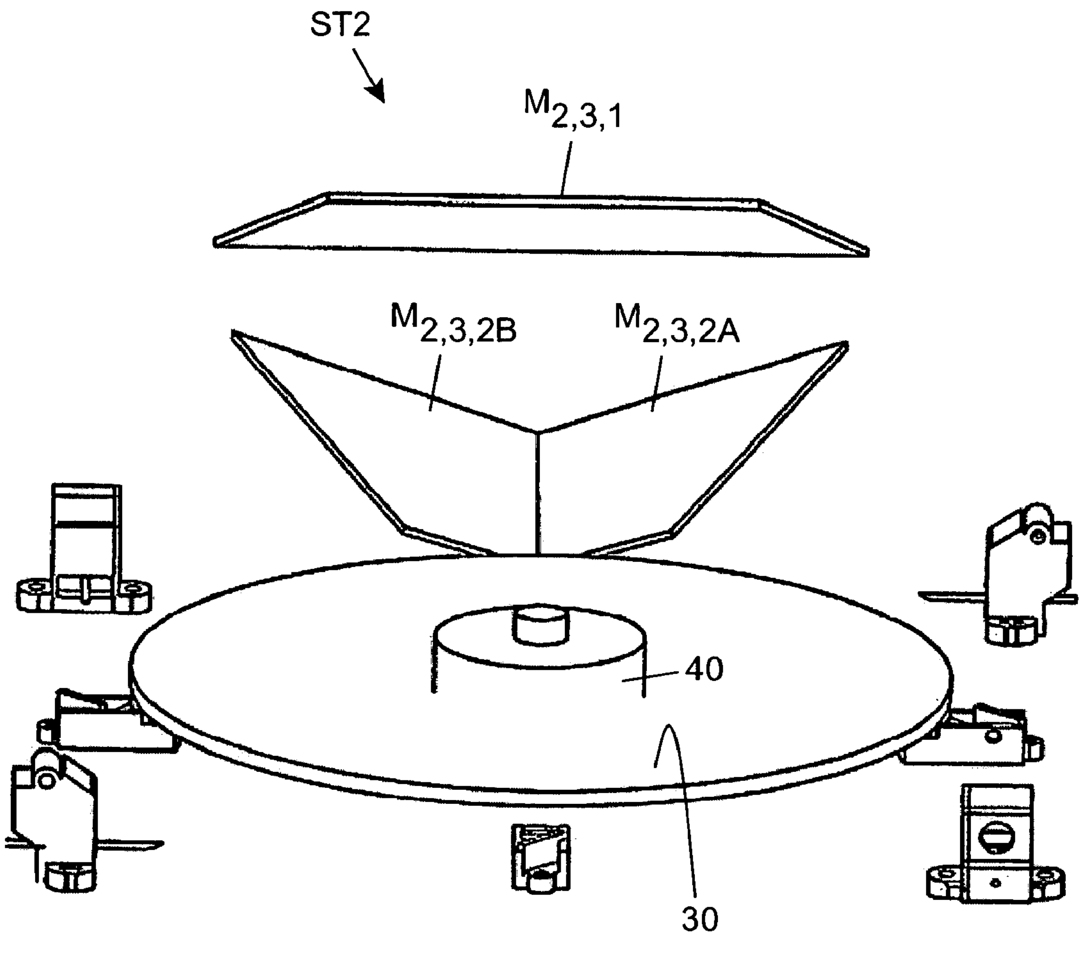
FIG. 2L is a perspective view of the second laser scanning station (ST2) in the bioptical holographic laser scanning system of the present invention, showing solid models of its laser beam production and direction modules disposed about the edge of the holographic laser scanning disc, and associated group of laser beam folding mirrors, wherein the laser beam folding mirrors associated the group ($Mi_{j,k}$ where the group index j is j=3) cooperate with laser beams generated from scanning facets having low elevation angle and zero (i.e. no) skew angle characteristics.

Referring to FIGS. 2L and 3C and using the mirror identification conventions disclosed above, the laser beam folding mirrors employed at the second scanning station ST2 can be conveniently indexed as follows: mirror group MG3@ST2, containing facets that do not generate skewed outgoing laser beams, has two beam folding mirrors indicated by $M_{1,3,1,}$ and $M_{1,3,2}$ shown in FIGS. 5I1 through 5J5, and 6D1 through 6D7.

The position and orientation of each beam folding mirror employed at the second scanning station ST2 relative to the second locally-defined coordinate reference system $R_{local\ 2}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3C, organized according to the three mirror groups MG1@ST2, MG2@ST2 and MG3@ST2 employed at laser scanning station ST2. Notably, the first vertex of each facet in these mirror groups is repeated in the table of FIG. 3C, to traverse a closed path in 3-D space, specifying the perimetrical boundaries of these optimally-trimmed beam folding mirrors employed in the scanning system of the illustrative embodiment.

As shown in FIG. 3C, the mirrors in each mirror group of scanning station ST2 are arranged in the order that the beam folding mirror performs its beam folding (i.e. light reflection) function upon the outgoing diffracted laser beam produced by a scanning facets associated with a facet group corresponding to the mirror group. Notably, at scanning station ST2, two light reflection operations are performed by the mirror group MG3@ST2 upon the outgoing diffracted laser beams. Also, while beam reflecting mirror $M_{2,3,1}$ has four vertices, mirrors $M_{2,3,1A}$ and $M_{2,3,1B}$ have five vertices. As will be described in greater detail hereinafter, the exact number of vertices of each beam folding mirror at scanning station ST2 will depend on the laser scanning plane being generated by the outgoing laser beam, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the second laser scanning station ST2, it is understood that other mirror surface areas, positions and orientations can and may be used to realize other embodiments of the second laser scanning station ST2 in accordance with the principles of the present invention taught herein.

As best shown in FIGS. 1D1, 1E, 2B2, 2C1, 2M, 2N and 2O, the third laser scanning station (ST2) comprises: a third laser beam production module 41C mounted on the optical bench 42 of the system, preferably outside the outer periphery of the holographic scanning disc 30, as shown in FIG. 2A2 and 2B2; a third laser beam directing mirror 43C, disposed beneath the edge of the scanning disc, below the third point of incidence associated with the third scanning station ST3, for directing the laser beam output from the third laser beam production module 41C, through the third point of incidence at a fixed angle of incidence; three groups of laser beam folding mirrors, MG1@ST3, MG2@ST3 and MG3@¢ST3 which are arranged about the third point of incidence at the third scanning station ST3, and cooperate with the three groups of scanning facets MG1@ST3, MG2@ST3 and MG3@ST3 on the scanning disc, respectively, so as to generate and project different groups of laser scanning planes through the bottom scanning window 16, as graphically illustrated in FIGS. 5K1 through 5R5, and vectorally specified in FIGS. 6E1 through 6G5; a third light collecting/focusing mirror structure (e.g. parabolic light collecting mirror or parabolic surface emulating volume reflection hologram) 70C disposed beneath holographic scanning disc 30 adjacent the third laser beam directing mirror 43C and the third point of incidence at scanning station ST3; a third photodetector 45C disposed substantially above the third point of incidence at scanning station ST3 at a predetermined (i.e. minimized) height above the holographic scanning disc 30; and a third set of analog and digital signal processing boards 50C and 55C, associated with the third laser scanning station ST3, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

Figure 2M:
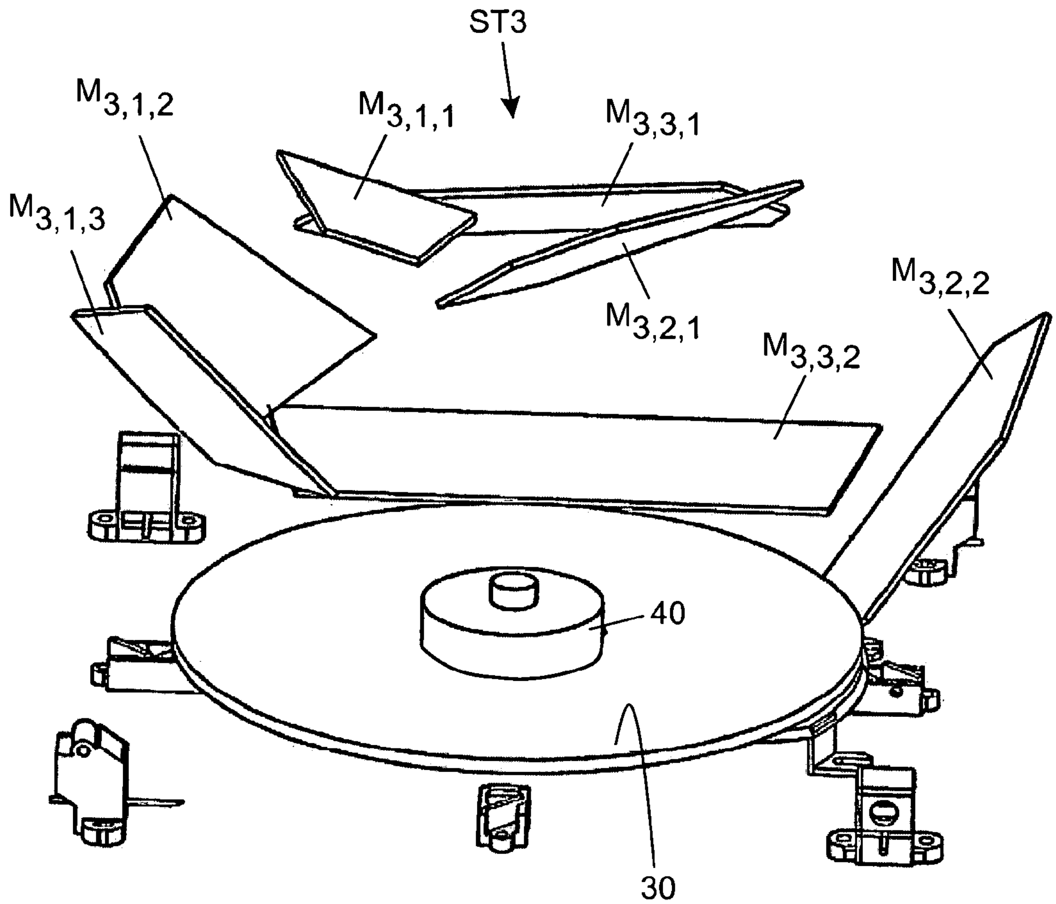
FIG. 2M is a perspective view of the third laser scanning station (ST3) in the bioptical holographic laser scanning system of the present invention, showing solid models of its laser beam production and direction modules disposed about the edge of the holographic laser scanning disc, and associated first, second and third groups of laser beam folding mirrors, wherein the laser beam folding mirrors associated with the first group ($M_{i,j,k}$ where the group index j is i=1) cooperate with laser beams generated from scanning facets having high elevation angle and positive (i.e. left) skew angle characteristics, the laser beam folding mirrors associated with the second group ($M_{i,j,k}$ where the group index j is j=2) cooperate with laser beams generated from scanning facets having high elevation angle and negative (i.e. right) skew angle characteristics, and the laser beam folding mirrors associated with the first group ($M_{i,j,k}$ where the group index j is j=3) cooperate with laser beams generated from scanning facets having low elevation angle and zero (i.e. no) skew angle characteristics.
Figure 2N:
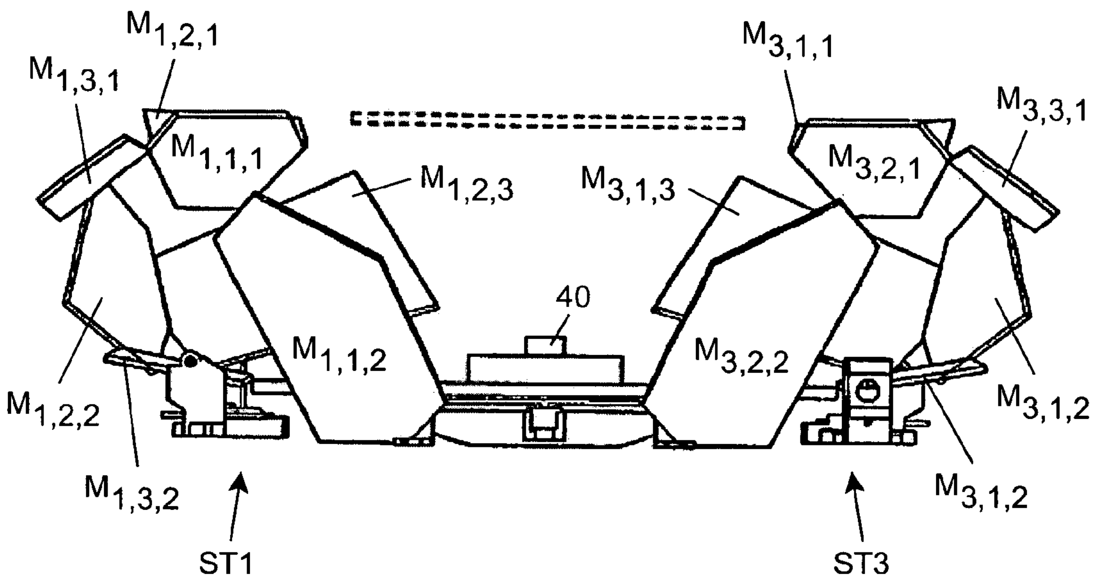
FIG. 2N is an elevated side view of the first and third laser scanning stations (ST1 and ST3) in the bioptical holographic laser scanning system of the present invention, showing solid models of its laser beam production and direction modules disposed about the edge of the holographic laser scanning disc, and associated first, second and third groups of laser beam folding mirrors.
Figure 2O:
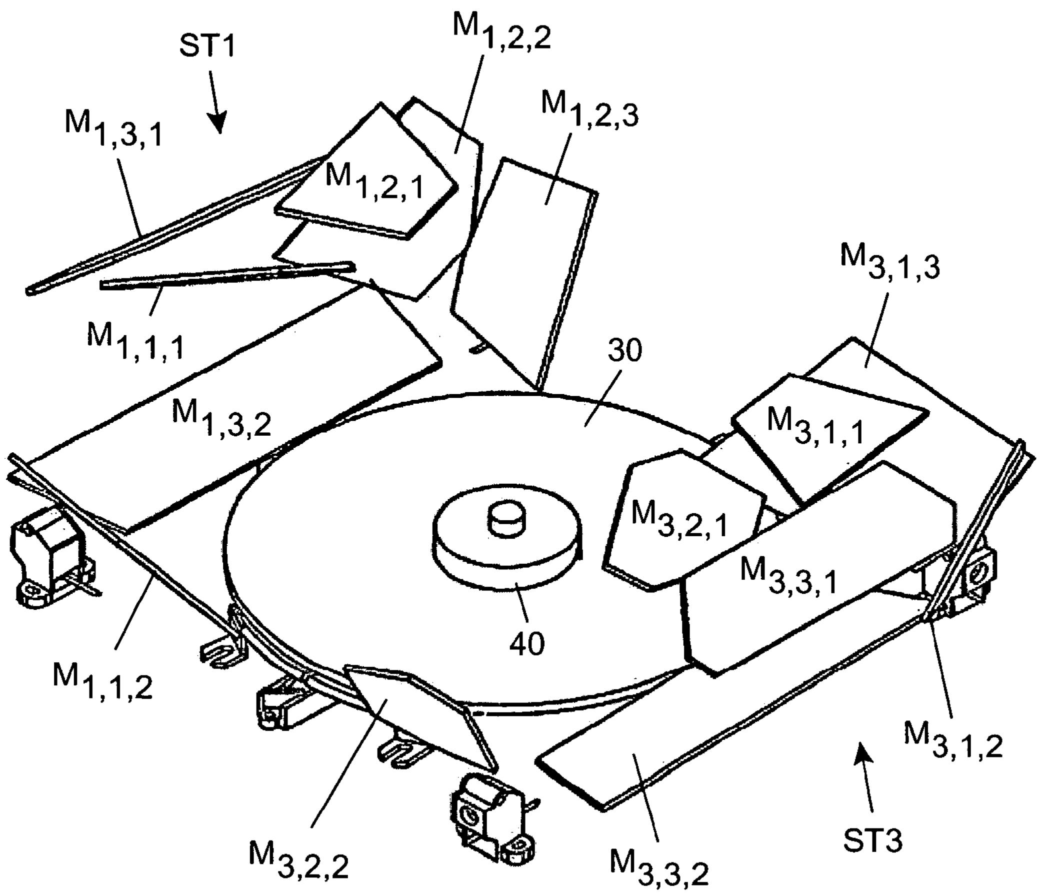
FIG. 2O is a perspective view of the first and third laser scanning stations (ST1 and ST3) in the bioptical holographic laser scanning system of the present invention, showing solid models of its laser beam production and direction modules disposed about the edge of the holographic laser scanning disc, and associated first, second and third groups of laser beam folding mirrors.
Figure 2P:
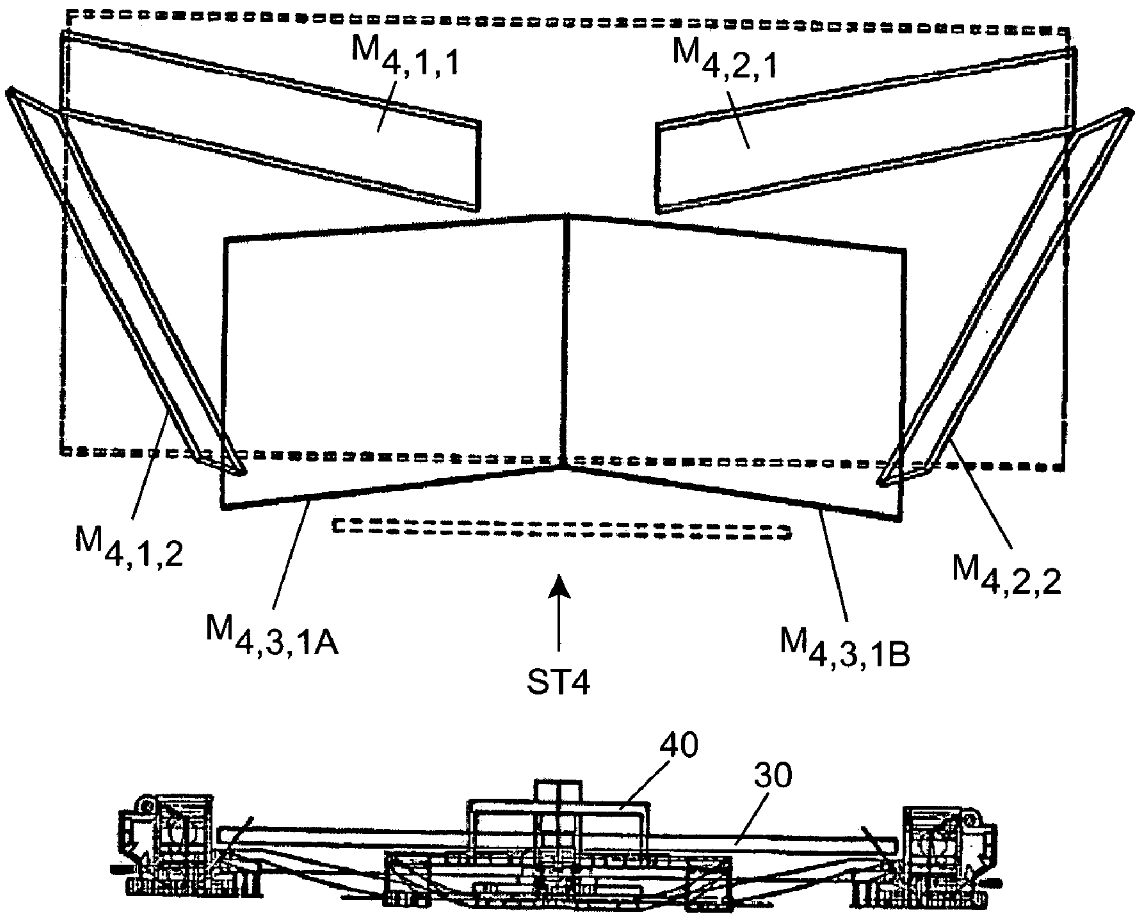
FIG. 2P is a perspective view of the fourth laser scanning station (ST4) in the bioptical holographic laser scanning system of the present invention, showing solid models of its laser beam production and direction modules disposed about the edge of the holographic laser scanning disc, and associated first, second and third groups of laser beam folding mirrors, wherein the laser beam folding mirrors associated with the first group ($M_{i,j,k}$ where the group index j is i=1) cooperate with laser beams generated from scanning facets having high elevation angle and positive (i.e. left) skew angle characteristics, the laser beam folding mirrors associated with the second group ($M_{i,j,k}$ where the group index j is j=2) cooperate with laser beams generated from scanning facets having high elevation angle and negative (i.e. right) skew angle characteristics, and the laser beam folding mirrors associated with the first group ($M_{i,j,k}$ where the group index j is j=3) cooperate with laser beams generated from scanning facets having low elevation angle and zero (i.e. no) skew angle characteristics.
Figure 2Q:
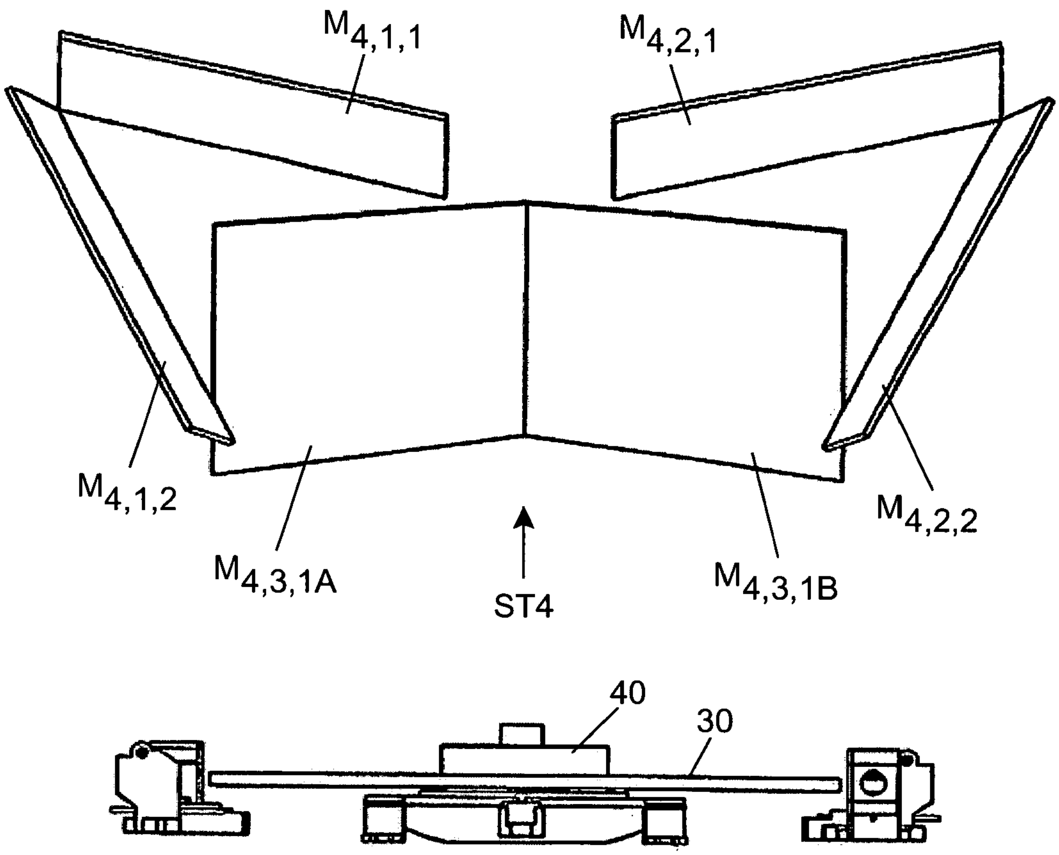
FIG. 2Q is an elevated side view of the fourth laser scanning stations (ST4) in the bioptical holographic laser scanning system of the present invention, showing solid models of its laser beam production and direction modules disposed about the edge of the holographic laser scanning disc, and associated first, second and third groups of laser beam folding mirrors.

Referring to FIGS. 2M and 3D and using the mirror identification conventions set forth above, the laser beam folding mirrors employed at the third scanning station ST3 can be conveniently indexed as follows: mirror group MG1@ST3, containing facets that generate left (i.e. positive) skewed outgoing laser beams, has three beam folding mirrors indicated by $M_{3,1,1,}$, $M_{3,1,2}$ and $M_{3,1,3}$ shown in FIGS. 5M1 through 5N5, and FIGS. 6E1 through 6G5; mirror group MG2@ST3, containing facets that generate right (i.e. negative) skewed outgoing laser beams, has two beam folding mirrors indicated by $M_{3,3,1}$, and $M_{3,2,2}$ shown in FIGS. 5K1 through 5L5, and FIGS. 6F1 through 6F4; and mirror group MG3@ST3, containing facets that do not generate skewed outgoing laser beams, has two beam folding mirrors indicated by $M_{3,3,1}$, and $M_{3,3,2}$ shown in FIGS. through 5P5, and FIGS. 6G1 through 6G5.

The position and orientation of each beam folding mirror employed at scanning station ST3 relative to the third locally-defined coordinate reference system $R_{local\ 3}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3D, organized according to the three mirror groups MG1@ST3, MG2@ST3 and MG3@ST3 employed at laser scanning station ST3. Notably, the first vertex of each facet in these mirror groups is repeated in the table of FIG. 3D, to traverse a closed path in 3-D space, specifying the perimetrical boundaries of these optimally-trimmed beam folding mirrors employed in the scanning system of the illustrative embodiment.

As shown in FIG. 3D, the mirrors in each mirror group of scanning station ST3 are arranged in the order that the beam folding mirror performs its beam folding (i.e. light reflection) function upon the outgoing diffracted laser beam produced by a scanning facet associated with a facet group corresponding to the mirror group. Notably, at scanning station ST3, two light reflection operations are performed by the mirror groups MG2@ST3 and MG3@ST3 upon the outgoing diffracted laser beams, whereas three light reflection operations are performed by mirror group MG1@ST3 upon the outgoing diffracted laser beams. Also, certain beam reflecting mirrors (e.g. $M_{3,2,1}$ and $M_{3,2,2}$) have six vertices, while some mirrors have four vertices (e.g. $M_{3,1,2}$ and $M_{3,3,2}$), and yet other mirrors (e.g. $M_{3,1,3}$) have five vertices. As will be described in greater detail hereinafter, the exact number of vertices of each beam folding mirror will depend on the laser scanning plane being generated by the outgoing laser beam, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the third laser scanning station ST3, it is understood that other mirror surface areas, positions and orientations can and may be used to realize other embodiments of the third laser scanning station ST3 in accordance with the principles of the present invention taught herein.

As best shown in FIGS. 1D1, 1E, 2B2, 2C1, 2N, 2P and 2Q, the fourth laser scanning station (ST4) comprises: a fourth laser beam production module 41D mounted on the optical bench 42 of the system, preferably outside the outer periphery of the holographic scanning disc 30, as shown in FIGS. 2A2 and 2B2; a fourth laser beam directing mirror 43D, disposed beneath the edge of the scanning disc, below the fourth point of incidence associated with the fourth scanning station ST4, for directing the laser beam output from the fourth laser beam production module 41D, through the fourth point of incidence at a fixed angle of incidence; three groups of laser beam folding mirrors, MG1@ST4, MG2@ST4 and MG3@ST4 which are arranged about the fourth point of incidence at the fourth scanning station ST4, and cooperate with the three groups of scanning facets G1, G2 and G3 on the scanning disc, respectively, so as to generate and project different groups of laser scanning planes through the side bottom scanning window 18, as graphically illustrated in FIGS. 5U1 through 5Z4, and vectorally specified in FIGS. 6H1 through 6J7; a fourth light collecting/focusing mirror structure (e.g. parabolic light collecting mirror or parabolic surface emulating volume reflection hologram) 700 disposed beneath holographic scanning disc 30 adjacent the fourth laser beam directing mirror 43D and the fourth point of incidence at scanning station ST4; a fourth photodetector 45D disposed substantially above the fourth point of incidence at scanning station ST4 at a predetermined (i.e. minimized) height above the holographic scanning disc 30; and a fourth set of analog and digital signal processing boards 50D and 55D, associated with the fourth laser scanning station ST4, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

Referring to FIGS. 2N, 2P, 2Q, and 3E and using the mirror identification conventions set forth above, the laser beam folding mirrors employed at the fourth scanning station ST4 can be conveniently indexed as follows: mirror group MG1@ST4, containing facets that generate left (i.e. positive) skewed outgoing laser beams, has two beam folding mirrors indicated by $M_{4,1,1}$, and $M_{4,1,2}$ shown in FIGS. 5U1 through 5V5, and FIGS. 6H1 through 6H4; mirror group MG2@ST4, containing facets that generate right (i.e. negative) skewed outgoing laser beams, has two beam folding mirrors indicated by $M_{4,2,1}$, and $M_{4,2,2}$ shown in FIGS. 5U1 through 5V5, and FIGS. 6I1 through 6I4; and mirror group MG3@ST4, containing facets that do not generate skewed outgoing laser beams, has two (i.e. a pair of split-type) beam folding mirrors indicated by $M_{4,3,1A}$, and $M_{4,3,1B}$ shown in FIGS. 5W1 through 5V5, and FIGS. 6J1 through 6J7.

The position and orientation of each beam folding mirror employed at scanning station ST4 relative to the fourth locally-defined coordinate reference system $R_{local\ 4}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3E, organized according to the three mirror groups MG1@ST4, MG2@ST4 and MG3@ST4 employed at laser scanning station ST4. Notably, the first vertex of each facet in these mirror groups is repeated in the table of FIG. 3E, to traverse a closed path in 3-D space, specifying the perimetrical boundaries of these optimally-trimmed beam folding mirrors employed in the scanning system of the illustrative embodiment.

As shown in FIG. 3E, the mirrors in each mirror group of scanning station ST4 are arranged in the order that the beam folding mirror performs its beam folding (i.e. light reflection) function upon the outgoing diffracted laser beam produced by a scanning facet associated with a facet group corresponding to the mirror group. Notably, at scanning station ST4, two light reflection operations are performed by the mirror groups MG1@ST4 and MG1@ST4 upon the outgoing diffracted laser beams, whereas one light reflection operation is performed by mirror group MG3@ST4 upon the outgoing diffracted laser beams. Notably, while all mirrors in the mirror groups of scanning station have four vertices, it is understood that in alternative embodiments of the present invention, the beam folding mirrors in such mirror groups may have more or less than four vertices, depending on the laser scanning planes being generated by the outgoing laser beams, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the fourth laser scanning station ST4, it is understood that other mirror surface areas, positions and orientations can and may be used to realize other embodiments of the fourth laser scanning station ST4 in accordance with the principles of the present invention taught herein.

In the illustrative embodiment of the present invention, certain of the laser beam folding mirrors associated with scanning stations ST1 and ST3, and all of the beam folding mirrors associated with scanning station ST4 are physically supported using a first mirror support platform, formed with the scanner housing. All of the beam folding mirrors associated with the second laser scanning station ST2, and certain of beam folding mirrors associated with laser scanning stations ST1 are physically supported using a second mirror support platform associated with optical bench 42 of the scanning system. Preferably, these mirror mounting support structures, as well as the components of the scanning housing are made from a high-impact plastic using injection molding techniques well known in the art. The vertices of the laser beam folding mirrors used at each scanning station can be used to create molds for making such mirror support structures.

During operation of the bioptical laser scanning system hereof, each laser beam production module 41A, 41B , 41C and 41D cooperates with the holographic scanning disc 30 and produces from its internal visible laser diode(VLD) 153, a laser beam having desired beam cross-sectional characteristics (e.g. the beam aspect ratio of an ellipse or circle) and being essentially free of astigmatism and beam-dispersion that is otherwise associated with a laser beam directly transmitted from a VLD through a prior art rotating holographic scanning facet during laser beam scanning operations. When an incident laser beam from the VLD passes through a particular holographic scanning facet at the point of incidence of the laser scanning station of the present invention, it is diffracted in a prespecified "outgoing" direction (i.e. at an angle of diffraction $B_i$) determined by the skew angle $\phi_{skew}$ and elevation angle $\theta_{elevation}$ determined during the holographic disc design process of the present invention. The function of the multiple groups of laser beam folding mirrors associated with each laser scanning station is to change (i.e. fold) the direction of the outgoing diffracted laser beam from its outgoing direction off the scanning disc, into the direction required to generate its corresponding laser scanning plane in front of the bottom and side scanning window 16 and 18. The actual laser scanning planes produced by the laser scanning stations of the system are geometrically specified in FIGS. 5A1 through 5Z4, and vectorally specified in FIGS. 6A1 through 6J7. Notably, when a produced laser scanning plane is intersected by a planar surface (e.g. associated with an object bearing a bar code symbol), a linear scanline is projected on the intersected surface. The angular dimensions of each resulting scanning plane are determined by the Scan Angle, $\theta_{Si}$ associated with the geometry of the scanning facet, and the Scan Angle Multiplication Factor, $M_i$ associated therewith, which will be discussed in greater detail hereinafter.

When a bar code symbol is scanned by any one of the laser scanning planes projected from the bottom or side scanning windows of the system, the incident laser light scanned across the object is intensity modulated by the absorptive properties of the scanned object and scattered according to Lambert's Law (for diffuse reflective surfaces). A portion of this laser light is reflected back along the outgoing ray (optical) path, off the same group of beam folding mirrors employed during the corresponding laser beam generation process, and thereafter passes through the same holographic scanning facet that generated the corresponding scanning plane only $T_{transit}$=2-$f_i$/c seconds before, where c is the speed of light. As the reflected laser light passes through the holographic scanning facet on its return path towards the parabolic mirror structure disposed beneath the holographic scanning disc, the incoming light rays enter the holographic scanning facet close to the Bragg angle thereof (i.e. $B_i$) and thus (once again) are strongly diffracted towards the parabolic mirror along its optical axis. The parabolic mirror associated with each laser scanning station, in turn, focuses these collected light rays and redirects the same through the holographic scanning facet at angles sufficiently far off the Bragg angle (i.e. $A_i$) so that they are transmitted therethrough towards the photodetector disposed directly above the point of incidence at the laser scanning station with minimal losses due to internal diffraction within the holographic facet. A novel method of designing the light collection/focusing/detection subsystem of the present invention will be described in great detail hereinafter.

As will be described in greater detail hereinafter, the geometry of each holographic facet has been designed so that (1) each of the twelve holographic facets supported thereon has substantially the same (i.e. equal) Lambertian light collecting efficiency, independent of its focal length, and (2) the collective surface area of all of the holographic facets occupies (i.e. uses) all of the available light collecting surface area between the outer radius and inner radius of the scanning disc. The advantage of this aspect of the present invention is that optical-based scan data signals with maximum signal-to-noise (SNR) ratio are produced and collected at the photodetector of each laser scanning station in the system. This, of course, implies higher performance and higher quality scan data signals for signal processing purposes.

As shown in FIG. 3A1, each holographic facet on the surface of the scanning disc is specified by a set of geometrical parameters, a set of optical parameters, and a set of holographic recording parameters. The geometrical parameters define various physical characteristics of the facet in issue, such as the location of the facet on the disc specified by its preassigned facet number (e.g. n=1, 2, 3, . . . , or 12), its light collecting surface $Area_i$ (designed to exhibit a high diffraction efficiency to incoming light rays on Bragg), the Angle of the facet $\theta_{roti}$, the adjusted Rotation Angle of the facet $\theta'_{roti}$ actual scan angle of the facet $\theta_{Sweepi}$ (accounting for beam diameter $d_{beam}$ and interfaced gaps $d_{gap}$), and the surface boundaries $SB_i$ occupied by the holographic facet on the scanning disc, which typically will be irregular in shape by virtue of the optimized light collecting surface area of the holographic disc). The optical parameters associated with each holographic facet include the wavelength $\lambda$ at which the object beam is designed to be reconstructed, the angle of incidence of the holographic facet $A_i$, the angle of diffraction thereof $B_i$, its scan angle multiplication factor $M_i$, the focal length $f_i$ of the facet, etc. Unlike the other parameters associated with each facet, the recording parameters define: the thickness of the recording medium T (e.g. dichromate gelatin or Dupont photopolymer) used during the recording of the holographic facet; the average bulk index of refraction of the recording medium; and the modulation depth (i.e. modulation-index) $\Delta n_i$ associated with fringe structure formed in the recording medium. Collectively, these parameters shall be referred to as "construction parameters" as these parameters are required to construct the holographic facet with which they are associated.

In the bioptical holographic laser scanning system of the present invention, the principal function of each holographic facet on the scanning disc is to deflect an incident laser beam along a particular path in 3-D space in order to generate a corresponding scanning plane within the 3-D laser scanning volume produced by the laser scanning system hereof. Collectively, the complex of laser scanning planes produced by the plurality of holographic facets in cooperation with the four laser beam production modules ST1, ST2, ST3, ad ST4 creates an omni-directional scanning pattern within the highly-defined 3-D scanning volume of the scanning system between the space occupied by the bottom and side scanning windows of the system.

In the bioptical holographic laser scanning system of the present invention, multiple facets of the holographic scanning disc can be designed such that multiple incident laser beams are simultaneously focused to overlapping regions in the 3-D scanning volume at varying focal distances (preferably, less than 2 inches or less difference in focal distance). Such features provide a larger spot in the same vicinity as a smaller spot, which extends the overall depth of field of the bioptical holographic laser scanner system while reducing paper noise.

As shown in the timing diagram of FIG. 6K, the bioptical holographic laser scanner of the illustrative embodiment cyclically generates a complex omni-directional 3-D laser scanning pattern from both the bottom and side scanning windows 16 and 18 thereof. This complex omnidirectional scanning pattern is graphically illustrated in FIGS. 5A1 through 5A5, and the scanning plane components of this pattern are graphically illustrated in FIGS. 5A6 through 5Z4. The 3-D laser scanning pattern of the illustrative embodiment consists of 50 different laser scanning planes, having different depths of focus, which cooperate in order to generate a plurality of pairs of quasi-orthogonal laser scanning patterns within the 3-D scanning volume of the system, thereby enabling true omnidirectional scanning of bar code symbols having minimum bar elements on the order of about 0.006 inches or less. Greater details of the laser scanning pattern of the present invention will be described hereinbelow.

In the bioptical holographic laser scanning system of the present invention, the laser light source (e.g., VLD) of the laser beam production module(s) can be deactivated (e.g., turned off) when the scan line produced therefrom is no longer passing through the bottom or side window. This eliminates unwanted internal scattering of the laser light in the system housing and extends the life of the laser light source.

As shown in FIGS. 2E through 2E3 and 2F1 through 2H3, the four laser production modules 41A, 41B, 41C and 41D are mounted on a base plate (i.e. optical bench) 42 in FIG. 1G, about the axis of rotation of the shaft of electric motor 41, at the angular locations specified in FIGS. 2B1 and 2B2, detailed above. As shown in FIGS. 2G1 through 2G3, each laser beam production module comprises: a visible laser diode (VLD) 153 and an aspheric collimating lens (L1) 81 supported within the bore of a housing 82 mounted upon the optical bench 42 of the module housing; a multi-function light diffractive grating 83 having a fixed spatial frequency and disposed at incident angle relative to the outgoing laser beam collimated from lens 81 for changing properties of the incident laser beam so that the aspect-ratio thereof is controlled, beam dispersion is minimized upon the laser beam exiting the holographic scanning disc; a beam folding mirror 84 supported at the edge of housing for directing the output laser beam through the scanning disc at the point of incidence, at the angle of incidence; and, possibly, a photodetector 84 supported within a housing 82 and disposed along the optical axis of the VLD 81 for detecting the zeroeth diffraction order as the incident laser beam is transmitted through the multifunction light diffractive grating 83, and producing an electrical signal indicative of the detected intensity. Details for designing the multi-function light diffractive grating and configuring the laser scanning beam module of the illustrative embodiment is described in great detail in Applicants' prior U.S. patent application Ser. No. 08/949,915 filed Oct. 14, 1997, and incorporated herein by reference, incorporated herein by reference in its entirety.

In the illustrative embodiment describe above wherein the laser scanning station ST4 produces scanning planes that are directed through the vertical window 18 of the system, the aspheric collimating lens (L1) 81 of the laser production module 41D for the laser scanning station ST4 is designed to increase the focus distance of these scanning planes directed through the vertical window 18 beyond the focus distance of the scanning planes that are directed through the horizontal window 16 of the system (produced by the laser scanning stations ST1, ST2 and ST3). Such a design allows for the same facets of the holographic disc to be used in producing the scanning planes that are directed through both the vertical window 18 and the horizontal window 16.

In each laser scanning station (ST1, ST2, ST3 and ST4) of the illustrative embodiment, the laser beam production module serves several important functions. The module produces a circularized laser beam that is directed at the point of incidence, located at $r_o$, on the rotating scanning disk, at the prespecified angle of incidence $\theta_i$ (i.e. 90°-$A_i$), which, in the illustrative embodiment, is precisely the same for all facets thereon. Also, the module produces a laser beam that is free of VLD-related astigmatism, and exhibits minimum dispersion when diffracted by the scanning disk, as taught by Applicants in U.S. patent application Ser. No. 08/949,915 filed Oct. 14, 1997, and incorporated herein by reference.

As shown in FIGS. 2H1 and 2H2, each laser beam directing module 41A, 41B, 41C and 41D, cooperating with laser beam directing modules 43A, 43B, 43C and 43D, respectively, comprises an optical bench 90 which is stationarily mounted upon the optical bench of the scanning system, as shown in FIGS. 1E and 2A2. As shown in FIGS. 2H1 and 2H2, the optical bench 90 supports a first planar mirror 91 which reflects the laser beam output from its associated laser beam production module at about a 90 degree angle, onto a second planar mirror 92 also supported by the optical bench. As shown, the second planar mirror 92 is disposed at an angle relative to the central plane of the scanning disc to that the beam reflecting off the second planar mirror 92 is directed onto the point of incidence of the associated scanning station at the predetermined angle of incidence.

As shown in FIGS. 2I1 through 2J2, scan data photodetectors 45A and 45C associated with laser scanning stations ST1 and ST3 are mounted substantially above the first and third point of incidences, whereas scan data photodetectors 45B and 45D associated with laser scanning stations ST2 and ST4 are mounted substantially above the second and fourth point of incidences so that these devices do not block or otherwise interfere with the returning (i.e. incoming) laser light rays reflecting off light reflective surfaces (e.g. product surfaces, bar code symbols, etc) during laser scanning and light collecting operations. In practice, each photodetector 45A, 45B, 45C and 45D is supported in its respective position by a photodetector support frame or like structure which is stationarily mounted to the optical bench 42 by way one or more support elements (not shown for purposes of clarity). The electrical analog scan data signal produced from each photodetector is processed in a conventional manner by its analog scan data signal processing board which can be supported upon photodetector support frame, or by other suitable support mechanisms known in the art. Notably, the height of the photodetector support structure, referenced to the base plate (i.e. optical bench) 42, will be chosen to be less than the maximum height of the base/bottom portion of the scanner housing.

As best shown in FIGS. 2I and 2J2, the parabolic light collecting mirror structure 70A (70B, 70C, 70D) associated with each laser scanning station is disposed beneath the holographic scanning disc, about the × axis of the locally embedded coordinate system of the laser scanning station. While certainly not apparent, precise placement of the parabolic light collecting element (e.g. mirror) relative to the holographic facets on the scanning disc is a critical requirement for effective light detection by the photodetector associated with each laser scanning station. Placement of the photodetector 45A at the focal point of the parabolic light focusing mirror 70A alone is not sufficient for optimal light detection in the light detection subsystem of the present invention. Careful analysis must be accorded to the light diffraction efficiency of the facets on the holographic scanning disc and to the polarization state(s) of collected and focused light rays being transmitted therethrough for detection. As will become more apparent hereinafter, the purpose of such light diffraction efficiency analysis ensures the realization of two important conditions, namely: (i) that substantially all of the incoming light rays reflected off an object (e.g. bar code symbol) and passing through the holographic facet (producing the corresponding instant scanning beam) are collected by the parabolic light collecting mirror; and (ii) that all of the light rays collected by the parabolic light collecting mirror are focused through the same holographic facet onto the photodetector associated with the station, with minimal loss associated with light diffraction and refractive scattering within the holographic facet.

In another embodiment of the present invention, the scan data photodetector (45A, 45B, 45C and 45D) for each laser scanning station is mounted along the × axis in the locally embedded coordinate system of the laser scanning station directly above the edge of the holographic scanning disc (or possibly outside the outer periphery of the holographic scanning disc). Moreover, the corresponding parabolic light collecting mirror structure (70A, 70B, 70C, or 70D) for each laser scanning station is disposed beneath the holographic scanning disc, about the x axis of the locally embedded coordinate system of the laser scanning station and is designed to ensure the realization of two important conditions, namely: (i) that substantially all of the incoming light rays reflected off an object (e.g. bar code symbol) and passing through the holographic facet (producing the corresponding instant scanning beam) are collected by the parabolic light collecting mirror structure (70A, 70B, 70C, or 70D); and (ii) that all of the light rays collected by the parabolic light collecting mirror structure (70A, 70B, 70C, or 70D) are focused onto the corresponding scan data photodetector (45A, 45B, 45C and 45D). Such a design reduces the height of the parabolic light collecting mirror structures (70A, 70B, 70C, and 70D), thereby allowing for reduction in depth of the scanner housing, which is a key benefit in a space constrained environment such as in POS retail applications.

In another embodiment of the present invention, the scan data photodetector (45A, 45B, 45C or 45D) for one or more of the laser scanning stations may be disposed behind one of the beam folding mirrors. In this case, a small hole (or notch) may be cut in this beam folding mirror(s) to allow return light collected by the corresponding parabolic light collecting mirror structure (70A, 70B, 70C, or 70D), which is disposed beneath the holographic scanning disc, to reach the scan data photodetector (45A, 45B, 45C and 45D).

Preferably, the size, shape and orientation of the scan data collecting photodetector (45A, 45B, 45C and 45D) for each laser scanning station is designed so that the lateral shift of the reflected beam image across the light sensitive surface of the photodetector, as a scanned item moves through the depth of field region of the scanning station, results in a relatively uniform light level reaching the light sensitive surface of the photodetector.

In addition, a light cone disposed immediately adjacent to one or more of the scan data collecting photodetectors (45A, 45B, 45C and 45D) may be used to collect light directed thereto by the parabolic light collecting mirror structures (70A, 70B, 70C, and 70D) and funnel such light to the light collecting surface(s) of the photodetector(s).

In addition, one or more light pipes may be used to funnel light from a light collection element (for example, a parabolic light collecting mirror) in the return optical path for one or more of the laser scanning stations to the light collecting surface(s) of the scan data collecting photodetector(s) (45A, 45B, 45C and 45D).

Moreover, the optical surface of the parabolic light collecting mirror structures (70A, 70B, 70C, and 70D) for the laser scanning stations ST1, ST2, ST3 and ST4, respectively, is preferably shaped as a truncated ellipse. Such an optical surface may be physically formed from pie-shaped sectors whose three corners are truncated.

As illustrated in FIG. 2I2, a light blocking element 51, which is supported by legs (two shown as 52A and 52B), may be positioned above the scanning disk 30. The light blocking element 51 serves two primary purposes. First, it blocks the zero-order beams produced from the scanning disc 30 (which correspond to the primary beams produced by the laser beam production modules 47A, 47B, 47C and 47D for the laser scanning stations ST1, ST2, ST3 and ST4, respectively, that are incident on the scanning disc 30) so that these zero-order beams do not pass through the bottom window 16. Importantly, these zero-order beams are static beams and would, therefor, violate laser safety standers were it not blocked. The second function is to block ambient light which comes into the bottom window 16 (including light entering the bottom window 16 along the exact opposite direction of the outgoing zero-order beams) from reaching the photodetectors (45A, 45B, 45C and 45D) for the laser scanning stations ST1, ST2, ST3 and ST4, respectively. If it were not blocked, this ambient light would, in some amount, pass through the scanning disc 30, reflect off the parabolic light collecting mirror structures (70A, 70B, 70C, and 70D) and be directed to the photodetectors (45A, 45B, 45C and 45D), which would add unwanted noise to the signal generated therein.

As shown in FIGS. 2A and 2B1, the four digital scan data signal processing boards 55A, 55B, 55C and 55D are arranged in such a manner within the scanner housing to receive and provide for processing the analog scan data signals produced from analog scan data signal processing boards 50A, 50B, 50C, and 50D respectively. Each of the analog signal processing boards 50A, 50B, 50C and 50D, with it scan data photodetector mounted thereto, can be mounted above the corresponding laser beam directing mirror module 43A, 43B, 43C and 43D, set back slightly in a radial direction along the × axis of the locally embedded coordinate reference system. In practice, each analog scan data signal can be made very small and narrow to occupy the available space provided in such "return ray free" locations within the scanner housing. Digital scan data signal processing boards 55A, 55B, 55C and 55D can be mounted virtually anywhere within the side portion of the scanner housing which does not cause interference with outgoing and incoming (i.e. return) laser light rays. A central processing board 60 can also be mounted within the vertical housing portion of the scanner housing, for processing signals produced from the digital scan data signal processing boards. A conventional power supply board can be mounted upon the base plate (i.e. optical bench) 42 of the system, preferably within one of the corners of the system. The function of the digital scan data signal processing boards, the central processing board, and the power supply board will be described in greater detail in connection with the functional system diagram of FIG. 4. As shown, electrical cables are used to conduct electrical signals from each analog scan data signal processing board to its associated digital scan data signal processing board, and from each digital scan data signal processing board to the central processing board. Regulated power supply voltages are provided to the central signal processing board 60 by way of an electrical harness (not shown), for distribution to the various electrical and electro-optical devices requiring electrical power within the holographic laser scanner. In a conventional manner, electrical power from a standard 120 Volt, 60 HZ, power supply is provided to the power supply board by way of flexible electrical wiring (not shown). Symbol character data produced from the central processing board is transmitted over a serial data transmission cable connected to a serial output (i.e. standard RS232) communications jack installed through a wall in the scanner housing. This data can be transmitted to any host device by way of a serial (or parallel) data communications cable, RF signal transceiver, or other communication mechanism known in the art.

As shown in FIGS. 1A, the bottom and side scanning windows 16 and 18 have light transmission apertures of substantially planar extent. Bottom light transmission aperture is substantially parallel to the holographic scanning disc rotatably supported upon the shaft of electric motor 41, whereas the side light transmission aperture is substantially perpendicular thereto. In order to seal off the optical components of the scanning system from dust, moisture and the like, laser scanning windows 16 and 18, preferably fabricated from a high impact plastic material, are installed over their corresponding light transmission apertures using a rubber gasket and conventional mounting techniques. In the illustrative embodiment, each laser scanning window 16 and 18 has spectrally-selective light transmission characteristics which, in conjunction with a spectrally-selective filters 16A, 16B, 16C, 16D installed before each photodetector within the housing, forms a narrow-band spectral filtering subsystem that performs two different functions. The first function of the narrow-band spectral filtering subsystem is to transmit only the optical wavelengths in the red region of the visible spectrum in order to impart a reddish color or semi-transparent character to the laser scanning window. This makes the internal optical components less visible and thus remarkably improves the external appearance of the holographic laser scanning system. This feature also makes the holographic laser scanner less intimidating to customers at point-of-sale (POS) stations where it may be used. The second function of the narrow-band spectral filtering subsystem is to transmit to the photodetector for detection, only the narrow band of spectral components comprising the outgoing laser beam produced by the associated laser beam production module. Details regarding this optical filtering subsystem are disclosed in copending application Ser. No. 08/439,224, entitled "Laser Bar Code Symbol Scanner Employing Optical Filtering With Narrow Band-Pass Characteristics and Spatially Separated Optical Filter Elements" filed on May 11, 1995, which is incorporated herein by reference in its entirety.

When using multiple laser beam sources in any holographic laser scanning system, the problem of "cross-talk" among the neighboring light detection subsystems typically arises and must be adequately resolved. The cause of the cross-talk problem is well known. It is due to the fact that the spectral components of one laser beam are detected by a neighboring photodetector. While certainly not apparent, the holographic scanning disc of the present invention has been designed so that light rays produced from one laser beam (e.g. j=1) and reflected off a scanned code symbol anywhere within the laser scanning volume $V_{scanning}$ will fall incident upon the light collecting region of the scanning disc associated with a neighboring light detection subsystem in an off-Bragg condition. Consequently, the signal level of "neighboring" incoming scan data signals are virtually undetectable by each photodetector in the holographic laser scanner of the present invention. The optical characteristics of the scanning facets on the scanning disc which makes this feature possible will be described in greater detail hereinafter during the description of the scanning disc design process hereof.

As best shown in FIG. 3A1, the holographic scanning disc of the present invention is unlike any other prior art laser scanning disc in three important respects. Firstly, virtually all of the utilizable surface area of the scanning disc, defined between the outer edge of the support hub 40 and the outer edge of the scanning disc, is occupied by the collective surface area of all twenty holographic scanning facets that have been laid out over this defined region. Secondly, each holographic scanning facet has substantially the same Lambertian light collection efficiency as all other scanning facets. Unlike conventional laser scanning discs, the geometry of each holographic facet on the scanning disc of the present invention is apparently irregular, arbitrary and perhaps even fanciful to the eyes of onlookers. The fact is, however, that this is not the case. As taught in Applicants' U.S. patent application Ser. No. 08/949,915 filed Oct. 14, 1997, and incorporated herein by reference, the scanning disc design process employed herein comprises two major stages: a first, "analytical modeling stage" during which particular optical and geometrical parameters are determined for each holographic facet within a complex set of scanning system constraints; and a second, "holographic facet layout stage", during which the scanning disc designer lays out each holographic facet on the support disc so that virtually all of the available surface area thereon is utilized by the resulting layout. While the disc design method allows certain geometrical parameters associated with each designed holographic facet to be selected on the basis of discretion and judgement of the disc designer (preferably using a computer-aided (CAD) tool) during the holographic facet layout stage, certain geometrical parameters, however, such as the total surface area of each facet $Area_i$, its Scan Sweep Rotation (or Sweep Angle $\theta'_{rot}$) and its inner radius $r_i$ are determined during the analytical modeling stage by the geometrical structure (e.g. its scanline length, focal plane, and relative position in the scan pattern) associated with the corresponding laser scanline P(i,j) produced by the holographic facet within a particular focal plane of the prespecified laser scanning pattern. Consequently, particular parameters determined during the analytical modeling stage of the design process operate as constraints upon the disc designer during the facet layout stage of the process. Thus, the holographic facets realized on the scanning disc of the present invention have particular geometrical characteristics that are directly determined by geometrical properties of the laser scanning pattern produced therefrom, as well as the optical properties associated with the laser beam and the holographic facets realized on the scanning disc.

Figure 4A:
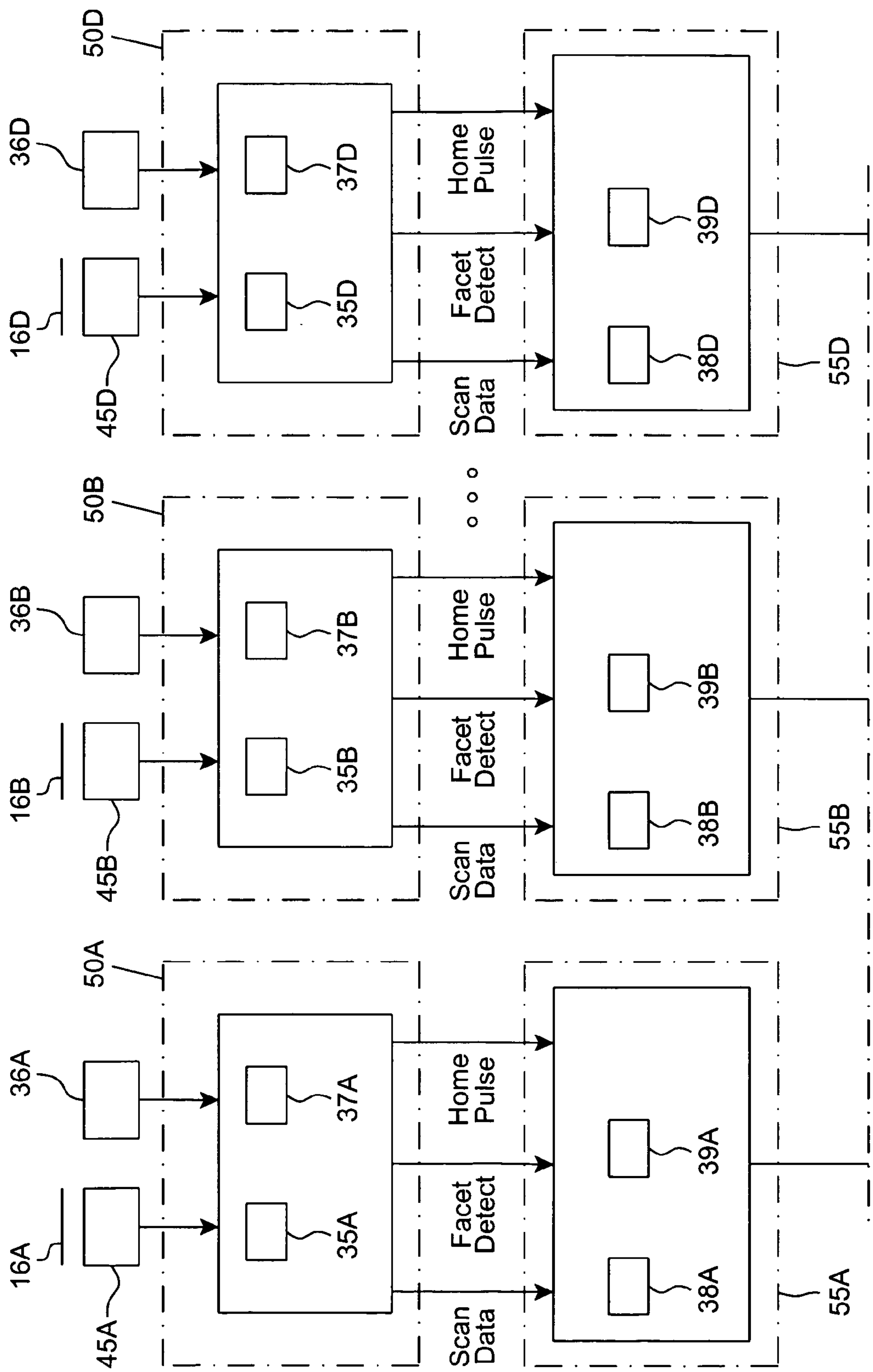
FIGS. 4A, 4B and 4C set forth a block functional diagram of bioptical holographic laser scanning system of the illustrative embodiment of the present invention, showing the major components of the system and their relation to each other.
Figure 4B:
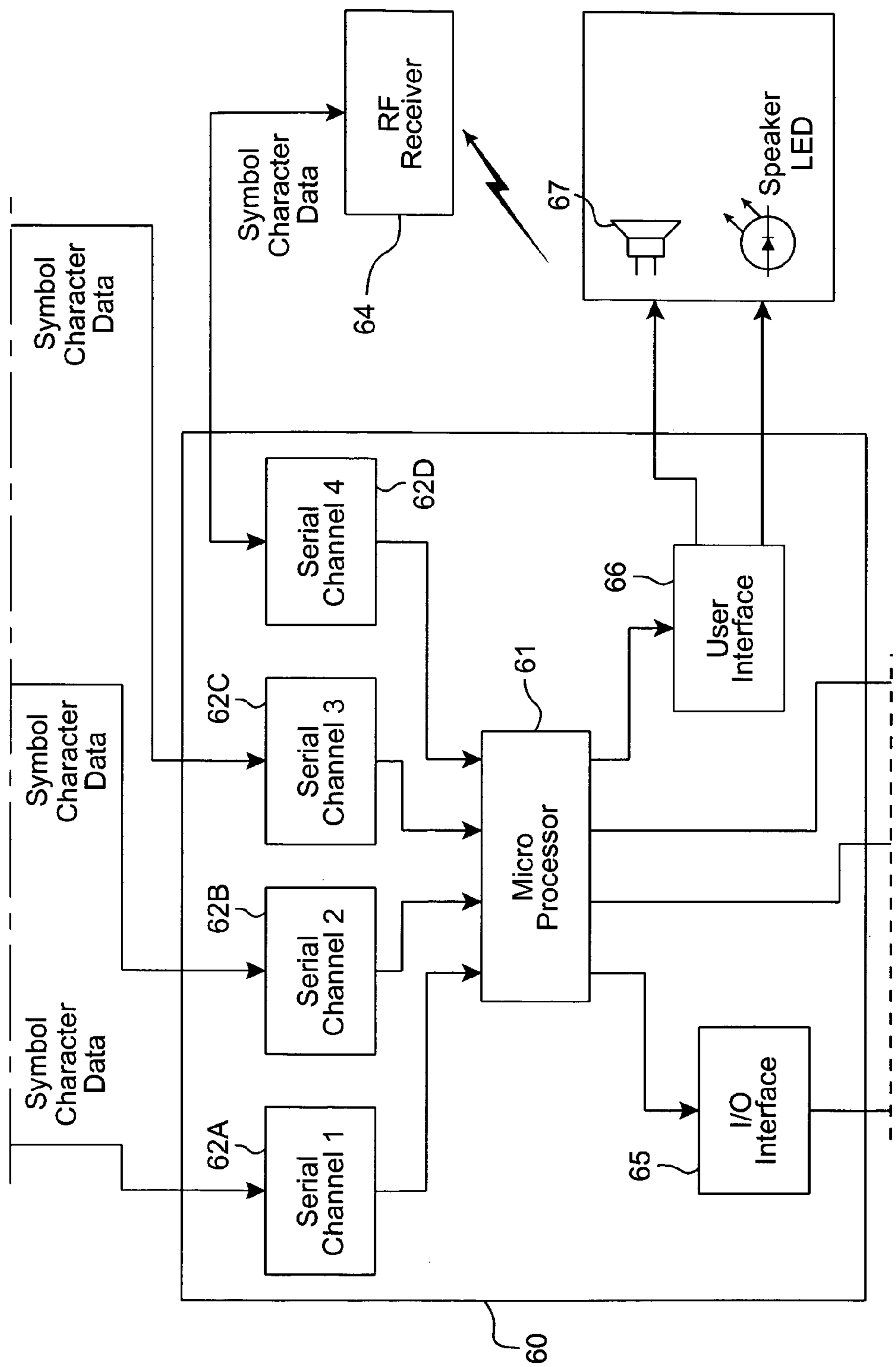
Figure 4C:
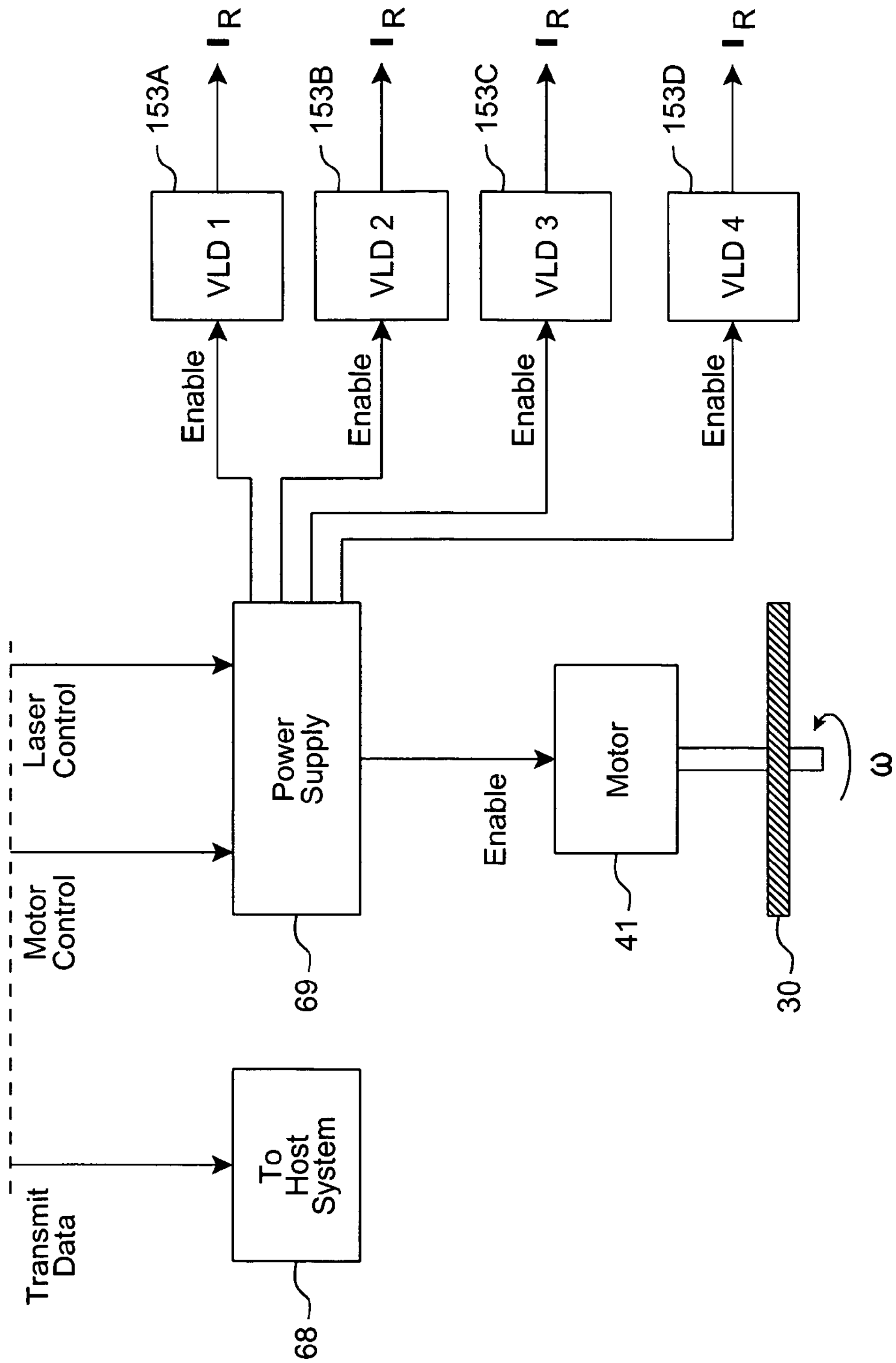
Figure 504:
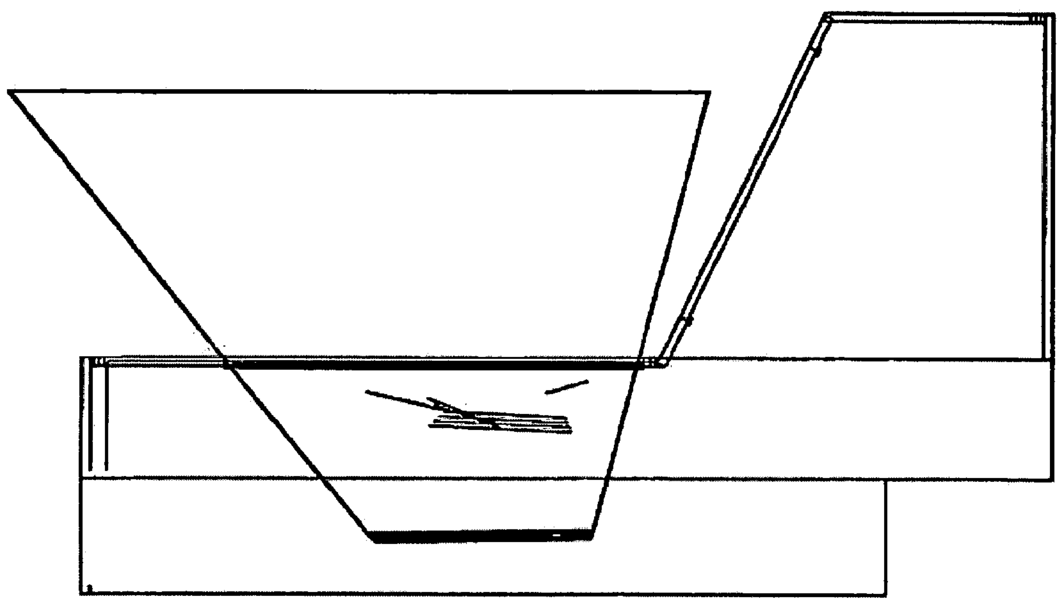

As shown in the system diagram of FIGS. 4A through 4C, the holographic laser scanning system of the present invention comprises a number of system components, many of which are realized on boards that have been hereinbefore described. For sake of simplicity, it will be best to describe these system components by describing the components realized on each of the above-described boards, and thereafter describe the interfaces and interaction therebetween.

In the illustrative embodiment, each analog scan data signal processing board 50A, 50B, 50C and 50D has the following components mounted thereon: an associated photodetector 45A (45B, 45C, 45D) (e.g. a silicon photocell) for detection of analog scan data signals (as described); an analog signal processing circuit 50A (S0B, 50C, 50D) for processing detected analog scan data signals; a 0-th diffraction order signal detector 36A (36B, 36C, 36D) for detecting the low-level, 0-th diffraction order signal produced from each holographic facet on the rotating scanning disc during scanner operation; and associated signal processing circuitry 37A (37B, 37C, 37D) for detecting a prespecified pulse in the optical signal produced by the 0-th diffraction order signal detector and generating a synchronizing signal S(t) containing a periodic pulse pattern. As will be described below in greater detail, the function of the synchronizing signal S(t) is to indicate when a particular holographic facet (e.g. Facet No. i=1) produces its 0-th order optical signal, for purposes of linking detected scan data signals with the particular holographic facets that generated them during the scanning process.

In the illustrative embodiment, each photodetector 45A, 45B, 45C and 45D is realized as an opto-electronic device and each analog signal processing (e.g. preamplification and A/D conversion) circuit 35A (35B, 35C, 35D) aboard the analog signal processing board is realized as an Application Specific Integrated Circuit (ASIC) chip. These chips are suitably mounted onto a small printed circuit (PC) board, along with electrical connectors which allow for interfacing with other boards within the scanner housing. With all of its components mounted thereon, each PC board is suitably mounted within the scanner housing.

In a conventional manner, the optical scan data signal $D_0$ focused onto the photodetector 45A (45B, 45C or 45D) during laser scanning operations is produced by light rays associated with a diffracted laser beam being scanned across a light reflective surface (e.g. the bars and spaces of a bar code symbol) and scattering thereof, whereupon the polarization state distribution of the scattered light rays is typically altered when the scanned surface exhibits diffuse reflective characteristics. Thereafter, a portion of the scattered light rays are reflected along the same outgoing light ray paths toward the holographic facet which produced the scanned laser beam. These reflected light rays are collected by the scanning facet and ultimately focused onto the photodetector of the associated light detection subsystem by its parabolic light reflecting mirror disposed beneath the scanning disc. The function of each photodetector is to detect variations in the amplitude (i.e. intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g. the scanned bar code symbol). The function of the analog signal processing circuitry is to band-pass filter and preamplify the electrical analog scan data signal $D_1$, in order to improve the SNR of the output signal.

In the illustrative embodiment, each digital scan data signal processing board 55A (55B, 55C, 55D) is constructed the same. On each of these signal processing boards, programmable digitizing circuit 38A (38B, 38C, 38D) is realized as a second ASIC chip. Also, a programmed decode computer 39A (39B, 39C, 39D) is realized as a microprocessor and associated program and data storage memory and system buses, for carrying out symbol decoding operations. In the illustrative embodiment, the ASIC chips, the microprocessor, its associated memory and systems buses are all mounted on a single printed circuit (PC) board, using suitable electrical connectors, in a manner well known in the art.

The function of the A/D conversion circuit is to perform a simple thresholding function in order to convert the electrical analog scan data signal $D_1$ into a corresponding digital scan data signal $D_2$ having first and second (i.e. binary) signal levels which correspond to the bars and spaces of the bar code symbol being scanned. In practice, the digital scan data signal $D_2$ appears as a pulse-width modulated type signal as the first and second signal levels thereof vary in proportion to the width of bars and spaces in the scanned bar code symbol.

The function of the programmable digitizing circuit is to convert the digital scan data signal D2, associated with each scanned bar code symbol, into a corresponding sequence of digital words (i.e. a sequence of digital count values) $D_3$. Notably, in the digital word sequence D3, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the holographic laser scanner of the present invention.

In bar code symbol scanning applications, the function of the programmed decode computer is to receive each digital word sequence $D_3$ produced from the digitizing circuit, and subject it to one or more bar code symbol decoding algorithms in order to determine which bar code symbol is indicated (i.e. represented) by the digital word sequence $D_3$, originally derived from corresponding scan data signal $D_1$ detected by the photodetector associated with the decode computer. In more general scanning applications, the function of the programmed decode computer is to receive each digital word sequence $D_3$ produced from the digitizing circuit, and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art.

As shown in FIGS. 4A through 4C, the central processing board 60 comprises a number of components mounted on a small PC board, namely: a programmed microprocessor 61 with a system bus and associated program and data storage memory, for controlling the system operation of the holographic laser scanner and performing other auxiliary functions; first, second, third and forth serial data channels 62A, 62B, 62C and 62D, for receiving serial data input from the programmable decode computers and RF receiver/base unit 64; an input/output (I/O) interface circuit 65 for interfacing with and transmitting symbol character data and other information to host computer system 68 (e.g. central computer, cash register, etc.); and a user-interface circuit 65 for providing drive signals to an audio-transducer 67 and LED-based visual indicators used to signal successful symbol reading operations to users and the like. In the illustrative embodiment, each serial data channel is be realized as an RS232 port, although it is understood that other structures may be used to realize the function performed thereby. The programmed control computer 61 also produces motor control signals, and laser control signals during system operation. These control signals are received as input by a power supply circuit 69 realized on the power supply PC board, identified hereinabove. Other input signals to the power supply circuit 69 include a 120 Volt, 60 Hz line voltage signal from a standard power distribution circuit. On the basis of the received input signals, the power supply circuit produces as output, (1) laser source enable signals to drive VLDs 153A, 153B, 153C, and 153D, respectively, and (2) motor enable signals in order to drive the scanning disc motor 41.

In the illustrative embodiment, RF base unit 64 is realized on a very small PC board mounted on the base plate 42 within the scanner housing. Preferably, RF base unit 64 is constructed according to the teachings of copending U.S. application Ser. No. 08/292,237 filed Aug. 17, 1995, also incorporated herein by reference. The function of the base unit is to receive data-packet modulated carrier signals transmitted from a remotely situated bar code symbol reader, data collection unit, or other device capable of transmitting data packet modulated carrier signals of the type described in said application Ser. No. 08/292,237, supra.

In some holographic scanning applications, where omnidirectional scanning cannot be ensured at all regions within a prespecified scanning volume, it may be useful to use scan data produced either (i) from the same laser scanning plane reproduced many times over a very short time duration while the code symbol is being scanned therethrough, or (ii) from several different scanning planes spatially contiguous within a prespecified portion of the scanning volume. In the first instance, if the bar code symbol is moved through a partial region of the scanning volume, a number of partial scan data signal fragments associated with the moved bar code symbol can be acquired by a particular scanning plane being cyclically generated over an ultra-short period of time (e.g. 1–3 milliseconds), thereby providing sufficient scan data to read the bar code symbol. In the second instance, if the bar code symbol is within the scanning volume, a number of partial scan data signal fragments associated with the bar code symbol can be acquired by several different scanning planes being simultaneously generated by the three laser scanning stations of the system hereof, thereby providing sufficient scan data to read the bar code symbol, that is, provided such scan data can be identified and collectively gathered at a particular decode processor for symbol decoding operations.

In order to allow the bioptical holographic scanner of the present invention to use symbol decoding algorithms that operate upon partial scan data signal fragments, as described above, the 0-th order signal detector and its associated processing circuitry are used to produce a periodic signal X(t), as discussed briefly above. As the periodic signal X(t) is generated by the 0-th order of the incident laser beam passing through the outer radial portion of each holographic facet on the rotating scanning disc, this signal will include a pulse at the occurrence of each holographic facet interface. However, in order to uniquely identify a particular facet for reference purposes, a "gap" of prespecified width $d_{gap}$, as shown in FIG. 3A1, is formed between two prespecified facets (i.e. i=1 and 6) at the radial distance through which the incident laser beam passes. Thus, in addition to the periodic inter-facet pulses, the periodic signal X(t) also includes a "synchronizing pulse" produced by the prespecified "gap" which is detectable every $T=2\pi/\omega$ [seconds], where $\omega$ is the constant angular velocity of the holographic scanning disc maintained by the scanning disc motor and associated driver control circuitry. Thus, while the function of the 0-th order light detector is to detect the 0-th diffractive order of the incident laser beam, the function of its associated signal processing circuitry is to (1) detect the periodic occurrence of the "synchronizing pulse" in the periodic signal X(t) and (2) simultaneously generate a periodic synchronizing signal S(t) containing only the periodic synchronizing pulse stream. The construction of such pulse detection and signal generation circuitry is well known within the ordinary skill of those in the art.

As each synchronizing pulse in the synchronizing signal S(t) is synchronous with the "reference" holographic facet on the scanning disc, the decode processor (i.e. computer) (39A, 39B, 39C, 39D) provided with this periodic signal can readily "link up" or relate, on a real-time basis, (1) each analog scan data signal $D_1$ it receives with (2) the particular holographic facet on the scanning disc that generated the analog scan data signal. To perform such signal-to-facet relating operations, the decode computer is provided with information regarding the order in which the holographic facets are arranged on the scanning disc. Such facet order information can be represented as a sequence of facet numbers (e.g. i=1, 6, 3, 9, 7, 4, 8, 11, 5, 12, 2, 10, 1) stored within the associated memory of each decode processor. By producing both a scan data signal and a synchronizing signal S(t) as described above, the holographic scanner of the present invention can readily carry out a diverse repertoire of symbol decoding processes which use partial scan data signal fragments during the symbol reading process. The advantages of this feature of the system will become apparent hereinafter.

In code symbol reading applications where partial scan data signal fragments are used to decode scanned code symbols, the synchronizing signal S(t) described above can be used to identify a set of digital word sequences $D_3$, (i.e. $\{D_s\}$), associated with a set of time-sequentially generated laser scanning beams produced by a particular holographic facet on the scanning disc. In such applications, each set of digital word sequences can be used to decode a partially scanned code symbol and produce symbol character data representative of the scanned code symbol. In code symbol reading applications where complete scan data signals are used to decode scanned code symbols, the synchronizing signal S(t) described above need not be used, as the digital word sequence $D_3$ corresponding to the completely scanned bar code symbol is sufficient to carry out symbol decoding operations using conventional symbol decoding algorithms known in the art.

Referring to FIGS. 5A1 through 5Z4, the omnidirectional laser scanning pattern generated by the bioptical holographic scanner hereof is illustrated in greater detail.

In FIGS. 5A1 through 5A4, all of the laser scanning planes that are projected through the bottom and side scanning windows during the course of a complete revolution of the holographic scanning disc are shown simultaneously. It is understood, however, that at any instant in time, only four scanning planes (i.e. scanlines) are being simultaneously generated, but that during a complete revolution of the holographic scanning disc, all 50 scanning planes are generated from four scanning stations of the system. The order in which each scanning plane is produced during a single revolution of the scanning disc is described by the schematic representation shown in FIG. 6K. Notably, as shown in FIG. 6K, different angular portions of different scanning facets are used at different laser scanning stations in order to generate laser scanning planes that produce laser scan lines of particular lengths at particular depths of focus and spatial regions in the 3-D scanning volume of the system. For example, as shown in FIG. 6K, at the laser scanning station ST1, only a small angular portions of scanning facet Nos. 8, 10, and 12 are used to generate laser scanning planes from the bottom scanning window using mirror groups MG2@ST1, whereas substantially greater angular portions of scanning facet Nos. 7, 9 and 11 are employed to generate laser scanning planes from the bottom scanning window using mirror groups MG1@ST1, and almost the entire angular extent of scanning facet Nos. 1, 2, 3 and 4 are used to generate laser scanning planes from the bottom scanning window using mirror groups MG3@ST1. At scanning station ST4, substantially the entire angular extent of scanning facet Nos. 1, 2, 3 and 4 are used to generate laser scanning planes from the side scanning window using mirror groups MG3@ST4.

In order to more fully appreciate complexity and capabilities associated with the omnidirectional laser scanning pattern of the present invention, it will be helpful to describe the structure of such subcomponents, as well as the manner in which such subcomponents are generated by particular holographic facets on the rotating scanning disc passing through particular laser scanning stations. Also, it will be helpful to show how, when such subcomponents of the laser scanning pattern are spatially combined within the space occupied between the bottom and side scanning windows, pairs of quasi-orthogonal scanning planes are produced therewithin to form the complete omnidirectional scanning pattern during each complete revolution of the holographic scanning disc.

As shown in FIGS. 5B1 through C5, when scanning facets (Nos. 7, 9 and 11) having high elevation angle characteristics and left (i.e. positive) skew angle characteristics pass through the first laser scanning station (ST1), these scanning facets sequentially generate laser scanning beams that reflect off the first group of beam folding mirrors (MG1@ST1) associated therewith during system operation, and project substantially vertically-disposed laser scanning planes through the bottom scanning window for reading horizontally-oriented (i.e. ladder-type) bar code symbols.

As shown in FIGS. 5D1 through 5E5, when scanning facets (Nos. 8, 10 and 12) having high elevation angle characteristics and right (i.e. negative) skew angle characteristics pass through the first laser scanning station (ST1), ), these scanning facets sequentially generate laser scanning beams that reflect off the second group of beam folding mirrors (MG2@ST1) associated therewith during system operation, and project substantially vertically-disposed laser scanning planes through the bottom scanning window for reading horizontally-oriented (i.e. ladder-type) bar code symbols.

As shown in FIGS. 5F1 through 5G5, when scanning facets (Nos. 1 through 4) having low elevation angle characteristics and no (i.e. zero) skew angle characteristics pass through the first laser scanning station (ST1), these scanning facets sequentially generate laser scanning beams that reflect off the third group of beam folding mirrors (MG3@ST1) associated therewith during system operation, and project substantially horizontally-disposed laser scanning planes through the bottom scanning window for reading vertically-oriented (i.e. picket-fence type) bar code symbols.

As shown in FIGS. 5H1 through 5H10, when scanning facets (Nos. 1–4 and 7–12) pass through the first laser scanning station (ST1), they sequentially generate laser scanning beams that reflect off the first, second and third groups of beam folding mirrors (MG1@ST1, MG2@ST1 and MG3@ST1) associated therewith during system operation, and project both substantially horizontally and vertically disposed laser scanning planes through the bottom scanning window for reading vertically-oriented (i.e. picket-fence type) bar code symbols and horizontally-oriented (i.e. ladder type) bar code symbols, respectively.

As shown in FIGS. 5K1 through 5L5, when scanning facets (Nos. 8, 10 and 12) having high elevation angle characteristics and right (i.e. negative) skew angle characteristics pass through the third laser scanning station (ST3), these scanning facets sequentially generate laser scanning beams that reflect off the first group of beam folding mirrors (MG1@ST3) associated therewith during system operation, and project substantially vertically disposed laser scanning planes through the bottom scanning window for reading horizontally-oriented (i.e. ladder type) bar code symbols.

As shown in FIGS. 5M1 through 5N5, when scanning facets (Nos. 7, 9 and 11) having high elevation angle characteristics and left (i.e. positive) skew angle characteristics pass through the third laser scanning station (ST3), these scanning facets sequentially generate laser scanning beams that reflect off the second group of beam folding mirrors (MG2@ST3) associated therewith during system operation, and project substantially vertically disposed laser scanning planes through the bottom scanning window for reading horizontally-oriented (i.e. ladder type) bar code symbols.

As shown in FIGS. 5O1 through 5P5, when scanning facets (Nos. 1–4) having low elevation angle characteristics and no (i.e. zero) skew angle characteristics pass through the third laser scanning station (ST3), these scanning facets sequentially generate laser scanning beams that reflect off the third group of beam folding mirrors (MG3@ST3) associated therewith, and project substantially horizontally disposed laser scanning planes through the bottom scanning window for reading vertically-oriented (i.e. picket-fence type) bar code symbols during system operation.

As shown in FIGS. 5Q1 through 5R5, when scanning facets (Nos. 1–4 and 7–12) pass through the third laser scanning station (ST3), these scanning facets sequentially generate laser scanning beams that reflect off the first, second and third groups of beam folding mirrors (MG1@ST3, MG2@ST3 and MG3@ST3) associated therewith during system operation, an project both substantially horizontally and vertically disposed laser scanning planes through the bottom scanning window for reading vertically-oriented (i.e. picket-fence type) bar code symbols and horizontally-oriented (i.e. ladder type) bar code symbols, respectively.

As shown in FIGS. 5S1 through 5T5, when scanning facets (Nos. 1–12) pass through the first, second and third laser scanning stations (ST3, ST2 and ST3), these scanning facets sequentially generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation, and project both substantially horizontally and vertically disposed laser scanning planes through the bottom scanning window for reading vertically-oriented (i.e. picket-fence type) bar code symbols and horizontally-oriented (i.e. ladder type) bar code symbols, respectively.

As shown in FIGS. SU1 through 5V5, when scanning facets (Nos. 7–12) pass through the fourth laser scanning station (ST4), these scanning facets sequentially generate laser scanning beams that reflect off the groups of beam folding mirrors (MG1@ST4 and MG2@ST4) associated therewith during system operation, and project substantially vertically disposed laser scanning planes through the side scanning window for reading horizontally-oriented (i.e. ladder type) bar code symbols.

As shown in FIGS. 5W1 through 5X5, when scanning facets (Nos. 1–6) pass through the fourth laser scanning station (ST4), these scanning facets sequentially generate laser scanning beams that reflect off the third group of beam folding mirrors (MG3@ST4) associated therewith during system operation, and project substantially horizontally disposed laser scanning planes through the side scanning window for reading vertically-oriented (i.e. picket-fence type) bar code symbols.

As shown in FIGS. 5Y1 through 5Z4, when scanning facets (Nos. 1–12) pass through the fourth laser scanning station (ST4), these scanning facets sequentially generate laser scanning beams that reflect off the first, second and third groups of beam folding mirrors (MG1@ST4, MG2@ST4 and MG3@ST4) associated therewith during system operation, and project both substantially horizontally and vertically disposed laser scanning planes through the side scanning window for reading vertically-oriented (i.e. picket-fence type) bar code symbols and horizontally-oriented (i.e. ladder type) bar code symbols, respectively.

The time sequential order in which each laser scanning plane is cyclically generated from the bioptical holographic laser scanning system of the illustrative embodiment described above, is shown in the schematic "facet versus timing" diagram of FIG. 6K.

Designing a Bioptical Holographic Laser Scanning System According to the Method of the Present Invention The basic design method disclosed in U.S. Pat. Ser. No. 08/949,915 filed Oct. 14, 1997, now U.S. Pat. Ser. No. 6,158,659, incorporated herein by reference, can be used to design the bioptical laser scanning system of the present invention. However, a recursive design method described hereinbelow with reference to FIGS. 7A through 7R is typically a more preferred method when the laser scanning pattern to be generated from the system is complex, as in the case of a high-performance bioptical POS laser scanner, as disclosed herein.

Referring to FIGS. 7A through 7R, the major steps involved in practicing the holographic scanner design method hereof will now be described in great detail. Notably, the terms "holographic scanner design method" and "scanner design method" are employed herein to describe the overall process used to design all of the subsystems of the holographic laser scanner including, but not limited to, the holographic scanning disc, the beam folding mirror array, the light collecting and detecting subsystem, the laser beam production modules, as well as the scanner housing within which such subsystems are compactly contained. Thus, the holographic scanner design method hereof comprises a collection of subsystem design methods and processes which interact with each other to provide a composite method. In general, there are numerous embodiments of the holographic scanner design method of the present invention. Factors which influence the design of the scanning disc and light detection subsystem include, for example, the polarization state of the incident laser beam used during scanning operations, as well as the polarization state of the laser light rays collected, focused and detected by the light collecting and detecting subsystem used during light collecting and detecting operations.

In the illustrative embodiments of the present invention, the scanner design methods hereof are carried out on a computer-aided design (CAD) workstation which can be realized using a computer system, such as the Macintosh 8500/120 computer system. In the illustrative embodiment, the CAD-workstation supports a 3-D geometrical database for storing and retrieving information representative of 3-D models of the holographic scanning apparatus and processes under design; as well as a relational database for storing and retrieving information representative of geometrical and analytical models holographic laser scanning apparatus and processes under design. In addition, the CAD workstation includes a diverse array of computer programs which, when executed, provide a number of important design and analysis tools. Such design and analysis tools include, but are not limited to: 3-D geometrical modeling tools (e.g. AUTOCAD geometrical modeling software, by AutoDesk, Inc. for creating and modifying 3-D geometrical models of virtually every aspect of the holographic laser scanning apparatus and processes under design; robust mathematical modeling tools (e.g. MATHCAD 3.1 for Macintosh by MathSoft, Inc. of Cambridge, Mass.) for creating, modifying and analyzing mathematical models of the holographic scanning apparatus and processes under design; and spreadsheet modeling tools (e.g. EXCEL by Microsoft Corporation, or LOTUS by Lotus Development Corporation) for creating, modifying and analyzing spreadsheet-type analytical models of the holographic scanning apparatus and processes under design. For purposes of simplicity of expression, the above-described CAD workstation and all of its tools shall be collectively referred to as the "Holographic Scanner Design (HSD) workstation" of the present invention. Where necessary or otherwise appropriate, the functionalities and tools of the HSD workstation will be elaborated in greater detail hereinafter.

As indicated in FIG. 7A, step A1 of the scanner design method involves geometrically specifying the volumetric (e.g. physical) dimensions of the scanner housing of a holographic laser scanner to be designed. In the illustrative embodiment, the laser scanner is a holographic bioptical laser scanning system having a pair of vertically and horizontally arranged scanning windows formed therein. Such geometric specifications include the position and size of a pair of vertically and horizontally arranged scanning windows formed therein, from which a complex omni-directional laser scanning pattern is to be generated and projected therefrom.

As indicated in FIG. 7A, step A2 of the scanner design method involves creating a 3-D Solid Geometry Model of the optical bench of the scanner and the scanner housing supported thereupon. The 3-D solid geometry model can be created on a computer workstation (e.g. $O_z$ workstation from Silicon Graphics, Inc.) running a 3-D solid geometry program (e.g. Designer from Alias-Wavefront, Inc. of Toronto, Canada) or any other suitably programmed computer system equipped with 3-D solid modeling software (e.g. CADKEY 3-D solid modeling software from CADKEY Corporation of Marlborough, Mass.).

As indicated in FIG. 7A, step A3 of the scanner design method involves producing a geometrical specification of the generalized 3-D structure of the laser scanning pattern and scanning volume to be generated from such scanning windows. Such geometrical specifications include scanning performance parameters (e.g. the volumetric dimensions of the laser scanning pattern, laser beam spot size of the laser scanning planes projected therewithin), as well as the focal zones of the scanning pattern required to read a predetermined set of bar code symbol structures). Preferably, such geometrical specifications will involve the creation of a 3-D solid geometry model of the composite laser scanning pattern to be generated from the holographic laser scanning system under design. In the illustrative embodiment, a 3-D geometrical model of the composite laser scanning pattern is schematically depicted in FIGS. 5A1 through 5V4. While it is not necessary to develop the model in such detail, it will be helpful to create sufficient structure for each of the laser scanning planes to be generated from the laser scanning platform under design. In general, the better the specification of the desired laser scanning pattern, the easier it will be for the designer to determine if he or she is on course with regards to the system design process. It is understood, however, that in some instances, it may be desirable to employ a generalized laser scanning specification and allow a great deal of flexibility during the later stages of the design process. Naturally, the resolution of the bar code symbols to be read will determine the largest cross sectional dimension that each scan line can be in order to resolve the bar code symbol. Thus, it will be necessary to provide a proper specification of the maximum cross-sectional diameter of the scanned laser beams within the specified scanning volume.

As indicated in FIG. 7B, step B1 of the scanner design method involves selecting an architecture for a holographic laser scanning platform to be designed and realized upon the optical bench within the specified scanner housing. In the illustrative embodiment, the holographic laser scanning platform is that schematically depicted in FIGS. 2A through 2K2. As shown therein, the selected scanning platform generally comprises: a plurality of laser scanning stations arranged about a holographic scanning disc having a plurality of left-skewed holographic scanning facets with both high and low elevation diffraction angles and a plurality of right-skewed holographic scanning facets with both high and low elevation diffraction angles. As described hereinabove, each laser scanning station (i.e. ST1, ST2, and ST3) comprises: a laser beam production module (LBPM); a first plurality of laser beam folding mirrors for folding laser beams diffracted from the plurality of left-skewed holographic scanning facets; a second plurality of laser beam folding mirrors for folding laser beams diffracted from the plurality of right-skewed holographic scanning facets; a laser light collection and detection subsystem having a parabolic (or elliptical) light focusing mirror disposed beneath the holographic scanning disc and a photodetector disposed about the holographic scanning disc; a scan data signal processing board for processing the analog scan data signals produced from the photodetector and producing digital character data; and a decode processing board for processing digital scan data and producing symbol character data. In the illustrative embodiment, the holographic laser scanning platform for the bioptic holographic laser scanner comprises: a holographic scanning disc having twelve (12) holographic optical elements (HOEs) or facets and three laser scanning stations. Three of the laser beam scanning stations are arranged about the holographic scanning disc for generating the first, second and third partial laser scanning patterns from the bottom scanning window. The fourth laser scanning station is mounted within the vertical portion of the scanner housing, and employs a set of beam folding mirrors to project the fourth partial laser scanning pattern out the vertical scanning window and above the bottom scanning window. Each of these subcomponents have been described in great detail hereinabove.

As indicated in FIG. 7B, step B2 of the scanner design method involves creating a 3-D Solid Geometry Model for each laser scanning station in the Holographic Scanning System. In the illustrative embodiment, this step of the design procedure can be carried out using the 3-D solid modeling system to create a parameterized 3-D solid model for each such laser scanning station.

As indicated in FIG. 7B, step B3 of the scanner design method involves using a 3-D solid modeling system to integrate the 3-D solid geometry models of the scanner housing, optical bench, holographic scanning disc, and laser scanning stations, thereby forming a composite 3-D solid geometrical model for the bioptical holographic laser scanning system under design.

As indicated in FIG. 7B, step B4 of the scanner design method involves symbolically embedding the first locally-defined hybrid Cartesian/Polar Coordinate System $R_{local\ 1}$ within the composite 3-D solid geometry model of the holographic laser scanning system, as shown in FIG. 2A1. The function of local coordinate reference system is to enable the specification of the propagation of laser beams generated from the laser beam production module of Laser Scanning Station No. 1 through the facets on the holographic scanning disc, and off the beam folding mirrors associated with the Laser Scanning Station, through the Bottom Scanning Window formed in the Scanner Housing.

As indicated in FIG. 7C, step B5 of the scanner design method involves symbolically embedding a second locally-defined hybrid Cartesian/Polar Coordinate System $R_{local\ 2}$ within the composite 3-D solid geometry model of the Holographic Laser Scanning System, as shown in FIG. 2A1. The function of local coordinate reference system is to enable the specification of the propagation of laser beams generated from the laser beam production module of Laser Scanning Station No. 2 through the facets on the holographic scanning disc, and off the beam folding mirrors associated with the Laser Scanning Station, through the Bottom Scanning Window formed in the Scanner Housing.

As indicated in FIG. 7C, step B6 of the scanner design method involves symbolically embedding a third locally-defined hybrid Cartesian/Polar Coordinate System $R_{local\ 3}$ within the composite 3-D solid geometry model of the Holographic Laser Scanning System, as shown in FIG. 2A1. The function of local coordinate reference system is to enable the specification of the propagation of laser beams generated from the laser beam production module of Laser Scanning Station No. 3 through the facets on the holographic scanning disc, and off the beam folding mirrors associated with the Laser Scanning Station, through the Bottom Scanning Window formed in the Scanner Housing.

As indicated in FIG. 7C, step B7 of the scanner design method involves symbolically embedding a fourth locally-defined hybrid Cartesian/Polar Coordinate System $R_{local\ 3}$ within the composite 3-D solid geometry model of the Holographic Laser Scanning System, as shown in FIG. 2A1. The function of local coordinate reference system is to enable the specification of the propagation of laser beams generated from the laser beam production module of Laser Scanning Station No. 4 through the facets on the holographic scanning disc, and off the beam folding mirrors associated with the Laser Scanning Station, through the Bottom Scanning Window formed in the Scanner Housing.

As indicated in FIG. 7D, step B8 of the scanner design method involves symbolically embedding a globally-defined hybrid Cartesian/Polar Coordinate System $R_{global}$ within the 3-D solid geometry model of the Holographic Laser Scanning System, as shown in FIG. 2A1. The function of this global coordinate reference system is to enable the specification of the propagation of laser beams generated from Laser Scanning Station Nos. 1, 2, 3 and 4 relative to the globally-based coordinate system $R_{global}$.

As indicated in FIG. 7D, step CA1 of the scanner design method involves creating, for each scanning facet passing through each Laser Scanning Station in the Holographic Scanning System, an analytical-based light diffraction model of the laser beam as it propagates from its laser beam production module (LBPM), towards and through each scanning facet on the holographic scanning disc in the system, as the scanning disc rotates about its axis of rotation. This analytical-based light diffraction model is also known as a laser scanning beam production model, and is set forth in FIGS. 8A through 8E. Preferably, this laser beam production model is created using spread-sheet based modeling tools which enable the embodying all of the analytical relationships defined in FIGS. 8A through 8E.

As indicated in FIG. 7D, step C1B of the scanner design method involves converting the analytical-based diffraction models created in Step C1A into corresponding vector-based light diffraction models of the laser beam diffraction processes, illustrated in FIGS. 8F1 through 8F5. The purpose of converting each analytical-based diffraction model to a vector-based light diffraction model is that it facilitates the computation of the x,y,z coordinates of outgoing diffracted laser beams. The use of a spreadsheet type program to perform such vector-based modeling facilitates the updating and sequential generation of outgoing diffracted laser beams along the start, middle and end of each scanning facet, as well as the convenient management and display of such coordinate data during the system design process. The function of the vector-based light diffraction model is to model the laser scanning plane generation processes carried out at each scanning station and generate the x,y,z components of each diffracted laser beam towards its point of focus as each scanning facet rotates through the incident laser beam which is maintained at a substantially constant incident angle thereto. These x,y,z components are stored in a Summary Table and describe the coordinates of each laser scanning plane generated from the system as the scanning disc rotates about its axis during each complete revolution.

In the illustrative embodiment, the vector-based light diffraction model for each scanning facet is schematically illustrated in FIGS. 8F1, 8F2, 8F3, 8F4 and 8F5. As shown in these figures, the incoming laser beam (i.e. incident) to scanning disk at angle A, is defined by a Reference vector (i.e. unit input vector) R which is the same for all scanning facets on the disc. Each outgoing diffracted laser beam is defined by an Object vector O, specified by (i) a point source located at the diffraction focal length (focus) of the scanning facet, (ii) the elevation angle (angle B) of the scanning facet, and (iii) the skew angle thereof, as shown in FIG. 8B.

As each incident laser beam is generated by a collimated light source (passing through the disc at angle A), the Reference beam $R_p$ for any point p on the scanning disk is the same, i.e. $R_p=R$. The Object beam emanating from any point p on the scanning facet shall be designated as $O_p=O-D$, where D is the vector from the center point of the scanning disc annulus to an arbitrary point p on the scanning facet. Notably, vector D in the above expression is not explicitly shown in the vector model of FIGS. 8F1 and 8F2, but is figured into the calculations employed therein.

Each outgoing diffracted laser beam (i.e. exiting ray) is calculated when the arbitrary point p on the scanning facet is rotated over the incoming laser beam. The rotation causes a new orientation for vector $R_p$ in the local co-ordinate system which shall be designated as $R_p'$. This new value is stored within the spreadsheet modeling program. Likewise the object ray O is rotated and the new value with respect to the locale co-ordinate system is calculated and stored in the spreadsheet modeling program. The exiting diffracted laser beam, or object ray, is calculated (i.e. as a unit output vector) using the grating equation:

$$O_p'=R-R_p'+O'$$

described in detail in "Handbook of Optical Holography" by H. J. Caulfield, Academic Press pp. 575–576, except that different notation has been used herein, and some simplifications have been made.

In FIG. 8F3, a schematic diagram is shown illustrating how the z component of the diffracted object ray (at point p) is calculated by the spreadsheet modeling program. In FIG. 8F4, a schematic diagram is shown illustrating how the x and y components of the diffracted object ray (at point p) are calculated by the spreadsheet modeling program, and that the object vector $O_p$ is composed by combining the x,y,z components thereof, as expressed in detail in FIG. 8F5.

As each facet is rotated through the incident laser beam, the x,y,z components of the computed Object ray (i.e. exiting diffracted laser beam) are stored in a Summary Table maintained by the spreadsheet program. The purpose of the Summary table is to organize the data calculated above for ready access by other programs during the design process. The Summary Table consists of a column of facet numbers and the associated unit output vectors for the middle, start and end of scanning lines expressed in x,y,z Cartesian format. These vectors are simply copied from the locations where they were calculated.

The vector-based light diffraction models as described above are used to model the laser scanning plane generation processes carried out at each scanning station and generate the x,y,z components of each diffracted laser beam towards its point of focus as each scanning facet rotates through the incident laser beam which is maintained at a substantially constant incident angle thereto as will now be described in detail.

As indicated in FIG. 7E, step C1C of the scanner design method involves assigning, to each scanning facet moving through each of the Laser Scanning Stations in the system, initial (or updated) values to the following scanning facet parameters: the input angle $A_i$, the elevation angle $B_i$, the skew angle $\theta_{skewi}$, the scan angle $\theta_{roti}$, the (diffraction) focal length $f_i$ of the facet, and the beam diameter at the point of incidence of the laser beam on the scanning disc, required to generate the desired laser scanning planes from the system under design.

As indicated in FIG. 7E, step C2A of the design method involves creating a geometrical optics model, for each scanning facet on the scanning disc, by computing the equalized facet area Ai for each facet which ensures equalized light collection therefrom. In the illustrative embodiment, this procedure uses polarization-dependent light diffraction efficiency analysis, Lambertian light collection analysis etc. in order to determine the area for each facet that ensures that the same amount of light is collected by the corresponding photodetector. The input parameters for the analytical model used to perform such calculations are: the focal length of each facet; the skew angle of the facet; the elevation angle of each facet; the incidence angle of each facet; the inner radius of the scanning disc; the outer radius of the scanning disc; and the total number of facets on the scanning disc. Notably, as the facet area is not a parameter in the diffraction-based model, this step need only be carried out when the diffraction angles, focal lengths and scanning patterns are attained by a particular configuration.

As indicated in FIG. 7E, step C2B of the design method involves numerically evaluating, for each scanning facet on the scanning disc, the relative light diffraction factor $H_i$ and the modulation depth $\Delta n_i$ required to achieve the same, and then store these values in the spreadsheet program.

FIG. 10A2 defines the facet design parameters that pertain to the optimization of the facet areas on the disc. The incidence plane contains the incident beam and the normal to the disc. The incidence angle, $\theta_i$ and angle A are measured in the incidence plane. The diffraction plane contains the diffracted beam and the normal to the disc. The diffraction angle, $\theta_d$, and angle B are measured in the diffraction plane. The angle between these two planes is defined as the skew angle, $\phi_{skew}$.

Additional parameters used in the determination of the facet areas are defined in FIG. 10A3. The top view of the holographic disc shows the orientation of the grating structure at an angle $\theta_{Ro}$ away from being perpendicular to the incidence plane. Section A—A in FIG. 10A4 shows a view of the parallel Bragg surfaces within the holographic medium of the scanning disc. Notably, section A—A shows a relatively large gelatin thickness simply for clarity. The angles in that figure drawing are denoted by a prime (') since those angles, as seen from the A—A perspective, are projections of the actual angles into the plane of A—A from either the incidence or diffraction plane. FIG. 10B lists the definitions of the parameters indicated in FIGS. 10A2 and 10A3, along with some additional parameters used in determining the diffraction efficiency of the facets. All of these parameters are used in determining the relative efficiency factors, $H_i$, of the facets, and thereby the relative facet areas.

In determining the design facet efficiencies the following parameters are given: incidence angle, diffraction angle, skew angle, facet angular width (defined previously as $\theta_{ROTi}$), average bulk refractive index of the holographic medium, S-polarization losses, and P-polarization losses. The effective gelatin thickness is also chosen ahead of time, with the intent of it being as thin as possible while still being able to modulate the refractive index far enough to achieve high diffraction efficiency. The reason for desiring a thin film is that efficiency varies more with disc rotation when the film is thicker (i.e. a result of Bragg sensitivity being greater when the film is thicker). As uniform efficiency is desired, a film as thin as possible is therefor also desired. However, the thinner the film, the higher the index modulation, $n_i$, must be in order to maximize the design efficiency, and there are limits on how high the modulation can go. Also, if the film is too thin, the efficiency of the third pass of the light through the disc from the light collector mirror to the photodetector will be reduced. Bearing these considerations in mind, a suitable effective film thickness is chosen.

Determining the design facet efficiencies involves applying a numerical solving algorithm to a complex non-linear formula. That formula is governed by the equations in FIGS. 10C1 through 10C3. The input constants of the formula are given above, the variables of the formula are the index modulation and the Bragg plane tilts, and the output of the formula relates Equations (19) & (22) to a solution goal. For ease of computation, and production, it is more convenient to use the maximum efficiency incidence angle, $\phi_{imax}$, that results from the Bragg plane tilt as the variable, rather than the Bragg plane tilt itself. This angle is not to be confused with the design incidence angle at which the laser beam strikes the disc when in use. The goal is achieved by allowing the numerical solver to vary the variables of the formula until Equation (22) is satisfied and Equation (19) is maximized for all facets. Equation (19) is the total diffraction efficiency of a given facet. Equation (22) is an expression which dictates the most uniform relative signal collection within a given facet.

Signal, as it is being referred to here, is the total amount of light being collected at any instant by a given facet. The variation in the amount of light collected as the disc rotates is referred to as the relative signal. It is normalized to some arbitrary amount, and is therefore unitless. The relative signal is directly proportional to the total facet efficiency, $T_s$, and to the facet area projected in the direction of the diffracted beam. Both of these values are functions of disc rotation. Furthermore, the projected facet area can be expressed as the product of some constant with the cosine of the diffraction angle. As a result, the relative signal can be expressed as the product of the total facet efficiency with the cosine of the diffraction angle.

Specific solutions of Equation (22) are graphically depicted in FIGS. 10D1 and 10D2 for facets 1 and 12 respectively. The plots in these figures show the variation of (diffraction) efficiency with disc rotation. The rotation angles are measured from the center of the given facet (zero on the abscissa), at which point the facet (i.e. grating) has an orientation angle of $\theta_{Ro}$ (nominal angle). It can be seen from FIG. 10D1 that as the incident laser beam approaches a more positive rotation angle, the efficiencies tend to rise. This is due to the maximum efficiency incidence angle being optimized to a value less than the working incidence angle. This effect offsets the fact that as we rotate in that direction the facet area appears smaller and smaller. The result is that the relative signal produced at the left extreme facet position ($\theta_R=\theta_{Ro}-\theta_{ROTi}$) is equal to the relative signal produced at the right extreme facet position ($\theta_R=\theta_{Ro}+\theta_{ROTi}$), and thereby Equation (22) is satisfied.

Using the facet design techniques described above, it is now possible to design and construct holographic scanning discs having facets with skew angle characteristics, wherein the incident Bragg angle of each facet is optimized so that the total light collection efficiency thereof exhibits maximal uniformity with respect to facet rotation. In summary, this technique involves varying the diffraction efficiency function of each facet (dependent on facet rotation angle) by (i) varying the Bragg Angle of the facet until (ii) the product of the diffraction efficiency function and the collection aperture function is observed to exhibit maximum uniformity with respect to facet rotation angle.

As a result of this aspect of the present invention, it is now possible to design and manufacture holographic scanning discs (i) having minimal diffraction efficiency variation with respect to disc rotation, as shown in FIGS. 10D2 and 10E2, and therefore (ii) capable of generating laser scanning beams having more uniform performance characteristics.

As indicated in FIG. 7E, step C2C of the design method involves numerically evaluating, for each i-th scanning facet, the relative light collection efficiency ξi thereof. This step involves using Equation No. 7 set forth in the table of FIG. 8E.

As indicated in FIG. 7E, step C2D of the design method involves numerically evaluating, for each i-th scanning facet, the total light collection area $A_i$ thereof, using substantially all of the surface area available on the scanning disc. This step involves using Equation No. 8 set forth in the table of FIG. 8E.

As indicated in FIG. 7F, step C2E of the design method involves determining, for each i-th scanning facet, the minimal value for the inner radius r, which allows the desired housing height using a reiterative computational procedure described in detail in U.S. patent Ser. No. 08/949,915 filed Oct. 14, 1997, now U.S. Pat. Ser. No. 6,158,659, incorporated herein by reference.

As indicated in FIG. 7F, step C2F of the design method involves verifying that geometrical parameters obtained for each i-th scanning facet above allow the facets to be physically laid out on the available surface area upon the scanning disc. Techniques for carrying out this step of the method are disclosed in U.S. Pat. Ser. No. 08/949,915 filed Oct. 14, 1997, now U.S. Pat. Ser. No. 6,158,659.

As indicated in FIG. 7F, step C2G of the design method involves confirming that light transmission efficiencies along the outgoing and relative optical paths produce sufficient power levels at photodetection. This step of the method is carried out using the spreadsheet information table set forth in FIGS. 9A through 9C.

As indicated in FIG. 7F, step C3A of the design method involves using the facet parameters computed in step C2A to compute a set of Construction Parameters for each facet on the scanning disc. This step of the method is described in detail in U.S. patent Ser. No. 08/949,915 filed Oct. 14, 1997, now U.S. Pat. Ser. No. 6,158,659.

As indicated in FIG. 7F, step C3B of the design method involves using the set of Construction Parameters computed in step C3A to construct a Construction Vector and thereafter install the Construction Vector into the Vector-Based Light Diffraction Model created in Step C1B for each of the facets on the scanning disc.

As indicated in FIG. 7G, step C4A of the design method involves specifying the depth of focus (DOF) and the minimum beam spot size (i.e. cross-sectional diameter) of the laser scanning planes to be generated from each facet on the scanning disc at each of the laser scanning stations. In practice, this step involves considering the assumed (i.e. initial value) focal length of the facet (i.e. its optical power), and then based on this specification, specifying the effective beam diameter (i.e. at the $1/e^2$ power point along the laser beam) that the scanned laser beam must have in the S and P polarization directions at the collimating lens L of the laser beam production module (LBPM) in each Laser Scanning Station so that the desired depth of focus and laser beam cross-sectional characteristics are attained throughout the scanning volume by the resulting laser scanning plane.

As illustrated in FIG. 11A1, a spreadsheet-type laser beam truncation analysis program is used to obtain the following measures: (1) the effective beam diameter (i.e. $1/e^2$ diameter) in the S and P polarization directions at the collimating lens within the laser beam production module (LBPM) under design; and (2) light intensity loss characteristics. The fixed input parameters to this program are VLD output wavelength $\lambda_{VLD}$, $\theta_s$, and $\theta_p$; and the variable input parameters are lens parameters such as, for example, focal length (mm), numerical aperture, clear aperture, etc. the output from this program is the effective beam diameter $d_e$ in the S and P directions at the lens, and the light intensity loss ($1/e^2$).

Given the laser and lens parameters, the spreadsheet truncation analysis program calculates the effect of truncation on the laser beam. The final result of the program is an "effective diameter" which is an equivalent 1/e-squared diameter that will produce the same spot at the focal point as the actual truncated laser beam. This is also the beam diameter that will be inserted into the main scanner disc design spreadsheet program. The actual number linked to the main scanner disc design spreadsheet program will be a rounded number. It will usually be rounded up to 0.1 to allow for tolerances. FIG. 11A2 sets forth a graphical plot of data produced by the truncation analysis spreadsheet program when numerically integrating the diffraction equation A(z), as described in FIGS. 11A1A through 11A1H.

A Gaussian Analysis spreadsheet program, as shown in FIGS. 11B1A through 11B2E, is then used to measure the amount of light intensity lost by virtue of truncation and propagation along the outgoing optical paths of the system. In the illustrative embodiment, the Gaussian Beam Analysis spreadsheet program has the following input parameters: wavelength of VLD, effective beam diameter at scanning disc $d_e$ (linked from the Truncation Analysis spreadsheet program), and assumed focal length of the holographic facet(s); the output from the program is the minimum beam spot size at light intensity loss ($1/e^2$) of the outgoing laser beam, and depth of field for each group of holographic facets.

As indicated in FIG. 7G, step C4B of the design method involves using the results from Step C4A above and initial facet parameters, to specify the focal length and numerical aperture of the VLD lens in the Refraction-Based Model of the Laser Beam Production Modules (used in the Holographic Scanning System) so as to produce laser scanning planes having the DOF and minimum beam spot size characteristics specified in Step C4A.

Steps Involving The Design Of Laser Scanning Station No. 1

As indicated in FIG. 7H, step C5 of the design method involves assigning, for each scanning facet passing through Laser Scanning Station No. 1, (initial or updated) coordinate values for the position and orientation of each beam folding mirror employed in the Laser Scanning Station No. 1, and using such coordinate values, constructing a Vector-Based Reflection Model of the propagation of the laser beam diffracted from the scanning facet towards and off the laser beam folding mirrors in the Laser Scanning Station so as to enable the geometrical modeling of laser scanning plane generation processes during each revolution of the holographic scanning disc about its axis of rotation.

As indicated in FIG. 7H, step C6A of the design method involves, for each scanning facet passing through Laser Scanning Station No. 1, integrating the Vector-Based Diffraction Model created in Step C2A and the Vector-Based Reflection Model created in STEP C5 so as to create a Vector-Based Geometric Optics Model of the laser scanning plane process generated from the scanning facet as it is passed through Laser Scanning Station No. 1.

As indicated in FIG. 7H, step C6B of the design method involves importing the Vector-Based Geometric Optics Model created during Step C6A, into the 3-D Solid Geometry Model of the Holographic Scanning System created during Step B3 in order to enable the 3-D Solid Geometry Model of the Holographic Scanning System to generate, relative to the global coordinate reference system global, geometrical models of the laser scanning planes produced during each revolution of the holographic scanning disc.

As indicated in FIG. 7I, step C7 of the design method involves using the Vector-Based Geometric Optics Models embodied within the 3-D Solid Geometry Model of the Holographic Scanning System to graphically plot the partial laser scanning pattern resulting from laser scanning beam production processes supported upon Laser Scanning Station No. 1.

As indicated in FIG. 7I, step C8 of the design method involves determining whether the parameters in the vector-based geometric optics model are optimally set so that the laser scan planes produced from laser scanning station 1 converge towards the desired laser scanning planes to be generated therefrom. If the designer determines that the laser scanning planes produced from laser scanning station ST1 have not yet converged towards the desired laser scanning planes to be generated therefrom, then the design process proceeds to step C9 in FIG. 7H, at which point the designer may, as necessary, modify the position of the beam folding mirrors employed in Laser Scanning Station ST1, and/or modify the facet parameters on the scanning disc as deemed necessary to achieve correspondence therebetween or to achieve an otherwise desired laser scanning pattern. Thereafter, the design process returns to Step C5, where updated coordinate values are reassigned to the position and orientation of each beam folding mirror, and vector-based reflection models are modified based on such modified coordinate values. During each recursive loop from Steps (i.e. Blocks) C5 through C8, Truncation Analysis and Gaussian Beam Analysis used in Steps C4 and C5 can be re-performed in connection with Laser Scanning Station ST1, in order to re-specify the VLD lens in Geometrical Optics Model of each LBPM, and determine the depth of field and resolution parameters for each scanning plane generated from the holographic scanning disc.

If the designer determines at Step C8 that the laser scanning planes produced from laser scanning station ST1 have converged towards the desired laser scanning planes to be generated therefrom, then the design process proceeds to Block C10 in FIG. 71, at which point (Step twenty-four), the designer optimizes the physical dimensions of each beam folding mirror in laser scanning station ST1. After a number of recursive loops, the parameters in the Vector-Based Geometric Optics Model will be optimally set so that the laser scanning planes produced from Laser Scanning Station No. 1 converge towards the desired Laser Scanning Planes to be generated therefrom, and each beam folding mirror has been truncated to a minimal set of dimensions.

In the illustrative embodiment, Step C10 is generally carried out by projecting the light collection geometry of each scanning facet (preferably specified by a set of vectors as shown in FIG. 12D) onto the first outgoing beam folding mirror (and each successive beam folding mirror) in the group of beam folding mirrors involved in the generation of each scanning plane from the Laser Scanning Station ST1, and then analyzing such geometrical projections on each given beam folding mirror to find the geometrical boundaries that covers the geometrical projections for the given beam folding mirror. The given beam folding mirror is trimmed such that its outer periphery corresponds to such geometrical boundaries, thereby minimized surface dimensions of the given beam folding mirror while maximum number of return light rays collected by the beam folding mirror. This geometrical projection process will be described below with reference to FIGS. 12A1 through 13D1, for the case addressing Scanning Stations No. 1, in particular. FIGS. 12A–12D and 14A1A–14D1B, address Scanning Station No. 2, whereas FIGS. 12A–12D and 15A1–15D3B, address Scanning Station No. 4.

In general, the first step of the facet trimming method involves specifying: the vertices of each facet on the disc using a set of vectors defined relative to the first local coordinate reference system $R_{local\ 1}$; and the vertices of each beam folding mirror (associated with a particular scanning plane generation process) using a second set of vectors also defined relative to the local coordinate reference system. Thereafter, the surface area of each facet is consecutively projected onto each beam folding mirror in its respective mirror group in order to determine if each mirror is large enough to collect the return laser light rays from the scanned bar code. This step can be carried out using geometrical projection techniques well known in the mathematical arts. Afterwards, geometrical projections onto the surfaces of each beam folding mirror are analyzed with a view towards modifying (i.e. trimming) the dimensions of each such mirror so that the maximum number of return light rays are collected using beam folding mirrors having minimized surface dimensions.

Steps Involving The Design Of Laser Scanning Station No. 2

As indicated in FIG. 7J, step D1 of the design method involves, for each scanning facet passing through Laser Scanning Station No. 2, assigning (initial or updated) coordinate values for the position and orientation of each beam folding mirror employed in the Laser Scanning Station No. 2, and using such coordinate values, construct a Vector-Based Reflection Model of the propagation of the laser beam diffracted from the scanning facet towards and off the laser beam folding mirrors in the Laser Scanning Station so as to enable the geometrical modeling of laser scanning plane generation processes during each revolution of the holographic scanning disc about its axis of rotation.

As indicated in FIG. D2A, step D2A of the design method involves, for each scanning facet passing through Laser Scanning Station No. 2, integrating the Vector-Based Diffraction Model created in Step CA2 and the Vector-Based Reflection Model created in step D1 so as to create a Vector-Based Geometric Optics Model of the laser scanning plane process generated from the scanning facet as it is passed through Laser Scanning Station No. 2.

As indicated in FIG. 7K, step D2B of the design method involves importing the Vector-Based Geometric Optics Model created during step D2A into the 3-D Solid Geometry Model of the Holographic Scanning System created during Step B3 in order to enable the 3-D Solid Geometry Model of the Holographic Scanning System to generate, relative to the global coordinate reference system, geometrical models of the laser scanning planes produced during each revolution of the holographic scanning disc As indicated in FIG. 7K, step D3 of the design method involves using the Vector-Based Geometric Optics Models embodied within the 3-D Solid Geometry Model of the Holographic Scanning System to graphically plot the partial laser scanning pattern resulting from laser scanning beam production processes supported upon Laser Scanning Station No. 2.

As indicated in FIG. 7L, step D4 of the design method involves determining whether the parameters in the vector-based geometric optics model are optimally set so that the laser scan planes produced from laser scanning station 2 converge towards the desired laser scanning planes to be generated therefrom. If the designer determines that the laser scanning planes produced from laser scanning station ST2 have not yet converged towards the desired laser scanning planes to be generated therefrom, then the design process proceeds to step D5 in FIG. 7L, at which point (Step thirtieth), the designer may, as necessary, modify the position of the beam folding mirrors employed in Laser Scanning Station ST2, and/or modify the facet parameters on the scanning disc as deemed necessary to achieve correspondence therebetween or to achieve an otherwise desired laser scanning pattern. Thereafter, the design process returns to step D1, where updated coordinate values are reassigned to the position and orientation of each beam folding mirror, and vector-based reflection models are modified based on such modified coordinate values. During each recursive loop from steps D1 through D4, Truncation Analysis and Gaussian Beam Analysis used in Steps C4 and C5 can be re-performed in connection with Laser Scanning Station ST2, in order to re-specify the VLD lens in Geometrical Optics Model of each LBPM, and determine the depth of field and resolution parameters for each scanning plane generated from the holographic scanning disc. If the designer determines that the laser scanning planes produced from laser scanning station ST2 have converged towards the desired laser scanning planes to be generated therefrom, then the design process proceeds to Step D6 in FIG. 7K, at which point (Step thirty-one), the designer optimizes the physical dimensions of each beam folding mirror in laser scanning station ST2. After a number of recursive loops, the parameters in the Vector-Based Geometric Optics Model will be optimally set so that the laser scanning planes produced from Laser Scanning Station ST2 converge towards the desired laser scanning planes to be generated therefrom.

As indicated in FIG. 7L, step D5 of the design method involves modifying, as necessary, the position of the beam folding mirrors employed in Laser Scanning Station No. 2, and/or modifying the facet parameters to achieve correspondence therebetween or to achieve an otherwise desired laser scanning pattern.

As indicated in FIG. 7L, step D6 of the design method involves optimizing the physical dimensions of each beam folding mirror employed in Laser Scanning Station No. 2 by projecting the geometry of each scanning facet onto each beam folding mirror involved in the generation of each scanning plane from the Laser Scanning Station. A more detailed description of this step is described above with respect to step C10 if FIG. 7H.

Steps Involving The Design Of Laser Scanning Station No. 3

As indicated in FIG. 7M, step E1 of the design method involves, for each scanning facet passing through Laser Scanning Station No. 3, assigning (initial or updated) coordinate values for the position and orientation of each beam folding mirror employed in the Laser Scanning Station No. 3, and using such coordinate values, construct a Vector-Based Reflection Model of the propagation of the laser beam diffracted from the scanning facet towards and off the laser beam folding mirrors in the Laser Scanning Station so as to enable the geometrical modeling of laser scanning plane generation processes during each revolution of the holographic scanning disc about its axis of rotation.

As indicated in FIG. 7M, step E2A of the design method involves, for each scanning facet passing through Laser Scanning Station No. 3, integrating the Vector-Based Diffraction Model created in Step C2A and the Vector-Based Reflection Model created in step El above so as to create a Vector-Based Geometric Optics Model of the laser scanning plane process generated from the scanning facet as it is passed through Laser Scanning Station No. 3.

As indicated in FIG. 7M, step E2B of the design method involves importing the Vector-Based Geometric Optics Model created during Step E2A into the 3-D Solid Geometry Model of the Holographic Scanning System created during Step B3 in order to enable the 3-D Solid Geometry Model of the Holographic Scanning System to generate, relative to the global coordinate reference system, geometrical models of the laser scanning planes produced during each revolution of the holographic scanning disc.

As indicated in FIG. 7N, step E3 of the design method involves using the Vector-Based Geometric Optics Models embodied within the 3-D Solid Geometry Model of the Holographic Scanning System, to graphically plot the partial laser scanning pattern resulting from laser scanning beam production processes supported upon Laser Scanning Station No. 3.

As indicated in FIG. 7N, step E4 of the design method involves determining whether the parameters in the vector-based geometric optics model have been optimally set so that the laser scan planes produced from Laser Scanning Station No. 3 converge towards the desired laser scanning planes to be generated therefrom. If the designer determines that the laser scanning planes produced from laser scanning station ST3 have not yet converged towards the desired laser scanning planes to be generated therefrom, then the design process proceeds to Step E5 in FIG. 7M, at which point, the designer may, as necessary, modify the position of the beam folding mirrors employed in Laser Scanning Station ST3, and/or modify the facet parameters on the scanning disc as deemed necessary to achieve correspondence therebetween or to achieve an otherwise desired laser scanning pattern. Thereafter, the design process returns to Step E1, where updated coordinate values are reassigned to the position and orientation of each beam folding mirror, and vector-based reflection models are modified based on such modified coordinate values.

During each recursive loop from Steps E1 through E4, Truncation Analysis and Gaussian Beam Analysis used in Steps C4 and C5 can be reperformed in connection with Laser Scanning Station ST3, in order to respecify the VLD lens in Geometrical Optics Model of each LBPM, and determine the depth of field and resolution parameters for each scanning plane generated from the holographic scanning disc. If the designer determines that the laser scanning planes produced from laser scanning station ST3 have converged towards the desired laser scanning planes to be generated therefrom, then the design process proceeds to Step E6 in FIG. 7N, at which point the designer optimizes the physical dimensions of each beam folding mirror in laser scanning station ST3. After a number of recursive loops, the parameters in the Vector-Based Geometric Optics Model will be optimally set so that the laser scanning planes produced from Laser Scanning Station ST3 converge towards the desired laser scanning planes to be generated therefrom.

As indicated in FIG. 7N, step E5 of the design method involves modifying, as necessary, the position of the beam folding mirrors employed in Laser Scanning Station No. 3, and/or modify the facet parameters to achieve correspondence therebetween or to achieve an otherwise desired laser scanning pattern.

As indicated in FIG. 7N, step E6 of the design method involves optimizing the physical dimensions of each beam folding mirror employed in Laser Scanning Station No. 3 by projecting the geometry of each scanning facet onto each beam folding mirror involved in the generation of each scanning plane from the Laser Scanning Station. A more detailed description of this step is described above with respect to step C10 if FIG. 7H.

Steps Involving The Design Of Laser Scanning Station No. 4

As indicated in FIG. 70, step F1 of the design method involves, for each scanning facet passing through Laser Scanning Station No. 4, assigning (initial or updated) coordinate values for the position and orientation of each beam folding mirror employed in the Laser Scanning Station No. 4, and using such coordinate values, construct a Vector-Based Reflection Model of the propagation of the laser beam diffracted from the scanning facet towards and off the laser beam folding mirrors in the Laser Scanning Station so as to enable the geometrical modeling of laser scanning plane generation processes during each revolution of the holographic scanning disc about its axis of rotation.

As indicated in FIG. 7O, step F2B of the design method involves importing the Vector-Based Geometric Optics Model created during Step F2A into the 3-D Solid Geometry Model of the Holographic Scanning System created during Step B3 in order to enable the 3-D Solid Geometry Model of the Holographic Scanning System to generate, relative to the global coordinate reference system, geometrical models of the laser scanning planes produced during each revolution of the holographic scanning disc.

As indicated in FIG. 7P, step F3 of the design method involves using the Vector-Based Geometric Optics Models embodied within the 3-D Solid Geometry Model of the Holographic Scanning System to graphically plot the partial laser scanning pattern resulting from laser scanning beam production processes supported upon Laser Scanning Station No. 4.

As indicated in FIG. 7P, step F4 of the design method involves determining whether the parameters in the vector-based geometric optics model are optimally set so that the laser scan planes produced from laser scanning station 4 converge towards the desired laser scanning planes to be generated therefrom.

As indicated in FIG. 7P, step F5 of the design method involves modifying, as necessary, the position of the beam folding mirrors employed in Laser Scanning Station No. 4, and/or modify the facet parameters to achieve correspondence therebetween or to achieve an otherwise desired laser scanning pattern.

As indicated in FIG. 7P, step F6 of the design method involves optimizing the physical dimensions of each beam folding mirror employed in Laser Scanning Station No. 4 by projecting the geometry of each scanning facet onto each beam folding mirror involved in the generation of each scanning plane from the Laser Scanning Station. A more detailed description of this step is described above with respect to step C10 if FIG. 7H.

Steps Involving The Design Of The Holographic Laser Scanning Disc And The Laser Scanning Stations As indicated in FIG. 7Q, step G of the design method involves laying out holographic scanning facets on the holographic scanning disc using the computed equalized areas for each facet, and any facet ordering imposed for satisfaction of a predetermined constraint.

As indicated in FIG. 7Q, step $H_1$ of the design method involves designing the multifunction light diffractive grating employed within the laser beam production module of each Laser Scanning Station in the Holographic Scanning System. The input parameters are the angle of incidence of the facets, the average angle of diffraction of the facets, wavelength; the output parameters are the construction parameters required to make multi-function plate and dispersion plots for the laser beam production module and scanning disc.

As indicated in FIG. 7Q, step H2 of the design method involves using a spreadsheet program to perform Astigmatism Analysis on the resulting design of the Laser Beam Production Module. The inputs to the spreadsheet program are multi-function plate parameters; whereas the output parameters are convergence/divergence plots of laser beams produced from the multifunction plate.

As indicated in FIG. 7Q, step H3 of the design method involves using a spreadsheet program to perform Dispersion Analysis on the resulting design for each Laser Beam Production Module and holographic scanning disc. The inputs to the spreadsheet program are multi-function plate parameters, average facet parameters; whereas the output parameters are dispersion plots of scanning facets.

As indicated in FIG. 7R, step I1 of the design method involves, for each Laser Scanning Station, using a spreadsheet program to design the light collection mirror disposed beneath the holographic scanning disc in relation to the specified location of the photodetector associated therewith. This process involves using the specifications for the holographic scanning disc, scanner housing, beam folding mirrors and resulting laser scanning pattern. The input parameters to the spreadsheet program are the maximum distance above the scanning disc (i.e. box height), the angle of incidence of the laser beam on the scanning disc, focal length of the light collection mirror, collection width of the worst case scanning facet, and scan angle of facet; whereas the output parameters are surface specifications of the light collecting surface.

As indicated in FIG. 7R, step 12 of the design method involves using a spreadsheet program to perform Off-Bragg Analysis on focused light rays being directed from the light collection mirror through the holographic scanning disc, towards the photodetector within Laser Scanning Station. The input parameters to the spreadsheet program are the extreme Bragg angles and Bragg sensitivity curve; whereas the output parameters are percentage of light loss due to diffraction through scanning facet. If light loss is too great, then respond by changing position of photodetector and/or change angle of incidence A.

As indicated in FIG. 7R, step I3 of the design method involves using a spreadsheet program to determine the minimum area of the photodetector employed within the light collection and photodetection subsystem in each Laser Scanning Station. This procedural step solves the problem of the beam diameter increasing in size at the photodetector in response to increased axial motion in the image plane. The input parameters to the spreadsheet program are the extreme angles of left, right, in and out beams off the light collection mirror to the photodetector (i.e. cone of rays from light collection mirror to photodetector), the distance from the light collection mirror to the photodetector, focal length of light collection mirror, and depth of field at target; whereas the output parameters are the surface area of the photodetector. If at any stage of the design process, the worst case geometry gets worse, then the detector area design step and light collection mirror (size and shape) design step are repeated.

Below is a procedure for minimizing the detector area in the bioptical laser scanner of the present invention: (1) Insert all key parameters into a light collection mirror/detector-size spreadsheet; (2) Key parameters are: (a) assumed height of detector above disk (this will be modified by the spreadsheet design process), (b) assumed distance from disk rotation axis (also modified by the spreadsheet design process), (c) angle of incidence of the VLD beam at the disk, (d) angle of diffraction, (e) radius of disk, (f) minimum inner radius of facets, (g) maximum outer radius of facets, (h) divergence of incident VLD beam at disk, (j) diffraction focal length of facet (waist location), and (k) desired depth of field; (3) the spreadsheet design program is run with the above parameters; (4) the detector area is one of the output parameters provided by the spreadsheet; (5) If the detector area is larger than desired, one, or both, of the two main assumed input parameters, (a) and (b) is (are) adjusted until a desired detector size is achieved.

Parameter (a) employed in the above procedure is generally fixed by other requirements, such as the height of the scanner box and the need to avoid obstructing the outgoing and return beam paths. Decreasing the distance from the axis of rotation (parameter b) will decrease the size of the photodetector. However, decreasing this distance will also increase the depth of the light collection mirror below the disk. So an optimum value may have to be selected. This optimum value is often a "best compromise" between depth of the light detecting mirror and size of the photodetector. The spreadsheet will provide the necessary information for making that selection. The light collection mirror/photodetector-size spreadsheet is simply an application of the geometric and trigonometric equations associated with the light collection mirror/detector geometry.

As indicated in FIG. 7R, step J of the design method involves using the finalized models in order to construct the holographic scanning disc, and components employed within the Holographic Scanning System As indicated in FIG. 7R, step K of the design method involves assembling the constructed components to produce the Holographic Scanning System.

Modifications To Illustrative Embodiments of Present Invention

The illustrative embodiments of the holographic laser scanning system of the present invention as described above may be modified in various ways using the design method set forth herein. For example, more or less groups of beam folding mirrors can be added to each laser scanning station within the system. Also more or less laser scanning stations might be employed within the system. Also, more or less facets (or groups of facets) and corresponding groups of light bending mirrors may be added. Also, the scan pattern produced from the bottom and side windows can be altered. Also, the dimensions of the scanner housing and the optical subsystem housed therein can be altered. Such modifications might be practiced in order to provide an omnidirectional laser scanning pattern having scanning performance characteristics optimized for a specialized scanning application.

While the scanning disc of the illustrative embodiment employed facets having low elevation angle characteristics and no (i.e. zero) skew angle characteristics, it is understood that it might be desirable in particular applications to use scanning facets having low elevation angle characteristics and left and/or right skew angle characteristics to as to enable a compact scanner design in a particular application.

While the various embodiments of the holographic laser scanner hereof have been described in connection with linear (1-D) bar code symbol scanning applications, it should be clear, however, that the scanning apparatus and methods of the present invention are equally suited for scanning 2-D bar code symbols, as well as alphanumeric characters (e.g. textual information) in optical character recognition (OCR) applications, as well as scanning graphical images in graphical scanning arts.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying claims to Invention.

What is claimed is:

1. A laser scanning system comprising:

a housing having a first portion and a second portion, said first portion having a bottom window, and said second portion having a side window; and a plurality of laser scanning stations disposed within said housing, wherein each said laser scanning station comprises a light beam source and corresponding groups of light bending mirrors disposed within said housing, that cooperate with a plurality of light directing elements to produce laser scanning planes that are projected within a 3-D scanning volume disposed above said bottom window and adjacent said side window;

wherein a first set of said plurality of laser scanning stations, are disposed within said first portion of said housing, and produce a first set of laser scanning planes passing through said bottom window;

wherein said first portion of said housing has a depth of less than 5 inches; and wherein a given laser scanning station produces scan lines that pass through said side window, said given laser scanning station comprising a collimating lens that cooperates with a plurality of holographic optical elements to increase focal distance of scan lines passing through said side window, thereby allowing said plurality of holographic optical elements to be used in producing scan lines that pass through both first and side windows.

2. The laser scanning system of claim 1, wherein the depth of said first portion is less than 3.5 inches.

3. The laser scanning system of claim 1, wherein a second set of said plurality of laser scanning stations produce a second plurality of laser scanning planes passing through said side window.

4. The laser scanning system of claim 1, wherein said second portion houses groups of light bending mirrors associated with said second set of light scanning stations.

5. The laser scanning system of claim 1, wherein the volume of said housing is less than 2000 cubic inches.

6. The laser scanning system of claim 1, wherein the volume of said housing is less than 1650 cubic inches.

7. The laser scanning system of claim 1, wherein said 3-D scanning volume is greater than 400 cubic inches.

8. The laser scanning system of claim 1, wherein resolution of a bar code symbol that said laser scanning planes can resolve is on the order of 0.006 inches wide.

9. The laser scanning system of claim 1, wherein said laser scanning planes are quasi-orthogonal.

10. The laser scanning system of claim 1, wherein said first portion of the housing is disposed under a counter in a point of sale application.

11. The laser scanning system of claim 1, wherein said holographic optical elements are integrated in a rotating disc, and wherein said photodetector is mounted directly above the edge of the rotating disc.

12. The laser scanning system of claim 1, wherein said holographic optical elements are integrated in a rotating disc, and wherein said photodetector is mounted outside the outer periphery of the rotating disc.

13. The laser scanning system of claim 1, wherein at least one member of said first group $G_1$ of holographic optical elements have symmetrical left skew angle characteristics with respect to the right skew angle characteristics of at least one corresponding member of said second group $G_2$ of holographic optical elements.

14. The laser scanning system of claim 1, which comprises multiple holographic optical elements that simultaneously focus multiple scanning beams to overlapping regions in a 3-D scanning volume at varying focal distances (preferably, 2 inches or less difference in focal distance), which minimizes the effects of paper noise.

15. The laser scanning system of claim 1, wherein said plurality of light directing elements comprise a plurality of multi-faceted volume holographic elements.

16. The laser scanning system of claim 15, wherein a plurality of multi-faceted volume holographic elements are supported by a scanning disc.

17. A laser scanning system comprising:

a housing having a first portion and a second portion, said first portion having a bottom window, and said second portion having a side window; and a plurality of laser scanning stations disposed within said housing, wherein each said laser scanning station includes a light beam source and corresponding groups of light bending mirrors disposed within said housing, that cooperate with a plurality of light directing elements to produce laser scanning planes that are projected within a 3-D scanning volume disposed above said bottom window and adjacent said side window;

wherein a first set of said plurality of laser scanning stations are disposed within said first portion of said housing, and produce a first set of laser scanning planes passing through said bottom window;

wherein said first portion of said housing has a depth of less than 5 inches; and wherein some of said groups of light bending mirrors cooperate with light directing elements that have high elevation angle characteristics, and other groups of light bending mirrors cooperate with light directing elements that have low elevation angle characteristics.

18. The laser scanning system of claim 17, wherein some of said groups of light bending mirrors cooperate with light directing elements that have left skew angle characteristics, and other groups of light bending mirrors cooperate with light directing elements that have right skew angle characteristics.

19. The laser scanning system of claim 17, wherein said bottom window has a substantially horizontal orientation and said side window has a substantially vertical orientation.

20. The laser scanning system of claim 17, wherein said plurality of laser scanning stations comprise four laser scanning stations.

21. The laser scanning system of claim 17, wherein some of said light bending mirrors having a different number of vertices than do other light bending mirrors.

22. The laser scanning system of claim 17, wherein geometry, placement and orientation of said light bending mirrors are optimized to satisfy physical constraints with respect to said housing.

23. The laser scanning system of claim 17, wherein said bottom window has a substantially horizontal orientation and said side window has a substantially vertical orientation, and wherein said second set of laser scanning stations comprise a single laser scanning station that produces laser scanning planes passing through said side window.

24. The laser scanning system of claim 17, wherein said bottom and side windows include a spectral filtering subsystem that transmits a narrow band of spectral components of light including the light associated with said laser scanning planes.

25. The laser scanning system of claim 17, wherein said light beam source for a given laser scanning station includes a visible laser diode, at least one collimating lens and a diffractive optical element producing S polarized light.

26. The laser scanning system of claim 25, wherein said collimating lens and diffractive optical element substantially eliminate astigmatic characteristics of light produced by the visible laser diode.

27. The laser scanning system of claim 17, wherein each said laser scanning station includes light collection optical elements comprising a parabolic mirror and a photodetector.

28. The laser scanning system of claim 27, wherein said photodetector is substantially disposed above incidence of light beams onto said light directing elements.

29. The laser scanning system of claim 17, which further comprises light collection optical elements coupled to signal processing circuitry that has multiple decoding channels.

30. The laser scanning system of claim 29, which further comprises a mechanism for linking, in each decoding channel, a particular optical path to a given scan data signal.

31. The laser scanning system of claim 29, which further comprises a mechanism for analyzing scan data signal fragments over multiple decoding channels to identify bar code symbols therein.

* * * * *